US006578068B1

(12) United States Patent
Bowman-Amuah

(10) Patent No.: US 6,578,068 B1
(45) Date of Patent: Jun. 10, 2003

(54) LOAD BALANCER IN ENVIRONMENT SERVICES PATTERNS

(75) Inventor: Michel K. Bowman-Amuah, Colorado Springs, CO (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/387,576

(22) Filed: Aug. 31, 1999

(51) Int. Cl.[7] .......... G06F 15/16

(52) U.S. Cl. .......... 709/203; 709/105; 709/226

(58) Field of Search .......... 709/226, 201, 709/203, 202, 223, 224, 235, 238, 239, 106, 105

(56) References Cited

U.S. PATENT DOCUMENTS

| | | | | |
|---|---|---|---|---|
| 5,047,918 A | 9/1991 | Schwartz et al. | 707/203 |
| 5,133,075 A | 7/1992 | Risch | 707/201 |
| 5,187,787 A | 2/1993 | Skeen et al. | 709/314 |
| 5,241,580 A | 8/1993 | Babson, III | 379/15 |
| 5,257,369 A | 10/1993 | Skeen et al. | |
| 5,291,593 A | 3/1994 | Abraham et al. | 707/103 |
| 5,301,270 A | 4/1994 | Steinberg et al. | 345/326 |
| 5,301,320 A | 4/1994 | McAttee et al. | 395/650 |
| 5,313,636 A | 5/1994 | Noble et al. | 707/1 |
| 5,414,812 A | 5/1995 | Filip et al. | 707/103 |
| 5,434,978 A | 7/1995 | Dockter et al. | 709/230 |
| 5,437,038 A | 7/1995 | Silberbauer et al. | 395/700 |
| 5,457,797 A | 10/1995 | Butterworth et al. | 709/302 |
| 5,459,837 A | 10/1995 | Caccavale | |
| 5,463,686 A | 10/1995 | Lebourges | 379/220 |
| 5,471,629 A | 11/1995 | Risch | 707/201 |
| 5,475,844 A | * 12/1995 | Shiramizu et al. | 709/104 |
| 5,499,371 A | 3/1996 | Henninger et al. | 717/2 |
| 5,560,005 A | 9/1996 | Hoover et al. | 707/10 |
| 5,568,644 A | 10/1996 | Nelson et al. | 395/741 |

(List continued on next page.)

FOREIGN PATENT DOCUMENTS

| | | | |
|---|---|---|---|
| EP | 0817020 | 1/1998 | |
| EP | 0123456 A2 | 1/2000 | 100/100 |
| WO | WO92/01251 | 1/1992 | |
| WO | WO 99/08208 | 2/1999 | G06F/17/30 |
| WO | WO 99/44155 | 9/1999 | |
| WO | PCT/US00/23885 | 8/2000 | |
| WO | PCT/US00/23999 | 8/2000 | |
| WO | PCT/US00/24082 | 8/2000 | |
| WO | PCT/US00/24083 | 8/2000 | |
| WO | PCT/US00/24084 | 8/2000 | |
| WO | PCT/US00/24085 | 8/2000 | |
| WO | PCT/US00/24086 | 8/2000 | |
| WO | PCT/US00/24125 | 8/2000 | |
| WO | PCT/US/00/24188 | 8/2000 | |
| WO | PCT/US00/24189 | 8/2000 | |
| WO | PCT/US00/24236 | 8/2000 | |

OTHER PUBLICATIONS

Microsoft Corporation, *Microsoft Solutions Framework Overview A Quick Tour of the MSF Models,* URL:http://channels.microsoft.com/enterprise/support/support/consult, Oct. 9, 1999.

(List continued on next page.)

*Primary Examiner*—Ario Etienne
*Assistant Examiner*—Abdullahi E. Salad
(74) *Attorney, Agent, or Firm*—Oppenheimer Wolff & Donnelly LLP

(57) ABSTRACT

A system and method are provided for distributing incoming requests from a user interface amongst a client and server components for optimizing usage of resources. Incoming requests are first received and stored by an activity module. The activity module instructs a client to handle a first subset of the requests and passes a second subset of the requests on to a utilization-based load balancer. The second subset of the requests are stored on the load balancer, and an availability of server components is determined and a listing of available server components is compiled. A determination is made as to which server component on the listing of available server components is most appropriate to receive a particular request. Each particular request of the second subset of requests is sent to the selected server component determined to be most appropriate to receive the particular request.

12 Claims, 123 Drawing Sheets

U.S. PATENT DOCUMENTS

| | | | | | |
|---|---|---|---|---|---|
| 5,581,758 | A | | 12/1996 | Burnett et al. | 707/103 |
| 5,606,664 | A | | 2/1997 | Brown et al. | 709/224 |
| 5,623,418 | A | | 4/1997 | Rostoker et al. | 716/1 |
| 5,642,511 | A | | 6/1997 | Chow et al. | 395/701 |
| 5,649,139 | A | | 7/1997 | Weinreb et al. | 707/202 |
| 5,671,386 | A | | 9/1997 | Blair et al. | 395/405 |
| 5,675,748 | A | | 10/1997 | Ross | 395/284 |
| 5,677,997 | A | | 10/1997 | Talatik | 706/45 |
| 5,680,602 | A | | 10/1997 | Bloem et al. | 707/1 |
| 5,692,107 | A | | 11/1997 | Simoudis et al. | 706/12 |
| 5,706,506 | A | | 1/1998 | Jensen et al. | 707/103 |
| 5,708,828 | A | | 1/1998 | Coleman | 395/785 |
| 5,710,901 | A | | 1/1998 | Stodghill et al. | 345/339 |
| 5,715,397 | A | | 2/1998 | Ogawa et al. | 395/200.18 |
| 5,721,908 | A | | 2/1998 | Lagarde et al. | 395/610 |
| 5,724,575 | A | | 3/1998 | Hoover et al. | 707/10 |
| 5,732,263 | A | | 3/1998 | Havens et al. | 707/103 |
| 5,732,270 | A | | 3/1998 | Foody et al. | 709/303 |
| 5,737,607 | A | | 4/1998 | Hamilton et al. | 395/701 |
| 5,751,965 | A | | 5/1998 | Mayo et al. | 709/224 |
| 5,758,351 | A | | 5/1998 | Gibson | 707/104 |
| 5,761,513 | A | | 6/1998 | Yellin et al. | 395/705 |
| 5,764,235 | A | | 6/1998 | Hunt et al. | 345/428 |
| 5,764,955 | A | | 6/1998 | Doolan | 709/223 |
| 5,774,660 | A | * | 6/1998 | Brendel et al. | 709/201 |
| 5,778,368 | A | | 7/1998 | Hogan et al. | 707/10 |
| 5,787,413 | A | | 7/1998 | Kauffman et al. | 707/2 |
| 5,799,310 | A | | 8/1998 | Anderson et al. | 707/102 |
| 5,867,153 | A | | 2/1999 | Grandcolas et al. | 345/326 |
| 5,870,742 | A | | 2/1999 | Chang et al. | 707/8 |
| 5,870,746 | A | | 2/1999 | Knutson et al. | 707/101 |
| 5,872,973 | A | | 2/1999 | Mitchell et al. | 709/332 |
| 5,873,086 | A | | 2/1999 | Fujii et al. | 707/10 |
| 5,878,408 | A | | 3/1999 | Van Huben et al. | 707/1 |
| 5,881,238 | A | | 3/1999 | Aman et al. | |
| 5,890,133 | A | | 3/1999 | Ernst | 705/7 |
| 5,892,909 | A | | 4/1999 | Grasso et al. | 709/201 |
| 5,892,946 | A | | 4/1999 | Woster et al. | |
| 5,896,383 | A | | 4/1999 | Wakeland | 370/400 |
| 5,898,870 | A | * | 4/1999 | Okuda et al. | 709/104 |
| 5,903,757 | A | * | 5/1999 | Gretz et al. | 717/4 |
| 5,905,873 | A | | 5/1999 | Hartmann et al. | 395/200.79 |
| 5,905,897 | A | | 5/1999 | Chou et al. | 395/733 |
| 5,907,704 | A | | 5/1999 | Gudmundson et al. | 395/701 |
| 5,909,540 | A | | 6/1999 | Carter et al. | 714/4 |
| 5,915,115 | A | | 6/1999 | Talati | 717/5 |
| 5,920,703 | A | | 7/1999 | Campbell et al. | 395/200.66 |
| 5,933,816 | A | | 8/1999 | Zeannah et al. | 705/35 |
| 5,940,075 | A | | 8/1999 | Mutschler, III et al. | 345/335 |
| 5,940,594 | A | | 8/1999 | Ali et al. | 709/203 |
| 5,946,694 | A | | 8/1999 | Copeland et al. | 707/103 |
| 5,946,697 | A | | 8/1999 | Shen | 707/104 |
| 5,953,707 | A | | 9/1999 | Huang et al. | 705/10 |
| 5,958,012 | A | | 9/1999 | Battat et al. | 709/224 |
| 5,960,200 | A | | 9/1999 | Eager et al. | 717/5 |
| 5,966,451 | A | | 10/1999 | Utsumi | 380/49 |
| 5,987,247 | A | | 11/1999 | Lau | 717/2 |
| 5,987,501 | A | | 11/1999 | Hamilton et al. | 709/203 |
| 5,987,514 | A | | 11/1999 | Rangarajan | 709/224 |
| 5,987,633 | A | | 11/1999 | Newman et al. | 714/712 |
| 5,995,753 | A | | 11/1999 | Walker | 717/2 |
| 5,995,945 | A | | 11/1999 | Notani et al. | 705/28 |
| 5,999,948 | A | | 12/1999 | Nelson et al. | |
| 6,006,230 | A | | 12/1999 | Ludwig et al. | 707/10 |
| 6,016,394 | A | | 1/2000 | Walker | 717/1 |
| 6,018,743 | A | | 1/2000 | Xu | 707/103 R |
| 6,023,722 | A | * | 2/2000 | Colyer | 709/201 |
| 6,029,174 | A | | 2/2000 | Sprenger et al. | 707/103 |
| 6,029,177 | A | | 2/2000 | Sadiq et al. | 707/201 |
| 6,032,153 | A | | 2/2000 | Sadiq et al. | 707/103 |
| 6,035,303 | A | | 3/2000 | Baer et al. | 707/103 |
| 6,038,598 | A | | 3/2000 | Danneels | 709/219 |
| 6,041,365 | A | | 3/2000 | Kleinerman | 709/302 |
| 6,052,739 | A | | 4/2000 | Bopardikar et al. | 709/301 |
| 6,057,856 | A | | 5/2000 | Miyashita et al. | 345/435 |
| 6,070,191 | A | * | 5/2000 | Narendran et al. | 709/226 |
| 6,078,960 | A | * | 6/2000 | Ballard | 709/229 |
| 6,081,837 | A | | 6/2000 | Stedman et al. | 709/219 |
| 6,083,276 | A | | 7/2000 | Davidson et al. | 717/1 |
| 6,085,198 | A | | 7/2000 | Skinner et al. | 707/103 |
| 6,092,118 | A | | 7/2000 | Tsang | 709/246 |
| 6,108,703 | A | * | 8/2000 | Leighton et al. | 709/226 |
| 6,115,752 | A | * | 9/2000 | Chauhan | 709/241 |
| 6,125,359 | A | | 9/2000 | Lautzenheiser et al. | 706/60 |
| 6,128,279 | A | * | 10/2000 | O'Neil et al. | 370/229 |
| 6,141,660 | A | | 10/2000 | Bach et al. | 345/352 |
| 6,141,759 | A | * | 10/2000 | Braddy | 713/201 |
| 6,144,991 | A | | 11/2000 | England | 709/205 |
| 6,148,335 | A | * | 11/2000 | Haggard et al. | 709/224 |
| 6,148,361 | A | | 11/2000 | Carpenter et al. | 710/260 |
| 6,154,212 | A | | 11/2000 | Eick et al. | 345/356 |
| 6,157,940 | A | | 12/2000 | Marullo et al. | 709/22 |
| 6,182,182 | B1 | | 1/2001 | Bradley et al. | 710/129 |
| 6,185,601 | B1 | * | 2/2001 | Wolf | 709/203 |
| 6,202,099 | B1 | | 3/2001 | Gillies et al. | 709/317 |
| 6,223,209 | B1 | | 4/2001 | Watson | 709/201 |
| 6,243,761 | B1 | | 6/2001 | Mogul et al. | 709/246 |
| 6,317,786 | B1 | * | 11/2001 | Yamane et al. | 709/224 Viewed |

OTHER PUBLICATIONS

IBM Technical Disclosure Bulletin, vol. 39 No. 5, May 1996, p. 59.

Diwan et al., "Adaptive Utilization of Communication and Computational Resources in High–Performance Distributed Systems: The EMOP Approach", Jul. 28, 1998, pp. 2–9.

Kovalerchuck et al., 'comparison of relational methods and attribute–based methods for data mining in intelligent systems, proceedings of the 1999 IEEE, International Symposium on Intelligent Systems and Semiotics, Cambridge, MA, PP 162–166. Date Sep. 1999.

Kinexis. Object–orientation and Transaction Processing Where Do They Meet. OOPSLA Keynote, Oct. 6–11, 1991.

Lee et al. Path Dictionary: A New Access Method for Query Processing in Object–oriented Databases. IEEE Transactions on Knowledge and Data Engineering, v10, n3, May/Jun. 1998.

Buddrus et al. Enacting Authorization Models for Object–oriented Databases. Database and Expert Systems applications, Proceedings, Seventh International Workshop, Sep. 9–10, 1996, pp. 116–121.

Bertino et al. Trigger Inheritance and Overriding in an Active Object Database System. IEEE Transactions on Knowledge and Data Engineering, v12, n4. Jul./Aug., 2000.

ANSII Standard for the Programming Language C++, First Edition ISO/IEC 14882: 1998. Date Sep. 1998.

The Annotated C++Reference Manual ANSII Base Document, M.A. Ellis and B. Stroustrup. Date Jul. 1990.

IBM Dictionary of Computing, pp. 140, 241, 299, 728.

Microsoft Corporation, Microsoft Solutions Framework Overview A Quick Tour of the MSF Models, URL: http://channels.microsoft.com/enterprise/support/support/consult, Viewed Oct. 9, 1999.

* cited by examiner

5500

```
┌─────────────────────────────────────────────────────────────┐
│   PROVIDING AN ABSTRACT CLASS OF ABSTRACT DATA REQUIRED     │
│              BY A PLURALITY OF BATCH JOBS                   │
│                                                    5502     │
└─────────────────────────────────────────────────────────────┘
                              │
                              ▼
┌─────────────────────────────────────────────────────────────┐
│   DEFINING A PLURALITY OF BATCH JOB SUB-CLASSES EACH        │
│   INCLUDING BATCH SPECIFIC DATA, AND LOGIC FOR PROCESSING   │
│   THE ABSTRACT DATA AND THE BATCH SPECIFIC DATA UPON THE    │
│                    EXECUTION THEREOF                        │
│                                                    5504     │
└─────────────────────────────────────────────────────────────┘
                              │
                              ▼
┌─────────────────────────────────────────────────────────────┐
│      REPRESENTING EACH OF THE BATCH JOB SUB-CLASSES WITH    │
│                         AN OBJECT                           │
│                                                    5506     │
└─────────────────────────────────────────────────────────────┘
                              │
                              ▼
┌─────────────────────────────────────────────────────────────┐
│                 IDENTIFYING ONE OF THE OBJECTS              │
│                                                             │
│                                                    5508     │
└─────────────────────────────────────────────────────────────┘
                              │
                              ▼
┌─────────────────────────────────────────────────────────────┐
│   EXECUTING THE LOGIC OF THE BATCH JOB SUB-CLASSES          │
│        ASSOCIATED WITH THE IDENTIFIED OBJECT                │
│                                                    5510     │
└─────────────────────────────────────────────────────────────┘
```

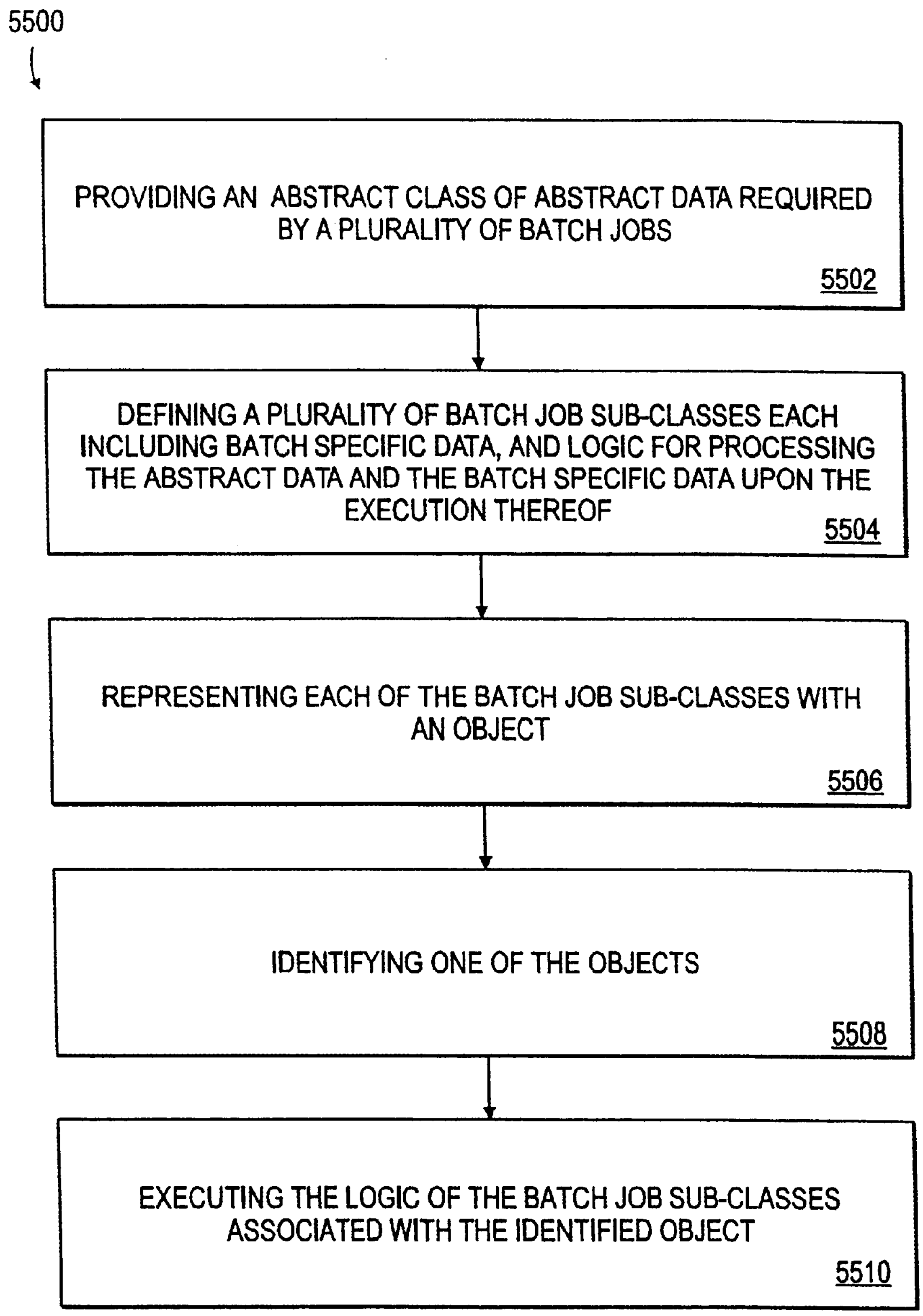

SENDING MESSAGES INCLUDING DATA BETWEEN A SENDING SYSTEM AND A RECEIVING SYSTEM

10502

ATTACHING META-DATA TO THE MESSAGES BEING SENT BETWEEN THE SENDING SYSTEM AND THE RECEIVING SYSTEM

10504

TRANSLATING THE DATA OF THE MESSAGES SENT FROM THE SENDING SYSTEM TO THE RECEIVING SYSTEM BASED ON THE META-DATA, WHEREIN THE META-DATA INCLUDES A FIRST SECTION IDENTIFYING A TYPE OF OBJECT ASSOCIATED WITH THE DATA AND A NUMBER OF ATTRIBUTE DESCRIPTORS IN THE DATA AND A SECOND SECTION INCLUDING A SERIES OF THE ATTRIBUTE DESCRIPTORS DEFINING ELEMENTS OF THE DATA

10506

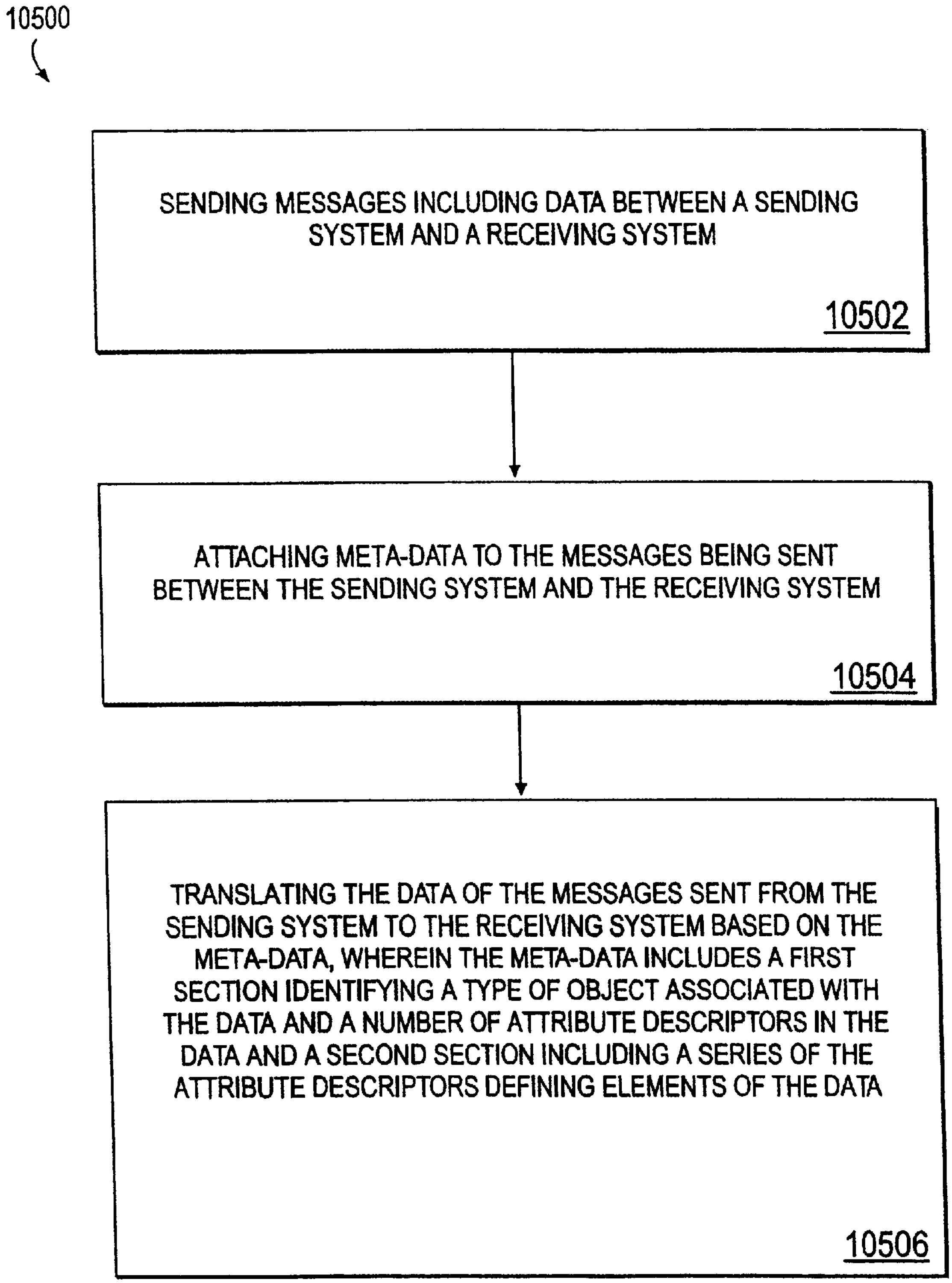

```
```

PROVIDING A PLURALITY OF USER INTERFACE WIDGETS
12802

↓

PROVIDING A PLURALITY OF VALIDATION RULES WHICH GOVERN USE OF THE USER INTERFACE WIDGETS
12804

↓

ALLOWING A USER TO SELECT THE VALIDATION RULES TO ASSOCIATE WITH THE USER INTERFACE WIDGETS OF A FIRST USER INTERFACE
12806

↓

AUTOMATICALLY ASSOCIATING THE VALIDATION RULES OF THE USER INTERFACE WIDGETS OF THE FIRST USER INTERFACE ACROSS A PLURALITY OF SEPARATE DIFFERENT USER INTERFACES
12808

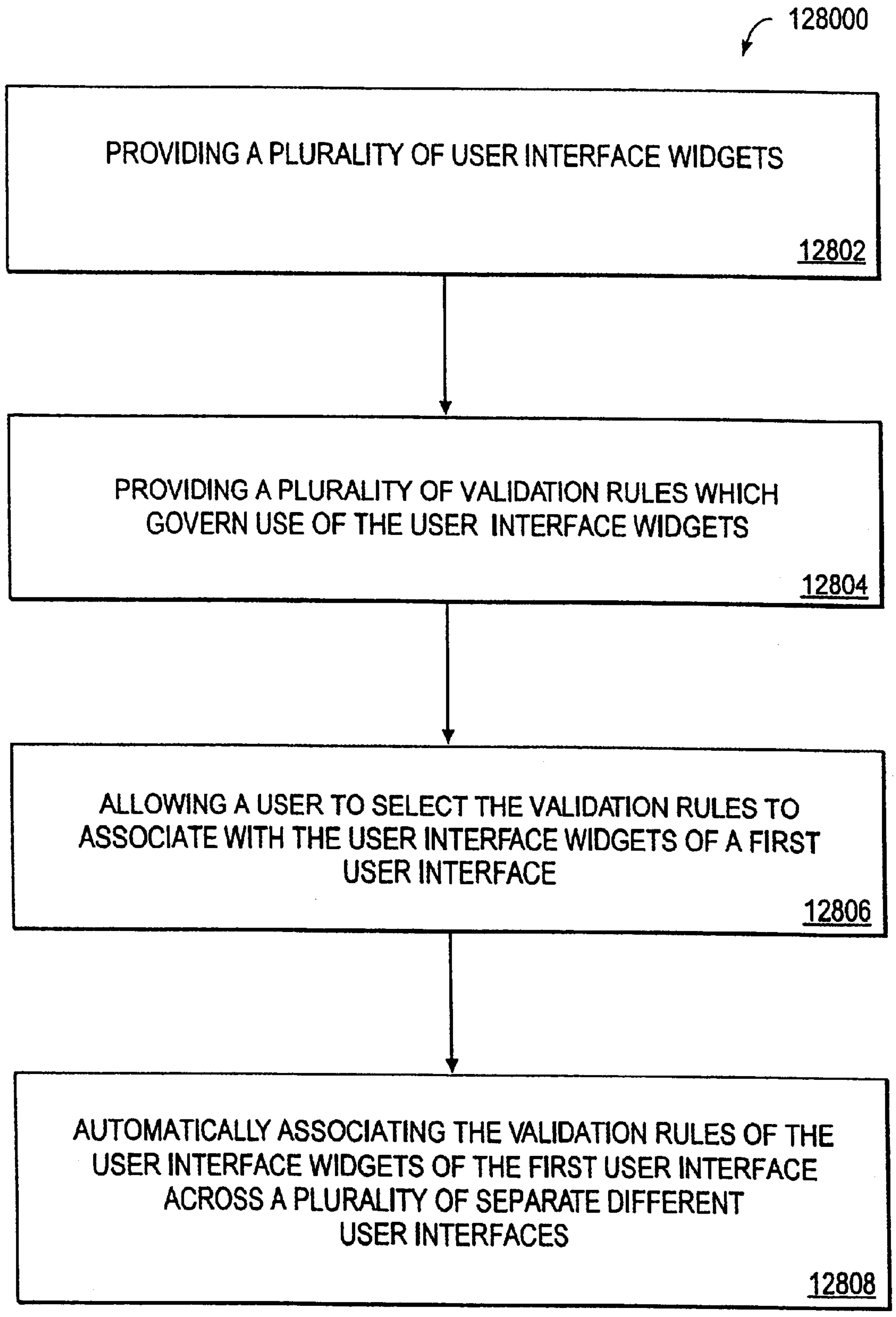

```
┌─────────────────────────────────────────────┐
│   PROVIDING AN EXCEPTION RESPONSE TABLE     │
│                                    14502    │
└─────────────────────────────────────────────┘
                      │
                      ▼
┌─────────────────────────────────────────────┐
│  RECORDING AN EXCEPTION IN THE EXCEPTION    │
│              RESPONSE TABLE                 │
│                                    14504    │
└─────────────────────────────────────────────┘
                      │
                      ▼
┌─────────────────────────────────────────────┐
│  ENTERING THE CONTEXT OF THE EXCEPTION IN   │
│       THE EXCEPTION RESPONSE TABLE          │
│                                    14506    │
└─────────────────────────────────────────────┘
                      │
                      ▼
┌─────────────────────────────────────────────┐
│ LISTING A RESPONSE FOR THE EXCEPTION IN THE │
│          EXCEPTION RESPONSE TABLE           │
│                                    14508    │
└─────────────────────────────────────────────┘
                      │
                      ▼
┌─────────────────────────────────────────────┐
│ OUTPUTTING THE RESPONSE UPON THE EXCEPTION  │
│         OCCURRING IN THE CONTEXT            │
│                                    14510    │
└─────────────────────────────────────────────┘
```

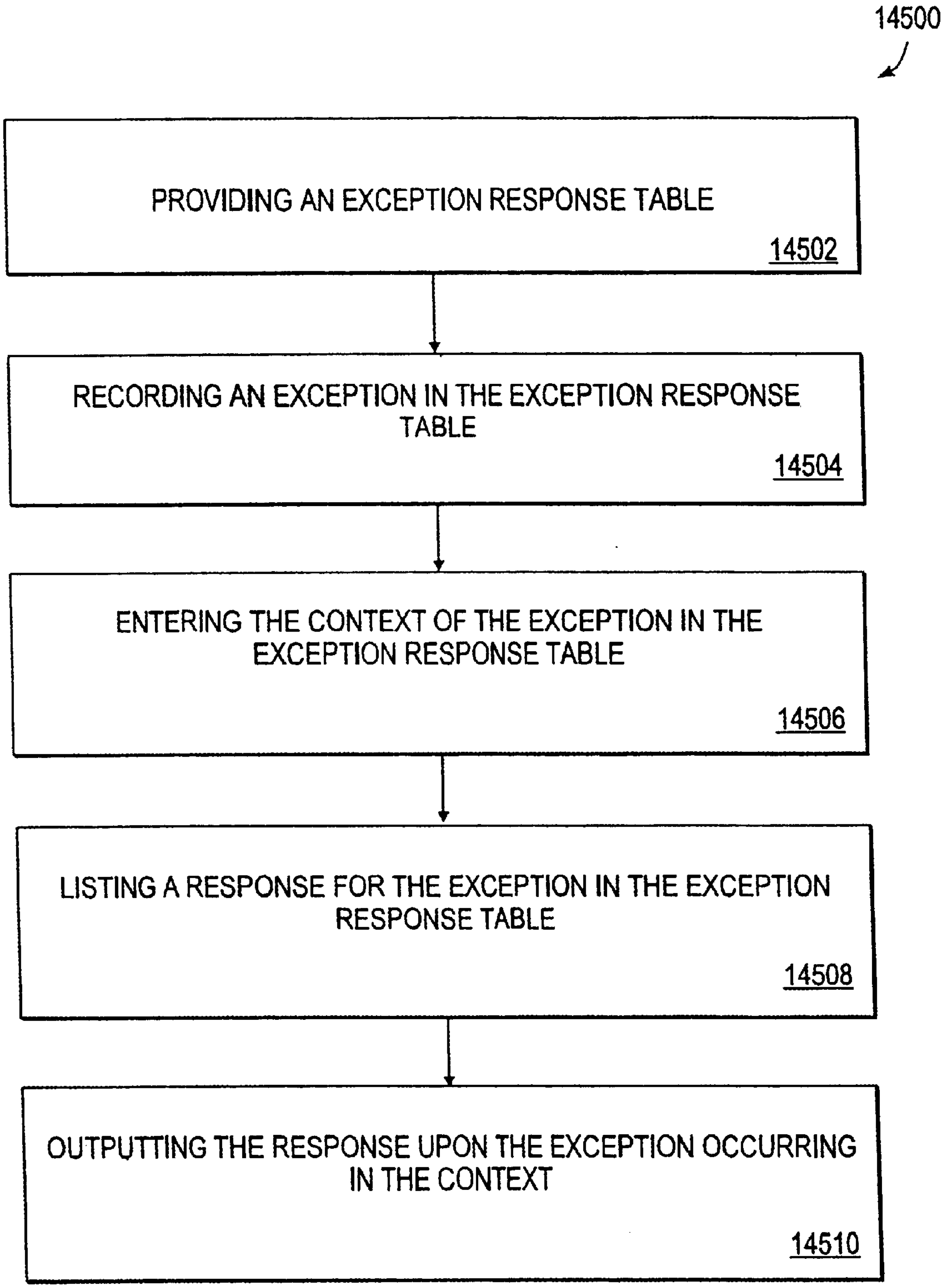

```
┌─────────────────────────────────────────────────────────┐
│  PROVIDING A GROUP OF BUSINESS OBJECTS NECESSARY FOR    │
│                      A TRANSACTION                       │
│                                                   18202 │
└─────────────────────────────────────────────────────────┘
                            │
                            ▼
┌─────────────────────────────────────────────────────────┐
│  MANAGING THE GROUP OF BUSINESS OBJECTS NECESSARY TO    │
│   THE TRANSACTION IN A LOGICAL UNIT OF WORK             │
│                                                   18204 │
└─────────────────────────────────────────────────────────┘
                            │
                            ▼
┌─────────────────────────────────────────────────────────┐
│   CREATING A RECEIVER WHICH COMMUNICATES WITH THE       │
│   BUSINESS OBJECTS IN THE LOGICAL UNIT OF WORK          │
│                                                   18206 │
└─────────────────────────────────────────────────────────┘
                            │
                            ▼
┌─────────────────────────────────────────────────────────┐
│   RECEIVING A MESSAGE FOR THE BUSINESS OBJECTS IN THE   │
│               LOGICAL UNIT OF WORK                      │
│                                                   18208 │
└─────────────────────────────────────────────────────────┘
                            │
                            ▼
┌─────────────────────────────────────────────────────────┐
│  DIRECTING THE MESSAGE TO THE RECEIVER, WHEREIN THE     │
│  RECEIVER FORWARDS THE MESSAGE TO EACH OF THE           │
│  BUSINESS OBJECTS IN THE LOGICAL UNIT OF WORK           │
│                                                   18210 │
└─────────────────────────────────────────────────────────┘
```

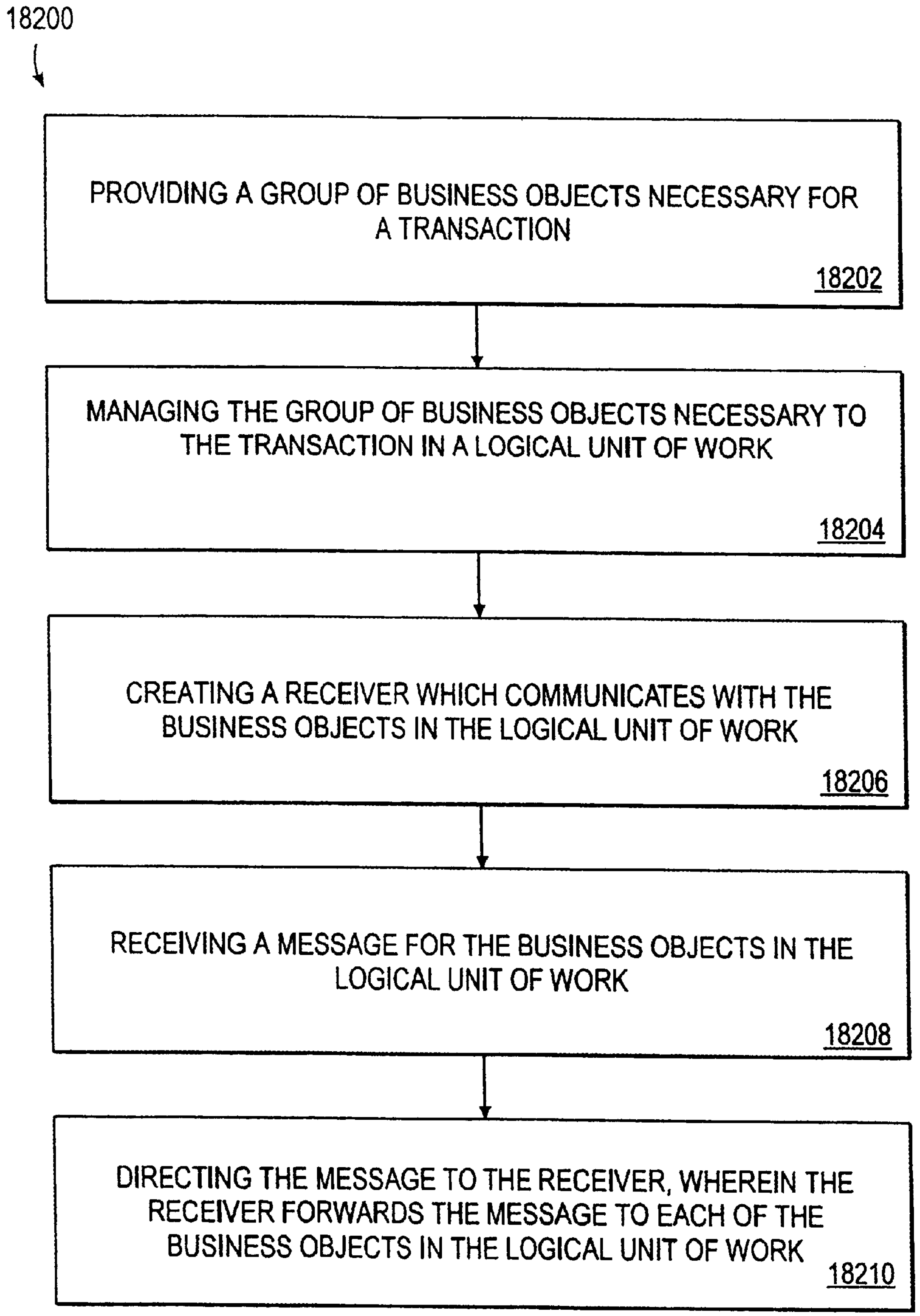

PROVIDING A GROUP OF BUSINESS OBJECTS NECESSARY FOR A TRANSACTION
18502

MANAGING THE GROUP OF BUSINESS OBJECTS NECESSARY TO THE TRANSACTION IN A LOGICAL UNIT OF WORK
18504

GROUPING LOGICALLY-RELATED REQUESTS RECEIVED FROM THE LOGICAL UNIT OF WORK INTO A SINGLE NETWORK MESSAGE
18506

STORING THE MESSAGE
18508

SENDING THE MESSAGE UPON RECEIVING AN ORDER TO SEND THE MESSAGE
18510

19100

```
┌─────────────────────────────────────────────────────────────┐
│ PROVIDING MULTIPLE LOGICAL UNITS OF WORK OPERATING          │
│ CONCURRENTLY, WHEREIN EACH OF THE LOGICAL UNITS OF          │
│ WORK MANIPULATE AT LEAST ONE COMMON BUSINESS OBJECT         │
│                                                      19102  │
└─────────────────────────────────────────────────────────────┘
                              │
                              ▼
┌─────────────────────────────────────────────────────────────┐
│ CREATING A COPY OF THE COMMON BUSINESS OBJECT FOR           │
│ EACH OF THE LOGICAL UNITS OF WORK SUCH THAT THE COPY        │
│ OF THE BUSINESS OBJECT FOR ONE LOGICAL UNIT OF WORK         │
│ BECOMES A SEPARATE INSTANCE FROM THE COPY OF THE            │
│ BUSINESS OBJECT FOR ANOTHER LOGICAL UNIT OF WORK,           │
│ WHEREIN EACH COPY OF THE BUSINESS OBJECT KNOWS THE          │
│ CONTEXT OF THAT COPY OF THE BUSINESS OBJECT IN RELATION     │
│ TO THE ASSOCIATED LOGICAL UNIT OF WORK        19104         │
└─────────────────────────────────────────────────────────────┘
                              │
                              ▼
┌─────────────────────────────────────────────────────────────┐
│ RECEIVING A REQUEST TO MAKE CHANGES TO A COPY OF THE        │
│ BUSINESS OBJECT OF ONE OF THE LOGICAL UNITS OF WORK         │
│ AND CHANGING THAT COPY OF THE BUSINESS OBJECT,              │
│ WHEREIN THE OTHER COPIES OF TH BUSINESS OBJECT              │
│ ARE NOT CHANGED                                             │
│                                                      19106  │
└─────────────────────────────────────────────────────────────┘
                              │
                              ▼
┌─────────────────────────────────────────────────────────────┐
│ VERIFYING THAT ONLY ONE COPY OF THE BUSINESS OBJECT         │
│ HAS BEEN CHANGED                                            │
│                                                      19108  │
└─────────────────────────────────────────────────────────────┘
                              │
                              ▼
┌─────────────────────────────────────────────────────────────┐
│ UPDATING THE COMMON BUSINESS OBJECT BASED ON THE            │
│ CHANGE TO THE COPY OF THE BUSINESS OBJECT                   │
│                                                      19110  │
└─────────────────────────────────────────────────────────────┘
```

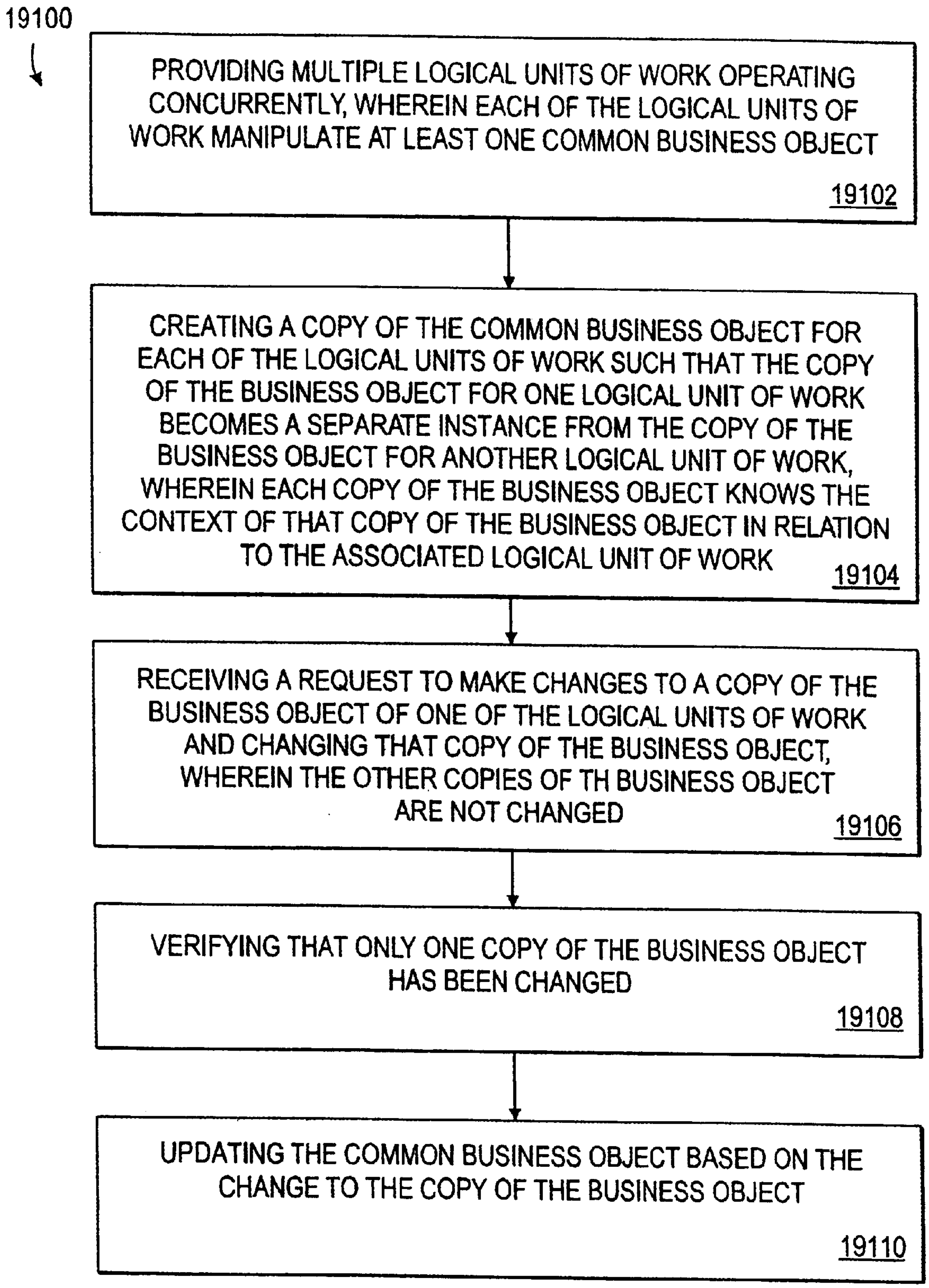

Fig. 191

LOAD BALANCER IN ENVIRONMENT SERVICES PATTERNS

CROSS REFERENCE TO RELATED APPLICATIONS

This application is related to United States Patent Applications entitled A SYSTEM, METHOD AND ARTICLE OF MANUFACTURE FOR A DEVELOPMENT ARCHITECTURE FRAMEWORK Ser. No. 09/387,747, now abandoned, and A SYSTEM, METHOD AND ARTICLE OF MANUFACTURE FOR MAINTENANCE AND ADMINISTRATION IN AN E-COMMERCE APPLICATION FRAMEWORK, Ser. No. 09/387,318, still pending both of which are filed concurrently herewith and which are incorporated by reference in their entirety.

FIELD OF THE INVENTION

The present invention relates to system optimization and more particularly to organized request distribution to server components.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low end personal computers to high-end super computers are coupled to the Internet.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mail.

In 1989, a new type of information system known as the World-Wide-Web ("the Web") was introduced to the Internet. Early development of the Web took place at CERN, the European Particle Physics Laboratory. The Web is a wide-area hypermedia information retrieval system aimed to give wide access to a large universe of documents. At that time, the Web was known to and used by the academic/research community only. There was no easily available tool which allows a technically untrained person to access the Web.

In 1993, researchers at the National Center for Supercomputing Applications (NCSA) released a Web browser called "Mosaic" that implemented a graphical user interface (GUI). Mosaic's graphical user interface was simple to learn yet powerful. The Mosaic browser allows a user to retrieve documents from the World-Wide-Web using simple point-and-click commands. Because the user does not have to be technically trained and the browser is pleasant to use, it has the potential of opening up the Internet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

The communication model under the conventional Web environment provides a very limited level of interaction between clients and servers. In many systems, increasing the level of interaction between components in the systems often makes the systems more robust, but increasing the interaction increases the complexity of the interaction and typically slows the rate of the interaction. Thus, the conventional Web environment provides less complex, faster interactions because of the Web's level of interaction between clients and servers.

SUMMARY OF THE INVENTION

A system and method are provided for distributing incoming requests from a user interface amongst a client and server components for optimizing usage of resources. Incoming requests are first received and stored by an activity module. The activity module instructs a client to handle a first subset of the requests and passes a second subset of the requests on to a utilization-based load balancer. The second subset of the requests are stored on the load balancer, and an availability of server components is determined and a listing of available server components is compiled. A determination is made as to which server component on the listing of available server components is most appropriate to receive a particular request. Each particular request of the second subset of requests is sent to the selected server component determined to be most appropriate to receive the particular request.

In one embodiment of the present invention, the determination of which server component is the most appropriate may be performed by allocating the requests on a round-robin basis whereby requests are assigned to consecutive server components by traversing along the listing of available server components. In another embodiment of the present invention, the determination of which server component is the most appropriate may also include calculating an amount of utilization that each available server component or the client is currently experiencing.

In one aspect of the present invention, the amount of utilization of each available server components may be calculated based on current CPU utilization, kernel scheduling run-queue length, current network traffic at a node to the server component, and/or a number of requests currently being serviced.

In another aspect of the present invention, a request may be rerouted to a different available server component upon a crash of the selected server component. In a further embodiment of the present invention, the server components may be saved in a persistent store, wherein a check is made to determine whether a connection to a server component needs to be reestablished.

BRIEF DESCRIPTION OF THE DRAWINGS

The invention will be better understood when consideration is given to the following detailed description thereof. Such description makes reference to the annexed drawings wherein:

FIG. 55 illustrates a flowchart for a method for representing a plurality of batch jobs of a system each with a unique class in accordance with an embodiment of the present invention;

FIG. 105 illustrates a flowchart for a method for providing a self-describing stream-based communication system in accordance with an embodiment of the present invention;

FIG. 119 illustrates the transmitting of all data in a Data Structure from a client to a server and visa-versa;

FIG. 120 illustrates the method in which a client finds and instantiates a Customer Object from a customer component;

FIG. 121 illustrates a Structure Based Communication that builds upon the method of FIG. 120 and depicts the flow of control during Structure Based Communication;

FIG. 122 shows Five Styles of Client/Server Computing;

FIG. 123 illustrates a flowchart for a method for providing an activity module in accordance with an embodiment of the present invention;

FIG. 124 illustrates multiple interfaces to an application including a handheld device, a desktop PC, and a telecommunications device;

FIG. 125 illustrates an activity entity relationship diagram;

FIG. 126 illustrates a roles and responsibilities diagram;

FIG. 127 illustrates a typical implementation between a user interface and its activity;

FIG. 128 illustrates a flowchart for a method for structuring validation rules to be applied to a user interface for maximum maintainability and extensibility in accordance with an embodiment of the present invention;

FIG. 129 illustrates widgets with their validation requirements;

FIG. 130 illustrates a user interface validator association diagram;

Figure 131:
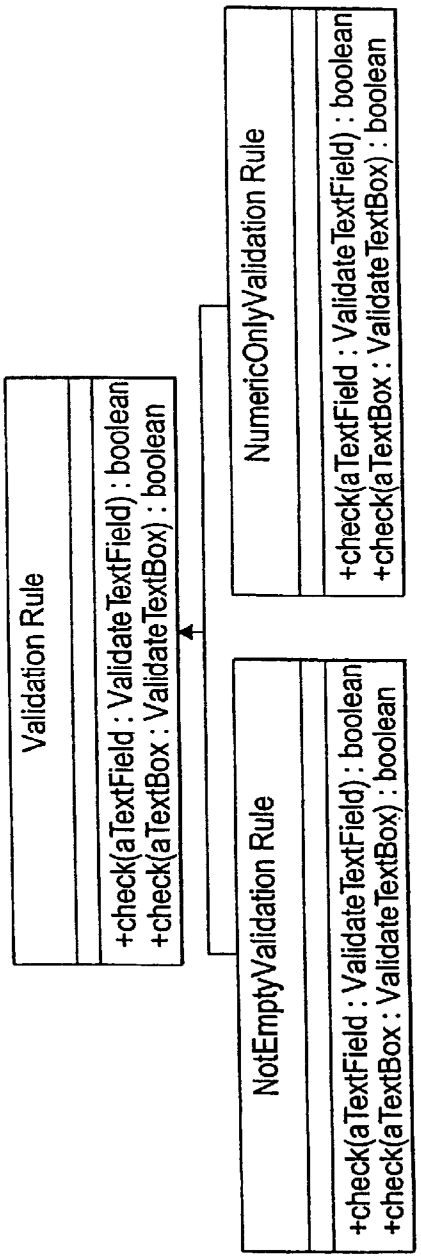
Figure 132:
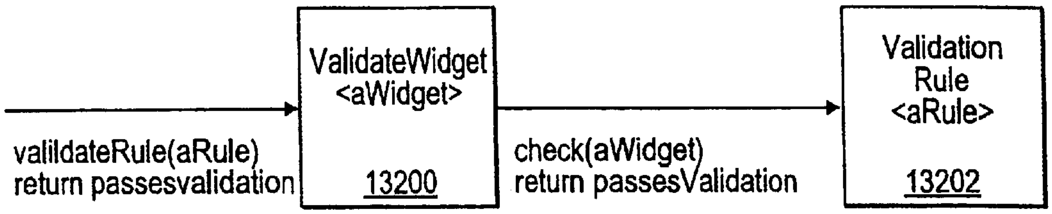
Figure 134:
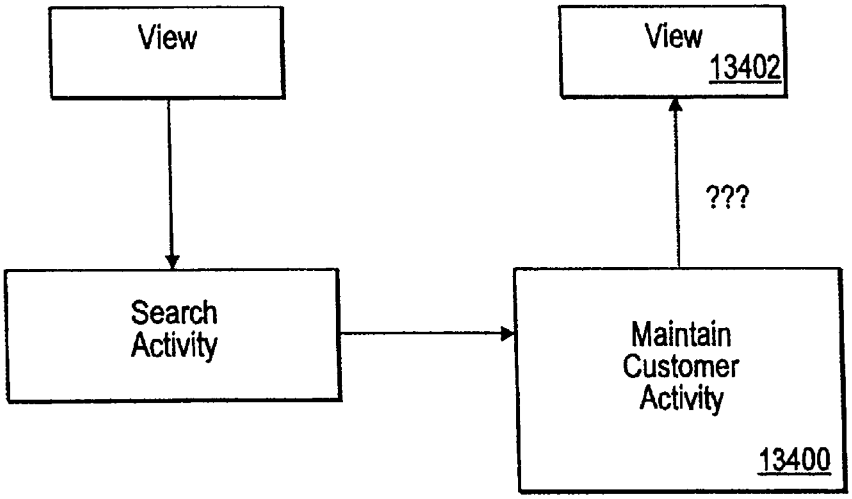
Figure 133:
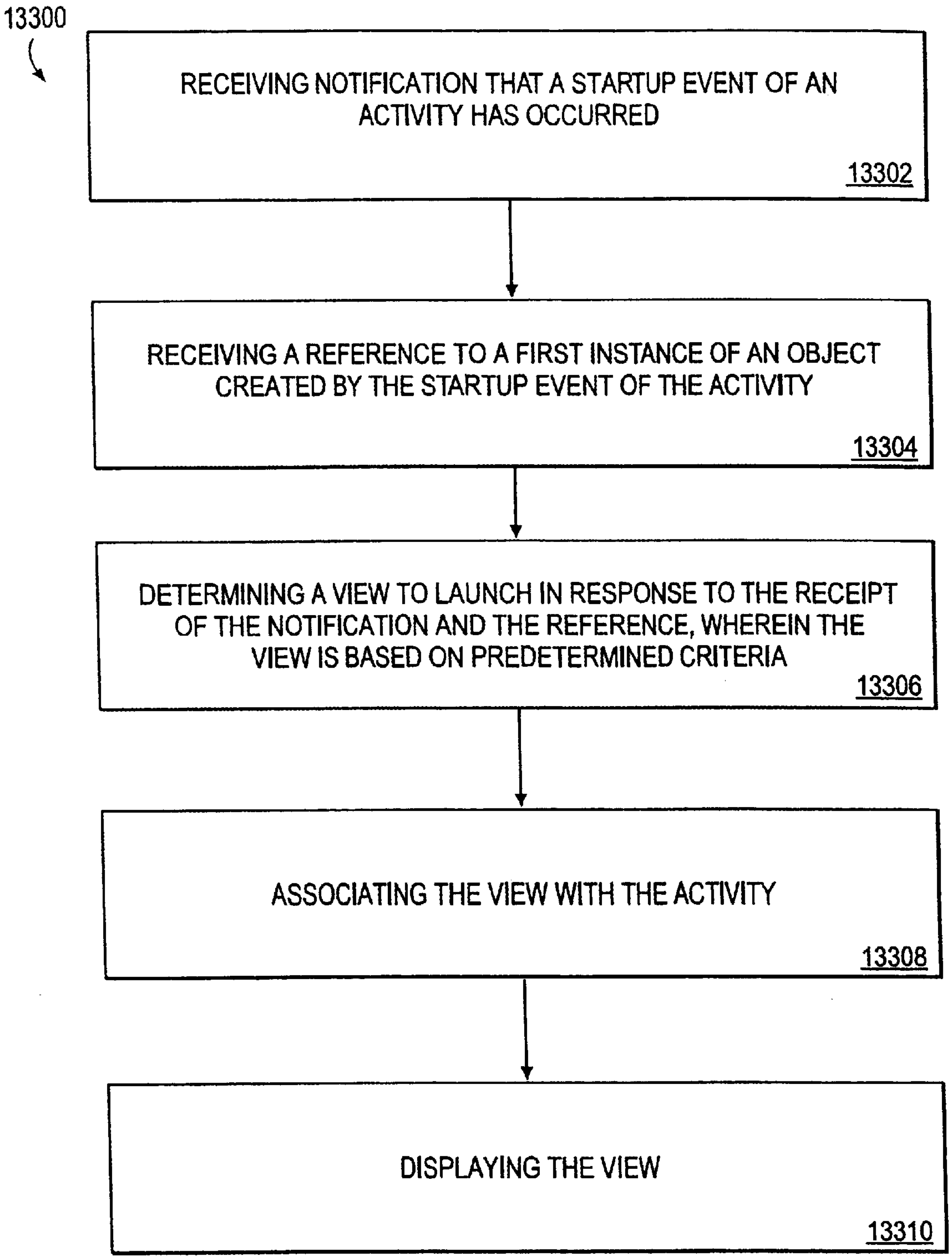
Figure 135:
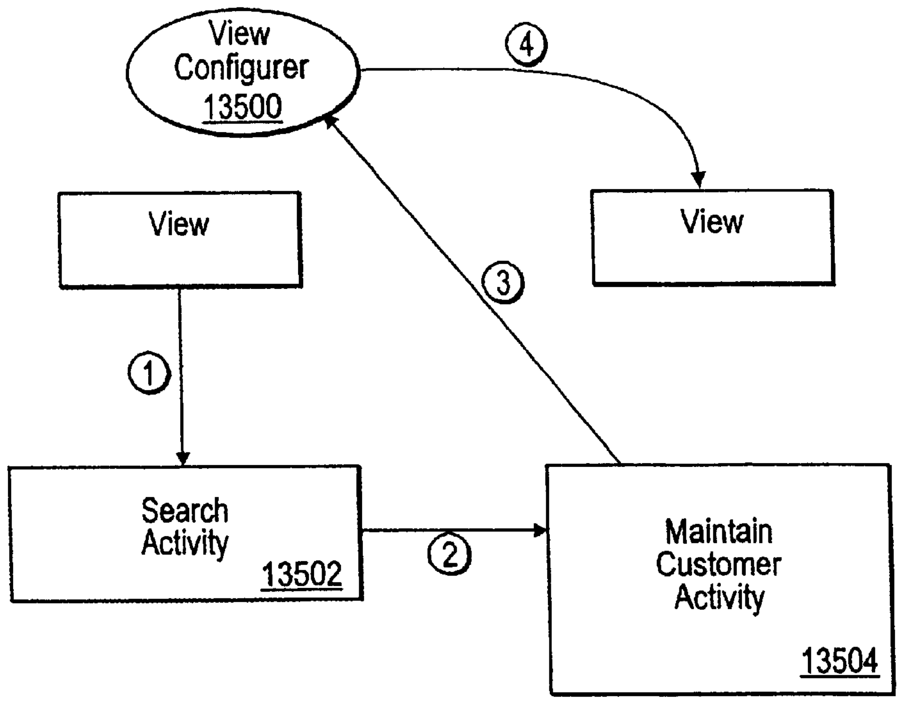
Figure 137:
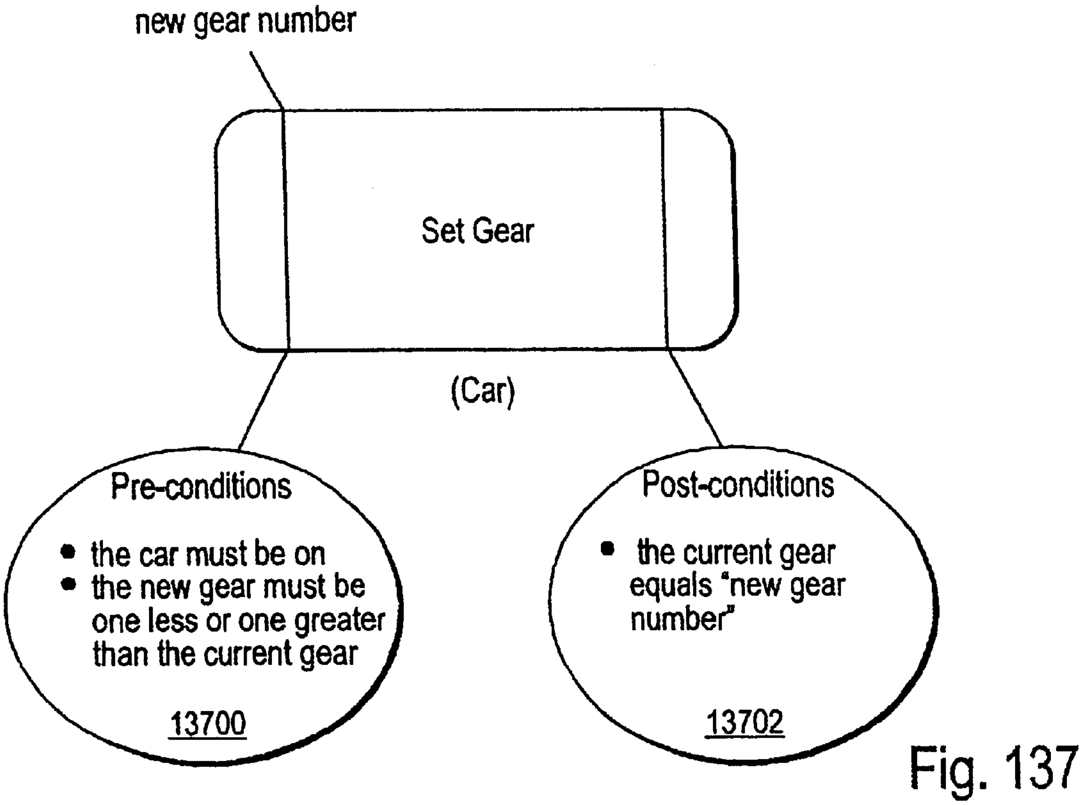
Figure 136:
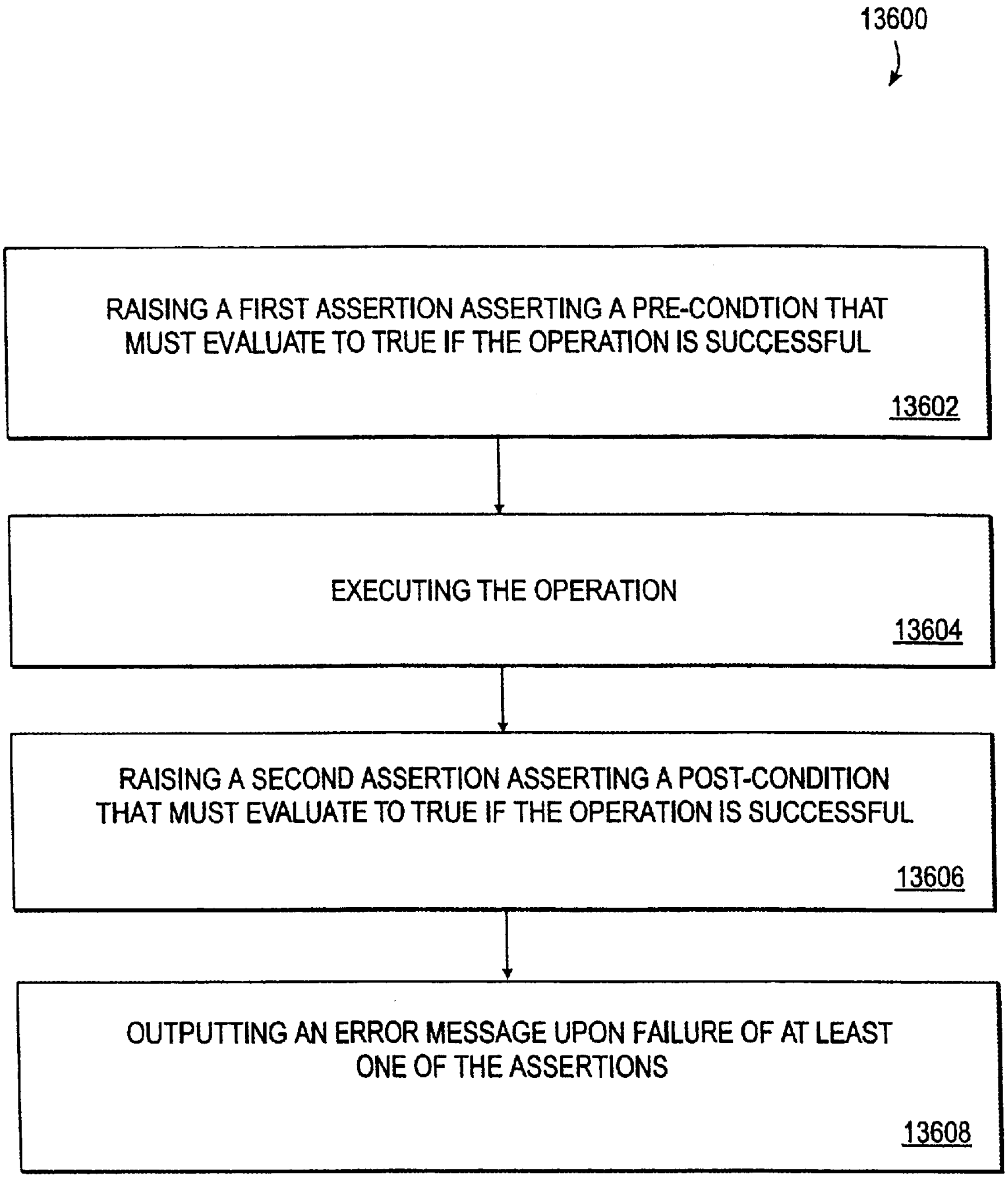
Figure 138:
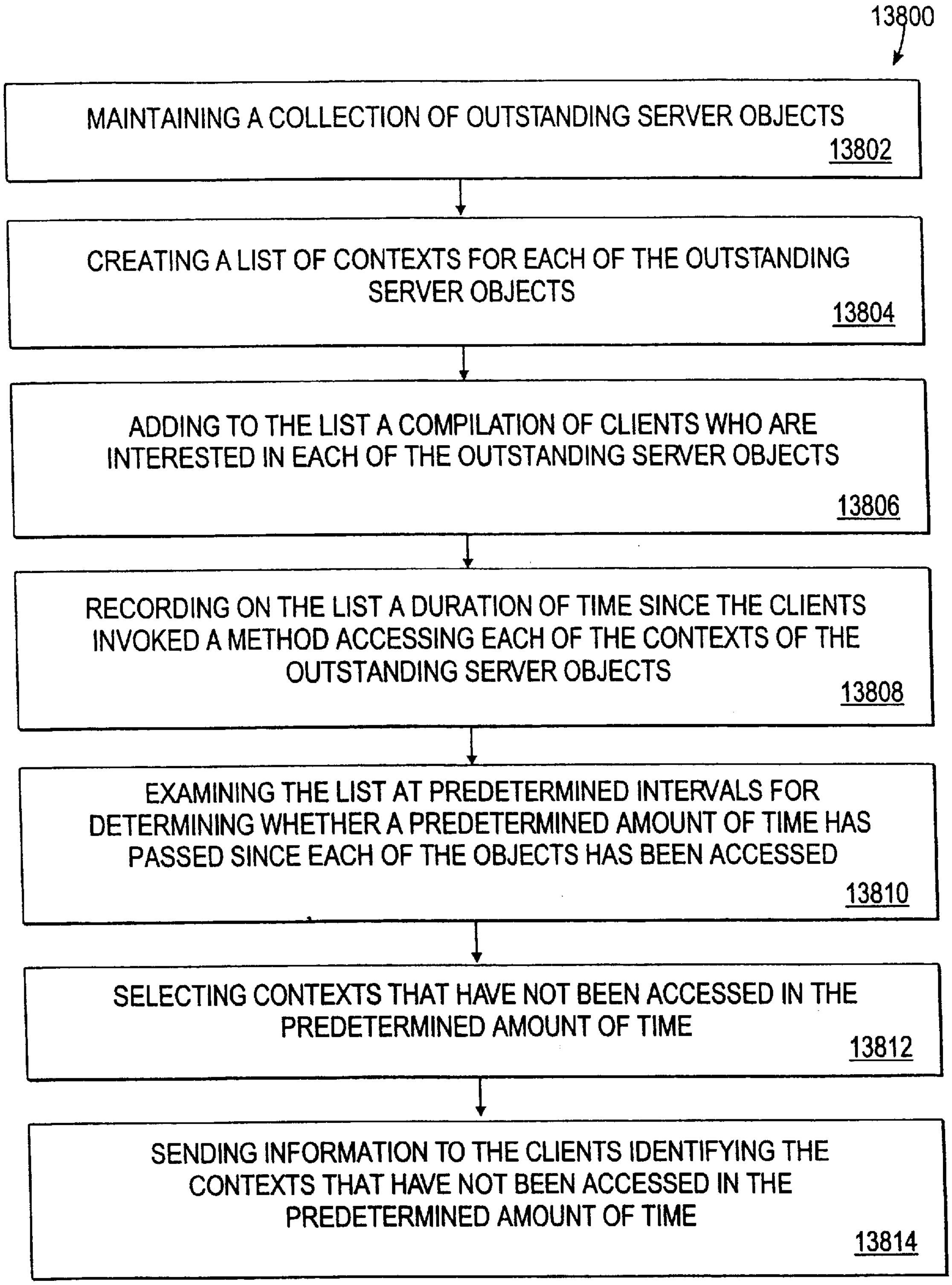
Figure 139:
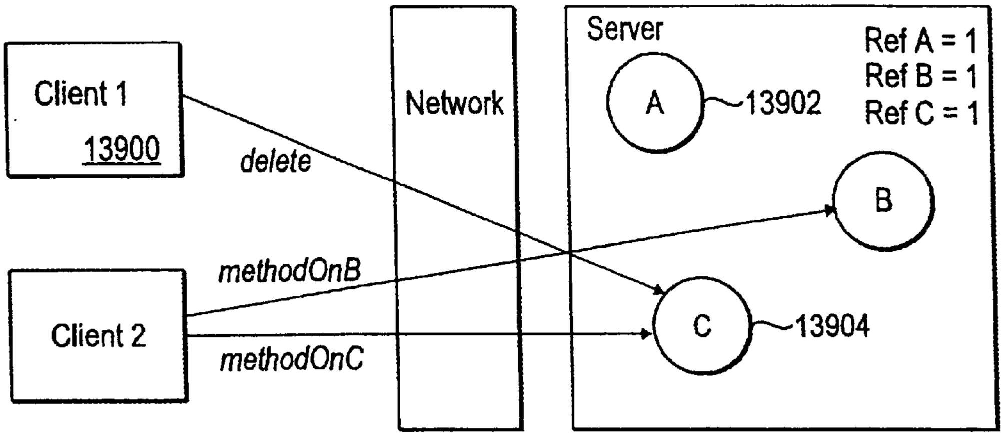
Figure 140:
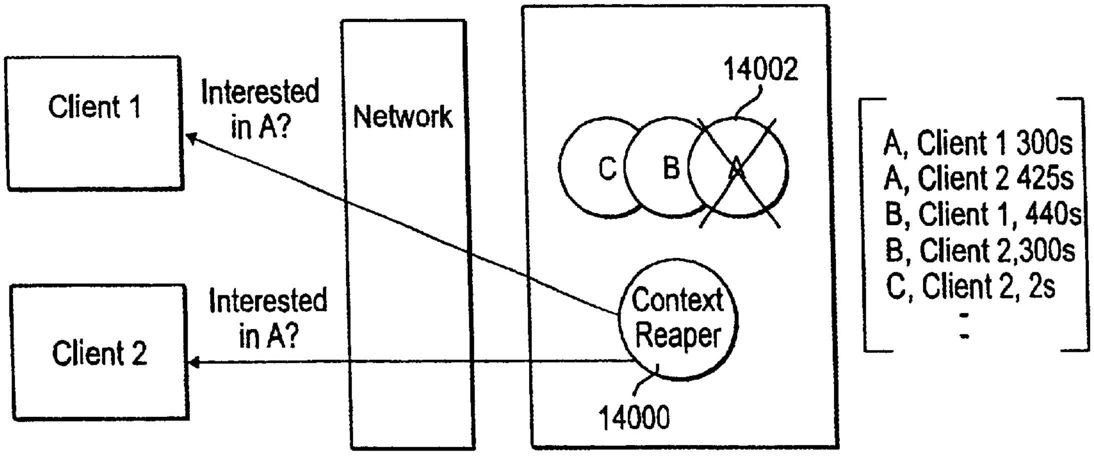
Figure 141:
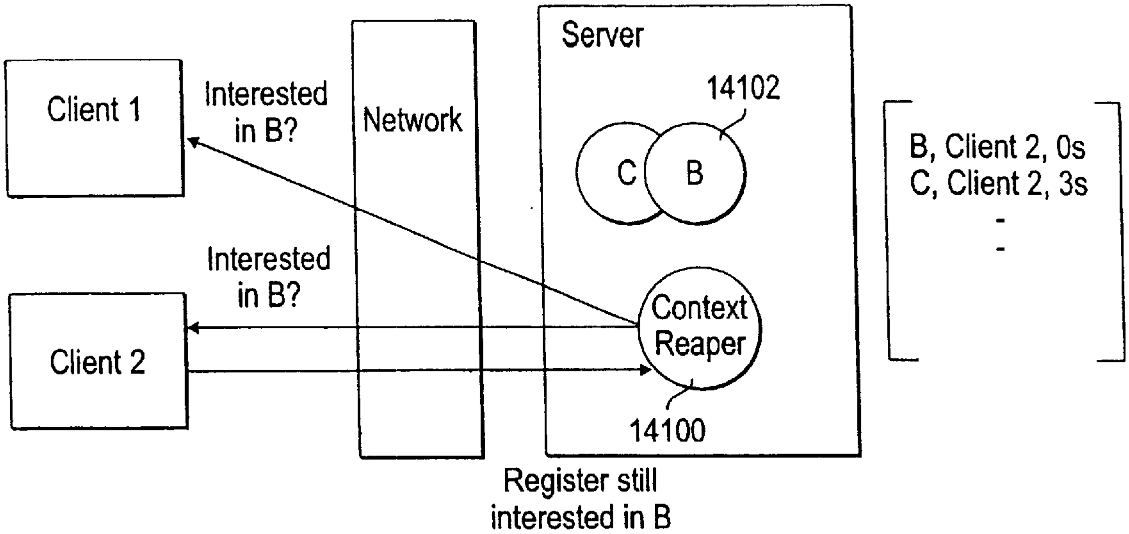
Figure 143:
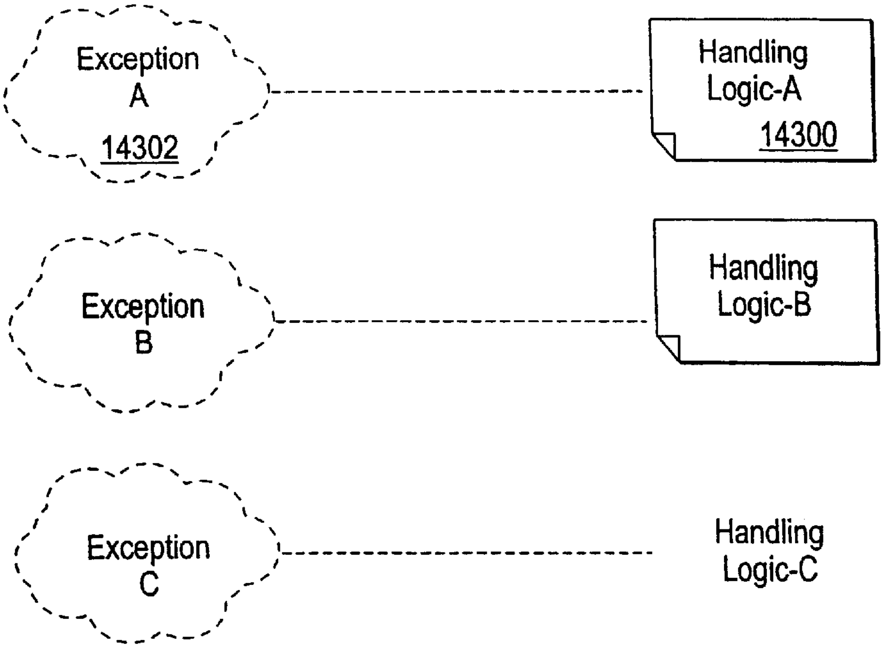
Figure 142:
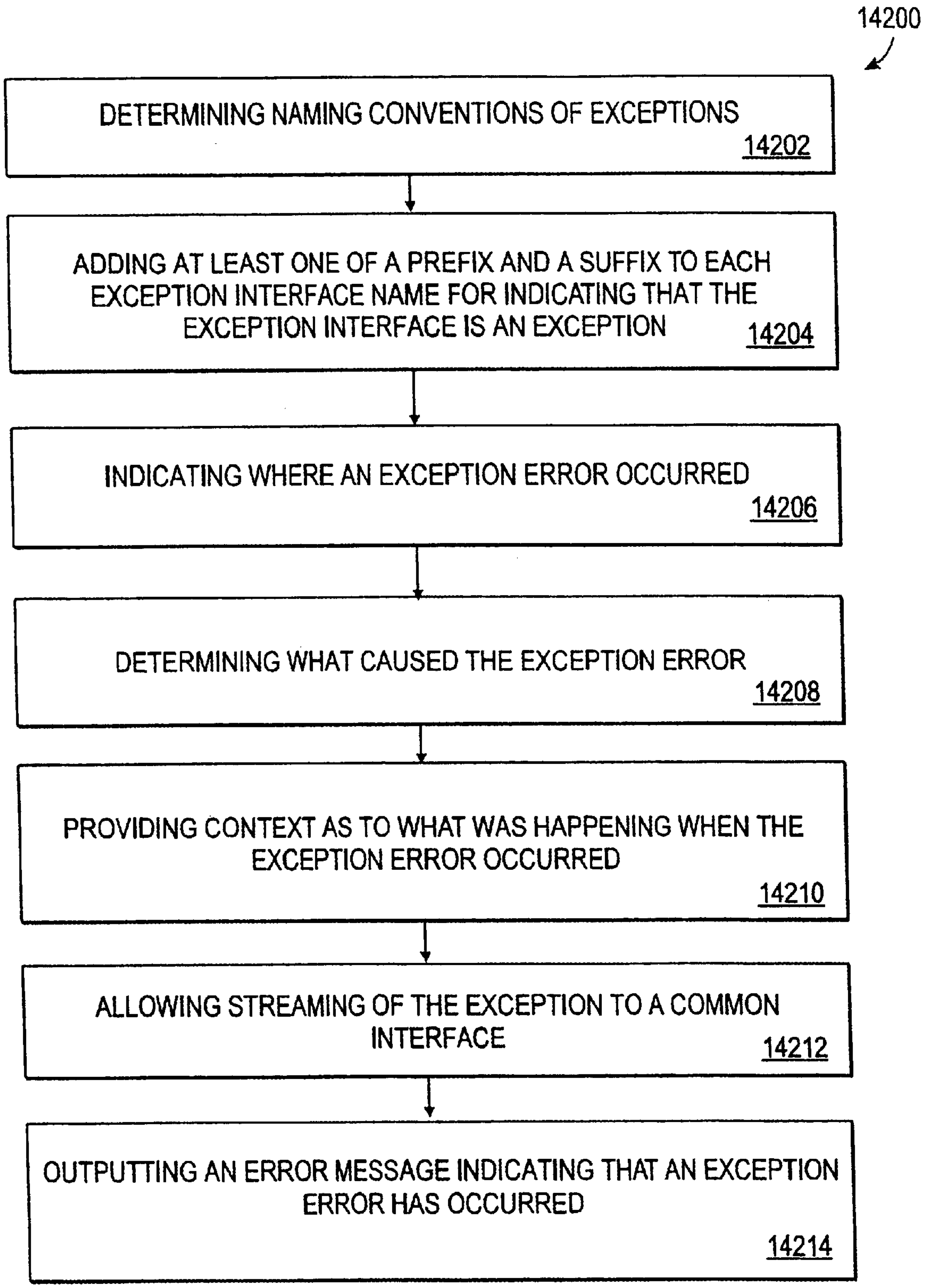
Figure 144:
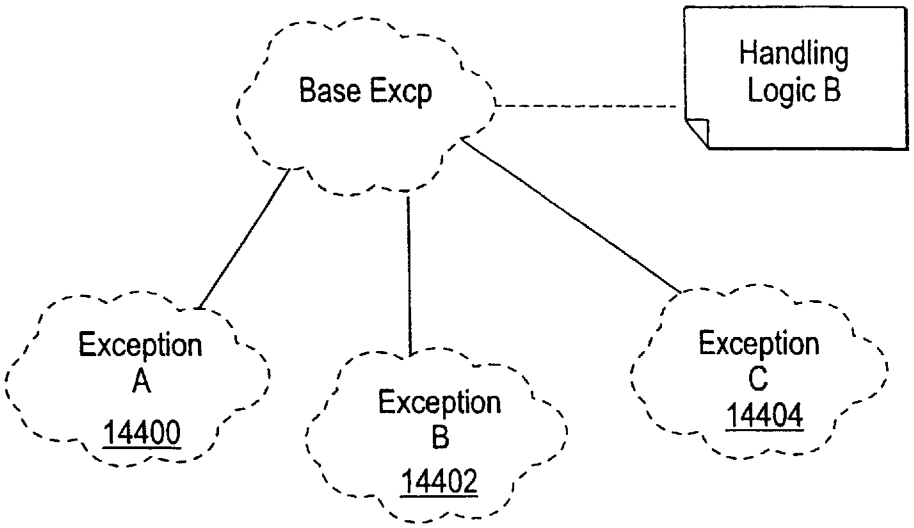
Figure 147:
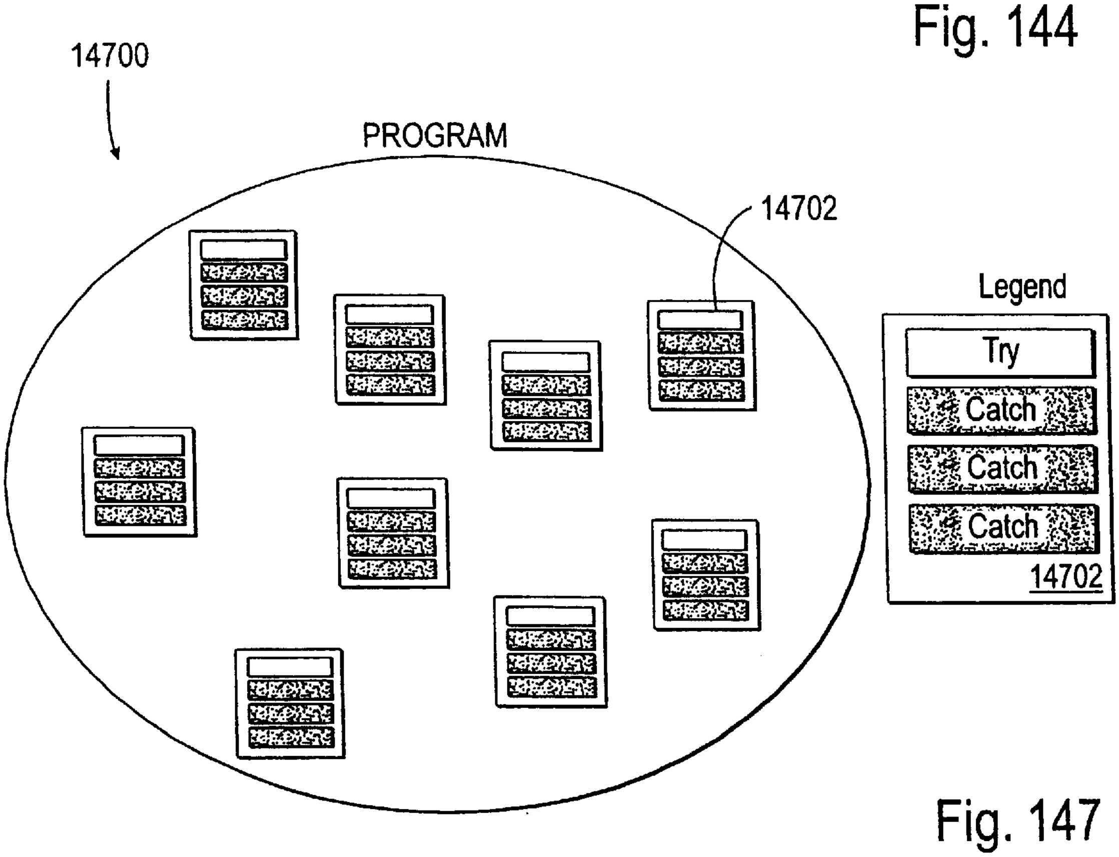
Figure 146:
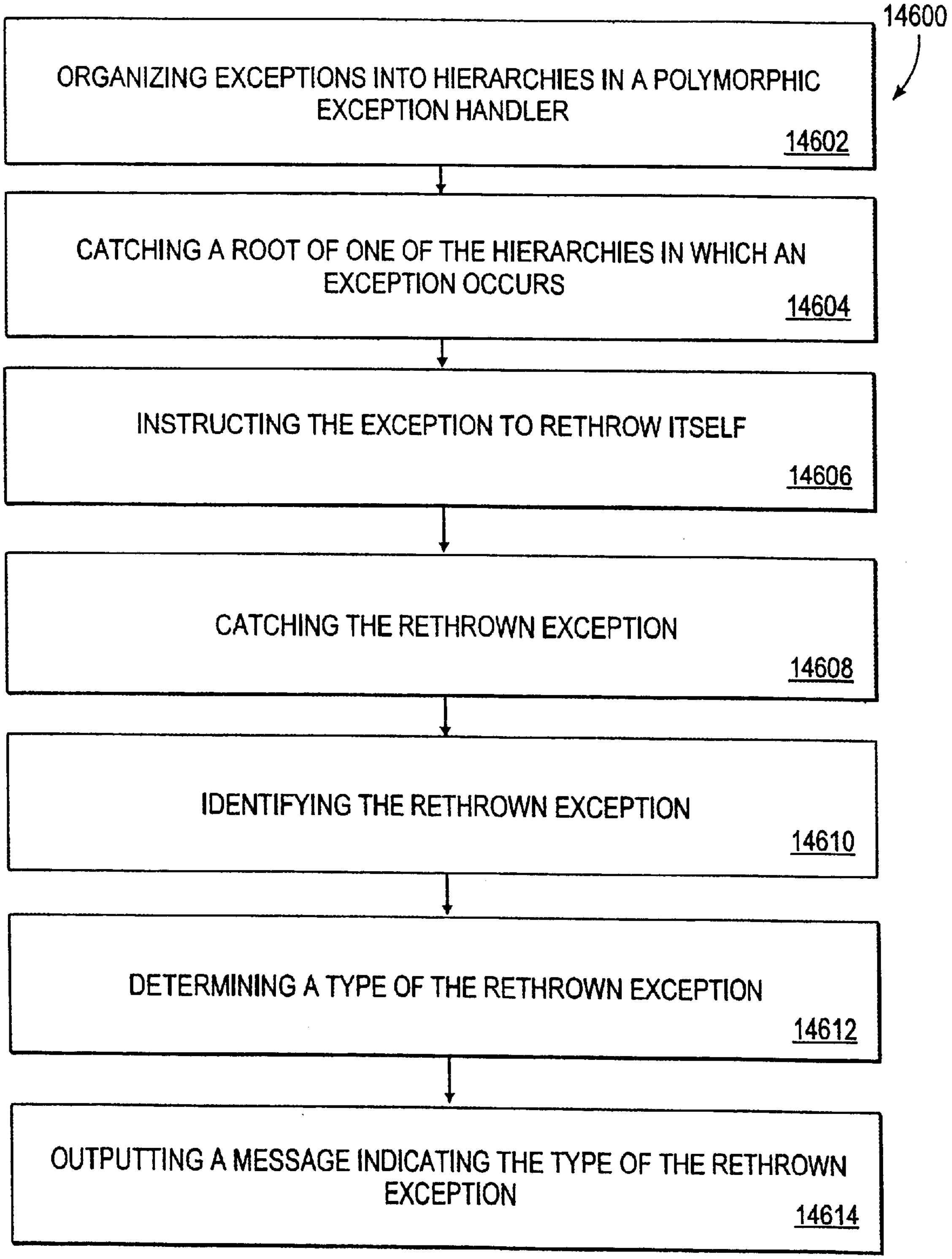
Figure 148:
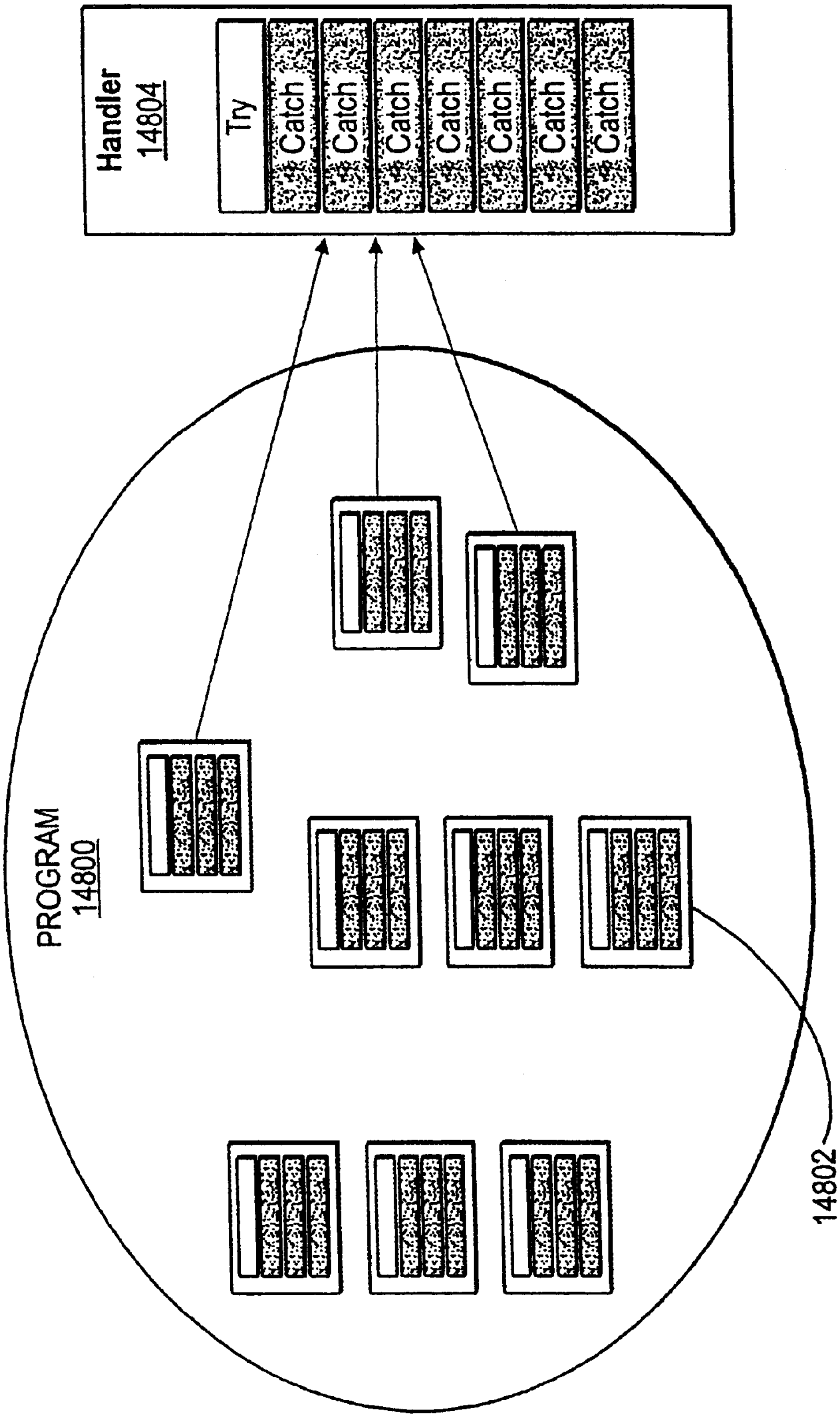
Figure 149:
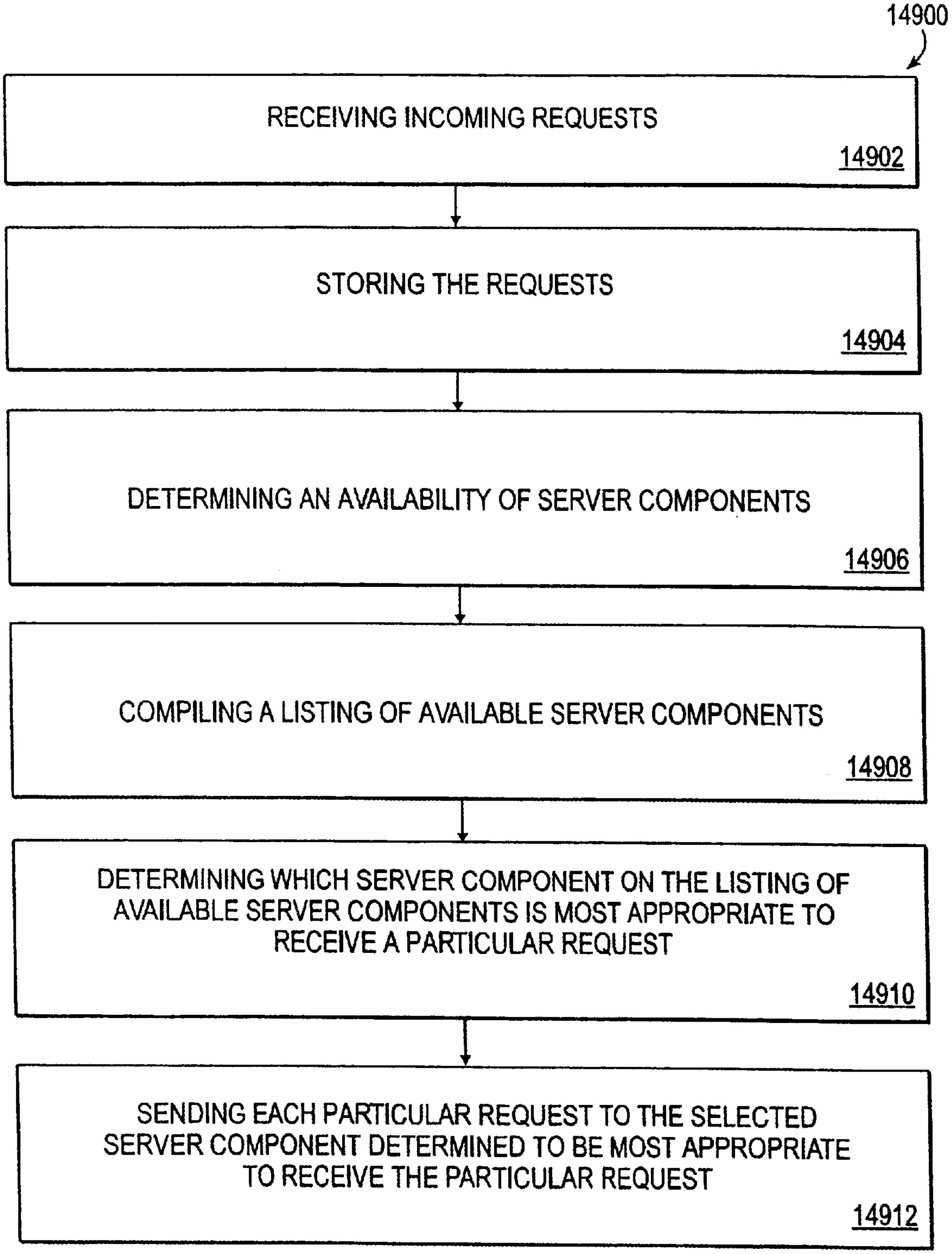
Figure 150:
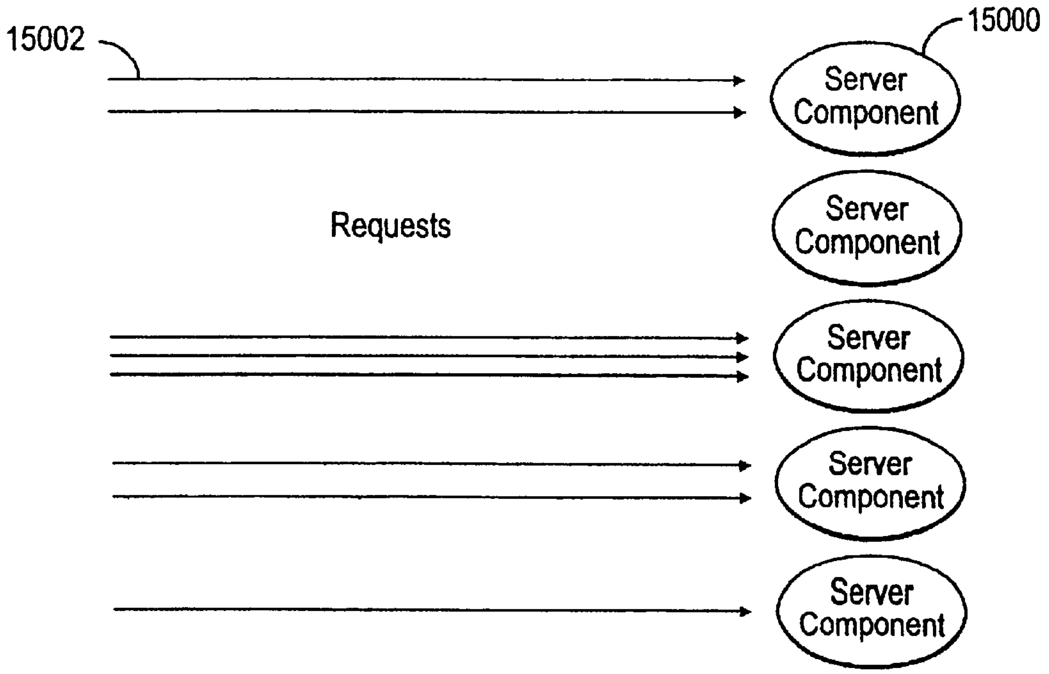
Figure 151:
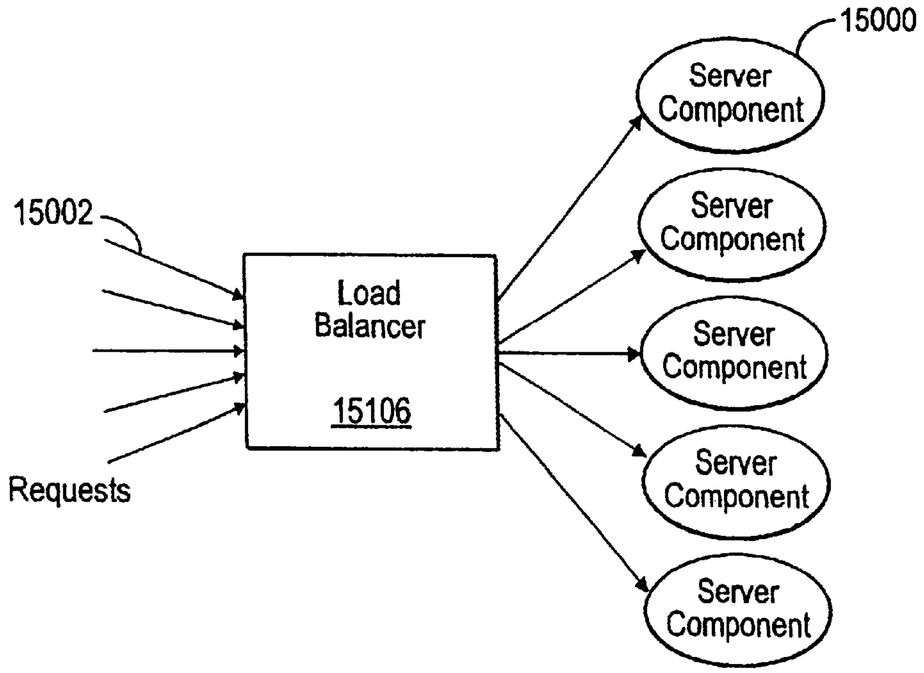
Figure 152:
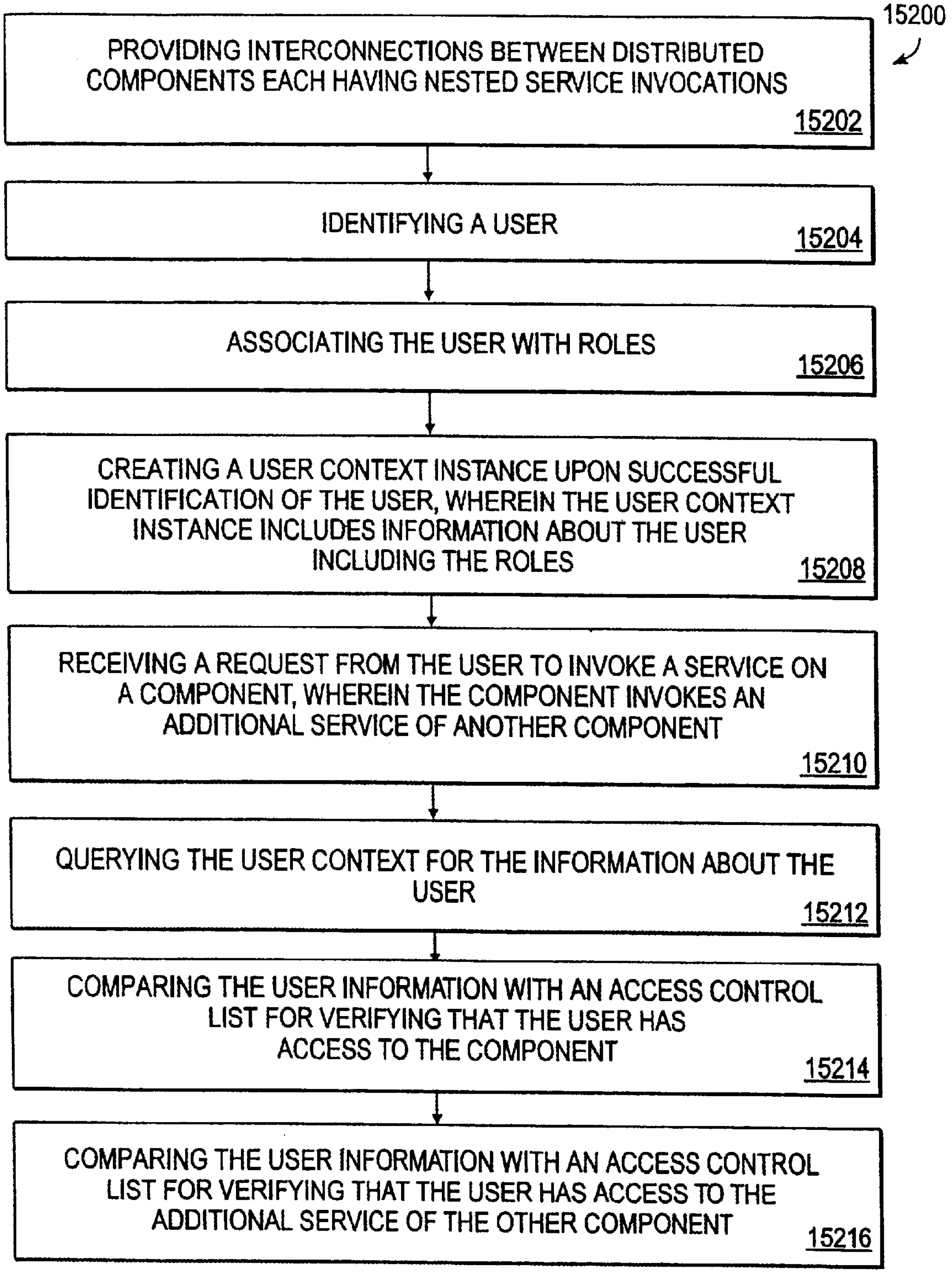
Figure 153:
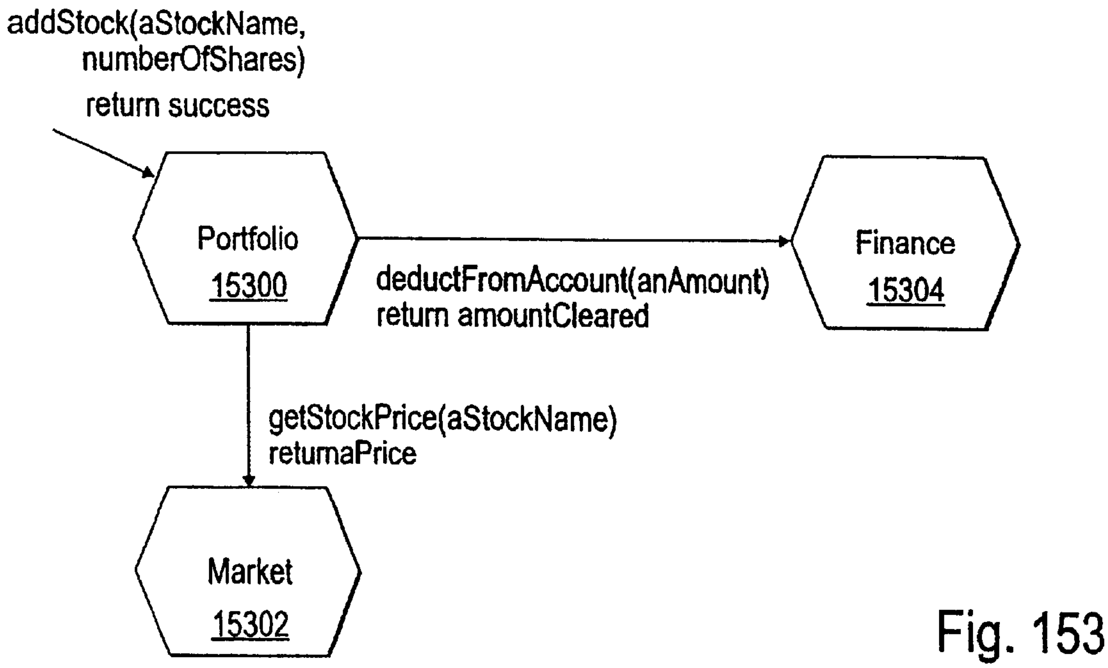
Figure 154:
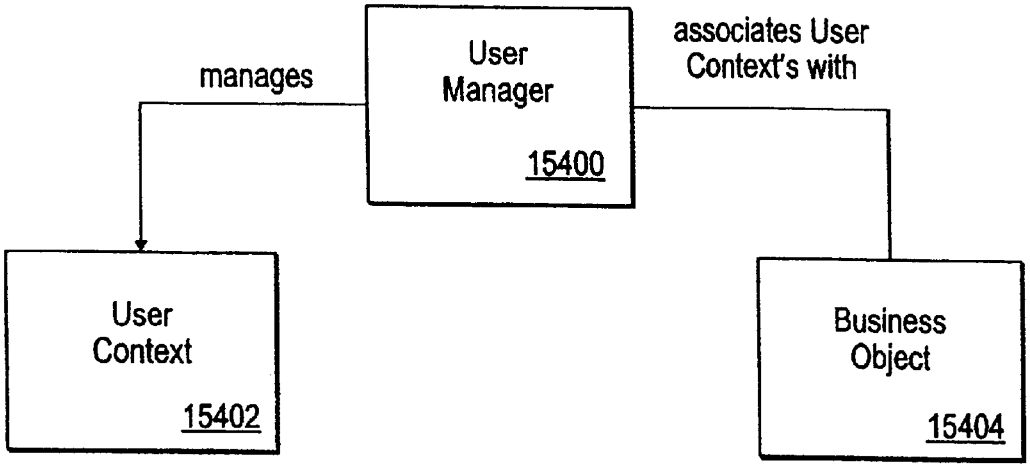
Figure 155:
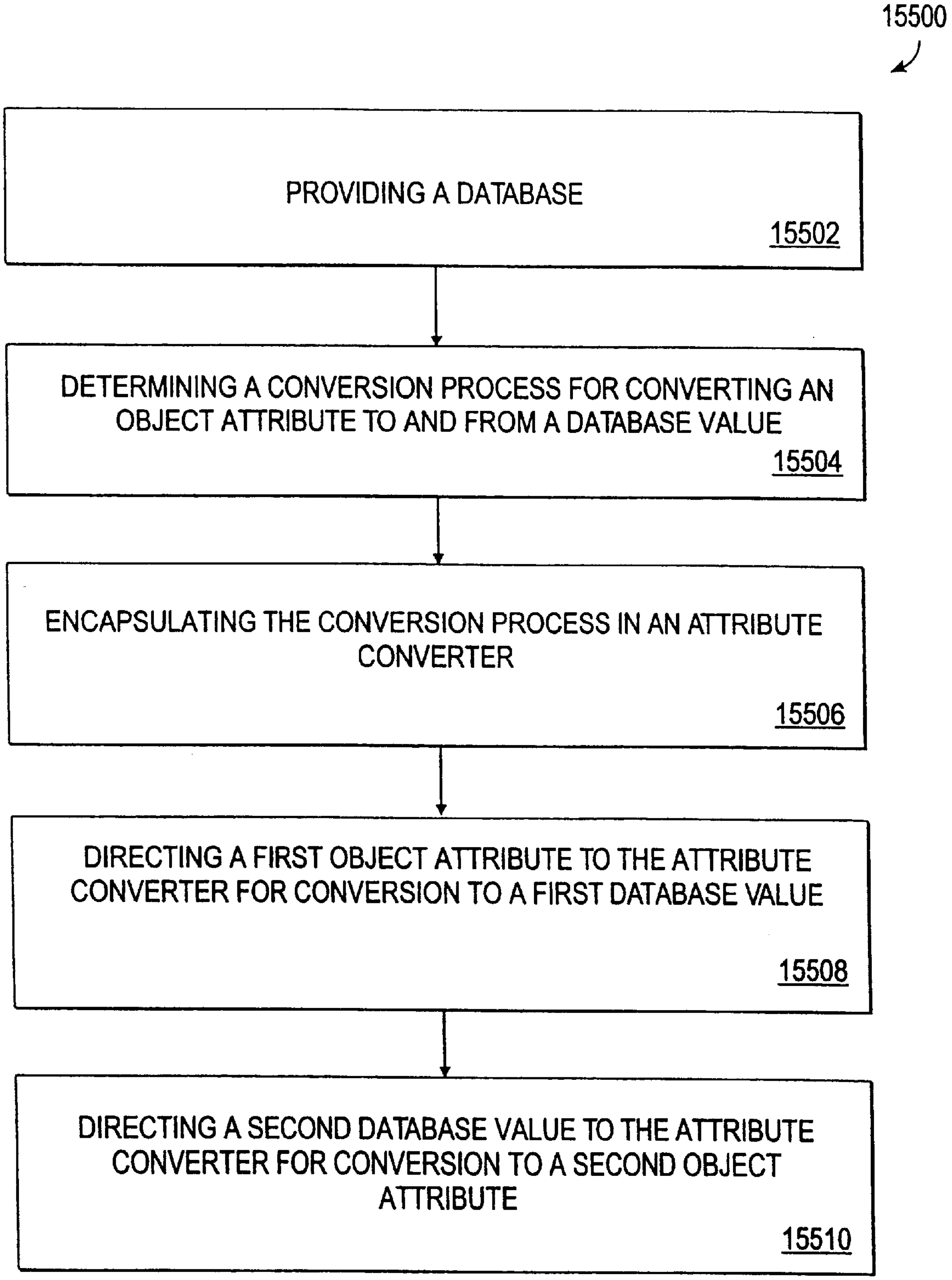
Figure 156:
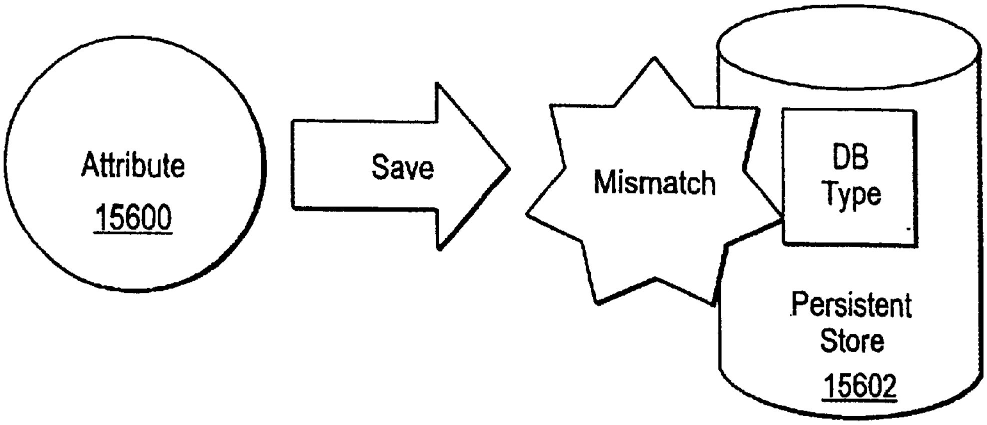
Figure 157:
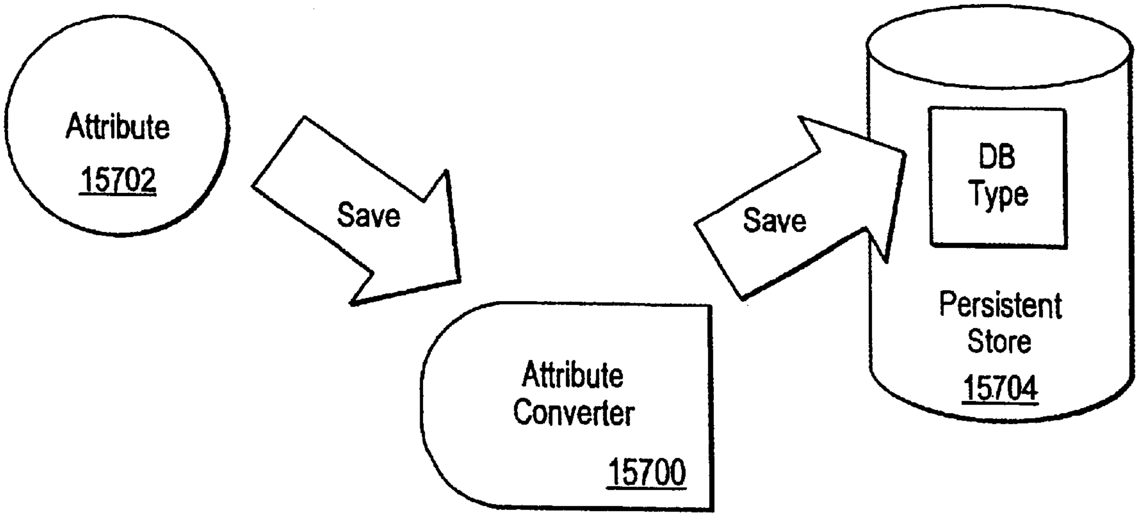
Figure 158:
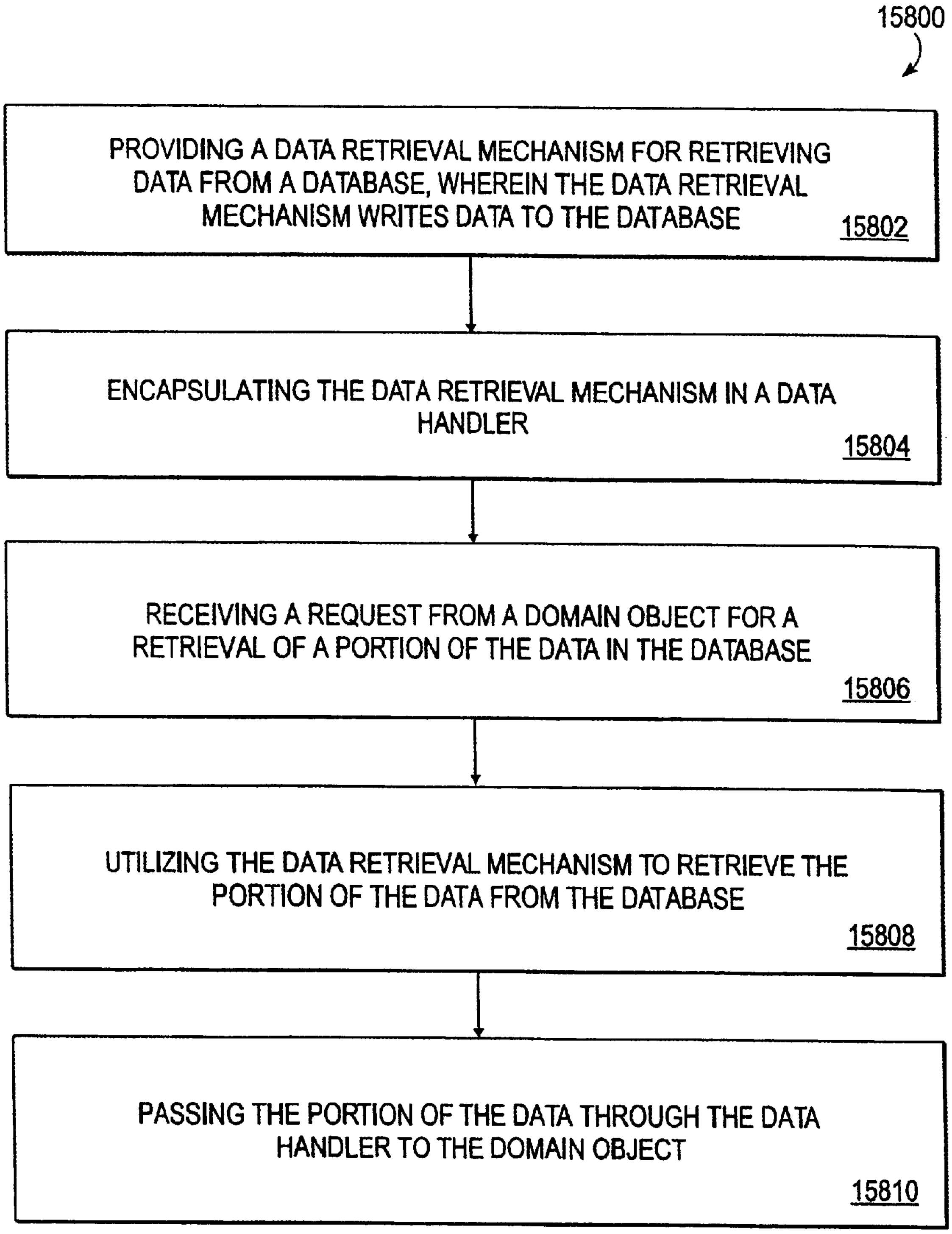
Figure 159:
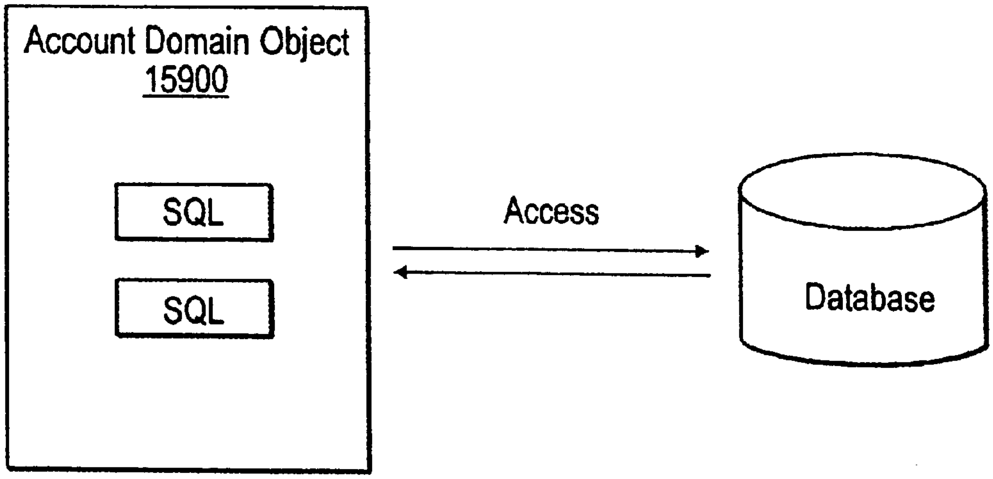
Figure 160:
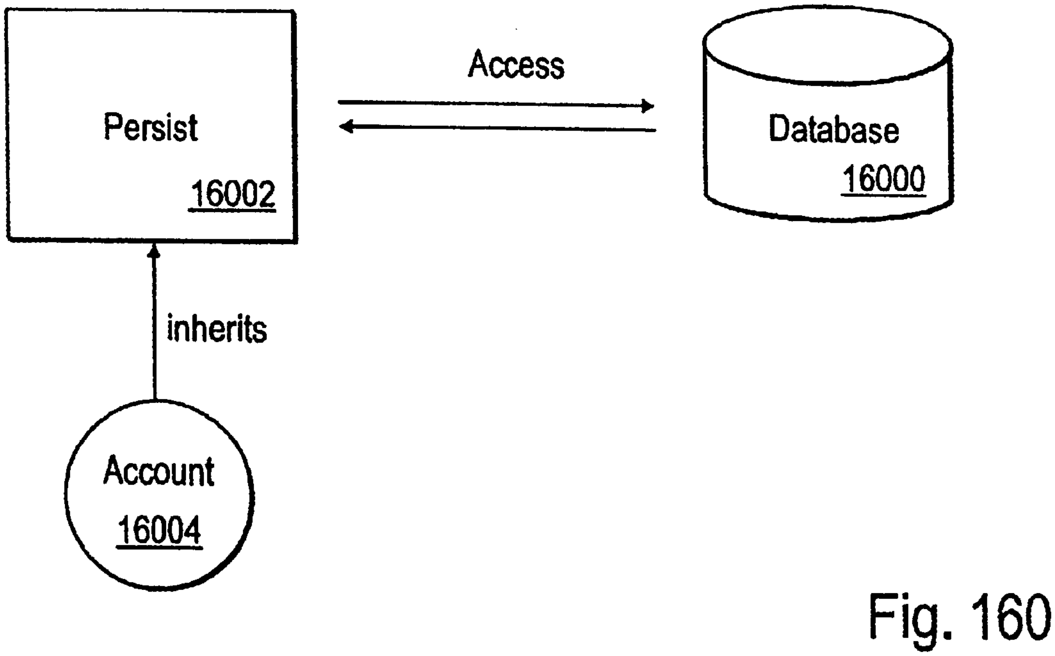
Figure 161:
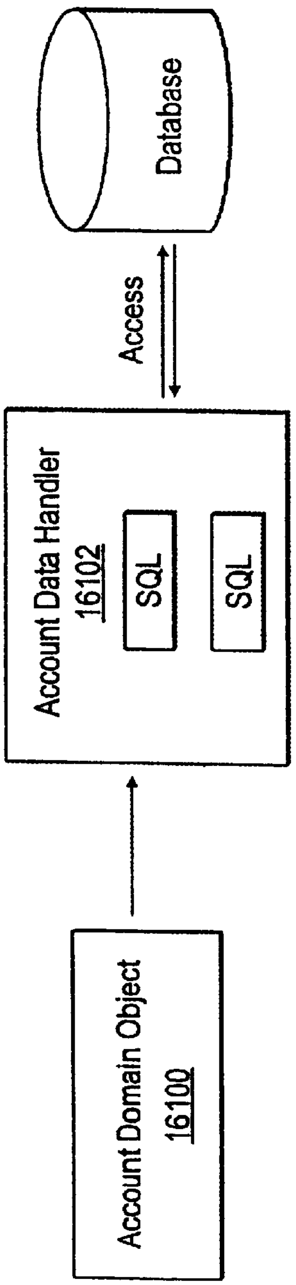
Figure 162:
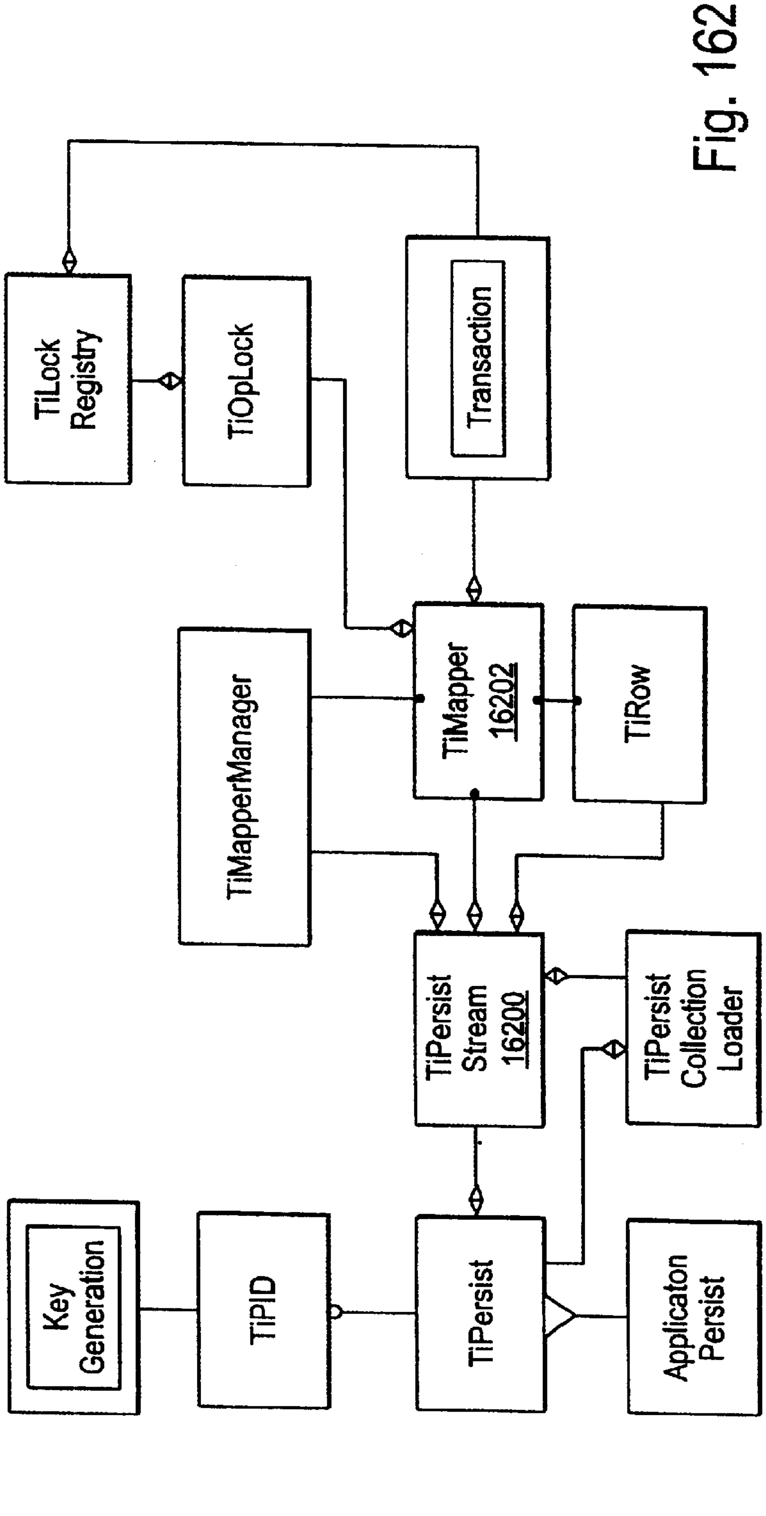
Figure 163:
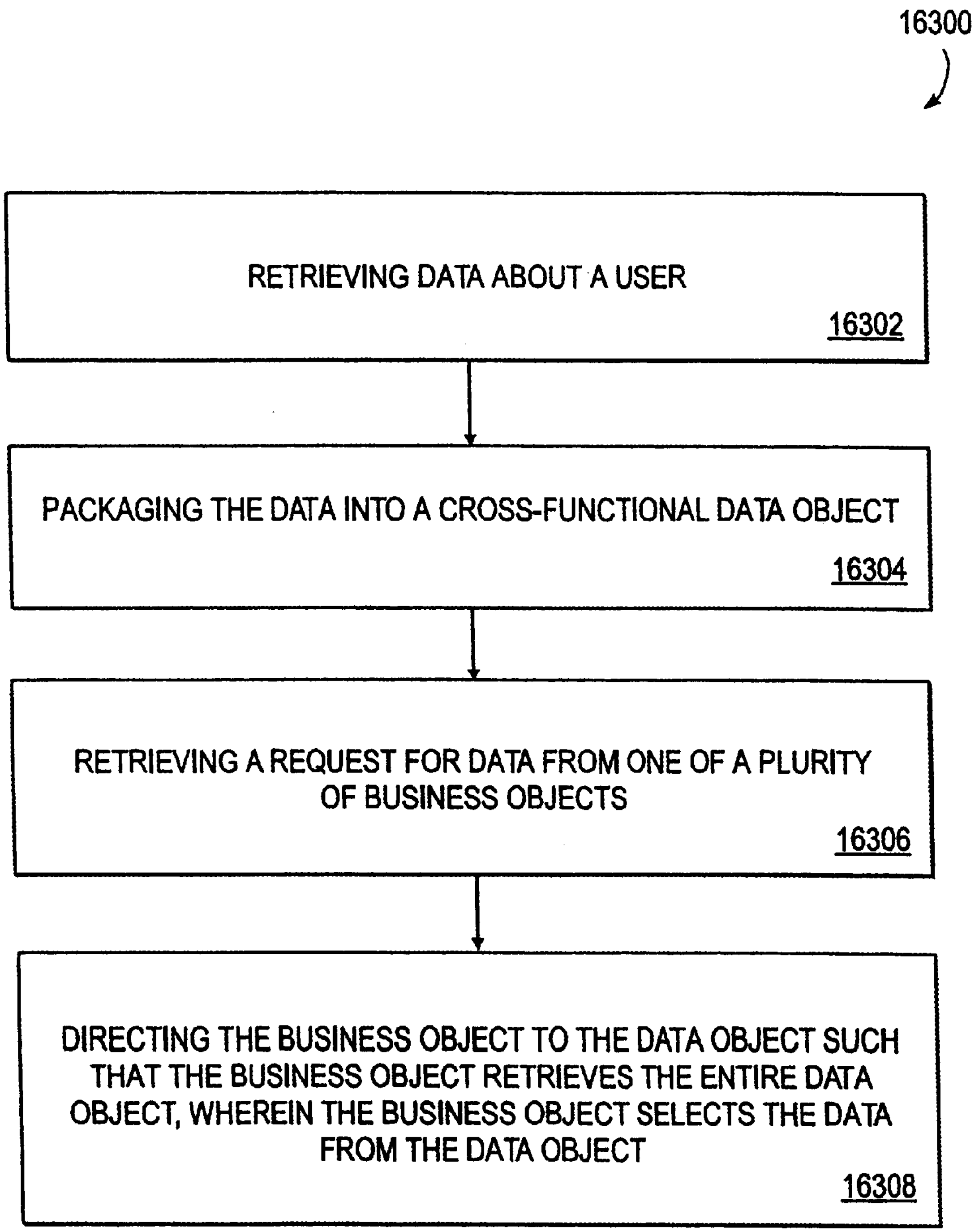
Figure 164:
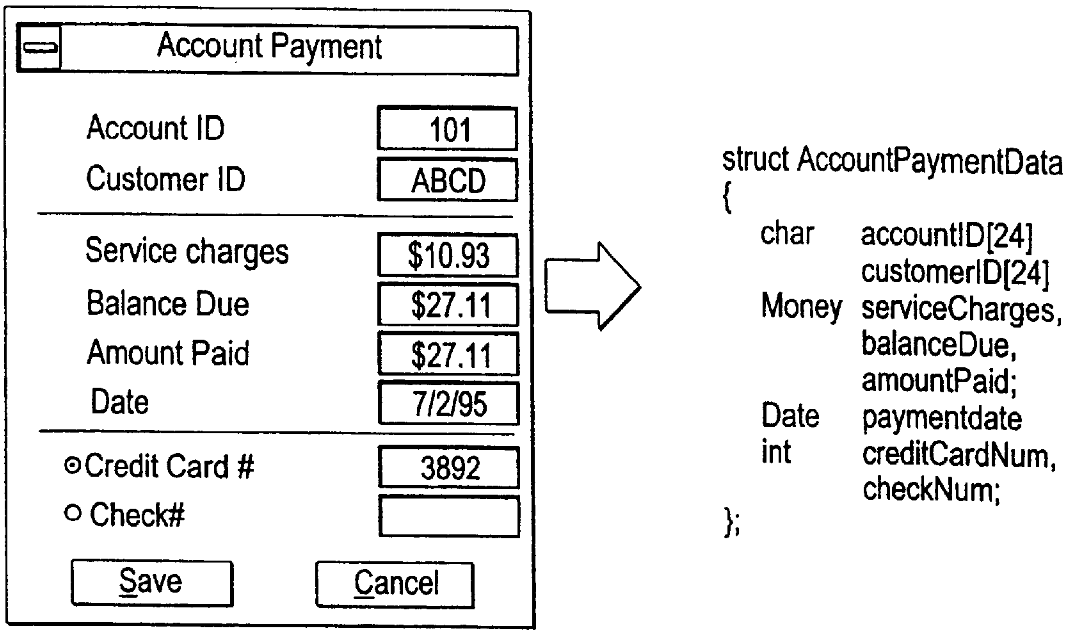
Figure 165:
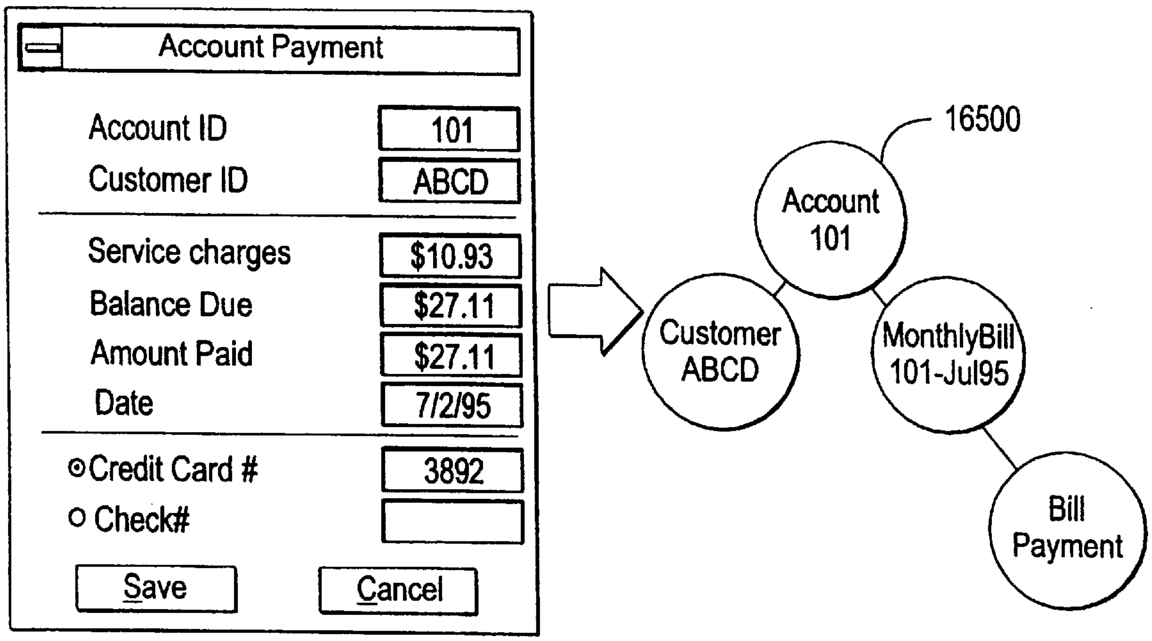
Figure 166:
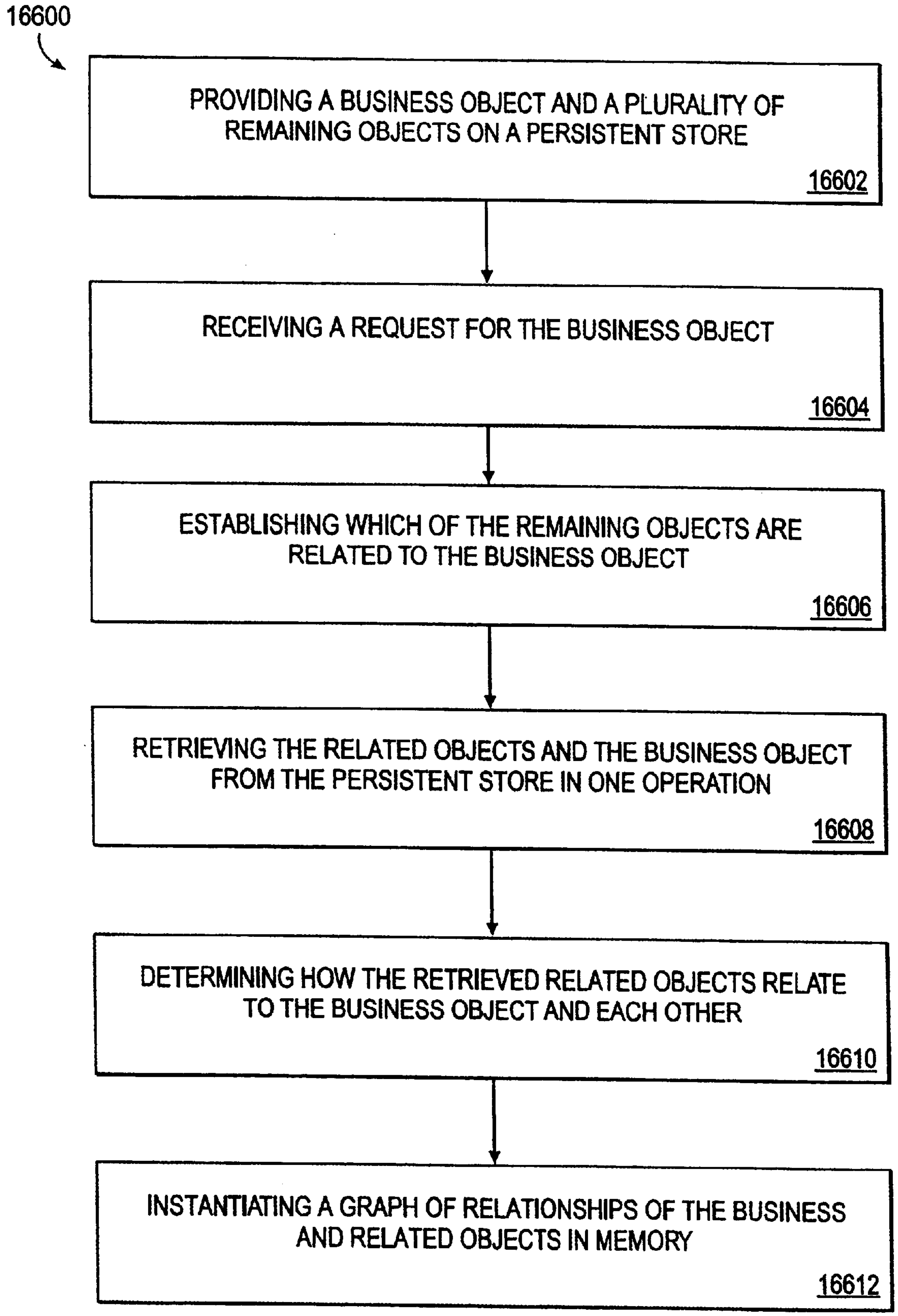
Figure 167:
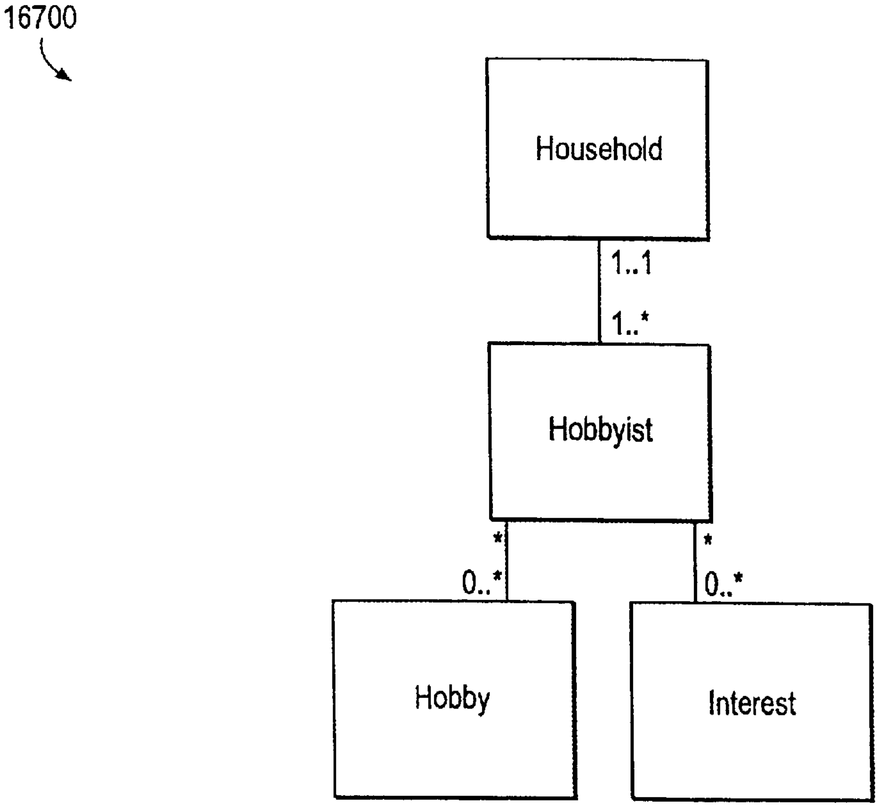
Figure 168:
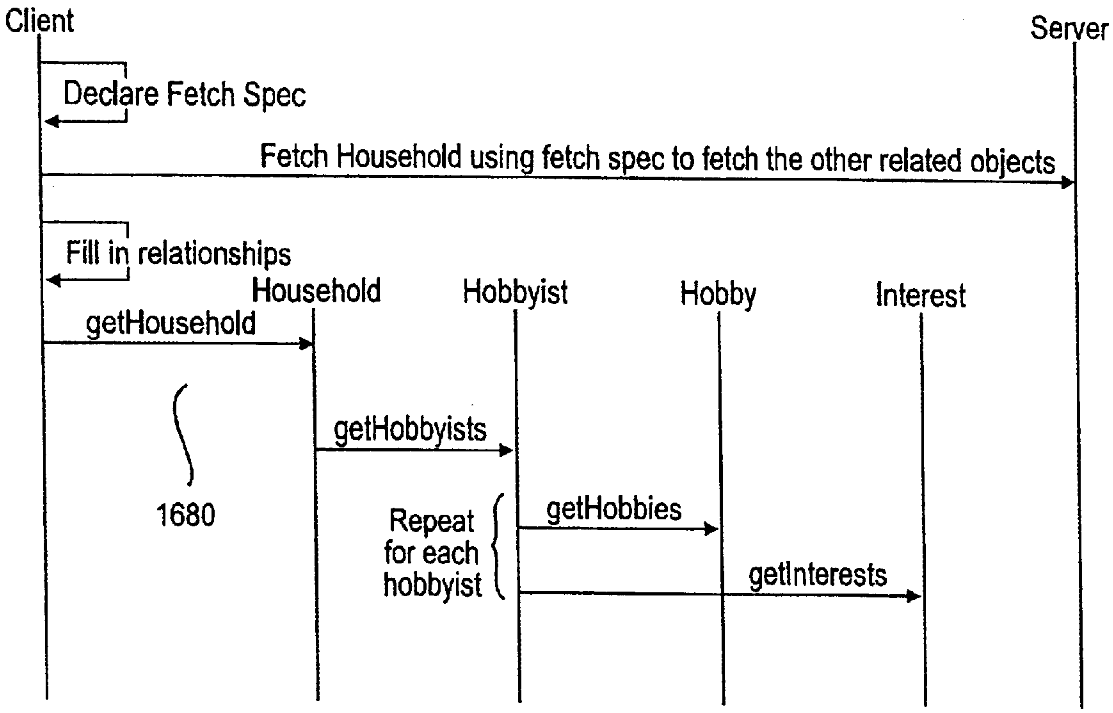
Figure 169:
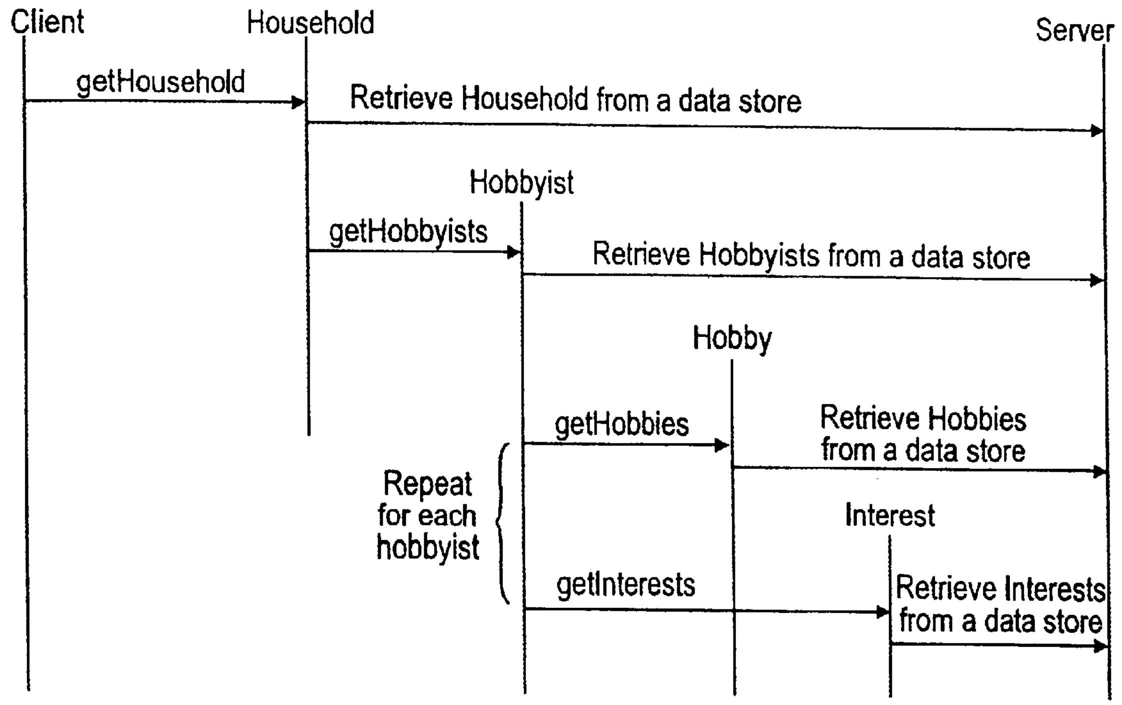
Figure 172:
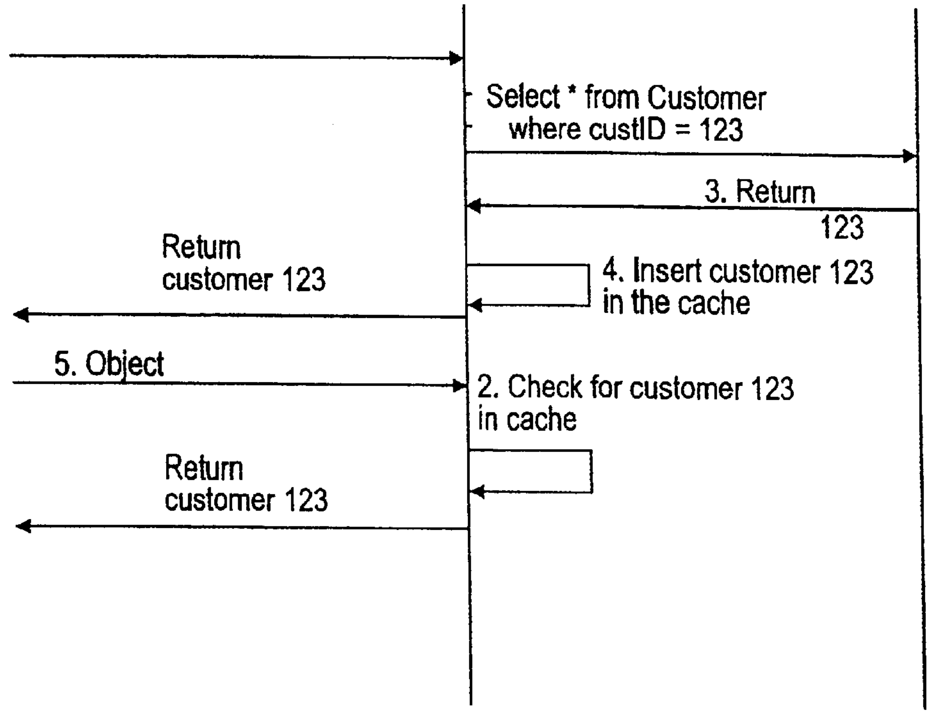
Figure 170:
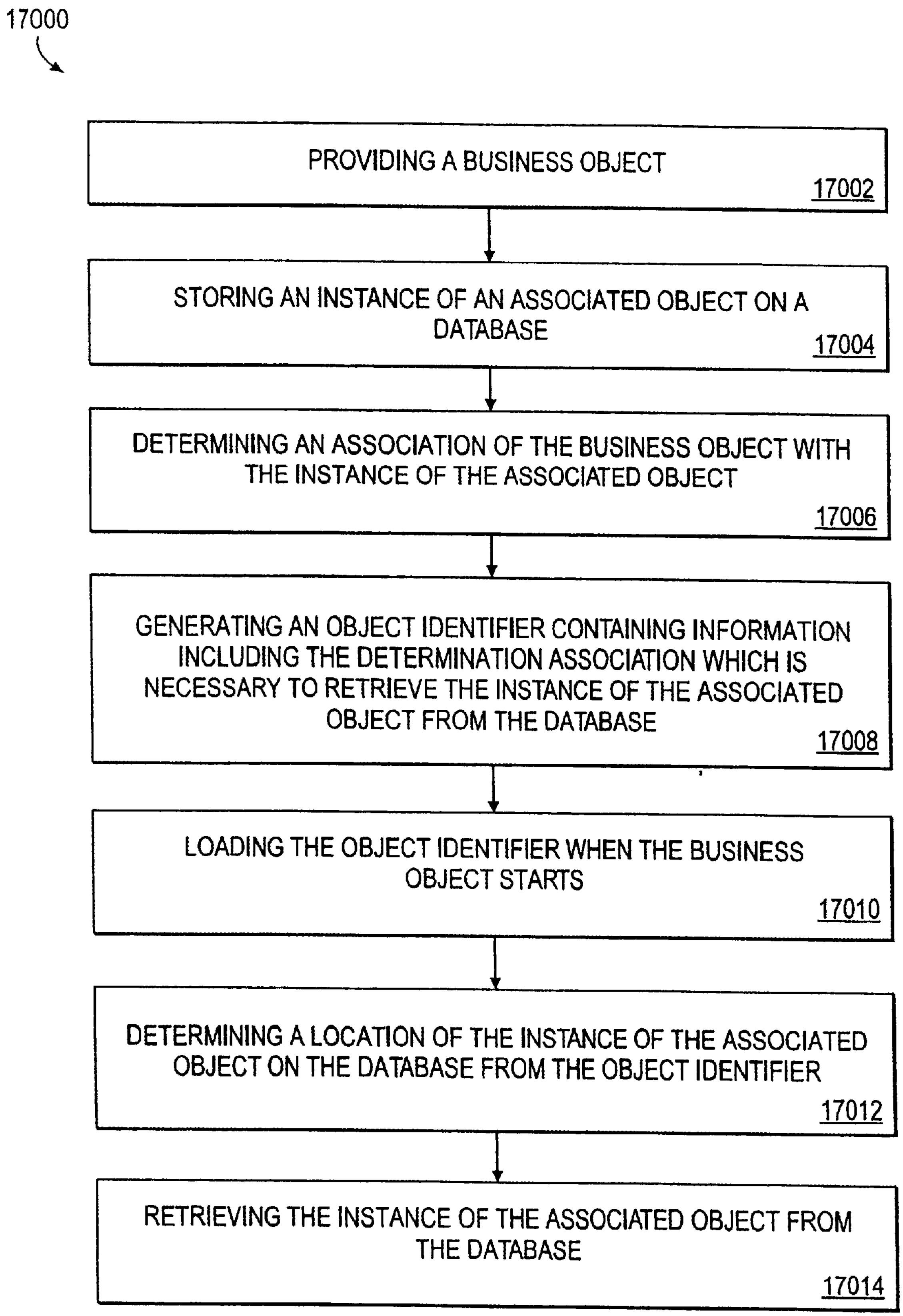
Figure 171:
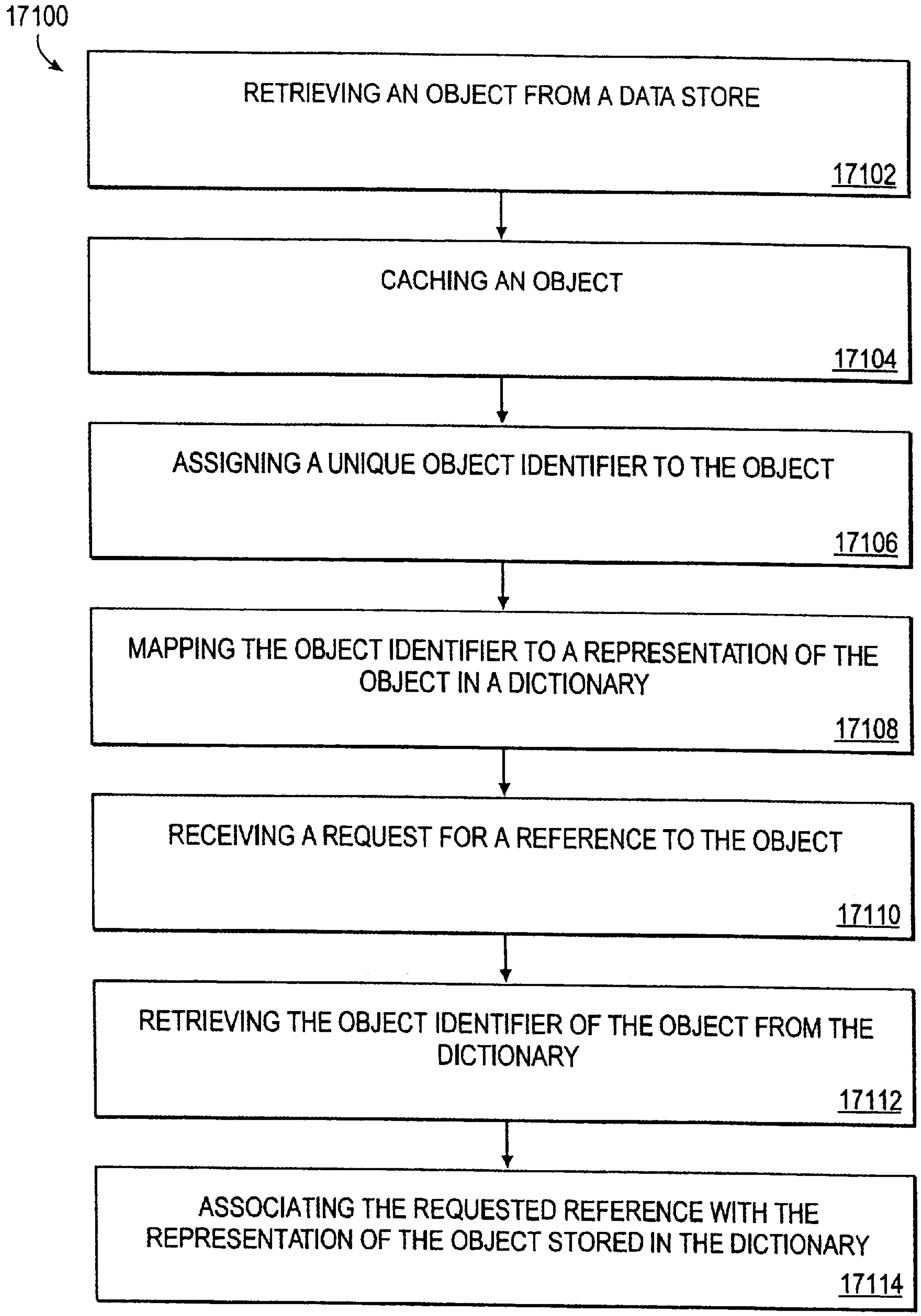
Figure 173:
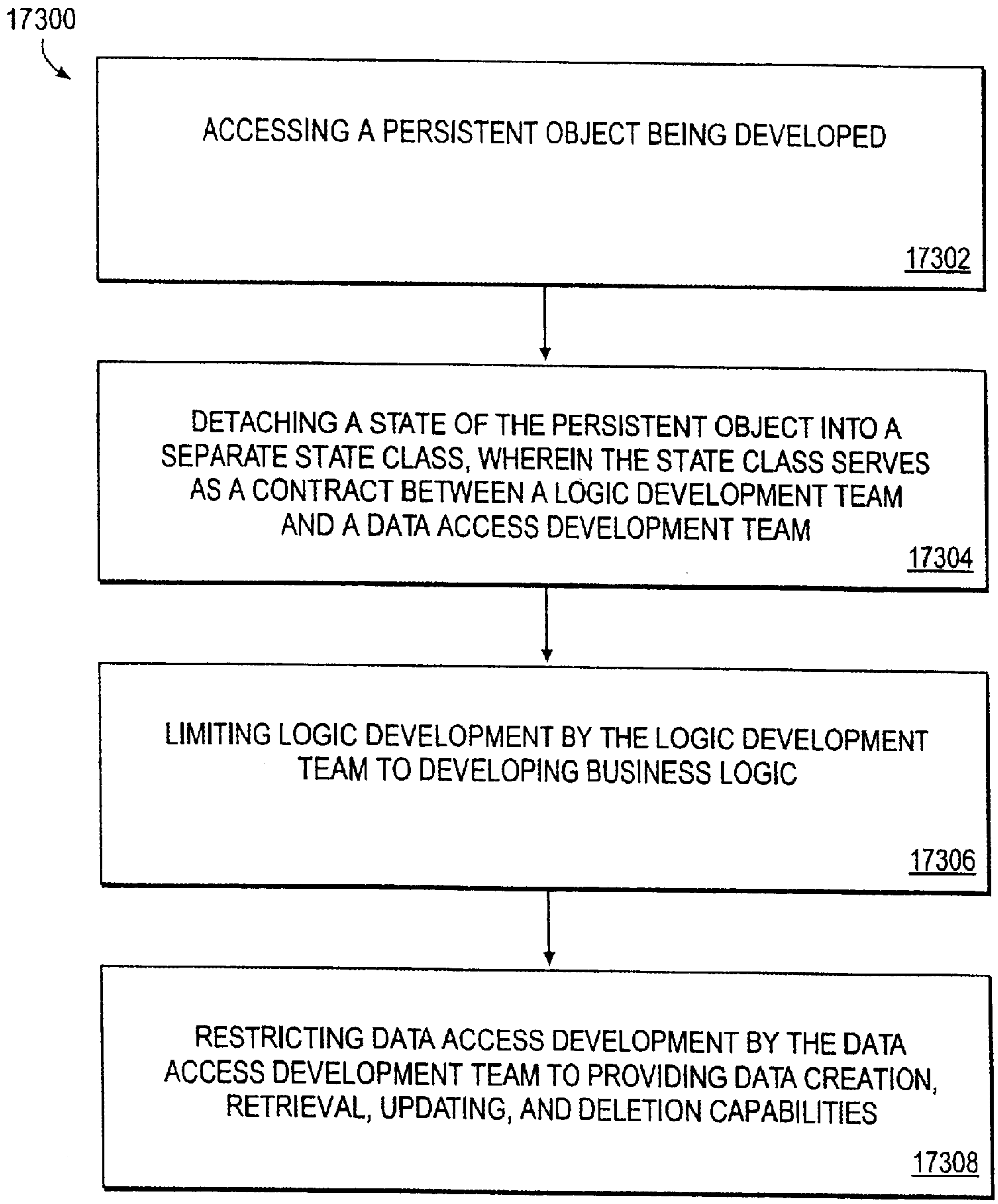
Figure 174:
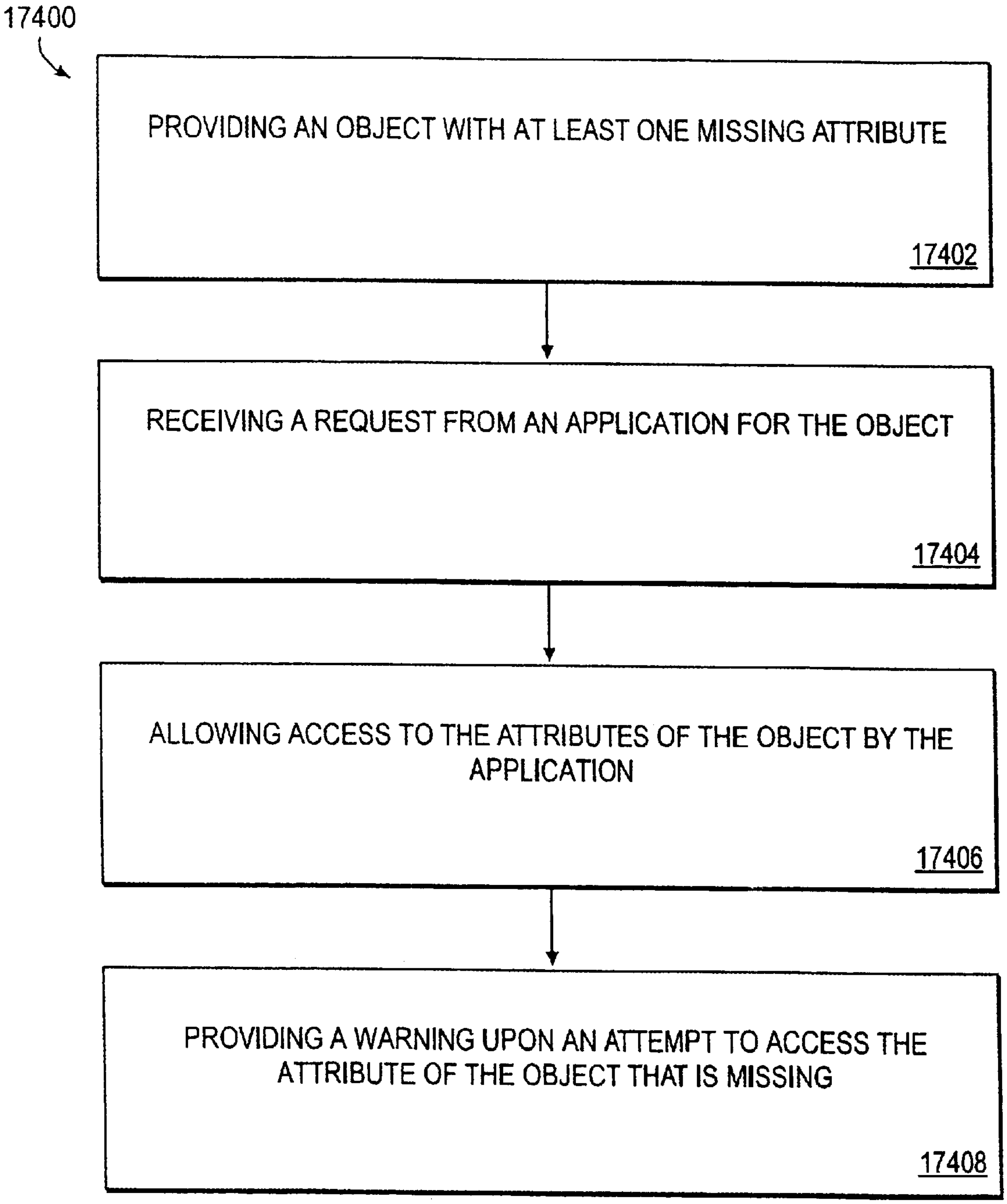
Figure 175:
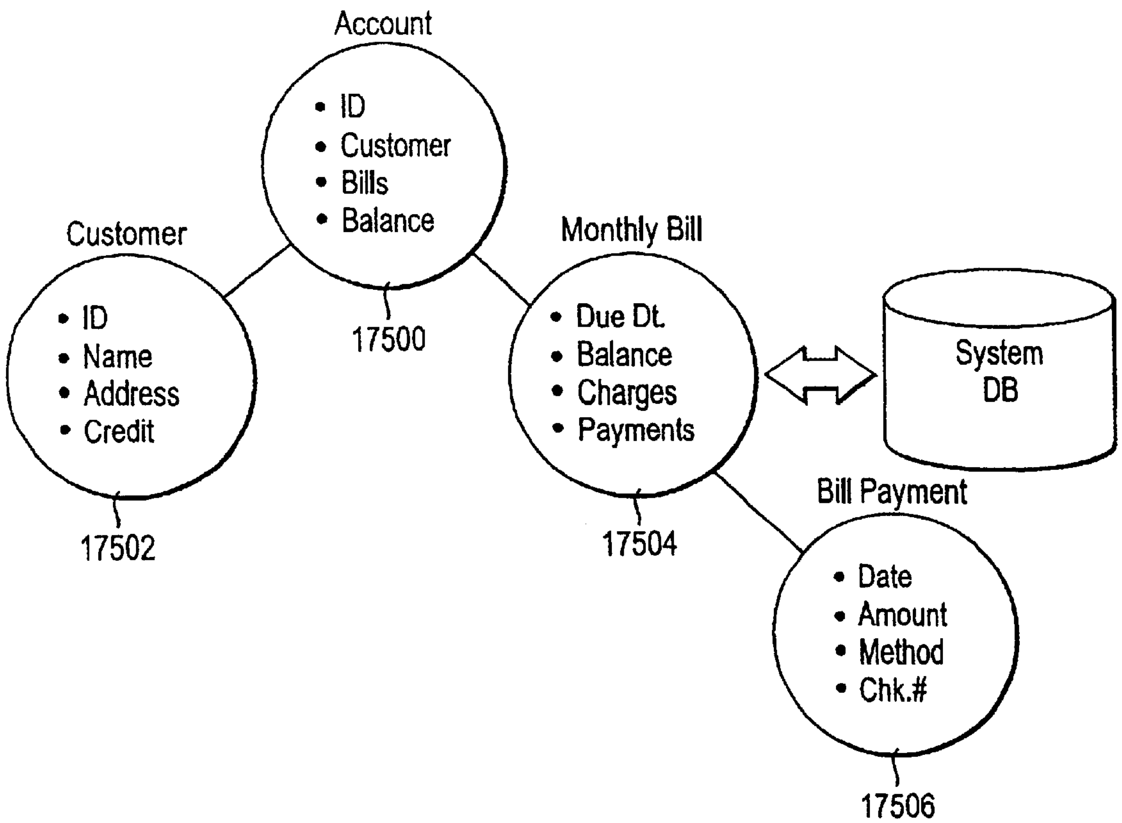
Figure 176:
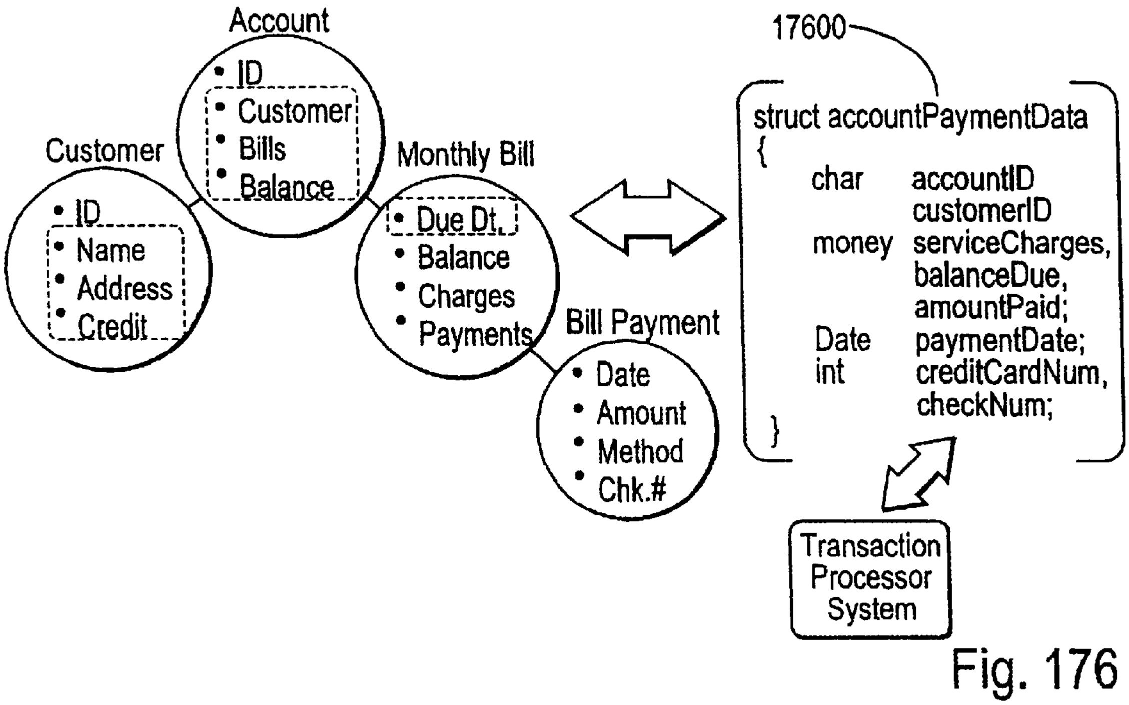
Figure 177:
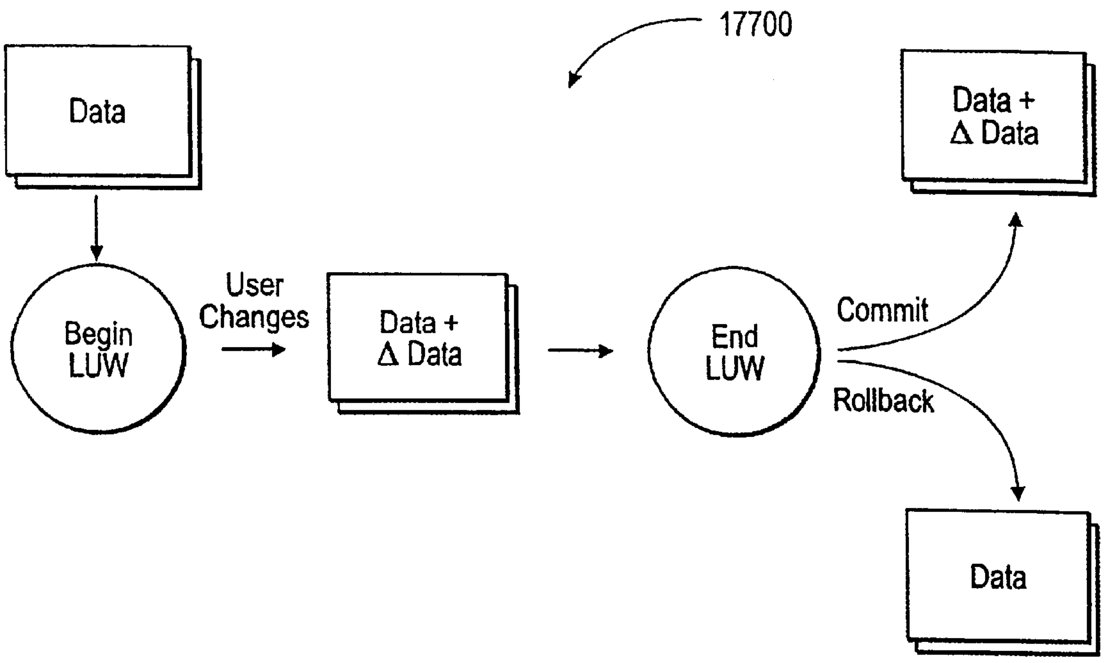
Figure 178:
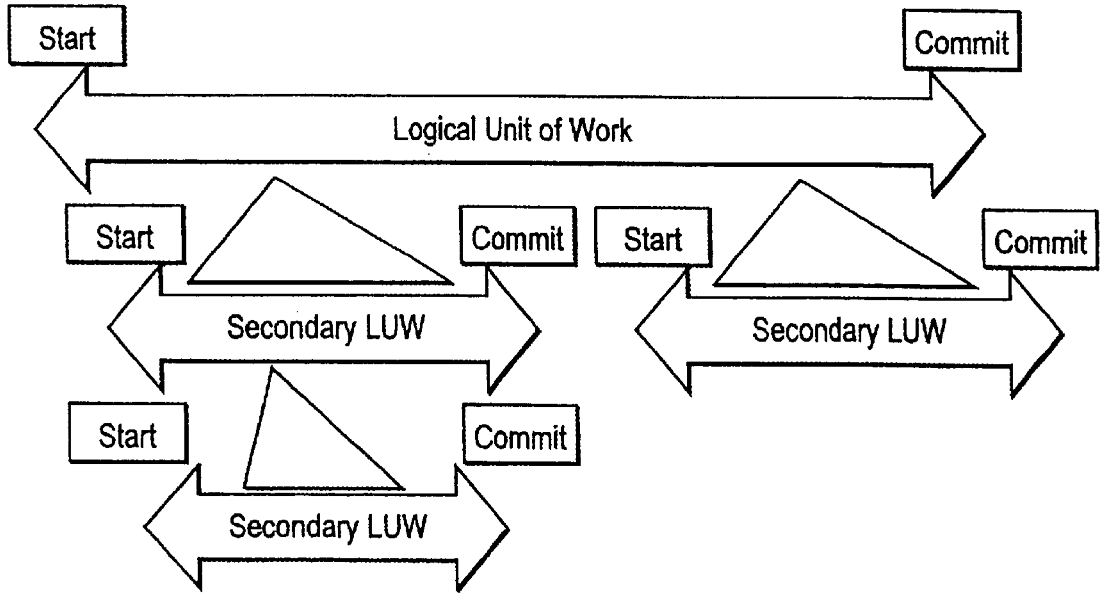
Figure 179:
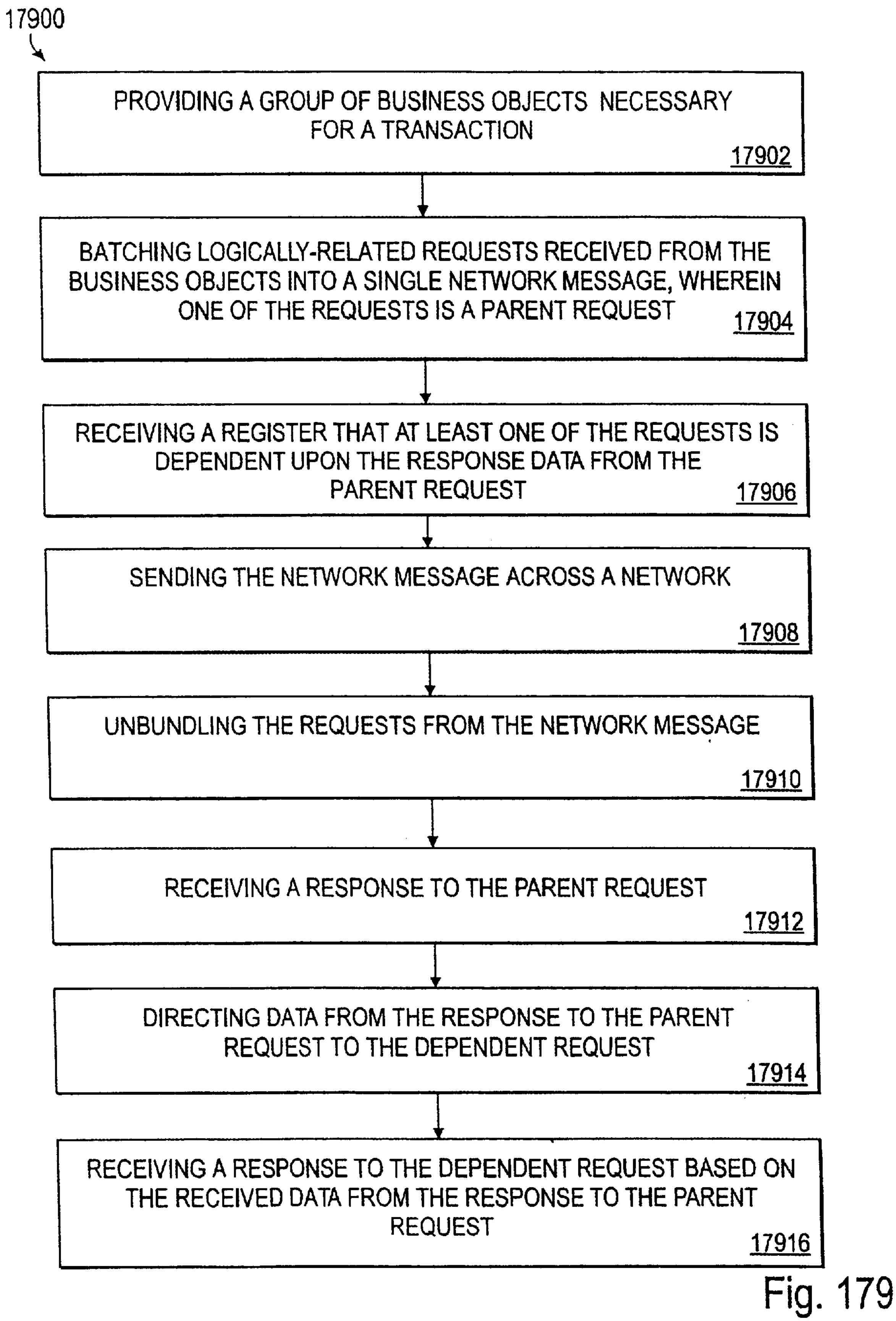
Figure 180:
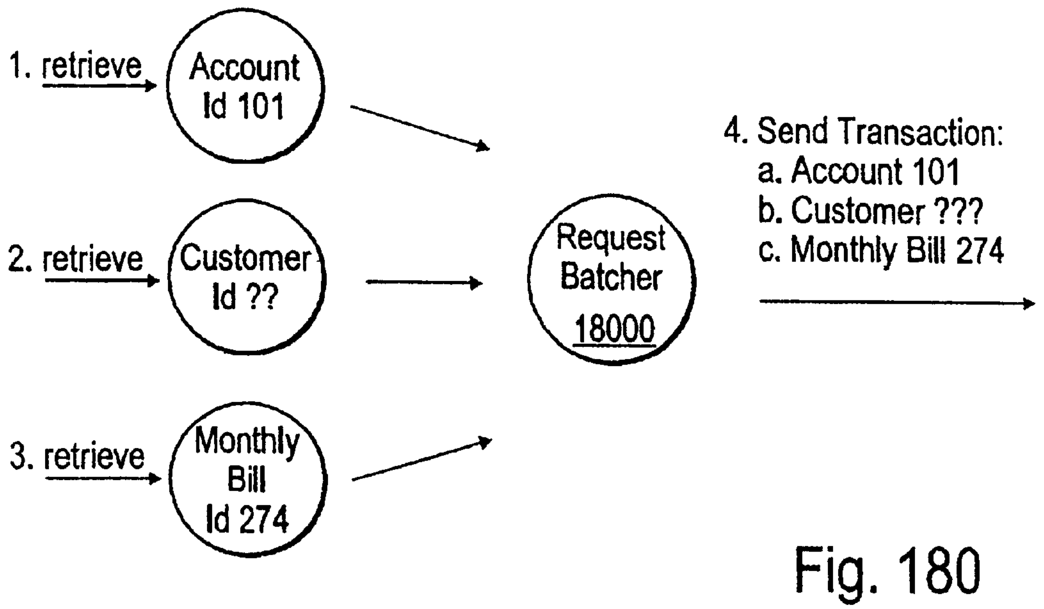
Figure 181:
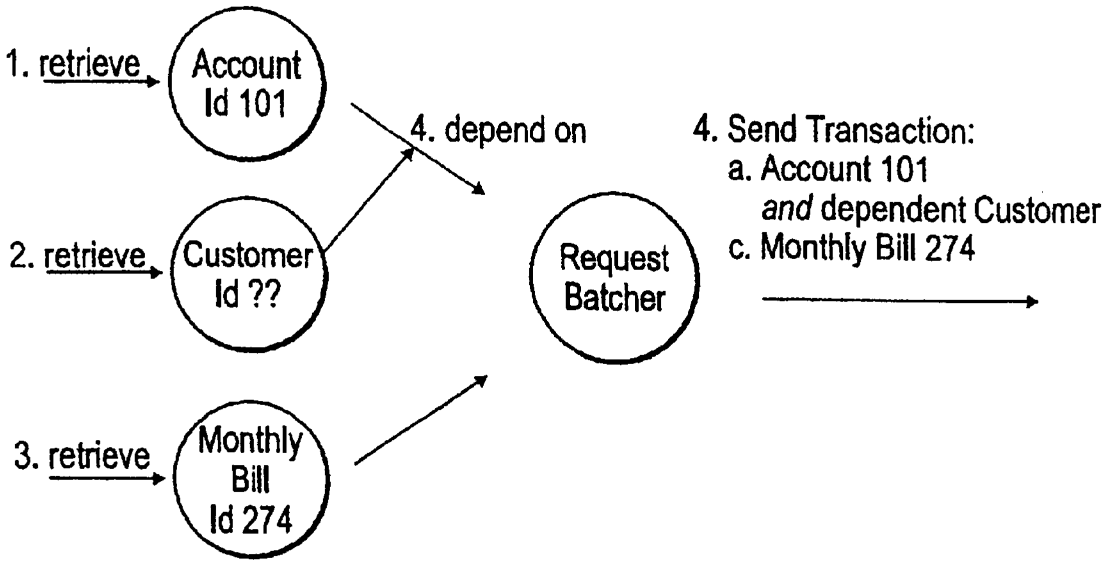
Figure 184:
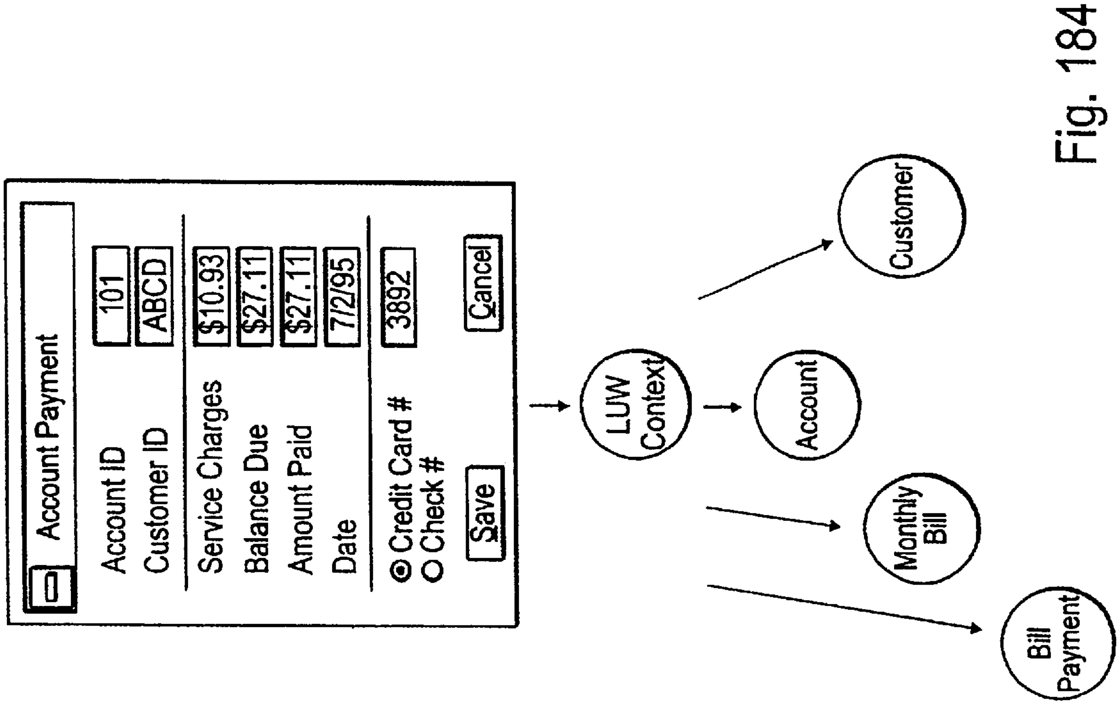
Figure 183:
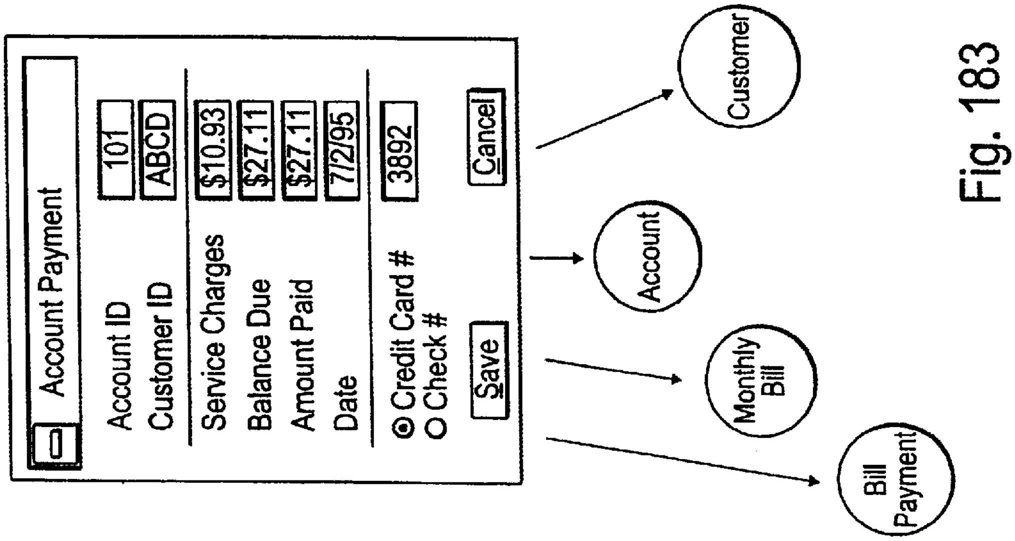
Figure 185:
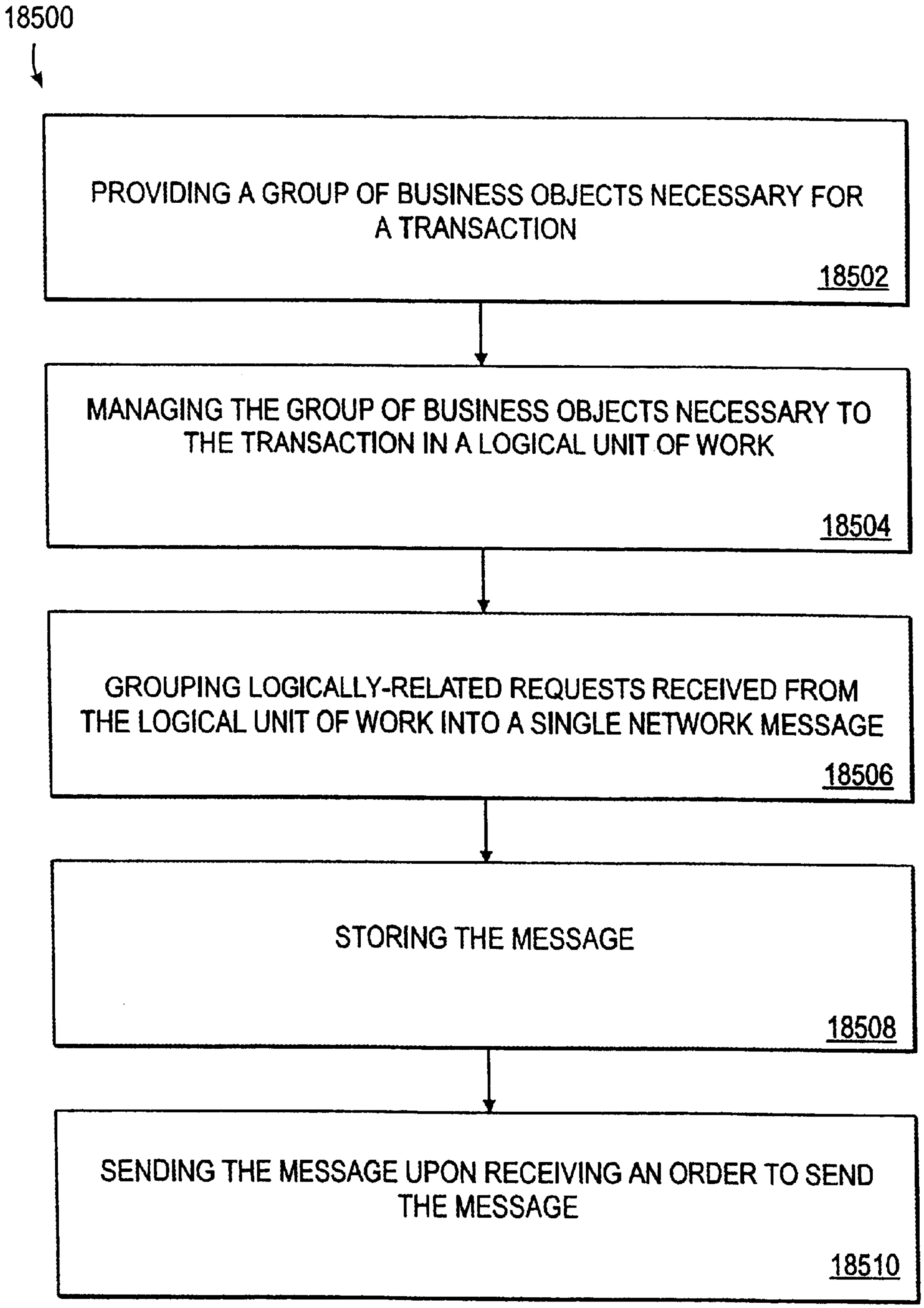
Figure 186:
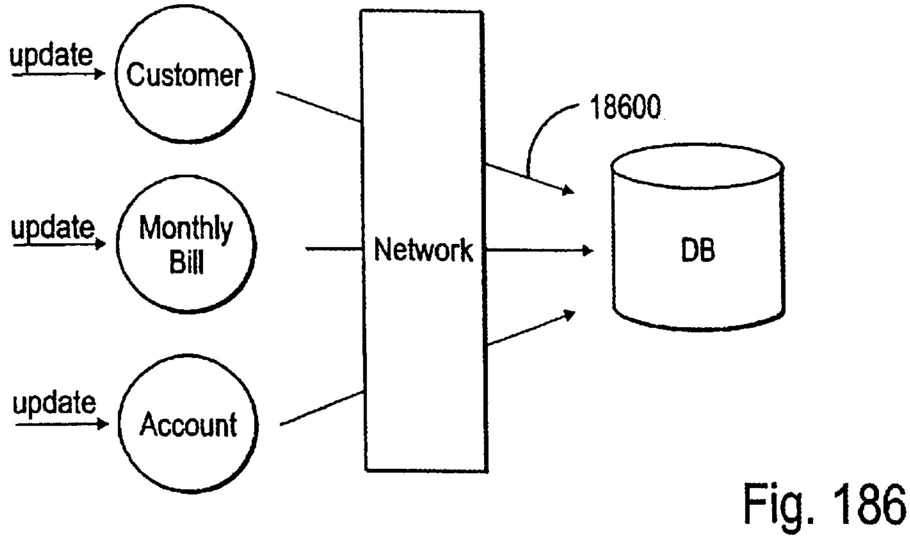
Figure 187:
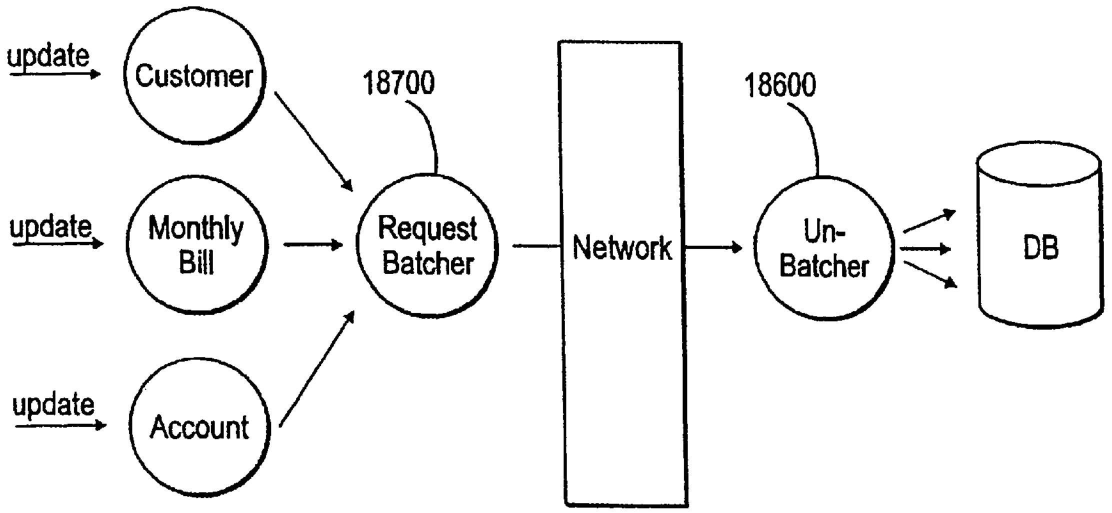
Figure 188:
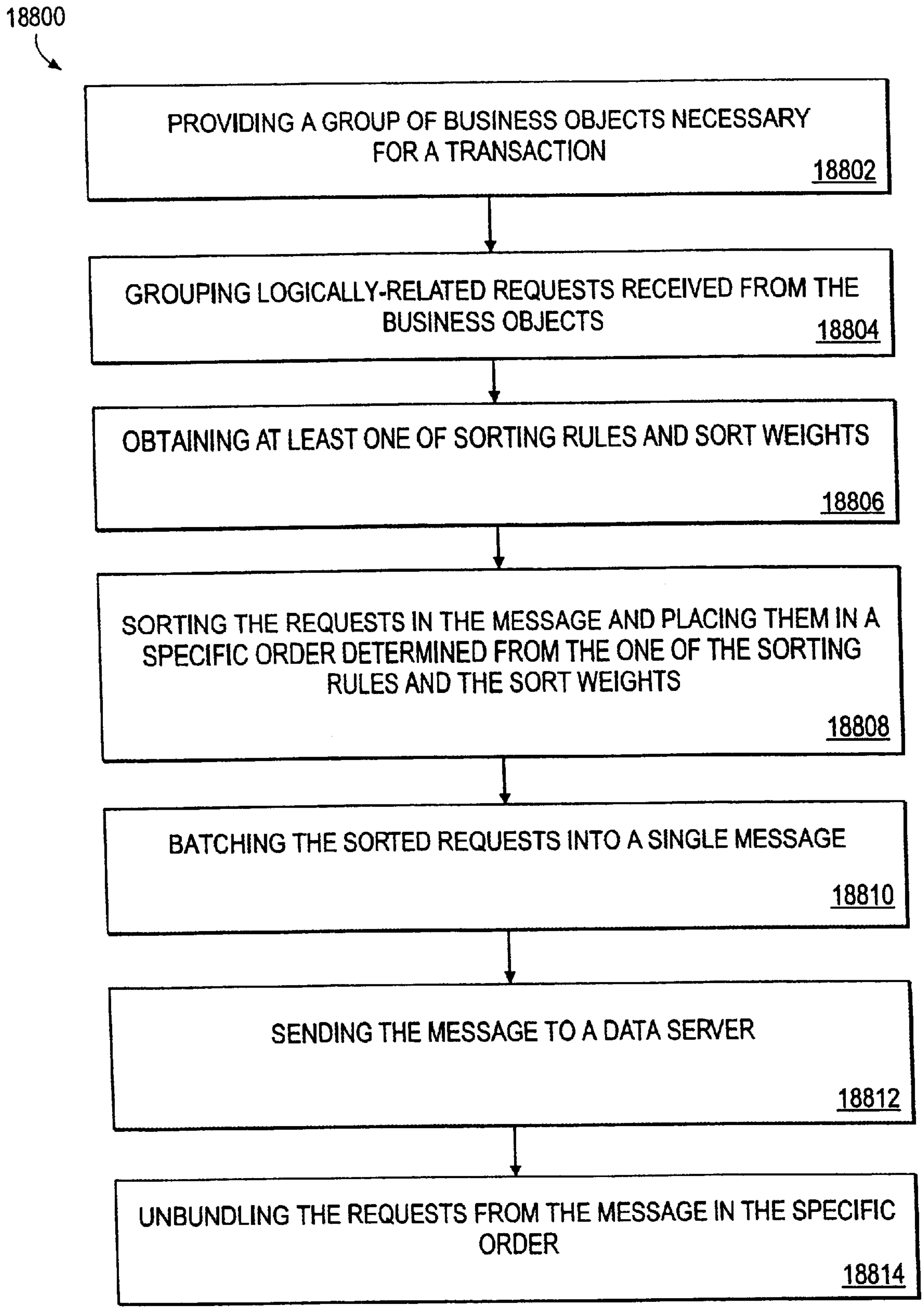
Figure 189:
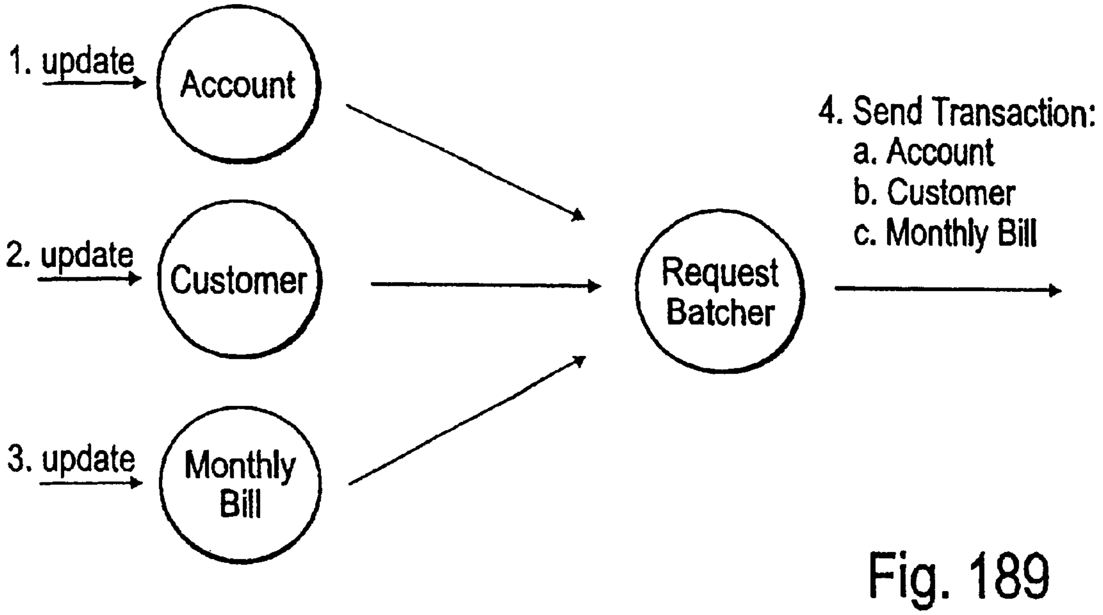
Figure 190:
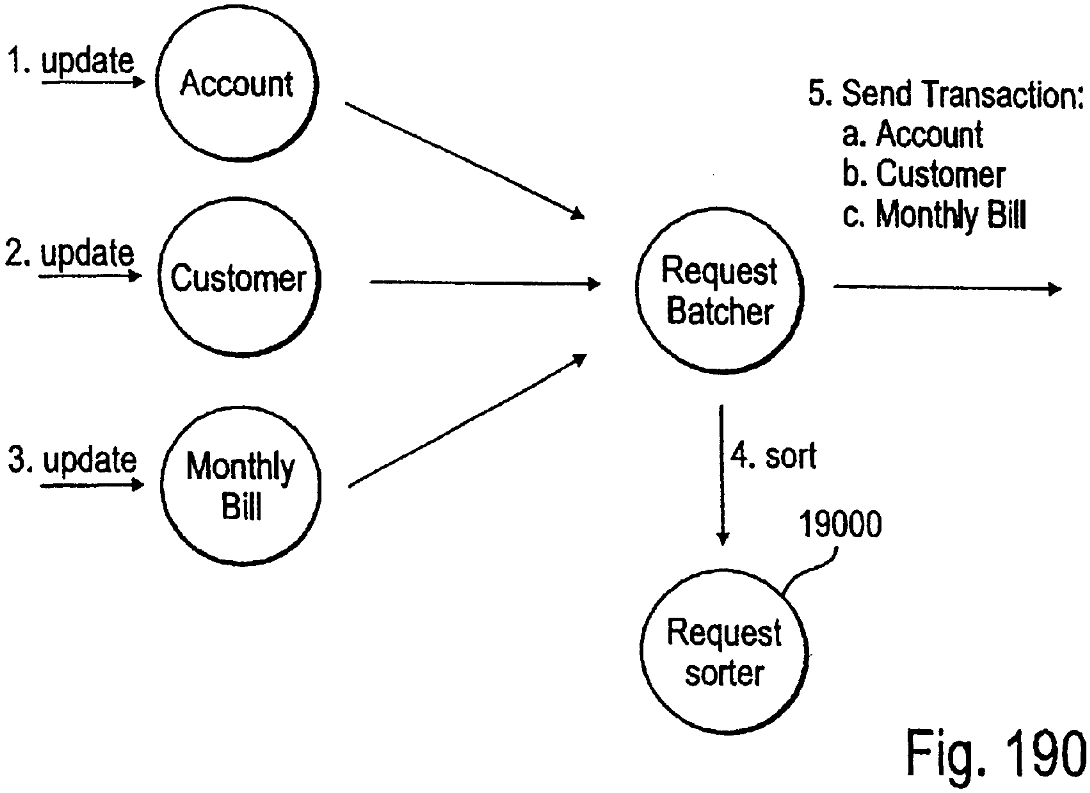
Figure 192:
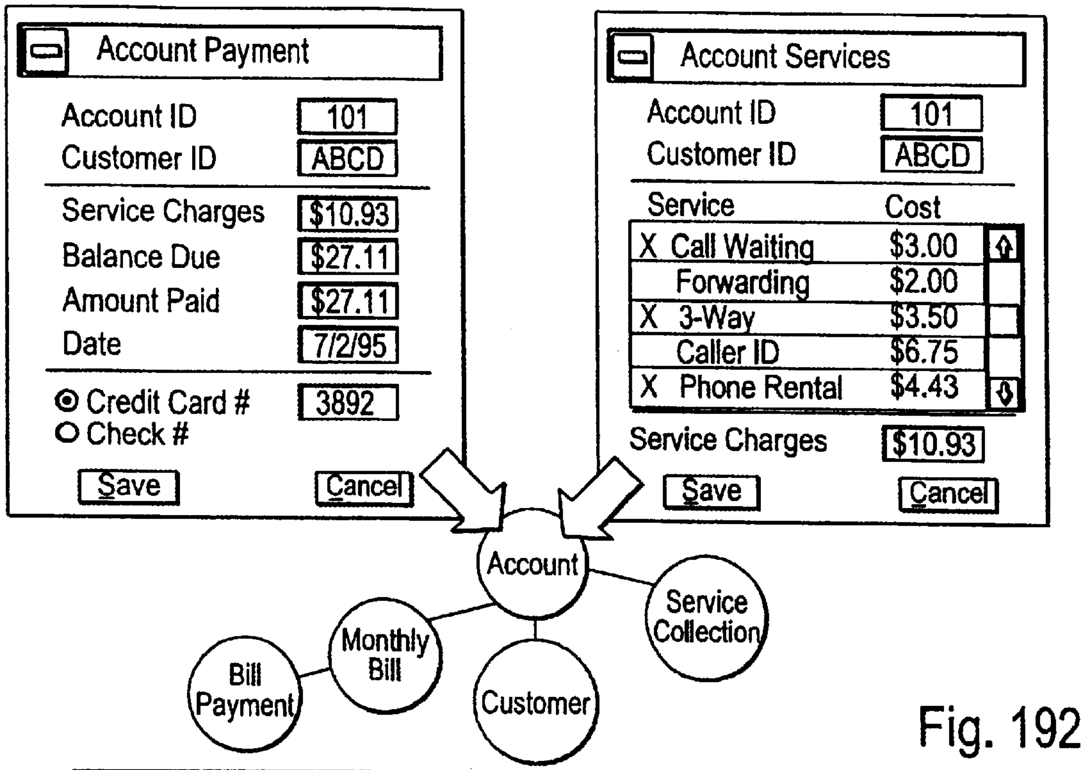
Figure 193:
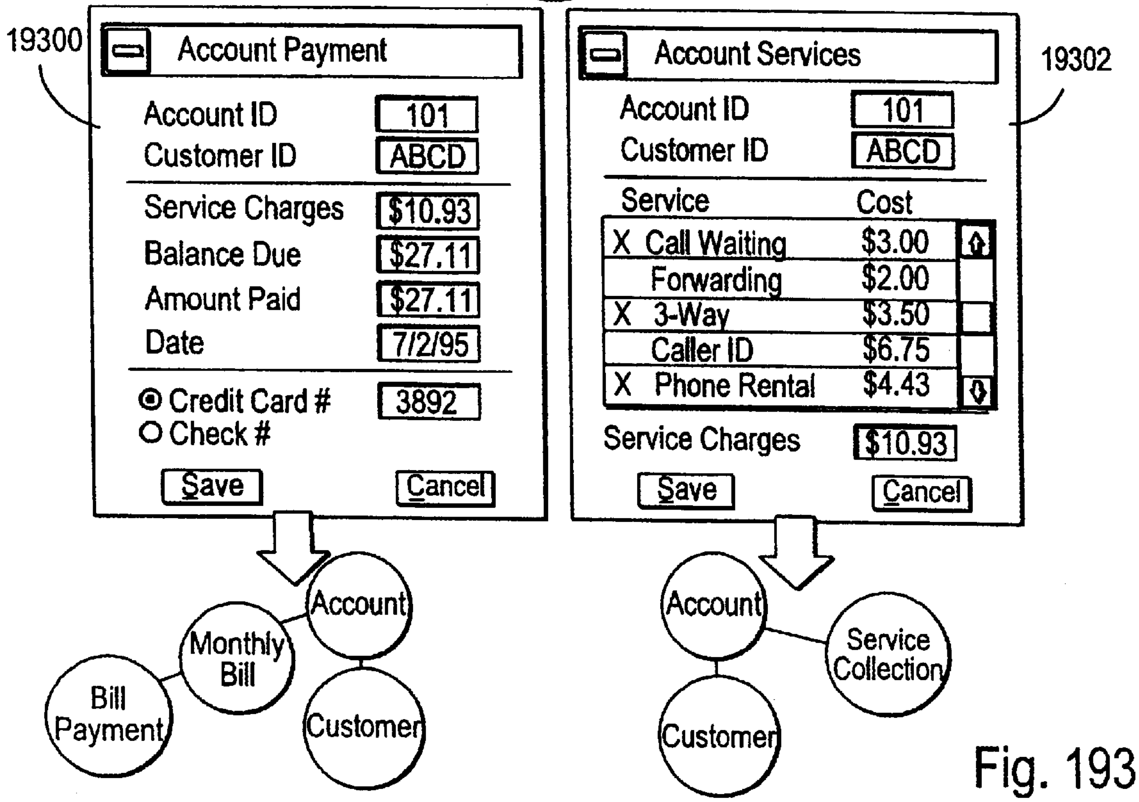
Figure 194:
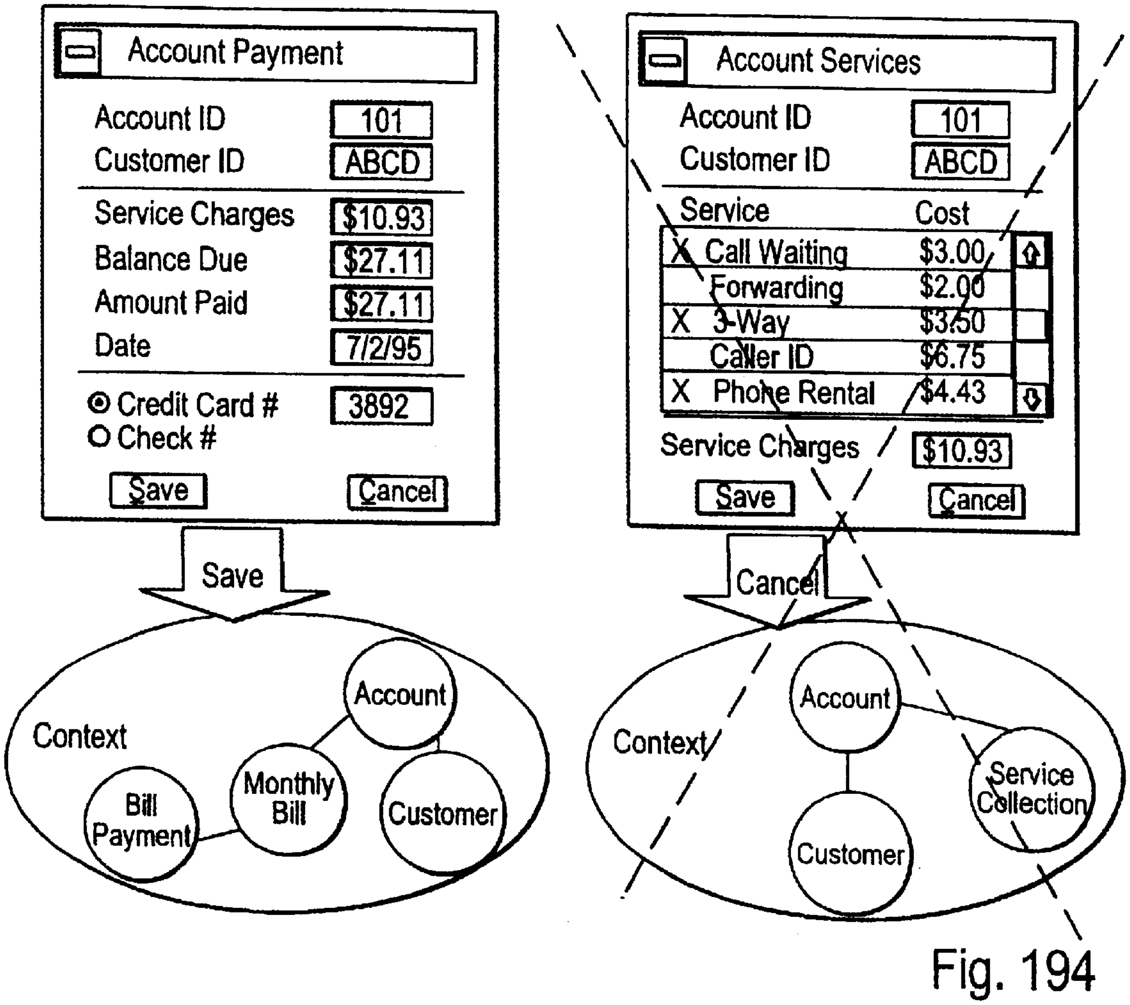
Figure 195:
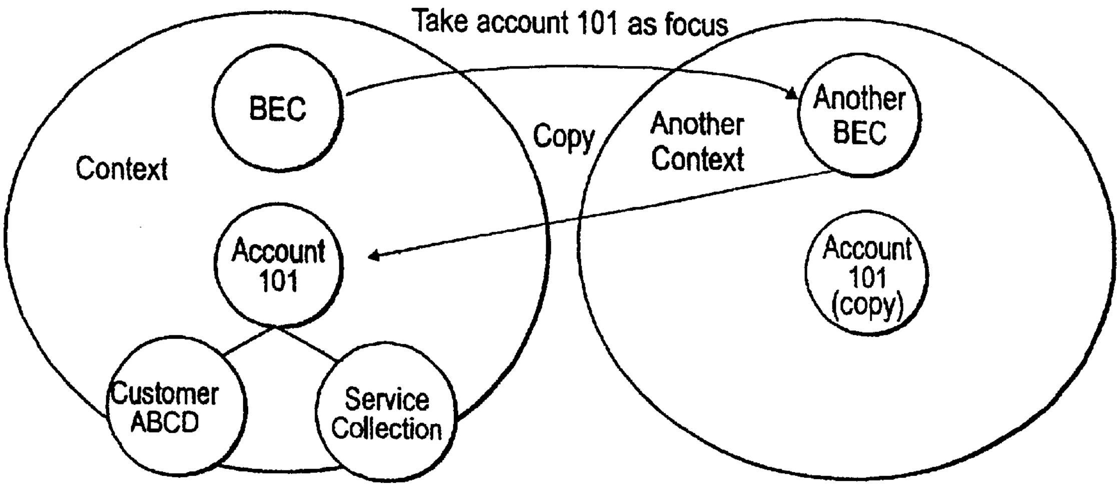

FIG. 131 illustrates a validation rule class diagram;

FIG. 132 illustrates a rule validation interaction diagram;

FIG. 133 illustrates a flowchart for a method for assigning a view to an activity in accordance with an embodiment of the present invention;

FIG. 134 illustrates a manner in which the maintain customer activity operation of the present invention launches its view;

FIG. 135 illustrates the view configurer launching the maintain customer view operation;

FIG. 136 illustrates a flowchart for a method for testing successfulness of an operation having pre-conditions and post-conditions that must be satisfied for the operation to be successful in accordance with an embodiment of the present invention;

FIG. 137 illustrates an operation diagram depicting an example of pre-conditions and post-conditions;

FIG. 138 illustrates a flowchart for a method for detecting an orphaned server context in accordance with an embodiment of the present invention;

FIG. 139 illustrates a Client 1 that has instantiated A and C, deletes C but fails to delete A;

FIG. 140 illustrates a GarbageCollector requesting for interest in context A;

FIG. 141 illustrates a GarbageCollector requesting for interest in context B;

FIG. 142 illustrates a flowchart for a method for creating a common interface for exception handling in accordance with an embodiment of the present invention;

FIG. 143 illustrates how having many different exception types will cause the exception handling logic to grow;

FIG. 144 illustrates that groupings are not always exclusive;

FIG. 145 illustrates a flowchart for a method for recording exception handling requirements for maintaining a consistent error handling approach in accordance with an embodiment of the present invention;

FIG. 146 illustrates a flowchart for a method for minimizing the amount of changes that need to be made to exception handling logic when new exceptions are added in accordance with an embodiment of the present invention;

FIG. 147 depicts a program (i.e., the exception handler of the present invention) with a few try-catch blocks;

FIG. 148 depicts a program (the polymorphic exception handler) with smaller catch blocks;

FIG. 149 illustrates a flowchart for a method for distributing incoming requests amongst server components for optimizing usage of resources in accordance with an embodiment of the present invention;

FIG. 150 illustrates server components receiving service requests;

FIG. 151 illustrates a load balancer mediating the requests of FIG. 150;

FIG. 152 illustrates a flowchart for a method for maintaining a security profile throughout nested service invocations on distributed components in accordance with an embodiment of the present invention;

FIG. 153 illustrates a component interaction diagram showing an interaction between a number of components in a financial system;

FIG. 154 illustrates a user manger/user context relationship diagram;

FIG. 155 illustrates a flowchart for a method for translating an object attribute to and from a database value in accordance with an embodiment of the present invention;

FIG. 156 illustrates that an attribute cannot be saved directly into the persistent store;

FIG. 157 illustrates the use of an Attribute Converter to save an attribute into a database;

FIG. 158 illustrates a flowchart for a method for controlling data in accordance with an embodiment of the present invention;

FIG. 159 illustrates the data retrieval mechanism calls being placed directly within the domain object;

FIG. 160 shows the interrelationship between a database, a persist, and an account;

FIG. 161 illustrates that the database retrieval mechanism is separated from the business object by encapsulating the logic within a data handler;

FIG. 162 illustrates the TiPersistenceStream and TiMapper of an embodiment of the present invention;

FIG. 163 illustrates a flowchart for a method for organizing data access among a plurality of business entities in accordance with an embodiment of the present invention;

FIG. 164 illustrates retrieving data piecemeal;

FIG. 165 illustrates the manner in which the present invention retrieves whole objects;

FIG. 166 illustrates a flowchart for a method for retrieving multiple business objects across a network in one access operation in accordance with an embodiment of the present invention;

FIG. 167 illustrates an example of an implementation of the Multi-Fetch Object;

FIG. 168 illustrates the Fetching of a Household object along with the other related objects using the multi object fetch results;

FIG. 169 is an interaction diagram showing when the multi object fetch is not used;

FIG. 170 illustrates a flowchart for a method for implementing an association of business objects without retrieving the business objects from a database on which the business objects are stored in accordance with an embodiment of the present invention;

FIG. 171 illustrates a flowchart for a method for mapping of retrieved data into objects in accordance with an embodiment of the present invention;

FIG. 172 illustrates an Object Identity Cache in accordance with one embodiment of the present invention;

FIG. 173 illustrates a flowchart for a method for separating logic and data access concerns during development of a persistent object for insulating development of business logic from development of data access routine in accordance with an embodiment of the present invention;

FIG. 174 illustrates a flowchart for a method for providing a warning upon retrieval of objects that are incomplete in accordance with an embodiment of the present invention;

FIG. 175 illustrates an Entity-Based Data Access System;

FIG. 176 illustrates a Retrieving Data Piecemeal System;

FIG. 177 illustrates a Commit and Rollback routine;

FIG. 178 illustrates Nested Logical Units of Work;

FIG. 179 illustrates a flowchart for a method for allowing a batched request to indicate that it depends on the response to another request in accordance with an embodiment of the present invention;

FIG. 180 illustrates a Batching Retrievals and Dependency;

FIG. 181 illustrates the Dynamically Setting Dependency;

FIG. 182 illustrates a flowchart for a method for sending a single message to all objects in a logical unit of work in accordance with an embodiment of the present invention;

FIG. 183 illustrates a Hand-crafted Message Forwarding scheme;

FIG. 184 illustrates a Generic Message Forwarding feature;

FIG. 185 illustrates a flowchart for a method for batching logical requests for reducing network traffic in accordance with an embodiment of the present invention;

FIG. 186 illustrates the manner in which the present invention sends requests independently;

FIG. 187 illustrates a manner in which the present invention registers requests;

FIG. 188 illustrates a flowchart for a method for sorting requests that are being unbatched from a batched message in accordance with an embodiment of the present invention;

FIG. 189 illustrates an Ad Hoc Registration feature;

FIG. 190 illustrates a manner in which the present invention sorts requests by weight;

FIG. 191 illustrates a flowchart for a method for assigning independent copies of business data to concurrent logical units of work for helping prevent the logical units of work from interfering with each other in accordance with an embodiment of the present invention;

FIG. 192 illustrates the MVC Implementation with Global Model;

FIG. 193 illustrates the Separate Models for Separate Business LUWs;

FIG. 194 illustrates the Canceling of one LUW Independently of Another LUW; and FIG. 195 illustrates the Context Copying Protects Context Boundaries.

DETAILED DESCRIPTION OF THE PREFERRED EMBODIMENTS

Figure 1:
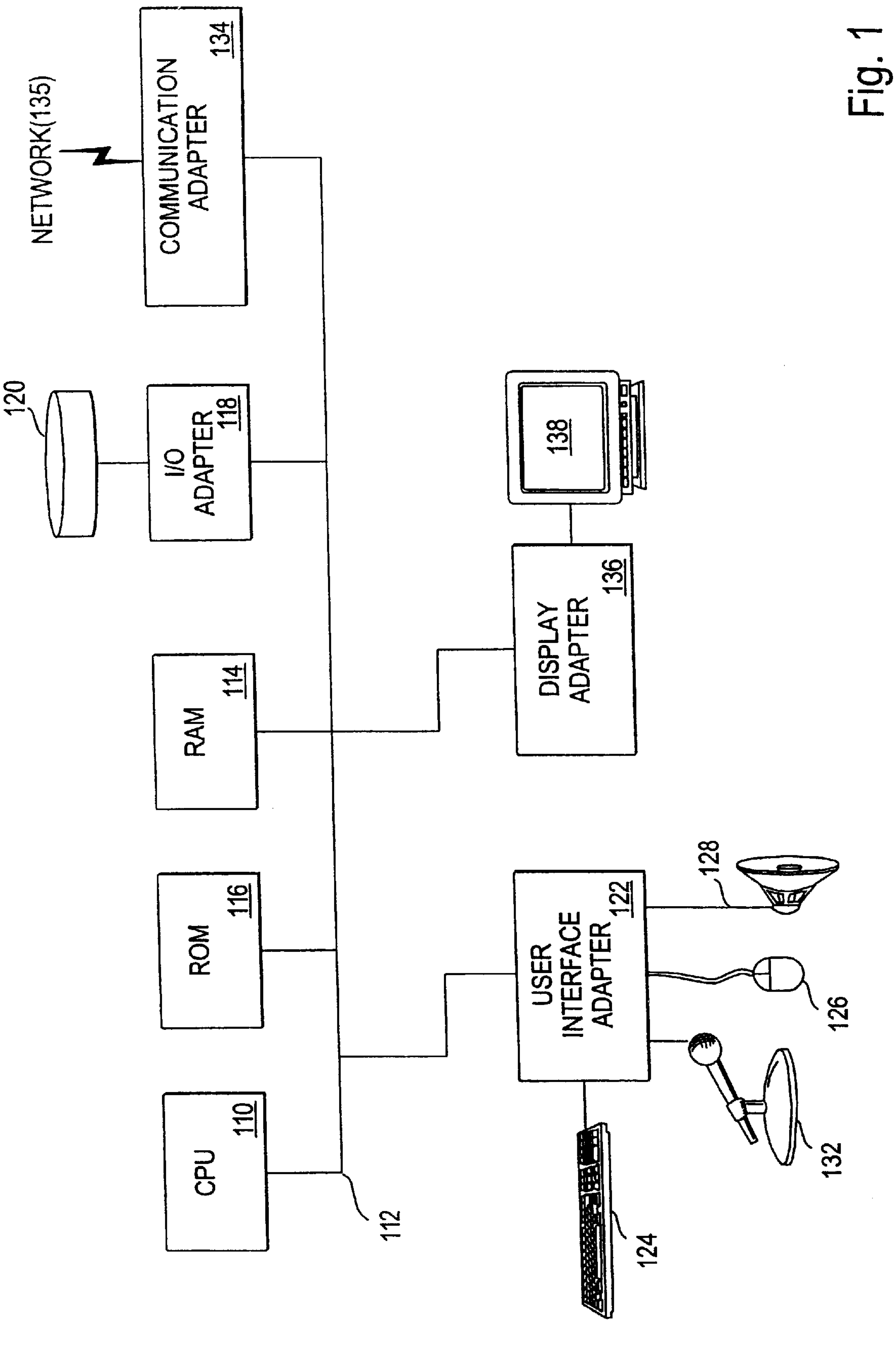
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided. OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time is through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects. OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Bemers-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

- Poor performance;
- Restricted user interface capabilities;
- Can only produce static Web pages;
- Lack of interoperability with existing applications and data; and
- Inability to scale.

Sun Microsystem's Java language solves many of the client-side problems by:

- Improving performance on the client side;
- Enabling the creation of dynamic, real-time Web applications; and
- Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Overview

Architecture Basics

Architecture Overview

What is architecture?

Architecture—whether the word is applied to work with a city skyline or an information system—is both about designing something and about making, building, or constructing something. An architect is literally a "master builder"—from the Greek words archi (primary or master) and tekton (builder or carpenter). In good Greek fashion, however, it would be unthinkable for something to be built without a sound theoretical basis. So architecture involves theory, but there is nothing merely theoretical about it. Conversely, architecture is also eminently practical, but there is nothing merely practical about it. Ideas about form and structure lie behind architecture. Ultimately one must let go of a mindset that tries to separate the designing from the making; they exist together as a whole, and to extract one without the other is to kill the whole.

Architecture also is an engineering discipline. It creates and also depends on a structured manner to analyze and design whatever is to be built. Like all living disciplines, architecture continues to grow and evolve. Engineering discoveries move the field forward. Certain design and engineering principles clearly show themselves to be successful in practice, and these then become repeatable components of additional work. The ability to continue to master each component, as well as the interrelations among components, is a distinguishing characteristic of architecture.

So architecture is about designing and building something from a set of basic components, and also about the interrelations among the components. And it is a discipline whereby all these things come together—materials, space, people—to bring something into being that was not there before.

Although building architects have not always been pleased about it, architectural concepts have influenced other kinds of "building" projects for some time. Over the past twenty years, developers of information systems, for example, have used concepts from the field of architecture not only to describe their work but to execute it, as well.

The use of architectural thinking implies that the work is about creating certain kinds of structures that can be engineered or at least influenced, and that the work can be organized and performed in a structured, systematic manner. Moreover, use of architectural concepts implies that there is something repeatable about the work: architects can create a structure, then use components of that structure again in the future when they come across a similar situation.

An architectural paradigm should not be lightly used. It makes demands. To use architectural concepts implies that clients are ready to do so—that is, that the field is sufficiently mature in its work to see patterns and to organize future work according to those patterns.

Figure 2:
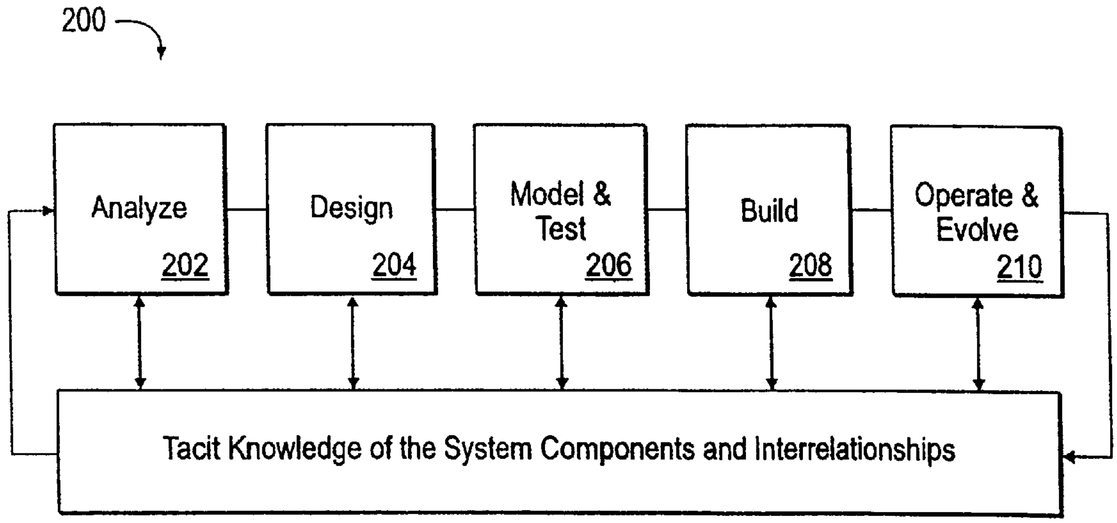
FIG. 2 is a flow diagram illustrating a high level overview of an architecture.

Finally, architecture must be understood as a process 200, not just a thing. This process can be described at a very high level using FIG. 2.

- Step 1: Analyze 202. The architect must begin by listening to and researching the needs of the client. What is the function of the building? What is its environment? What are the limitations set by budget and use?
- Step 2: Design 204. This is a blueprint stage. The architect creates one or several designs showing the layout of the structure, how different spaces fit together, how everything looks from different views, what materials are to be used, and so forth.
- Step 3: Model & Test 206. Not every architectural project has this step, but in many cases, the architect will create a scale model/prototype of the finished product, allowing the client a clearer sense of what the ultimate solution will look like. A model is a kind of test stage, allowing everyone to test the design in a near-real-life setting.
- Step 4: Build 208. This is the actual construction of the building, in general accord with the blueprints and prototype.
- Step 5: Operate and Evolve 210. The building is to be lived in and used, of course, and so an important step is to ensure that the finished product is tended and operated effectively. Architects themselves may not be involved in the operation of their building, but they certainly would be involved in future expansions or evolutions of the building. Stewart Brand's recent text, How Buildings Learn, argues that effective architecture takes into account the fact that buildings "learn": as people live and work in them over time, those people will seek to alter the building in subtle, or not so subtle, ways.

Also, when architects design a building, they have in their heads a primary conceptual framework for all the components that go into that building: the plumbing, the electric, the sewers, stairs/elevators, framing structure, and so forth. The tacit step for an architect is, "Based on my knowledge of the generic components that go into a building, how will these components fit together in this particular building? Which of these components will require special attention because of the functional demands of the building?"

Oxford English Dictionary Definition:

The conceptual structure and overall logical organization of a computer or computer-based system from the point of view of its use or design; a particular realization of this.

Gartner Group Definition:

The manner or structure in which hardware or software is constructed. Defines how a system or program is structured, how various components and parts interact, as well as what protocols and interfaces are used for communication and cooperation between modules and components which make up the system.

Gartner Group sets forth seven general characteristics of successful architectures.

- Delimitation of the problem to be addressed
- Decomposition of the solution to components with clearly assigned responsibilities.
- Definition of interfaces, formats, and protocols to be used between the components. These should be sufficiently clear and robust in order to permit asynchronous development and ongoing re-implementation of the components.
- Adequate documentation to permit compliance by implementors
- An auditing mechanism that exercises the specified interfaces to verify that specified inputs to components yield specified results
- An extendibility mechanism to enable response to changing requirements and technologies
- Policies, practices, and organizational structures that facilitate adoption of the architecture What types of architectures are discussed in the following description?

Figure 3:
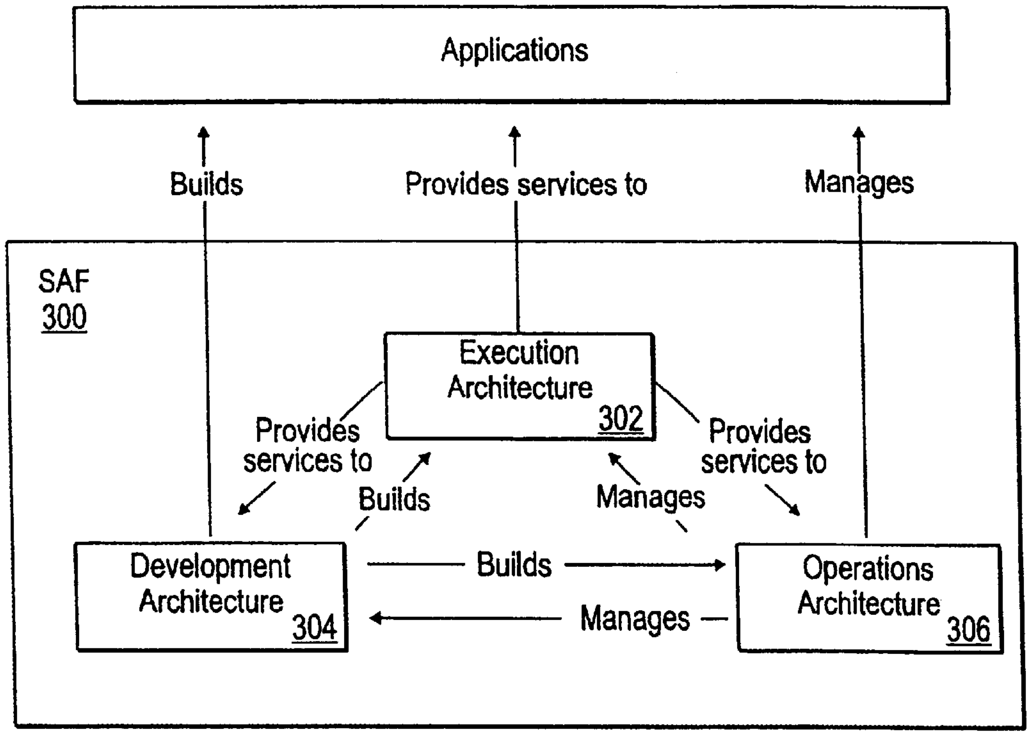
FIG. 3 shows the dependencies of three architecture frameworks.

Standard Architecture Framework (SAF) 300 provides access to the user's thought leadership and architecture frameworks for Execution, Development and Operations environments 302,304,306. For a more detailed discussion on these architectures, please see Standard Architecture Summaries (below). FIG. 3 shows the dependencies of the three architecture frameworks and is described in more detail in the Delivery Vehicle Overview (below).

The following lists are starting points for considering the range of components and activities that must be covered by each architectural view of the system. They are not a definitions of the environments.

Standard Architecture Summaries

Execution Architecture 302

The execution architecture is a unified collection of run-time technology services, control structures, and supporting infrastructure upon which application software runs.

It includes components such as:

Application messaging

Batch processing architecture

Middleware

Reporting

Error handling

On-line architecture

Security

Code/decode

Data access methods

Integrated help

File transfer capabilities

Directory services

Load balancing

Workflow services

State management

“Special” requirements (e.g., workflow, telephony, groupware)

Development Architecture Framework 304

The Development Architecture Framework (DAF) is a unified collection of technology services, tools, techniques, and standards for constructing and maintaining application software.

It includes components such as:

Design/documentation tools

Information repository

Project Management tools

Program Shells

GUI Window painter

Prototyping tools

Programmer APIs

Testing tools

Source code control/build process

Performance test tools

Productivity tools

Design tools

Compiler/debugger

Editor

Refer to the Development Architecture Framework application (referenced above) for more information.

Operations Architecture 306

A unified collection of technology services, tools, standards and controls required to keep a business application production or development environment operating at the designed service level. It differs from an execution architecture in that its primary users are system administrators and production support personnel.

It includes components such as:

Job scheduler

Software distribution

Error monitor

Data backup and restore

Help desk

Security administration

High-Availability

Hardware management

Performance monitors

Startup/shutdown procedures

Report management tool

Disaster Recovery

Network Monitoring Tools

Cross Platform Management Tools

Considerations—All Environments

To ensure that you are asking the right questions about the technology architecture, you must refer to the Architecture Checklist (available from the Content Finder). Questions will include:

For all technology components, have the following characteristics been addressed:

Performance according to specifications?

Reliability of operation?

Ease of operation?

Maintenance requirements?

Ability to interface with other components, particularly those from other vendors?

Delivery schedule to provide adequate pre-conversion testing?

Backup procedures?

Vendor reliability and financial stability?

Future proofing against business change?

Have the versions of system software been live at another site for at least six to twelve months?

This time frame varies by product. Have reference sites been verified?

What is a framework?

It is a major challenge to design the complex infrastructure that is needed to satisfy the requirements of today’s distributed, mission-critical applications. As such, it is helpful to have an inventory of the components that may be required for the design, build, installation and operation of systems. It is also helpful to have an understanding of how the components fit together conceptually.

A Framework should be thought of as a conceptual structure used to frame the work about to be done. It should be used as a thought trigger or as a completeness check. You cannot build from a framework directly but instead should use it as a starting point for understanding and designing.

Frameworks are used to help practitioners understand what components may be required and how the components fit together. Based on the inventory of components and the description of their relationships, practitioners will select the necessary components for their design. An architect extracts components from one or more Frameworks to meet a specific set of user or application requirements. Once an architecture has been implemented it is often referred to as an architecture or an infrastructure.

The scope of what a framework addresses can vary widely. One framework, for instance, may outline the components for a technical infrastructure in its entirety whereas another framework may focus explicitly on the network. A thorough understanding of a framework’s scope is crucial to its use during the design phase of a project.

It is also important to understand whether the framework is vendor specific in nature (proprietary) or whether it is available for use by a large number of vendors (open).

Why is architecture important?

One has seen the benefits of an architectural approach to information systems development: better productivity and less reinvention of the wheel. An architecture provides a completeness check, ensuring that all relevant components of a possible solution have been considered. It ensures consistent, reliable, high-quality applications. It gives everyone—the developers and their clients—a common framework and common language with which to talk about the work.

Perhaps most important, it allows developers to leverage successful solutions when performing additional work. Architecture involves repeatable concepts, and so it reduces the time and cost by which a solution is delivered.

Some of the specific technical benefits of a good architecture are:

Simplified Application Development

Provides common set of application services. Removes application programmers from the complexities of the underlying technology and development tools, allowing less experienced developers to be more productive Quality Usually more experienced developers implement the often complex technical components in an architecture. These components are then reused, avoiding duplicated complex logic in the applications. Iterations during design, implementation and testing often result in refinement and improvement of the architecture components. All users of these components benefit from such improvements, reducing the risk of failure and ensuring better overall quality in the final application.

Integration

An architecture often ties together disparate software, platforms and protocols into one comprehensive framework.

Extensibility

The architecture is established by experienced personnel who can predict with some confidence whether a given architecture will fulfill current and future requirements. Code extensions are easily integrated. A well-balanced architecture consists of the "right" components, where the components are tied together by simple interrelationships, since complex relationships increase the architecture's complexity faster than modularization can reduce it.

Location Transparency

Divorces application from the details of resource location. This is however not always true or required. For performance reasons designers and developers still often need to be aware of process and data locations.

Horizontal Scaling

Assist in optimal utilization of existing infrastructure resulting in increased application performance and stability Isolation An architecture can be used to isolate the applications from particular products. This ensures that products can more easily be replaced later. This characteristic can be important if there is risk associated with a product's or product vendor's future, or the rate of change in a particular technology area is particularly high. An evident example is looking back at changes in past user interface standards. Applications that did not separate user interface logic from business logic, had to be completely rewritten to take advantage of new user interfaces, such as MS Windows and more recently Web browsers.

Portability

Increases portability and reusability within and across different platforms or protocols.

The use of architecture frameworks during analysis and design can reduce the risks of an IT solution. It should improve development productivity through reuse, as well as the IT solution's reliability and maintainability.

One key challenge for today's IT managers is the need for change. Architectures provide a basic framework for major change initiatives. Clients' core business is performed by strategic applications that will most likely require frequent and rapid development to handle changes in technology capability and business requirements. A properly defined and intelligently developed architecture delivers an infrastructure on which clients can build and enhance applications that support their current and future business needs. This is how one helps clients to manage change.

A key benefit of an architecture is that it divides and conquers complexity. Simple applications benefit less from architecture than complex ones do; fewer decisions are needed in these cases, and fewer people need to know about them. During maintenance, a poorly architected small application is tolerable because it is still relatively easy to locate a fault and to anticipate the side effects of correcting it. Conversely, complex applications are more difficult to understand and to modify. Complexity is reduced by subdividing the application in layers and components, each layer having a specific functionality. The layers are strongly cohesive and decoupled: A given layer does not need to know the internals of any other layer.

The following quote from a recent study of Large Complex Systems (LCS) stress the importance of a stable architectures in large systems:

Successful delivery of an LCS solution depends on the early definition and use of common data applications and technology architecture.

There is a high failure rate when the architecture is not defined, stabilized, and delivered early in an LCS effort.

All significant LCS efforts involved the use of common or shared architectures. A successful effort, however, depended on early definition and delivery of a stable common architecture.

Significant changes to the data, application, or technology architectures had severe negative effects on the timeliness of project deliverables, and on the reliability of what was delivered.

PROJECT1 and PROJECT2, for example, experienced unusual circumstances. While the client evaluated whether to proceed, one defines and designs the architecture. As a result, the teams had nine months to define, design, and begin implementation of required data, applications, and development architectures. Although in each case these architectures continued to evolve with business and technology needs, they remained largely consistent with the initial design. This consistency proved to be essential to the timely delivery of the applications.

At PROJECT3 and PROJECT4, on the other hand, the architectures went through major evolutions as the developers created the applications. The overall result was that those efforts experienced delays relative to plan.

Although it is not realistic for every project to have nine months to define required architectures, it does suggest that early focus on definition and design of the architectural components is essential.

The risk of failure is greatly increased if essential architectures are being defined or changed significantly in parallel with application development.

What are the benefits of an architecture?

The benefits derived from a technology architecture may allow a user to be in the forefront of the development of many leading edge business solutions. The investment in a reliable and flexible architecture can result in one or more of the following:

- Preservation of investments in applications and technology by isolating each from changes in the other (e.g. upgrades in hardware or third-party software do not impact applications).
- Leveraging scarce technical skills (e.g. the need for people with detailed skills in a specific communications protocol or aspects of SQL).
- Enhancements in productivity, flexibility and maintainability because common and often complex and error-prone components (e.g. error handling or cross-platform communications) are created within the architecture, and then reused by all applications.
- Increases in the predictability of application performance because the run-time behavior of common components is familiar and consistent.
- Serves as a construction blueprint and discussion agenda and ensures consistency across systems. This can have a big impact on the operability and maintenance of the delivered applications.

What is an architect?

Architects must have deep understanding of a project, business and/or technical environment. Architects are involved across business integration projects, managing their complexities and intricacies.

How advanced should an architect be?

It is easy to go overboard when designing and implementing a technology architecture. Ideally the architecture should be a thin, well-defined layer that ensures development productivity, maintenance flexibility, performance and stability.

A key issue is maintainability and operability. Keep in mind that others may have to understand the rationale behind the architecture design in order to correctly maintain it.

Architecture logic can quickly become very abstract and hard to maintain by others than those who built it. A carefully designed architecture can quickly be destroyed by maintenance personnel that do not understand how it was designed and developed.

You should make your architecture as light-weight as possible only addressing the requirements that drive it. Avoid "nice to have" flexibility and additional levels of abstractions that are intellectually interesting but not strictly required.

Delivery Vehicle Overview

A Delivery Vehicle is an integrated collection of technology services that supports an application style, implemented on a distinct architecture generation.

Application Style

An application style defines a unique class of processing type, which is used by applications, and thus end-users. Delivery Vehicle Reference set of Application Styles include batch, on-line transaction processing, collaboration, data warehouse, knowledge management and integration.

The Application Style is the primary dimension of a Delivery Vehicle, and most people use the terms Application Style and Delivery Vehicle to mean the same thing.

A key goal with a delivery vehicle is that it can be reused across many applications. It is still part of the Technology Architecture, not involving application specific logic. An Application Architecture on the other hand, will be specific for a particular application.

Architecture Generation

An architecture generation is a broad classification scheme for placing technology components within a technology era. Delivery Vehicles are physically implemented on a distinct architecture generation. Examples of architecture generations include host-based, client-server and netcentric.

Note: Defining a clear line between what falls under the client/server and a Netcentric technology generation is difficult; typically different people tend to have different opinions. Technologically, the Netcentric generation may be an evolution of the client/server generation. In the context of the Delivery Vehicles, the technology generation discussion may be intended to be a logical discussion that aims to highlight the new business capabilities enabled by new technologies. So for example, there could be a PowerBuilder application executing from a Web Browser using a plug-in. Whether this is called a client/server or Netcentric application is up to the reader. When presenting technology architecture information to clients, focus on the business capabilities that are offered by technologies rather than just on definitions for what is client/server or what is Netcentric technology.

Delivery Vehicle Matrix

Figure 4:
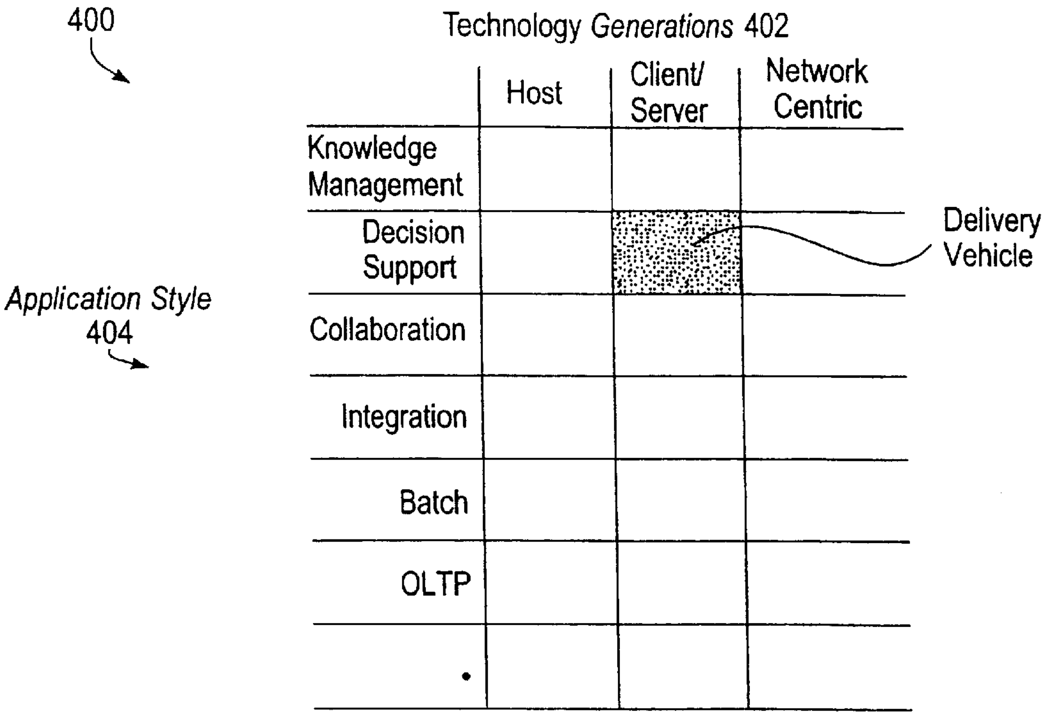
FIG. 4 illustrates a delivery vehicle matrix.

FIG. 4 illustrates a delivery vehicle matrix 400. One way of looking at a Delivery Vehicle is therefore as an intersection of a technology generation 402 and application style 404. This is the presentation method currently adopted for navigation in SAF.

Delivery Vehicle Cube

Figure 5:
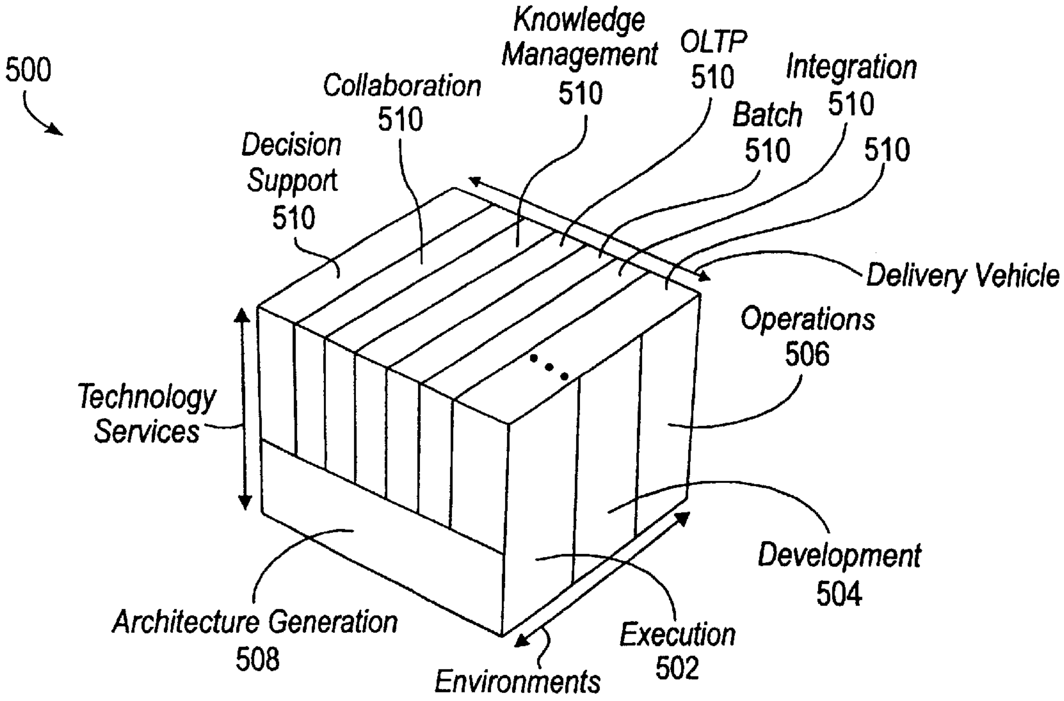
FIG. 5 illustrates a Delivery Vehicle Cube.

The Delivery Vehicle Cube 500, illustrated in FIG. 5, represents the "full" picture of what a Delivery Vehicle is. In addition to the Application Styles and the Technology generations it introduces a distinction between Execution, Development and Operations Environments 502,504,506.

The cube has the following dimensions, or cube "faces:

1. On the bottom left face of the cube are the core technology components and services 508 that are common across all delivery vehicles.

These core services may be implemented using one or several of the Technology Generations; currently Host, Client/Server or Netcentric. Most major enterprises have legacy systems that include both host based and distributed client/server applications. Netcentric applications may extend the mix of system technologies.

2. On the top left of the cube are the technology components 510 that are required to support a distinct delivery vehicle.

These components extend the technology architecture with services that are specific for each distinct delivery vehicle. Some of the components may extend some of the core services.

3. On the right face of the cube are the three environments each delivery vehicle will affect: execution, development and operations 502,504,506.

Both the core services and the delivery vehicle extensions require support in all three environments. The cube illustrates that different delivery vehicles may require different extensions to a core development or operations environment, not just the execution architecture. A mission-critical high-volume transaction delivery vehicle may require special performance tuning tools in the development architecture, as well as real-time monitoring tools in the operations architecture.

Also different technology generations may require special services in all three environments. When working in a multi-platform environment, there may be duplicated services across platforms. This usually complicates development, operations and execution architectures and may require special focus on providing an integration architecture.

The following figure illustrates the relationship between the three environments and the overall business system:

Typically, one may focus on engagements regarding the execution environment. The main dependency between these three environments is that the execution architecture to a large degree drives the requirements for the development and operations architectures. For example if a heterogeneous, distributed execution architecture is selected, both the development and operations environments must reflect this.

How can the delivery vehicle framework be useful?

Refocus users and clients toward business solutions and away from technology issues.

Help you link architecture planning deliverables to delivering.

Create an enterprise-wide view of the business capabilities enabled by technologies.

Provide new architecture frameworks needed today to meet you're a user's client's business needs.

Provide guidance to define what architecture best meets you're a user's client's business needs.

Provide standard architecture frameworks and best practices to build these architectures.

During a high-level architecture design, help the user identify architecture services the user will need to address, by providing a logical level discussion one can use to assess types of base services and products needed for the specific situation.

When Delivery Vehicles are implemented, they reduce time to implement business solutions by providing "Starter Kits" architectures.

When Delivery Vehicles are implemented, they leverages technology across the business by:

reducing operations and maintenance costs by limiting the number of different technologies and skills required to support these technologies.

reducing technology costs for execution & development.

Note: The Delivery Vehicle Framework presents a way to organize technology architecture information. When presenting this type of contentclient, one may need to tailor the information they present based on the client's background and the terminology they are familiar with.

Technology Generation Selection

Introduction

Figure 6:
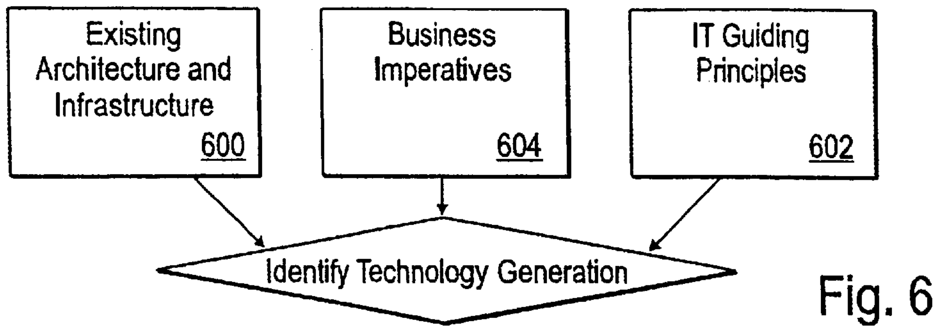
FIG. 6 is a flow diagram depicting considerations to be taken into consideration when identifying the core technologies to be used in an architecture.

This section should assist an architect in understanding the characteristics of, and the implications from selecting, a specific technology generation. The strengths and weaknesses of each technology generation should be understood when planning and designing a system. When identifying the core technologies to be used in an architecture, a view of the client's existing IT architecture 600, guiding principles 602 and business imperatives 604 should be taken into consideration, as depicted in FIG. 6.

It is important to realize that a distinct, static division does not exist between the different technology generations. It is possible that an architecture may consist of components from more than one generation.

The goal should be to understand the pros and cons of the different technology options available for each component and to select the most appropriate one based on the client's requirements.

It is becoming more important to leverage existing systems and integrate them with new applications. A typical scenario can involve mainframe legacy systems acting as servers in a client server architecture, application servers being accessed from both traditional GUI clients built in Powerbuilder and Visual Basic and from Web-based front ends accessing the application servers via a Web-server.

General Considerations

From a technology point of view a new custom-made application should generally use the most recent Architecture Generation to assure that the application will live longer by better being able to adapt to future changes.

This implies that most applications should ideally be based on a Netcentric Architecture, rather than on a traditional client/server or a host-based architecture.

However choosing a generation is not just a technical decision. Often key technology architecture decisions are made as a result of factors which are completely non-technical in nature, such as financial factors, internal and client politics (say no more), and implementation/operational considerations.

When deciding whether to employ a Netcentric solution, i.e. incorporating Web-based user interfaces and Internet application styles, keep in mind that these technologies are not a panacea and should be used only when there is solid business reason. They require new investments in skills, tools, development and operations processes. Due to the relative immaturity of tools and products, they also represent additional risks both in technical terms, such as performance and reliability, and in strategic terms, such as vendor and product quality and stability.

Regardless today each project should always consider the prospect of utilizing Netcentric technologies. It is important to evaluate whether the application can benefit from a Netcentric style implementation immediately or in the future.

Even if a traditional client/server approach (e.g. using Visual Basic or PowerBuilder) is decided upon, the use of Netcentric concepts to produce significant reductions in software packaging and distribution costs should be considered. Such concepts include three- or multi-tier architectures with more business logic residing on server, flexible security architecture, and user interface concepts that can be ported to a Web Browser at a later stage.

A Netcentric architecture will usually still support development of client/server applications. The opposite is not often true since traditional client/server systems usually keep a substantial portion of the business logic on a fat client, while Netcentric architectures still favor keeping most business logic at the server side. Also Netcentric architectures tend to be more loosely coupled than (the still dominant two-tier) client/server systems.

The following sections identify the main characteristics associated with a Netcentric, Client Server or Host based technology generation. This list should in no way be considered complete and exhaustive but is included as a starting point from which the identification process may begin.

Network Centric Architecture Generation

Figure 7:
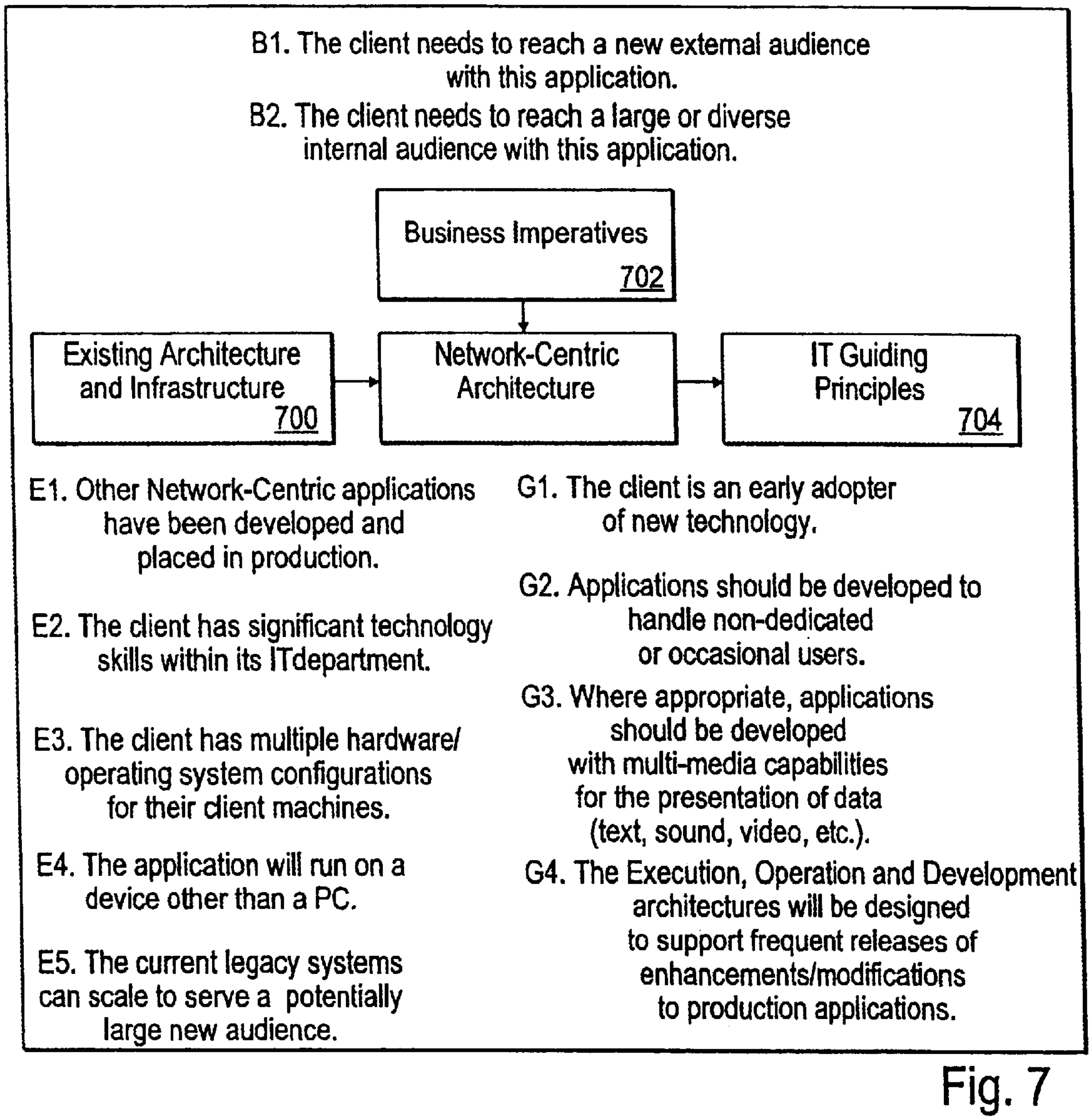
FIG. 7 is a chart that can be utilized to determine whether to use Netcentric technology.

If, based upon one's client's requirements, most of the statements in FIG. 7 are true, one should consider an application based upon the Netcentric technology generation.

The following details the importance of each of the statements in FIG. 7 and should assist one in identifying the appropriate answer for the specific client engagement.

Existing Architecture and Infrastructure 700

E1. Other Netcentric applications been developed and placed in production.

The user community is often less resistant to accept the use of new technology to address changing business drivers if they are not completely unfamiliar with the characteristics of the technology. If an application based on a Netcentric architecture has already been successfully piloted or deployed, acceptance of additional systems will be eased.

E2. The client has significant technology skills within its IT department.

This is especially important if the client plans on developing or operating the application themselves. A significant investment in training and changes to internal organizations may be necessary for successful deployment of this type of system. The client must have a culture that supports change. Some organizations are very conservative and strong, making it difficult to deliver a successful project using new technology.

E3. The client has multiple hardware/operating system configurations for their client machines.

In traditional client/server environments, distributing an application internally or externally for an enterprise requires that the application be ported, recompiled and tested for all specific workstation operating systems. Use of a Universal Client or web-browser may eliminate many of these problems by providing a consistent and familiar user interface on many different operating systems and hardware platforms.

E4. The application will run on a device other than a PC.

The momentum of the Internet is putting a lot of pressure on vendors of various devices to be web-enabled. Having the Internet infrastructure in place makes it more feasible for vendors to create new physical devices from which electronic information can be accessed. For example, Web televisions are gaining momentum. Now users can access the Internet from a television set. Network Computers, thin-client devices that download and run applications from a centrally maintained server are generating a lot of interest. Also, users want to have access to the same information from multiple physical devices. For example, a user might want to have access to his/her e-mail from a cellular phone, from a Web TV or their portable PC.

E5. The current legacy systems can scale to serve a potentially large new audience.

Expanding the user community of a legacy host or client/server system by including an audience which is external to the company can result in dramatic increases in system usage. The additional demand and increased usage placed on existing legacy systems is often difficult to estimate or predict. Analysis must be conducted to ensure existing legacy systems and infrastructure can absorb this increase.

Business Imperatives 702

B1. The client needs to reach a new external audience with this application.

This is probably the main reason for selecting a Netcentric architecture. Through appropriate use of a Netcentric architecture it is often possible to gain exposure to new customers and markets. The client can often achieve significant competitive advantage by providing new services and products to its customers. Also this new channel makes it technically possible to develop a new generation of "market-of-one" products, where each customer can repeatedly and easy customize a product according to own preferences.

B2. The client needs to reach a large or diverse internal audience with this application.

Configuration management of traditional client/server applications, which tend to be physically distributed across both the client and server, is a major issue for many corporations. The software distribution of such applications which are packaged as one large or a combination of a few large executables makes minor updates difficult for even a small scale user population. Every time an update is made, a process must be initiated to distribute new code to all client machines. The browser-centric application style offers an alternative to this traditional problem of distributing functionality to both internal and external users.

IT Guiding Principles 704

G1. The client is an early adopter of new technology.

Implementation of a Netcentric architecture can help the client realize a number of business benefits. However, the introduction of new technology into an organization does have inherent risks and can result in a significant amount of change. The client should have a culture which can embrace these necessary changes.

G2. Applications should be developed to handle non-dedicated or occasional users.

Non-expert users need a simple to use and familiar interface in order to be able to use the application. As people grow accustomed to Web-browsers, this will be their preferred user-interface. The consistent interface provided by the Web-browsers will help reduce the learning curve necessary for becoming familiar with new applications.

G3. Where appropriate, applications should be developed with multi-media capabilities for the presentation of data (text, sound, video, etc.).

The ability to digitize, organize, and deliver textual, graphical and other information (e.g., video, audio, etc.) in addition to traditional data to a broader audience, enables new methods for people and enterprises to work together. Netcentric technologies (e.g., HTML documents, plug-ins, Java, etc.) and standardization of media information formats enable support for these types of complex documents and applications. Network bandwidth remains a performance issue. However advances in network technologies and compression techniques continue to make richer media-enabled documents and applications more feasible on the Web.

G4. The Execution, Operation and Development architectures will be designed to support frequent releases of enhancements/modifications to production applications.

It is imperative that companies in the current market place be able to quickly modify their business processes in order to address changes in the industry.

A Netcentric architecture simplifies frequent software releases for both internal and external users of the systems.

Client/server Network Generation

Figure 8:
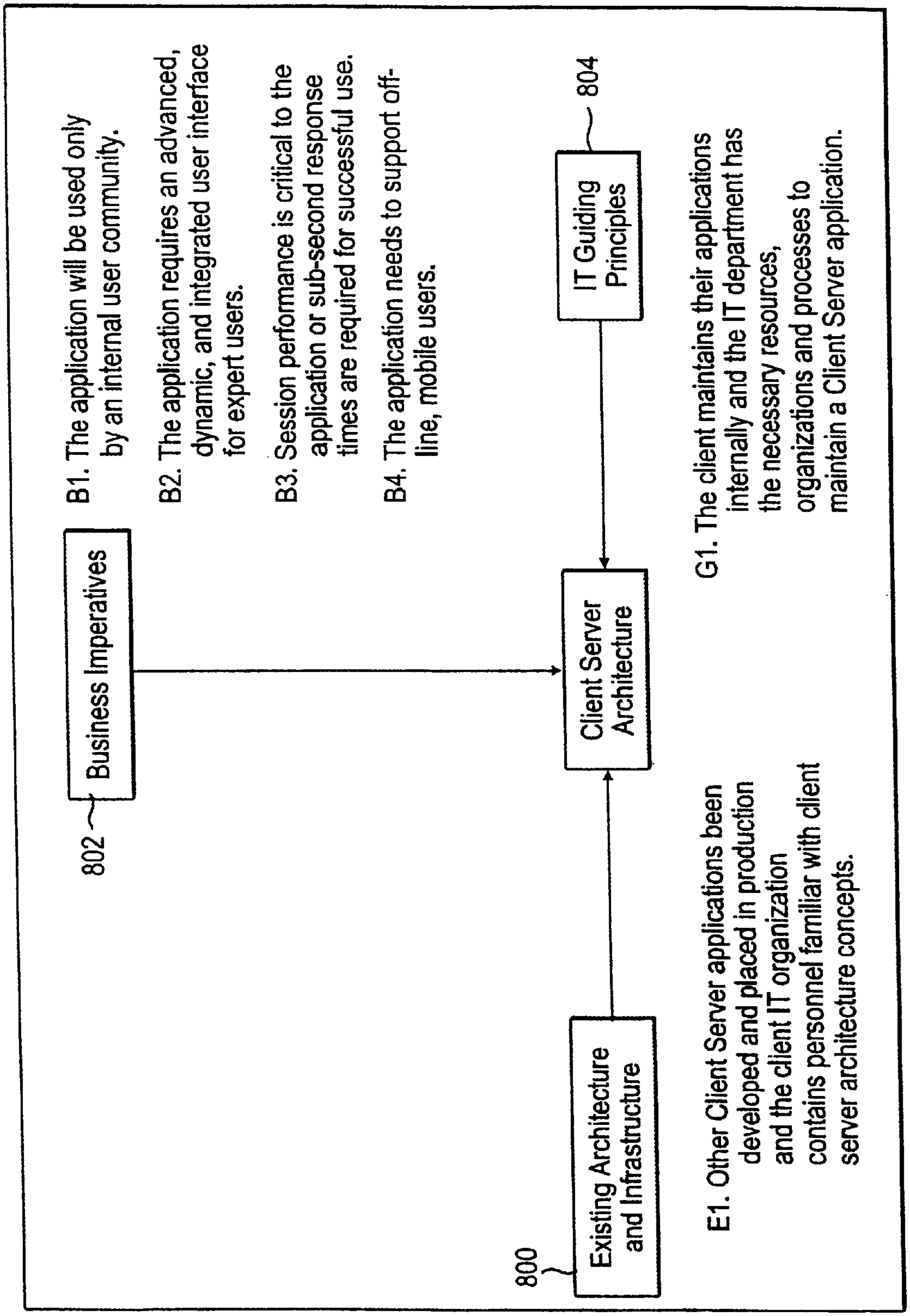
FIG. 8 is a chart that can be utilized to determine whether to use Client Server technology.

If, based upon a client's requirements, most of the statements of FIG. 8 are true, one should consider an application based upon the Client Server technology generation.

The following section details the importance of each of the statements found in FIG. 8 and should assist one in identifying the appropriate answer for your specific client engagement.

Existing Architecture and Infrastructure 800

E1. Other Client Server applications been developed and placed in production and the client IT organization contains personnel familiar with client server architecture concepts.

As with any new technology, there is a learning curve related to attaining client server development skills. The development process is often much more efficient when familiar tools and environments are used. The introduction of new technology can also create instability in the operations environment. Client/server systems still represent a new technology to many IT departments.

Business Imperatives 802

B1. The application will be used only by an internal user community.

Software distribution is a concern for traditional client server computing environments due to the fact that executable and data files need to reside on the client hard drive. Distribution to a user community outside of the client's organization is even more difficult to implement and manage and will probably be limited to a few key business partners.

B2. The application requires an advanced, dynamic, and integrated user interface for expert users.

State of the art 4GL and 3GL development languages will support advanced user interfaces which require a significant degree of context management between fields and windows. Web-based user interfaces do not support such interfaces well yet.

B3. Session performance is critical to the application or sub-second response times are required for successful use.

Client server applications can provide response times necessary to support transaction intensive mission critical systems. Application logic and business data can be distributed between the client and server for optimal efficiency. Web-based interfaces still have an inherent overhead due to the connectionless communication and constant downloading of data, formatting information and applet code.

B4. The application needs to support off-line mobile users.

Mobile computing is becoming more prevalent in the work place, therefore, connectivity to a server can not be assumed for all user classes. A client server architecture allows for the distribution of application logic and/or data between the server and client. Replication of data and logic is usually necessary for applications that are run on portable computers.

IT Guiding Principles 804

G1. The client maintains their applications internally and the IT department has the necessary resources, organizations and processes to maintain a Client Server application.

Introduction of a Client Server application to a company's production environment can require a great deal of change to the Execution, Operations and Development architectures required to develop, run and support the production systems. Before a Client Server application is developed, it is important that the client identify how a system of this type will fit within the company's strategic technology plan.

Host Architecture Generation

If yclients business and technical requirements meet the following system characteristics, you should consider an application based upon the Host technology generation.

Figure 9:
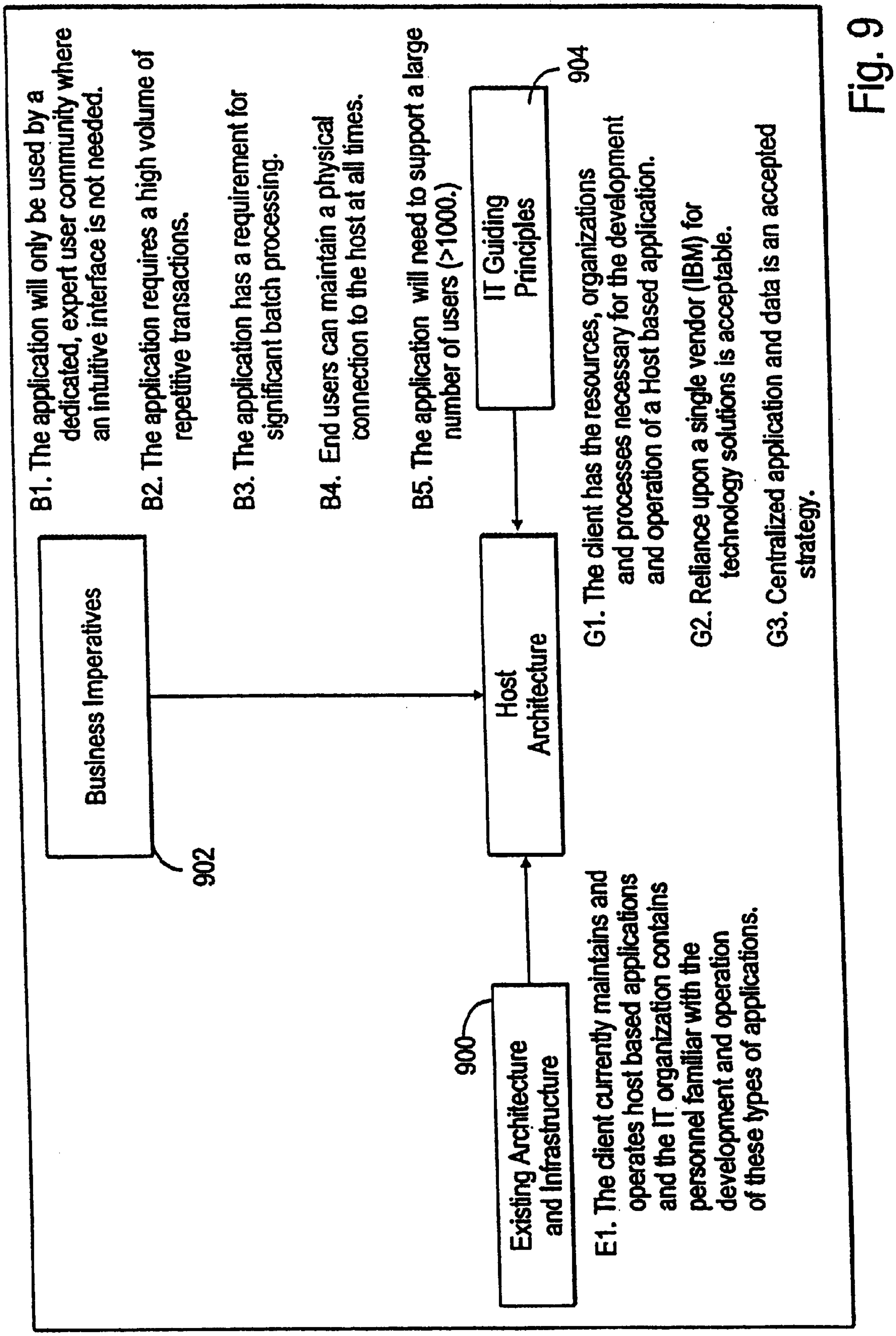
FIG. 9 is a chart that can be utilized to determine whether to use Host technology.

The following section details the importance of each of the statements found in FIG. 9 and should assist you in identifying the appropriate answer for your specific client engagement.

Existing Architecture and Infrastructure 900

E1. The client currently maintains and operates host based applications and the IT organization contains personnel familiar with the development and operation of these types of applications.

Few organizations introduce solely host based production systems. Usually the infrastructure for this type of systems already exists. New development is uncommon, typically existing legacy systems need to be extended.

Host systems usually have a mature and stable operations environment. Note that mainframe expertise may be expensive and in high demand Business Imperatives 902

B1. The application will only be used by a dedicated, expert user community where a GUI is not needed.

A dedicated work force with low turnaround, skilled in the use of character based 3270 applications, eliminates the need for a GUI interface.

B2. The application requires a high volume of repetitive transactions.

The high degree of processing power provided by mainframes allows for the development of applications with very high performance requirements.

B3. The application has a requirement for significant batch processing.

Mainframes are probably still the most powerful platforms for large scale batch processing. Mature tools exist for scheduling, recovery/restart, sorting, merging, and moving large sets of data.

B4. End users can maintain a physical connection to the host at all times.

Physical connection to the host is required for use of the applications. Methods of mobile computing with distribution of data or business logic is not possible.

B5. The application will need to support a large number of users (>1000).

The processing power of today's mainframe lends itself well to the development of large scale, mission critical applications with a large user base.

IP Guiding Principles 904

G1. The Client has the resources, organizations and processes necessary for the development and operation of a Host based application.

Before a Host based application is developed, it is important that the client identify how a system of this type will fit within the company's strategic technology plan.

G2. Reliance upon a single vendor (IBM) for technology solutions is acceptable.

Selection of a host based architecture inherently locks the client into dependence upon one vendor for its technology solutions. While IBM is a reputable, stable company it may be important to ensure that the client's long term business strategy will be supported by IBM's technology vision and direction.

G3. Centralized application and data is an acceptable strategy.

A pure host based architecture eliminates the possibility of distributing data or business logic to the client. This removes some of the application performance benefits which can be seen by a distribution strategy, however, centralized access to the business logic and business data can improve operational stability and lower costs.

A current trend is to transform mainframe based legacy systems into data—and application servers in a multi-tiered client/server or Netcentric architecture.

Overview of the Frameworks

One may ask: what frameworks one should use? This portion of the specification should help one understand:

when the various frameworks in SAF can be useful how the frameworks are related

Frameworks Related to Delivery Vehicles

Most of the frameworks in SAF address various a spects of Delivery Vehicle architectures.

SAF provides access to the user's thought leadership and architecture frameworks for Execution, Development and Operations environments. Very briefly, SAF covers:

The Core Execution Architecture frameworks for the different architecture generations (Host, Client/Server and Netcentric). Most users will primarily use the Netcentric framework.

The Execution Architecture Extensions. This is a collection of the most common delivery vehicles that are built for clients. These frameworks extend the core frameworks with services specific for a particular delivery vehicle.

The Development Architecture Framework. Should help one establish and operate a high-quality development environment.

The Operations Architecture Framework. Should help one establish and operate a high-quality operations environment.

To learn more about what Delivery Vehicles are, see the Delivery Vehicle Overview section. This page explains the relationships between Architecture Generations, Application Styles and Environments.

Framework Extensions and Other Frameworks

The remaining frameworks in SAF are special purpose frameworks that may not directly fit into the current Delivery Vehicle definition.

They may be extensions to the delivery vehicle frameworks such as Call Center, Mobile, eCommerce Application Framework, Middleware or Component Technologies.

Framework Recommendations

The frameworks in SAF address different aspects and areas of technology and application architecture. No single framework may cover this scope. Depending on the phase of one's project and the type of applications one's project will deliver, one may need to use different specialized frameworks.

Most implementations today may begin by considering the Netcentric Execution framework, then adding extensions for the delivery vehicles or specific technologies that your project will use. Keep in mind, however, the Development and Operations frameworks. Also, remember that some architectures will need to be built on multiple frameworks, most likely involving the Integration framework to bridge between them.

This section lists all the frameworks currently available in SAF, indicates when they may be useful, and how it relates to other frameworks:

Netcentric

When is it useful?

This framework constitutes the core of a modem netcentric and client/server execution architecture. It will help one plan and design one's architecture by understanding what components a typical netcentric architecture should consist of.

Netcentric Architecture Framework

Framework Overview

Introduction

Figure 10:
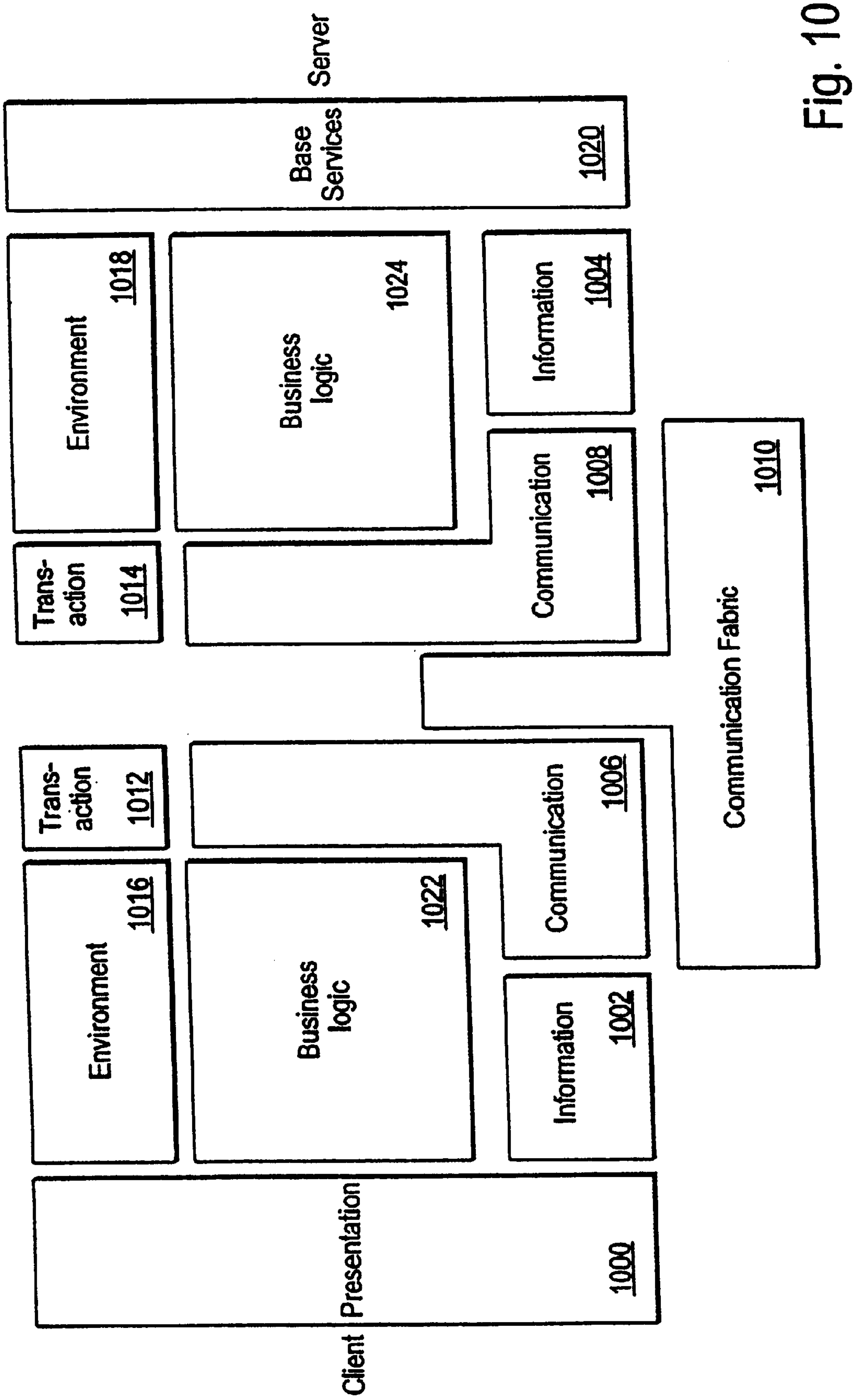
FIG. 10 illustrates the services of a Netcentric Architecture Framework in accordance with one embodiment of the present invention.
Figure 11:
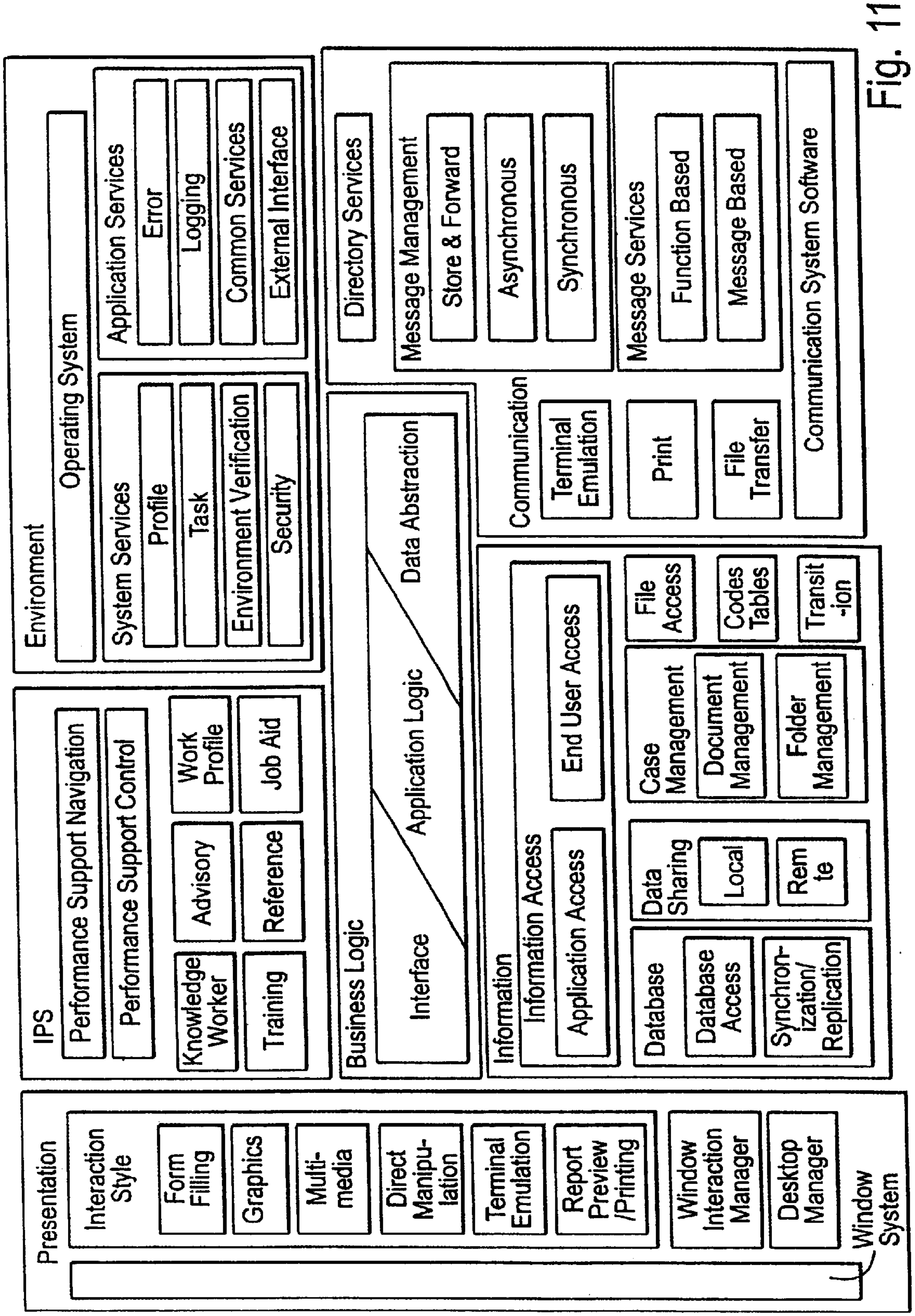
FIG. 11 is a detailed diagram of some of the components of the Netcentric Architecture Framework found in FIG. 10.
Figure 12:
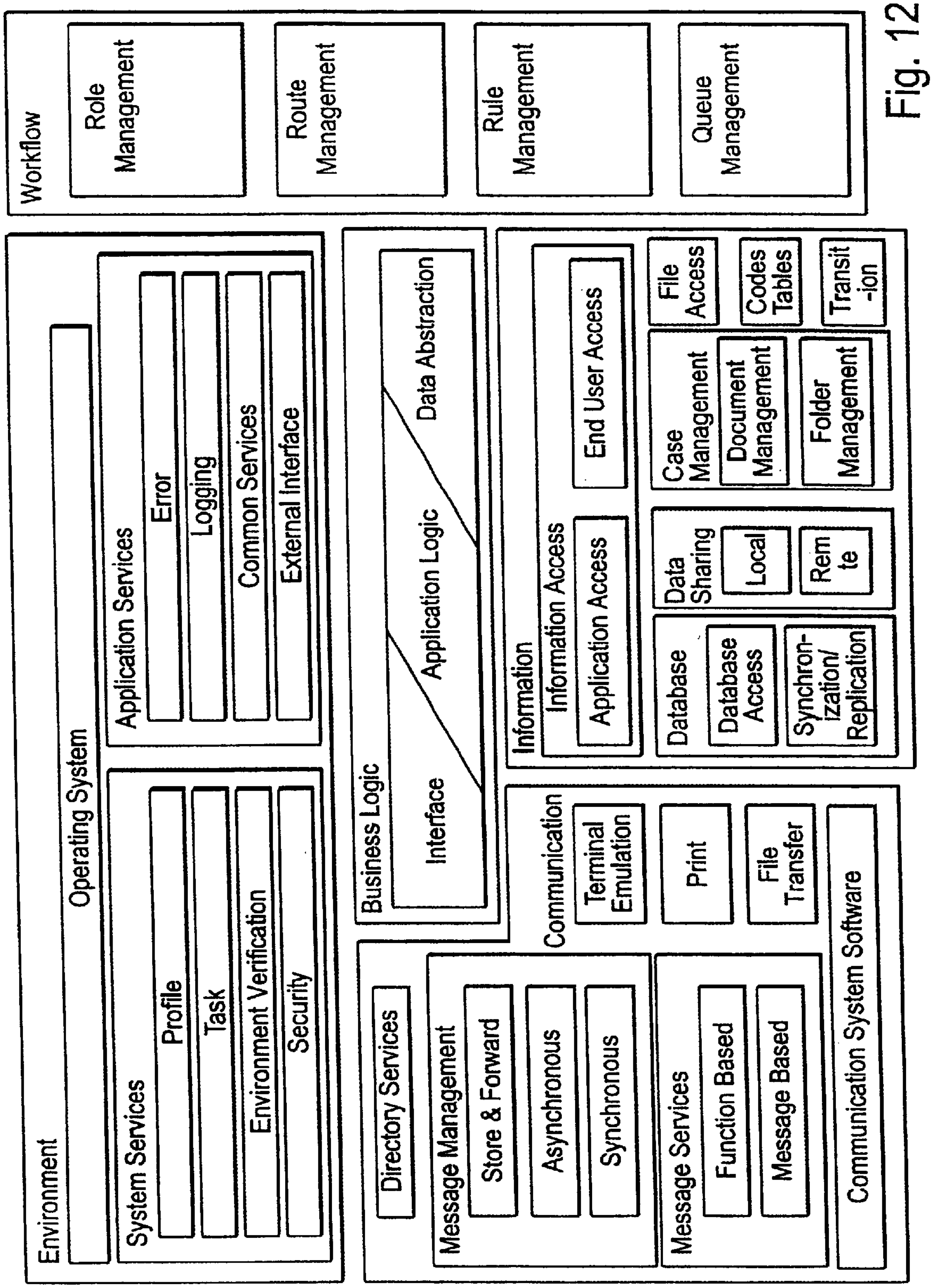
FIG. 12 is a detailed diagram of other components of the Netcentric Architecture Framework found in FIG. 10.

The Netcentric Architecture Framework identifies those run-time services required when an application executes in a Netcentric environment. As shown in FIG. 10, the services can be broken down into logical areas: Presentation Services 1000, Information Services 1002,1004, Communication Services 1006,1008, Communication Fabric Services 1010, Transaction Services 1012,1014, Environment Services 1016,1018, Base Services 1020 and Business Logic 1022, 1024. This framework is an evolution of the Client Server New Age Systems Framework and is useful for technical architects involved in the selection, development and deployment of technical architectures in a Netcentric environment. More discussion of each of these logical areas is provided below. See also FIGS. 11 and 12, which are detailed diagrams of the components of the Netcentric Architecture Framework found in FIG. 10.

Netcentric Computing Top 10 Points

Netcentric computing represents an evolution—it builds on and extends, rather than replaces, client/server.

Netcentric computing has a greater impact on the entire business enterprise, hence greater opportunity and risk.

Definitions of Netcentric may vary. One is about reach and content.

Netcentric is not just electronic commerce; it can impact enterprises internally as well.

You can begin identifying Netcentric opportunities for clients today.

There are three basic types of Netcentric applications: advertise; inquiry; and fully interactive.

One can underestimate the impact of Netcentric on infrastructure requirements.

Build today s client/server engagements with flexibility to extend to Netcentric.

Netcentric Computing Definition

Netcentric Computing also called Netcentric Architecture, Netcentric Technology, etc. is an emerging architecture style which expands the reach of computing both within and outside the enterprise. Netcentric enables sharing of data and content between individuals and applications. These applications provide capabilities to publish, interact or transact. Netcentric represents an evolution of Client/Server which may utilize internet technologies to connect employees, customers, and business partners.

Client/Server vs. Netcentric Computing (NCC)

NCC is a new style of computing that expands on the technological base already provided by traditional client/server systems. Many of the traditional client/server design concepts and considerations still apply to NCC.

The important differences between client/server systems and NCC systems are:

The way in which the application logic is distributed to clients is different in NCC and traditional client/server systems. In NCC systems, application logic can be packaged into components and distributed from a server machine to a client machine over a network. In traditional client/server systems, the application logic is split between the client and the server on a permanent basis; there is no dynamic distribution of application logic.

The number of tiers in NCC and traditional client/server systems is different. NCC extends the traditional two-tier client/server architecture to a n-tier architecture.

- The client in NCC systems is different from a client in traditional client/server systems. The client in a NCC system is a standardized universal one; a NCC application can execute within a client that can run on multiple operating systems and hardware platforms. In traditional client/server systems, the client is custom-made for a specific operating system and hardware platform.
- The way in which NCC and traditional client/server systems can be extended and adapted is different. Components enable NCC systems to be adaptable to a variety of distribution styles, from a "thin client" to a "fat client". In comparison, traditional client/server systems, once designed and built, cannot be adapted for use on more than one computing style Tiers Similarly to traditional client/server architectures, Netcentric architectures support a style of computing where processes on different machines communicate using messages. In this style, "client" processes delegate business functions or other tasks (such as data manipulation logic) to one or more server processes. Server processes respond to messages from clients.

Business logic can reside on both client and server. Clients are typically PCs or Workstations with a graphical user interface running in a Web browser. Servers are usually implemented on UNIX, NT or mainframe machines.

A key design decision for a client/server system is whether it should be two-tiered or multi-tiered and how business logic is distributed across the tiers. In Netcentric architectures there is a tendency to move more business logic to the server tiers, although "fatter" clients are becoming more popular with newer technologies such as Java and ActiveX.

Two-Tiered Architectures

Two-tiered architecture describes a distributed application architecture in which business applications are split into front-ends (clients) and back-ends (servers). Such a model of computing began to surface in the late 1980s and is the prominent configuration in use today by companies which have attempted to migrate to client/server based computing.

Advantages

At a minimum, a two-tiered client/server architecture assumes that an application's presentation logic resides on the client and its data management logic resides on the server. This style of computing became attractive to early adopters of client/server because it clearly addresses the inadequacies of a character-based interface. That is, it allows PC-based clients to introduce a graphical user interface (GUI) into the application environment.

- Allows rapid development "out-of-the-box"
- Decreased communication overhead because of a direct connection (for a small number of users)
- Allows the distribution of the program's logic (application, presentation, data management)

Limitations of Two-Tiered Architecture

The use of two-tier tools has resulted in a defacto "client-heavy" or "fat-client" two-tiered model where the presentation and application logic resides on the client and data management resides on the server. In fact, the use of these tools "out-of-the-box" assumes the adoption of such a model. Unfortunately, such an architectural model falls short of addressing many important issues required of an enterprise-wide information architecture. This model of computing was actually developed for less-demanding PC environments where the database was simply a tool for decision support.

Limitations

- Limited/cost prohibitive Scalability
- Limited availability
- Limited reliability
- Security Deficiencies
- Network/Database bottlenecks
- Low implementation flexibility
- Limited Asynchronous processing Three-Tiered or Multi-tiered Architectures Three-tiered architecture describes a distributed application architecture in which business applications are separated into three logical components: presentation and control, application logic, and data management. These logical components are "clean layered" such that each runs on a different machine or platform, and communicates with the other components via a network.

A three-tiered architecture is often enhanced by the integration of distributed transaction processing middleware. This model of computing is often termed the "enhanced" client/server model. Most Netcentric architectures use a three- or four tiered approach with a web server and potentially a separate application server layer.

In the enhanced client/server model, all presentation and control logic resides on the client, all application logic resides on multiple back-end application servers, and all data management logic resides on multiple back-end database servers.

Advantages

In contrast to mainframe and two-tiered client/server computing models, the principle advantage with a three-tiered enhanced client/server architecture is that it provides the benefits of a GUI application, but also provides a level of integrity and reliability found in mainframe centralized computing. That is, it will evolve to serve high-volume, high-integrity, and high-availability environments.

- Location and implementation transparency—The use of a transaction manager such as Tuxedo allows for service location independence.
- Distribution of logic to optimal resource—Since the application and database functions reside on their own physical devices, each can be optimally tuned for the work they perform.
- Database scaleable on throughput—In the enhanced three-tiered client/server model, client applications no longer connect directly to database servers. Instead, only application servers connect to the database servers.
- Security over service resources—With the application logic residing on back-end application servers, security over the applications is made possible at various levels.
- Redundancy and resiliency of services—A major disadvantage prominent in other models of computing is "single point of failure
- Optimization of personnel resources—Developers can be utilized for specific talents in each tier.
- Allows for asynchronous and standardized messaging—The enhanced client/server model is really a superset of the RPC-based function shipping model which provides features such as asynchronous, event-driven programming.
- Administration, configuration, prioritization—The use of a transaction manager enables servers to be added, removed, or restarted dynamically. This allows for very robust, scaleable, and flexible applications.

Disadvantages

Three-tier architectures are highly flexible. This flexibility comes with the cost of being more complex to implement.

Limitations

- Additional tool (middleware) selection
- Longer implementation times
- Greater development costs associated with additional tier
- More complex planning
- Additional Skills
- Extra Hardware
- Greater complexity for maintenance, configuration management

Presentation 1000

Figure 13:
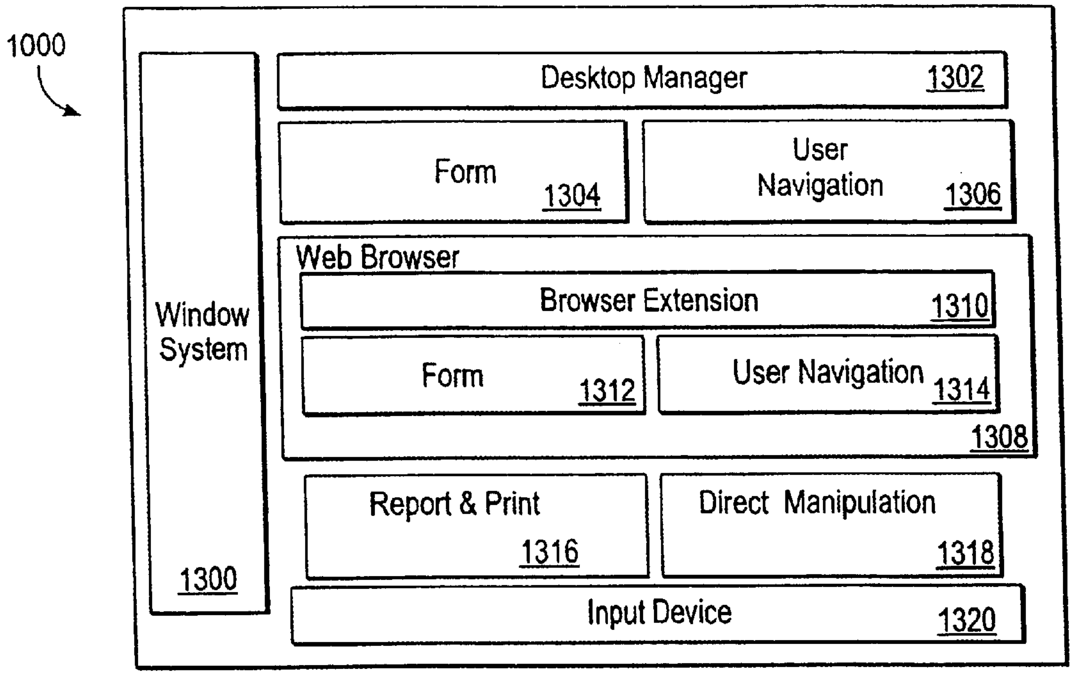
FIG. 13 illustrates several components of the Presentation area of the Netcentric Architecture Framework.

Presentation Services enable an application to manage the human-computer interface. This includes capturing user actions and generating resulting events, presenting data to the user, and assisting in the management of the dialog flow of processing. FIG. 13 illustrates several components of the Presentation area of the Netcentric Architecture Framework.

Exemplary products that may be used to enable this component include Visual Basic; PowerBuilder; C++; Windows 3.x/NT/95; X-Windows/Motif; Visual C++; Borland Delphi; AC FOUNDATION for FCP.

The products listed as candidates for specific components here and below should be used with care. These examples do not provide an all-inclusive list, nor do they necessarily represent the current market leaders. They are there to provide an example of products that may enable the component services.

Window System 1300

Typically part of the operating system, the Window System Services provide the base functionality for creating and managing a graphical user interface (GUI)—detecting user actions, managing windows on the display, and displaying information in windows.

Implementation Considerations

Windowing systems expose their functionality to application programs through a set of application programming interfaces (APIs). For the Microsoft windowing platform, this API is called Win32. The Win32 API is a documented set of over 500 C functions that allow developers to access the functionality of the windowing system as well as various other operating system functions. While it is possible for developers to directly call the Win32 API or its equivalent on other platforms using a C language compiler, most business application development is done using higher level development languages such as Visual Basic or PowerBuilder which make the lower level calls to the operating systems on behalf of the developer.

Exemplary products that may be used to enable this component include Microsoft Windows; Windows 95; Windows NT; Macintosh OS; Program Manager for OS/2; X-Windows/Motif; JavaOS Desktop Manger 502

Desktop Manager Services implement the desktop metaphor. The desktop metaphor as the name suggests is a style of user interface that tries to emulate the idea of a physical desktop allowing you to place documents on the desktop, launch applications by clicking on a graphical icon, or discard files by dragging them onto a picture of a waste basket. Most Window Systems contain elementary Desktop Manager functionality (e.g., the Windows 95 desktop), but often more user friendly or functional Desktop Manager Services are required.

Microsoft Windows 95 task bar; Norton Navigator; Xerox Tabworks; Starfish Software Dashboard Product Considerations Exemplary products that may be used to enable this component include:

- Microsoft Windows 95 task bar—provides a launch bar which allows users to access recently used documents, launch applications, or switch between active applications. The Windows 95 desktop and launch bar are programmable allowing users to extend and customize the desktop manager for their specific application. For example, the desktop can be extended with icons or Start Menu options for creating a new customer account or finding an order.
- Norton Navigator—provides multiple virtual desktops, enhanced file management including direct FTP connectivity, long file name support for some 16-bit applications, file un-erase, and other features; targeted at users who often interact with the Windows 95 desktop.
- Xerox Tabworks—presents the user with a notebook metaphor for application and document access; allows creation of tabbed sections which contain related files (e.g., Winston Account or New Product Launch) for easier access.
- Starfish Software Dashboard—a desktop utility designed to simplify application and system management; provides quick launch buttons, system resource gauge, drag-and-drop printing and faxing, calendar, etc.

Form 1304

Form Services enable applications to use fields to display and collect data. A field may be a traditional 3270-style field used to display or input textual data, or it may be a graphical field such as a check box, a list box or an image. Form Services provide support for:

Display—support the display of various data types (e.g., text, numeric, date, etc.) in various formats (e.g., American/European date, double-byte characters, icons, etc.)

Input/Validation—enable applications to collect information from the user, edit it according to the display options, and perform basic validation such as range or format checks.

Mapping Support—eliminate the need for applications to communicate directly with the windowing system; rather, applications retrieve or display data by automatically copying the contents of a window's fields to a copybook structure in memory. These Services may also be used to automate the merging of application data with pre-defined electronic form templates.

Field Interaction Management—coordinate activity across fields in a window by managing field interdependencies and invoking application logic based on the state of fields and user actions. For example, the Field Interaction Manager may disable the "OK" button until all required input fields contain valid data. These services significantly reduce the application logic complexity inherent to an interactive windowed interface.

Implementation Considerations

In traditional client/server applications, Forms are windows that contain widgets (text fields, combo-boxes, etc.) and business logic. Form development tools such as Visual Basic, PowerBuilder, etc. allow the Form designer to specify page layout, entry fields, business logic, and routing of forms. From a developers perspective, these products typically expose Form and control handling functionality as a set of proprietary or product specific APIs.

In addition to the traditional tools (e.g., Visual C++, Visual Basic, PowerBuilder), Netcentric technologies have introduced new tools that can be used to develop Forms. For example, a developer can use Symantec Visual Café to create a Java application that will execute directly on the users desktop without any interaction with a browser.

Today most Netcentric applications are Web based and are launched from the Web browser. Additionally, one is now beginning to see other types of Netcentric solutions. For example, PointCast is a Netcentric application located on the users machine; it relies on the Internet to deliver stock prices, news headings, sports updates, etc. to the user. However, it is not launched from the Web browser—it is its own application. In the future there will be more Netcentric applications that use this approach for delivering information.

Product Considerations

What level of technical support, documentation, and training is required to ensure the productivity of developers?

The extent of support (on-site, phone, bulletin board, world-wide, etc.), quality of documentation, and availability and location of education/training should be considered.

What functions are required in the control set?

At the minimum a tool should support basic widgets (push buttons, list boxes, etc.), window styles, (multi-window, multi-document, paned-window), and menu styles, along with validation and inter-application communication. Consideration should also be given as to the extensibility of the toolset via add-ons and third party products.

Can the tool be used for both prototyping and GUI design?

The ability to use a single tool for both prototyping and GUI design will reduce the development learning curve. One should also consider how well the tool integrates will all other development tools.

What platform(s) are supported?

The platform(s) that must be supported, i.e., MS-DOS, Windows, IBM OS/2, UNIX, or UNIX Motif, is an important consideration, as are any hardware restrictions.

What type of learning curve is associated with the tool?

Developers using the product should be able to become productive quickly. Factors which reduce the learning curve include an easy to learn and intuitive interface, thorough and clear documentation, and on-line help.

If the tool is also going to be used for application development, how well does the tool perform during production?

Computational, network, data retrieval, and display speeds differ for products. Factors to consider are whether the application will consist of heavy data entry, transaction processing, or a large user base.

How much does the tool cost?

Product components, maintenance agreements, upgrades, run-time licenses, and add-on packages should be considered.

Does the product integrate with other tools and/or support other tools in the development and execution environments?

It is important to determine how well the product integrates with other design and development tools, presentation services (graphics, multi-media, etc.), data access services (databases and database API libraries), distribution services (distributed TP monitor), transmission services (SNA, HLLAPI, etc.), data dictionary, desktop applications, and programming languages for call-out/call-in. Additional consideration should be given to add-on and third-party products/enhancements such as specialized widgets, report writers and case tools.

Will the tool be used with a large development team?

If the development team is more than 5 people, a tool should provide support for multiple developers. This support includes features such as object check-in/check-out, a central design repository for the storage of application objects and user interface definitions, and version control. Additionally, the development team should be able to cleanly divide the application(s) into pieces which can be worked on by multiple people.

What protocols are used to communicated with the database?

Important considerations include the supported databases and protocols used to communicated with the databases. The tool must support the selected database. Additionally, if the database selection may change, it is important that the tool have the ability to support other databases with minimal impact on the application development. Native database interfaces tend to have better performance than open standards such as ODBC.

Will the design tool be used for programming of client applications? What programming language is supported?

If the design tool is used for programming, there are several features of a tool which must be considered. These features can have an impact on the productivity of programmers, performance of the applications, skill sets required, and other tools required for development. These features include:

What programming language is supported? Is the programming language interpretive or compiled? Is it object oriented or structured procedural language?

Does the tool support programming extensions to Dynamic Link Libraries?

What are the debugging capabilities of the tool?

Is the tool scalable?

The tool should be scalable to support growth in application size, users, and developers.

Exemplary products that may be used to implement this component include JetForms JetForm Design; Lotus Forms; Visual Basic.

JetForms JetForm Design—provides tools to design, fill, route, print and manage electronic forms, helping organizations reduce costs and increase efficiency by automating processing of forms across local and wide area networks as well as the Internet. Lotus Forms—Lotus Development Corporations electronic forms software provides tools to design, route and track forms to automate business processes for the workgroup or the extended enterprise.

Lotus Forms is designed to run with Lotus Notes or as a standalone application. It is comprised of two parts: Forms Designer, an application-development version, and Forms Filler, a runtime version for users. Visual Basic—a development tool that provides a comprehensive development environment for building complex applications.

User Navigation 1306

User Navigation Services provide a user with a way to access or navigate between functions within or across applications. Historically, this has been the role of a text-based menuing system that provides a list of applications or activities for the user to choose from.

Client/server technologies introduced new navigation metaphors. A method for allowing a user to navigate within an application is to list available functions or information by means of a menu bar with associated pull-down menus or context-sensitive pop-up menus. This method conserves screen real-estate by hiding functions and options within menus, but for this very reason can be more difficult for first time or infrequent users. This point is important when implementing electronic commerce solutions where the target customer may use the application only once or very infrequently (e.g., purchasing auto insurance).

Additionally, client/server development tools such as Visual Basic and PowerBuilder do not provide specific services for graphical navigation, but the effect can be recreated by selecting (i.e., clicking on) graphical controls, such as picture controls or iconic push-buttons, programmed to launch a particular window.

A major advantage of the graphical user interface is the fact that it allows multiple windows to be open at one time.

Implementation Considerations

Is there a need to manage multiple instances of a window object?

Windows Interaction Manager provides the application with facilities to open multiple instances of the same window. This component provides an option parameter that will let the application developers enable or disable the ability to open the same window with the same key data (that is, a duplicate instance).

Do you need to pass messages between windows?

Windows Interaction Manager provides the facility to pass messages between windows within one application. This allows one window to trigger an event/action on another related window.

Do multiple applications need to pass messages between each other?

Windows Interaction Manager provides the facility to pass messages between windows from different applications residing on the same machine. This allows one window to trigger an event/action on an related window when certain actions (user or environment) occur.

If information needs to be shared between applications on different machines, Window Interaction Management cannot be used. This type of data sharing requires a special architecture component called Communication, which is more network orientated.

Is there a need for object registration/de-registration?

Windows Interaction management allows the application to control and manage the opening and closing of multiple windows by—maintaining the parent-child relationship, controlling multiple instances of similar windows, maintaining key data-window relationship. This allows the user to work in a controlled and, well managed, environment.

Web Browser 1308

Web Browser Services allow users to view and interact with applications and documents made up of varying data types, such as text, graphics, and audio. These services also provide support for navigation within and across documents no matter where they are located, through the use of links embedded into the document content. Web Browser Services retain the link connection, i.e., document physical location, and mask the complexities of that connection from the user. Web Browser services can be further subdivided into: Browser Extension, Form, and User Navigation.

Parlez-vous Internet?

The Elements of Web Style

Language philosopher Benjamin Whorf once said, “We dissect nature along lines laid down by our native language. Language is not simply a reporting device for experience, but a defining framework for it.” This notion is especially true when applied to the World Wide Web. The evolution of the Web from a rigid, text-centric village to an elastic, multimedia-rich universe has been driven by modifications to the languages behind it. The Internet is at a crucial point in its development as a number of enhancements for extending Web technology come under scrutiny by Internet standards groups. These enhancements will ultimately push the Web into the realms of distributed document processing and interactive multimedia.

SGML: in the beginning . . .

Although the World Wide Web was not created until the early 1990s, the language behind it dates back to the genesis of the Internet in the 1960s. Scientists at IBM were working on a Generalized Markup Language (GML) for describing, formatting, and sharing electronic documents. Markup refers to the practice in traditional publishing of annotating manuscripts with layout instructions for the typesetters.

In 1986, the International Standards Organization (ISO) adopted a version of that early GML called Standard Generalized Markup Language (SGML). SGML is a large and highly-sophisticated system for tagging documents to ensure that their appearance will remain the same regardless of the type of platform used to view them. Designers use SGML to create Document Type Definitions (DTDs), which detail how tags (also known as format codes) are defined and interpreted within specified documents. These tags can be used to control the positioning and formatting of a document’s text and images. SGML is used for large, complex, and highly-structured documents that are subject to frequent revisions, such as dictionaries, indexes, computer manuals, and corporate telephone directories.

HTML: SGML for dummies?

While creating the World Wide Web in the early 1990s, scientists at CERN discovered that in spite of its power and versatility, SGML’s sophistication did not allow for quick and easy Web publishing. As a result, they developed HyperText Markup Language (HTML), a relatively simple application of SGML. This simplicity has contributed to the exponential growth of the Web over the last few years. HTML files are written in plain text and can be created using any text editor from the most robust Web page authoring software (such as Microsoft’s FrontPage or Sausage Software’s HotDog) to the anemic Notepad utility included with Microsoft’s Windows operating system.

As with many languages, HTML is in a state of constant evolution. The World Wide Web Consortium W3C oversees new extensions of HTML developed by both software companies (such as Microsoft and Netscape Communications) and individual Web page authors and ensures that each new specification is fully-compatible with previous ones. Basic features supported by HTML include headings, lists, paragraphs, tables, electronic forms, in-line images (images next to text), and hypertext links. Enhancements to the original HTML 1.0 specification include banners, the applet tag to support Java, image maps, and text flow around images.

The W3C also approved the specification for version 4.0 of HTML (http://www.w3.org/TR/REC-html40). This specification builds upon earlier iterations of HTML by enabling Web authors to include advanced forms, in-line frames, and enhanced tables in Web pages. HTML 4.0 also allows authors to publish pages in any language, and to better manage differences in language, text direction, and character encoding.

Perhaps most significantly, HTML 4.0 increases authors’ control over how pages are organized by adding support for Cascading Style Sheets CSS Style sheets contain directions for how and where layout elements such as margins, fonts, headers, and links are displayed in Web pages. With CSS, authors can use programming scripts and objects to apply multiple style sheets to Web pages to create dynamic content. CSS can also be used to centralize control of layout attributes for multiple pages within a Web site, thus avoiding the tedious process of changing each page individually.

Dynamic HTML: Dyn-o-mite!

HTML’s simplicity soon began to limit authors who demanded more advanced multimedia and page design capabilities. Enter Dynamic HTML DHTML As an extension of HTML, DHTML allows Web pages to function more like interactive CD-ROMs by responding to user-generated events. DHTML allows Web page objects to be manipulated after they have been loaded into a browser. This enables users to shun plug-ins and Java applets and avoid bandwidth-consuming return trips to the server. For example, tables can expand or headers can scurry across the page based on a user's mouse movements.

Unfortunately, the tremendous potential offered by DHTML is marred by incompatible standards. At the heart of the DHTML debate is a specification called the Document Object Model DOM The DOM categorizes Web page elements—including text, images, and links—as objects and specifies the attributes that are associated with each object. The DOM makes Web document objects accessible to scripting languages such as JavaScript and VisualBasic Script (VBScript), which can be used to change the appearance, location, and even the content of those objects in real-time.

Microsoft's Internet Explorer 4.0 supports a W3C "Working Draft" DOM specification that uses the CSS standard for layout control and Web document object manipulation. In contrast, Netscape's implementation of DHTML in Communicator 4.0 uses a proprietary "Dynamic Layers" tag, which assigns multiple layers to a page within which objects are manipulated. As a result, Web pages authored using either version of DHTML may not be viewed properly using the other's browser. XML: X marks the spot HTML 4.0 and Dynamic HTML have given Web authors more control over the ways in which a Web page is displayed. But they have done little to address a growing problem in the developer community: how to access and manage data in Web documents so as to gain more control over document structure. To this end, leading Internet developers devised Extensible Markup Language (XML), a watered-down version of SGML that reduces its complexity while maintaining its flexibility. Like SGML, XML is a meta-language that allows authors to create their own customized tags to identify different types of data on their Web pages. In addition to improving document structure, these tags will make it possible to more effectively index and search for information in databases and on the Web.

XML documents consist of two parts. The first is the document itself, which contains XML tags for identifying data elements and resembles an HTML document. The second part is a DTD that defines the document structure by explaining what the tags mean and how they should be interpreted. In order to view XML documents, Web browsers and search engines will need special XML processors called "parsers." Currently, Microsoft's Internet Explorer 4.0 contains two XML parsers: a high-performance parser written in C++ and another one written in Java.

A number of vendors plan to use XML as the underlying language for new Web standards and applications. Microsoft uses XML for its Channel Definition Format, a Web-based "push" content delivery system included in Internet Explorer 4.0. Netscape will use XML in its Meta Content Framework to describe and store metadata, or collections of information, in forthcoming versions of Communicator. XML is currently playing an important role the realm of electronic commerce via the Open Financial Exchange, an application developed by Microsoft, Intuit, and CheckFree for conducting electronic financial transactions. Similarly, HL7, a healthcare information systems standards organization, is using XML to support electronic data interchange EDI of clinical, financial, and administrative information (http://www.mcis.duke.edu/standards/HL7/sigs/sgml/index.html).

Meet Cousin VRML

In 1994, a number of Internet thought leaders, including Tim Berners-Lee—the "father" of the Web—met to determine how they could bring the hot, new technology known as virtual reality VR to the Web. VR refers to the use of computers to create artificial and navigable 3-D worlds where users can create and manipulate virtual objects in real time. This led to the creation of Virtual Reality Modeling Language (VRML—pronounced "ver-mul"). VRML is technically not a markup language because it uses graphical rather than text-based file formats.

In order to create 3-D worlds and objects with VRML, users need a VRML editor such as Silicon Graphics' Cosmo Worlds (http://cosmo.sgi.com/products/studio/worlds). To view VRML content, users need either a VRML browser or a VRML plug-in for standard HTML browsers. Leading VRML plug-ins include Cosmo Player from Silicon Graphics (http://vrml.sgi.com/cosmoplayer), Liquid Reality from Microsoft's DimensionX subsidiary (http://www.microsoft.com/dimensionx), OZ Virtual from OZ Interactive (http://www.oz.com/ov/main_bot.html), and WorldView from Intervista (http://www.intervista.com/products/worldview/index.html), These plug-ins can typically be downloaded for free from the Web.

VRML is capable of displaying static and animated objects and supports hyperlinks to multimedia formats such as audio clips, video files, and graphical images. As users maneuver through VRML worlds, the landscape shifts to match their movements and give the impression that they are moving through real space. The new VRML 2.0 specification finalized in August 1996 intensifies the immersive experience of VR worlds on the Web by enabling users to interact both with each other and with their surroundings. Other new features supported by VRML 2.0 include richer geometry description, background textures, sound and video, multilingual text, Java applets, and scripting using VBScript and JavaScript. VRML will become a significant technology in creating next-generation Internet application as the language continues to mature and its availability increases.

The Future: Give Us a Big SMIL

The Web has come a long way since the codification of HTML 1.0. It has moved from simple text-based documents that included headings, bulleted lists, and hyperlinks to dynamic pages that support rich graphic images and virtual reality. So what next for the Web? The answer resides in a Synchronized Multimedia Integration Language (SMIL), a new markup language being developed by the W3C. SMIL will allow Web authors to deliver television-like content over the Web using less bandwidth and a simple text editor, rather than intricate scripting.

SMIL is based on XML and does not represent a specific media format. Instead, SMIL defines the tags that link different media types together. The language enables Web authors to sort multimedia content into separate audio, video, text, and image files and streams which are sent to a user's browser. The SMIL tags then specify the "schedule" for displaying those components by determining whether they should be played together or sequentially. This enables elaborate multimedia presentations to be created out of smaller, less bandwidth-consuming components.

Implemenation Considerations

Many features such as graphics, frames, etc. supported by Web Browsers today were not available in initial releases. Furthermore, with every new release the functionality supported by Web Browsers keeps growing at a remarkable pace.

Much of the appeal of Web Browsers is the ability to provide a universal client that will offer users a consistent and familiar user interface from which many types of applications can be executed and many types of documents can be viewed, on many types of operating systems and machines, as well as independent of where these applications and documents reside.

Web Browsers employ standard protocols such as Hypertext Transfer Protocol (HTTP) and File Transfer Protocol (FTP) to provide seamless access to documents across machine and network boundaries.

The distinction between the desktop and the Web Browser narrowed with the release of Microsoft IE4.0, which integrated Web browsing into the desktop, and gave a user the ability to view directories as though they were Web pages. Web Browser, as a distinct entity, may even fade away with time.

Exemplary products that may be used to implement this component includes Netscape Navigator; Netscape Communicator; Microsoft Internet Explorer; Netscape LiveWire; Netscape LiveWirePro; Symantec Visual Cafe; Microsoft Front Page; Microsoft Visual J++; IBM VisualAge.

Execution Products

Netscape Navigator or Communicator—one of the original Web Browsers, Navigator currently has the largest market share of the installed browser market and strong developer support. Communicator is the newest version with add-on collaborative functionality Microsoft Internet Explorer (IE)—a Web Browser that is tightly integrated with Windows and supports the major features of the Netscape Navigator as well as Microsoft's own ActiveX technologies.

Development Products

Web Browsers require new or at least revised development tools for working with new languages and standards such as HTML, ActiveX and Java. Many browser content development tools are available. The following are several representative products:

Netscape LiveWire and LiveWire Pro—visual tool suite designed for building and managing complex, dynamic Web sites and creating live online applications.

Symantec Visual Café—the first complete Rapid Application Development (RAD) environment for Java; it allows developers to assemble complete Java applets and applications from a library of standard and third party objects. Visual Café also provides an extensive set of text based development tools.

Microsoft FrontPage—Web site management tool that supports web page creation, web site creation, page and link management and site administration.

Microsoft Visual J++—a product similar to Visual C++, VJ++ allows the construction of Java and ActiveX applications through an integrated graphical development environment.

IBM VisualAge for Java—a product similar to VisualAge for Smalltalk, VJ++ allows the construction of Java applications through an integrated graphical development environment. It supports JavaBeans. Used by Eagle team for the Eagle JavaBeans reference application.

Browser Extension 1310

Browser Extension Services provide support for executing different types of applications from within a Browser. These applications provide functionality that extend Browser capabilities. The key Browser Extensions are:

Plug-in—a term coined by Netscape, a plug-in is a software program that is specifically written to be executed within a browser for the purpose of providing additional functionality that is not natively supported by the browser, such as viewing and playing unique data or media types. Typically, to use a plug-in, a user is required to download and install the Plug-in on his/her client machine. Once the Plug-in is installed it is integrated into the Web browser. The next time a browser opens a Web page that requires that Plug-in to view a specific data format, the browser initiates the execution of the Plug-in. Until recently Plug-ins were only accessible from the Netscape browser. Now, other browsers such as Microsoft's Internet Explorer are beginning to support Plug-in technology as well. Also, Plug-ins written for one browser will generally need to be modified to work with other browsers. Plug-ins are also operating system dependent. Therefore, separate versions of a Plug-in may be required to support Windows, Macintosh, and Unix platforms.

Helper Application/Viewer—is a software program that is launched from a browser for the purpose of providing additional functionality to the browser. The key differences between a helper application or sometimes called a viewer and a plug-in are:

How the program is integrated with the Web browser—unlike a plug-in, a helper application is not integrated with the Web Browser, although it is launched from a Web browser. A helper application generally runs in its own window, contrary to a plug-in which is generally integrated into a Web page.

How the program is installed—like a plug-in, the user installs the helper application. However, because the helper application is not integrated with the browser, the user tends to do more work during installation specifying additional information needed by the browser to launch the helper application.

How the program is initiated—the user tends to initiate the launching of the helper application, unlike a plug-in where the browser does the initiation.

From where the program is executed—the same helper application can be executed from a variety of browsers without any updates to the program, unlike a plug-in which generally needs to be updated for specific browsers. However, helper applications are still operating system dependent.

Java applet—a program written in Java that runs within or is launched from the client's browser. This program is loaded into the client device's memory at runtime and then unloaded when the application shuts down. A Java applet can be as simple as a cool animated object on an HTML page, or can be as complex as a complete windows application running within the browser.

ActiveX control—is also a program that can be run within a browser, from an application independent of a browser, or on its own. ActiveX controls are developed using Microsoft standards that define how re-usable software components should be built. Within the context of a browser, ActiveX controls add functionality to Web pages. These controls can be written to add new features like dynamic charts, animation or audio.

Implementation Considerations

Viewers and plug-ins are some of the most dynamic segments of the browser market due to quickly changing technologies and companies. What was yesterday a plug-in or a viewer add-on often becomes a built-in capability of the browser in its next release.

Exemplary products that may be used to implement this component include Real Audio Player; VDOLive; Macromedia Shockwave; Internet Phone; Web 3270.

Real Audio Player—a plug-in designed to play audio and video in real-time on the Internet without requiring to download the entire audio file before you can begin listening, or a video file before you can begin viewing.

Macromedia Shockwave—a plug-in used to play back complex multimedia documents created using Macromedia Director or other products.

Internet Phone—one of several applications which allow two-way voice conversation over the Internet, similar to a telephone call.

Web3270—a plug-in from Information Builders that allows mainframe 3270-based applications to be viewed across the Internet from within a browser. The Web3270 server provides translation services to transform a standard 3270 screen into an HTML-based form. Interest in Web3270 and similar plug-ins has increased with the Internets ability to provide customers and trading partners direct access to an organizations applications and data. Screen scraping plug-ins can bring legacy applications to the Internet or intranet very quickly.

Form 1312

Like Form Services outside the Web Browser, Form Services within the Web Browser enable applications to use fields to display and collect data. The only difference is the technology used to develop the Forms. The most common type of Forms within a browser are Hypertext Markup Language (HTML) Forms. The HTML standard includes tags for informing a compliant browser that the bracketed information is to be displayed as an editable field, a radio button, or other form-type control. Currently, HTML browsers support only the most rudimentary forms—basically providing the presentation and collection of data without validation or mapping support. When implementing Forms with HTML, additional services may be required such as client side scripting (e.g., VB Script, JavaScript).

Additionally Microsoft has introduced ActiveX documents which allow Forms such as Word documents, Excel spreadsheets, Visual Basic windows to be viewed directly from Internet Explorer just like HTML pages.

Different technologies may be used to create Forms that are accessible outside of the browser from those that are accessible within the browser. However, with the introduction of ActiveX documents these differences are getting narrower.

Exemplary products that may be used to implement this component include JetForms JetForm Design; Lotus Forms; Visual Basic; Front Page.

FrontPage—Web site management tool that supports web page creation, web site creation, page and link management and site administration.

User Navigation 1314

Like User Navigation Services outside the Web Browser, User Navigation Services within the Web Browser provide a user with a way to access or navigate between functions within or across applications. These User Navigation Services can be subdivided into three categories:

Hyperlink—the Internet has popularized the use of underlined key words, icons and pictures that act as links to further pages. The hyperlink mechanism is not constrained to a menu, but can be used anywhere within a page or document to provide the user with navigation options. It can take a user to another location within the same document or a different document altogether, or even a different server or company for that matter. There are three types of hyperlinks:

Hypertext is very similar to the concept of Context Sensitive Help in Windows, where the reader can move from one topic to another by selecting a highlighted word or phrase.

Icon is similar to the hypertext menu above, but selections are represented as a series of icons. The HTML standard and popular browsers provide hyperlinking services for non-text items such as graphics.

Image Map is also similar to the hypertext menu above, but selections are represented as a series of pictures. A further evolution of the image map menu is to display an image depicting some place or thing (e.g., a picture of a bank branch with tellers and loan officers).

Customized Menu—a menu bar with associated pull-down menus or context-sensitive pop-up menus. However, as mentioned earlier this method hides functions and options within menus and is difficult for infrequent users. Therefore, it is rarely used directly in HTML pages, Java applets or ActiveX controls. However, this capability might be more applicable for intranet environments where the browsers themselves need to be customized (e.g., adding custom pull-down menus within Internet Explorer) for the organizations specific business applications.

Virtual Reality—A virtual reality or a virtual environment interface takes the idea of an image map to the next level by creating a 3-dimensional (3-D) environment for the user to walk around in. Popularized by PC games like Doom, the virtual environment interface can be used for business applications. Imagine walking through a shopping mall and into and around virtual stores, or flying around a 3-D virtual resort complex you are considering for a holiday.

To create sophisticated user navigation interfaces such as these requires additional architectural services and languages. The Virtual Reality Modeling Language (VRML) is one such language gaining in popularity.

Implementation Considerations

The hyperlink metaphor makes it possible for the user to jump from topic to topic instead of reading the document from beginning to end. For many types of applications, this can create a more user-friendly interface, enabling the user to find information faster.

An image map menu can be useful where all users share some visual model for how business is conducted, and can be very engaging, but also painfully slow if even a moderate speed communications connection is required. Additional Image Map Services are required to map the location of user mouse clicks within the image to the corresponding page or window which is to be launched.

Exemplary products that may be used to implement this component include Silicon Graphics Open Inventor; VREAM VRCreator; DimensionX Liquid Reality.

There are many toolkits and code libraries available to speed development of applications utilizing Reality services. Below are some representative products:

Silicon Graphics Open Inventor—an object-oriented 3-D toolkit used to build interactive 3-D graphics using objects such as cameras, lights and 3-D viewers; provides a simple event model and animation engine.

VREAM VRCreator—a toolkit for building interactive virtual reality environments; supports gravity, elasticity, and throw-ability of objects, textured and colored 3-D objects and construction of networked multi-participant worlds. Provides support for ActiveX.

DimensionX Liquid Reality—VRML 2.0 platform written in Java, which provides both a viewer for viewing VRML content and a toolkit of Java classes for creating powerful 3-D applications. It supports more than 250 classes for 3-D content creation.

Report and Print 1316

Report and Print Services support the creation and on-screen previewing of paper or photographic documents which contain screen data, application data, graphics or images.

Implementation Considerations

Printing services must take into consideration varying print scenarios common in Netcentric environments, including: varying graphics/file types (Adobe .PDF, .GIF, .JPEG), page margins and breaks, HTML constructs including tables and frames, headers/titles, extended character set support, etc.

Is there a need for reporting or decision support?

Use report writers when you need to transform user data into columnar reports, forms, or mailing lists that may require sophisticated sorting and formatting facilities. This generally occurs for two reasons. The first is building "production reports" (i.e., reports that are built once and then used repeatedly, generally on a daily/weekly/monthly basis). The second is ad hoc reporting and decision support. Products targeted at one or the other use will have different facilities. (source is market research)

Is there a need to ease access to corporate data?

Use report writers when users require easy and quick access to corporate data. Since developers can deliver reports as run-time applications, users are shielded from having to learn complicated databases in order to access information. All a user has to do to retrieve the data is click on an icon to launch a report. Because these run-time applications are smaller than normal applications, they launch faster and require very little training to operate. (source is market research)

Product Considerations

Buy vs. Build

There are numerous packaged controls on the market today that support basic report and print capability. However, a careful evaluation of both functions and features and vendor viability must be completed before a decision can be made. Architects must additionally be sure to evaluate that controls will support all required environments, are small in size and extensible as requirements demand.

How important is performance?

In general, performance of data access and printing should be considered. Some typical benchmark tests include table scan, single-table report, joined table report, and mailing label generation times. (source is market research)

What is the budget?

Per developer costs as well as run time licensing fees, maintenance costs, support fees, and upgrade charges should be considered.

Do I have another component that satisfies this requirement?

Many databases and application development tools are shipped with built in or add-on report writing capability. However, stand-alone report writers: (1) are more powerful and flexible, especially when dealing with multiple data sources and a wide variety of formats; (2) can retrieve information from more data sources than the bundled report writers and can create reports from several data sources simultaneously; (3) excel in ease of use, both in designing and generating reports; (4) offer better tools and more predefined reports; and (5) have faster engines. (source is market research)

Does the product integrate with the existing or proposed architecture?

It is important to consider how well a product integrates with desktop tools (word processing, spreadsheet, graphics etc.) and application development programs. These items can be used to extend the capabilities of the reporting package.

What databases does the product support?

A product should support the most widely used PC file formats and Client/Server databases. It may be necessary to consider the type of support. For example, native database interfaces tend to have better performance than open standards such as ODBC. Another possible consideration is how well the product accesses multiple files or databases. (source is market research)

What are the required features of the tool?

Features to look for include but are not limited to:

- WYSIWYG print preview
- Ability to create views—prevents users from getting overwhelmed with choices when selecting a table, acts as a security system by controlling which users have access to certain data, and increases performance since only the data users need gets downloaded to the report engine, thereby reducing network traffic.
- Data dictionary—store predefined views, formats, and table and field name aliases
- User friendly query tool
- Scripting or macro language
- Supported data types and formats
- Formatting capabilities (page orientation, fonts, colors, margins, condensed printing, etc.)
- Supported report types
- Aggregate functions.

Is the intention to create production reports or facilitate end user queries?

Ease of use will be of major importance for end user query and decision support type applications. In contrast, functionality that allows for the implementation of complex reporting requirements will outweigh ease of use for applications whose objective is creating production reports.

Direct Manipulation 1318

Direct Manipulation Services enable applications to provide a direct manipulation interface (often called "drag & drop"). A direct manipulation interface allows users to manage multiple "application objects" by manipulating visual representations of those objects. For example, a user may sell stock by dragging "stock" icons out of a "portfolio" icon and onto a "trading floor" icon. Direct Manipulation Services can be further divided as follows:

- Display: These services enable applications to represent application objects as icons and control the display characteristics (color, location, etc.) of these icons.
- Input/Validation: These services enable applications to invoke validation or processing logic when an end user "acts on" an application object. "Acting on" an object may include single clicking, double clicking, dragging, or sizing.

Input Device 1320

Detect user input from a variety of input technologies (i.e. pen based, voice recognition, touch-screen, mouse, digital camera, etc.).

Implementation Considerations

Voice response systems are used to provide prompts and responses to users through the use of phones. Voice response systems have scripted call flows which guide a caller through a series of questions. Based on the users key pad response, the voice response system can execute simple calculations, make database calls, call a mainframe legacy application or call out to a custom C routine. Leading voice response system vendors include VoiceTek and Periphonics.

Voice recognition systems are becoming more popular in conjunction with voice response systems. Users are able to speak into the phone in addition to using a keypad. Voice recognition can be extremely powerful technology in cases where a key pad entry would be limiting (e.g., date/time or location). Sophisticated voice recognition systems have been built which support speaker-independence, continuous speech and large vocabularies.

Information 1002,1004

Figure 14:
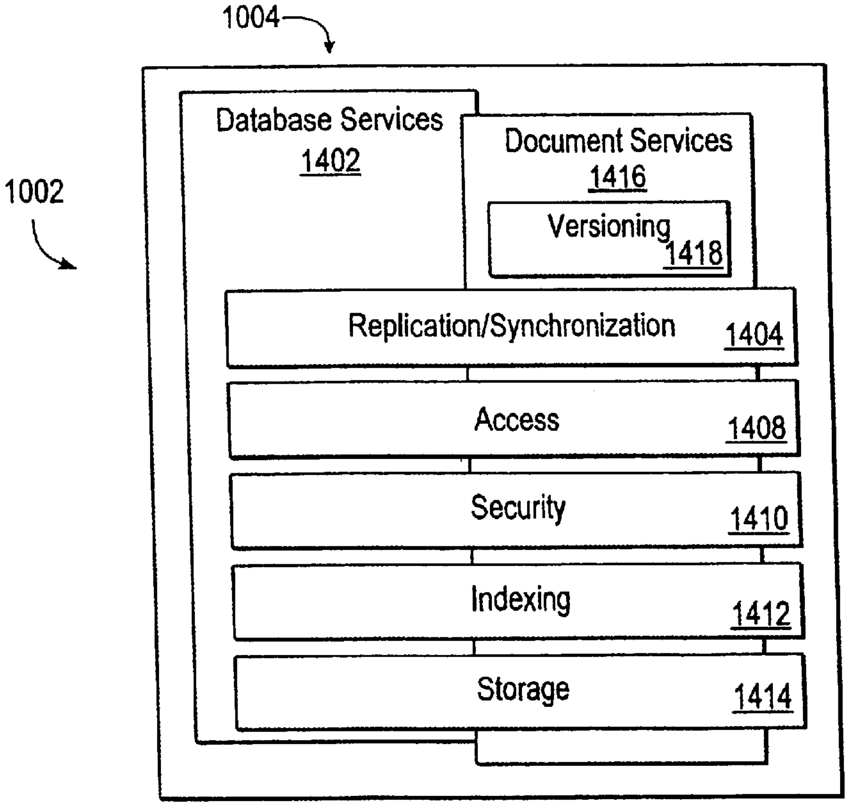
FIG. 14 illustrates several components of the Information Services of the present invention.

FIG. 14 illustrates several components of the Information Services of the present invention. Information Services manage electronic data assets and enable applications to access and manipulate data stored locally or remotely in documents or databases. They minimize an application's dependence on the physical storage and location within the network. Information Services can be grouped into two categories: Database Services, and Document Services Database Services 1402

Database Services are responsible for providing access to a local or a remote database, maintaining integrity of the data within the database and supporting the ability to store data on either a single physical platform, or in some cases across multiple platforms. These services are typically provided by DBMS vendors and accessed via embedded or call-level SQL variants and supersets. Depending upon the underlying storage model, non-SQL access methods may be used instead.

Many of the Netcentric applications are broadcast-type applications, designed to market products and/or publish policies and procedures. Furthermore, there is now a growth of Netcentric applications that are transaction-type applications used to process a customers sales order, maintenance request, etc. Typically these type of applications require integration with a database manager. Database Services include: Storage Services, Indexing Services, Security Services, Access Services, and Replication/Synchronization Services Implementation Considerations The core database services such as Security, Storage and Access are provided by all major RDBMS products, whereas the additional services of Synchronization and Replication are available only in specific products.

Product Considerations

Oracle 7.3; Sybase SQL Server; Informix; IBM DB/2; Microsoft SQL Server

Oracle 7.3—market leader in the Unix client/server RDBMS market, Oracle is available for a wide variety of hardware platforms including MPP machines. Oracles market position and breadth of platform support has made it the RDBMS of choice for variety of financial, accounting, human resources, and manufacturing application software packages. Informix—second in RDBMS market share after Oracle, Informix is often selected for its ability to support both large centralized databases and distributed environments with a single RDBMS product. Sybase SQL Server—third in RDBMS market share, Sybase traditionally focused upon medium-sized databases and distributed environments; it has strong architecture support for database replication and distributed transaction processing across remote sites.

IBM DB2—the leader in MVS mainframe database management, IBM DB2 family of relational database products are designed to offer open, industrial strength database management for decision support, transaction processing and line of business applications. The DB2 family now spans not only IBM platforms like personal computers, AS/400 systems, RISC System/6000 hardware and IBM mainframe computers, but also non-IBM machines such as Hewlett-Packard and Sun Microsystems. Microsoft SQL Server—the latest version of a high-performance client/server relational database management system. Building on version 6.0, SQL Server 6.5 introduces key new features such as transparent distributed transactions, simplified administration, OLE-based programming interfaces, improved support for industry standards and Internet integration.

Replication/Synchronization 1404

Replication Services support an environment in which multiple copies of databases must be maintained. For example, if ad hoc reporting queries or data warehousing applications can work with a replica of the transaction database, these resource intensive applications will not interfere with mission critical transaction processing. Replication can be either complete or partial. During complete replication all records are copied from one destination to another, while during partial replication, only a subset of data is copied, as specified by the user or the program. Replication can also be done either real-time or on-demand (i.e., initiated by a user, program or a scheduler). The following might be possible if databases are replicated on alternate server(s): better availability or recoverability of distributed applications; better performance and reduced network cost, particularly in environments where users are widely geographically dispersed; etc.

Synchronization Services perform the transactions required to make one or more information sources that are intended to mirror each other consistent. This function may especially valuable when implementing applications for users of mobile devices because it allows a working copy of data or documents to be available locally without a constant network attachment. The emergence of applications that allow teams to collaborate and share knowledge has heightened the need for Synchronization Services in the execution architecture.

The terms Replication and Synchronization are used interchangeably, depending on the vendor, article, book, etc. For example, when Lotus Notes refers to Replication, it means both a combination of Replication and Synchronization Services described above. When Sybase refers to Replication it only means copying data from one source to another.

Implementation Consideration

Replication/Synchronization Services are sometimes supplied as part of commercial databases, document management systems or groupware products such as Lotus Notes, Microsoft Exchange, Oracle, etc.

With Windows 95 and Windows NT 4.0, Microsoft has also introduced the concept of Replication/Synchronization Services into the operating system. Through the briefcase application users can automatically synchronize files and SQL data between their Windows PC and a Windows NT server. Underlying this application is the user-extensible Win32 synchronization services API which can be used to build custom synchronization tools.

Are changes in data usage anticipated?

Data can be dynamically changed to accommodate changes in how the data is used.

Is it desirable to shield the user from the data access process?

A replicated database often consolidates data from heterogeneous data sources, thus shielding the user from the processes required to locate, access and query the data.

What are the availability requirements of the system?

Replication provides high availability. If the master database is down, users can still access the local copy of the database.

Is there a business need to reduce communication costs?

Depending on the configuration (real time vs. nightly replication, etc.), there is a potential to reduce communications costs since the data access is local.

Is scalability an issue?

With users, data, and queries spread across multiple computers, scalability is less of a problem.

Can users benefit from the increased performance of local data access?

Access to replicated data is fast since data is stored locally and users do not have to remotely access the master database. This is especially true for image and document data which cannot be quickly accessed from a central site. Making automatic copies of a database reduces locking conflicts and gives multiple sets of users better performance than if they shared the same database.

Product Considerations

What is the current or proposed environment?

Platforms supported as well as source and target DBMS should be considered.

What are the technical requirements?

Products differ in features such as complete refresh vs. differential refresh (replication of changes), replication granularity (row, table, database), method of capturing changes (snapshot, SQL statement intercept, trigger-based, log-based), method of propagating copies (push, pull), propagation timing controls (database event-driven, scheduled based on interval, scheduled based on application event-driven, manually invoked), and conflict resolution mechanisms. Also important is what management utilities are available with the product.

Are available resources and issue?

Products vary in the amount of resources required to install and operate the system.

What are the business requirements?

Three key considerations are:

Who owns and uses the data? Replication products support one or more of the three ownership models: Primary site ownership—data is owned by one site; Dynamic site ownership—data owned by one site, however site location can change; and Shared site ownership—data ownership is shared by multiple sites.

Which of the four basic types of replication style is appropriate? The four styles are: Data dissemination—portions of centrally maintained data are replicated to the appropriate remote sites; Data consolidation—data is replicated from local sites to a central site where all local site data is consolidated; Replication of logical partitions—replication of partitioned data; and Update anywhere—multiple remote sites can possible update same data at same time.

What is the acceptable latency period (amount of time the primary and target data can be out of synch)? There are three basic replication styles depending on the amount of latency that is acceptable: Synchronous—real-time access for all sites (no latency); Asynchronous near real-time—short period of latency for target sites; Asynchronous batch/periodic—predetermined period of latency for all sites.

Do I already have a component that satisfies this criteria?

Many DBMS vendors ship replication products as either part of the base package or as an additional feature.

Possible Product Options

Sybase Replication Server; Oracle Symmetric Replication; CA-Ingres Replicator; InfoPump; DataPropagator Relational; Informix Replicator Access 1408

Access Services enable an application to retrieve data from a database as well as manipulate (insert, update, delete) data in a database. SQL is the primary approach for accessing records in today's database management systems.

Client-server systems often require data access from multiple databases offered by different vendors. This is often due to integration of new systems with existing legacy systems. The key architectural concern is in building the application where the multi-vendor problem is transparent to the client. This provides future portability, flexibility and also makes it easier for application developers to write to a single database access interface. Achieving database access transparency requires the following:

Standards Based SQL API—this approaches uses a single, standards based set of APIs to access any database, and includes the following technologies: Open Database Connectivity (ODBC), Java Database Connectivity (JDBC), and Object Linking and Embedding (OLE DB).

SQL Gateways provide a mechanism for clients to transparently access data in a variety of databases (e.g., Oracle, Sybase, DB2), by translating SQL calls written using the format and protocols of the gateway server or primary server to the format and protocols of the target database. Currently there are three contending architectures for providing gateway functions:

Distributed Relational Data Access (DRDA) is a standard promoted by IBM for distributed data access between heterogeneous databases. In this case the conversion of the format and protocols occurs only once. It supports SQL89 and a subset of SQL92 standard and is built on top on APPC/APPN and TCP/IP transport stacks.

IBI's EDA/SQL and the Sybase /MDI Open Server use SQL to access relational and non-relational database systems. They use API/SQL or T-SQL respectively as the standard interface language. A large number of communication protocols are supported including NetBIOS, SNA, DecNET, TCP/IP. The main engine translates the client requests into specific server calls. It handles security, authentication, statistics gathering and some system management tasks.

Implementation Considerations

Gateways may create bottlenecks, because all the clients go through a single gateway.

Security 1410

Security Services enforce access control to ensure that records are only visible or editable by authorized people for approved purposes. Most database management systems provide access control at the database, table, or row level as well as concurrency control.

Implementation Considerations

Will the application be used in a distributed environment?

In a distributed environment, the need exists to provide access to the corporate data and resources in a secure and controlled manner. This access depends on the role of the user, the user group, etc. within that environment. Since security is an architecture component where functionality and robustness vary across engagements, the architectures usually provide a base set of security functions. These functions target securing the systems corporate data and resources, as opposed to securing an applications detailed functions.

The security component prevents unauthorized users from accessing corporate data/resources by providing the users with access codes—password & ID—that allows the user to login to the system or execute any (or a particular) application.

Security components can restrict access to functions within an application based on a users security level. The highest level security is whether the user has access to run the application. The next level checks if the user has access to functions within the application, such as service calls or windows. At an even lower level, the security component could check security on more granular functions, such as widgets on a window.

Security usually resides on both the client and server platform in a distributed environment. True security should always be placed on the server platform, to protect the system through access outside of a client application.

Is there a direct/indirect relationship between the user role/group and the data/services?

There are situations where it is required for the system to maintain the relationship of the users role and the users access to specific system services/resources. For example, a database administrator will have read-write-delete access to the database, whereas a sales manager will have only read access to it for viewing the data in various forms. The security component should provide the functionality for validating the users resource access privileges based on the role of the user.

Indexing 1412

Indexing Services provide a mechanism for speeding up data retrieval. In relational databases one or more fields can be used to construct the index. So when a user searches for a specific record, rather than scanning the whole table sequentially the index is used to find the location of that record faster.

Storage 1414

Storage Services manage data physical storage. These services provide a mechanism for saving information so that data will live beyond program execution. Data is often stored in relational format (an RDBMS) but may also be stored in an object-oriented format (OODBMS) or other formats such as IMS, VSAM, etc.

Document Services 1416

Document Services provide similar structure and control for documents that database management systems apply to record oriented data. A document is defined as a collection of objects potentially of different types (e.g., structured data, unstructured data, images, multi-media) a business user deals with. An individual document might be a table created using a spreadsheet package such as Microsoft Excel, a report created using a word processing package such as Lotus AmiPro, a Web page created using an HTML authoring tool, unstructured text or a combination of these object types. Regardless of the software used to create and maintain the component parts, all parts together constitute the document, which is managed as a single entity.

Netcentric applications that are executed from a browser are particularly well suited for serving up document style information. If the Web application consists of more than just a few HTML documents, integration with a document management system should be considered. Document Services include: Storage Services, Indexing Services, Security Services, Access Services, Replication/Synchronization Services, and Versioning Services Possible Product Options Documentum Server; Saros; PC Docs Documentum—Documentum Enterprise Document Management System (EDMS) automates and accelerates the creation, modification, and reuse of business-critical documents, Web pages, and other unstructured data and all of the collaborative efforts involved.

Saros—Saros Discovery Suite is the next generation client/server solution that integrates Saros Document Manager, FileNet Ensemble and Watermark Client to provide powerful, tightly-integrated electronic document management, workflow, and document-imaging capabilities.

Versioning 1418

Versioning Services maintain a historical record of the changes to a document over time. By maintaining this record, these services allow for the re-creation of a document as it looked at any given point in time during it's evolution. Additional key versioning features record who made changes when and why they were made.

Replication/Synchronization 1404

Replication Services support an environment in which multiple copies of documents must be maintained. A key objective is that documents should be shareable and searchable across the entire organization. Therefore, the architecture needs to provide logically a single repository, even though the documents are physically stored in different locations. The following might be possible if documents are replicated on alternative server(s): better availability or recoverability of a distributed application; better performance; reduced network cost; etc.

Synchronization Services perform the transactions required to make one or more information sources that are intended to mirror each other consistent. They support the needs of intermittently connected users or sites. Just like for databases, these services are especially valuable for users of mobile devices that need be able to work locally without a constant network connection and then be able to synchronize with the central server at a given point in time.

Implementation Considerations

Products such as Lotus Notes and Microsoft Exchange allow remote users to replicate documents between a client machine and a central server, so that the users can work disconnected from the network. When reattached to the network, users perform an update that automatically exchanges information on new, modified and deleted documents.

Note: Both Lotus Notes and MS Exchange provide a limited subset of the Document Services described in this section. This should be carefully evaluated when considering these products to provide document management services.

Access 1408

Access Services support document creation, maintenance and retrieval. These services allow users to capture knowledge or content through the creation of unstructured information, i.e. documents. Access Services allow users to effectively retrieve documents that were created by them and documents that were created by others. Documents can be comprised of many different data types, including text, charts, graphics, or even audio and video.

Security 1410

Documents should be accessed exclusively through the document management backbone. If a document is checked-in, check-out, routed, viewed, annotated, archived, or printed it should be done only by users with the correct security privileges. Those access privileges should be able to be controlled by user, role, and group. Analogous to record locking to prevent two users from editing the same data, document management access control services include check-in/check-out services to limit concurrent editing.

Indexing 1412

Locating documents and content within documents is a more complex problem and involves several alternative methods. The Windows file manager is a simplistic implementation of a hierarchical organization of files and collection of files. If the user model of where documents should be stored and found can be represented in this way, the use of structure and naming standards can be sufficient. However, a hierarchical document filing organization is not suitable for many types of document queries (e.g., retrieving all sales order documents for over $1,000).

Therefore, most document management products provide index services that support the following methods for searching document repositories:

Attribute Search—scans short lists (attributes) of important words that are associated with a document and returns documents that match the search criteria. For example, a user may query for documents written by a specific author or created on a particular date. Attribute search brings the capabilities of the SQL-oriented database approach to finding documents by storing in a database the values of specially identified fields within a document and a reference to the actual document itself. In order to support Attribute Search an index maintains documents' attributes, which it uses to-manage, find and catalog documents. This is the least complicated approach of the searching methods.

Full-text Search—searches repository contents for exact words or phrases and returns documents that match the search criteria. In order to facilitate Full-text Search, full-text indexes are constructed by scanning documents once and recording in an index file which words occur in which documents. Leading document management systems have full-text services built-in, which can be integrated directly into applications.

Context Search—searches repository contents for exact words or phrases. Also, searches for related words or phrases by using synonyms and word taxonomies. For example, if the user searches for auto, the search engine should look for car, automobile, motor vehicle, etc.

Boolean Search—searches repository contents for words or phases that are joined together using boolean operators (e.g., AND, OR, NOT). Same type of indexes are used for Boolean Search as for Full-Text Search.

The following products are used to index and search Web and non-Web documents:

Verity Topic—delivers accurate indexing, searching and filtering of a wide variety of information sources and formats. Verity Topic is integrated directly into several document management products, allowing systems to full-text index its unstructured information. Verity Topic also offers a variety of products to help full-text index Web sites.

Fulcrum—provides a variety of robust, multi-platform indexing and retrieval products that deliver full-function text retrieval capabilities. Fulcrums products are typically integrated with custom databases, Web sites and document management systems.

The following products are mainly used for Web documents:

Microsoft Index Server 1.1—allows for search of Web documents, including Microsoft Word and Microsoft Excel. It works with Windows NT Server 4.0 and Internet Information Server 2.0 or higher to provide access to documents stored on an intranet or Internet site. Index Server supports full-text searches and retrieves all types of information from the Web browser including HTML, text, and all Microsoft Office documents, in their original format.

Netscape Catalog Server 1.0—provides an automated search and discovery server for creating, managing, and keeping current an online catalog of documents residing on corporate intranets and the Internet. Catalog Server offers query by full text, category, or attributes such as title, author, date, etc. It also supports multiple file formats, including HTML, Word, Excel, PowerPoint, and PDF.

Storage 1414

Storage Services manage the document physical storage. Most document management products store documents as objects that include two basic data types: attributes and content. Document attributes are key fields used to identify the document, such as author name, created date, etc. Document content refers to the actual unstructured information stored within the document. Generally, the documents are stored in a repository using one of the following methods:

Proprietary database—documents (attributes and contents) are stored in a proprietary database (one that the vendor has specifically developed for use with their product).

Industry standard database—documents (attributes and contents) are stored in an industry standard database such as Oracle or Sybase. Attributes are stored within traditional database data types (e.g., integer, character, etc.); contents are stored in the database's BLOB (Binary Large Objects) data type.

Industry standard database and file system—Documents' attributes are stored in an industry standard database, and documents' contents are usually stored in the file-system of the host operating system. Most document management products use this document storage method, because today, this approach provides the most flexibility in terms of data distribution and also allows for greater scalability.

Communication 1006,1008

Figure 15:
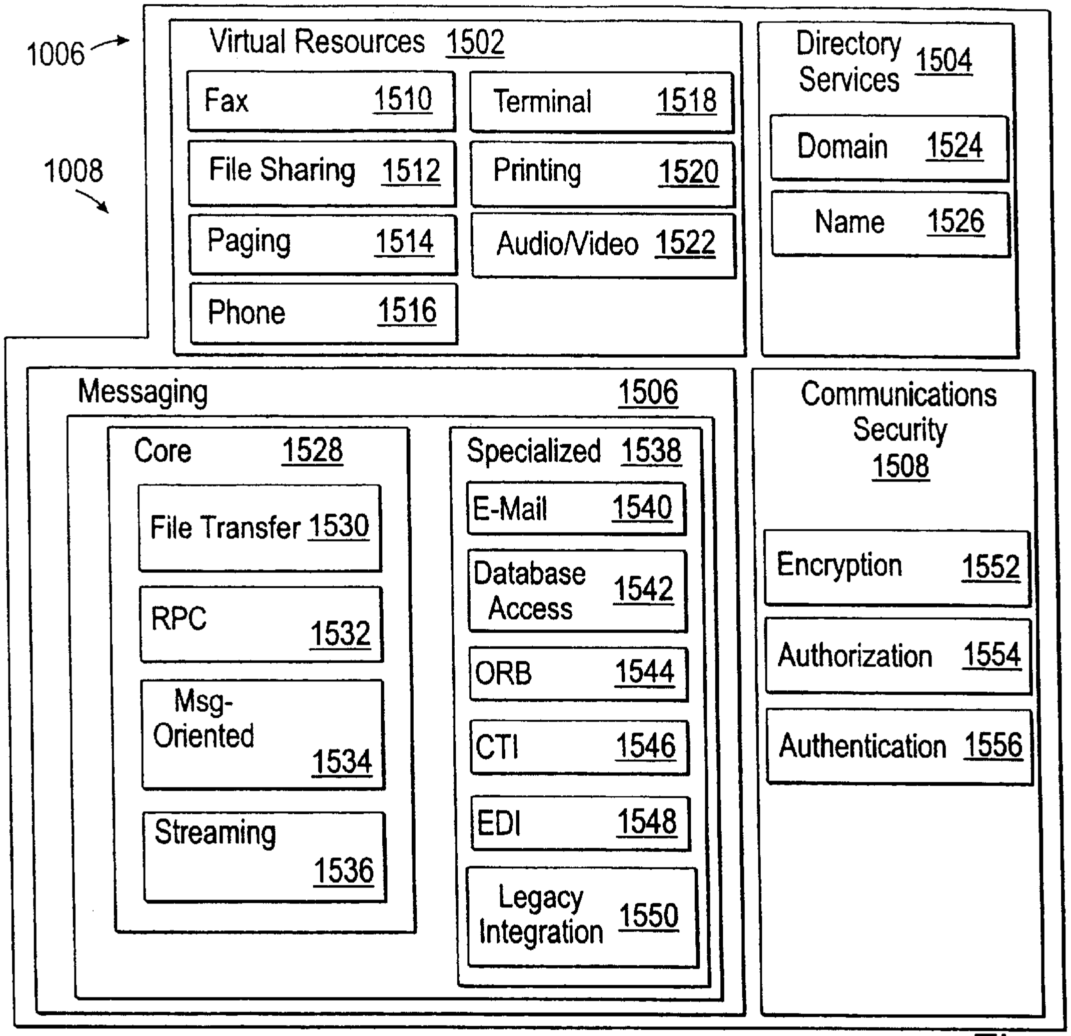
FIG. 15 depicts the four major categories of functionality that the Network services provided by the Communications Services are grouped into.

As illustrated in FIG. 15, Network services provided by the Communications Services layer are grouped into four major categories of functionality: Virtual Resource, Directory, Messaging, and Security services 1502,1504, 1506,1508.

Virtual Resource services proxy or mimic the capabilities of specialized, network connected resources. This allows a generic network node to emulate a specialized physical device. In this way, network users can interface with a variety of specialized resources.

Directory services play a key role in network architectures because of their ability to unify and manage distributed environments. Managing information about network resources involves a variety of processes ranging from simple name/address resolution to the logical integration of heterogeneous systems to create a common view of services, security, etc.

Messaging services transfer formatted information from one process to another. These services shield applications from the complexity of the network transport services.

Call centers and customer service centers are integral parts of many business operations. Call centers have enhanced business processes by managing telephone contact with potential customers, with the objective of improving the Quality of Service (QoS). Several customer and business drivers are motivating a transition from traditional cost-based call centers to more strategic centers focused on customer interaction.

Communications Security services control access to network-attached resources. Combining network Security services with security services in other parts of the system architecture (e.g., application and database layers) results in robust security.

Implementation Considerations

Is data translation required?

Communications middleware can translate data into a format that is compatible with the receiving process. This may be required in a heterogeneous environment. An example is data translation from ASCII-to-EBCDIC. It is important to note that data translation may not be provided by all middleware products.

Are additional communications services required?

Communications middleware can provide additional communications services that may be required by the applications. Additional services include dynamic message routing, guaranteed delivery, broadcasting, queuing, and priority delivery. These common services are usually provided in the communications middleware rather than addressing them in each application separately. Different communications middleware products provide different services. Additionally, many middleware packages, such as Tuxedo, provide OLTP functionality.

Is a packaged middleware solution desired?

Depending on the functionality required, communications middleware can be very complex to custom develop. In addition, products have evolved to a point where proven solutions exist. Based on this, it can be desirable to buy communications middleware rather than to build it. Considerations of time, budget, skills, and maintenance should be taken into account when selecting between a packaged middleware product and custom developed middleware. In some instances, custom developed middleware may still be preferred.

What is the clients middleware direction?

There is a definite functionality overlap between communications middleware and several other middleware components such as transaction services and information access. In addition, communications middleware may be provided by various CASE tools. An example of this is the Distribution Services component of FCP. Because of this overlap, it is important to understand the clients overall direction toward middleware and the specific middleware functionality required by the overall solution.

Is a simplified developers interface important?

The simplified interface associated with communications middleware can help to reduce the complexity of developing Netcentric applications. The simplified interface helps reduce the development complexity by insulating the business applications from the network protocols. Because of this, application developers do not need to understand the intricacies and somewhat cryptic APIs associated with network transport protocols.

Is location transparency required?

Communication middleware allows the client application to access any service on any physical server in the network without needing to know where it is physically located. This capability may be required in an environment with many physical servers or in an environment that is very dynamic. It is important to note that location transparency may not be provided by all middleware products.

Does the application need to run on multiple platforms?

Communications middleware is designed to allow applications to access various transport protocols from various vendors. From a network interface perspective, it should be easier to port an application from one computing platform to another if the application is using communications middleware. Of course, other porting issues will need to be considered.

Virtual Resources 1502

Virtual Resource services proxy or mimic the capabilities of specialized, network-connected resources. This allows a generic network node to emulate a specialized physical device. In this way, network users can interface with a variety of specialized resources. An examples of a Virtual Resource service is the capability to print to a network printer as if it were directly attached to a workstation.

Fax 1510

Fax Services provide for the management of both in-bound and out-bound fax transmissions. If fax is used as a medium for communicating with customers or remote employees, in-bound fax services may be required for centrally receiving and electronically routing faxes to the intended recipient. Out-bound fax services can be as simple as supporting the sharing on the network of a single fax machine or group of machines for sending faxes.

Fax services can provide centrally managed faxing capabilities, thus eliminating the need for fax modems on every workstation. A fax server generally provides Fax services to clients, such as receiving, queuing, and distributing incoming faxes and queuing and sending outgoing faxes. Clients can view faxes and generate faxes to be sent.

Applications may compose and transfer faxes as part of notifying users or delivering information. For example, an application may use Fax services to add customer-specific information to a delivery receipt form and fax the form to a customer.

Implementation Considerations

More sophisticated out-bound fax architecture services are required for supporting fax-back applications. Fax-back applications, when coupled with Computer Telephone Integration (CTI) are popular for automating customer requests for product or service information to be faxed to them.

Possible Product Options

Cheyenne Softwares Faxserve; Lotus Fax Server for Lotus Notes; Sirens Siren Fax

The following are examples of fax servers:

The Lotus® Fax Server (LFS)—provides fax services to users working on a network running NotesMail®. In addition to combining outgoing and incoming fax capabilities in a single product, the LFS provides additional features, such as automatic routing, and print-to-fax driver software that extends fax capabilities to any Windows-based Notes client. The LFS supports a wide variety of fax modems, fax cards and fax file formats through the incorporation of device technologies from Optus Software, Inc.

Cheyenne Software's Faxserve

The following is an example of a product that allows applications to generate faxes:

Siren's Siren Fax

File Sharing 1512

Figure 16:
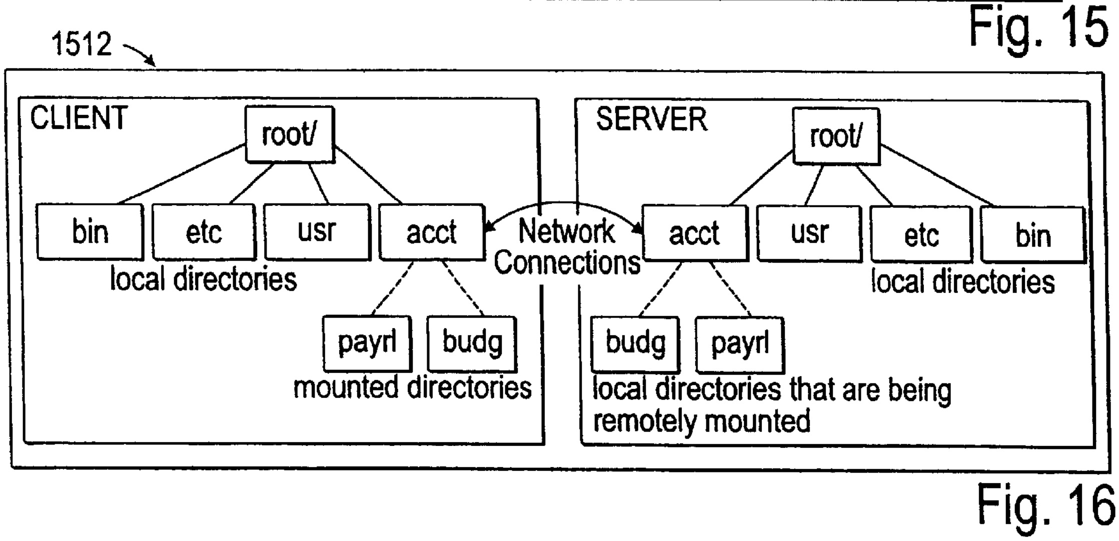
FIG. 16 illustrates File Sharing services.

FIG. 16 illustrates File Sharing services 1512. File Sharing services allow users to view, manage, read, and write files that may be located on a variety of platforms in a variety of locations. File Sharing services enable a unified view of independent file systems. This is represented in FIG. 16, which shows how a client can perceive remote files as being local.

File Sharing services can provide the following capabilities:

Transparent access—access to remote files as if they were local

Multi-user access—distribution and synchronization of files among multiple users, including file locking to manage access requests by multiple users File access control—use of Security services (user authentication and authorization) to manage file system security Multi-platform access—access to files located on various platforms (e.g., UNIX, NT, etc.)

Integrated file directory—a logical directory structure that combines all accessible file directories, regardless of the physical directory structure Fault tolerance—use of primary and replica file servers to ensure high availability of file system Scalability—ability to integrate networks and distributed file systems of various sizes Possible Product Options Novell's NetWare/IntranetWare; Microsoft's Windows NT Server; Sun Microsystems NFS and WebNFS; Novell's IntranetWare NFS Services; IBM/Transarcs Distribute File System (DFS); Transarc's AFS The following are examples of File Sharing products:

Novell's NetWare/IntranetWare—Novell's NetWare network operating system includes distributed file services, supported by the NetWare Core Protocol (NCP). NetWare Directory Services (NDS) manages naming and security for files on distributed platforms.

Microsoft's Windows NT Server

Server Message Block (SMB)—native file-sharing protocol in Windows 95, Windows NT, and OS/2.

Common Internet File System (CIFS)—an enhancement to SMB for distributed file systems in a TCP/IP environment.

Distributed File System (Dfs)—a utility for Windows NT Server that provides file services in a Microsoft environment.

Network File System (NFS)—NFS is a native UNIX file access protocol and is also available as an operating system add-on product that provides distributed file services. Sun Microsystems introduced NFS in 1985. NFS has been widely adopted and has been ported to a variety of platforms.

The following are examples of products that provide NFS services.

Sun Microsystems' NFS and WebNFS Novell's IntranetWare NFS Services

AFS—A distributed file system for distributed UNIX networks; derived from Carnegie-Mellon University's Andrew File System. Similar to NFS, but differs in terms of the name space, system performance, security, etc. AFS is distributed by Transarc.

IBM/Transarc's Distribute File System (DFS)—a scaleable distributed file system that offers replication, security, etc.

Paging 714

Wireless short messaging (i.e., paging) can be implemented through wireless systems such as paging networks, GSM voice/data networks, PCS voice/data networks, and dedicated wireless data networks. Paging virtual resource services provide the message formatting and display functionality that allows network nodes to interface with wireless paging systems. This service emulates the capabilities of one-way and two-way pagers. Paging systems allow pages to be generated in various ways:

E-mail messages to a specified mailbox

DTMF (touch tone) signaling to a voice response system

Encoded digital messages transferred into a paging provider gateway

Messages transferred to a locally attached two-way wireless pager

Possible Product Options

TelAlert; e-mail Systems e-mail systems—some e-mail systems and fax servers can be configured to generate pages to notify users when a defined event occurs such as e-mail/fax arriving.

Telamon's TelAlert—TelAlert provides notification capabilities for UNIX systems. For example, it can page support personnel in the event of system problems.

Phone 1516

Phone virtual resource services extend telephony capabilities to computer platforms. For example, an application on a desktop computer can place and receive telephone calls for the user. Phone virtual resource services may be used in customer care centers, help desks, or any other environment in which it is useful for a computer to replace a telephone handset.

Phone services enable clients, servers, and specialized telephony nodes (PBXs, ACDs, etc.) to control the telephony environment through the following telephony controls:

Call control
- Controls telephone features
- Controls recorded messages
- Manipulates real time call activities (e.g., make call, answer, transfer, hold, conference, mute transfer, release, route call, call treatments and digits collected)

Telephone status control
- Controls telephone status functions
- Logs users in and out of the system
- Sets ready, not ready, and make busy statuses for users The following are examples of uses of Phone virtual resources:

PC Telephony—PC telephony products allow desktop computers to act as conduits for voice telephone calls.

Internet Telephony—Internet telephony products enable voice telephone calls (and faxing, voice mail retrieval, etc.) through the Internet. For example, an Internet telephony product can accept voice input into a workstation, translate it into an IP data stream, and route it through the Internet to a destination workstation, where the data is translated back into audio.

Desktop Voice Mail—Various products enable users to manage voice mail messages using a desktop computer.

Possible Product Options

Lucent PassageWay; COM2001s TransCOM; NetSpeaks WebPhone; VocalTecs Internet Phone; IDTs Net2Phone; Octel Communications Unified Messenger The following are examples of vendors that provide PC telephony products:

Lucent PassageWay—suite of products that connect PCs to PBXs.

COM2001's TransCOM—voice, data and call-management system (dialing, voice mail, faxing, voice recognition, caller ID, etc.) for personal computers.

The following are examples of Internet telephony products:

NetSpeak's WebPhone

VocalTec's Internet Phone

IDT's Net2Phone

The following is an example of a desktop voice mail product:

Octel Communication's Unified Messenger

Terminal 1518

Terminal services allow a client to connect to a non-local host via a network and to emulate the profile (e.g., the keyboard and screen characteristics) required by the host application. For example, when a workstation application logs on to a mainframe, the workstation functions as a dumb terminal. Terminal Services receive user input and send data streams back to the host processor. If connecting from a PC to another PC, the workstation might act as a remote control terminal (e.g., PCAnywhere).

The following are examples of Terminal services:

- Telnet—a simple and widely used terminal emulation protocol that is part of the TCP/IP communications protocol. Telnet operates establishing a TCP connection with the remotely located login server, minicomputer or mainframe. The client's keyboard strokes are sent to the remote machine while the remote machine sends back the characters displayed on the local terminal screen.
- 3270 emulation—emulation of the 3270 protocol that is used by IBM mainframe terminals.
- tn3270—a Telnet program that includes the 3270 protocol for logging onto IBM mainframes; part of the TCP/IP protocol suite.
- X Window System—allows users to simultaneously access applications on one or more UNIX servers and display results in multiple windows on a local display. Recent enhancements to XWS include integration with the Web and optimization of network traffic (caching, compression, etc.).
- Remote control—While terminal emulation is typically used in host-based environments, remote control is a sophisticated type of client/server Terminal service. Remote control allows a client computer to control the processing on a remote desktop computer. The GUI on the client computer looks as if it is the GUI on the remote desktop. This makes it appear as if the remote applications are running on the client.
- rlogin—a remote terminal service implemented under BSD UNIX. The concept behind rlogin is that it supports "trusted" hosts. This is accomplished by having a set of machines that share common file access rights and logins. The user controls access by authorizing remote login based on a remote host and remote user name.

Possible Product Options Hummingbird's Exceed; Network Computing Devices' PC-Xware; Citrix WinFrame; Carbon Copy; pcANYWHERE; Stac's Reachout; Traveling Software's LapLink The following are examples of X Window System products:

Hummingbird's Exceed

Network Computing Devices' PC-Xware

The following are examples of remote control products:

Citrix's WinFrame

Microcom's Carbon Copy

Symantec's pcANYWHERE

Stac's Reachout

Traveling Software's LapLink

Printing 1520

Print services connect network workstations to shared printers. The administration of Print Services is usually handled by a print server. Depending on the size of the network and the amount of resources the server must manage, the print server may run on a dedicated machine or on a machine that performs other server functions. A primary function of print servers is to queue print jobs sent to network printers. The queued jobs are stored in a print buffer on the print server and are sent to the appropriate network printer as it becomes available. Print services can also provide the client with information including print job status and can manage in-progress print jobs.

Possible Product Options

Novell's Netware Distributed Print Services (NDPS); Novell's Netware UNIX Print Services; Microsoft; Windows NT Server; Line Printer Daemon (LPD)

The following are examples of print server products:

- Novell's Netware Distributed Print Services (NDPS)—provides central management of print services for NetWare networks.
- Novell's Netware UNIX Print Services—a supplement to Novell's NetWare 4.1 server which allows NetWare and UNIX clients to share UNIX or Netware printers.
- Microsoft Windows NT Server—provides central management of print services for NT networks.
- Line Printer Daemon (LPD)—UNIX print management facilities, which include client and server utilities for spooling print jobs. Related programs include lpr (sends print job to spool) and lp (sends request to printer).

Audio/Video 1522

Audio/Video services allow nodes to interact with multimedia data streams. These services may be implemented as audio-only, video-only, or combined audio/video:

- Audio services—Audio services allow components to interface with audio streams such as the delivery of music or radio content over data networks.
- Video services—Video services allow components to interface with video streams such as video surveillance. Video services can add simple video monitor capabilities to a computer, or they can transform the computer into a sophisticated video platform with the ability to generate and manipulate video.
- Combined Audio/Video services—Video and audio content is often delivered simultaneously. This may be accomplished by transferring separate audio and video streams or by transferring a single interleaved stream. Examples include video conferencing and television (traditional or interactive).

Audio/Video services can include the following functionality:

- Streams content (audio, video, or both) to end users
- Manages buffering of data stream to ensure uninterrupted viewing/listening
- Performs compression and decompression of data
- Manages communications protocols to ensure smooth delivery of content
- Manages library of stored content and/or manages generation of live content Audio/Video services draw upon lower-level services such as streaming and IP Multicast in order to efficiently deliver content across the network.

Possible Product Options

Progressive Networks RealVideo; Microsoft's NetShow; Vxtremes Web Theater; Intels ProShare; Creative Labs Video WebPhone The following products are examples of video servers:

Progressive Networks' RealVideo

Microsoft's NetShow

Vxtreme's Web Theater

The following products are examples of video conferencing systems:

Intel's ProShare

Creative Labs' Video WebPhone

Directory Services 1504

A full-featured Directory Service organizes, categorizes and names networked resources in order to provide a comprehensive picture of clients, servers, users, applications and other resources. The service typically includes a database of objects, representing all nodes and resources on a network. The database manages relationships between users and networks, network devices, network applications, and information on the network. The Directory service can organize network nodes to reflect the topology and organization of the enterprise and its policies. The Directory service makes resources location and platform independent, since it allows users to locate resources via the directory and regardless of their physical location. The Directory service also maps between logical resource names (e.g., "Marketing_Printer") and physical resource address (e.g., 10.27.15.56). (See Name service, below).

Directory service products utilize Security services to track access rights for access to network resources and information. The Directory service is an efficient way to manage resource security, since the directory offers a logical representation of all resources in the enterprise. In addition, the Directory service can act as a single point of entry into the network, meaning users can receive access to allowed resources by authenticating themselves a single time to the Directory service. (For more information on authentication and authorization, refer to the Comm. Security service.)

In summary, the Directory service performs the following functions:

- Stores information about network resources and users and tracks relationships
- Organizes resource access information in order to aid resources in locating and accessing other resources throughout the network
- Provides location transparency, since resources are accessed through a directory rather than based on their physical location
- Converts between logical resource names and physical resource addresses
- Interacts with Security services such as authentication and authorization track identities and permissions
- Provides single network logon to file and print resources; can provide single network logon for network applications that are integrated with the Directory service
- Distributes directory information throughout the enterprise (for reliability and location-independent access)
- Synchronizes multiple directory databases
- Enables access to heterogeneous systems (integration of various network operating systems, platforms, etc.)

Directory Standards—There are a variety of standards for directories. Vendor-specific directory products build upon (and extend) standards to provide a robust, full-featured enterprise directory.

The following are examples of standards related to Directory services:

- X.500 an ITU-T standard for a hierarchical directory containing user and resource information; includes Directory Access Protocol (DAP), which can be used to access directory information.
- Lightweight Directory Access Protocol (LDAP) a de facto standard for accessing X.500-compatible directory information in an Internet/intranet environment.

Implementation Considerations

One of the most popular network directory services is Novell Directory Services (NDS) used with Netware 4.x. This system allows users to access services and resources with a single login, regardless of where the user location is or where the resource location is. Another example of a directory service is the ISO X.500 standard. This method is not widely used due to its high overheads. In addition to these two protocols, Windows NT uses a similar system called Primary Domain Control. This system allows for the same type of directory mapping as NDS and X.500.

Another protocol that has emerged is the Lightweight Directory Access Protocol (LDAP), which is a slimmed-down version of the X.500 directory client and is seen as a possible replacement for X.500. LDAP is a standard protocol for accessing and updating directory information in a client/server environment; it has evolved into an emerging standard for directory replication for the Internet, and is backed by vendors such as Netscape, Novell, Microsoft, IBM and AT&T that can provide low-level compatibility among directory systems.

Another helpful feature to look out for is support for dynamic IP addressing via DHCP. This lets the router handle the process of sharing a small number of IP addresses among the members of the workgroup. Support for dynamic IP addressing is now part of Windows 95 and Macintosh System 7.6, among other operating systems.

Possible Product Options

Novells Netware Directory Service; Netscapes Directory Server; Microsofts Active Directory; Banyan Systems StreetTalk The following are examples of products that provide full-featured Directory services.

Novell's Netware Directory Service

Netscape's Directory Server

Microsoft's Active Directory Banyan Systems' StreetTalk

The following is an example of a meta-directory product:

Zoomit VIA—integrates network operating system directories, application databases, and human resource databases (includes Lotus cc:Mail, Lotus Notes, Novell NDS, Microsoft NT Domain Controller and Active Directory, Microsoft Exchange, Banyan VINES, Netscape Directory Server), thus allowing unified access and maintenance.

The following are examples of Name services:

Domain Name Service—The most common and widely used Name Service on the Internet is Domain Name Service (DNS) which resolves a pronounceable name into an IP address and vice versa. For instance, DNS could resolve the domain name of www.ac.com to be 204.167.146.195. DNS functionality is distributed across many computers within the network.

Microsoft's Windows Internet Name Service (WINS)—WINS is Microsoft's proprietary method for mapping IP addresses to NetBIOS device names. WINS works with Windows 3.x, Windows 95, and Windows NT clients.

The following are examples of products that provide Domain services:

Network Information Service (NIS)—Developed and licensed by Sun Microsystems for use in UNIX environments, NIS tracks user names, passwords, user IDs, group IDs, and host names (along with other system files) through a centralized NIS database.

Microsoft's Windows NT Server Domain Controller

Domain Services 1524

A network domain is a set of network nodes under common control (i.e., common security and logins, unified addressing, coordinated management, etc.). Domain services manage these types of activities for the network nodes in a domain. Domain services may be limited in their ability to support heterogeneous systems and in the ability to scale to support the enterprise.

Name Service 1526

The Name service creates a logical "pronounceable" name in place of a binary machine number. These services could be used by other communications services such as File Transfer, Message Services, and Terminal Services. A Name service can be implemented on its own, or as part of a full-featured Directory service.

Core Messaging 1528

Broadly defined, Messaging services enable information or commands to be sent between two or more recipients. Recipients may be computers, people, or processes within a computer. Messaging Services are based on specific protocols. A protocol is a set of rules describing, in technical terms, how something should be done. Protocols facilitate transport of the message stream. For example, there is a protocol describing exactly what format should be used for sending specific types of mail messages. Most protocols typically sit "on top" of the following lower level protocol:

TCP/IP—Transmission Control Protocol/Internet Protocol (TCP/IP) is the principle method for transmitting data over the Internet today. This protocol is responsible for ensuring that a series of data packets sent over a network arrive at the destination and are properly sequenced.

Messaging services transfer formatted information from one process to another. By drawing upon Messaging services, applications can shield themselves from the complexity of the low-level Transport services. The Core Messaging services category includes styles of messaging that support basic inter-process communication (IPC). There are a variety of architecture options used to support IPC. They can be divided into Store and Forward, Synchronous and Asynchronous Message Services.

Store and Forward Message Services—provide deferred message service processing. A Store and Forward Message Service may use an E-Mail infrastructure upon which to build applications. Common uses would be for forms routing and E-mail.

Synchronous Message Services—allow an application to send a message to another application and wait for a reply before continuing. Synchronous messaging is typically used for update and general business transactions. It requires time-out processing to allow the application to re-acquire control in the event of failure.

Asynchronous Message Services allow an application to send a message to another application and continue processing before a reply is received. Asynchronous messaging is typically used for larger retrieval type processing, such as retrieval of larger lists of data than can be contained in one message.

Additionally, inter-process messaging services are typically one of two messaging types:

Function Based—uses the subroutine model of programming. The message interface is built upon the calling program passing the appropriate parameters and receiving the returned information.

Message Based—message-based approach uses a defined message format to exchange information between processes. While a portion of the message may be unstructured, a defined header component is normally included. A message-based approach is not limited to the call/return structure of the function-based model and can be used in a conversational manner.

Core Messaging services are categorized by the characteristics of the information being transferred:

File Transfer

RPCs

Message-Oriented Middleware

Streaming

How do Messaging services compare to Transaction Processing (TP) services? TP services offer broad functionality to support application management, administrative controls, and application-to-application message passing. TP services may include global transaction coordination, distributed two-phase commit, database support, coordinated recovery after failures, high availability, security, and work load balancing. TP services may utilize Messaging services, which provide basic interprocess communication.

Another category of Messaging services, Specialized Messaging services, includes services that extend Core Messaging services to provide additional functionality.

Implementation Considerations

Is guaranteed delivery required?

RPCs do not support guaranteed message delivery techniques such as store-and-forward and queuing. Consequently, RPCs depend upon the availability of the physical network and server processes. Therefore, network stability is important to consider when deciding to use RPCs.

How important is flexibility?

In general, RPCs work best with tightly coupled applications or in environments where significant application modifications are unlikely. RPCs may be desirable if the application being developed is intended to be shrink wrapped and sold.

Is synchronous or asynchronous program control required?

Function based middleware such as RPCs traditionally provide synchronous program control. Therefore, they tend to pass control from the client process to the server process. When this occurs, the client is dependent on the server and must wait to perform any additional processing until the servers response is received. This type of program control is also known as blocking. Some RPC vendors are enhancing their products to support asynchronous program control as well.

What type of conversation control is required?

RPCs permit one side of the conversation (the client) to only make requests, while the other side (the server) may only make replies. Conversation control is passed from the client to the server since the client, for each request, causes one or more functions to execute on the server while it waits for its reply. With RPCs, developers do not need to be concerned with the state of the conversation between the client and the server. In most cases, the absence of conversation states simplifies the design and development effort.

Is yclient interested in a stable or emerging technology?

RPCs have existed for many years and are considered to be a mature, stable, proven solution.

Is it important to minimize development complexity?

Due to the synchronous program control and the request/reply conversation control, RPCs can be fairly straightforward to design and build. The complexity is also reduced since RPC calls are completely independent of any previous or future RPC call. On the other hand, RPCs usually require a specific RPC compiler, which may add to the development complexity.

Are extended technical capabilities required?

If any of the following capabilities are required, message based middleware should be considered. It may also be possible to incorporate these capabilities into a function based middleware solution, but significant custom modification and development may be required.

Guaranteed Delivery

Store and Forward

Queuing

Priority Message Delivery

Dynamic Routing

Multicasting and Broadcasting

Load Balancing

Product Considerations

What are the client's budgetary constraints?

Costs may vary greatly among middleware products. There are many factors to consider when looking at middleware. To begin, middleware products can require extensive consulting and support services just to install. Therefore, understanding the set-up and configuration costs are important. There are also additional products required to complete an environment such as additional networking software which may be necessary for each individual client. In addition, development seat costs and production seat costs must considered.

Is synchronous or asynchronous communications required?

All RPC products support synchronous program control. Some vendors are enhancing their products to provide asynchronous capabilities as well. Asynchronous means that while information is being passed via send and receive commands, programs can continue to process other tasks while waiting for a response to a request.

What's the clients position on DCE?

DCE software, developed by Open Systems Foundation (OSF), is licensed to OSF-member companies to form products that provide common services. The RPC is one of several DCE common services. Some clients may desire to be aligned with DCE-based solutions.

Is the middleware compatible with the other technology architecture components?

Communications middleware products must integrate with other technology architecture components, development tools, and operations tools. Therefore, it is necessary to understand the compatibility between these tools and the communications middleware product.

Is it important for the product to support multiple platforms and operating systems?

The middleware products must support the required computing platform such as Windows, UNIX, and Mainframe. It is common for vendors to claim that their product supports various platforms and operating systems, when in reality, that platform and operating system may be supported in a future release. It is important to request references of implementations of the platforms and operating systems that are important to your specific environment.

What is the client's vendor direction?

When evaluating a middleware product, its important to consider the clients relationships with vendors in the technology market. For example, if the client has a strong relationship with a vendor who is also in the middleware market, it would be wise to investigate and consider such a vendor for the clients middleware solution.

Is it important for the product to support multiple network protocols?

The middleware products must support the network protocols such as TCP/IP, LU6.2, and IPX/SPX that are important to your specific environment. It is important to note that protocols can vary across platforms. Ensure that the clients specific transport protocol version is supported by the communications middleware product. For example, communications middleware vendors may support TCP/IP but they may not support the particular TCP/IP vendor that the client has selected.

Is a quick response time critical?

RPC performance may vary between products based upon the internal mechanisms and techniques of the product. For example, slow performance may be due to the processing overhead associated with each RPC call. Some RPC products may improve performance by utilizing special techniques used to invoke the server every time a client request arrives. Performance should be considered as a product differentiator.

What level of security is required?

There are potential security issues associated with the execution of commands on a remote system. Some vendors install security features into their products. It is also possible for the architecture team to build additional security into the overall solution.

Is yclient interested in a stable or emerging product?

Vendors should be evaluated on the quality of service they offer, their market share, the age of their product, the installed base of their product, and their financial stability. In addition, since this market is still emerging, there are many small vendors in the market trying to offer solutions. Vendor and product stability should be taken very seriously.

File Transfer 1530

File Transfer services enable the sending and receiving of files or other large blocks of data between two resources. In addition to basic file transport, features for security, guaranteed delivery, sending and tracking sets of files, and error logging may be needed if a more robust file transfer architecture is required. The following are examples of File Transfer standards:

File Transfer Protocol (FTP) allows users to upload and download files across the network. FTP also provides a mechanism to obtain filename, directory name, attributes and file size information. Remote file access protocols, such as Network File System (NFS) also use a block transfer method, but are optimized for online read/write paging of a file.

HyperText Transfer Protocol (HTTP)—Within a Web-based environment, Web servers transfer HTML pages to clients using HTTP. HTTP can be thought of as a lightweight file transfer protocol optimized for transferring small files. HTTP reduces the inefficiencies of the FTP protocol. HTTP runs on top of TCP/IP and was developed specifically for the transmission of hypertext between client and server. The HTTP standard is changing rapidly.

Secure Hypertext Transfer Protocol (S-HTTP)—a secure form of HTTP, mostly for financial transactions on the Web. S-HTTP has gained a small level of acceptance among merchants selling products on the Internet as a way to conduct financial transactions (using credit card numbers, passing sensitive information) without the risk of unauthorized people intercepting this information. S-HTTP incorporates various cryptographic message formats such as DSA and RSA standards into both the Web client and the Web server.

File Transfer and Access Management (FTAM)—The OSI (Open Systems Interconnection) standard for file transfer, file access, and file management across platforms.

Implementation Considerations

Additional options for File Transfer Services in a homogeneous environment could include the native operating systems copy utility, i.e. Windows NT Copy features.

Possible Product Options

Computer Associates CA-XCOM; RemoteWare; Hewlett-Packards HP FTAM; IBMs Files On-Demand gateway The following are examples of File Transfer products:

Computer Associates CA-XCOM; RemoteWare; Hewlett-Packards HP FTAM; IBMs Files On-Demand gateway The following are examples of File Transfer products:

Computer Associates' CA-XCOM—provides data transport between mainframes, midrange, UNIX, and PC systems. XcelleNet's RemoteWare—retrieves, appends, copies, sends, deletes, and renames files between remote users and enterprise systems. Hewlett-Packard's HP FTAM—provides file transfer, access, and management of files in OSI networks.

The following product provides File Transfer translation:

IBM's Files On-Demand gateway—acts as a gateway between Web-based and mainframe-based FTP services to allow users to download mainframe-based files from a World Wide Web browser.

RPC 1532

RPCs (Remote Procedure Calls) are a type of protocol by which an application sends a request to a remote system to execute a designated procedure using the supplied arguments and return the result. RPCs emulate the function call mechanisms found in procedural languages (e.g., the C language). This means that control is passed from the main logic of a program to the called fuinction, with control returning to the main program once the called function completes its task. Because RPCs perform this mechanism across the network, they pass some element of control from one process to another, for example, from the client to the server. Since the client is dependent on the response from the server, it is normally blocked from performing any additional processing until a response is received. This type of synchronous data exchange is also referred to as blocking communications.

Possible Product Options

Sun Microsystems ONC+; OpenGroups DCE RPC; Novells NetWare RPC; NobleNet's EZ-RPC; Transarcs DCE RPC; Microsofts Windows95/NT RPC Sun Microsystems' ONC (Open Network Computing)

OpenGroup's DCE (Distributed Computing Environment)

Novell's NetWare RPC NobleNet EZ-RPC Transarc's DCE

Microsoft's Windows95/NT RPC

Message Oriented 1534

Message-Oriented Middleware (MOM) refers to the process of distributing data and control throughout the exchange of records known as messages. MOM provides the application developer with a set of simple verbs (e.g., connect, send, receive, and disconnect) that are used to exchange information with other distributed applications.

Message-Oriented Middleware is responsible for managing the interface to the underlying communications architecture via the communications protocol APIs and ensuring the delivery of the information to the remote process. This interface provide the following capabilities:

Translating mnemonic or logical process names to operating system compatible format Opening a communications session and negotiating parameters for the session Translating data to the proper format Transferring data and control messages during the session Recovering any information if errors occur during transmission Passing results information and status to the application.

An application continues processing after executing a MOM request, allowing the reply to arrive at a subsequent time. Thus, unlike RPCs, MOM implements a "non-blocking" or asynchronous messaging architecture.

Message-Oriented Middleware products typically support communication among various computing platforms (e.g., DOS, Windows, OS/2, Macintosh, UNIX, and mainframes).

There are three types of Message-Oriented Middleware commonly implemented:

Message Passing

Message Queuing

Publish and Subscribe

Figure 17:
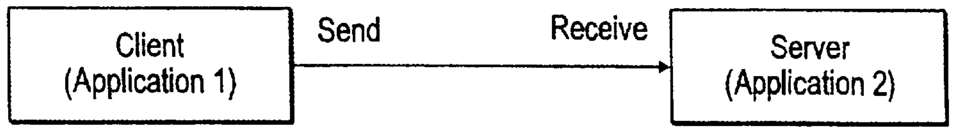
FIG. 17 depicts Message Passing services.

Message Passing—as illustrated in FIG. 17, is a direct, application-to-application communication model. An application request is sent in the form of message from one application to another. The communication method can be either synchronous like RPCs or asynchronous (through callback routines). In a message-passing model, a direct link between two applications that participate in the message exchange is always maintained.

Figure 18:
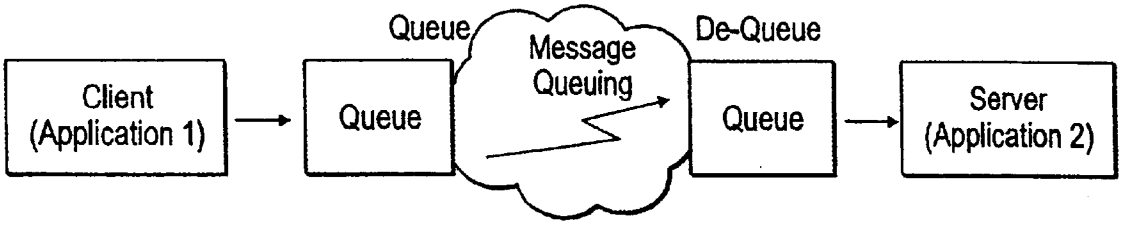
FIG. 18 depicts Message Queuing services.

Message Queuing (also known as Store and Forward)—as depicted in FIG. 18, is an indirect application to application communication model that allows applications to communicate via message queues, rather than by calling each other directly. Message queuing is asynchronous by nature and connectionless, meaning that the recipient need not be directly available when the message is sent. Moreover, it implies support for reliable, guaranteed and assured (non-duplicate) message delivery.

Figure 19:
FIG. 19 illustrates Publish and Subscribe services.

Publish and Subscribe (also known as Push messaging)—as shown in FIG. 19, is a special type of data delivery mechanism that allows processes to register an interest in (i.e., subscribe to) certain messages or events. An application then sends (publishes) a message, which is then forwarded to all processes that subscribe to it.

Implementation Considerations

When trying to decide whether to use MOM technology, keep the following characteristics of this type of middleware in mind:

MOMs are high speed, generally connectionless and are usually deployed for executing applications with a nonblocking sender MOM solutions are especially useful for inter-application communication and are increasingly popular for inter-enterprise work MOMs support end-to-end business applications and process inter-operability MOMs are designed for heavily used production applications and are generally capable of high throughput rates and fast transfer times. Data is usually forwarded immediately, although it is possible to store it for later processing Possible Product Options PeerLogics PIPES; IBM MQSeries; BEAs MessageQ; Momentum XIPC; Microsoft MQ (Falcon); TibCo's Rendezvous Message Passing PeerLogic's PIPES PIPES Platform applications communicate through a messaging interface that allows asynchronous, non-blocking communications. The messaging model is well-suited to complex multi-tier applications because it inherently supports asynchronous, event-driven communications.

Message Queuing

IBM's MQSeries

New features found in version 5 include:

- A new Internet gateway that allows customers and partners to run mission critical business applications over an unreliable network.
- Enhanced message distribution carries more business information, while minimizing use of networks.
- Performance improvements gives message transmission at least 8 times faster than previous versions
- Resource Coordination ensures that data held in databases is always updated completely—or not at all, if processing cannot complete.
- Additional developer features include further language support for C++, Java and PL/1, and interoperability with current and previous MQSeries versions.
- Easier implementation because MQSeries now has the same install and use characteristics as other IBM Software Servers.

BEA's MessageQ

Key highlights of the MessageQ product include:

- High performance—up to thousands of non-recoverable messages/second; hundreds of recoverable messages/second
- Both synchronous, and asynchronous message delivery
- Broadest platform support in the industry including UNIX, Windows NT, OpenVMS, and mainframes
- Common Application Programming Interface (API)
- Publish and subscribe (broadcasting)
- Microsoft Windows client product with support for DLLs (Dynamically Linked libraries), Visual Basic, and Power Builder development environments
- Message recovery on all BEA MessageQ clients and servers
- Interoperability with IBM MVS/CICS and IBM MVS/IMS
- Large message size-up to 4 MB-eliminates need for message partitioning Momentum's XIPC XIPC is an advanced software toolset for the development of multitasking and distributed applications. XIPC provides fault-tolerant management of guaranteed delivery and real-time message queuing, synchronization semaphores and shared memory, all of which are network-transparent.

Microsoft Message Queue Server (MSMQ, formerly known as Falcon)

Publish and Subscribe

TibCo's Rendezvous

TIB/Rendezvous' publish/subscribe technology is the foundation of TIBnet, TibCos solution for providing information delivery over intranets, extranets and the Internet. It is built upon The Information Bus® (TIB®) software, a highly scaleable messaging middleware technology based on an event-driven publish/subscribe model for information distribution. Developed and patented by TIBCO, the event-driven, publish/subscribe strategy allows content to be distributed on an event basis as it becomes available. Subscribers receive content according to topics of interest that are specified once by the subscriber, instead of repeated requests for updates. Using IP Multicast, TIBnet does not clog networks, but instead, provides for the most efficient real-time information delivery possible.

Streaming 1536

Streaming is the process of transferring time-sensitive data streams (e.g., video and/or audio) in real-time. Streaming differs from the other types of Core Messaging services in that it delivers a continuous, one-way stream of data, rather than the relatively short messages associated with RPC and Message-Oriented Middleware messaging or the large, batch transfers associated with File Transfer. (While the media stream is one-way from the server to the client, the client can issue stream controls to the server.) Streaming may be used to deliver video, audio, and/or other real-time content across the Internet or within enterprise networks.

Streaming is an emerging technology. While some multimedia products use proprietary streaming mechanisms, other products incorporate standards. The following are examples of emerging standards for streaming protocols. Data streams are delivered using several protocols that are layered to assemble the necessary functionality.

- Real-time Streaming Protocol (RTSP)—RTSP is a draft Internet protocol for establishing and controlling on-demand delivery of real-time data. For example, clients can use RTSP to request specific media from a media server, to issue commands such as play, record and pause, and to control media delivery speed. Since RTSP simply controls media delivery, it is layered on top of other protocols, such as the following.
- Real-Time Transport Protocol (RTP)—Actual delivery of streaming data occurs through real-time protocols such as RTP. RTP provides end-to-end data delivery for applications transmitting real-time data over multicast or unicast network services. RTP conveys encoding, timing, and sequencing information to allow receivers to properly reconstruct the media stream. RTP is independent of the underlying transport service, but it is typically used with UDP. It may also be used with Multicast UDP, TCP/IP, or IP Multicast.
- Real-Time Control Protocol (RTCP)—RTP is augmented by the Real-Time Control Protocol. RTCP allows nodes to identify stream participants and communicate about the quality of data delivery.

The following table summarizes the protocol layering that supports Streaming:

| functionality | sample protocol options | architecture service |
|---|---|---|
| controlling media delivery | RTSP or proprietary | Streaming Messaging service |
| monitoring data stream | RTCP or proprietary | Streaming Messaging service |
| end-to-end delivery of stream | RTP or proprietary | Streaming Messaging service |
| message transport | UDP, Multicast UDP, TCP | Message Transport service |

-continued

| functionality | sample protocol options | architecture service |
|---|---|---|
| packet forwarding/ internetworking | IP, IP Multicast | Packet Forwarding/Internetworking service |

Figure 20:
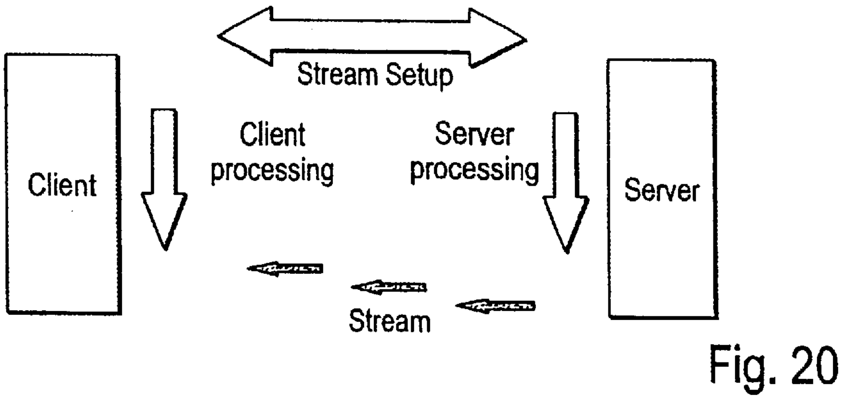
FIG. 20 depicts Streaming, in which a real-time data stream is transferred.

FIG. 20 depicts Streaming, in which a real-time data stream is transferred.

Possible Product OptionsOptions

Netscape's Media Server; Progressive Networks Real Audio/Video; VXtremes WebTheater The following are examples of products that implement Streaming Messaging (based upon RTSP or other standards or proprietary approaches):

Netscape's Media Server

Progressive Networks' Real Video VXtreme's WebTheater

Specialized Messaging 1538

Specialized Messaging services extend the Core Messaging services to provide additional functionality, including:

Provides messaging among specialized systems by drawing upon basic messaging capabilities Defines specialized message layouts Defines specialized inter-system protocols Suggests ways in which messaging draws upon directory and security services in order to deliver a complete messaging environment An example of a specialized messaging service is Mail Messaging. Mail Messaging is a specialized implementation of store-and-forwarding MOM (message-oriented middleware) messaging, in that Mail Messaging defines specialized, mail-related message layouts and protocols that utilize store-and-forward messaging.

E-Mail 1540

E-Mail takes on a greater significance in the modern organization. The E-Mail system, providing it has sufficient integrity and stability, can function as a key channel through which work objects move within, and between organizations in the form of messages and electronic forms. An E-Mail server stores and forwards E-Mail messages. Although some products like Lotus Notes use proprietary protocols, the following protocols used by E-Mail Services are based on open standards:

X.400—The X.400 message handling system standard defines a platform independent standard for store-and-forward message transfers among mail servers. X.400 is often used as a backbone e-mail service, with gateways providing interconnection with end-user systems.

SMTP—Simple Mail Transfer Protocol (SMTP) is a UNIX/Internet standard for transferring e-mail among servers.

MIME—Multi-Purpose Internet Mail Extensions (MIME) is a protocol that enables Internet users to exchange multimedia e-mail messages.

POP3—Post Office Protocol (POP) is used to distribute e-mail from an SMTP server to the actual recipient.

IMAP4—Internet Message Access Protocol, Version 4 (IMAP4) allows a client to access and manipulate electronic mail messages on a server. IMAP4 permits manipulation of remote message folders, called "mailboxes", in a way that is functionally equivalent to local mailboxes. IMAP4 also provides the capability for an off-line client to re-synchronize with the server. IMAP4 includes standards for message handling features that allow users to download message header information and then decide which e-mail message contents to download.

Implementation Considerations

A number of E-mail servers from vendors including HP and Netscape are built around SMTP, and most proprietary protocol E-Mail servers now provide SMTP gateways.

The Multi-part Internet Mail Extensions (MIME) standard has gained acceptance as the Internet mechanism for sending E-mail containing various multimedia parts, such as images, audio files, and movies. S/MIME, or secure MIME adds encryption and enables a secure mechanism for transferring files.

Although currently POP3 is the popular Internet E-Mail message handling protocol, recently the lesser known IMAP4 protocol has been gaining in adoption among mail server and mail client software providers. IMAP was designed to add features beyond POP that allow users to store and archive messages and support mobile users that need to keep messages on a central server as well as on their laptop.

Organizations are looking to use vehicles like E-Mail and the Internet to enable communications with customers and trading partners. The least common denominator E-mail capability today is very rudimentary (ASCII text). But as the standards listed here as well as others become integrated into most of the popular E-mail products and gateways this will change enabling a more flexible and useful commercial communications medium.

Possible Product OptionsOptions

Microsoft Exchange Server; Lotus cc:mail; Lotus Notes; Qualcomm Eudora; TenFours TFS Universal E-Mail Gateway; UUcoding; Netscape Mail Server; Post.Office; NTMail The following E-Mail products are based on the open Internet standards defined above:

Netscape Mail Server—Netscapes implementation of an open standards-based client/server messaging system that lets users exchange information within a company as well as across the Internet. It includes support for all standard protocols, and is packaged with Netscapes SuiteSpot server line.

Post.Office—one of the leading POP3/SMTP mail servers for the Internet community as well as corporate intranets. This message transport agent is based entirely on the open standards of the Internet, ensuring maximum compatibility with other systems.

NTMail—an open SMTP and POP3 mail server for Windows NT.

The following are major proprietary E-mail servers used in large organizations today:

Lotus Notes—platform-independent client/server mail system. Notes Mail can support over 1,500 active users per server, offering Internet integration, distributed replication and synchronization. Lotus Notes also provides integrated document libraries, workflow, calendaring and scheduling, and a cc:Mail user interface.

Microsofts Exchange Server—Exchange 4.0 provides a messaging and groupware platform to support collaboration solutions on Windows machines. Microsoft Exchange 5.0 has-support for all of the key Internet protocols. These include POP3 for mailbox access, SMTP for mail sending and receiving, NNTP for newsgroups and discussion forums, LDAP for directory access, HTTP and HTML for access via a web browser, and SSL for security.

The following products are examples of e-mail systems:

Microsoft Mail

Lotus cc:mail

Qualcomm Eudora

The following products provides e-mail system translation:

TenFour's TFS Universal E-Mail Gateway—links users of Lotus Development Corp.'s cc:Mail and Notes, Novell Inc.'s GroupWise, Microsoft Corp.'s Mail, MCI Mail, and SMTP e-mail to Microsoft Exchange.

UUcoding—process for converting 8-bit binary files into 7-bit ASCII files for transmission via e-mail over the Internet (the Internet only supports seven bit characters in e-mail messages); UUencode and UUdecode utilities on end nodes perform the conversion.

Database Access 1542

Database Messaging services (also known as Database Access Middleware) provide connectivity for clients to access databases throughout the enterprise. Database messaging software draws upon basic inter-process messaging capabilities (e.g., RPCs) in order to support database connectivity. Database Messaging services typically provide single application seemless access to multiple data sources, both relational and non-relational. Additionally, database messaging services can be used to facilitate migration of data from one environment to another (i.e., MVS/DB2→Sybase)

There are three types of database access middleware:

ODBC-like

Propietary

Gateway

Is there a projected growth in data requirements?

Storage of data in a database allows for more optimal future growth since databases scale better than mechanisms such as flat files.

Should the data be secured and controlled?

Use databases to protect data integrity from multiple user access, and hardware and software failures.

Is it desirable to limit the amount of viewed data?

Use databases to store large amounts of information and to access an individual record(s) without having to inspect all the records of a given topic.

Is there a need to impose data standards?

Use a database when you wish to store and impose standards on data elements. This is important when developing enterprise wide solutions, since it is desirable to have the different applications access the same structured information.

Is there a current or potential requirement for a distributed architecture?

Databases allow for the potential of such architectural features as a data replication strategy and/or distributed data access.

Is there a need to minimize data duplication?

Because of their normalized design, relational databases are used to reduce data redundancy. This reduces maintenance and storage requirements.

Product Considerations

What are the available administration or systems management features?

Administration and systems management features such as remote management, remote configuration, backup and recovery, and disaster recovery should be considered.

What are the key business requirements?

Product selection may be influenced by business requirements such as replication and distributed data, parallel processing, complex object support for such purposes as multimedia, OLTP, decision support, VLDB, data warehousing, and availability (24/7 vs. 8/5).

What is the availability of market resources to support the product?

Personnel available for support (permanent hires, contractors), and third party support for skilled resources/training should be considered.

Are the current data requirements expected to increase?

Products differ in their ability to scale with respect to hardware architecture, transaction throughput, and user base.

How do the vendors compare against one another?

Issues to consider are type, quality and responsiveness of support, alliances/partnerships with other companies, market presence (install base, customer list, number of production copies, etc.), vendor industry, alignment of mission and vision with that of potential customer/evaluator, product philosophy, long-term product plans/strategy, and vendor's training.

How well does a product integrate with the current or proposed architecture?

Issues to consider include supported operating systems, networks, and other database platforms, availability of database utilities, application interfaces, development tools, and third party products, and integration with legacy systems.

Possible Product Options

Oracles SQL*Net; Sybases EnterpriseConnectivity; Microsoft's Open Database Connectivity (ODBC); Sun Java Database Connectivity (JDBC)

Oracle's SQL*Net—supports database interoperability across a variety of transport protocols (e.g., TCP/IP, SPX/IPX, SNA, etc.); includes verbs such as connect, send, receive, and disconnect; performs transparent protocol bridging by allowing multiple protocols to reside simultaneously on each node.

Sybase's EnterpriseConnectivity—supports database interoperability across a variety of platforms.

Microsoft's Open Database Connectivity (ODBC)—a database programming interface that provides a common language for Windows applications to access databases on a network.

Sun's Java Database Connectivity (JDBC)—a Java-based programming interface that provide a common method for Java applications to access databases on a network Object Messaging 1544

Object Messaging enables objects to transparently make requests of and receive responses from other objects located locally or remotely. Objects communicate through an Object Request Broker (ORB). An ORB enables client objects to access server objects either locally or remotely over a network and invoke operations (i.e. functions and methods) on them. ORBs typically provide interoperability between heterogeneous client and server environments: across languages and/or operating systems and/or network protocols. In that respect some have said that ORBs will become a kind of "ultimate middleware" for truly distributed processing. A standardized Interface Definition Language (IDL) defines the interfaces that applications must use to access the ORB Services. The two major Object Request Broker standards/implementations are:

Object Management Group's Common Object Request Broker Architecture (CORBA)

Microsoft's (Distributed) Component Object Model (COM/DCOM)

CORBA

Common Object Request Broker Architecture (CORBA) is a standard for distributed objects being developed by the Object Management Group (OMG). The OMG is a consortium of software vendors and end users. Many OMG member companies are developing commercial products that support the CORBA standards and/or are developing software that use these standards. CORBA provides the mechanism by which objects transparently make requests and receive responses, as defined by OMG's Object Request Broker (ORB). The CORBA ORB is an application framework that provides interoperability between objects, built in different languages, running on different machines in heterogeneous distributed environments.

Inter-ORB Messaging

Figure 21:
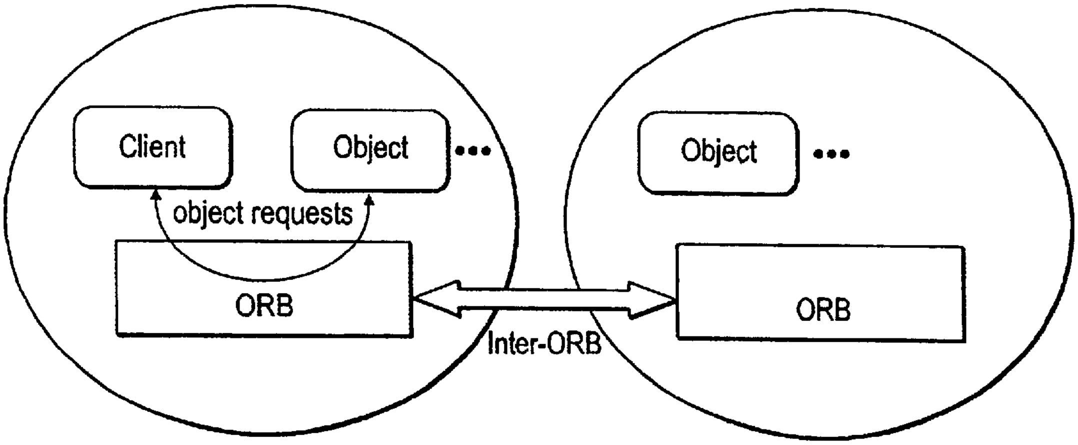
FIG. 21 illustrates CORBA-based Object Messaging.

The OMGs Internet Inter-Orb Protocol (IIOP) specifies a set of message formats and common data representations for communication between ORBs over TCP/IP networks. CORBA-based Object Messaging is summarized in FIG. 21.

COM/DCOM

Figure 22:
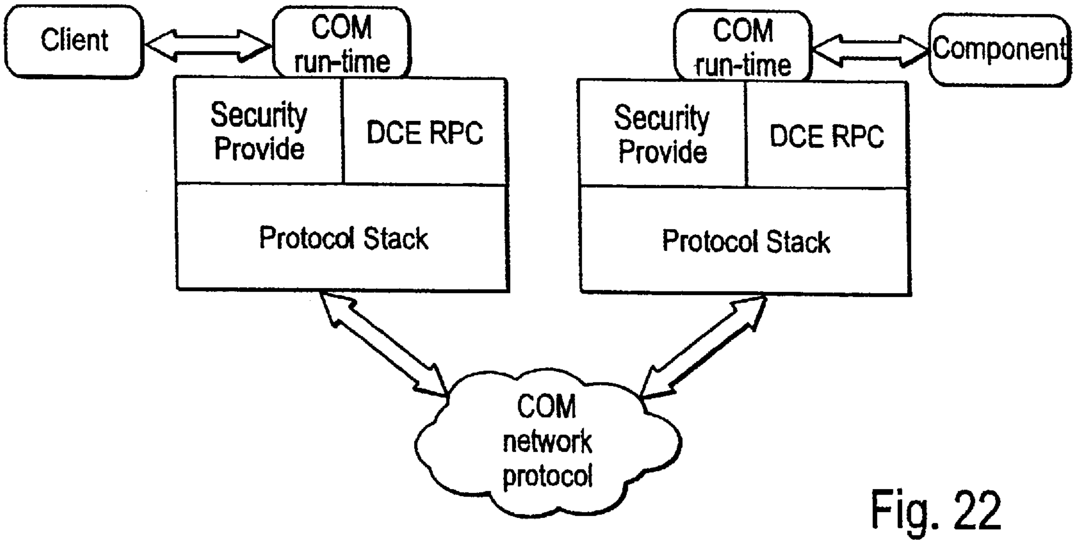
FIG. 22 illustrates COM Messaging.

Component Object Model (COM) is a client/server object-based model, developed by Microsoft, designed to allow software components and applications to interact with each other in a uniform and standard way. The COM standard is partly a specification and partly an implementation. The specification defines mechanisms for creation of objects and communication between objects. This part of the specification is paper-based arid is not dependent on any particular language or operating system. Any language can be used as long as the standard is incorporated. The implementation part is the COM library which provides a number of services that support a mechanism which allows applications to connect to each other as software objects. COM is not a software layer through which all communications between objects occur. Instead, COM serves as a broker and name space keeper to connect a client and an object, but once that connection is established, the client and object communicate directly without having the overhead of passing through a central piece of API code. Originally conceived of as a compound document architecture, COM has been evolved to a full object request broker including recently added features for distributed object computing. DCOM (Distributed COM) contains features for extending the object model across the network using the DCE Remote Procedure Call (RPC) mechanism. In sum, COM defines how components should be built and how they should interact. DCOM defines how they should be distributed. Currently COM/DCOM is only supported on Windows-based machines. However, third-party vendors are in progress of porting this object model to other platforms such as Macintosh, UNIX, etc. FIG. 22 illustrates COM Messaging.

Implementation Considerations

Although ORBs provide a mechanism for transparently communicating among components located locally or remotely, performance issues need to be thoroughly addressed before moving components around the network Making requests and receiving responses among components located on different machines will take longer that having the same communication between components located on the same machine. Performance is dependent on what type of network is available (LAN, type of LAN, WAN, type of WAN, dial-up, wireless, etc.), size of messages and number of messages that go across the network.

Possible Product Options

Expersoft's CORBAplus; IBM's Component Broker; BEASystems ObjectBroker; Iona Technology's Orbix; Inprise's Visibroker; Microsofts COM; Software AGs COM CORBA-based ORB Products
- Expersoft's CORBAplus
- IBM's Component Broker
- BEA's Object Broker
- Iona Technologies's Orbix
- Inprise's VisiBroker(formerly Visigenic)

COM Products
- Microsoft's DCOM (Windows NT Server, Windows NT Workstation, Windows 95, Apple Macintosh, Windows Java Virtual Machine)
- Software AG's COM (current or planned availability on Sun, Digital UNIX, IBM, and HP platforms)

CTI Messaging 1546

Computer-Telephone Integration (CTI) integrates computer systems and telephone systems to coordinate data and telephony activities. For example, CTI can be used to associate a customers database entry with the customers telephone call and route the call accordingly.

Figure 23:
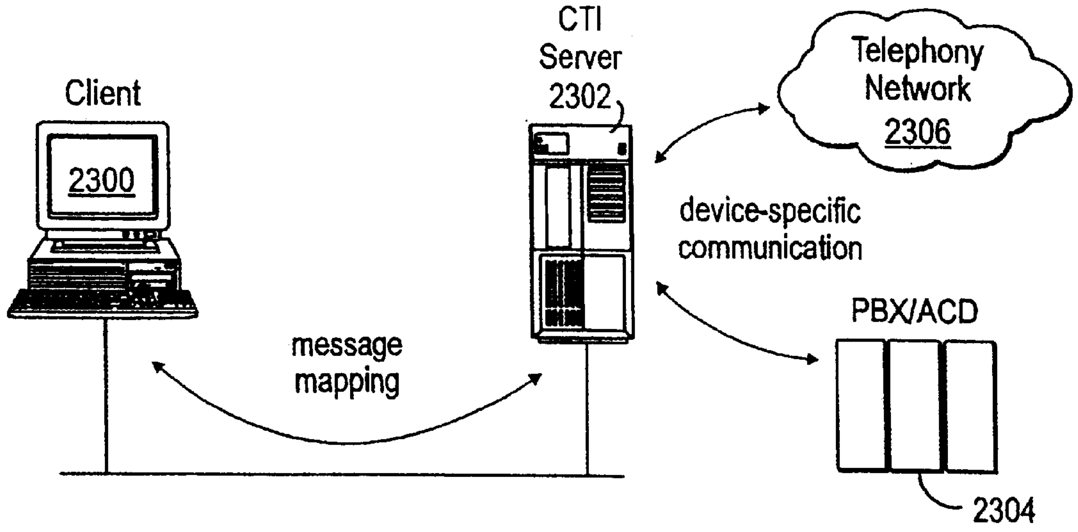
FIG. 23 represents CTI Messaging.

Referring to FIG. 23, CTI Messaging supports communication among clients 2300, CTI servers 2302, PBXs/ACDs 2304, hybrid platforms, networks 2306, and external telephony devices. CTI Messaging relies upon proprietary PBX/ACD APIs, CTI vendor-specific APIs or message sets, and industry-standard APIs.

CTI Messaging has two primary functions:
- Device-specific communication
  - Manages direct communications between telephony devices and data devices
  - Allows applications to control PBXs, key telephone systems, ISDN, analog PSTN, cellular, Centrex, etc. and supports features such as address translation, call setup, call answering, call dropping, and caller ID.
  - Provides interface to carrier networks for call delivery and call-related messaging
- Message mapping
  - Translates device-specific communication to generic API and/or message set CTI products can be divided into the following categories:
- CTI Platform-Specific Products—products that can only be implemented on the hardware of a specific vendor.
  - CTI Telephony-based API Products—include proprietary PBX/ACD-based messaging sets, which permit external devices to interface with the vendor's PBX/ACD call and station control logic
  - CTI Server/Workstation-based or Host-based API Products—operate on a particular computer vendor's hardware platform and provide call control and messaging functionality.
- CTI Cross-Platform Vendors—products that have been ported to multiple hardware platforms/operating systems.
  - CTI Enabling Solutions—focus solely on call control and call/application synchronization functions.
  - CTI Enterprise Solutions—provide all CTI business functions to varying degrees.

Possible Product Options

Novell's Netware Telephony Services; Microsoft TAPI; Novell TSAPI

Industry-Standard Application Programming Interfaces (APIs):
- Microsoft's TAPI
- Novell's TSAPI
  - Novell's Netware Telephony Services—Based on Novell's Telephony Services API (TSAPI), Netware Telephony Services is a CTI gateway that integrates Novell networks with telephony networks.

Other vendors of CTI products include:

Aspect Telecommunications Corp.

Genesys Labs

IBM

Lucent

Nortel

Rockwell

EDI Messaging 1548

EDI (Electronic Data Interchange) supports system-to-system messaging among business partners by defining standard message layouts. Companies typically use EDI to streamline commercial transactions within their supply chains.

EDI standards (e.g., EDIFACT, ANSI X12) define record layouts for transactions such as "purchase orders". EDI services include the generation and translation of EDI messages according to the various public message layout standards.

EDI messaging can be implemented via electronic mail or customized message-oriented architectures.

Implementation Considerations

EDI messages have traditionally been sent between companies using a VAN (Value Added Network). VANs have been criticized for their relatively high cost in comparison to public networks like the Internet. Recently, EDI messaging vendors such as Premenos have been creating software with built-in encryption features to enable companies to send EDI transmissions securely over the Internet.

Web server vendors including Microsoft, Netscape and OpenMarket are putting plans in place to add EDI transmission capabilities into their Web server products. OpenMarket Inc. is working with Sterling and Premenos to integrate their EDI management software with OpenMarkets OMTransact electronic commerce server software. Netscape is working with GEIS in creating Actra Business Systems to integrate EDI services with Netscape server products.

Possible Product Options

Digital Equipment Corp.s DEC/EDI; Sterling Commerces GENTRAN; IBM Global Services Advantis; GE Information Services; Sterling Commerce EDI Applications Digital Equipment Corp.'s DEC/EDI Sterling Commerce's GENTRAN EDI value-added networks (VANs)—VANs link EDI trading partners and transmit EDI messages through a central electronic clearinghouse IBM Global Services'Advantis GE Information Services Sterling Commerce Legacy Integration 1550

Legacy services provide gatewarys to mainframe legacy systems. The following protocol is typically used:

Systems Network Architecture (SNA) is a networking connection-oriented protocol architecture which was developed in the 1970s by IBM. Currently, SNA and TCP/IP are two of the most widely used networking protocol architectures.

Design techniques for integration with existing systems can be grouped into two broad categories:

Front end access—discussed as part of Terminal Emulation

Back end access—tend to be used when existing data stores have information that is needed in the client/server environment but accessing the information through existing screens or functions is not feasible. Legacy Integration messaging services typically include remote data access through gateways. A database gateway provides an interface between the client/server environment and the legacy system. The gateway provides an ability to access and manipulate the data in the legacy system.

Implementation Considerations

Legacy systems hold critical data which must be accessible by new Netcentric computing solutions. These legacy data sources often must be accessed in their current form so as to not disrupt the legacy systems.

Communications Security 1508

Communications Security services control access to network-attached resources. Combining network Security services with security services in other parts of the system architecture (e.g., application and database layers) results in robust security.

Possible Product Options

UkWeb's Stronghold; UkWeb's SafePassage

UkWeb's Stronghold

Stronghold was the first web server to support SSL Client Authentication. Regular expression-based matching of client certificate information to determine access control is possible. Stronghold also has an API for certificate to username mapping so that client certificates may be mapped to standard usernames. CA certificates from both Thawte and Verisign can be utilized. Uncompromised, full 128-bit symmetric encryption is provided in all versions. This provides Netcentric systems used outside of the USA or Canada with secure encryption capabilities.

UkWebs's SafePassage

SafePassage is a full-strength, encrypting Web proxy. It is designed to supplement the security of browsers whose authentication and encryption capabilities have been weakened to comply with United States export regulations. For these types of browsers, SafePassage will provide client authentication certificates and full-strength encryption (128 bit).

Encryption 1552

Encryption services encrypt data prior to network transfer to prevent unauthorized interception. (Note that encryption can occur within the Communications Services layer, the Transport Services layer, or the Network Media Services layer.) Within the Communications Services layer, encryption occurs at the top of the protocol stack and is typically performed within an application (e.g., an e-mail application, a Web browser). This is an end-to-end approach that can leave the remainder of the protocol stack (i.e., the Transport services and the Network Media services) unaffected.

Encryption has two main components: the encryption algorithm, which is the series of steps that is performed to transform the original data; and the key, which is used by the algorithm in some way to encrypt the message. Typically, the algorithm is widely known, while the key is kept secret. There are several types of encryption in use today, including:

Secret key cryptography—uses one key (the secret key) both to encrypt the message on one side and to decrypt the message on the other side.

Public key cryptography—uses two keys, the public key and the private key. The public key and private key are mathematically related so that a message encrypted with the recipient's public key may be decrypted with the recipient's private key. Therefore, the public key can be widely published, while the private key is kept secret.

There are also varying methods of employing encryption types described above to encrypt data sent across a network:

Data link layer—data is encrypted before it is placed on the wire. Data link encryptors are generally hardware products.

Application layer—data is encrypted by the application. Netscape's Secure Sockets Layer (SSL) is one example of application-layer encryption for WWW browsers. SSL uses RSA encryption to wrap security information around TCP/IP based protocols.

Network layer—data is encrypted inside the network layer header, therefore relying on the network layer protocol.

Implementation Considerations

The advantage of SSL over S/HTTP is that SSL is not restricted to HTTP but can also be used for securing other TCP/IP based services such as FTP, Telnet, etc. SSL can provide session level data encryption and authentication to enable secure data communications over public networks such as the Internet.

The need for Encryption Services is particularly strong where electronic commerce solutions that involve exchanging sensitive or financial data are to be deployed over public networks such as the Internet. Cryptography can be used to achieve secure communications, even when the transmission media (for example, the Internet) is untrustworthy. Encryption Services can also be used to encrypt data to be stored (e.g., sensitive product information on a sales person's laptop) to decrease the chance of information theft.

There are complex legal issues surrounding the use of encrypting in an international environment. The US government restricts what can be exported (in terms of encryption technology), and the French government defines encryption technology as a "weapon of war" with appropriate legal and regulatory restrictions. This is a key issue in international e-commerce today.

Possible Product Options

Netscape's Secure Sockets Layer (SSL); S-HTTP; e-mail encryption; S-MIME

Encryption that is architected into Web-based solutions

Netscape's Secure Sockets Layer (SSL)—provides encryption for World Wide Web browsers.

S-HTTP—a secure version of the HTTP data transfer standard; used in conjunction with the World Wide Web.

Encryption that is embedded in e-mail products e-mail encryption—products such as Lotus Notes and Microsoft Exchange can encrypt e-mail messages and/or attachments.

S-MIME—a secure version of the MIME e-mail standard.

Authorization 1554

When a user requests access to network resources, the Authorization service determines if the user has the appropriate permissions and either allows or disallows the access. (This occurs after the user has been properly authenticated.)

The following are examples of ways to implement Authorization services:

Network Operating Systems—Authorization services are bundled with all network operating systems in order to control user access to network resources.

Firewall Services protect sensitive resources and information attached to an Intxxnet network from unauthorized access by enforcing an access control policy. A variety of mechanisms exist for protecting private networks including:

Filters—World Wide Web filters can prevent users from accessing specified content or Internet addresses. Products can limit access based on keywords, network addresses, time-of-day, user categories, etc.

Application Proxies—An application-level proxy, or application-level gateway, is a robust type of firewall. (A firewall is a system that enforces an access control policy between a trusted internal network and an untrusted external network.) The application proxy acts at the application level, rather than the network level. The proxy acts as a go-between for the end-user by completing the user-requested tasks on its own and then transferring the information to the user. The proxy manages a database of allowed user actions, which it checks prior to performing the request.

Servers, Applications, and Databases—Authorization can occur locally on a server to limit access to specific system resources or files. Applications and databases can also authorize users for specific levels of access within their control. (This functionality is within the Environment Services grouping in the execution architecture.)

Possible Product Options

Microsoft Windows NT; Novell Netware; UNIX; Check Points Firewall-1; Raptor Systems Eagle Firewall; Microsoft Proxy Server; Netscape Proxy Server; Microsystem Softwares Cyber Patrol Corporate; Net Nanny Softwares Net Nanny Network Operating Systems Microsoft Windows NT, Novell Netware, UNIX, etc.

Application Proxies

Microsoft Proxy Server—allows for designation of who can access the Internet and which services they can use. Administrators can establish additional credentials for logging on, set specific dialing hours or days of the week, and restrict access to certain sites altogether.

Netscape Proxy Server—high-performance server software for replicating and filtering access to Web content on the Internet or an intranet. Provides access control, URL filtering, and virus scanning.

Filters

Check Point FireWall-1—combines Internet, intranet and remote user access control with strong authentication, encryption and network address translation (NAT) services. The product is transparent to network users and supports multiple protocols.

BorderWare Firewall—protects TCP/IP networks from unwanted external access as well as provides control of internal access to external services; supports packet filters and application-level proxies.

Raptor System's Eagle Firewall

Microsystem Software's Cyber Patrol Corporate

Net Nanny Software's Net Nanny

Authentication

Authentication services verify network access requests by validating that users are who they claim to be. For secure systems, one or more authentication mechanisms can be used to validate authorized users and to verify which functions and data they have access to. Within the corporate network, authentication services are often included in directory services products like Novell's NDS. NDS requires the user to have an established account and supply a password before access is granted to resources through the directory.

Authentication for accessing resources across an Internet or intranet is not as simple and is a rapidly evolving area. When building e-commerce Web sites there may be a need to restrict access to areas of information and functionality to known customers or trading partners. More granular authentication is required where sensitive individual customer account information must be protected from other customers.

Authentication can occur through various means:

- Basic Authentication—requires that the Web client supply a user name and password before servicing a request. Basic Authentication does not encrypt the password in any way, and thus the password travels in the clear over the network where it could be detected with a network sniffer program or device. Basic authentication is not secure enough for banking applications or anywhere where there may be a financial incentive for someone to steal someone's account information. Basic authentication is however the easiest mechanism to setup and administer and requires no special software at the Web client.
- ID/Password Encryption—offers a somewhat higher level of security by requiring that the user name and password be encrypted during transit. The user name and password are transmitted as a scrambled message as part of each request because there is no persistent connection open between the Web client and the Web server.
- Digital Certificates or Signatures—encrypted digital keys that are issued by a third party "trusted" organization (i.e. Verisign); used to verify user's authenticity.
- Hardware tokens—small physical devices that may generate a one-time password or that may be inserted into a card reader for authentication purposes.
- Virtual tokens—typically a file on a floppy or hard drive used for authentication (e.g. Lotus Notes ID file).
- Biometric identification—the analysis of biological characteristics to verify individuals identify (e.g., fingerprints, voice recognition, retinal scans).

Related to authentication, non-repudiation is a means of tagging a message in order to prevent an entity from denying that it sent or received the message.

Possible Product Options

Microsoft Windows NT; Novell NetWare; UNIX; Platinum Technologies AutoSecure SSO; Axents Enterprise Access Control for Windows 95; SecurID; Racals TrustMe Authentication Server; Visionics FaceIt; Sensars IrisIdent; Keyware Technologies Voice Guardian; National Registrys NRIdentity; Kerberos; VeriSign The following are examples of products that perform authentication:

- user IDs and passwords
- operating systems: Microsoft Windows NT, Novell NetWare, UNIX, etc.
- application level user IDs and passwords (e.g., e-mail system)
  - single sign-on software—manages user logins to multiple systems or resources.
- Platinum Technologies' AutoSecure SSO
  - add-on administration packages—enhance the capabilities of native operating system security
- Axent's Enterprise Access Control for Windows 95—enforces password standards and encrypts data.

Hardware Tokens

- Security Dynamics' SecurID Authentication Tokens
- Racal's TrustMe Authentication Server Biometric Security

- Visionics' FaceIt—face recognition
- Sensar's IrisIdent—iris identification
- Keyware Technologies' Voice Guardian—voice recognition
- National Registry's NRIdentity—fingerprint recognition Keys and Certificates

- Kerberos—an encryption and key management protocol for third party authorization; vendors include CyberSAFE and Digital Equipment Corporation.
- VeriSign—a company that manages digital certificates.

Communication Fabric 1010

As communication networks become increasingly complicated and interconnected, the services provided by the network itself have by necessity increased as well. Clients and servers are rarely directly connected to one another, but separated by a network of routers, servers and firewalls providing an ever increasing number of network services such as address resolution, message routing, security screening and many more.

The communications fabric provides common network services to the platform-specific network services residing on the client and server nodes. These common network services can be used to manage resources and translate capabilities within and across enterprises.

Short of interpreting the data being transmitted, the communications fabric is aware of the different message-oriented information streams in order to help the client and server communicate regardless of the different network functions implemented on each platform.

An intelligent communications fabric monitors and routes data flows and provides functionality (security, directories, etc.) to clients and servers. An intelligent communications fabric provides the following benefits:

- An intelligent network can manage itself, including addressing, routing, security, recovery, etc. It is inefficient for individual clients and servers to perform such tasks.
- Specialized network components reduce the network-related processing that occurs on clients and servers.
- An intelligent network integrates heterogeneous clients, servers, and other resources by resolving incompatible protocols and standards.
- An intelligent network has the capability to actively manage the flow of information rather than simply moving data. This allows the network to effectively deliver multimedia and other network-sensitive traffic.
- An intelligent network adds value to enterprise resources by presenting a cohesive view of available resources and increasing the level of security associated with those resources.

Figure 24:
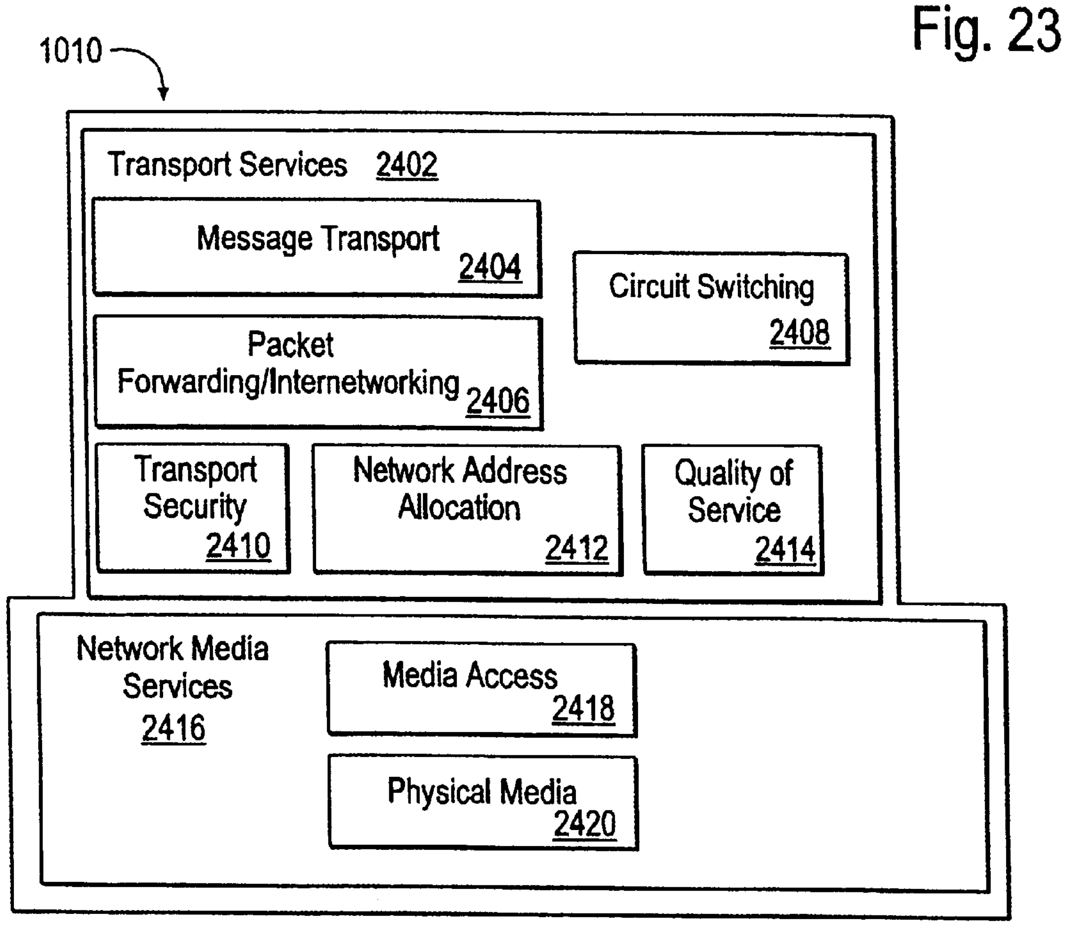
FIG. 24 illustrates various components of the Communication Fabric of the present invention.

FIG. 24 illustrates various components of the Communication Fabric.

Transport Services 2402

Provides the underlying protocols responsible for transmitting and securing data communications. Transport Services are responsible for establishing, maintaining and terminating end-to-end communications between users and processes. Connection management provides transfer services that ensure the delivery of data from sender to receiver, which support the transferring of messages from a process running on one machine to a process running on another machine. In addition, connection management provides services that initiate a connection, gracefully terminate a connection, and handle abrupt termination. These services take place for application before and after the data is formatted for transport over the network.

Messaging Transport 2404

The Message Transport service is responsible for the end-to-end delivery of messages. It can include the following functionality:

End-to-End Data Transfer—The Message Transport Service formats messages for sending and confirms the integrity of received messages.

Connection Control—The Message Transport service may establish end-to-end (client-server) connections and track addresses and other associated information for the connection. The service also tears down connections and handles hard connection failures.

Reliable Transfer—The Message Transport service may manage reliable delivery of messages through the use of acknowledgments and retransmissions.

Flow Control—The Message Transport service may allow the receiver to govern the rate at which the sender transfers data.

Multiplexing—The Message Transport service may define multiple addresses or ports within a single network node, allowing multiple processes on the node to have their own communications paths.

(Some transport services do not implement all of the listed functionality. For example, the UDP protocol does not offer connection control or reliable transfer.)

The following are examples of protocols that provide message transport:

SPX (Sequenced Packet eXchange)

TCP (Transmission Control Protocol)

UDP (User Datagram Protocol)

NetBIOS/NetBEUI (Network Basic Input/Output System/NetBIOS Extended User Interface)

APPC (Advanced Program-to-Program Communications)

AppleTalk

Packet Forwarding/Internetworking 2406

The Packet Forwarding/Internetworking service transfers data packets and manages the path that data takes through the network. It includes the following functionality:

Fragmentation/Reassembly—The Packet Forwarding/Internetworking service divides an application message into multiple packets of a size suitable for network transmission. The individual packets include information to allow the receiving node to reassemble them into the message. The service also validates the integrity of received packets and buffers, reorders, and reassembles packets into a complete message.

Addressing—The Packet Forwarding/Internetworking service encapsulates packets with addressing information.

Routing—The Packet Forwarding/Internetworking service can maintain routing information (a view of the network topology) that is used to determine the best route for each packet. Routing decisions are made based on the cost, percent utilization, delay, reliability, and similar factors for each possible route through the network.

Switching—Switching is the process of receiving a packet, selecting an appropriate outgoing path, and sending the packet. Switching is performed by routers and switches within the communications fabric. Switching can be implemented in the following ways:

For some network protocols (e.g., IP), routers draw upon dynamic routing information to switch packets to the appropriate path. This capability is especially important when connecting independent networks or subnets.

For other network protocols (e.g., Ethernet, Token Ring), switching simply directs packets according to a table of physical addresses. The switch can build the table by "listening" to network traffic and determining which network nodes are connected to which switch port.

Some protocols such as Frame Relay involve defining permanent routes (permanent virtual circuits PVCs) within the network. Since Frame Relay is switched based upon PVCs, routing functionality is not required.

Multicasting—The Packet Forwarding/Internetworking service may support multicasting, which is the process of transferring a single message to multiple recipients at the same time. Multicasting allows a sender to transfer a single copy of the message to the communications fabric, which then distributes the message to multiple recipients.

The following are examples of protocols that provide Packet Forwarding/Internetworking:

IP (Internet Protocol)

IP Multicast (emerging standard that uses a special range of IP addresses to instruct network routers to deliver each packet to all users involved in a multicast session)

IPX (Internetwork Packet Exchange)

ATM (Asynchronous Transfer Mode)

Frame Relay

X.25

SMDS (Switched Multimegabit Data Service)

The following are examples of network components that perform Packet Forwarding/Internetworking:

routers switches

ATM switches, Frame Relay switches, IP switches, Ethernet switches, Token Ring switches, etc.

The following are examples of protocols that maintain routing information tables within routers:

Distance Vector Protocols—each router periodically informs neighboring routers as to the contents of routing table (destination addresses and routing metrics); routing decisions based on the total distance and other "costs" for each path.

IP and IPX Routing Information Protocols (RIP)

AppleTalk Routing Table Management Protocol (RTMP)

Ciscos Interior Gateway Routing Protocol (IGRP) and Enhanced IGRP

Link-State Protocols—each router periodically broadcasts changes to the routers and directly attached networks that it can talk with.

Open Shortest Path First (OSPF)

ISOs Intermediate System to Intermediate System (IS-IS)

Novells NetWare Link Services Protocol (NLSP)

Policy Routing Protocols—allow Internet backbone routers to accept routing information from neighboring backbone providers on the basis of contracts or other non-technical criteria; routing algorithms are Distance Vector.

Border Gateway Protocol (BGR)

Interdomain Routing Protocol (IDR)

Circuit Switching 2408

While Message Transport services and Packet Forwarding/Internetworking services support the transfer of packetized data, Circuit Switching services establish physical circuits for the transfer of circuit-switched voice, fax, video, etc.

Circuit Switching uses an end-to-end physical connection between the sender and the receiver that lasts for the duration of the "call"

includes voice, video, fax, etc.

includes data in a circuit switched architecture (e.g., dial-up connections)

Packetized transferred through brief, temporary, logical connections between nodes includes data and packetized multimedia (video, voice, fax, etc.)

Circuit Switching includes the following functionality:

establishes end-to-end path for circuit (may involved multiple intermediate nodes/switches)

manages end-to-end path (quality, billing, termination, etc.)

The following are examples of Circuit Switching:

analog dial-up telephone circuit

ISDN (Integrated Services Digital Network)

Possible Product Options

Lucent's Definity; Nortels Meridian; Lucents E5S; Nortels DMS; Tellabs Titan products; Lucents DSX products; Alcatels SX products; AltiGens AltiServ; Lucents Internet Telephony Server The following are examples of PBX products, which perform circuit switching within private telephone networks:

Lucent's Definity

Nortel's Meridian

The following are examples of central office (telephone company) switches, which perform circuit switching within the public telephone network:

Lucent's E5S

Nortel's DMS

The following are examples of Digital Access Cross-connect Systems (DACS), which are configured to switch circuits among multiple ports.

Tellabs' Titan products

Lucent's DSX products

Alcatel's SX products

The following is an example of a PC-based PBX system:

AltiGen's AltiServ—PC-based PBX system for a small branch office or a low-volume specialized call center.

The following is an example of a circuit-switching/packet-forwarding gateway:

Lucent's Internet Telephony Server—server software that routes calls from PBXs over the Internet or intranets.

Transport Security 2410

Transport Security services (within the Transport Services layer) perform encryption and filtering.

Transport-layer Encryption

Encryption within the Transport Services layer is performed by encrypting the packets generated by higher level services (e.g., Message Transport) and encapsulating them in lower level packets (e.g., Packet Forwarding/Internetworking). (Note that encryption can also occur within the Communications Services layer or the Network Media layer.) Encryption within the Transport Services layer has the advantage of being independent of both the application and the transmission media, but it may make network monitoring and troubleshooting activities more difficult.

The following standards support transport-layer encryption:

Point to Point Tunneling Protocol

Layer 2 Tunneling Protocol

Transport-layer Filtering

Network traffic can be controlled at the Transport Services layer by filtering data packets based on source and/or destination addresses and network service. This ensures that only authorized data transfers can occur. This filtering is one of the roles of a packet filtering firewall. (A firewall is a system that enforces an access control policy between a trusted internal network and an untrusted external network.)

The following IETF standard supports interoperability among security systems:

IPSec Allows two nodes to dynamically agree on a security association based on keys, encryption, authentication algorithms, and other parameters for the connection before any communications take place; operates in the IP layer and supports TCP or UDP. IPSec will be included as part of IPng, or the next generation of IP.

Implementation Considerations

Firewalls can also provide a single point of access to the companys network, which could be used to maintain an audit trail. Some firewalls provide summaries to the administrator about the type of traffic and amount of traffic passed through it, number of break in attempts, etc.

Most commercial firewalls are configured to reject all network traffic that has not been explicitly allowed, thus enforcing the policy, Only allow traffic that has been categorically permitted, otherwise prohibit. This policy provides much more control and is much safer than a policy which allows traffic unless it has been explicitly prohibited.

Possible Product Options

Cisco Systems; Bay Networks; 3Com Corp.; Check Points Firewall-1; Raptor Systems Eagle Firewall; Data Fellows F-Secure VPN; Racals Datacryptor 64F The following are examples of vendors of products that perform Transport-level encryption:

routers:

Cisco Systems

Bay Networks

3Com Corp.

firewalls:

Check Point's Firewall-1

Secure Computing's BorderWare Firewall Server

Raptor Systems' Eagle Firewall encryption devices:

Data Fellows' F-Secure VPN

Racal's Datacryptor 64F

The following are examples of products that perform Transport-level packet filtering:

firewalls:

Check Point FireWall-1—combines Internet, intranet and remote user access control with strong authentication, encryption and network address translation (NAT) services. The product is transparent to network users and supports multiple protocols.

Secure Computing's BorderWare Firewall Server protects TCP/IP networks from unwanted external access as well as provides control of internal access to external services; supports packet filters and application-level proxies.

Raptor Systems' Eagle Firewall routers:

Cisco Systems

Bay Networks

3Com Corp.

Network Address Allocation 2412

Network Address Allocation services manage the distribution of addresses to network nodes. This provides more flexibility compared to having all nodes assigned static addresses. This service assigns addresses to nodes when they initially power-on and connect to the network.

The following are examples of standards that implement Network Address Allocation and allow a network node to ask a central resource for the node_s network address (e.g., IP address):

DHCP (Dynamic Host Configuration Protocol)

BootP (Bootstrap Protocol)

Quality of Service 2414

Different types of network traffic (e.g., data, voice, video) have different quality of service requirements. For example, data associated with video conferencing sessions is useless if it is not delivered "on time". On the other hand, traditional best-effort data services, such as file or e-mail transfer, are not affected by variations in latency. QoS (Quality of Service) services deliver a defined network throughput for designated traffic by allocating dedicated bandwidth, prioritizing data traffic, etc. (Note that as an alternative to predefined throughput, some QoS protocols can also offer a best effort (i.e., variable) throughput QoS based on available network capacity.)

The following list provides a description of various Quality of Service parameters.

connection establishment delay—time between the connection request and a confirm being received by the requester connection establishment failure probability—chance that the connection will not be established within the maximum establishment delay throughput—bits per second (bps) of transmitted data transit delay—time elapsed between when sender transfers packet and recipient receives packet residual error rate—number of lost or corrupted messages compared to total messages in the sampling period transfer failure probability—the fraction of the time when the throughput, transit delay, or residual error were not those agreed upon at the start of the connection connection release delay—time between when one node initiates a release and the other node performs the release connection release failure probability—fraction of release attempts which do not succeed protection—specifies a secure connection priority—indicates traffic priority over the connection resilience—probability that the transport layer spontaneously terminates QoS can be achieved in various ways as listed below:

Specialized QoS Communications Protocols—provide guaranteed QoS.

Asynchronous Transfer Mode (ATM)—ATM is a connection-oriented wide area and local area networking protocol that delivers QoS on a per-connection basis. QoS is negotiated as part of the initial connection set up and as network conditions change. Because of the small size of ATM data cells, QoS can be better managed, compared to protocols such as Ethernet that have large frames that can tie up network components. For ATM to deliver QOS to applications, ATM must be used end-to-end.

Resource Reservation Protocol (RSVP)—The emerging RSVP specification, proposed by the Internet Engineering Task Force (IETF), allows applications to reserve router bandwidth for delay-sensitive sensitive IP traffic. With RSVP, QoS is negotiated for each application connection. RSVP enables the network to reserve resources from end to end, using Frame Relay techniques on Frame Relay networks, ATM techniques on ATM, and so on. In this way, RSVP can achieve QoS across a variety of network technologies, as long as all intermediate nodes are RSVP-capable.

IP Stream Switching—improves network performance but does not guarantee QoS.

IP Switching—IP Switching is an emerging technology that can increase network throughput for streams of data by combining IP routing software with ATM switching hardware. With IP Switching, an IP switch analyzes each stream of packets directed from a single source to a specific destination, and classifies it as short- or long-lived. Long-lived flows are assigned ATM Virtual Channels (VCs) that bypass the IP router and move through the switching fabric at the full ATM line speed. Short-lived flows continue to be routed through traditional store-and-forward transfer.

Tag Switching—Like IP Switching, emerging Tag Switching technology also improves network throughput for IP data streams. Tag Switching aggregates one or more data streams destined for the same location and assigns a single tag to all associated packets. This allows routers to more efficiently transfer the tagged data. Tag Switching is also known as Multiprotocol Label Switching.

Data Prioritization—improves network performance but does not guarantee

While not an example of end-to-end QoS, various network components can be configured to prioritize their handling of specified types of traffic. For example, routers can be configured to handle legacy mainframe traffic (SNA) in front of other traffic (e.g., TCP/IP). A similar technique is the use of prioritized circuits within Frame Relay, in which the Frame Relay network vendor assigns different priorities to different permanent virtual circuits.

Prioritization techniques are of limited effectiveness if data must also pass through network components that are not configured for prioritization (e.g., network components run by third party network providers).

Network Media Services 2416

The Network Media layer provides the following capabilities:

Final framing of data for interfacing with the physical network.

Performing, receiving, interpreting and acting on signals from the communications fabric.

Transferring data through the physical network.

The technologies used at the Network Media Services layer vary depending on the type of network under consideration.

Media Access 2418

Media Access services manage the low-level transfer of data between network nodes. Media Access services perform the following functions:

Physical Addressing—The Media Access service encapsulates packets with physical address information used by the data link protocol (e.g., Ethernet, Frame Relay).

Packet Transfer—The Media Access service uses the data link communications protocol to frame packets and transfer them to another computer on the same network/subnetwork.

Shared Access—The Media Access service provides a method for multiple network nodes to share access to a physical network. Shared Access schemes include the following:

- CSMA/CD—Carrier Sense Multiple Access with Collision Detection. A method by which multiple nodes can access a shared physical media by "listening" until no other transmissions are detected and then transmitting and checking to see if simultaneous transmission occurred.
- token passing—A method of managing access to a shared physical media by circulating a token (a special control message) among nodes to designate which node has the right to transmit.
- multiplexing—A method of sharing physical media among nodes by consolidating multiple, independent channels into a single circuit. The independent channels (assigned to nodes, applications, or voice calls) can be combined in the following ways:
  - time division multiplexing (TDM)—use of a circuit is divided into a series of time slots, and each independent channel is assigned its own periodic slot.
  - frequency division multiplexing (FDM)—each independent channel is assigned its own frequency range, allowing all channels to be carried simultaneously.

Flow Control—The Media Access service manages the flow of data to account for differing data transfer rates between devices. For example, flow control would have to limit outbound traffic if a receiving machine or intermediate node operates at a slower data rate, possibly due to the use of different network technologies and topologies or due to excess network traffic at a node.

Error Recovery—The Media Access service performs error recovery, which is the capability to detect and possibly resolve data corruption that occurs during transmission. Error recovery involves the use of checksums, parity bits, etc.

Encryption—The Media Access service may perform encryption. (Note that encryption can also occur within the Communications Services layer or the Transport Services layer.) Within the Network Media Services layer, encryption occurs as part of the data link protocol (e.g. Ethernet, frame relay). In this case, all data is encrypted before it is placed on the wire. Such encryption tools are generally hardware products. Encryption at this level has the advantage of being transparent to higher level services. However, because it is dependent on the data link protocol, it has the disadvantage of requiring a different solution for each data link protocol.

The following are examples of Media Access protocols:

- Ethernet
- token ring
- FDDI
- portions of the ATM standard
- HDLC/SDLC
- LAPB
- T-carrier, E-carrier (e.g., T1, T3, E1, E3)
- TDM and FDM (Time Division Multiplexing and Frequency Division Multiplexing; used on T-carriers, etc.)
- SONET, SDH
- PPP, SLIP
- V.32, V.34, V.34 bis, etc.
- RS-232, EIA-232
- TDMA and FDMA (Time Division Multiple Access and Frequency Division Multiple Access; used on wireless links)

Specialized services convert between addresses at the Media Access level (i.e., physical addresses like Ethernet) and the Packet Forwarding/Internetworking level (i.e., network addresses like IP). The following protocols are examples of this functionality:

- ARP (Address Resolution Protocol)—allows a node to obtain the physical address for another node when only the IP address is known.
- RARP (Reverse Address Resolution Protocol)—allows a node to obtain the IP address for another node when only the physical address is known.

Possible Product Options

Semaphores Network Security System for Workgroups

Semaphore's Network Security System for Workgroups—encrypts Ethernet.

Physical Media 2420

Figure 25:
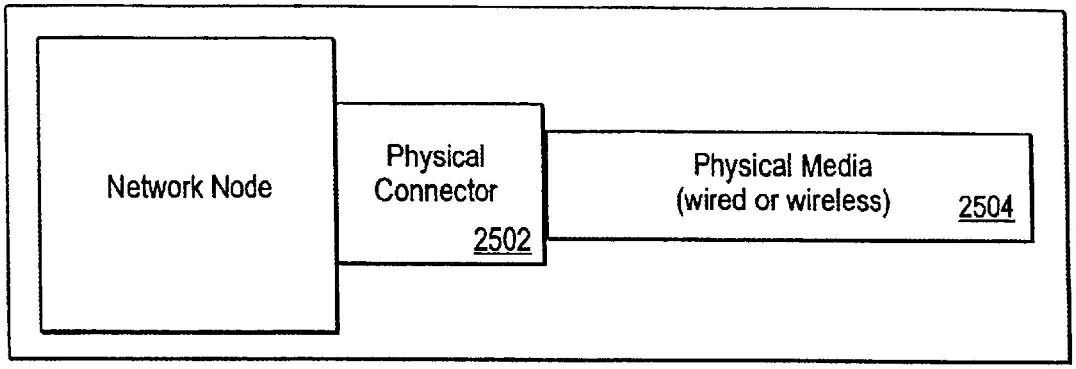
FIG. 25 illustrates the two categories of the Physical Media.

As illustrated in FIG. 25, the Physical Media is divided into two categories:

1). the physical connectors 2502

2). the physical media (wired or wireless) 2504

Physical Connectors

The following are examples of wiring connectors used to connect network nodes to physical media:

- RJ-11, RJ-45
- BNC
- DB-9, DB-25
- fiber optic connectors

Physical Media

Physical Media may be wired or wireless. Wired Physical Media includes wiring and cabling, while wireless Physical Media includes antennas, connectors, and the radio frequency spectrum.

The following are examples of wired physical media:

- twisted pair wiring, shielded twisted pair wiring
- coaxial cable
- fiber optic cable
- 4-pair voice-grade wiring The following are examples of wireless physical media:

- cellular antennas and the associated radio frequencies
- wireless local area network antennas and the associated radio frequencies
- satellite antennas and the associated radio frequencies

Transaction 1012,1014

A transaction is a unit of work that has the following (ACID) characteristics:

- A trans action is atomic; if interrupted by failure, all effects are undone (rolled back).
- A transaction produces consistent results; the effects of a transaction preserve invariant properties.
- A transaction is isolated; its intermediate states are not visible to other transactions. Transactions appear to execute serially, even if they are performed concurrently.

A transaction is durable; the effects of a completed transaction are persistent; they are never lost (except in a catastrophic failure).

A transaction can be terminated in one of two ways: the transaction is either committed or rolled back. When a transaction is committed, all changes made by the associated requests are made permanent. When a transaction is rolled back, all changes made by the associated requests are undone.

Transaction Services provide the transaction integrity mechanism for the application. This allows all data activities within a single business event to be grouped as a single, logical unit of work.

In small to moderate scale environments of less than 150 simultaneous users on a single server, this service may be provided by the DBMS software with its restart/recovery and integrity capabilities.

For larger client/server environments distributed on-line transaction managers might be more applicable. These transaction managers provide sharing of server processes across a large community of users and can be more efficient than the DBMSs.

Figure 26:
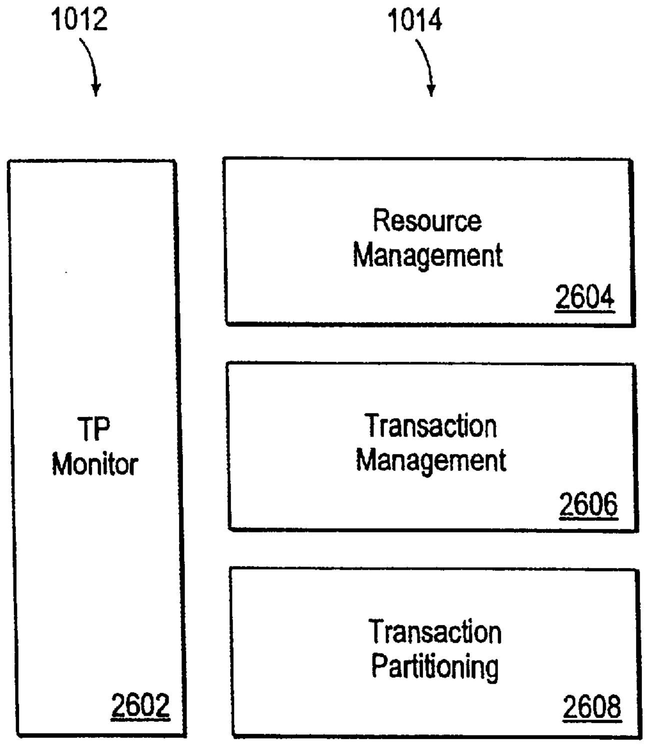
FIG. 26 illustrates several of the components of the Transaction areas of the Netcentric Architecture Framework.

FIG. 26 illustrates several of the components of the Transaction areas of the Netcentric Architecture Framework, each of which will be discussed in more detail below.

Transaction Monitor 2602

The Transaction Monitor Services are the primary interface through which applications invoke Transaction Services and receive status and error information. Transaction Monitor Services, in conjunction with Information Access and Communication Services provide for load balancing across processors or machines and location transparency for distributed transaction processing.

Implementation Considerations

Does the system access nonrelational data?

Some TP monitors provide a method of accessing nonrelational data, such as VSAM files or flat files, independently of where the file physically resides. If write access is required for these data sources, a TP monitor would provide more dependable messaging and two-phase commit capabilities than the data source messaging capabilities alone.

Does the system require high throughput?

Because TP monitors provide load balancing functionality and because they effectively reduce the number of connections that must be made to the database(s), they will help conserve the resources of the data servers and, as a result, increase the throughput of the system. Systems with high throughput requirements should consider using a TP monitor.

Do the on-line applications need the support of interoperability between autonomous, heterogeneous processors?

Some TP monitors are available on multiple platforms and maintain interoperability (communication, data translation, etc.) between heterogeneous resource managers (databases) and clients (UNIX, MS Windows NT, etc.). For this reason, projects that intend to support a heterogeneous hardware environment should consider using a TP monitor.

Is the system supposed to be highly available (i.e. 24×7), or mission critical?

TP monitors offer robust functionality: two-phase commit, recovery/rollback, naming services, security services, can guarantee message delivery, can be maintained for high-availability operation and provides audit trail logging. Therefore, the more mission critical the system, the more likely it is that a TP monitor should be used.

Does the system require high availability?

Because of their fault tolerance, TP monitors make a valuable addition to systems that require high availability. The automatic restart/recovery feature helps a system recognize when components have failed and attempts to restart them. Also, because of the location transparency feature of service calling, if an entire node in a system goes down, clients may be able to reach the service they need on another node providing the same service.

Will the system be scaled in the future?

TP monitors offer multiple scalability options. TP monitors can run on machines ranging from PCs to mainframes. Monitors also scale by allowing new machines to be added dynamically to the system. Adding additional nodes in the production cycle is one TP monitor strength, although some monitors are better at doing this than others. If it is anticipated that system volumes will increase during the system's lifetime, scalability in itself is an excellent reason to use a TP monitor.

Does the system have complex security requirements?

All of the TP monitors available today provide security authorization/authentication services. Most of them utilize the Kerberos security package, developed at the Massachusetts Institute of Technology (MIT).

Does the system access legacy systems?

TP monitors can access databases and services running on mainframe systems. TP monitors frequently include mainframe networking capability and maintain transaction rollback during mainframe accesses. If access to the legacy system is read only, the messaging capabilities of the data source will probably be sufficient. If access is write, however, the messaging and two-phase commit capabilities of the TP monitor would be more dependable.

Is the system distributed across multiple nodes?

TP monitors provide common administrative facilities to manage groups of servers. These facilities allow a system to be managed from one location with a common set of commands for each machine.

How many users access the system concurrently?

Different sources give different answers as to the number of concurrent users that necessitates the use of a TP monitor. The monitor vendors themselves give low values; the database vendors give high values. The middle ground seems to be somewhere around 250 users. This is by no means definitive, however; weigh each of the following questions when making the choice.

Do the on-line applications access/update more than one database or more than one type of database?

The real strength of TP monitors is their ability to ensure a global two-phase commit over multiple, heterogeneous databases. A system that has this quality is a candidate for a TP monitor.

Is the system not a transaction processing system?

Although TP monitors provide global two-phase commit "transaction processing" functionality, systems that do not need this feature can also benefit by using TP monitors. For example, the load-balancing feature in itself can help increase system performance. Also, the administrative facilities can help simplify system management.

Is Data Dependent Routing Necessary?

Data Dependent Routing is the ability to route requests to a particular server based upon the data passed within the request. TP monitors can provide this functionality. e.g. A system has several servers accepting requests from clients dispersed across North America. There are two groups of servers. One group of servers handles requests from all clients located in the USA while the other group serves requests from Canada. When a client sends a request to the system, a field in the request message, defining the location of the client, is passed to the system. The TP monitor is then able to route the request to the correct group of servers (USA or Canada) based upon information in the request message.

Is Reliable Queueing Necessary?

TP monitors provide the ability to enqueue and dequeue requests to and from a reliable (stable storage) queue. Both the application and the administrator can control the order of the messages (service requests) in the queue. Messages can be ordered LIFO, FIFO, time based, priority, or by some combination of these keys.

Example

A system updates a customer database. Suppose that the database has been partitioned such that the information on customers most likely to use a branch office is stored locally at a branch office. There is a requirement to maintain an up-to-date of the entire customer database at the home office. The application that updates the local customer master can place a copy of the update into a reliable queue. The queue can be forwarded to the home office via a WAN, and the updates can be replicated in the home office database. The queuing system can be used to assure that every update completed at the local office is completed at the home office.

Is The System Multi-tiered?

Transaction Services are typically used in three-tier and multi-tier architectures. Particularly in Netcentric environments, applications might need to support getting and providing access to multiple back-end services, across enterprises, as part of a single transaction or user activity. This can be especially challenging if the user does not own some or all of the back-end services and/or data that its application relies on.

Product Considerations

Is the client interested in stable or emerging technologies?

TUXEDO has been in the TP marketplace for seven years and has the most installations of all TP monitors. Encina, TOP END, and CICS/6000 are relatively new and emerging.

Does the client plan to use Windows NT?

On Which platforms/operating systems do the servers run?

TP monitor support for NT may be limited.

Some TP monitors are capable of running on a wider variety of platforms/operating systems than others.

Is the project installing a new system or rehosting/downsizing an existing mainframe system?

The UniKix, VIS/TP, and CICS/6000 monitors were developed specifically with rehosting in mind. TUXEDO, Encina, and TOP END are best suited to fresh installations.

Does the system use PC-based clients?

Each TP monitor offers different support for PC-based clients. TUXEDO and TOP END currently provide DOS, Windows, and OS/2 application programming interface (API) support. Encina offers PC support, but this feature is still in beta test. Several vendors have PowerBuilder and Visual Basic interfaces planned for their monitors, but as of this practice aid's printing, nothing has been released.

On which platforms will client applications execute?

New and re-engineered systems may be required to execute on a previously installed base of clients.

Does the system require integration with other 3rd party tools?

The client may expect the TP monitor to integrate with an already installed base of 3rd party development tools.

Does the system require mainframe connectivity?

Of the four monitors that are evaluated in this practice aid, all of them offer varying levels of mainframe connectivity.

Does the client have existing personnel with mainframes—CICS experience?

CICS/6000 has a programming interface similar to mainframe CICS. The learning curve for mainframe CICS programmers to use CICS/6000 would be minimal; for these same personnel to program using TUXEDO, Encina, or TOP END, the learning curve would be substantial. On the other hand, because CICS/6000's administrative facilities are not similar to mainframe CICS, administrative personnel will face a steep learning curve: they will need to learn UNIX, DCE, and Encina (the layers on which CICS/6000 is built). (NOTE: VIS/TP and UniKix are also implementations of CICS in the UNIX environment, but they ere not included in this evaluation.)

Possible Product Options

Tuxedo; CICS/6000; Encina; MS Transaction Server; Sybase Jaguar; TOP END; openUTM; TransIT Open/OLTP Below are commonly used transaction monitors:

BEA TUXEDO—provides a robust middleware engine for developing and deploying business-critical client/server applications. BEA TUXEDO handles not only distributed transaction processing, but also application and the full complement of services necessary to build and run enterprise-wide applications. It enables developers to create applications that span multiple hardware platforms, databases and operating systems.

IBMs CICS/6000 —an application server that provides industrial-strength, online transaction processing and transaction management for mission-critical applications on both IBM and non-IBM platforms. CICS manages and coordinates all the different resources needed by applications, such as RDBMSs, files and message queues to ensure completeness and integrity of data.

Transarcs Encina—implements the fundamental services for executing distributed transactions and managing recoverable data, and various Encina extended services, which expand upon the functionality of the toolkit to provide a comprehensive environment for developing and deploying distributed transaction processing.

Microsofts Transaction Server (Viper)—a component-based transaction processing system for developing, deploying, and managing high performance, and scalable enterprise, Internet, and intranet server applications. Transaction Server defines an application programming model for developing distributed, component-based applications. It also provides a run-time infrastructure for deploying and managing these applications.

Brief Product Considerations

Encina—The Encina DTP (OLTP) was built on top of OSF's DCE. This is both its greatest asset and curse. DCE offers a very complete set of functions including security services, RPC's, a directory service (like a yellow pages for clients to find services) and a standard time service, and it is truly cross-platform and is endorsed by most vendors. The problem is that it is a resource hog, and is fairly slow. DCE is also somewhat immature in that there are not many tools to help you administer or program applications (although many are on the way). Encina adds primarily a transactional element and some load balancing services to RPC's. It also provides an easier interface to work with (although it is still an administrative nightmare).

The good news is that the tools are getting better all of the time. Also, Encina is very scalable and services can be on any machine in the network. Finally, Encina's load balancing is quite good, much better then native DCE or Tuxedo.

Tuxedo
Functionality
- Can handle a large number of concurrent client applications
- Can handle a large volume of through-put (ex. 1000+ TPS)
- Scaleable (handle many clients or a few without code rewrite)
- Supports Transactions, including XA transactions
- Has its own transaction resource manager
- Guaranteed message delivery using a stable storage queue (/Q)
- Future service delivery using/Q (usually for batch processing)
- Can prioritize messages—most important get processed sooner.
- Supports many platforms (all UNIX, NT, all common client platforms)
- Tuxedo supports C, C++, and Cobol development
- Can be used for basic c/s messaging
- Supports conversational messaging between a client and a specific server
- Peer-to-peer, client-to-client messaging is supported
- Unsolicited messaging is supported for client processes
- Asynchronous:service calls can be made by client and server processes
- Synchronous service calls can be made by client and server processes
- Synchronous calls that receive no return message are supported
- Very good security—must connect to access services
- Security can be integrated w/Kerberos
- Has many different buffer types: view to pass C structs, FML to pass anything, carrays to pass binary (sound, video), strings to pass strings
- FML allows dynamic messages to be sent/received
- Automatic error logging for Tuxedo components (ULOG, tagent log)
- Application code can write to the ULOG with a Tuxedo API (error logging provided)
- Automatic process monitor for process that die or machines that get partitioned
- Service location independency (distribution/directory services)
- Platform independency-handles data conversion
- Built in data compression (if desired)
- Built in performance measurement feature for services
- Built in admin functions to monitor Tuxedo system online (tmadmin)
- A server can be called based on data in the message (Data Dependent Routing)
- Customizable server start-up and shutdown functions are automatically called.
- /Domains allow independent Tuxedo regions to share services
- Extensions to execute IMS and CICS transactions from UNIX (Open Transport)
- Subscribe and Broadcast supported
- APIs to get admin and system monitoring data for custom operation tools
- JOLT (java to access Tuxedo servers)

Other Reasons to Use Tuxedo
- Tuxedo is the market leader OLTP
- Tuxedo is a proven product used in mission critical systems govt. and financial)
- Tuxedo can be used to develop highly-available systems (24×7)
- Has been implemented with PowerBuilder, VisualBasic, Motif clients, and unix batch systems.

Cons of Using Tuxedo
- Tuxedo for basic c/s messaging is overkill.
- Expensive to purchase
- Can be complicated to develop with and administer
- System performance tuning requires an experienced Tuxedo administrator
- Uses IPC resources and therefore should not be on same machine w/other IPC products
- Must be understood thoroughly before design starts. If used incorrectly, can be very costly.
- Single threaded servers requires an upfront packaging design.
- Difficult to debug servers
- Does not work well with Pure Software products: Purify, Quantify
- Servers must be programmed to support client context data management
- Difficult to do asynch messaging in 3rd party Windows 3.x client tools (ex. PowerBuilder)

Resource Management 2604

A Resource Manager provides for concurrency control and integrity for a singular data resource (e.g., a data base or a file system). Integrity is guaranteed by ensuring that an update is completed correctly and entirely or not at all. Resource Management Services use locking, commit, and rollback services, and are integrated with Transaction Management Services.

Transaction Management 2606

Transaction Management Services coordinate transactions across one or more resource managers either on a single machine or multiple machines within the network. Transaction Management Services ensure that all resources for a transaction are updated, or in the case of an update failure on any one resource, all updates are rolled back.

This services that allow multiple applications to share data with integrity. The transaction management services help implement the notion of a transaction—a set of computations producing changes to recoverable data which demonstrate the ACID properties:

- Atomicity—all changes are made completely (committed) or not at all (roll-back).
- Consistency—the effects of a transaction preserve invariant properties.
- Isolation—intermediate data values are not visible to other transactions.
- Durability—the effect of a completed transaction are persistent.

Two-Phase Commit is a feature found in distributed database management-systems and online transaction processing (OLTP) monitors to ensure information integrity across distributed databases. With this feature, a transaction is only committed if two databases have the necessary information. If a problem arises on a network connection or a computer, the software will roll the transaction back so it will not be entered in either place. A restart mechanism may then retriy to complete the transaction.

Possible Product Options

Tuxedo; Encina; TOP END; CICS/6000; openUTM; TransIT Open/OLTP

Transaction Partitioning 2608

Transaction Partitioning Services provide support for mapping a single logical transaction in an application into the required multiple physical transactions. For example, in a package or legacy rich environment, the single logical transaction of changing a customer address may require the partitioning and coordination of several physical transactions to multiple application systems or databases. Transaction Partitioning Services provide the application with a simple single transaction view.

Implementation Considerations

Must the system support logical transactions that occur across heterogenous application servers and databases?

Example

In a given application, a single business process of updating a customer record requires an update to a table in a UNIX based relational database and then an update to a table in a MVS DB2 database. Although there are two physical transactions occurring, this entire business process is represented as a single logical transaction. Transaction Partitioning services allow the application to ensure that the individual transactions occurr across the different UNIX and MVS systems and that the single logical transaction is completed and successful when the individual physical transactions are completed and successful.

ENVIRONMENT 1016,1018

Figure 27:
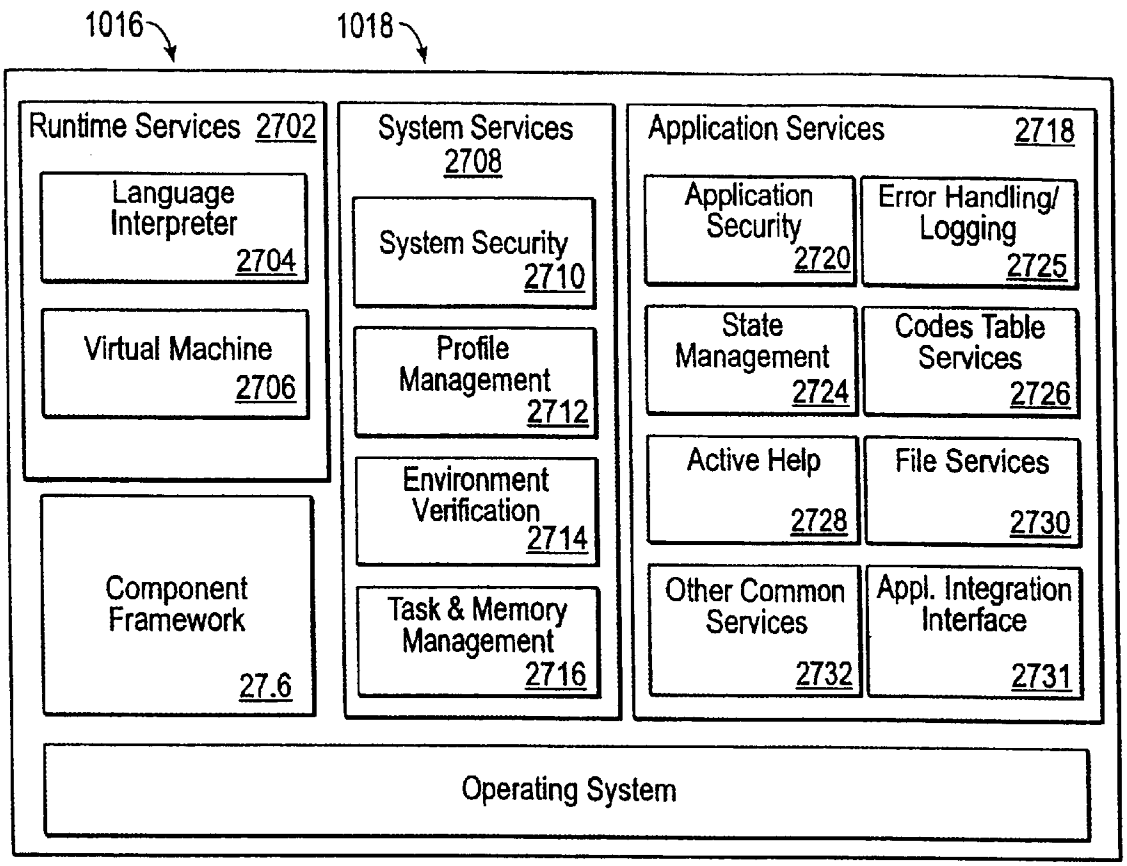
FIG. 27 illustrates various components of the Environmental Services of the Netcentric Architecture Framework.

FIG. 27 illustrates various components of the Environmental Services of the Netcentric Architecture Framework. Environment Services provide miscellaneous application and system level services that do not deal directly with managing the user-interface, communicating to other programs, or accessing data.

Runtime Services 2702

Runtime services convert non-compiled computer languages into machine code during the execution of a program.

Language Interpreter 2704

Language Interpreter Services decompose a 4th generation and/or a scripting languages into machine code (executable code) at runtime.

Possible Product Options

VBRUN300.DLL

VBRUN300.DLL—runtime Dynamic Link Library that supports programs written in Visual Basic.

Virtual Machine 2706

Typically, a Virtual Machine is implemented in software on top of an operating system, and is used to run applications. The Virtual Machine provides a layer of abstraction between the applications and the underlying operating system and is often used to support operating system independence.

Possible Product Options

Java Virtual Machine; Smalltalk Virtual Machine

Virtual machines such as the Java virtual machine or the Smalltalk virtual machine implement their own versions of operating system services in order to provide the application with complete platform independence.

Java virtual machine—software implementation of a "CPU" designed to run compiled Java byte code. This includes stand-alone Java applications as well as "applets" that are downloaded and run in Web browsers.

Smalltalk virtual machine—runtime engine that interprets application code during execution and supports platform independence.

System Services 2708

Services which applications can use to perform system-level functions. These services include: System Security Services, Profile Management Services, Task and Memory Management Services, and Environment Verification Services.

System Security 2710

System Security Services allow applications to interact with the operating system's native security mechanism. The basic services include the ability to login, logoff, authenticate to the operating system, and enforce access control to system resources and executables.

Profile Management 2712

Profile Management Services are used to access and update local or remote system, user, or application profiles. User profiles, for example, can be used to store a variety of information such as the user's language and color preferences to basic job function information which may be used by Integrated Performance Support or Workflow Services.

Implementation Considerations

Is there a need for the application to have its own profile file?

All MS Windows based application maintain their own profile file (XXXXXXXX.INI) that is used during application startup, execution, and shutdown. This is a flat text file that contains information that can be used by the application during various phases of execution. For example, if an application needs to connect to a database engine/server, it needs to know, during startup, various information like—database name, the server name, login ID, etc. Instead of hard coding all these information in the application executable, this information can be stored in the profile file for flexibility. In the future, if the database server name should change, this change only needs to be entered in the applications profile file.

In some cases, it has been seen that this profile information has been hard coded in that applications executable itself. This will work, but, it makes the application more rigid with no room for any flexibility.

Environment Verification 2714

Environment Verification Services ensure functionality by monitoring, identifying and validating environment integrity prior and during program execution. (e.g., free disk space, monitor resolution, correct version). These services are invoked when an application begins processing or when a component is called. Applications can use these services to verify that the correct versions of required Execution Architecture components and other application components are available.

Implementation Considerations

In client/server applications, it may be necessary to implement Environment Verification Services to ensure that the client and server applications are of a compatible release level.

ActiveX framework provides services for automatic installation and upgrade of ActiveX controls. When using IE, i.e., Microsoft's Web browser, because of its integration with Windows OS, ActiveX controls can be automatically installed and automatically upgraded on the users machine without the developer adding any additional code.

Task and Memory Management 2716

Task & Memory Management Services allow applications and/or other events to control individual computer tasks or processes, and manage memory. They provide services for scheduling, starting, stopping, and restarting both client and server tasks (e.g., software agents).

Implementation Considerations

Memory management, the allocating and freeing of system resources, is one of the more error prone development activities when using 3GL development tools. Creating architecture services for memory handling functions can reduce these hard to debug errors.

Java removes, in theory, the problem of memory management, by providing a garbage collector; although, its implementation is not very efficient in current implementations of Java. Future releases of the Java VM promise a background-running garbage collector with significantly increased performance.

Application Services 2718

Application Services are miscellaneous services which applications can use for common functions. These common functions can apply to one application or can be used across applications. They include: Application Security Services, Error Handling/Logging Services, State Management Services, Help Services, and Other Common Services.

Application Security 2720

Besides system level security such as logging into the network, there are additional security services associated with specific applications. These include:

- User Access Services—set of common functions that limit application access to specific users within a company or external customers.
- Data Access Services—set of common functions that limit access to specific data within an application to specific users or user types (e.g., secretary, manager).
- Function Access Services—set of common functions that limit access to specific functions within an application to specific users or user types (e.g., secretary, manager).

Implementation Considerations

In the Netcentric environment, application security becomes a more critical component primarily because there are more types of users (e.g., employees, customers) and additional types of transactions (e.g., e-commerce, helpdesks). In traditional client/server environments most users are employees of the company. In Netcentric environments there are typically also external users (e.g., vendors, registered users) and the general public. Usually, different types of users have different application security requirements limiting what data they can see and what functions they can execute. Also, new types of transactions such as verifying credit when doing e-commerce transactions also require additional application security services.

Error Handling/Logging 2722

Error Handling Services support the handling of fatal and non-fatal hardware and software errors for an application. An error handling architecture takes care of presenting the user with an understandable explanation of what has happened and coordinating with other services to ensure that transactions and data are restored to a consistent state.

Logging Services support the logging of informational, error, and warning messages. Logging Services record application and user activities in enough detail to satisfy any audit trail requirements or to assist the systems support team in recreating the sequence of events that led to an error.

Implementation Considerations

Error Handling

Primarily there are three types of errors: system, architecture and application.

- System errors occur when the application is being executed and some kind of serious system-level incompatibility is encountered, such as memory/resource depletion, database access problems, network problems or printer related problems, because of which the application cannot proceed with its normal execution.
- Architecture errors are those which occur during the normal execution of the application and are generated in architecture functions that are built by a project architecture team to isolate the developers from complex coding, to streamline the development effort by re-using common services, etc. These architecture functions perform services such as database calls, state management, etc.
- Application errors are also those which occur during the normal execution of the application and are generally related to business logic errors such as invalid date, invalid price, etc.

Typically an application is written using a combination of various programming languages (e.g., Visual Basic and C). Therefore, a common error handling routine should be written in a language that can be called from any other language used in the application.

Logging

Logging must be done, however to mitigate problems, centralize logs and create a standard, usable log format. 3rd party logs should be mapped into the central format before any analysis is attempted.

In a Netcentric environment, errors are rarely logged on the client machine (one exception may be for an intranet type application).

Logging can add much stress to a Web server and logs can grow very large, very quickly, so do not plan to log all errors—capture only those which are deemed necessary for processing exceptions.

State Management 2724

State Management Services enable information to be passed or shared among windows and/or Web pages and/or across programs. So lets say several fields in an application need to be passed from one window to another. In pseudo-conversational mainframe 3270 style applications passing data from one screen to another screen was done using Context Management Services that provided the ability to store information on a host computer (in this paper the term Context Management refers to storing state information on the server, not the client). Client/server architectures simplified or eliminated the need for Context Management (storing state information on the server), and created a need to store state information on the client. Typically, in traditional client/server systems this type of state management (i.e., data sharing) is done on the client machine using hidden fields, global variables, messages, files or local databases.

The popularity of the Internets HTTP protocol has revived the potential need for implementing some form of Context Management Services (storing state information on the server). The HTTP protocol is a stateless protocol. Every connection is negotiated from scratch, not just at the page level but for every element on the page. The server does not maintain a session connection with the client nor save any information between client exchanges (i.e., web page submits or requests). Each HTTP exchange is a completely independent event. Therefore, information entered into one HTML form must be saved by the associated server application somewhere where it can be accessed by subsequent programs in a conversation.

Advances in Netcentric technologies now offer additional options for implementing state management on both the client and server machines.

Possible Product Options

NetDynamics Inc. NetDynamics

NetDynamics Inc. NetDynamics

NetDynamics provides built-in, developer-definable session and state 25 management. The Persistence Engine (PE), part of the NetDynamics application server, stores all relevant information about a user. Everything from the WebID to the exact table row the user is currently viewing can be maintained in the PE. NetDynamics maintains state information on both the server and on the client page. Application state information is maintained by the application server, and local state information is maintained on the page. NetDynamics provides manipulatable state objects for both server and page state information.

Codes Table Service 2726

Codes Table Services enable applications to utilize externally stored parameters and validation rules. For example, an application may be designed to retrieve the tax rate for the State of Illinois. When the user enters "Illinois" on the screen, the application first validates the user's entry by checking for its existence on the "State Tax Table", and then retrieves the tax rate for Illinois. Note that codes tables provide an additional degree of flexibility. If the tax rates changes, the data simply needs to be updated; no application logic needs to be modified.

Implementation Considerations

Is there a need for the codes table functionality?

Most applications need code/decode facility. For example, an application may need to store codes like—error severity codes, etc., stored in a table (may be a cached table) instead of in the executable itself. In some cases, where there is a small amount of information that needs to be stored in the codes table, the profile file (mentioned above) can be used instead of the codes table. But in cases where the codes table needs to be used quite extensively, then storing the code/decode information in the profile file will slow down the performance of the application because of the overhead of accessing flat files.

What basic services an architecture should provide in terms of managing/using codes/decodes functionality?

In cases where the application requires extensive use of codes table, the architectures Code/Decode component should provide the application developers with a set of API that can be used to use code/decode tables. This component should also provide the option of caching all or parts of the codes table in the application machines memory for easier and faster access.

Where should Code/Decode information be stored and maintained?

Code/decode information can be stored at any layer of an n-tier architecture—client, application server, or database. The decision will need to be based upon codes table size and number, information update frequency, and write-access to the client machine or device.

Active Help 2728

Active Help Services enable an application to provide assistance to a user for a specific task or set of tasks. Context-sensitive help is most commonly used in applications today, however this can imply more "active" support that just the F1 key. Typically, today's systems must be architected to include Help that is aware of both the user's environment, process and context, and in this sense can be called "active". Active Help services may include components like Wizards for walking a user through a new process, stored or real-time multi-media support, on-demand Computer Based Training, etc.

Other Common Services 2726

Catchall category for additional reusable routines useful across a set of applications (e.g., Date Routines, Time Zone Conversions, Field Validation Routines).

Implementation Considerations

Does the client operate in different date/time zone?

In most large scale distributed applications, the client and the server applications (or machines) are scattered over different time zones. This forces the client applications and the server hosts to deal with date and time zone conversions (like-CST to PST, etc.) in order to use or display their local time accurately. Most of the architectures provide a base set of APIs that can be used by the applications to convert the data/time as needed.

Does the system requires customized date/time format for display purposes?

Many systems, for certain business reasons, need customized date and time formats for display and storage purposes. In order to do that, the architecture should provide a set of APIs that will allow the system to convert data and time from one format to the other.

Does the system deal with high database accesses?

As mentioned in the Codes Table Component, sometimes it is necessary to cache the data in the memory for faster access and less database hits. This a feature that some architectures provide as a set of memory management APIs to create the cache area in the client platforms memory for the data to reside.

Application Integration Interface 2734

An Application Integration Interface provides a method or gateway for passing context and control of information to an external application. The Application Integration Interface specifies how information will be passed and defines the interface by which other applications can expect to receive information. External applications in this context could include anything from Integration Performance Support systems to ERP systems like SAP or Peoplesoft to external custom applications that have been previously developed by the client.

Implementation Considerations

Where possible, Application Integration Interfaces should make use of the Component Model defined by the project to broker information (i.e. OLE/COM interfaces) as opposed to custom building data sharing modules.

Component Framework 2736

Component Framework Services provide an infrastructure for building components so that they can communicate within an application and across applications, on the same machine or on multiple machines across a network, to work together. COM/DCOM and CORBA described in Communication Services are the two leading component industry standards. These standards define how components should be built and how they should communicate.

Object Request Broker (ORB) services, based on COM/DCOM and CORBA, focus on how components communicate. Component Framework Services, also based on CORBA and COM/DCOM, focus on how components should be built. The currently 2 dominant Component Frameworks include:

1. ActiveX/OLE—ActiveX and Object Linking and Embedding (OLE) are implementations of COM/DCOM. ActiveX is a collection of facilities forming a framework for components to work together and interact. ActiveX divides the world into two kinds of components: controls and containers. Controls are relatively independent components that present well defined interfaces or methods that containers and other components can call. Containers implement the part of the ActiveX protocol that allows for them to host and interact with components—forming a kind of back plane for controls to be plugged into. ActiveX is a scaled-down version of OLE for the Internet. OLE provides a framework to build applications from component modules and defines the way in which applications interact using data transfer, drag-and-drop and scripting. OLE is a set of common services that allow components to collaborate intelligently.

In creating ActiveX from OLE 2.0, Microsoft enhanced the framework to address some of the special needs of Web style computing. Microsofts Web browser, Internet Explorer, is an ActiveX container. Therefore, any ActiveX control can be downloaded to, and plugged into the browser. This allows for executable components to be interleaved with HTML content and downloaded as needed by the Web browser.

2. JavaBeans—is Sun Microsystems proposed framework for building Java components and containers. The intent is to develop an API standard that will allow components developed in Java (or beans), to be embedded in competing container frameworks including ActiveX or OpenDoc. The JavaBeans API will make it easier to create reusable components in the Java language.

Other component frameworks include:

OpenDoc—CI Labs was formed in 1993 and created the OpenDoc architecture to provide a cross-platform alternative component framework—independent of Microsofts OLE. The OpenDoc architecture is constructed from various technologies supplied by its founding members—IBM, Apple and Word Perfect. The technologies include: Bento (Apples object storage model), Open Scripting Architecture (OSA—Apples scripting architecture) and SOM/DSOM (IBMs System Object Model/Distributed SOM). IBMs SOM architecture provides analogous services to that of Microsofts DCOM architecture.

OpenDoc provides an open compound document infrastructure based on CORBA. It uses CORBA as its object model for inter-component communications. OpenDoc architecture provides services analogous to those provided by OLE and OpenDoc components can also inter-operate with OLE components. The OpenDoc equivalent of an object is termed a part. Each type of part has its own editor and the OpenDoc architecture has responsibility for handling the communications between the distinct parts.

Supporters claim OpenDoc provides a simpler, more technically elegant solution for creating and manipulating components than does OLE. The drawback is that OpenDoc is not yet commercially proven, like OLE. Ironically, one of the more popular uses of OpenDoc tools is for creating and implementing OLE clients and servers. Because OpenDoc provides a more manageable set of APIs than OLE, it may be that OpenDoc gains initial acceptance as an enabler of OLE applications before becoming recognized as a complete component software solution itself.

ONE—Open Network Environment (ONE) is an object-oriented software framework from Netscape Communications for use with Internet clients and servers, which enables the integrating of Web clients and servers with other enterprise resources and data. By supporting CORBA, ONE-enabled systems will be able to link with object software from a wide array of vendors, including IBM, Sun Microsystems, Digital Equipment, and Hewlett-Packard. Netscape is positioning ONE as an alternative to Microsoft's Distributed Common Object Model (DCOM). ONE also complies with Sun Microsystems Java technology.

Implementation Considerations

An architecture that utilizes components brings many of the benefits of object orientation to applications. Component-based or document-centric applications are composed of intelligent components, each of which contains logic, possibly data and a set of well defined interfaces or APIs to the services they provide (e.g., a customer component or an Excel chart component). The similarities to object oriented are more than just coincidental. Component software is viewed by many as a more viable object approach focusing on larger grain of modularity and reuse.

Two important issues driving the decision around what should be a component are software re-use and software packaging. Software re-use will primarily stem from defining components at a level at which they can be re-used within the same application and across many applications. Although re-usable components can be at any level, more often they will probably be at an object level where they are more granular. Software packaging will be driven by defining components at a level at which they can be distributed efficiently to all users when business logic changes occur. If the application is large, perhaps it is better to package the application by breaking it up into process components such as customer maintenance, sales order maintenance, etc. So when a change to one of the processes occurs, only the component which contains that process needs to be distributed to client machines, rather than the whole application. For example, a developer can create an ActiveX control that will encapsulate the Employee Maintenance Process, which includes adding new employees, updating and deleting existing employees. This ActiveX control can be a part of an overall human resource intranet application. When the functionality within the Employee Maintenance Process changes, the next time the user accesses the human resource application from the Web browser, ActiveX technology will automatically download the latest version of the ActiveX control containing the most recent update of the Employee Maintenance Process to the client machine, if the client machine does not have the latest version.

Component architectures typically employ of a three-tier component architecture utilizing the following three types of components:

User Interface, Process, and Domain. While these three component types may go by different names on different projects, they all follow the same basic pattern and are briefly explained below:

User Interface components typically contain nothing more than the logic required to manipulate input and output to the user. This can include input validation requiring no additional server data, as well as simple calculations associated with field display. In addition, logic associated with dynamically changing the display (e.g., a checkbox entry causes a field to become disabled) is placed here.

Process components typically contain the logic associated with business transactions performed on data. This is often the point where transaction commit/rollback occurs. These components are typically invoked by the User Interface components.

Domain components typically contain the logic associated with accessing and maintaining business entities, i.e., data. These components are usually invoked by Process components when requiring access to or manipulation of data. However, in addition to data access, these components may often be used to perform manipulations involving the processing of data within the domain of that component. For example, a Customer Domain component might be requested to determine if it's credit limit had been exceeded when provided with a new invoice amount.

Build vs. Buy

There is an explosion of components available in the market place and the ease of accessing and down loading components from the Internet; the decision to buy or build a component is as real as ever. In general clients expect more justification of a build decision v. a buy decision. Feel out the client and the expectations and requirements they may have.

Components are a viable option and should be researched, even includingeven simple UI controls available on the Internet. Look at market trends to determine which applications/components can meet the bulk of the system needs.

Operating System 2738

Operating System Services are the underlying services such as multi-tasking, paging, memory allocation, etc., typically provided by todays modern operating systems. Where necessary, an additional layer or APIs may be provided to gain either operating system independence or a higher level of abstraction for application programmers.

Possible Product Options

Microsoft Windows; Windows 95; Windows NT; Macintosh OS; OS/2; Unix and Java OS

Base Services 1020

Component Description

Figure 28:
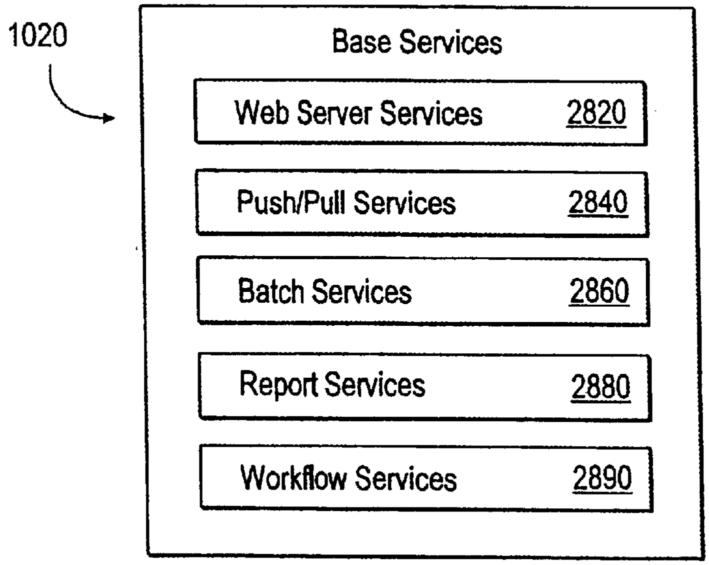
FIG. 28 illustrates the Base Services of the Netcentric Architecture Framework.

FIG. 28 illustrates the Base Services of the Netcentric Architecture Framework. Base Services provide server-based support for delivering applications to a wide variety of users over the Internet, intranet, and extranet. The information about these services in the Netcentric framework may be limited based on the least common denominator. For more detailed information about these components refer also to the following frameworks in SAF and/or DAF.

Batch Delivery Vehicle

Collaboration Framework for Structured Information (Workflow)

Web Services (2820)

Web Server Services enable organizations to manage and publish information and deploy Netcentric applications over the Internet and intranet environments. These services support the following:

Managing documents in most formats such as HTML, Microsoft Word, etc.

Handling of client requests for HTML pages. A Web browser initiates an HTTP request to the Web server either specifying the HTML document to send back to the browser or the server program (e.g., CGI, ASP) to execute. If the server program is specified, the Web server executes the program which generally returns a formatted HTML page to the Web Server. The Web server then passes this HTML page just as it would any standard HTML document back to the Web browser.

Processing scripts such as Common Gateway Interface (CGI), Active Server Pages (ASP). Server side scripting enables programs or commands to be executed on the server machine providing access to resources stored both inside and outside of the Web server environment. For example, server side scripts can be used to process requests for additional information, such as data from an RDBMS.

Caching Web pages. The first time a user requests a Web page, the Web server retrieves that page from the network and stores it temporarily in a cache (memory on the Web server). When another page or the same page is requested, the Web server first checks to see if the page is available in the cache. If the page is available, then the Web server retrieves it from the cache, otherwise it retrieves it from the network. Clearly, the Web server can retrieve the page from the cache more quickly than retrieving the page again from its location out on the network. The Web server typically provides an option to verify whether the page has been updated since the time it was placed in the cache, and if it has to get the latest update.

Possible Product Options

Netscape Enterprise Web Server; Microsoft Internet Information Server (IIS); Oracle WebServer The following are relevant products for providing or implementing HTTP Web Server Services:

Netscape Enterprise Web Server

An enterprise-strength Web server that enables organizations to manage and publish their information and deploy Netcentric applications. Netscape Enterprise Web Server is built on open Internet standards that enable information and applications to scale easily. Supports S-HTTP, Java, and SNMP.

Microsoft Internet Information Server (IIS)

A free add-on product for NT Server that implements basic HTTP services. Future versions of NT Server (4.0 and beyond) will have HTTP features built directly into the operating system.

Oracle WebServer

A multi-threaded HTTP server that provides integrated features for translating and dispatching client HTTP requests directly to the Oracle7 Server using PL/SQL.

Push Pull Services (2840)

Push/Pull Services allow for interest in a particular piece of information to be registered and then changes or new information to be communicated to the subscriber list. Traditional Internet users "surf" the Web by actively moving from one Web page to another, manually searching for content they want and "pulling" it back to the desktop via a graphical browser. But in the push model, on which subscription servers are based on, content providers can broadcast their information directly to individual users' desktops. The technology uses the Internet's strengths as a two-way conduit by allowing people to specify the type of content they want to receive. Content providers then seek to package the requested information for automatic distribution to the user's PC.

Depending upon requirements, synchronous or asynchronous push/pull services may be required. Synchronous push/pull services provide a mechanism for applications to be notified in real time if a subscribed item changes (e.g., a stock ticker). Asynchronous push/pull services do not require that a session-like connection be present between the subscriber and the information. Internet ListServers are a simple example. Subscribers use e-mail to register an interest in a topic and are notified via e-mail when changes-occur or relevant information is available. Asynchronous push/pull services can be useful for pro-actively updating customers on changes in order status or delivering information on new products or services they have expressed an interest in.

PointCast; Marimba; IBM/Lotus; Microsoft; Netscape; America Online; BackWeb; Wayfarer Castanet from Marimba—distributes and maintains software applications and content within an organization or across the Internet, ensuring subscribers always have the most up-to-date information automatically.

PointCast—news network that appears instantly on the subscribers computer screen.

Batch Services (B2060)

Batch processing is used to perform large scale repetitive processing where no user involvement is required as well as reporting. Areas for design attention include scheduling, recovery/restart, use of job streams and high availability (e.g. 24 hour running). In addition close attention must be paid to performance as batch systems usually must be processed within strict batch windows.

The design of batch architectures is often complicated considerably by the fact that batch jobs must be able to run concurrently with on-line systems. The general globalization of companies requires that he on-line systems must be available on a close to 24×7 hours basis, eliminating the traditional batch windows. Concurrent batch and on-line processing poses serious challenges to data integrity, throughput and performance.

Batch application programs can include business processing such payroll, billing, etc. and can also include report generation. This is an often overlooked area in client/server architectures. Traditional client/server solutions and Netcentric solutions often require batch processing, but unlike the mainframe, the typical platforms and development environments used often do not have built-in batch or reporting architecture facilities.

Batch processing should be used in preference to on-line modules when:

- The same process, or set of processes, must be applied to many data entities in a repetitive and predictable fashion.
- There is either no manual element to the process or the manual element can be completely separated from a batch element.
- The volume of information to be presented to a user is too great to be processed on-line or it can be better printed in batch.

Related Patterns

For more detailed information about component based batch design patterns, refer also to the Batch patterns in the Patterns section:

- Base Services Patterns Overview
- Abstraction Factory
- Batch Job
- BUW—Batch Unit of Work
- Processing Pipeline Is Report Services (2880)

Report Services are facilities for simplifying the construction and delivery of reports or generated correspondence. These services help to define reports and to electronically route reports to allow for online review, printing, and/or archiving. Report Services also support the merging of application data with pre-defined templates to create letters or other printed correspondence. Report Services include:

- Driver Services. These services provide the control structure and framework for the reporting system.
- Report Definition Services. These services receive and identify the report request, perform required validation routines, and format the outputted report(s). After the request is validated, the report build function is initiated.
- Report Build Services. These services are responsible for collecting, processing, formatting, and writing report information (for example, data, graphics, text).
- Report Distribution Services. These services are responsible for printing, or otherwise distributing, the reports to users.

Functions and Features of a Report Architecture

The report architecture within Environment Services supports the generation and delivery of reports. Applications request report services by sending a message to the reporting framework.

The following types of reports are supported by the reporting application framework:

- Scheduled: Scheduled reports are generated based upon a time and/or date requirement. These reports typically contain statistical information and are generated periodically (invoices and bills, for example).
- On-demand: Some reports will be requested by users with specific parameters. The scheduling of these reports, the formatting, and/or the data requirements are not known before the request is made, so these factors must be handled at request time.
- Event-driven: This report type includes reports whose generation is triggered based on a business or system event. An example here would be a printed trade slip.

Reporting Application Framework

Figure 29:
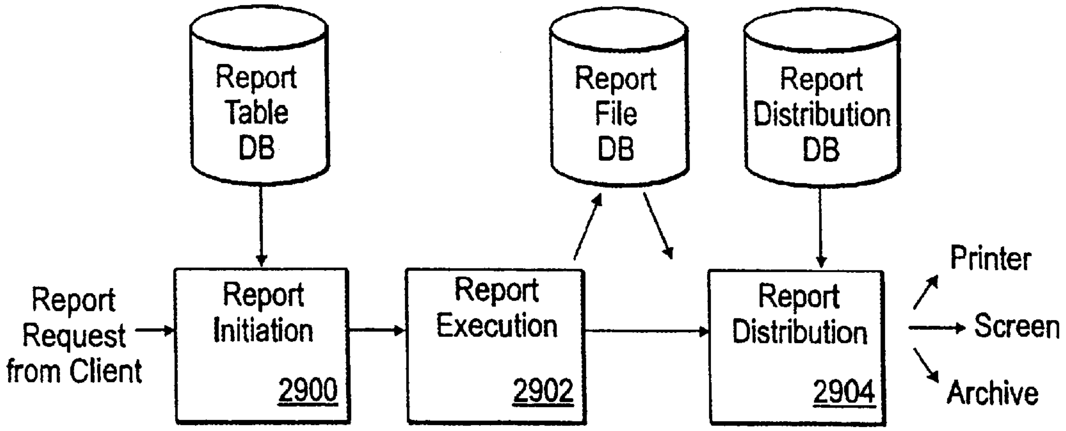
FIG. 29 shows the major components of the reporting application framework.

FIG. 29 shows the major components of the reporting application framework:

Report Initiation (2900)

The report initiation function is the interface for reporting applications into the report architecture. The client initiates a report request to the report architecture by sending a message to the report initiation function. The responsibility of report initiation is to receive, identify, and validate the request and then trigger the report build process. The main components of reporting initiation are the following.

- Receive, identify, and validate a report request. The identification function determines general information about the request, such as report type, requester, quantity to be printed, and requested time. Based on the report type, a table of reports is examined in order to gather additional report-specific information and perform required validation routines for the report request. After the report identification and validation functions have been successfully completed, the reporting process can continue. If any errors are identified, the report initiation function will return an error message to the requester application.
- Initiate report execution. The initiate report execution function processes the report profile and specific distribution requirements and determines the report to be created. It then passes control to the report execution process.

Report Execution (2902)

Report execution is the core of the reporting application framework. The main components of report execution include:

- Format the report. This function is responsible for formatting the layout of the outputted report, including standard headers, column headings, row headings, and other static report information.
- Collect the information. This function is responsible for collecting the information (for example, data, text, image, graphics) that is required for the report. This function would utilize the Information Access Services component of the client/server architecture.
- Format the information. This function is responsible for formatting the collected information into the appropriate display format based upon the report type and the report distribution requirements.

- Output the report. This function initiates the report distribution function in order to distribute the created report to the specified devices (printers, disks, and so forth) and individuals.

The process of collecting, processing, formatting, and outputting report data can be accomplished in several different ways. For example, one method is to create a program in C for each report format. Here, many aspects of report printing—such as page size, headings, footings, and printer control values—would have to be programmed in function calls to facilitate the report programming process. Information access to files or the database would be through Information Access Services.

Another option is to use a third-party report tool, such as the SQR (Structured Query Report Writer) from SQL Solutions. SQR is a robust report generator designed to be used with SQL-based relational databases. SQR insulates the developer from programming in a third generation language by providing a higher-level programming language. SQL queries (Information Access) are placed directly into the SQR program.

Report Distribution (2904)

The final requirement of the reporting application framework is the report distribution function. Once the report has been generated, it must be distributed to the specified targets (devices and/or users). The report distribution function will locate completed report files and route them to the appropriate devices within the client/server network.

Typically, a report distribution database is used to specify the destinations for each report supported by the report architecture. The report distribution database specifies where, when, how, and to whom to distribute the produced report. Specific destinations can include: printer(s), user(s), user groups, archives (permanent storage), and/or specific display devices such as workstations and terminals.

Several additional options exist for distributing reports including timed reporting, multiple copy distribution, and report archiving. Also, a user interface function can be built to open and browse report files.

Custom Reporting Approaches

Figure 30:
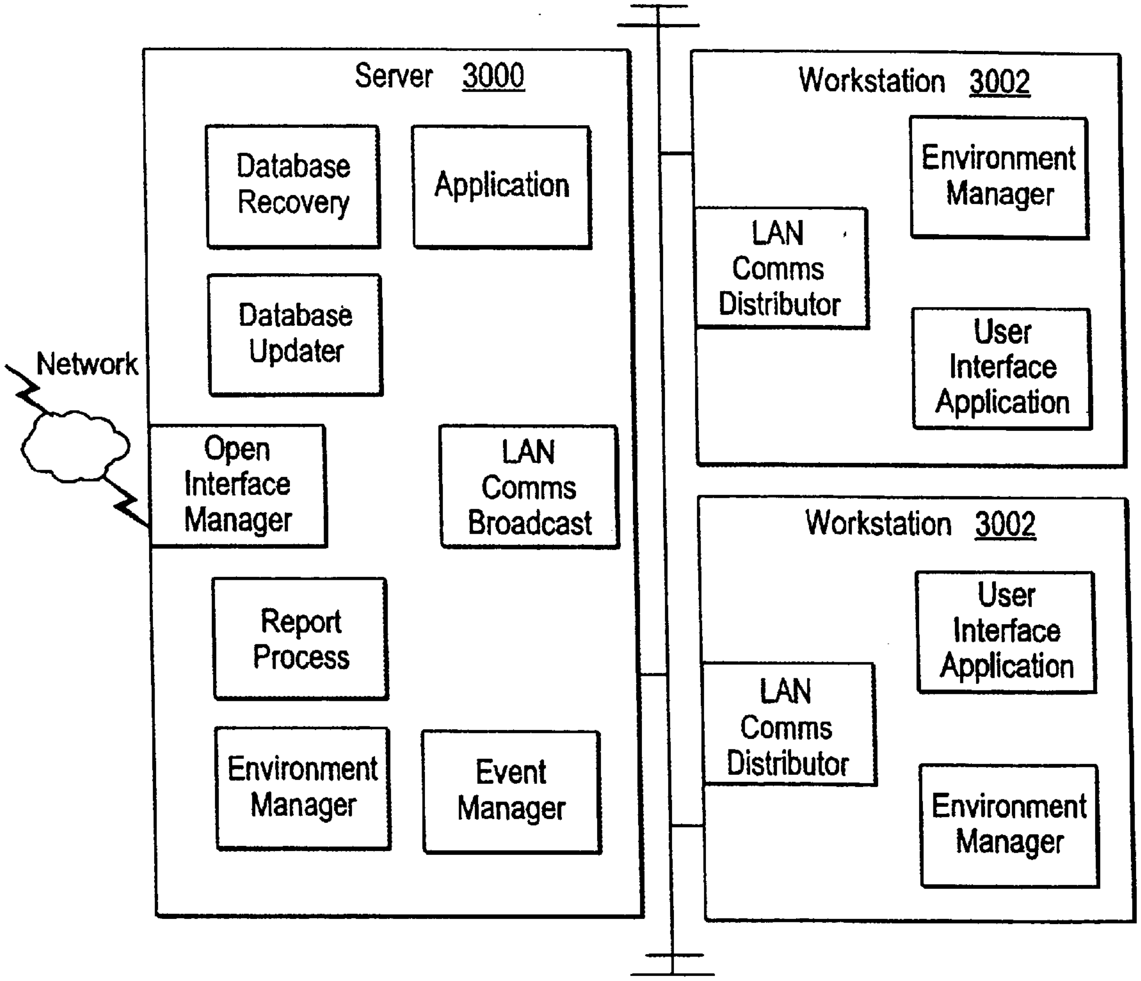
FIG. 30 illustrates an example of how a custom report architecture relates to a workstation platform technology architecture.

If a commercially-available reporting product can not meet your report requirements, you may have to consider a custom approach. FIG. 30 illustrates an example of how a custom report architecture relates to a workstation platform technology architecture.

This custom report process is responsible for processing all messages requesting generation, manipulation, or distribution of reports. The following services are provided in an environment including a pair of workstations 3000 and a server 3002:

- Report generation
- Report deletion
- Report printing
- Report status maintenance Report generation is supported by an additional report writer process that contains all application-defined report writer modules. These modules contain the logic to produce each of the report types that may be requested. The report process receives generation requests and ensures that they are forwarded to the report writer process at the current or specified time. All report requests are processed in an asynchronous manner (for example, service requesters do not wait for completion of report processing).

Figure 31:
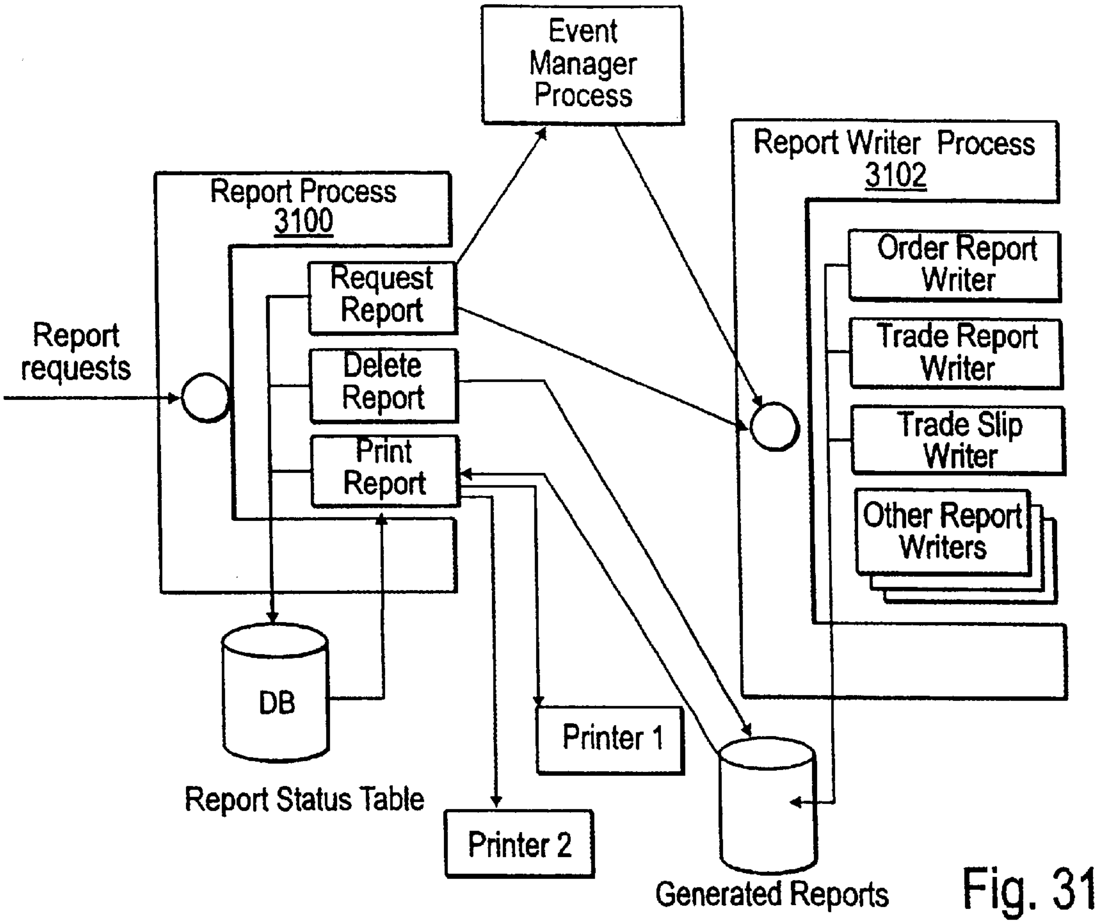
FIG. 31 describes the relationships between the major components of the report process and the report writer process.

FIG. 31 describes the relationships between the major components of the report process 3100 and the report writer process 3102.

Design Approach

For the report process in a client/server system, a set of APIs is provided for use within application programs and within the application report writer modules. Each API requests a specific report service (generation, printing, or deletion) which is performed by a report manager module.

The report process maintains an internal database table, a report status table, containing information about each report that has been requested for generation, including:

- Requester ID
- Report name
- Date/time requested
- Status (requested, in process, complete, or error)
- Report-specific parameters.

The requester ID, report name, and date/time are used to uniquely identify the is report. These values are passed to APIs which request report status, print or delete a previously generated report.

All application-defined report writer modules invoke an API to update the report status table with a status of "completed" after a report has been produced or with "error" if the report cannot be generated. An API is also provided to print the report after the generation if specified in the original request.

Processed report records are removed from the table only after the output reports have been archived. Implementation and frequency of this table cleanup is to be determined in systems management design.

Report Process Flows

Report processing is message-driven. Each defined API sends a unique message to the report process. The report process reads the messages from a queue and invokes the appropriate modules to handle each request. Subsequent process flows differ based upon the requested service. In the case of a report generation request, the process flow proceeds as follows:

- A record is added to the report status table.
- A message is sent to the report writer process for immediate generation or to the event manager for generation at a specified time (report scheduling).
- The appropriate application report writer module generates the report, prints it if specified in the original API request, and updates the status in the report status table.

A request to print a report proceeds as follows:

- The report status is retrieved from the report status table.
- The output file is located on disk and sent to the specified or default printer or the request is sent to the event manager for report scheduling.

Report deletion proceeds as follows:

- The report record is removed from the report status table.
- The report file is removed from disk.

Status information requests are performed directly from the API using Information Access Services APIs. No interaction with the report process is necessary, which results in improved performance.

Modules

Figure 32:
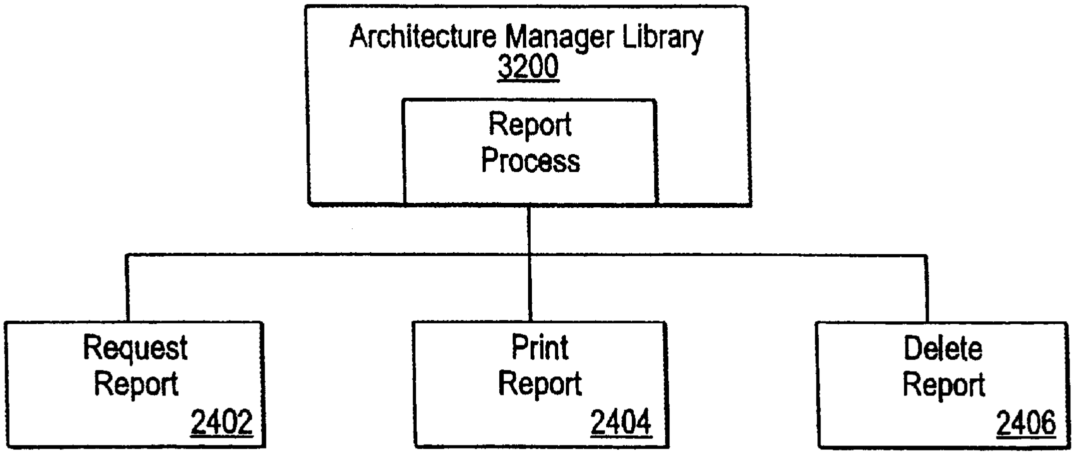
FIG. 32 shows the module hierarchy for the custom report process.

FIG. 32 shows the module hierarchy for the custom report process. The Figure shows the relationships between modules, not their associated processing flows. It should be used to identify the calling module and the called modules for the process. FIG. 32 illustrates the Architecture Manager library 3200 which supports the report process.

The functions designed to support this process are:

- Generate Report
- Get Report Status

Control Reports

Request Report (b2402)

Delete Report (b2406)

Print Report (b2404)

Generate Report. This module is called to request report generation and printing (optional). Input data blocks specify the following:

Report name

Report parameters

Report generation time (default is immediately)

Printer name.

The report name must be one of the defined application report types. Valid report parameters vary depending on the report type. Reports may be requested for generation immediately or at a designated future time. All reports are written to a reserved area on disk; however, specification of a printer causes the output to be printed as well as stored on the file system.

Get Report Status. The Get Report Status function retrieves status information about all reports that have been previously requested for generation by the calling process. Returned is a list containing the requested data as well as the number of reports found.

Control Reports. The Control Reports function is responsible for performing various operations on reports. The following services are provided:

Delete a report request and any associated output

Print a previously generated report.

Update report status.

In all cases, the report name is passed through an input data block. For the print service, a printer name is passed. For status update, the new status code is passed.

Request Report. The Request Report function is responsible for processing report request messages written to the report process queue. It creates a new entry in the report status table with a status of "requested" and initiates the report writer process for immediate generation or sends a message to the event manager for future report. generation.

Delete Report. The Delete Report function is responsible for removing a report from the Report Status list and deleting the generated output file (if any).

Print Report. The Print Report fuinction sends a generated report output file to a specified or default printer. The report name and requesting process ID is passed to identify the report.

Evaluation Criteria

There are two primary approaches to implementing a reporting architecture: custom and package. Evaluating custom and package solutions involves both functional and technical criteria. The following is a discussion of various functional and technical criteria that should be considered during the planning for a report architecture. Note that not all of the criteria may be required by any particular organization.

Functional Criteria

1. Report Repository: The report architecture should work with, and support maintenance of, a report repository on the platforms within the client/server architecture. The report repository contains the detailed definitions of the reports.

2. Workgroup Report Support: The report architecture should work with and support distribution of reports generated on the workgroup server.

3. On-Demand Reports: The report architecture must support distribution of reports requested by users on demand. Typically, these reports will not have a set schedule or frequency for distribution. The report architecture must support distribution of these reports without the requirement of manual or user intervention (subsequent to initial set up and conversion).

4. Scheduled Reports: The report architecture must support distribution of regularly scheduled reports. Typically, these reports will have a set schedule and frequency for distribution. The report distribution package must support distribution of these reports without the requirement of manual or user intervention (subsequent to set up and conversion).

5. Online Preview: The report architecture should allow preview of reports online from a user's intelligent workstation prior to actual distribution. Ideally, the report architecture itself would provide support for online preview of reports through software located on the intelligent workstation.

6. Graphical User Interface: The architecture should provide users with a graphical user interface.

7. Bilingual Support: For companies where two or more languages are used, the report architecture must provide a multi-national user interface. (Note that large report runs targeted for multiple users may require the ability to change languages during the report.)

8. Basic Preview Functions: The report architecture should support basic preview functions. These include:

Scrolling up and down.

Scrolling left and right.

Advancing to end or beginning of report without scrolling through intermediate pages.

9. Advanced Preview Functions: In addition to the basic preview functions listed previously, certain advanced preview functions may also be necessary:

Page indexing (allows users to jump to specific report pages).

Section indexing (allows users to jump to specific report sections).

Search capabilities (allows users to search report for occurrence of a specific data stream).

10. Report Level Security: Reports may occasionally contain sensitive information. It is therefore important that access to certain reports be restricted to authorized users. The report architecture should provide a mechanism for implementing report level security. This security must be in place on all platforms with the client/server architecture. At the workgroup level, the security may consist of downloading sensitive report files to a secure directory, and having the LAN administrator release the report as appropriate.

11. Section, Page, and Field Level Security: Defining security at the report section, page, or field level would provide greater flexibility in determining and implementing report security. This is a desirable, though not mandatory, requirement of the report architecture.

12. Background Processing: The report architecture should support the processing of reports in the background while the application works in the foreground during online hours. In other words, processing of reports should not negatively affect online response times, or tie up the user's workstation.

13. Automatic Report Addressing: The report architecture should provide a "humanly intelligible" address for all distributed reports. The address may be used by a print site operator, LAN administrator, or other personnel to manually sort printed output (if required). This criterion can be satisfied by automatic creation of banner pages or other means.

14. Delivery Costing: To provide sufficient information to users to avoid accidentally downloading or printing very large reports during peak usage hours, a distribution costing function can be useful. This function would warn users of reports that would overload the network or a printer. This costing function might provide recipients with a rough estimate of the amount of time that distribution might take. Finally, during the online day, the delivery costing mechanism might disallow transmission of reports that exceed a predetermined cost.

15. Multiple Destinations: The report architecture should support distribution of a single report to single or multiple destinations.

16. Destination Rationalization: For some systems, it is possible that multiple copies of a report will be sent to the same site—to several different users, for example. In these cases, it is highly desirable to have the report architecture recognize these situations whenever possible and distribute the specified report only once.

17. Automatic Printing: The report architecture should provide automatic print capabilities. Once a report has been distributed for printing (either through a "push" distribution scheduling mechanism or through a "pull" user request) no further user or operations personnel involvement should be necessary to print the report at the specified location.

18. Multiple Print Destinations: The report architecture should support distribution of reports for printing at centralized, remote, or local print sites without user or operations personnel intervention.

19. Variable Printer Types: Printing on multiple types of printers, including line, impact, and laser printers, should be supported. This should not require user intervention—that is, the user should not have to specify the type of target printer. Ideally, the report architecture would default this information from the user's profile or the default printer defined in the local operating system. This criterion requires that the report architecture support several print mechanisms, such as postscript drivers and host/mainframe protocols (for example, Advanced Function Printing [AFP]).

20. Variable Printer Destinations: The report architecture should default the destination printer for a specific report (from the user's profile or operating system parameters). Additionally, the architecture should allow the user to change the printer specified. Validation of the print destination also should be included.

21. Special Forms Printing: The report architecture should support distribution of "regular" reports and special forms reports.

22. Font Support: Some reports may be printed on laser printers and/or may support electronic forms text (i.e., including the forms text in the report dataset as opposed to printing the report dataset on a pre-printed form). The architecture should allow multiple fonts to be specified.

23. Report Archival: The report architecture should provide and/or facilitate archival or disposition of report datasets. Ideally, the architecture would permit definition of retention periods and disposition requirements.

24. Report Download: The report architecture should allow distribution of the information contained in a report dataset to a user's intelligent workstation. The information should be in a form that can be imported to a local word processing software, decision support software package, or other appropriate application.

25. Application Transparency: It is desirable for the report architecture to appear to the users as if it were part of the overall application. This does not necessarily mean that the architecture must integrate seamlessly with the application; a message interface between the systems might be acceptable.

26. Selective Printing: It would be desirable for the report architecture to provide users with the ability to print only selected pages or sections of the report. This should reduce paper usage, while still allowing users to obtain a hard copy of the information as required.

27. Print Job Restart: It would be desirable if the report architecture allowed a print job to be restarted from the point of failure rather than having to reprint the entire report. This of particular concern for very large reports.

Technical Criteria

The following is a list of technical criteria that should be considered during the planning for a report architecture:

1. Platform Compatibility: The report architecture must be compatible with the platform architecture. It also should be compatible with local area networks and standalone workstation technology specified in the platform architecture.

2. Wide Area Network Compatibility: Most systems will include support for WAN communication, so the report architecture should be compatible with this environment.

3. Technology Standards: The report architecture should be compliant with existing formal and de facto standards (for example, SQL Database Language, COBOL Programming Language, C Programming Language).

4. External User Directory: The report architecture should make use of an external user directory of preferences and locations.

5. Data Compression in Report Repository: To reduce the storage requirements for the report repository, it is also desirable for the report architecture to support data compression in the repository.

6. Code Page Compatibility: Code page compatibility must be considered when translating characters to ASCII.

Workflow Services (2890)

Workflow services control and coordinate the tasks that must be completed in order to process a business event. For example, at XYZ Savings and Loan, in order to receive a promotion, you must complete an essay explaining why you should be promoted. This essay and your personnel file must be routed to numerous individuals who must review the material and approve your promotion. Workflow services coordinate the collection and routing of your essay and your personnel file.

Workflow enables tasks within a business process to be passed among the appropriate participants, in the correct sequence, and facilitates their completion within set times and budgets. Task definition includes the actions required as well as work folders containing forms, documents, images and transactions. It uses business process rules, routing information, role definitions and queues. Workflow functionality is crucial for the customer service and engineering applications to automate the business value chains, and monitor and control the sequence of work electronically.

The business processes can be of a repetitive nature, eg automatically routing and controlling the review of a work plan through the approval stages. These are called production workflows. Conversely it can be an ad hoc process, eg generating and delivering a work order for a special meter reading to a meter reader who is available to perform the task. In production workflows the processes are predefined, whereas ad hoc workflows are created only for a specific nonrecurrent situation. Often it is difficult to determine how much ad hoc functionality that needs to be provided. An overly strict production workflow may not support necessary special cases that must be handled in an ad hoc fasion.

Workflow provides a mechanism to define, monitor and control the sequence of work electronically. These services are typically provided by the server as they often coordinate activities between multiple users on multiple computers.

The following are some of the architectural and integration issues that must be addressed:

Process integration

The workflow system must achieve a seamless integration of multiple processes. The workflow system must control the business process, eg it should be able to open a word processor with the relevant data coming from a previous business process;

Infrastructure integration from PC to mainframe

The ability to interface with the host-based hardware, system software, and database management systems is critical. This is essential because the workflow system is located between the client-based and host-based processes, ie it can initiate client-based as well as host-based applications;

LAN and WAN connectivity

Connectivity must include all sites for the supported processes, enabling a large number and variety of users to use the workflow system, and thus to execute the business process;

Integration of peripherals

The workflow system should support many different types of printers, modems, fax machines, scanners, and pagers. This is especially important because of the diversity of the users that will be involved, from field crew to managers, each with their own needs and preferences; and Integration with workflow-participating applications The key to the efficiency of the workflow system is its capability to integrate with office automation, imaging, electronic mail, and legacy applications.

Workflow can be further divided into the following components:

Role management

Role management ie provides for the assignment of tasks to roles which can then be mapped to individuals.

A role defines responsibilities which are required in completing a business process. A business worker must be able to route documents and folders to a role, independent of the specific person, or process filling that role. For example, a request is routed to a supervisor role or to Purchasing, rather than to "Mary" or "Tom." If objects are routed to Mary and Mary leaves the company or is reassigned, a new recipient under a new condition would have to be added to an old event. Roles are also important when a number of different people have the authority to do the same work, such as claims adjusters; just assign the request to the next available person. In addition, a process or agent can assume a role; it doesn't-need to be a person. Role Management Services provide this additional level of directory indirection.

Route management

Route management enables the routing of tasks to the next role, which can be done in the following ways:

Serial—the tasks are sequentially performed;

Parallel—the work is divided among different players;

Conditional—routing is based upon certain conditions; and

Ad hoc—work which is not part of a predefined process.

Workflow routing services route "work" to the appropriate workflow queues. When an application completes processing a task, it uses these services to route the work-in-progress to the next required task or tasks and, in some cases, notify interested parties of the resulting work queue changes.

The automatic movement of information and control from one workflow step to another requires work profiles that describe the task relationships for completing various business processes. The concept of Integrated Performance Support can be exhibited by providing user access to these work profiles. Such access can be solely informational—to allow the user to understand the relationship between tasks, or identify which tasks need to be completed for a particular work flow—or navigational—to allow the user to move between tasks.

Route Management Services also support the routing and delivery of necessary information (e.g., documents, data, forms, applications, etc.) to the next step in the work flow as needed.

Rule Management

A business process workflow is typically composed of many different roles and routes. Decisions must be made as to what to route to which role, and when. Rule Management Services support the routing of workflow activities by providing the intelligence necessary to determine which routes are appropriate given the state of a given process and knowledge of the organization's workflow processing rules. Rule Management Services are typically implemented through easily maintainable tables or rule bases which define the possible flows for a business event.

Queue Management

These services provide access to the workflow queues which are used to schedule work. In order to perform workload analysis or to create "to do lists" for users, an application may query these queues based on various criteria (a business event, status, assigned user, etc.). In addition, manipulation services are provided to allow queue entries to be modified.

Workflow services allow users and management to monitor and access workflow queue information and to invoke applications directly.

Is there a need for reporting and management facilities?

Typical workflow application requirements are better general management control and better management of change. Proactive system action, audit trails and system administration features like work queue reporting are important administration tools. Some of the areas for monitoring for improvement are employee productivity, process performance, and forecasting/scheduling. Where any form of customer service is involved, features like status reports on individual cases can sharpen customer response times while performance monitoring of groups and individuals can help quality improvement and efficiency exercises. Note that reports and reporting does not necessarily mean paper reports that are distributed in a traditional manner, it can mean electronic messages or even triggers based on specific events.

Are cooperative applications present?

Workflow management is frequently required in cooperative applications because the users are generally professionals, the flow of work in the organization is frequently highly variable, the application units of work (legal case, sales order) are processed for long periods of elapsed time, and work often moves from one processing site to another. As data and application logic are split, better control is needed to track processing/data status across location.

Will there be business process re-engineering?

Workflow is a logical complement to BPR and the trend is moving toward using workflow software to re-engineer new business processes on a workgroup or project basis.

Is the business process well defined?

If rules or conditions can be identified which define the business process, with few exception conditions, workflow tools can then automate areas such as information routing, task processing, and work-in-process reporting.

Are fixed delays or deadlines involved?

Workflow has been used to regulate delays and deadlines such as those associated with government regulations, contractual obligations, accounting periods, customer service, and sales lead follow-up. Typical workflow goals are shorter time to market and quicker response times.

Are multiple people involved in the business process?

Workflow co-ordinates cross-functional, cross-departmental work activities and promotes accountability. It also enables dynamic redistribution and reprioritization of work.

Is there a need for work scheduling?

Workflow management can be extended to automate work scheduling. A system may be able to do as good a job, or better, in scheduling a users work. This might be due to a very large amount of work to be assigned to a large pool, a complex method of assigning priorities, an extremely dynamic environment, or some other reason. Another advantage to work scheduling is that the system can initiate some needed activity automatically for the user in anticipation of the next task.

Do integration issues exist?

It is important to determine how well the workflow system integrates with host-based hardware, system software, database management systems, and communication networks. Examples of items to consider include E-mail, database, GUI tool, PC applications, other office systems, and business applications.

How scaleable is the product?

Number of workers the product could reliably support in a production environment. Two major product factors characterize scalability:,(1) Platform alternatives (hardware and operating system); and (2) Message-based architecture (relying on specific mail systems for much of the functionality) versus Database-based.

What is the nature of the workflow?

How an organization approaches the management of its workflow will determine which workflow management tools are appropriate to the organization. In general, there are three types of workflow, production, collaborative, and ad hoc. A production environment involves high transaction rates and thousands of documents in which the rules for a certain document can be defined for most of the time. Examples include accounts payable, insurance claims processing, and loan processing. A collaborative environment involves multiple departments viewing a single document with typically less number of documents than in the production environment. One example is a sales order. Ad hoc workflows arise from the specific temporary needs of a project team whose members become active and inactive depending on their function within the group.

What is the relationship between the workflow and imaging components?

It may be important to determine whether or not the products work routing function is integrated and inseparable from document storage and retrieval functions.

What are the necessary functions and features?

Issues to consider include the following: (1) samples and assists that are available to the developer; (2) existence of a scripting or programming language; (3) granularity of the security, or in other words, at what levels can security be added; (4) freedom of choosing productivity applications; (5) existence of aggregate functions which allow for analysis of the workflow efficiency; (6) existence/need for Business Processing Re-engineering tools.

How stable is the vendor?

One should consider the leadership and size characteristics of the products vendor compared to the workflow software marketplace. Another consideration is whether the vendor is a member of Workflow Management Coalition. This coaltion is beginning to have a bigger impact on the direction of vendors workflow management products.

How mature is the product?

One should consider the age, release, and installed base of the product.

How flexible is the product?

A product should be able to support changing workflows at various levels of detail.

Business Logic 1022,1024

The execution architecture services are all generalized services designed to support the applications Business Logic. How Business Logic is to be organized is not within the scope of the execution architecture and must be determined based upon the characteristics of the application system to be developed. This section is intended to serve as a reminder of the importance of consciously designing a structure for Business Logic which helps to isolate the impacts of change, and to point out that the underlying Netcentric architecture is particularly well suited for enabling the packaging of Business Logic as components.

Figure 33:
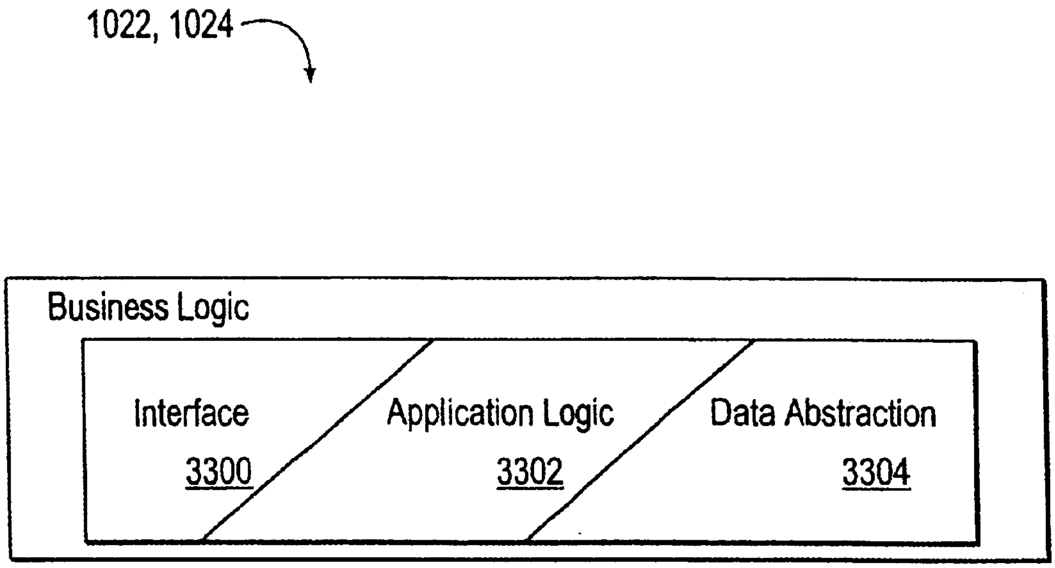
FIG. 33 depicts the various components of the Business Logic portion of the Netcentric Architecture Framework.

Business Logic is the core of any application, providing the expression of business rules and procedures (e.g., the steps and rules that govern how a sales order is fulfilled). As such, the Business Logic includes the control structure that specifies the flow for processing business events and user requests. There are many ways in which to organize Business Logic, including: rules-based, object-oriented, components, structured programming, etc. however each of these techniques include, although perhaps not by name, the concepts of: Interface, Application Logic, and Data Abstraction. FIG. 33 depicts the various components of the Business Logic portion of the Netcentric Architecture Framework.

Interface Logic (3302)

Interface logic interprets and maps the actions of users into business logic processing activities. With the assistance of Presentation Services, Interface logic provides the linkage that allows users to control the flow of processing within the application.

Application Logic (b2504)

Application Logic is the expression of business rules and procedures (e.g., the steps and rules that govern how a sales order is fulfilled). As such, the Application Logic includes the control structure that specifies the flow for processing for business events and user requests. The isolation of control logic facilitates change and adaptability of the application to changing business processing flows.

Data Abstraction (b2506)

Information Access Services isolate the Business Logic from the technical specifics of how information is stored (e.g., location transparency, RDBMS syntax, etc.). Data Abstraction provides the application with a more logical view of information, further insulating the application from physical information storage considerations.

The developers of business logic should be shielded from the details and complexity of other architecture services (e.g., information services, component services), and other business logic for that mater.

It is important to decide whether the business logic will be separate from the presentation logic and the database access logic. Today separation of business logic into its own tier is often done using an application server. In this type of an environment, although some business rules such as field validation might still be tightly coupled with the presentation lgic, the majority of business logic is separate, usually residing on the server. It is also important to decide whether the business logic should be packaged as components in order to maximize software re-use and to streamline software distribution.

Another factor to consider is how the business logic is distributed between the client and the server(s)—where the business logic is stored and where the business logic is located when the application is being executed. There are many ways to distribute business logic: (1) business logic can be stored on the server(s) and executed on the server(s); (2) business logic can be stored on the server(s) and executed on the client; (3) business logic can be stored and executed on the client; (4) some business logic can be stored and executed on the server(s) and some business logic can be stored and executed on the client; etc.

Having the business logic stored on the server enables developers to centrally maintain application code; thereby eliminating the need to distribute software to client machines when changes to the business logic occur. If all the business logic executes on the server, then the application on the client will make requests to the server whenever it needs to execute a business function. This could increase network traffic, which may degrade application performance. On the other hand, having the business logic execute on the client, may require longer load times when the application is initially launched. However, once the application is loaded, most processing is done on the client until synchronization with the server is needed. This type of an architecture might introduce complexities into the application that deal with the sharing of and reliance on central data across many users.

If the business logic is stored and executed on the client, software distribution options must be considered. Usually the most expensive option is to have a system administrator or the user physically install new applications and update existing applications on each client machine. Another option is to use a tool that performs automatic software distribution functions. However, this option usually requires the software distribution tool to be loaded first on each client machine. Another option is to package the application into ActiveX controls, utilizing the automatic install/update capabilities available with ActiveX controls—if the application is launched from a Web browser.

Currently, Internet applications house the majority of the business processing logic on the server, supporting the thin-client model. However, as technology evolves, this balance is beginning to shift, allowing business logic code bundled into components to be either downloaded at runtime or permanently stored on the client machine. Today, client side business logic is supported through the use of Java applets, JavaBeans, Plug-ins and JavaScript from Sun/Netscape and ActiveX controls and VBScript from Microsoft.

The developers of business logic should be shielded from the details and complexity of other architecture services (e.g., information services, component services), and other business logic for that matter.

It is important to decide whether the business logic will be separate from the presentation logic and the database access logic. Today separation of business logic into its own tier is often done using an application server. In this type of an environment, although some business rules such as field validation might still be tightly coupled with the presentation logic, the majority of business logic is separate, usually residing on the server. It is also important to decide whether the business logic should be packaged as components in order to maximize software re-use and to streamline software distribution.

Another factor to consider is how the business logic is distributed between the client and the server(s)—where the business logic is stored and where the business logic is located when the application is being executed. There are many ways to distribute business logic: (1) business logic can be stored on the server(s) and executed on the server(s); (2) business logic can be stored on the server(s) and executed on the client; (3) business logic can be stored and executed on the client; (4) some business logic can be stored and executed on the server(s) and some business logic can be stored and executed on the client; etc.

Having the business logic stored on the server enables developers to centrally maintain application code; thereby eliminating the need to distribute software to client machines when changes to the business logic occur. If all the business logic executes on the server, then the application on the client will make requests to the server whenever it needs to execute a business function. This could increase network traffic, which may degrade application performance. On the other hand, having the business logic execute on the client, may require longer load times when the application is initially launched. However, once the application is loaded, most processing is done on the client until synchronization with the server is needed. This type of an architecture might introduce complexities into the application that deal with the sharing of and reliance on central data across many users.

If the business logic is stored and executed on the client, software distribution options must be considered. Usually the most expensive option is to have a system administrator or the user physically install new applications and update existing applications on each client machine. Another option is to use a tool that performs automatic software distribution functions. However, this option usually requires the software distribution tool to be loaded first on each client machine. Another option is to package the application into ActiveX controls, utilizing the automatic install/update capabilities available with ActiveX controls—if the application is launched from a Web browser.

Currently, Internet applications house the majority of the business processing logic on the server, supporting the thin-client model. However, as technology evolves, this balance is beginning to shift, allowing business logic code bundled into components to be either downloaded at runtime or permanently stored on the client machine. Today, client side business logic is supported through the use of Java applets, JavaBeans, Plug-ins and JavaScript from Sun/Netscape and ActiveX controls and VBScript from Microsoft.

Patterns

Overview of Patterns

Introducing Patterns

The goal of patterns within the software community is to create a body of literature to help software developers resolve common difficult problems encountered throughout all of software engineering and development. Patterns help create a shared language for communicating insight and experience about these problems and their solutions. Formally codifying these solutions and their relationships lets us successfully capture the body of knowledge which comprises one's understanding of good architectures that meet the needs of their users. Forming a common pattern language for conveying the structures and mechanisms of architectures allows us to intelligibly reason about them. The primary focus is not so much on technology as it is on creating a culture to document and support sound engineering architecture and design.

What is a Pattern?

A pattern is a named nugget of insight that conveys the essence of a proven solution to a recurring problem within a certain context amidst competing concerns. Patterns are a more formal way to document codified knowledge, or rules-of-thumb.

Patterns represent the codified work and thinking of our object technology experts. While experts generally rely on mental recall or rules-of-thumb to apply informal patterns as opportunities are presented, the formalization of the patterns approach allows uniform documentation and transfer of expert knowledge.

Patterns are not unique to object technology or even software development, having been invented by Christopher Alexander, a building architect. However, they have not been applied to other information technology development techniques. Thus, they are an exclusive feature of object technology. Furthermore, patterns are becoming widely accepted by the worldwide object community as an important element in successfully rolling out the technology, and enabling the maturation of software development as an engineering process.

Patterns are usually concerned with some kind of architecture or organization of constituent parts to produce a greater whole. Richard Gabriel, author of *Patterns of Software: Tales From the Software Community,* provides a clear and concise definition of the term pattern:

Each pattern is a three-part rule, which expresses a relation between a certain context, a certain system of forces which occurs repeatedly in that context, and a certain software configuration which allows these forces to resolve themselves.

As an element in the world, each pattern is a relationship between a certain context, a certain system of forces which occurs repeatedly in that context, and a certain spatial configuration which allows these forces to resolve themselves.

As an element of language, a pattern is an instruction, which shows how this spatial configuration can be used, over and over again, to resolve the given system of forces, wherever the context makes it relevant.

The pattern is, in short, at the same time a thing, which happens in the world, and the rule which tells us how to create that thing, and when one must create it. It is both a process and a thing; both a description of a thing which is alive, and a description of the process which may generate that thing.

In Software Patterns, Jim Coplien writes, a good pattern may do the following:

It solves a problem: Patterns capture solutions, not just abstract principles or strategies.

It is a proven concept: Patterns capture solutions with a track record, not theories or speculation.

The solution isn't obvious: Many problem-solving techniques (such as software design paradigms or methods) try to derive solutions from first principles. The best patterns generate a solution to a problem indirectly—a necessary approach for the most difficult problems of design.

It describes a relationship: Patterns don't just describe modules, but describe deeper system structures and mechanisms.

The pattern has a significant human component . . . . All software serves human comfort or quality of life; the best patterns explicitly appeal to aesthetics and utility.

Component-Based Development

Introduction to Component Based Development,

Component systems model—how the business works

Component-orientation is a strategic technology that may significantly impact a user's practice and clients. Component technologies are a natural evolution from object-oriented systems providing a more mature way of packaging reusable software units. Object-oriented systems more closely support business integration framework for solution delivery by shifting design focus away from an underlying technology toward a company's business conduct and functional behaviors. Business entities are represented as objects, which package data and functional behavior. This is in distinct contrast to traditional development approaches that maintain a ubiquitous split between functional behaviors and data.

Object-orientation has accelerated into the take-up curve. All of the major commercial component models are object-oriented. In addition, all of the major vendors have adopted the "Unified Modeling Language" (UML) as a standard notation for describing object models. A tremendous reservoir of knowledge capital, practice aids and starter kits related to object and component technology can be found on the Knowledge Exchange.

More and more, users are asking for assistance to deploy Netcentric eCommerce applications based on components. These applications are frequently based on object-oriented languages like Java, Visual Basic and C++.

Objects are an easy metaphor to understand and manage. There are still substantial risks involved, particularly because component- and object-orientation has a pervasive impact on areas as broad as analysis and design, planning, and development tools.

Component-Based Overview

Component Technology Impacts Most Aspects of Development

Component and object technology impacts most aspects of software development and management. Component technology is a new technology and a driving influence in the evolution of object-oriented (OO) methodologies. The Management Considerations section of the Introduction to Component-Based Development uses the Business Integration (BI) Model to discuss the impact of OO, including:

Strategy and planning with a long-term view towards building reusable, enterprise software assets.

Technology and architecture approaches for building cohesive, loosely coupled systems that provide long-term flexibility.

Processes that shift analysis/design techniques from functional, procedural decomposition to business process modeling. These techniques are then used to decompose the system into domain objects and processes.

People and organization strategies that emphasize greater specialization of skills within structures that support inter-team collaboration.

Balancing Tradeoffs Is Key To Applying Components for Mission-Critical Systems

Figure 34:
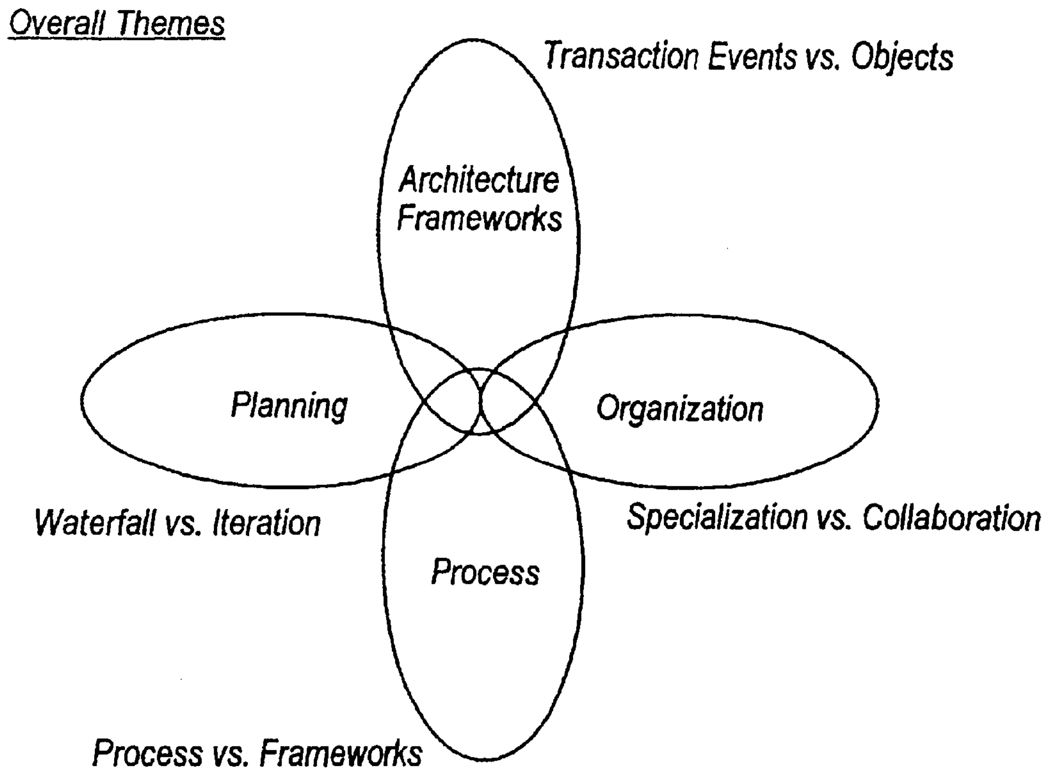
FIG. 34 illustrates a relationship between major themes that impact aspects of software development and management.

Tradeoffs are an important theme. Experience with large, mission-critical systems has shown that the most complex issues require strategic tradeoffs between quality, cost, and time. These tradeoffs usually involve interdependent considerations between strategy, technology, process, and people. See FIG. 34 which illustrates a relationship between major themes. For example, how should an architecture be tailored to effectively support a specific methodology, for a given organization's skill set? Competing tensions also cloud decisions at a more detailed level. For example, how should an architecture be customized to better support performance, at the potential cost of increased coupling between components?

Many of these considerations have been addressed over the last few years. Most published literature continues to focus on narrow technology issues, such as programming techniques or generic methodologies, such as analysis and design approaches or notation. Still, a growing number of publications and vendor strategies attack the enterprise needs within on-line netcentric execution models. Real-world, client solutions involve making pragmatic decisions, in which compromise occurs at the intersection of the four major OO themes. Experience with many component client projects in diverse industries uniquely positions a user to effectively address these complexities.

Management Considerations Overview

The Management Considerations section discusses the key benefits, risks, and issues introduced by a component engagement. Key topics include:

- Managing risk in balancing tradeoffs between strategy, people, process, and technology
- Considering issues related to configuration management, testing, and performance of object systems
- Addressing the component development learning curve
- Differences between development architecture considerations leveraging the advantages of a component industry.

The Management Considerations section also address issues not unique to Component technology, including:

- Estimating, planning, and managing iteration
- Organizing and managing to achieve reuse of both architecture and business logic Netcentric Patterns Overview Netcentric Patterns Focus On Application Frameworks Netcentric Patterns focus on how to design and leverage application frameworks, which are pieces of reusable application architecture that provide a highly configurable, flexible and maintainable system. They are aligned with SAF and/or DAF service layers. Alignment with SAF and/or DAF makes the patterns easier to grasp the context for which they are solving problems.

There was no mandate to express implementation within any given particular OO language. Java and Visual Basic have increased in popularity over the last few years and C++ continues to be a solid foundation on which to build many types applications. In addition, some implementations chose the design syntax of UML. One should see the value of the pattern regardless of the implementation personality. Nowhere has this been more strongly demonstrated than in the Eagle Starter Kits. Here, the Eagle Architecture Specification has been documented in patterns and implemented in Visual Basic, Java, C++ and a host of execution environments within these language offerings. The power is in the reusable design patterns.

For a high-level description of the context for the patterns within a service layer of SAF and/or DAF, click the title of the section. Please refer to the SAF and/or DAF for more detailed descriptions of the service layers. From the Frameworks Main Page, under Framework Extensions, the "Component Technology Extension" describes, in the context of the Netcentric Architecture framework, the additional, specialized, architecture services that are required when building a system using component technologies.

Approach

Over the past years, component-based development has become an important, but often-misunderstood concept in the IT world. Components in themselves don't guarantee successful business applications, but coupled with a proven methodology and continuous technological advancements, they make it possible to realize a number of important benefits such as flexibility, adaptability, maintainability, reusability, integration readiness, interoperability, and scalability.

Components have been around for a long time. The wheels on an ancient Roman chariot were certainly components. When the local chariot maker invented a new wheel (one that promised greater speeds and improved reliability on a wider variety of terrain), chariot owners would replace their worn-out, inefficient, and out-dated wheels with the new ones, but only if the new ones offered, at a minimum, the same function (i.e., rolling) through the same interface (i.e., the connection between the wheel and the chariot).

Today components are used to build everything from cars to computers. In electronics, for example, they have led to the proliferation of product features, disposability, miniaturization, product selection, price reduction, and standard interfaces—all good for the consumer. This example also draws attention to some of the challenges that accompany components: setting standards, determining the right components, the need to change standard interfaces based on new requirements, and the legal and commercial structure for selling components.

Throughout the industry the word "component" is used broadly and often loosely. Components come in a wide variety of shapes and sizes. For example: JavaBeans, ActiveX controls, and COM objects. And more generically: application, architecture, development, engineering, Web, server, and business components.

Many industry experts have attempted to define "component." Unfortunately, many of these definitions are too abstract, too academic, or too specialized to be useful. Yet below the surface of these definitions is some real business value for organizations.

Figure 35:
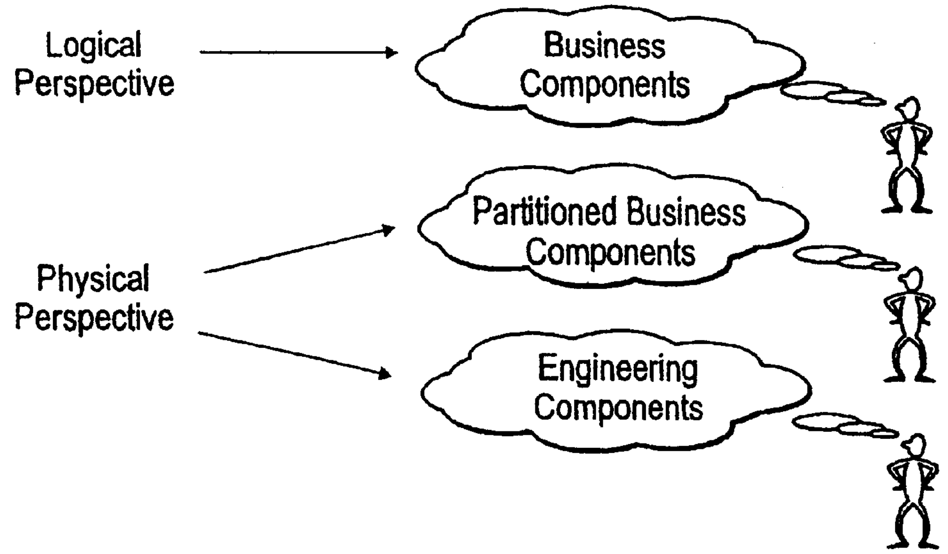
FIG. 35 illustrates how components are viewed from different perspectives.

Experience has shown that it's quite common for people to view components from different perspectives, as illustrated in FIG. 35. Some of them—typically designers—take a logical perspective. They view components as a means for modeling real-world concepts in the business domain. These are Business Components. Others—typically developers—take a physical perspective. They view components as independent pieces of software, or application building blocks, that implement those real-world business concepts. These are Partitioned Business Components. Developers also emphasize that Partitioned Business Components can be built from other independent pieces of software that provide functionality that is generally useful across a wide range of applications. These are Engineering Components.

To use an analogy, the designer of a PC workstation would initially think in terms of logical components such as Disk Storage, Memory, Display, etc. These are analogous to Business Components. At some point in the design process, however, this thinking must become more precise. For example, Disk Storage might become a Hard Disk Drive and Disk Controller Card. These are analogous to Partitioned Business Components. And finally, the designer might-use generic parts in the design of the Disk Controller Card, such as Memory Chips for cache, Bus Adapters, etc. These are analogous to Engineering Components.

Establishing one definition to satisfy all of these perspectives is certainly not required to be successful with components. What's more important is to recognize the different perspectives and to understand when it's appropriate to talk about a particular type of component. Hence, multiple definitions, one for each type of component:

Business Components represent real-world concepts in the business domain. They encapsulate everything about those concepts including name, purpose, knowledge, behavior, and all other intelligence. Examples include: Customer, Product, Order, Inventory, Pricing, Credit Check, Billing, and Fraud Analysis. One might think of a Business Component as a depiction or portrait of a particular business concept, and as a whole, the Business Component Model is a depiction or portrait of the entire business. It's also important to note that although this begins the process of defining the application architecture for a set of desired business capabilities, the applicability of the Business Component Model extends beyond application building.

Whereas Business Components model real-world concepts in the business domain, Partitioned Business Components implement those concepts in a particular environment. They are the physical building blocks used in the assembly of applications. As independent pieces of software, they encapsulate business data and operations, and they fulfill distinct business services through well-defined interfaces. Business Components are transformed into Partitioned Business Components based on the realities of the technical environment: distribution requirements, legacy integration, performance constraints, existing components, and more. For example, a project team might design an Order Business Component to represent customer demand for one or more products, but when it's time to implement this concept in a particular client/server environment, it may be necessary to partition the Order Business Component into the Order Entry component on the client and the Order Management component on the server. These are Partitioned Business Components.

Engineering Components are independent pieces of software that provide functionality that is generally useful across a range of applications. They come in all shapes and sizes, and they are typically packaged as black box capabilities with well-defined interfaces. They are the physical building blocks used in the assembly of Partitioned Business Components. Examples include: a workflow engine, a JavaBean that encapsulates a reusable concept like address or monetary unit, a complex widget that allows users to edit a list of order lines, a group of objects responsible for persistence, a JavaBean that sorts a collection of objects, and a simple list box coded as an ActiveX control.

Components are useful throughout the development process. As a design artifact, early in the process, Business Components provide an underlying logical framework for ensuring flexibility, adaptability, maintainability, and reusability. They serve to break down large, complex problems into smaller, coherent elements. They also model the business in terms of the real-world concepts that make up the domain (e.g., entities, business processes, roles, etc.). Thus they provide the application with conceptual integrity. That is, the logical Business Components serve as the direct link between the real-world business domain and the physical application. An important goal is to build an application that is closely aligned with the business domain. Later in the process, Partitioned Business Components and Engineering Components provide a means for implementing, packaging, and deploying the application. They also open the door to improved integration, interoperability, and scalability.

Figure 36:
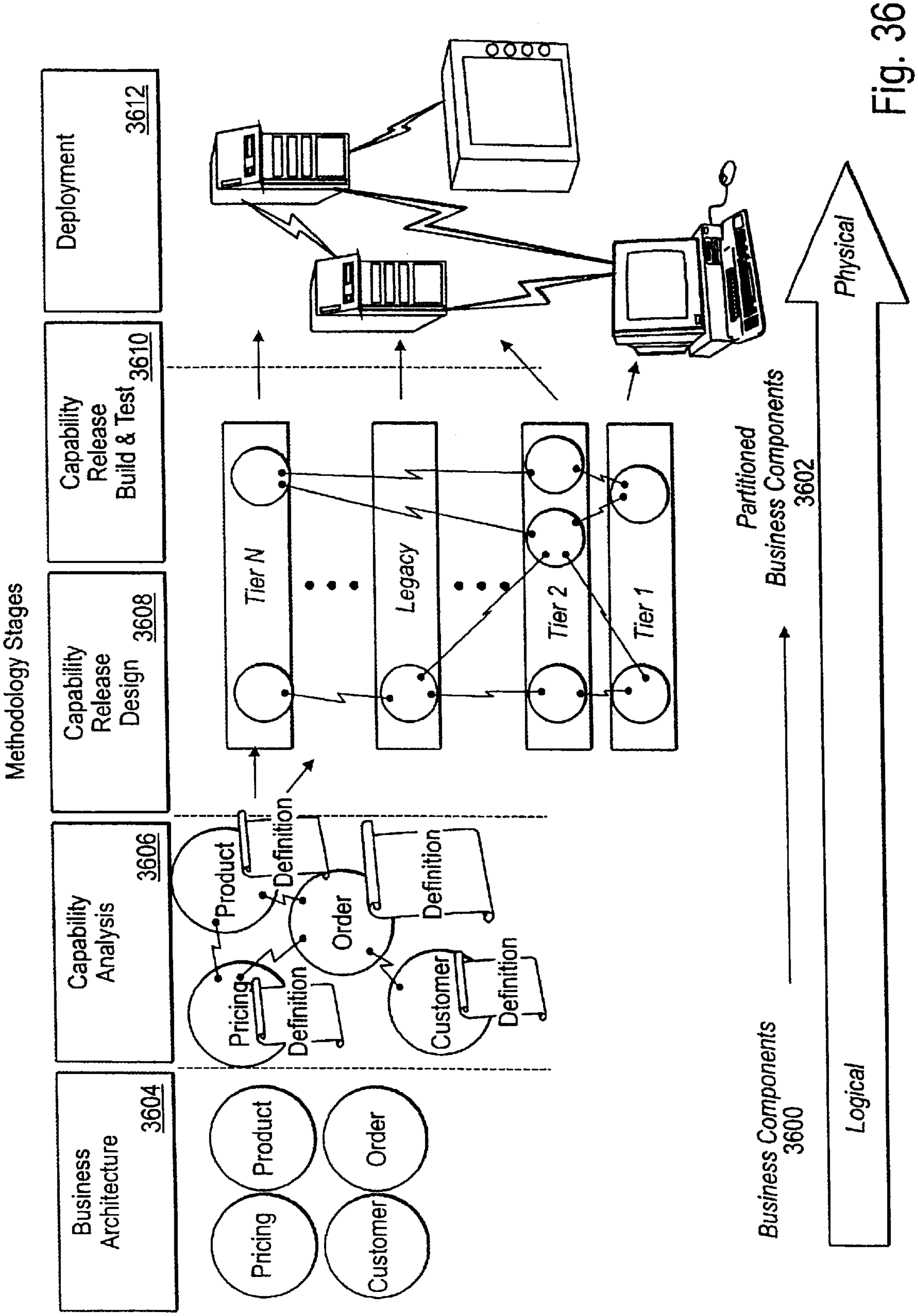
FIG. 36 shows a relationship between business components and partitioned business components.

FIG. 36 shows a relationship between business components 3600 and partitioned business components 3602. Business Components are an integral part of the previously discussed Framework Designs. Business Components represent real-world concepts in the business domain. They encapsulate everything about those concepts including name, purpose, knowledge, behavior, and all other intelligence.

In the Business Architecture stage 3604, a project team begins to define the application architecture for an organization's business capabilities using Business Components. Business Components model real-world concepts in the business domain (e.g., customers, products, orders, inventory, pricing, credit check, billing, and fraud analysis). This is not the same as data modeling because Business Components encapsulate both information and behavior. At this point in the process, an inventory of Business Components is sufficient, along with a definition, list of entities, and list of responsibilities for each Business Component.

In Capability Analysis 3606 and the first part of Capability Release Design 3608, the project team designs Business Components in more detail, making sure they satisfy the application requirements. The team builds upon its previous work by providing a formal definition for each Business Component, including the services being offered. Another name for these services is "Business Component Interfaces." The team also models the interactions between Business Components.

Throughout the remainder of Capability Release Design and into Capability Release Build and Test 3610, Business Components are transformed into Partitioned Business Components based on the realities of the technical environment. These constraints include distribution requirements, legacy integration, performance constraints, existing components, and more. Furthermore, to ensure the conceptual integrity of the Business Component model, a given Partitioned Business Component should descend from one and only one Business Component. In other words, it should never break the encapsulation already defined at the Business Component level. Also at this time, the project team designs the internal workings of each Partitioned Business Component. This could mean the Engineering Components that make up the Partitioned Business Component, the "wrapper" for a legacy or packaged system, and other code.

In Capability Release Build and Test, Partitioned Business Components are built and tested. The build process varies depending upon the technology chosen to build the internal workings of each Partitioned Business Component. Among the many tests that are performed during this stage, the component, assembly, and performance tests are impacted the most by this style of development. A component test addresses a Partitioned Business Component as a single unit by testing its interfaces and its internal workings, while an assembly test addresses the interactions between Partitioned Business Components by testing broader scenarios. The performance test is impacted primarily by the techniques one would use to resolve the various performance issues. For example, it's common to run multiple copies of a Partitioned Business Component across multiple servers to handle a greater transaction volume.

In Deployment 3612, the Partitioned Business Components are packaged and deployed as part of the application into the production environment. The application parameters and the manner in which the Partitioned Business Components are distributed are tweaked based on how well the application performs.

Well designed Business Components are anthropomorphic. That is, they take on characteristics and abilities as if they were alive. This means that Business Components should reflect directly the characteristics and abilities (i.e., the information and behavior) of the business concepts they represent. Therefore, only by examining the various types of business concepts will one discover an acceptable way to classify Business Components.

Business concepts come in a wide variety. For example, a product represents something of value that is up for sale; while a credit check represents the work that needs to be done to determine if a customer's credit is good. The former is centered around an entity—the product—while the latter is centered around a process—credit check.

This line of thinking leads to two types of Business Components: entity-centric and process-centric. Unfortunately, what commonly results from this paradigm is an argument over whether or not a particular Business Component is entity-centric or process-centric. In reality, Business Components are always a blend of both information and behavior, although one or the other tends to carry more influence. An appropriate mental model is a spectrum of Business Components.

Business Components on the entity-centric side of the spectrum tend to represent significant entities in the business domain. Not only do they encapsulate information, but also the behaviors and rules that are associated with those entities. Examples include: Customer, Product, Order, and Inventory. A Customer Business Component would encapsulate everything an organization needs to know about its customers, including customer information (e.g., name, address, and telephone number), how to add new customers, a customer's buying habits (although this might belong in a Customer Account component), and rules for determining if a customer is preferred.

Business Components on the process-centric side of the spectrum tend to represent significant business processes or some other kind of work that needs to be done. Not only do they encapsulate behaviors and rules, but also the information that is associated with those processes. Examples include: Pricing, Credit Check, Billing, and Fraud Analysis. A Pricing Business Component would encapsulate everything an organization needs to know about how to calculate the price of a product, including the product's base price (although this might belong in a Product component), discounts and rules for when they apply, and the calculation itself.

One might argue that the Pricing component is more entity-centric than process-centric. After all, it's centered around the concept of price, which is an entity. In reality, though, it depends on the business requirements, but again, whether or not a given Business Component is entity-centric or process-centric is not important yet. What is important is how well the Business Component represents its corresponding real-world business concept. The fact that most business concepts are a blend of information and behavior means that most Business Components should also be a blend of information and behavior. Otherwise applications would be much like they are today with a distinct separation of data and process.

Another way to think about the process-centric side of the spectrum is by asking, "What role performs the process?" For example, it's the picker-packer who picks inventory and packs it into a shipment. This might lead to the Picker-packer component. Another example is a Shopping Agent component that knows someone's buying preferences, shops for the best deals, and either reports back to the user or makes the purchase.

A pattern emerges when one examines the way these Business Components interact with each other. Process-centric Business Components are "in control," while entity-centric Business Components do what they're told. To be more explicit, a process-centric Business Component controls the flow of a business process by requesting services in a specific sequence according to specific business rules (i.e., conditional statements). The services being requested are generally offered by entity-centric Business Components, but not always. Sometimes process-centric Business Components trigger other process-centric Business Components.

Figure 37:
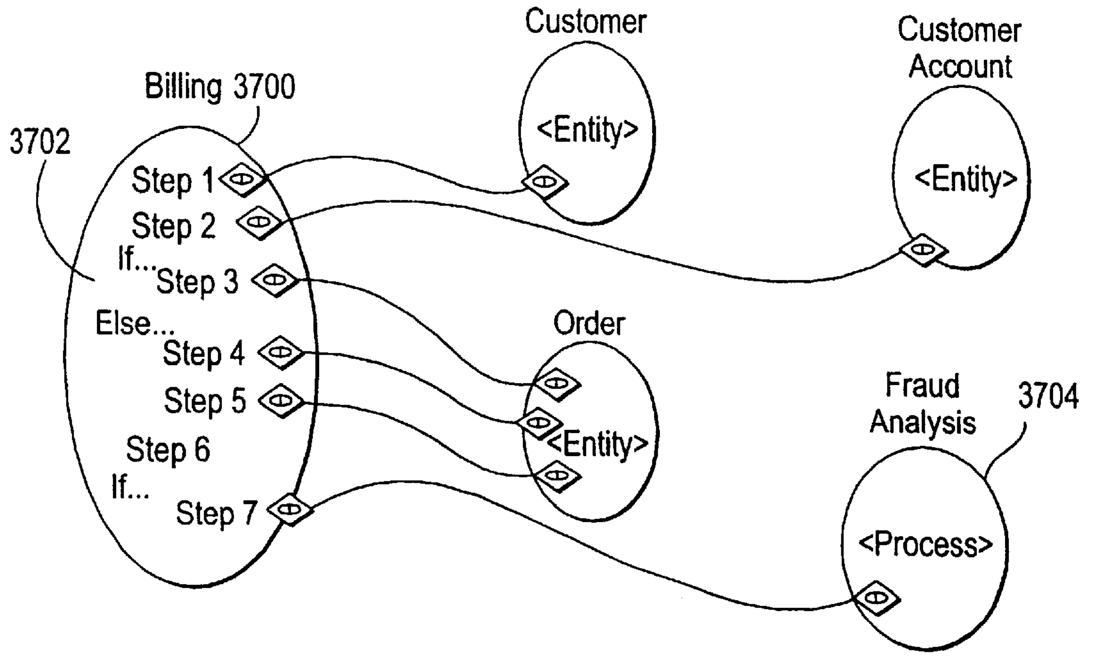
FIG. 37 shows how a Billing Business Component may create an invoice.

FIG. 37 shows how a Billing Business Component 3700 may create an invoice. The control logic 3702 (i.e., the sequence of steps and business rules) associated with the billing process is encapsulated within the Billing component itself. The Billing component requests services from several entity-centric Business Components, but it also triggers Fraud Analysis 3704, a process-centric Business is Component, if a specific business rule is satisfied. Note also that "Step 6" is performed within the Billing component itself. Perhaps this is where the invoice is created, reflecting the design team's decision to encapsulate the invoice within the Billing component. This is one valid approach. Another is to model a separate entity-centric Invoice component that encapsulates the concept of invoice. This would effectively decouple the invoice from the billing process which might be a good thing depending on the requirements.

It would be logical to conclude that the two types of Business Components translate to two types of Partitioned Business Components, but a small adjustment is required. Entity-centric Business Components translate directly to Business Entity Components, but a closer look at the ways in which a business process can be implemented in an application reveals two possibilities for process-centric Business Components. A business process can be: 1) automated, like a billing process, or 2) controlled by a user, like an order entry process. The former results in a Business Process Component, while the latter results in a User Interface Component.

Figure 38:
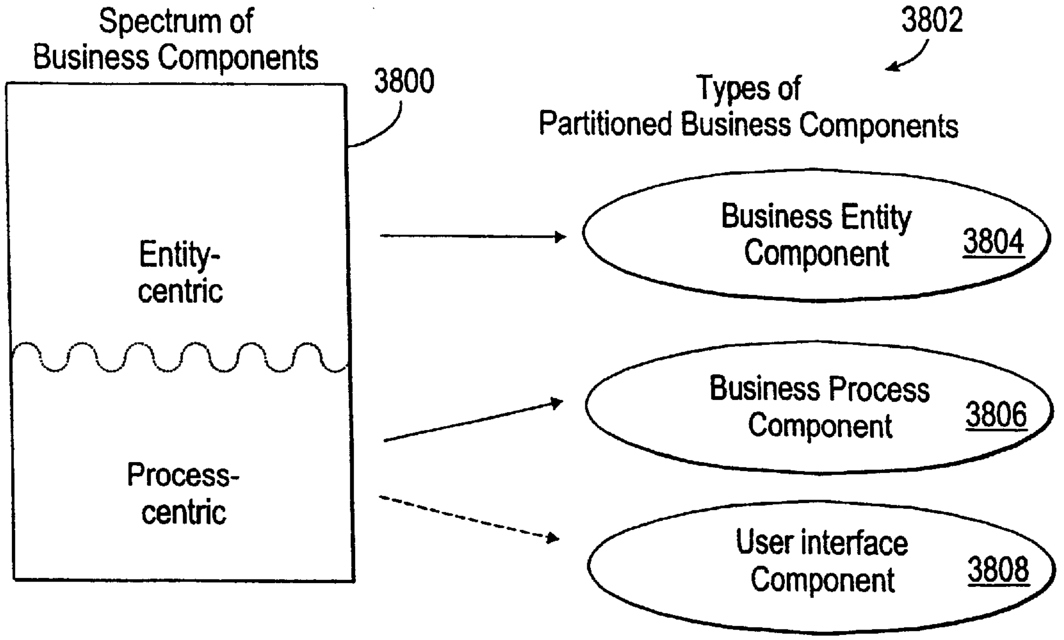
FIG. 38 illustrates the relationship between the spectrum of Business Components and the types of Partitioned Business Components.

FIG. 38 illustrates the relationship between the spectrum of Business Components 3800 and the types of Partitioned Business Components 3802. Business Entity Components 3804 and Business Process Components 3806 are straightforward. The former is the physical implementation of an entity-centric Business Component (e.g., Customer), while the latter is the physical implementation of an automated process-centric Business Component (e.g., Billing). User Interface Components 3808, on the other hand, require further explanation.

Figure 39:
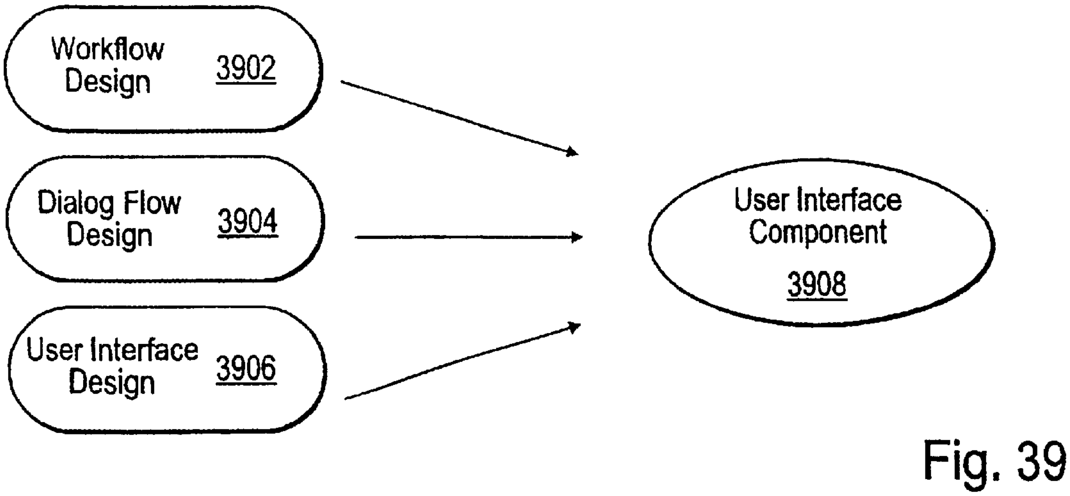
FIG. 39 illustrates the flow of workflow, dialog flow, and/or user interface designs to a User Interface Component.

As mentioned above, a User Interface Component is the implementation of a business process that is user controlled, but more explicitly it is a set of functionally related windows that supports the process(es) performed by one type of user. Examples include: Customer Service Desktop, Shipping Desktop, and Claim Desktop. These are not to be confused with low-level user interface controls (e.g., Active X controls), rather User Interface Components are usually built from low-level user interface controls. The reason for the dashed arrow in the diagram above is a subtle one. It points to the fact that earlier in the development process User Interface Components are generally not modeled as process-centric Business Components. Instead, they typically originate from the workflow, dialog flow, and/or user interface designs. See FIG. 39, which illustrates the flow of workflow, dialog flow, and/or user interface designs 3902, 3904, 3906 to a User Interface Component 3908. This makes complete sense given their direct tie to user controlled business processes.

Figure 40:
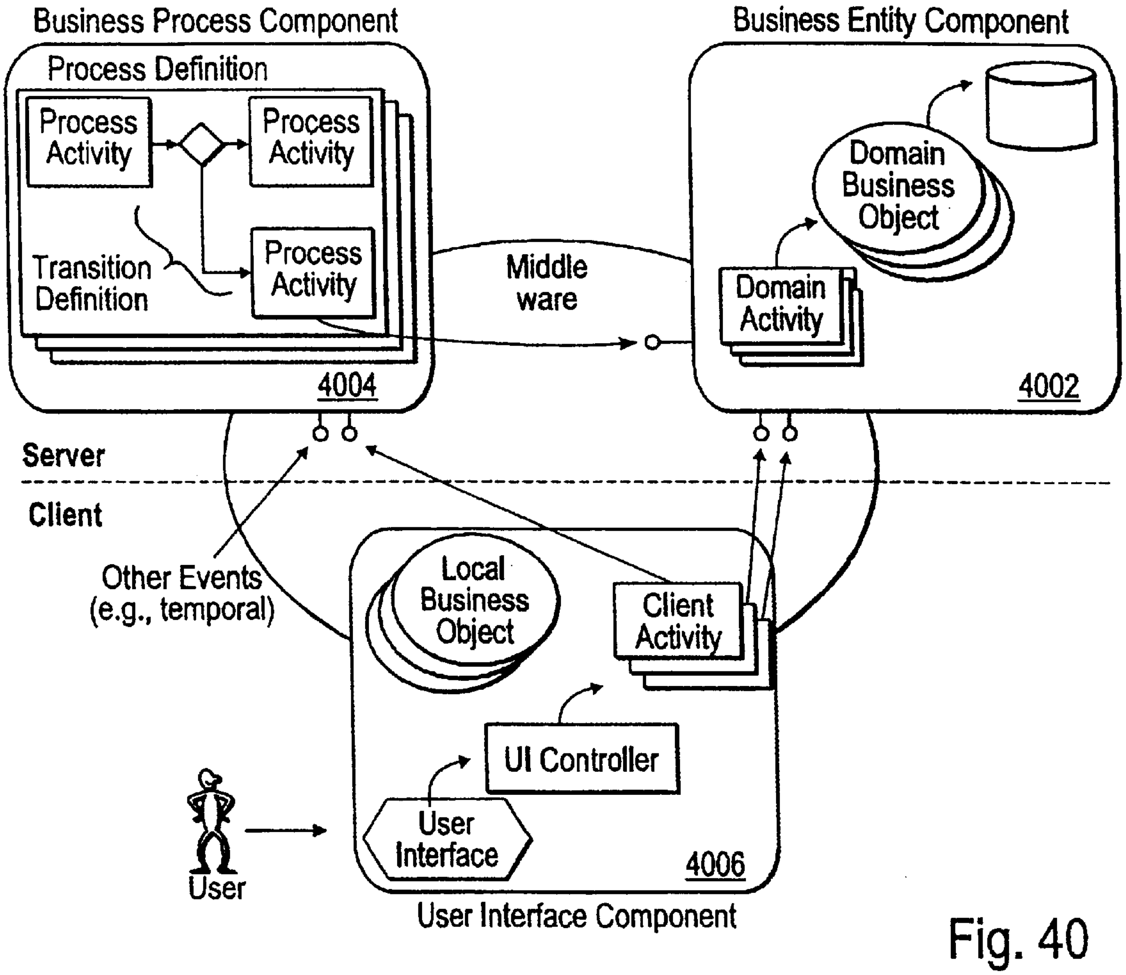
FIG. 40 is a diagram of an Application Model which illustrates how the different types of Partitioned Business Components might interact with each other.

FIG. 40 is a diagram of the Eagle Application Model which illustrates how the different types of Partitioned Business Components might interact with each other. Business Entity Components 4002 and Business Process Components 4004 typically reside on a server, while User Interface Components 4006 typically reside on a client.

Figure 41:
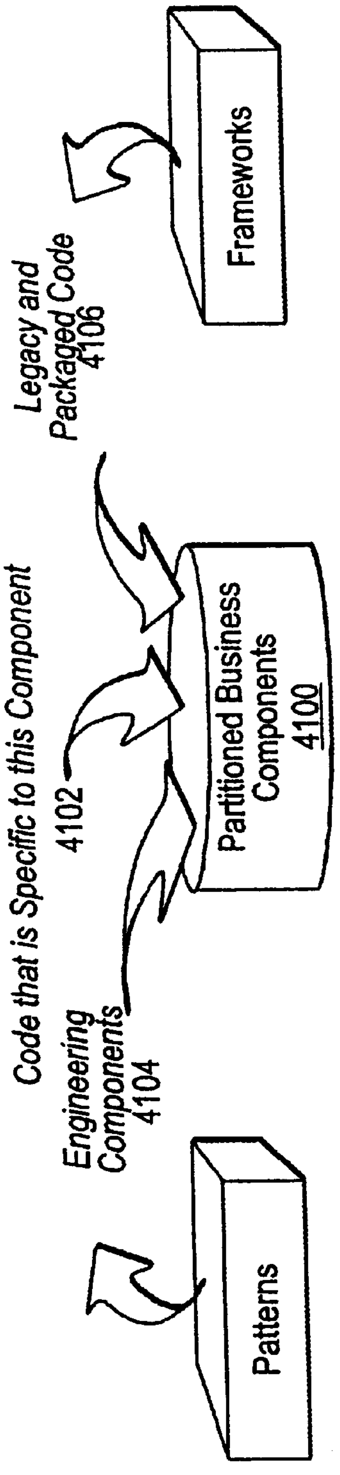
FIG. 41 illustrates what makes up a Partitioned Business Component.

FIG. 41 illustrates what makes up a Partitioned Business Component 4100. As long as a component does what it's suppose to do, it doesn't matter what kind of code is used to build the component's internal workings. It could be anything from COBOL to Java. This is a key benefit of encapsulation. Classifying this code is a different matter. Some code 4102 is specific to the Partitioned Business Component. Other code is more widely reusable, both functionally and technically; this is where one finds Engineering Components 4104. Another possibility is to "wrap" existing code 4106 from legacy and packaged systems. Finally, it's important to note that patterns and frameworks are frequently used as starting points for designing and building this code.

Engineering Components are physical building blocks used in the assembly of Partitioned Business Components. They are independent pieces of software that provide functionality that is generally useful across a range of applications, and they are usually packaged as black box capabilities with well-defined interfaces. Engineering Components can be bought or built, and they come in a wide variety. Examples include: a workflow engine, a JavaBean that encapsulates a reusable concept like address or monetary value, a complex user interface control that allows users to edit a list of order lines, a group of objects responsible for persistence, a JavaBean that sorts a collection of objects, and a list box coded as an ActiveX control.

A pattern is "an idea that has been useful in one practical context and will probably be useful in others." Think of them as blueprints, or designs for proven solutions to known problems. Having found the right pattern for a given problem, a developer must then apply it. Examples of patterns include: an analysis pattern for hierarchical relationships between organizations and/or people, a design pattern for maintaining an audit trail, a design pattern for applying different levels of security to different user types, and a design pattern for composite relationships between objects.

A framework is a template for the implementation of a particular function (similar to a shell program). It usually embodies a known pattern (or group of patterns) in a specific technical environment. Frameworks are available from a number of third-party vendors, and they are also developed on projects. Developers are typically expected to customize and extend frameworks to meet their specific requirements, but this involves a tradeoff. Customizing and extending a framework may optimize its use, but the resulting framework tends to be less abstract, and therefore less reusable in other contexts. Examples of frameworks include: a framework for displaying an object and its properties in Smalltalk, a Java-specific framework for persisting data, and a messaging and publish/subscribe framework for DCOM.

Figure 42:
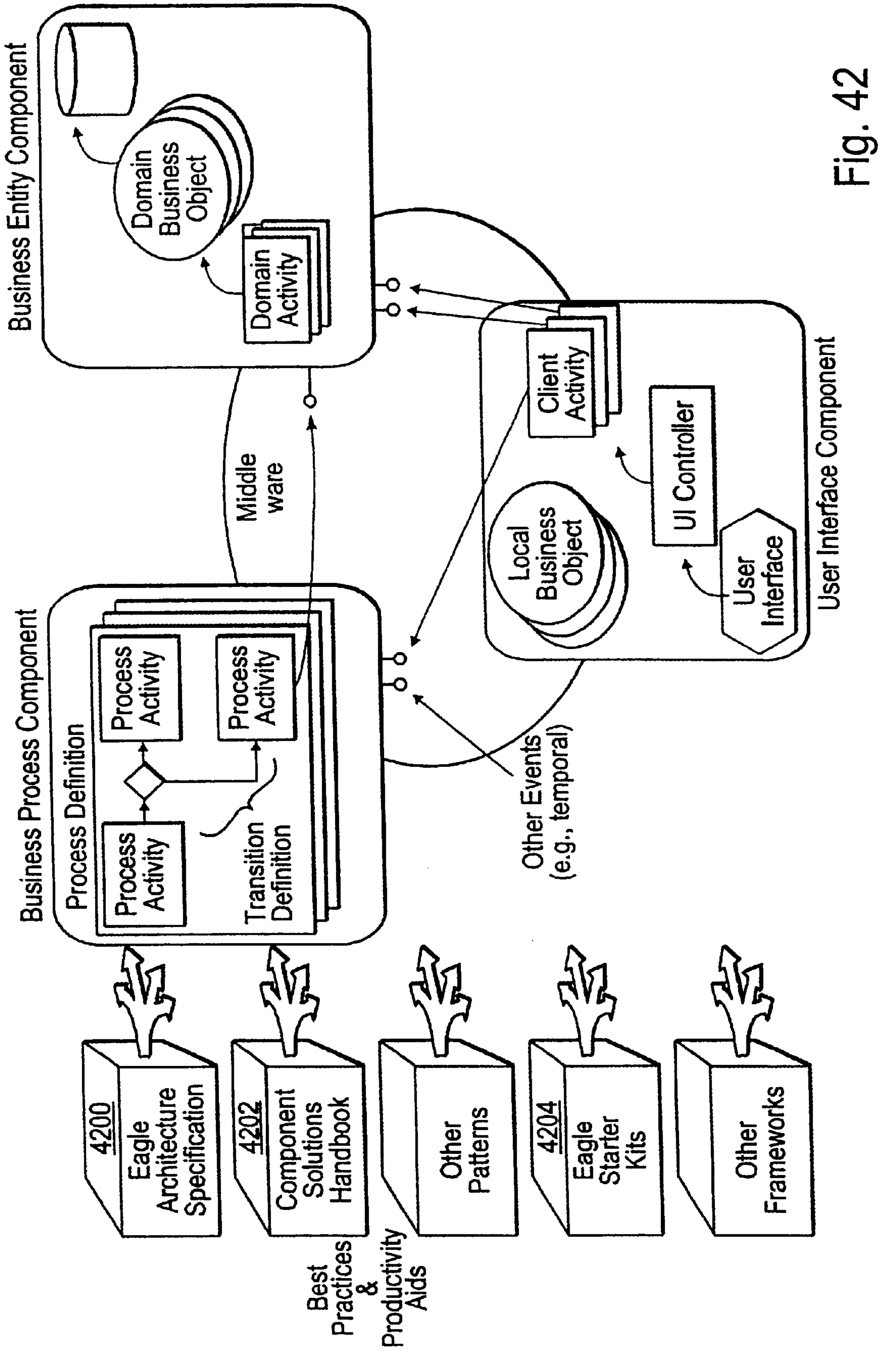
FIG. 42 illustrates the role of patterns and frameworks.

FIG. 42 illustrates the role of patterns and frameworks. More specifically, it introduces the Eagle Architecture Specification 4200 and the Component Solutions Handbook 4202, both of which are groups of patterns. Eagle also offers technology-specific starter kits 4204, which include frameworks for various environments.

The pace of change in today's business world is increasing faster than ever before. Meanwhile, advances in information technology have enabled businesses to better understand their customers, provide greater value, and create new markets. However, as technology becomes more complex, applications have become more difficult and time-consuming to build and maintain. Looking forward, applications must be dramatically more responsive to change. They must be more:

| | In theory . . . | In practice . . . |
|---|---|---|
| Flexible | Making it possible to quickly satisfy new business requirements by replacing or modifying certain components with minimal impact to others. | Making it possible to accommodate a new product line solely by updating the Product component. |
| Adaptable | Making it easy to deliver an application to a variety of user types through a variety of delivery channels with minimal impact to the core application. | Making it easy to provide in-home access to customer account information by developing only a new user interface while reusing existing components. |
| Maintainable | Making it easy to update an application by reducing the area of impact for most changes. | Making it easy to add a new customer attribute by isolating the change to one component-the Customer component. |
| Reusable | Making it possible to quickly assemble unique and dynamic solutions from existing components. | Making it possible to assemble an application at a fraction of the cost because eight of the twelve components that are needed already exist. |
| Integration Ready | Making it possible to reuse the functionality within existing systems by wrapping them as components within new applications. | Making it possible to absorb newly acquired divisions by "wrapping" their systems and "plugging" them into the enterprise infrastructure. |
| Interoperable | Making it possible to request services across platforms. | Making it possible to integrate two applications built on different platforms. |
| Scalable | Making is easy to distribute and reconfigure components to satisfy various transaction volumes. | Making it easy to accommodate the holiday crunch by running multiple copies of the Order component across multiple servers. |

Components will help an IT organization achieve these quality attributes. Through encapsulation they make it possible to develop applications that are more responsive to change. One can make this claim with confidence because a component that is well encapsulated (i.e., an independent, black box component with predictable, well defined interfaces) can be used in any situation, as long as it's used for its intended purpose. It knows how to perform its services without regard to what's happening outside of its boundaries (e.g., the actions that precede or follow it).

Another key to embracing change is the predictability and conceptual integrity of the parts that make up an application. Fred Brooks, author of *The Mythical Man-Month*, writes, " . . . conceptual integrity is the most important consideration in system design." Therefore, components must be conceptually whole, and they must perform functions that are aligned with their purpose and within their sphere of knowledge. If they accurately reflect the real world, they are much easier to develop and maintain. If the real world changes, so must the corresponding component.

Given a design with these characteristics, the opportunity for reuse is significantly enhanced, and the time it takes to upgrade the system is dramatically reduced. The Gartner Group agrees that component-based development will be a dominant method of application development in the years to come. They say that "by 2001, at least 60 percent of all new applications development will be based on assemblies of componentware, increasing speed to market and the ability to cope with change (0.7 probability)."

Business Components and Partitioned Business Components represent a major improvement in design capability—some might argue the first major change in design thinking since structured design. There are several reasons for this breakthrough:

Business Components model entities and processes at the enterprise level, and they evolve into Partitioned Business Components that are integrated into applications that operate over a network. Consequently, they serve as an excellent first step in the development of scalable, distributed enterprise applications that map closely to the business enterprise itself (i.e., the way it operates and the information that defines it).

Business Components model the business, and thus they enable applications to more completely satisfy the business needs. They also provide a business-oriented view of the domain and consequently a good way to scope the solution space. This results in a good context for making process and application decisions. Finally, Business Components provide a common vocabulary for the project team. They educate the team in what's important to the business.

When modeled correctly, entity-centric Business Components represent the most stable elements of the business, while process-centric Business Components represent the most volatile. Encapsulating and separating these elements contributes to the application's overall maintainability.

To manage the complexity of a large problem, it must be divided into smaller, coherent parts. Partitioned Business Components provide an excellent way to divide and conquer in a way that ties the application to the business domain. They provide the ability to "package software capabilities into more manageable (and useful) chunks." By contrast, traditional modules are too cumbersome to be reusable in multiple contexts. On the other end of the spectrum, objects are too small to effectively divide and conquer; there are simply too many of them.

Partitioned Business Components provide a greater emphasis on application layering-a well known, but often neglected concept in application development.

Partitioned Business Components are application building blocks. As an application modeling tool, they depict how various elements of an application fit together. As an application building tool, they provide a means for systems delivery.

Proven processes, patterns, and frameworks offer a higher level of reuse. This is one of the key advantages because it means greater agility. These mechanisms make it possible for hundreds of developers to do things consistently and to benefit from previously captured, reusable knowledge capital.

Business Components model the business. It sounds straightforward, but even with experience it's a challenge to identify the right components and to design them for flexibility and reuse. Flexibility and reuse are certainly more achievable with Business Components, but they are not inherent to Business Components. To accomplish these goals, as the previous examples suggest, one must understand what's happening within the enterprise and across the industry. One must work with business experts who understand the factors that will influence the current and future evolution of the business domain. This will improve one's ability to anticipate the range of possible change (i.e., to anticipate the future). The Business Component Model will be more flexible and reusable if it is challenged by scenarios that are likely to take place in the future.

Reuse becomes a reality more quickly if one plans for it. And it endures if one manages it over time. However, both of these things are difficult to do, especially for large projects and large enterprises. First of all, it's easy for communication across one or more projects to break down. It's also common for individual projects to pay more attention to their requirements and deadlines than to project-wide or enterprise-wide reuse. After all, their most important objective is to deliver value to their customers. Reuse must be engrained into the culture. This could mean teams responsible for project-wide and enterprise-wide reuse, but no matter how it's done, reuse must be one of the most important technology objectives.

Too much focus on low-level (i.e., code) reuse can be a trap. To draw an analogy, take a look at the recent history of the auto industry. Some auto makers were focused on inter-changeable parts and low-level standardization. For example, they decided to use the same body style for all of their cars. Unfortunately, when the industry began to move away from the boxy body style, they were not well prepared, nor were they agile enough to react in a timely fashion. They had invested too much in low-level standardization. Conversely, other auto makers were focused on quality processes and frameworks (i.e., high-level reuse). As a result, they were able to respond more quickly to the changing requirements. Engagement experience has shown that the same thing can happen with components and objects (e.g., too much emphasis on low-level inheritance). That's why it's important to focus appropriately on the high-level reuse enabled by processes, patterns, and frameworks.

Although Business Components and Partitioned Business Components represent a significant breakthrough in design capability, the architectural frameworks to support this breakthrough are still maturing. Standards come to mind first: Will it be COM, JavaBeans, or CORBA? It's still not clear. Likewise with languages: Will it be Visual Basic, Java? Tools and repositories offer another challenge. Clear winners have yet to emerge, and newcomers are constantly popping up with promising products. Finally, the legal and commercial market for buying and selling components is not mature. The market for high-level common business objects is just emerging, while the market for low-level components is still chaotic.

One of the most important challenges is teaching a new application development style. Although components and objects have been around for a while, they are new to most people. Furthermore, component-based development requires a change in the way one thinks about designing and building applications. Engagement experience has shown that it takes a couple of months to feel comfortable with this paradigm-and longer for those pursuing deeper technical skills. But this challenge is certainly not impossible to overcome. A combination of training and mentoring has proven to be the best way to teach these concepts, and the more rigorous approach that results from this education is well worth the journey.

The following tips and techniques provide an introduction to some of the issues surrounding the design of Business Components.

What is the right number of Business Components? How big should they be?

The granularity of Business Components is a frequent topic of discussion. A fairly common misconception is that Business Components are the same as applications, but in fact, applications are assembled from Business Components (or Partitioned Business Components to be more accurate). A typical application might have ten to twenty Business Components. On the other end of the spectrum, Business Components are larger than business objects. In fact, some people refer to Business Components as large-grained business objects.

So what is the right size for a Business Component?

Business Components should encapsulate concepts that are significant to the business domain. Of course, this is subjective, and it certainly varies by business domain. In fact, business domain experts, with help from component modelers, are in the best position to make this judgment.

Bigger Business Components hide more complexity, which in general is a good thing. However, too much complexity in a component can lead to many of the problems that preceded component-based development. For example, embedding too much policy information can lead to a Business Component that is more difficult to maintain and customize. Another advantage is the fact that the coupling between bigger components tends to be weaker. On the other hand, bigger components are generally less cohesive and consequently less flexible. For example, assume that the concepts of warehouse and inventory have been combined into one Business Component. This could be problematic if a future application needs warehouse information, but not inventory information.

Smaller Business Component tends to be more flexible. It's also easier to reuse them in future applications. Unfortunately, smaller components typically result in a higher degree of coupling. One will find significantly more interactions between smaller components. This could also lead to performance problems. If two or three small components send each other a lot of messages, it might make sense to combine them into one. Smaller components may also be more difficult to manage, simply because more of them exist.

It's important to strike a balance, and keep in mind that the ideal size depends on the domain. If there's a question in one's mind, it makes sense to lean toward smaller components. It's easier to combine them than to break them up.

What's the best way to identify Business Components?

During the Business Architecture stage, the project team defines its business capabilities. At this point in the process, one can begin to search the business domain for Business Components. Then again later, during Capability Release Design, when the project team documents scenarios and workflows, one can perform a second iteration through the identification process.

Figure 43:
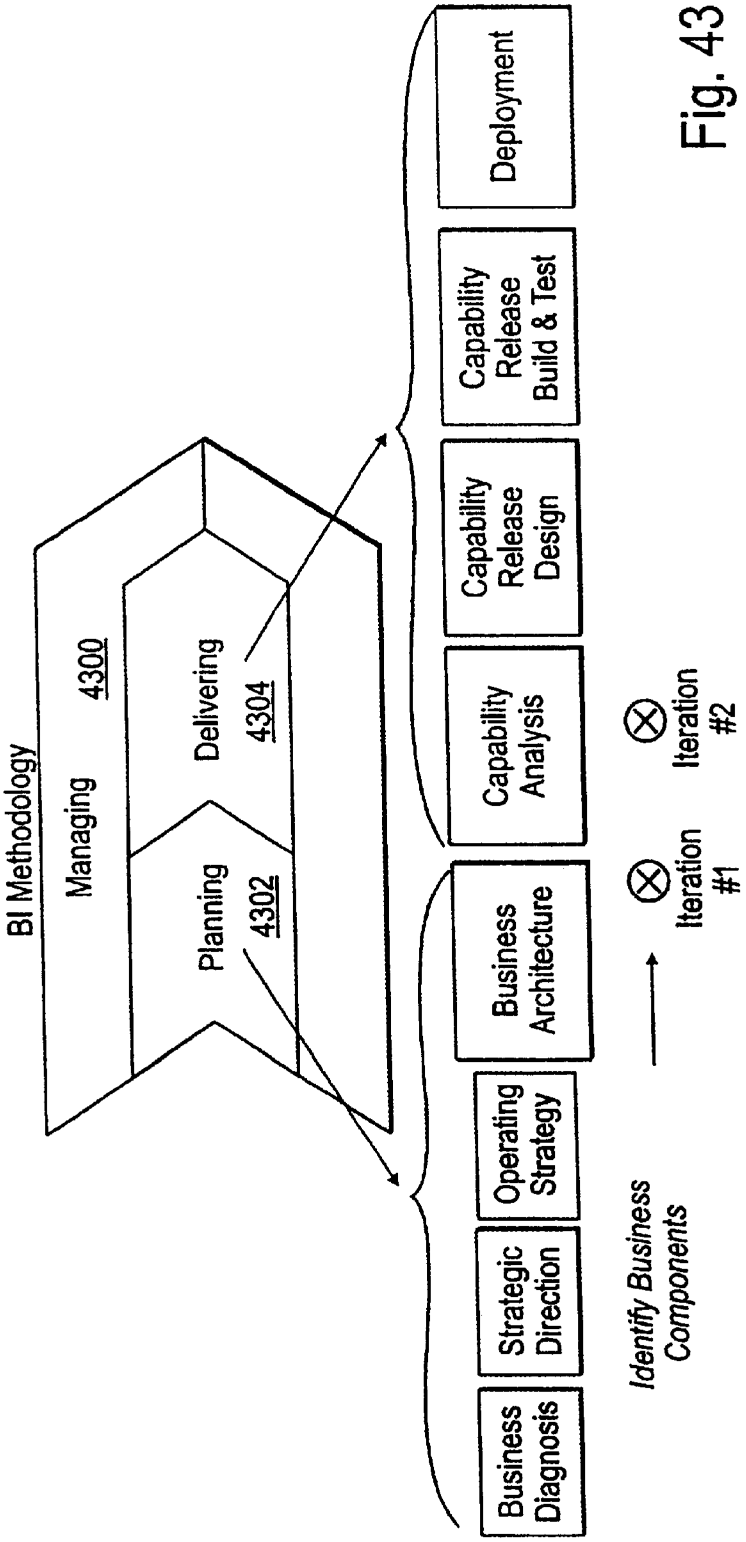
FIG. 43 illustrates this Business Component Identifying Methodology including both Planning and Delivering stages.

The following steps describe one technique for identifying Business Components. FIG. 43 illustrates this Business Component Identifying Methodology 4300 including both Planning and Delivering stages 4302, 4304:

1. Start with entity-centric Business Components. For example, the customer is a significant entity in most business domains, therefore a Customer component may be included. A Customer Business Component would encapsulate everything an organization needs to know about its customers, including customer information (e.g., name, address, and telephone number), how to add new customers, a customer's buying habits (although this might belong in a Customer Account component), and rules for determining if a customer is preferred. Entities themselves can be physical or conceptual. For example, customers and products are physical—you can touch them. Orders, on the other hand, are conceptual. An order represents a specific customer's demand for a product. You cannot touch that demand.
2. Look for process-centric Business Components next. Generally speaking, a process-centric Business Component controls the flow of a business process. For example, in the utility industry, a Billing component would process customer, product, pricing, and usage information into a bill. Sometimes one will find an entity associated with the process—in this case, a bill or invoice—but another option is to model this entity as a separate, entity-centric Business Component, thus decoupling it from the process.

What's the best way to identify the responsibilities of a business component?

Review the business capabilities, business processes, business practices, scenarios, workflows, and other requirements. Look for behaviors that will be supported by the application. In other words, what are the business functions that will be performed by the system? Assign them as responsibilities to the most appropriate component. If components were people and computers didn't exist, one might ask, "Who is responsible for this task?" In fact, sometimes it's helpful to assign component owners who speak up when they encounter a responsibility that should belong to their components—"Hey, I should be responsible for that!"

This section addresses several frequently asked questions that more broadly apply to the physical implementation of component- and object-based solutions. The answers are intended to increase the awareness of the reader. Most of them only scratch the surface of issues that are somewhat controversial within the component and object community.

What is the role of components in net-centric computing?

Physical components play a critical role in net-centric computing because they can be distributed, as encapsulated units of executable software, throughout a heterogeneous environment such as the Internet. They have the ability to make the Web more than a toy for retrieving and downloading information. Robert Orfali, Dan Harkey, and Jeri Edwards, well-known experts in the field of component- and object-based development, wrote the following about distributed objects (same as "distributed components" for the purpose of this discussion):

The next-generation Web—in its Internet, intranet, and extranet incarnations—must be able to deal with the complex requirements of multi-step business-to-business and consumer-to-business transactions. To do this, the Web must evolve into a full-blown client/server medium that can run your line-of-business applications (i.e., a delivery vehicle for business transaction processing) . . . . To move to the next step, the Web needs distributed objects.

What's the difference between components and objects?

From a logical perspective, components and objects are the same. They both model concepts from a particular domain, and they both encapsulate information and behavior. On this level, good component models and good object models share the same characteristics: high cohesion, low coupling, reusability, well defined services, and more. One might argue that granularity is a key difference. After all, for an object-oriented design, components are made up of objects. This may be true, but in reality both of them come in all sizes, thus making this difference rather insignificant.

From a physical perspective, components and objects are similar, but different. The key difference relates to the different ways in which they are implemented. As long as a component's interfaces comply with an accepted standard like COM, JavaBeans, or CORBA, its internal workings can be implemented using any technology (e.g., Java, Visual Basic, Smalltalk, C, or even COBOL). The internal workings of an object, on the other hand, can only be implemented using object technology. For the same reason (i.e., standard interfaces), it is possible to request a component's services from any platform. That's not true of objects, unless they are wrapped with interfaces that comply with the accepted standards, which would make them distributed objects (i.e., components) instead.

Robert Orfali, Dan Harkey, and Jeri Edwards also wrote the book *The Essential Distributed Objects Survival Guide* (1996). Chapter 2, "From Distributed Objects to Smart Component," is an excellent source of information about objects, components, and the differences between them. They say the following about physical components:

> A component is an object that's not bound to a particular program, computer language, or implementation . . . . They are the optimal building blocks for creating the next generation of distributed systems . . . . Components are standalone objects that can plug-and-play across networks, applications, languages, tools, and operating systems. Distributed objects are, by definition, components . . . . Unlike traditional objects, components can interoperate across languages, tools, operating systems, and networks. But components are also object-like in the sense that they support encapsulation, inheritance, and polymorphism.

What is a component model?

This is a common point of confusion. From a logical perspective, the term "component model" is frequently used to refer to a Business Component Model in the same way that "object model" is used to refer to a business object model.

From a physical perspective, a component model (or a component object model) defines a set of conventions that provides a standard way to develop and use physical components, including how to-define properties, events, behaviors, etc. It also includes the standard structure of a component's interfaces, the mechanism by which a component interacts with other components, patterns for asking a component about its features, a means for browsing active components, and more. Some of the existing component models are COM, JavaBeans, and CORBA.

Example: A Grocery Store

A grocery store chain is creating an enterprise-wide Business Component model. Currently the individual stores do not record specific customer information.

Consequently, a model based on today's requirements would not retain customer information.

However, they are looking into preferred customer cards. Furthermore, while analyzing the industry, the project team reads about a competitor with a pharmacy and video rental service. In both cases, customer information becomes critical. So the project team creates scenarios describing how they would use customer information to support these requirements. They create one Business Component Model that supports both today's and tomorrow's view of the customer.

In the near future, when the chain adopts preferred customer cards, and in the more distant future, if they decide to add a pharmacy or video rental service, the Business Component design for their current application will provide a solid foundation for the future requirement of tracking customer information. If they weren't using Business Components, they would not have a model that maps to their business domain, and introducing new requirements would require more abrupt changes.

Example: Inventory Management

A telecommunications company in the paging business sells and leases pagers and services. One part of the company is installing an inventory management. system for tracking pagers, while another part of the company is trying to determine how to track the frequencies that are owned and leased by the company. What does this company mean by inventory? Does it simply mean knowing what items are in a warehouse?

When the company thinks abstractly about the concept of inventory, they discover that it's all about managing anything of value. When they look at what they have in inventory, they discover that it is countable, reservable, and has a cost associated with it. Inventory does not require specific knowledge of the use of an item in inventory; that knowledge can be put into another component, such as Item. If inventory does not need to know the specifics about its use, then it could apply its ability to count, reserve, and value anything it is associated with. Inventory could be used to manage a variety of things: conference rooms, fixed assets, work in process, finished goods, and leased frequencies.

So one can start out building an inventory management application and then build the ready-to-reuse Inventory component which, without modification, can support many other uses. In this way one can unload the concept of inventory so that it can be reused outside the context it was initially planned for.

This section highlights key messages for project management. The Management Lessons discuss these points further.

Manage Expectations—Component Technology Is Not a Silver Bullet

Components promise to enhance the ability to quickly build robust systems through the use of reusable pre-built software components. Properly leveraged, components can provide the foundation upon which one meet and exceed the demands of a global marketplace which increasingly uses technology as a primary competitive advantage. Like object technology before, components are often portrayed as the magic silver bullet to slay the ills of software technology.

Yet, the silver bullet mentality inevitably leads to unreasonable expectations. Intense media attention fuels these expectations. For example, components are often compared to Lego blocks that are simply plugged together to form complex systems. Experience has shown, however, that component technology is not that simple and that payoffs are primarily in the long term. There are several factors impede short-term payoffs.

Most important, demand exceeds supply for professionals with component and object-oriented skills. Thus, many initial projects incur start-up costs related to recruiting, training, and learning curve. Furthermore, after receiving investment in training, individuals find themselves in demand, becoming higher risk to leave the organization.

Another unreasonable expectation is the belief that components may provide immediate software reuse. Experience has shown that reuse is not automatically attained; it is necessary to establish a disciplined approach to reuse and create a development culture that embraces reuse.

A client's view of component technology may vary depending on their previous experiences. Client's with no component or object experiences may have the most unrealistic expectations for what the technology can delivery. In contrast, clients that have attempted object-oriented applications and failed may understand that components are not the "silver bullet" that many have promised. In fact, these clients may require additional evidence of the viability of a component approach. For these clients, a component approach can be very appealing since a component-based architecture can combine both traditional and object technologies. And lastly, there is the third category of clients that have achieved some measure of success with object technology and view component technology as the natural evolution towards the goals that are only partially delivered by object technology alone.

Component-based Development's Focus on the Long-term Is Usually a Good Tradeoff

Component-based development is also inherently biased towards the long-term. For example, the development process strives for a higher degree of quality and reuse, incorporating iteration between design and code to support refinement. Striving for this higher design quality may almost always, by definition, cost more up front. Despite these initial costs, component-based development's focus on the long-term makes economic sense. Experience has shown that 60–80% of development costs are in maintenance.

Recruit a Project Champion or Sponsor with a Long-term Focus

To ensure that short-term concerns do not outweigh the potential benefits, project management should maintain a realistic view of the benefits and risks of components. Thus, recruiting a project champion or sponsor with a balanced, long-term view is a key to success.

Business Benefits Must Support Adoption of Component Technology

Establish Clear Goals for a Component-based Project

Component technologists sometimes promote component development for its own sake, without regard for the business benefits. However, rarely may management justify something they do not understand. Component technology introduces a daunting array of new terminology. Furthermore, if a pilot component project is launched with unclear goals or mission, the significant short-term costs and challenges may inevitably undermine the commitment to components.

Thus, component technology must be justified in business rather than technology terms. In many cases, a traditional client/server solution can deliver the benefits. This proves especially true for short-lived, simple, or moderately complex applications. On the other hand, component technology may benefit applications with characteristics such as:

- a long maintenance life
- complex processing or significant asynchronous logic
- complex data relationships
- very dynamic business requirements
- multiple access channels
- legacy evolution or replacement
- functionality common across multiple applications Firm Clients Have Achieved Business Benefits The number of engagements that have employed component and object technologies has continued to grow over the last few years. These engagements have shown that object and component-based approaches can lead to significant business benefits.

Reduces Maintenance Costs

Properly designed component-based systems should reduce maintenance costs. Encapsulating implementation details and data make a system more resilient to changes in the business or underlying technology. Furthermore, design decisions must rigorously consider what is likely to change. Susceptible points should be hidden behind an abstract, public interface that decouples their potential changes from impacting other components.

Component Reuse Reduces Development Time

Components are more easily reused because they provide well-defined interfaces and can often be used through visual development tools. This make it more straightforward to develop components for one project and share them across other projects. Furthermore, components can be designed so that their properties can be tailored to meet varying requirements. Once a reusable base of components has been established, the development time for subsequent projects can be reduced.

In one utility company they saw significant gains in the reuse of components across initiatives. Rather than copying and tailoring source code for new initiatives they were able to assemble applications from already created components.

Another engagement estimated that new system development was reduced 25% once the first application was released and a core set of components was established. Even though the engagement ultimately realized the benefits of reuse, the client still had the expectation that reusable components would save time and money for the first project. To manage this expectation, the project team needed to re-emphasize that component-based development requires an initial investment.

Leverage Existing Technology Investments

Many clients have existing technology assets that would require significant investments to replace. Components can enable these legacy systems to be wrapped with component interfaces so that new applications can easily interact with them. Later, these legacy applications could be replaced without changes to the new applications.

Shields Complexity and Supports Re-engineered Processes

Objects Raise the Level of Abstraction in the Software Solution

Object development enables closer integration between developing applications and reengineering business processes. The first object-oriented language, Simula, was invented to enable simulation. It and other object development environments provide capabilities that raise the level of abstraction of the software. That is, object-oriented languages and design techniques enable writing software in terms closer to the real-world business rather than the computer.

Enables Improved Usability

Object-oriented technology can support improved usability in two ways. First, objects messaging each other lends itself to simplified programming of advanced, direct manipulation or multi-media interfaces. Second, an object metaphor for designing the user interface may be a more desirable interaction style for some types of users such as knowledge workers needing flexible navigation.

Reduces System Test Complexity and Cost

In a few different instances, the object-oriented development approach has significantly reduced system test complexity. In all these cases the projects fell behind schedule due to learning curve, the complexity of custom architecture development, and increased effort for component and assembly testing. However, once core, reusable objects in the domain model and application framework stabilized, system testing the functionality and performance was much easier. For example, since less code and data knowledge was replicated throughout the system, global changes could often be made by making a change in one place.

Component Technology May Help Improve Communications with Users

The close tie that component and object modeling enables between the software solution and business process may help software analysts and users or business analysts to better understand each other, reducing errors in communications. This represents a significant opportunity, because misunderstanding user requirements has been proven to be the most costly type of mistake in systems development. A component model further improves the understanding of the software design by providing a larger-grained model that is easier to digest.

Lastly, communication with users is often improved by using scenarios which convey requirements through familiar business situations.

Multiple Access Channels

Component architectures are inherently service-oriented. Components provide their services through interfaces which consist of operations. Because components are independent pieces of software they can be reused by any number of applications. Thus, component-based architectures are well suited to environments that need to provide multiple application "personalities" or access channels. New personalities can be provided by creating a new user interface layer that reuses the existing business components.

Managing Risk Is Key

Component technology is still high risk, because it may often: have a pervasive impact on the overall-development approach require immature technology or tools implicitly involve complex functional requirements Component-based Development Is Not Only New Technology; It Is a New Approach to Software Engineering Component-based development should not be understood as just a technology decision; rather, it is a new approach for software engineering. Thus, it affects almost all aspects of development including methodology, tools, organization, and architecture approaches. This broad impact creates multiple learning curves, complicating the migration of an organization. Finding available skills is also difficult, because demand currently outweighs supply.

Component-based systems may also require immature technology or tools. Many of the core development tools such as the programming language and environments for C++, Visual Basic, Java and Smalltalk are actually very robust. However, some of the ancillary tools such as the CASE tools and web development tools or technology architecture components such as messaging middleware may not be as mature. Thus, the team may face a choice of managing some risk exposure with a tool or library that simplifies development, or avoiding this tool risk but facing a more complex development challenge.

Another, more subtle source of risk is the inherent functional complexity of applications often chosen for component-based projects. Component technology's technical characteristics enable dynamic, functionally complex systems. For example, business reengineering can capitalize on the inherent flexibility of component-based systems. However, reengineering creates more dynamic functional requirements, thereby increasing risk. Not to mention that business reengineering is itself a risky venture.

Thus, proactive risk management is an essential practice in development. Traditional risk management techniques apply to component-based projects. For example, a "top ten" risk list can help focus management attention. This risk focus must then influence the development tasks carried out by the team early in the project to ensure risks are addressed in a timely fashion.

Architecture Is Essential to Delivering the Benefits

Component Technology Enables Application Frameworks

Component-based systems extend the notion of architecture beyond that in a traditional system. Much of the power of component-based systems is the ability to leverage application frameworks. Frameworks are somewhat analogous to program shells found in a traditional environment such as the INSTALL/1 online system with components like MES and CCP. However, this is only an approximate analogy. An application framework goes beyond traditional application architectures to provide a greater degree of default behavior and flow of control in a skeleton of the application.

For example, traditional program shells rely heavily on cut-and-paste techniques to achieve reuse. This places a heavier burden on the developer and exposes the structure of the application. With an application framework, object-oriented capabilities minimize or eliminate the need for cut-and-paste reuse. A well-designed framework reduces the burden on application developers by providing an architecture environment that effectively says, "Don't call us, we'll call you."

There are many frameworks within the Java programming environment. For example, Java Security, a very important topic in new netcentric architectures, provides a Java Security Framework. This is a plug and play framework that allows developers the option of plugging in a security provider of their choice (DES, RSA, etc) or developing a custom security solution that can be called by security clients. To create a new security provider, the developer must only implement the required interfaces for the framework and provide a well-known name. Once these requirements are met, the component can be plugged into the framework.

Component-based Systems Are Distinguished by a Business Component Model

The presence of a Reusable Business Component Model Is a Key Characteristic

A component-based software architecture may have a domain component model shared by the application processes. The component model contains the core business components that represent the business directly in software. These components perform behaviors upon request by windows, reports, or batch process control objects.

The presence of a component model distinguishes component-based systems from procedural, client/server systems. In a procedural approach, there is no shared business component model. This typically requires, for example, programs to pass data to each other in a context record. Thus, any changes to the data may affect many programs. The extent of business logic reuse is also usually less with the procedural approach.

The presence of a business component model also distinguishes a component-based architecture from that produced by componentware tools. Specifically, many traditional and even component-based tools provide data-aware controls that tie the user interface directly to the database. This is indeed a powerful technique to rapidly build simpler, less strategic applications. However, it suffers from a lack of smaller-grained business reuse and increased coupling between presentation and data. This may increase maintenance costs and miss opportunities to flexibly model complex business processes, as can be done with a component model. On the other hand, producing a reusable component model requires a higher level of abstraction and is therefore a more difficult approach.

Component Systems Are Based on Standards

Component-based systems are also usually distinguished by their use of one or more of the leading component standards, i.e. CORBA, DCOM, or JavaBeans. These standards define the mechanisms that business components may use to communicate with each other. However, a system does not necessarily have to use one of these technologies to be considered component-based. The most important criteria is that the application is made up of reusable, service-oriented building blocks that encapsulate their functionality.

Component-based Systems Can Incorporate a Variety of Technologies

Clients Can Select the Most Appropriate Mix of Technologies

Just as none of a user's client experience with objects has involved migration to a completely pure object solution, components may involve a variety of technologies. This is even more true for component-based systems since they provide the ability to integrate different technologies through well-defined interfaces. The ease of integration is very appealing to clients since it allows them to maintain their existing technology investments, leverage their existing skills, and select a mix of technologies that best fit their tolerance for risk.

More Diverse Skills May Be Required

Because components can be implemented in a variety of programming languages on a number of platforms, it is often necessary to have competencies in a number of technologies. For example, one client used Visual Basic, Smalltalk, C++, and COBOL for different layers of the system. The increasing number of technology combinations also increases the complexity associated with development activities such as testing, debugging, and configuration management.

Component Can Wrap Procedural Applications

Wrapping is a technique to integrate traditional system components. It applies to both the application and system levels. For example, a component can provide a public interface, encapsulating a legacy application.

Wrapping can be effectively applied to integrate a legacy billing system with a large, object-oriented customer care system.

At the architecture level, wrappers often provide database interface objects to shield the application from the database vendor.

Architecture Development Must Start Early

A Tension Exists between Scenarios and Frameworks

As with client/server, architecture work must start early. As noted above, this is particularly challenging because of the level of application reuse in a well-designed application framework and domain component model. Because of this reuse, the framework must be heavily driven by application requirements, or scenarios. Yet, the architecture team must stay one step ahead of application development teams to ensure that the architecture and component model are ready in time to be reused. Thus, a difficult tension exists between scenarios and frameworks.

The tension between scenarios and frameworks can be simplified to the extent that third-party or standard architectures such as Eagle can be leveraged. In any case, the following guidelines should be considered, particularly for custom architectures:

- The architecture should be defined and prototyped, if necessary, early in the preliminary design
- The architecture should be complete-at the very least, the development architecture and overall framework, prior to developers actually coding; the design must be in place earlier when functional developers start detailed design; private architecture aspects may be deferred
- Time must be planned for architecture support based upon unforeseen scenarios, performance tuning, documentation and developer mentoring
- Developing a custom application framework should be estimated as a set of tasks in addition to much of the traditional technology architecture development New Roles and Organization Strategies Must Be Introduced Component Projects Require Modeling Skills Most traditional engagements divide roles into two basic categories, functional and technical, or architecture. Component-based development introduces a third dimension by requiring an extensive modeling role. Early experience has shown that the capability to draw abstractions in modeling a business problem or application framework is a unique skill set distinct from purely technical or functional skills.

Managing the Domain Component Model Requires New Organization Approaches

In addition, the extensive reuse of a core business component model requires an organization structure that manages it as a shared resource. This creates a tension between the needs to support consistent reuse of core components, and the desire to solve a business problem front-to-back. Experience has shown this often requires some form of matrix organization, combining vertical-based leadership along the lines of business functions, and horizontal-based leadership along the lines of architecture layers.

Leveraging Expert Mentors and Time Are Key to Scaling the Learning Curve

The Learning Curve Is Greater, Because it Has Multiple Dimensions

Component-based development involves a longer learning curve than comparable software technologies, because it has multiple dimensions. Component technology skills cover a wide range of competencies—from modeling and design skills to detailed programming syntax. Yet, a user may have good success with people scaling the learning curve in a reasonable amount of time.

Programmers can expect to perform simple tasks in 2–4 weeks when an architecture is in place. More complete implementation skills may require 8–24 weeks. Design skills also typically require the same amount of learning curve, 2–4 weeks for simple tasks and 8–24 weeks or slightly more for complex design problems. Usually programming should precede design experience, if possible.

Thus, leveraging experienced component and object technology skills is key to success. Even a few skilled component developers can provide significant leverage to mentor and support an inexperienced development team. Experience has shown that at least 20% of the development team should have component technology or process skills at the outset. This represents a minimal level for large engagement teams with projects of one year or more duration. Smaller teams or shorter duration projects may typically require more. It is also extremely important to have a significant percentage of the team with client/server skills, to reduce additional learning curves such as GUI design or client/server architecture development.

Estimating and Planning Present New Management Challenges

Projects Should Allow Time for Start-up Costs and Contingencies

There is still not enough experience with component technology to support rigorous, detailed metrics. One reasonable checkpoint for estimating an initial project is to use traditional techniques, and then add time to adjust for contingency and start-up costs such as training, learning curve, and architecture development. Early client engagements have demonstrated that an initial project may almost always be more expensive due to these start-up costs.

Yet, care should be exercised in applying traditional estimating metrics. For example, traditional metrics often use number of days per window or report. Component-based development can result in significantly different window counts for similar functionality.

In addition, the fixed versus variable nature of costs should be considered. Start-up costs are often not simply a variable percentage of the project size, because roughly the same architecture components may be required independent of size. Thus, anecdotal evidence suggests that the start-up costs usually have a greater effect on a small project.

Development Requires a Mix of Waterfall and Iteration

Systems development traditionally relies on a waterfall model. This approach manages development in sequential phases of activity such as analysis, design, code, and test. The waterfall provides control and discipline to development, particularly critical for large, mission-critical efforts.

On the other hand, iteration enables proving out design assumptions in code early in the process, and testing the validity of code before proceeding on a wide scale. The information and learning gained from iteration are especially important for component-based development, because it is so new. As component-based architecture and methodologies mature, the need to iterate may be reduced Significant Planning and Status Monitoring Is Necessary to Manage Iteration However, managing iteration on a large scale is difficult. The team can easily slip into hacking, in which design is simply skipped before coding. Or, a team may use iteration as an excuse to not exercise due diligence in completing tasks. Thus, a merging of waterfall and iterative principles is beneficial. Yet, striking a compromise between waterfall and iteration is not easy. Thus, significant effort must be invested for detailed workplanning and status monitoring.

Incremental Development May Help Manage Scope and Risk

Incremental Development Partitions the System Roll-out into Releases

Perhaps the most effective way to mitigate the risks of a large project is to simply avoid being large. Incremental development addresses risk by reducing the necessary team size and scope. "Incremental" and "iterative" development are often used interchangeably, but they are different approaches.

Incremental development partitions the system roll-out into successive releases. For example, the initial release of a customer system might comprise order processing, followed by a subsequent release for billing, and a third release for collections processing. Thus, incremental development adds new functionality, while iterative development continuously refines existing functionality.

Incremental development avoids the complexity of a big bang integration. Furthermore, although an incremental approach delivers less in each successive release, it can deliver higher priority portions of the system much earlier than a traditional approach, thereby recognizing business benefits in a shorter time frame.

Despite these benefits, incremental development is not a panacea. Many times a big bang conversion has proven necessary, if the cost and risks of having parallel systems and bridges, performing conversion, and rolling out training are high. These costs must balance those introduced by the delayed delivery of business benefits and the risks implied by increasing scope and team size. The urgency of the business and the desire to manage development size may sometimes favor an incremental approach.

Commercially Available Methodologies Have a Narrow Focus

Most component-based methodologies focus primarily on analysis and design techniques. For example, less guidance is available for configuration management or testing. Yet, both of these aspects are more complex with component-based development, because of the greater level of granularity of the software decomposition. Because the methodologies are generic, they also typically do not address detailed architecture or design steps.

Configuration Management and Testing Are More Complex

As noted above, the increased granularity of a component-based system and the variety of technologies associated with it complicate testing and configuration management. A component-based system may often have more than ten times as many components as a traditional system. While component-based systems are more granular than purely object-oriented systems, configuration management is not necessary less complex. While the use of components allows objects to be packaged into more comprehensible interfaces, it also increases the number of elements that need to be managed. Typically, the following entities may be tracked:

Methods

Classes

Packages (which are often aligned with components)

Components

Configurations

Applications

Configuration management requires a comprehensive approach of tools, procedures, and organization approaches. Multiple levels of component ownership must be defined. The higher level of reuse requires frequent roll-outs of updated component versions. This also typically requires the workplan and other status monitoring techniques to track dependencies between components at a much lower level of detail.

In addition, completing a set of processing requires many software components working together. Thus, testing involves integrating many more components. The complexity is magnified, because the integration work often cuts across different developers. The testing strategy must generally include more testing phases, each specifying a lower level of detail. Furthermore, automated regression testing has proven essential to address the complexity of integration.

Address Performance Risks Early, but Defer Application Tuning

Timing when to address performance has subtle complexities for a component-based system. Certainly, component-based development involves new technologies that introduce performance risks. Prototyping architecture components should be initiated early to adequately address the performance risks.

On the other hand, excessive application tuning should not be done to the exclusion of following good design principles, especially if the components are built using object technology. Experience has shown that dramatic performance improvements can be made late in object-oriented development projects. Furthermore, following good design principles actually better enables these tuning capabilities.

However, if more traditional approaches are used to implement the components, then it may be more appropriate to tune performance throughout the development lifecycle.

Third-Party Components Have Increasing Importance

Third party components can play an important role in software development. Today's development tools make it easy to incorporate off-the-shelf components and customize them to a project's specific requirements. Thus far, off-the-shelf components have primarily consisted of user interface or architecture components. One project bought third party components for the user interface, device drivers, bar-coding, and database drivers. This project found that it saved a significant amount of time, especially in areas that required specialized programming skills. Unlike architecture components, it is not likely that third-party business components may be available any time soon.

Staffing, Training and Skills Development

This chapter discusses management issues related to staffing, training, and skills development.

Component-based Systems Require a Mix of Technical Skills

Object Skills Are Common, But Not Required

Components and objects are frequently considered to be equivalent technologies; however, they are not one in the same. While object-oriented systems may be developed using object-oriented analysis, design, and programming, a component-based system can be developed using a wide variety of languages, including procedural ones. As a result, the required depth of skills for a component-based project may depend on the blend of technologies used. For example, one project may require skills in COBOL, C++, and Smalltalk, while another may use Visual Basic exclusively. Because many projects are building components with objects, deep object-oriented skills may continue to be an essential ingredient in the success of a project.

Competencies in Multiple Technologies May be Required

Since component technologies make it possible to integrate different platforms, languages, and other technologies, it is often necessary to develop a broad portfolio of skills on a project. It is important to develop an early understanding of the different skills required and how they can be developed and leveraged across a project.

Leveraging Experienced Component Practitioners Is Key

Leveraging experienced component technology skills is key to success. Even a few skilled component developers can provide significant leverage to mentor and support an inexperienced development team.

At least 20% of the implementation team should have component skills

Small teams or short projects likely require more

Experience has shown that at least 20% of the development team should have object/component technology or process skills at the outset. These represent minimal levels for large engagement teams with projects of one year or more duration. Smaller teams or shorter duration engagements need a higher ratio of experienced component developers. Furthermore, custom building the architecture from scratch may generally demand even more and deeper skills, unless the team has exceptionally talented individuals, extensive client/server experience, and ample time to scale the learning curve.

It is important to note that component technology skills cover a wide range of competencies—from modeling and design skills to detailed programming syntax. Rarely may one individual have the necessary expertise in all these areas. Thus, experience has shown that it is necessary to find individuals that specialize in one of these areas to leverage across a large team. The key is obtaining the right balance of technology and methodology skills.

One Engagement Used a 1:1:1 Rule to Leverage Expertise

One large engagement found the most effective leveraging ratio was 1:1:1, comprising an experienced object specialist, an experienced programmer without object skills, and an inexperienced person. Note that this 1/3 ratio rule only applied to the team doing implementation. Thus, even though the total team size was about 200, only 40–50 were doing hands-on implementation, implying the need for about 13–17 skilled people.

Another engagement found the best mix to be one experienced developer to every four or five new developers. This project had a well-defined architecture and used Visual Basic to develop components. The relatively short learning curve of Visual Basic allowed this project to further leverage its experienced developers.

Exercise Caution When Contracting External Component Specialists

In some cases, independent contractors have proven an effective solution for filling gaps with specific niche skills. Experience has shown, however, these people may not be business-oriented, adapt well to the structure of a large engagement, nor have experience with mission-critical development.

Another problem has been having to fight object religion wars.

Managers Must Adopt New Techniques, Yet Not Forget Fundamentals

It's often said that, a good manager can manage anything. Many management skills such as planning, monitoring status, working with end-customer expectations, and managing risk certainly apply to any domain. These blocking-and-tackling aspects of management must not be forgotten on a component-based development project. Managers may, at times, be intimidated by component experts, and ignore the basics of project management.

Managing Iteration Is Difficult, but Possible

In particular, object industry and academic gurus frequently suggest that object development and iteration simply cannot be managed. Their recommended approach is usually some form of time-boxing the development, simply declaring victory whenever time is up. However, this represents a very unappealing approach to promising delivery of business benefits to clients. Fortunately, experience has shown that this does not have to be the case. Managing iteration, while certainly more difficult, is possible.

However, software development managers must recognize that component technology has a pervasive impact on many aspects of the development process including estimating, planning, methodology, and technology architecture. For example, iteration impacts many of the standard rules-of-thumb for work completion. And the extensive reuse of a common business component model requires more sophisticated organization strategies.

Managers Must Invest Time In Training

Thus, successful managers must be willing to invest the time to learn new terminology and techniques to adapt to these changes. Traits common to those who have successfully scaled the component management learning curve include:

Experience with client/server development and a technical orientation

Willingness and flexibility to learn new terminology, tools, and techniques

Strong communication and people skills.

Sound understanding of the system's development life-cycle and the risks at the various stages Architecture Roles Require Diverse Skills Complicating the search for architecture skills is the need to find developers who also possess the necessary communications and teamwork skills. The architecture team must be capable of both delivering an application framework, and giving people appropriate mentoring and support. Many technology architects are simply not well equipped to handle the tutoring, coaching, and communications demands inherent in component-based development.

Avoid starting inexperienced people in architecture roles. There are simply too many skills to learn. Architects need to have a deep knowledge of design patterns, programming languages, technical infrastructure, and methodologies. It is better to start new developers in application development roles where they may have the opportunity to view the architecture as a consumer. This perspective may make them more effective in future architecture roles.

While the dual role of building and supporting an architecture exists in a traditional client/server system, it may be more pronounced with component technology. Component-based systems require a higher degree of coordination by the framework developers partly because more application developers may be inexperienced with the environment. However, even an experienced team requires extensive coordination, because a greater level of consistency is required.

Developing with component technology demands more consistency, because an application framework and business or domain component model provide more reuse. In particular, much of the business logic may be shared by a common domain component model, viewed by many windows. To strive for this greater level of reuse across many business functions requires coordination among many developers. The risk is that the components may not fit together.

This type of development approach requires a strong architecture vision that is clearly communicated and supported through training, mentoring, and documentation. If a strong vision does not exist, then the components may inevitably not fit together into a cohesive, integrated architecture. In addition, this strong vision must include an understanding of the business objectives and functions of the system to be effective.

Strong architecture direction must also be accompanied by a positive "bedside manner". Application window developers may often perceive a framework somewhat restrictive of their creativity, too limiting, or burdensome, particularly when bugs hold up their delivery. It's important for the frameworks developers to be service-oriented; and, to realize that developing a reusable component is hard work and requires iteration.

Do Not Organize All the Component Skills on the Architecture Team

Because of the significant technical challenges often faced, a team may be tempted to staff all the experienced component developers on an architecture frameworks team. This strategy makes some sense. However, it should not be followed to the exclusion of leveraging the application or component modeling development team.

Developing the functional business logic requires component development and methodology skills, as well.

Staff an Engagement Team with a Mix of Backgrounds

Staffing an engagement with deep technical skills is clearly a challenge. However, the engagement team should not overlook the importance of functional skills. Experience has shown that technical backgrounds may sometimes be over-emphasized to the detriment of functional expertise.

It is important to remember that many roles on the team are more demanding functionally than technically. Interviewing users, analyzing business processes, and designing the user interface all do not require extensive technical training. Moreover, not adequately understanding and analyzing the functional requirements are the most expensive mistakes. Research has shown that 70–80% of a system's mistakes result from misunderstood requirements.

Component Technology Involves Multiple Learning Curves

A component approach affects almost all aspects of the development lifecycle. For this reason the component learning curve cannot be equated with a programming learning curve such as 'C'. There are multiple, distinct learning curves that affect individuals at many different levels in the organization:

- Component and object-oriented concepts and terminology
- Object analysis and design
- Programming language
- Programming environment and other development tools (e.g., browsers, debuggers, user interface tools)
- New architectures—such as how to use the project-specific application framework
- Management—such as estimating and planning for work, and managing iteration and prototyping Educating management about the multiple learning curves helps manage expectations. It's also important to avoid equating experience with pure elapsed time. For example, a person may be in the implementation phase doing things unrelated to building their component skills such as creating test conditions.

Component Skills May Take Longer to Transition to the Client

As a result of the many learning curves, it can take longer to successfully transition skills to the client. It is essential to have client participation in all areas of the project to ensure the transfer of skills. One of the most effective approaches is to have client personnel pair up with more experienced developers. Of course, this may be more expensive and may required buy-in from management.

The Rate at Which Individuals Scale the Learning Curve Varies Widely

Experience has shown that individuals scale the learning curve at very different rates. A user may have good success with individuals becoming productive in a reasonable amount of time. In some cases, people have learned extremely fast; on the other hand, a few have had considerable difficulty.

A useful model of the expected learning curve is outlined by Goldberg & Rubin [3]. These results are based on their extensive experience training personnel, primarily in the Smalltalk environment. Three primary levels of proficiency include:

- Basic—capable of doing basic assignments with adequate supervision, usually attained after formal training and some experience with simple assignments
- Functional—capable:of doing most assignments with a predictable level of productivity and minimal supervision
- Advanced—an expert resource capable of solving very difficult or unusual problems They distinguish the learning curve in four different skill areas as shown below, measured in months:

| Category | Basic | Func | Adv |
|---|---|---|---|
| Analysis and Design | 4 wks | 6–8 mos. | 18–24 mos |
| Implementation | 3–4 wks | 5–6 mos | 18–24 mos |
| Frameworks Design | 16 wks | 12–24 mos | 24–48 mos |
| Management | 3–4 wks | 12–18 mos | 24–36 mos |

The above results are reasonably consistent with a user's experience on client engagements. Some experience suggests that most firm personnel, on average, reach proficiency levels slightly faster than the above figures. However, a user may experience a much larger deviation, both positive and negative, than that reported above.

For example, some talented individuals reached a functionally competent level in implementation skills in as little as 8 or 10 weeks, less than half that suggested above. On the other hand, about 10–15% of individuals did not ever reach this level of expertise in a reasonable amount of time.

Early Experience Has Identified Key Predictors of Success

As noted above, a user may experience a reasonable degree of success in training personnel on engagements. Unfortunately, some clients have not been as successful.

Key predictors of success can be drawn from this experience and others. It is important to recognize that the list below is drawn from a very small experience base. As one's experience grows, the list of traits may be refined with-hopefully-more objective measurability. This may be key to helping both a user and clients to be more successful with components.

Ability to Deal with Change

Component-based development requires a high degree of change. Firm personnel deal with change their entire career. Often, client personnel may not be as adaptive. They may have worked with the same structured methodology and COBOL for 5 or 10 years. To change their entire process can be a big culture shift. Individuals must have the right attitude and interpersonal flexibility to change. This factor may help explain why less experienced people have often scaled the learning curve faster than more seasoned developers.

Yet, the simple fact that someone has deep COBOL experience does not mean that they may fail. There have been several examples of people on engagements who successfully made the transition from COBOL to Smalltalk, including architecture roles. However, all of these individuals were highly motivated with an open mind to change.

On the other hand, migrating to C++may be a considerable challenge for people who do not have experience with a pointer-based language. That is, C++projects should favor staffing people who have minimally programmed in languages such as C or assembly language.

Quick Study

Component technology involves multiple learning curves-people may need to learn fast. They must be motivated self-starters, capable of learning quickly on their own, and willing to read and perform supplemental tasks to improve their competencies.

Communications Skills

Component-based projects are very social endeavors. Because any given business function requires several collaborating components, developers also have to collaborate with one another. To ensure that components integrate smoothly, and to achieve the desired reuse, a high degree of communications and teamwork is necessary. This is significantly different than many traditional systems where a system is decomposed into larger, monolithic modules. These modules are typically developed front-to-back by each developer in relative isolation.

Creativity—Experience with Custom Systems Development

A component-based development project requires creativity. The overall atmosphere is usually very challenging with fewer, concrete rules. The answer to many analysis and design decisions is, "it depends". Similarly, the development environments encourage exploration and browsing.

Work Ethic

Individuals must be motivated to undertake personal training. There often is not enough time to support all the training needs during normal work hours for the system to meet a reasonable schedule. Thus, at times, individuals must pursue personal study and experimentation after hours. This type of commitment requires enthusiastic, hard-working individuals.

Initial Training Requires Hands-on Case Studies to Be Effective

Initial training requires significant upfront investment. Project Eagle achieved very good results with their multi-week Eagle University. Unfortunately, this represents a larger amount of upfront time than many engagements can realistically support. In addition, timing may be difficult, because often project team members may roll on the project at different times.

Thus, many engagements may need a more flexible model with training time staggered in smaller chunks. For example, the training may be accomplished through some combination of formal classroom training done in waves, self-study, case study experience with mentoring, reading, and on-the-job training. The key point, however, is that a significant commitment to training must be made-whether done upfront or spread throughout the project.

There are several other lessons learned that can be drawn from the Eagle experience. Perhaps most important, training should be based on case studies. It should involve a significant degree of learning-by-doing including both design and coding exercises. Examples can be taken from the actual application to be built, thus reducing the perception of pure training investment. However, care must be taken to ensure that day-to-day project demands do not detract from the training. For example:

Simple examples from well-known domains (e.g., checkbook application) ensure that the application requirements do not bog down the learning process.

People may need to be taken away from the project site, or firewalls created, to enable a total immersion environment.

Individuals should work in teams to simulate the collaboration necessary on an engagement.

If real portions of the application are used, the team should manage expectations so as not to confuse training goals with producing deliverables.

Reuse should be taught and encouraged through exercises that force the developer to browse.

On-going Support Is Necessary for Developers to Scale the Learning Curve

On-going support is necessary to help developers continue building skills. On-going training is important because the entire development lifecycle is affected, to some degree, by the shift to components. An individual's first few assignments should be carefully planned to enable growing skills, and to identify people who demonstrate aptitude. Time must also be allowed for scaling the productivity learning curve, after initial skills are developed. This generally requires a fair degree of commitment from experienced frameworks developers to provide mentoring.

A Formal Certification Process Supports On-going Skills Development

Since component technology can result in many new skills and competencies, an ongoing, comprehensive skills assessment and certification process has proven beneficial. A certification process defines areas of competence and then critically evaluates individuals' capability and progression. This can extend across design and coding skills to include familiarity with portions of the architecture. Peoples' skills can be assessed in compulsory design and code reviews. In effect, this becomes a component-specific skills evaluation.

A skills certification process helped to:

More rigorously identify and describe competencies of what is really desired in terms of skills and competence; and, what habits should be discouraged and flagged as performance problems.

Track peoples' growth-it encourages improvement by challenging people.

Provide a more effective way to assign appropriate roles to people and offer up the opportunity for people to grow into a more challenging role as quickly as they are adequately prepared.

Support more effective communications of what resources had which skills (e.g., through a wallchart)

Summary

Component-based development requires more time to scale the learning curve, because it has multiple dimensions. Component technology skills cover a wide-range of competencies including analysis, design, programming, and management. Thus, leveraging expert mentors and skills, investing in adequate training, and ensuring continued support are all key to success.

Team Organizations and Roles

This chapter discusses the team organization and roles involved with component-based development.

Manage the Team Size with Care

Team size should be managed carefully. Component-based development involves difficult coordination overhead. This stems from the higher degree of reuse and greater modularity of the system. A greater number of common components are reused across business functions. In addition, components are smaller than traditional modules. Thus, more work from multiple people must integrate smoothly. This complicates increasing the team size.

If a project slips off schedule, caution should be exercised in adding people. Brook's fundamental law states:

Adding More People to a Late Project Makes It Later

It is easy to underestimate the impact more people have on coordination and communications. Start-up costs can also be significant. New developers may have a learning curve. Even experienced developers must learn project-specific aspects such as the framework, business requirements, and team structure. These initial costs not only impact a new team member's productivity, they also reduce experts' availability for mentoring others.

Manage Expectations Regarding Developer Productivity

Industry Gurus Have Created Unrealistic Expectations For the Required Team Size

The need to manage team size must not create unrealistic expectations for developer productivity. High expectations have been fueled by many object industry experts who recommend a dramatically smaller team. Many have suggested that as little as 80–90% fewer people can accomplish an equivalent amount of work as a traditional development team.

However, experience does not support these exaggerated claims. Initial engagements have incurred considerable start-up costs such as training, architecture development, and building reusable components.

Some compelling evidence suggests object/component technology can improve productivity enough to reduce team size later in the software development lifecycle or for subsequent projects. Brooklyn Union Gas cut their maintenance staff in half and still accomplished as much or more work. Other firm experience has shown object technology reduced system test effort, enabling a smaller team. Large engagements have also realized benefits of reuse, significantly reducing development time for windows later in development. However, none of these experiences reported an order of magnitude reduction in team size.

Use Components As Work Packages

Components Can Define Work Packages

Perhaps the most effective way to mitigate the risks of a large project is to simply avoid being large. Partitioning a project into smaller sub-systems is one way to reduce size. Component-based development is particularly well-suited to partitioning the development effort because the constituent components can map directly to team responsibilities. This simplifies division of responsibility and roles, because software and team organizations can mirror each other.

Figure 44:
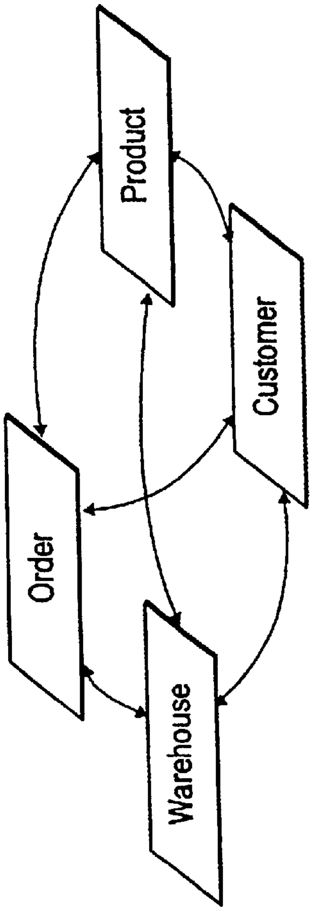
FIG. 44 shows a high level picture of application component interaction for an Order Entry system.

For example, FIG. 44 shows a high level picture of application component interaction for an Order Entry system. The boxes represent the application components of an application being developed. Orders are fulfilled by interaction with the Product, Customer, and Warehouse Application Components. These software application components can then serve to define the structure of teams and their collaborations with each other.

Keep in mind, however, the benefits of this partitioning approach may be influenced by the degree with which these components interact. Thus, determining the appropriate granularity of the components is a key, strategic design decision.

Greater Specialization of Roles Is Necessary

Two recent engagements involved very large teams, in one case peaking at over 200 people working with object-oriented technology. In both cases, the engagement teams leveraged expertise in a manner somewhat similar to a traditional engagement. There were, however, important differences in scaling object-oriented development to such a large size.

One important distinction is the categories of expertise to be leveraged. For a traditional engagement, most developers tend to be divided in two basic categories—functional or technical. These two dimensions represent the primary types of leveraged expertise. That is, guidance is provided by functional and technical experts.

Component Development Requires Functional, Technical, and Modeling Competencies

A component-based project adds a third dimension—modeling. The skill set to model and represent behaviors and relationships in components and objects is a distinct, complimentary skill set to functional and technical skills. Thus, most projects find that they need a third type of expert—e.g., a component/object modeling architect(s), to provide direction.

Four primary online development roles may be defined:

window team members developed the window-specific functionality. Their role was biased towards consuming rather than providing common object behaviors, although there was some degree of the latter.

object model team members developed complex behaviors in the common object model; they also performed quality and consistency reviews for object model behaviors implemented by window developers.

frameworks team members developed the overall architecture mechanisms, providing structure and default behavior for the entire application.

server team members developed common data access and service routines on the server.

Architecture roles must be defined to support this greater degree of specialization. One engagement used the following partitioning strategy:

Functional architect-responsible for resolving decisions for what the system should do. This person is ideally a user with a solid understanding of systems, or a systems person with a good understanding of, and relationship with, the users.

Technology architect-responsible for delivering the platform, systems software, and middleware infrastructure to support execution, development, and operations architectures.

User interface architect-responsible for setting direction of the user interface metaphor, layout standards, and integrated performance support (IPS).

Application frameworks architect-responsible for designing, delivering, and supporting the application framework that provides the overall structure, or template, of the application.

Object model architect-responsible for identifying and resolving modeling issues necessary to achieve a high degree of business reuse and modeling consistency.

Note that the last two roles are especially unique to object-oriented and component-based systems. This means these architects have a learning curve to simply understand what their role means in the organization. Furthermore, the architecture roles require the deepest technical skills and should be staffed with the more experienced resources on the project.

One must be very careful in ensuring that application frameworks are not "over-architected". Experience has shown that many frameworks fall by the way-side for the simple reason that they were not built closely enough in conjunction with the application development. They become too theoretical, complicated and over-engineered making them performance bottlenecks and obstacles to simplifying the application architecture. It has been found that frameworks should "fall out" of the application domain as candidates become obvious. Experienced developers that work closely with the application can quickly identify repetitive constructs and abstract useful frameworks from this context.

Data and Object Model Architects Must Clearly Define Their Roles

One issue that must be resolved early on is the relationship between the role of the data architect and the object model architect. In traditional development environments data architects produce deliverables such as Entity Relationship diagrams. Since an Object Model is a superset of an E/R diagram, it is important to avoid treating the two as separate entities because this can lead to development teams working from two separate schemas. Viewing the object model as the object and data schema is very helpful in solving performance problems later and in promoting an overall understanding of the information schema of the system.

One strategy that has been shown to work is to include the senior data modelers in the object modeling team and give them appropriate object modeling training for their roles. This allows a natural migration of the object model to be the logical schema for the database model. However, this must be carefully managed so that good object model principles are not violated by a strong-minded data modeler who has not transitioned through the paradigm shift.

Greater Collaboration between Roles Is Necessary

Another distinction is the necessary coordination of roles due to the impact reuse has on the organization. In a traditional architecture, modules tend to be larger front-to-back slices of functionality. Reuse is primarily confined to technical services. Thus, functional developers can work independently, relatively speaking. The greater degree of reuse in a component architecture, on the other hand, requires much more coordination of effort.

The organization Structure Must Enable Specialization and Collaboration

Component development requires a more sophisticated organization structure to support the increased specialization and collaboration of roles. Specialization is generally more important because more is being custom created-and less of the answer is codified as a proven solution. As noted above, well-defined roles are also important to ensure reusable components fit together.

At the same time, the structure must enable adequate collaboration of team members. Too many specialists may result in an organization that requires extensive coordination to deliver anything—e g., a completed window. The organization must then strike a balance between "vertical" partitioning by function and "horizontal" partitioning by architecture layer. This is a classic management problem at an enterprise or project level.

Vertical Partitioning by Business Function Better Supports Collaboration

Figure 45:
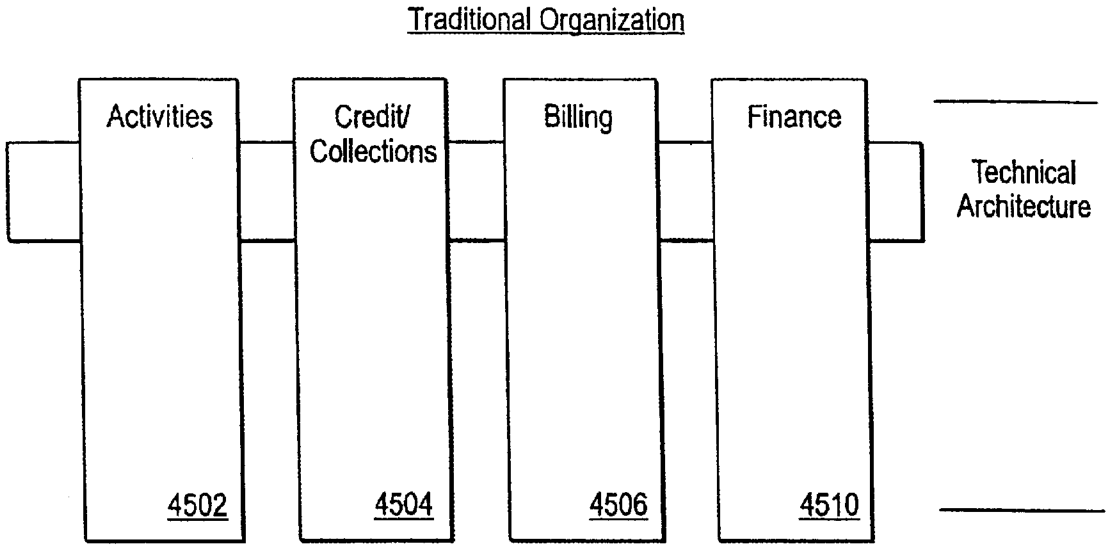
FIG. 45 illustrates a traditional organization structure including an activities component, a credit/collections component, a billing component, and a finance component.
Figure 46:
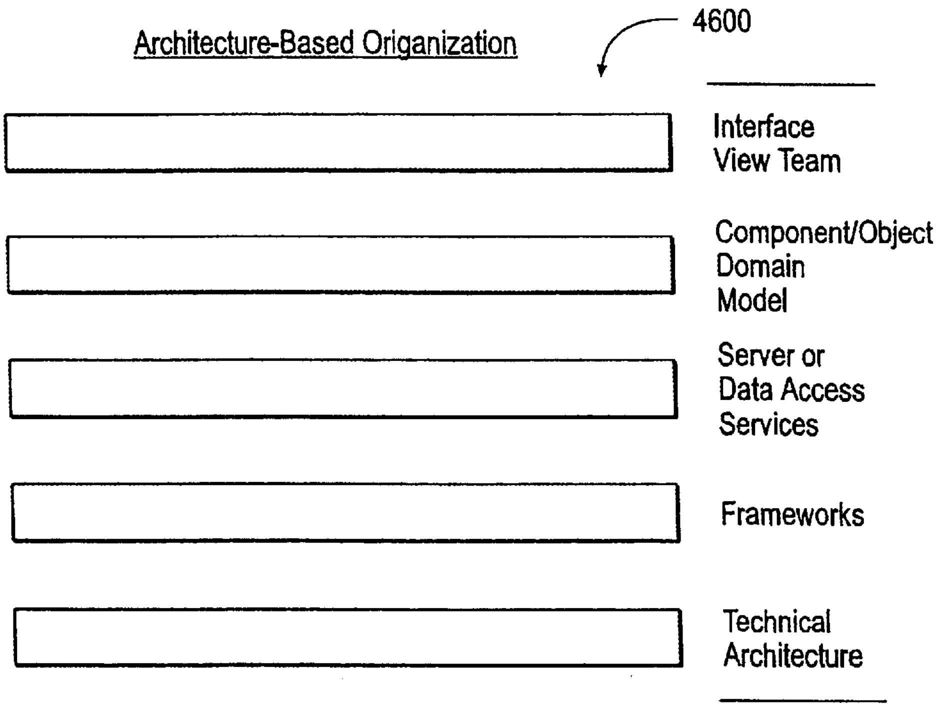
FIG. 46 provides an illustration of a horizontal organization model.

FIG. 45 illustrates a traditional organization structure including an activities component 4502, a credit/collections component 4504, a billing component 4506, and a finance component 4510. This traditional organization for most projects is vertically organized based upon business function with a technology architecture team. In this organization model, there would be one or more developers that are responsible for building a business function end to end. This works well for the following reasons:

aligns well with the business process and software decomposition enables clear work direction—i.e., complete a window or report, front-to-back ensures that complete functions work in an integrated, end-to-end fashion teams better align to application releases However, there are several potential shortcomings with this approach for an object-oriented system:

may force developers to learn multiple aspects of the framework (e.g., user interface and persistence services) which does not enable as much specialization of skills does not easily support consistency and reuse of business logic does not readily enable cross-function leverage of expertise Horizontal Partitioning by Architecture Better Supports Specialization Several object-oriented engagements have tried an alternative horizontal, or architecture-based, organization. FIG. 46 provides an illustration of a horizontal organization model 4600. In this model, one or more developers are responsible for a horizontal layer of the system. Teams may be organized around layers such as technology architecture, frameworks, user interface, component/object model, or data access.

Figure 47:
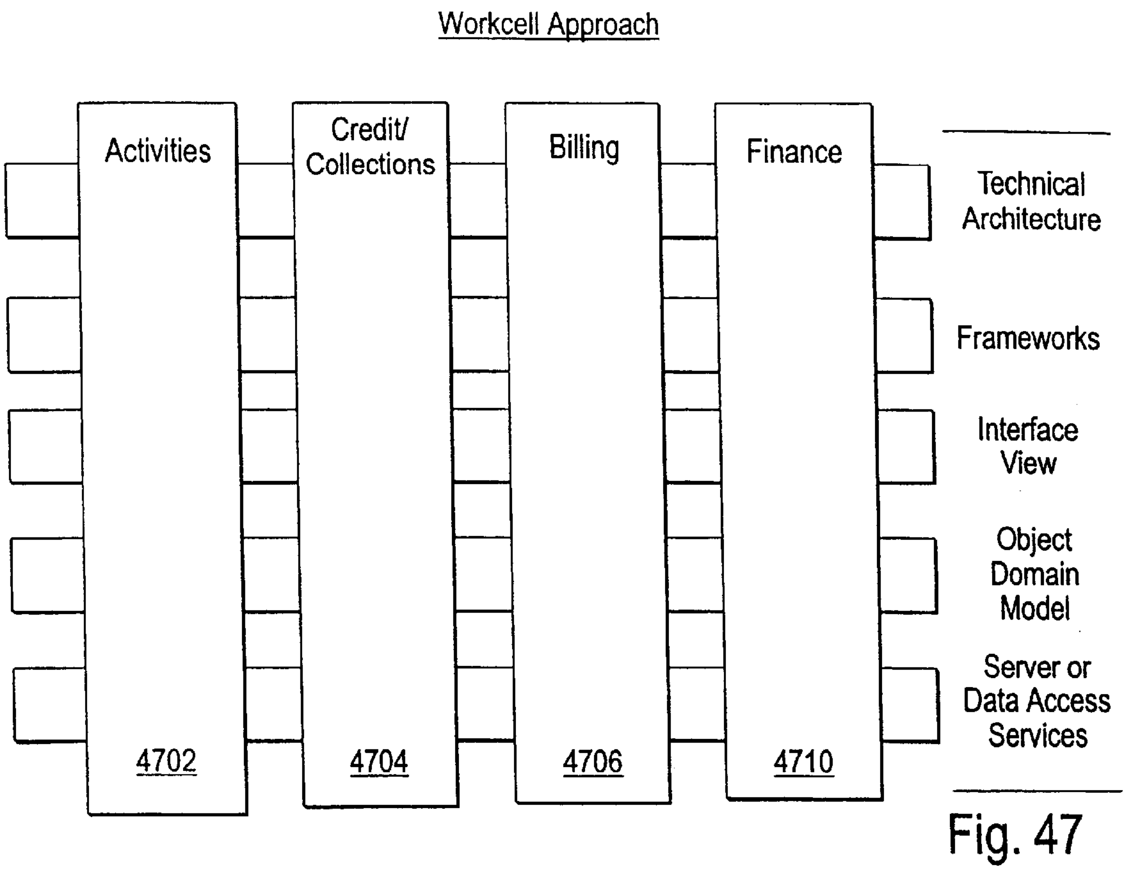
FIG. 47 illustrates a workcell organization approach including an activities component, a credit/collections component, a billing component, and a finance component.

This approach offered the following advantages:

aligned with the object architecture enabled cross-function consistency and reuse of business logic supported developing and leveraging specialized expertise However, the following drawbacks were experienced:

over-the-wall problems in coordinating hand-offs of work amongst multiple developers providing work direction to people became more complicated since they were poorly aligned with the business problem managing completion of business functions becomes nearly impossible A Workcell Organization Combines the Two Approaches FIG. 47 illustrates a workcell organization approach including an activities component 4702, a credit/collections component 4704, a billing component 4706, and a finance component 4710. This approach combines the two previous approaches into a workcell. The primary orientation can be aligned either way, but a functional orientation seems more natural for a business application. A cell is comprised of a complete set of specialized skills such as functional analyst, object modeler, application architect, and even user. Cross-cell architects then provide specialized direction for a particular role.

This approach, while adding complexity to the organization structure, has been used successfully on a number of engagements, and has been shown to combine the benefits of the two approaches. Of course, a drawback is simply an added level of organizational complexity—e.g., individuals at times taking direction from two different people.

Additional Effort Is Needed to Ensure Consistency Across Workcells

Additional effort is needed to ensure that each workcell develops application components in a consistent manner. It is important to define development standards and entry and exit criteria for all workcells. In addition, it can be useful to have a single person or group perform design reviews across the project.

A workcell's architect or frameworks developer can also help application developers better understand the architecture and use it consistently. Furthermore, the workcell architect serves as a good channel to feed new requirements—based on the application developers experiences—back to the architecture team.

Management May Need to Plan for at Least One Major Reorganization

The most effective approach depends on the team size, relative experience, and even the phase of the project. The dependence on development phase implies that management may need to plan for at least one reorganization. Unfortunately, re-organizations create significant team disruption, which must be considered.

Workcell Organization May Be Influenced by Other Factors

Some additional guidelines include the following:

- Larger teams generally need to favor increased specialization, because they may almost always have a higher proportion of inexperienced developers. Thus, the specialized model supports developing areas of competency.
- Early in an engagement more specialization may be required as an infrastructure of common components and frameworks is constructed.
- Once components are stable and integration of functionality is more important, then a collaborative, functionally-aligned or workcell organization may make sense.
- The higher degree of custom development required in the architecture, the more specialization of skills is necessary; likewise, the more stable the architecture, the less important is specialization in favor of supporting collaboration
- Complex, non-standard problems that cut across domains lend themselves to increased collaboration. On the other hand, more standardized problems can be solved with the specialized model. This experience is also consistent with management research of macro-organizations for an enterprise.
- Workcell alignment may be influenced by the needs of the client. If the client's objective is to develop a highly reusable business component model, then it may be appropriate to have a single team focused on developing the component model. On the hand, if the client is most concerned about delivering business functionality, workcells should be aligned by business function.

The Organization Must Support Informal Structures

Whatever the formal organization, the project must enable extensive informal communications. Component development requires a tighter coupling between functional and technical design, because more commonality is incorporated into the architecture as common services. Thus, few important decisions can be made solely by one group within the project.

One large engagement combined several different strategies to ensure effective communications across organizational boundaries:

- cross-cell weekly integration meetings were used to discuss and resolve low-level issues of global concern
- temporary, cross-cell teams were formed to address many special issues—e.g., integration with an external system, an approach to handle addresses, etc.
- temporary scout teams were formed to pilot the approach for a global change before rolling out to the entire team—e.g., the migration approach for moving subsystems into system test.

It's also important to consider the importance of informal sharing of information when many developers are undergoing training or there are global architecture changes underway. Geographic splits of a team can cause special problems.

Roles are Changed for Personnel at Multiple Levels

There often is not a direct mapping to the traditional roles that individuals expect. Analysts and Consultants may be given tasks with less creative freedom than they expect. For example, an Analyst role may involve less custom coding and more reusing, assembling, and testing of components. Design tasks for a new Consultant may also seem overly restrictive, because the challenge is to do things in a much more consistent, standard manner as dictated by the framework.

On the other hand, because everything is often so new to the entire project team, in some ways everyone is starting together from scratch. Thus, in a few cases, very talented Analysts with prior component experience have assumed lead technical design roles.

Traditional Hand-offs Between Designer and Coder Are Problematic

The way roles work together is also different. For example, because of the iteration and coupling required between design and code, hand-offs from designer to programmer generally do not work well. One scenario used to leverage skills involved a lead designer creating the design, prototyping the solution, and stubbing-out methods with comments. The details were then flushed out by a junior developer. Leveraging by review and mentoring has also been key.

Summary

Crafting an organization structure for a component-based project involves balancing many complex factors. The most effective approach may depend upon the size and skill set of the team, the architecture structure and stability, and even the type of the application. Some additional considerations include:

- Regardless of the chosen organization, care must be taken to ensure walls do not build up between teams
- People's behavior may be influenced by the organization; that is, research has shown that the organization model may be reflected in the software architecture. For example, one engagement experience may shown that individuals may allocate behaviors to inappropriate components to avoid having to collaborate with other developers Workcells combine the benefits of horizontally and vertically aligned organization structures, and have been used successfully on a number of engagements.

Planning and Managing Development

This section discusses strategies for managing a component-based development process. Two alternative development strategies are:

- Waterfall approach
- Iterative approach

Much of the one's experience may be with large, mission-critical projects. Moreover, large projects introduce additional, inherent complexity. Therefore, these issues may be discussed primarily from a large project perspective.

A Tension Exists between the Waterfall and Iterative Development Models

The Waterfall is the Traditional Approach to Managing Software Development

Systems development traditionally relies on a waterfall model. This approach manages development in sequential phases of activity such as analysis, design, code, and test. The waterfall model provides a controlled, orderly process for developing a system. Work is sequenced to ensure that the design addresses the correct requirements, implementation is based on upfront design, and system testing verifies and validates thoroughly unit tested components.

Despite these benefits, the waterfall model introduces potential problems. For example,

- Requirements may be difficult for the user to understand without prototyping the user interface or functionality
- The design team may not be prepared to specify an effective design without gaining implementation experience
- A team may not be positioned to generate reusable components for itself, unless a team works ahead to construct an architecture or component model during the design phase Iteration Helps a Team Address Risks and Gain Experience Because of the above shortcomings, much of the OO and component community recommends some variation of iterative development, in which analysis, design, and coding activities overlap to some degree. A theme in these variations is the need to address risk by proceeding further in development sooner. Both the gained information and experience can influence the approach taken in the current phase. However, iteration also has drawbacks. The team may slip into hacking, by simply skipping design before coding. Or, a team may use iteration as an excuse to not exercise due diligence in completing tasks. Defining and estimating milestones is also hard.

A Project Must Weigh the Tradeoffs between Waterfall and Iterative Models

Thus, a tension exists. The waterfall promotes discipline and control in the development process. In contrast, iteration proves out assumptions, gains advance experience, and addresses risks. Balancing these conflicting goals is difficult on a large scale.

Distinguish between the Macro and Micro Process in the Workplan

Both the waterfall and iteration have pros and cons. A hybrid capitalizes on the advantages of both. If they are merged, one or the other must inevitably dominate the structure of the high-level project plan. That is, the plan must start somewhere—either by defining iterations or waterfall-like phases of completion.

For example, defining iterations of the system or subsystem would result in high-level project phases such as:

- first working version
- refined working version
- final, released working version In contrast, a more traditional waterfall structure would result in high-level project phases such as:

- requirements definition
- preliminary design
- detailed design and/or coding
- testing A macro plan reflects the high-level development phases The micro plan shows the tasks of a specific phase or team.

Distinguishing between a macro and a micro process provides a practical compromise. The pure, traditional waterfall has no distinction. There, the entire workplan and accompanying development approach sequence analyzing everything, then designing everything, then coding and testing everything, with no overlap. The same uniformity between macro and micro processes applies to a pure iterative model. In this case, the workplan reflects multiple iterations of the entire application. However, in either case, such extremism is not necessary. Instead, a plan can merge the two approaches by distinguishing between the:

- macro, high-level plan, and
- micro, phase or team-specific plan.

In summary, an exclusively waterfall or wholly iterative model are, independently, too simple. A balance is required. Distinguishing between the macro and micro process gives management the intellectual freedom to craft a workplan that reflects a mix of the two styles. The downside is that this introduces significantly more effort and complexity in the planning process.

The Macro Process for Large Projects Should Be Waterfall In Nature

Managers Are Averse to Iteration, because It Expects Re-work, Ipso Facto

The previous section laid out two alternatives for combining the macro and micro process. For large, custom development projects, experience has shown that defining the macro process along the lines of a waterfall structure is most effective. Client and firm project management are typically uncomfortable with defining milestones and estimating work with iterations. The common statement is, "How do I know when I finished the current iteration?" This concern is valid—on a large-scale, "complete" can be difficult to define. In addition, most managers have trouble embracing a process that expects and even allows mistakes on such a large scale.

Iteration Does Not Scale Well Due to Communications Overhead

Aside from these psychological considerations, large projects introduce significant risks due to the complexity of coordination. A large team has a much greater inertia, because of the time delay and errors introduced in human communications. Any change takes much greater effort and time to implement. Correspondingly, once made, changes are more difficult to reverse. Greater reliance on documentation is often necessary to avoid miscommunications.

Many decisions must then be considered from the vantage point of their ease of communication. This complicates iteration. For example, if analysis, design, and code overlap extensively, then by definition, requirements and design change later in the process. Communicating wide-scale changes late in development can be inefficient, wreaking havoc on existing code. Thus, iteration does not scale well to the macro level, because of communications overhead.

It's important to re-state, however, that a pure waterfall introduces many problems for component development due to its intrinsic reuse and newness. Thus, many of the lessons below emphasize variations of iteration and how they can be merged with a waterfall approach.

Incremental Development May Help Manage Scope and Risk

Incremental Development Partitions the System Roll-out into Releases

Perhaps the most effective way to mitigate the risks of a large project is to simply avoid being large. Incremental development addresses risk by reducing the necessary team size and scope. "Incremental" and "iterative" development are often used interchangeably, but they are different approaches.

Incremental development partitions the system roll-out into successive releases. For example, the initial release of a customer system might comprise order processing,. followed by a subsequent release for billing, and a third release for collections processing. Thus, incremental development adds new functionality, while iterative development continuously refines existing functionality.

Incremental development is often more palatable to managers than iterative development, because there is no explicit notion of repetition. Yet, the desirable benefits of iteration are often realized. For example, releasing consecutive versions of the system creates the opportunity, and often the requirement, to refine the initial release. The early implementation experience can also provide important productivity benefits for subsequent releases. This experience may also help drive out technical requirements for future releases, improving the analysis and design process.

Incremental development avoids the complexity of a big bang integration. Furthermore, although an incremental approach delivers less in each successive release, it can deliver higher priority portions of the system much earlier than a traditional approach, thereby recognizing business benefits in a shorter time frame.

Despite these benefits, incremental development is not a panacea. Many times a big bang conversion has proven necessary, if the cost and risks of having parallel systems and bridges, performing conversion, and rolling out training are high. These costs must balance those introduced by the delayed delivery of business benefits and the risks implied by increasing scope and team size. The urgency of the business and the desire to manage development size may sometimes favor an incremental approach.

Incremental Development Can Also Apply to a Single Development Release

Even when incremental development does not prove feasible for entire application releases, the approach can be effective on a smaller scale. For example, the development and release of a single application may require extensive integration of diverse behaviors in a reusable domain component model. The domain components must be put in place early to allow reuse; then, behaviors are incrementally added as the business use cases are analyzed and designed. As in the previous case, iteration naturally occurs; but, again, incremental proves to be a more acceptable metaphor.

Enable Top Down and Bottom Up Development

Different Categories of Tasks Should Proceed at Different Rates

Whether applying a more waterfall, iterative, or incremental process, the dependencies between tasks require careful consideration. Different categories of tasks need to proceed from problem-definition through solution at different rates.

Figure 48:
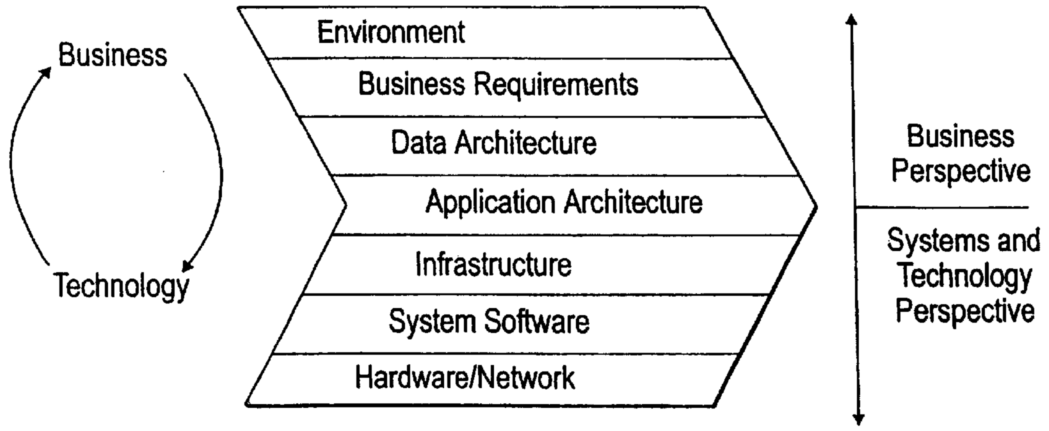
FIG. 48 illustrates the Enterprise Information Architecture (EIA) model.

FIG. 48 illustrates the Enterprise Information Architecture (EIA) model 4800. This model adapts to component terminology, with the relatively minor change in layer five from data architecture to domain component model.

Both Top-down and Bottom-up Models Are Necessary

This model incorporates the idea of simultaneous top-down and bottom-up development. Much development effort may follow a relatively top-down, sequential approach. This includes analyzing and designing: the business environment and processes, domain model, and then application. Concurrently, an architecture effort proceeds bottom-up. This builds: the technology architecture of platform system software, hardware and infrastructure services; and then application architecture, or frameworks. Top-down and bottom-up efforts then conceptually meet in the middle, integrating the application framework with the application.

Both the Architecture and Component Model Lead Application Development

The need to start architecture implementation early is well-understood for traditional or component-based client/server development. What is different with component-based development, however, is the need for the component model to lead the application and user interface development.

Starting the component model early is essential to enabling reuse of a consistent, cross-functional set of business components. These core domain components must be defined early, at least in preliminary form. Otherwise, the simultaneous integration of functionality from many windows or reports would be extremely chaotic. In addition, developers may implement business logic in the user interface layer, rather than in the business components where it can be reused. Furthermore, early design of the component model before user interface logic improves the odds of creating a pure component model, decoupled from the interface.

Design Efforts Should Focus on Component Interfaces

Interfaces are the contracts for the services that a component provides. Clients of a component are concerned with what the interface specifies, not how it is performed. It is the interface provider that is concerned with the implementation. By correctly defining interfaces during design, it is becomes possible to independently develop components. When interfaces are changed, component assembly becomes much more difficult and rework is often required. Thus, design efforts should pay additional attention to the completeness of interface specifications.

Architecture Development Must Start Early

A Tension Exists between Use Cases and Frameworks

As with client/server, architecture work must start early. As noted above, this is particularly challenging because of the level of application reuse in a well-designed application framework and domain component model. Because of this reuse, the framework must be heavily driven by application requirements, or use cases. Yet, the architecture team must stay one step ahead of application development teams to ensure that the architecture and component model are ready in time to be reused. Thus, a difficult tension exists between use cases and frameworks.

The tension between use cases and frameworks can be simplified to the extent that third-party or standard architectures such as Eagle can be leveraged. In addition, experienced architects may bring their knowledge of which services are common across applications and can be addressed earlier than application-specific architecture services. In any case, the following guidelines should be considered, particularly for custom architectures:

The architecture should be defined and prototyped, if necessary, early in the preliminary design The architecture should be complete—at the very least, the development architecture and overall framework, prior to developers actually coding; the design must be in place earlier when functional developers start detailed design; private architecture aspects' may be deferred Time must be planned for architecture support based upon unforeseen use cases, performance tuning, documentation and developer mentoring Developing a custom application framework should be estimated as a set of tasks in addition to much of the traditional technology architecture development Failure to Develop the Architecture Early May Reduce its Efficacy If the architecture is not completed ahead of the application, developers may have the tendency to build architecture services in the application layer. Clearly, this may lead to diminished reusability and more difficult maintenance. By defining the architecture services early and communicating them clearly to the application teams, these problems can be avoided.

A related problem with object architecture and frameworks is that the line between the application and architecture can become blurred. These architectures may provide so much common functionality that it is difficult for teams to distinguish who is responsible for what. For example, it may not be clear that a function should be provided by the application architecture team, technology architecture team, or application team. This problem can be resolved by better communication and coordination across teams. Workcells are one approach that has proven effective in this area.

Component-based Development Requires More Granular Milestones

The Macro Process Uses Traditional Milestones

The milestones used to track the macro process generally remain the same as for traditional systems lifecycles. Project management may still be interested in monitoring the progress of high-level milestones such as the start and end of design, or the start and end of construction.

The Micro Process May Use More Granular Milestones

On the other hand, the micro process may have more granular milestones than traditional systems. Whereas a business function in a traditional system may be composed of single front-to-back module, a component-based system may provide the business function using several collaborating components. Thus, component-based systems inherently have more work objects to track. While the increasing number of work objects may seem to be a management burden, it can provide a more fine-grained reading on the development process.

Another difference from traditional systems is that milestones may be more oriented around elements of the systems (windows, business components, and architecture components), rather than business functions. Furthermore, some types of milestones may be more important than others. For example, if there is a significant amount of functionality in the business components, then there may be more milestones associated with the business components than with the user interface.

The Micro Process Should Vary with the Type of Development Role

The Micro Process Must Compliment the Macro Process

Assuming a waterfall-like macro process, as described above, the challenge of the micro process is incorporating an effective level of iteration into this management framework.

Different roles for team members require different development methodologies. For example, possible roles are:

Application developer—responsible for implementing a particular business function, such as accepting bill payment. This focuses on the application-specific design and implementation tasks such as: working with a user to define requirements or use cases, designing the user interface, and implementing application functionality.

Component Model developer—builds, refines, and supports the core, reusable business components in the application.

Frameworks developer—responsible for the application and technology architecture that provide common services and control logic for the application.

These roles do not necessarily correspond directly to organization assignments. Whether these roles formalize as teams, identities within a workcell, or possibly different hats a single person wears is an organization decision that depends on the project size, individual skill sets, and other factors.

Within the Micro Process, More Parallelism Can Be Achieved

At the micro-level components make it more reasonable to execute more development tasks in parallel. Components enable this by providing more discrete work objects that are more clearly separated by their interfaces. Because interfaces are the contracts through which components interact, the internals of a component can be developed independently as long as the interfaces are respected.

Dependencies on Shared Components Need to Be Managed

On the other hand, since some components may be reused throughout the application, it is a good idea to start them earlier to provide a solid base for the rest of the system. Thus, a greater dependency on certain reusable components may require additional planning effort to correctly sequence the work.

Application Developers Can Follow a Relatively Formal, Sequential Process

A significant portion of application development can execute in a sequential manner. This excludes the development and maintenance of the core component model and application frameworks discussed below. For the application developer driving out requirements, design, and implementation of window functionality, development can proceed very similar to that of a traditional, client/server GUI project. Particularly early in development, many aspects of the methodology can be very similar such as CAR (Control Action Response) diagrams.

During implementation, detailed design and coding steps may overlap. However, the rules and guidelines for sequencing these should be spelled out in rigorous detail. Note that this does not imply iteration per se, although that may be a desirable side-effect if controlled. Rather, this approach merely suggests tactically interspersing the design and code activities, particularly to aid in- experienced developers in transitioning from design to code.

Define Concrete Milestones with Short Intervals

An important difference in managing efforts with this type of overlap is the need to define much more concrete milestones with shorter intervals. This is necessary because a detailed design or coding phase definition loses meaning if they overlap extensively. Milestones represent more concrete, visible accomplishments, such as:

all basic layout and behaviors designed; complex behaviors identified, but not completely designed view and application model integrate with domain model window opens data access from server coded and tested full detailed design of special processing or complex behaviors complex behaviors coded and tested Incrementally Add Behaviors to the Reusable Component Model A previous point emphasized starting the component model development early, because many of these components are reused in many business functions. Thus, their preliminary structure must be available before multiple windows require their use. This implies that many different behaviors may need to be continuously integrated into these components over and over. The component model development, then, is very much event-driven like a factory.

Incremental Is a Good Term for Continuous Integration of Behaviors in the Component Model The salient feature of this development style is that behaviors are incrementally added to the reusable component model throughout the development. Iteration and refinement often occur naturally in this process. However, incremental proves to be a more acceptable term for management.

When developing in this fashion, tracking status is difficult. Management traditionally tracks status by number of windows or reports complete. Yet, in this style of development, the windows complete may fluctuate dramatically. Some windows may not achieve completion until very late in the project, when the component model stabilizes. Yet, many behaviors may indeed have been completed. This creates an illusion that the project is further behind than reality. More sophisticated status tracking is therefore needed.

Iterate to Address Risks or High Degrees of Uncertainty

Prototypes "Buy Information" that Reduces Risk

Iteration is required to address risks involving a high degree of unknown. These risks tend to increase with component-based development, primarily because of its novelty. Thus, the need to iterate is often less intrinsic to component-based development and more related to challenges naturally resulting from unfamiliarity. What is now "traditional" client/server development faced similar difficulties years ago.

In some cases, this unknown requires experimentation. For example, a throw-away prototype has the explicit intent to "buy information" for reducing risk. Prototypes are a special case of iteration involving less commitment to salvage the work. Whether the prototype is salvaged or not becomes less relevant, because the primary value is in the information obtained in the process.

Several different categories of risk require iteration. None of these are unique to component-based development But they tend to be more important with component technology because, again, so much of the underlying technology and methodology are new. Some of the types of prototypes are (These are similar to other definitions):

usability, or user interface prototypes performance prototype proof-of-concept prototype pilot process prototype These categories may be addressed with throw-away prototypes, initial working models which are later refined, or some combination. Use of "prototype" below generically refers to either style.

User Interface Prototypes Help Users Understand Requirements

User interface prototypes address the difficulty that users have in defining requirements without implementation examples. This phenomenon is analogous to the Heisenberg Uncertainty Principle. This law of modern physics states that the simple act of trying to observe the position or velocity of electrons affects the result itself. Likewise, users' perceptions of their requirements may be changed, sometimes dramatically, by observing examples of the potential solution. In many cases, these prototypes have been used as a standard design deliverable with repeated review and refinement with the user.

An important consideration, however, is scope control. There is a very complex management problem when iteration is used to drive out requirements with users. Experience has shown that users may assume that exploring an alternative implies that the functionality may be implemented. Thus, some change control procedures need to be defined and managed, even if they do incorporate some flexibility to incorporate enhancements.

Performance Prototypes Address Global Architecture Issues

Performance prototypes primarily address technology architecture questions. For example, the architecture team may need to decide early on whether to use messaging, remote procedure calls, or shipped SQL statements for distribution services between client and server. A prototype is often the only way to identify the most effective solution.

Proof-of-concept Prototypes Address Complexity

Proof-of-concept prototypes address areas of significant technical or functional complexity. In the most extreme case, the team may be uncertain as to whether they can even develop the logic within the specified quality parameters. Or, it may be too difficult to design a solution upfront, because of a mix of technical, functional, and maintainability issues. In such cases, the team may need to implement alternatives for evaluation.

Pilot Process Prototypes Provide Experience for the Team

Pilot process prototypes are used primarily for the team to gain experience. They typically use a front-to-back, slice of the application. This is similar to incremental development, which delivers the solution to a portion of the business functionality. Such learning benefits are not unique to pilot prototypes. The distinction of a pilot prototype, however, is that gaining experience is the primary purpose of the effort. The learning may focus on technology, business function, or methodology.

Confine Highly Iterative Tasks to Experienced Framework Developers

Iteration demands very experienced developers, to understand the criteria for completion. Thus, tasks that require a very high degree of iteration, such as technical prototypes or development of reusable components, should be confined to a small team of experienced developers. These individuals usually comprise the architecture frameworks team.

One heuristic is to staff the frameworks team with the most experienced component developers, comprising about 5–10% of the total team size. There is another reason to allow the most skilled developers to iterate more—research has shown that very experienced software developers naturally work more productively this way. Thus, productivity for very talented architects may increase when given freedom to iterate as necessary. On the other hand, anecdotal evidence tells us the opposite is likely true for inexperienced developers.

This is not to say that application developers should never iterate—it's really a question of degree. One approach is to use selected application developers on scout teams that form for one-time efforts and then disband. These efforts may, for example, address an initial pilot process or other type of prototype mentioned above. Even then, these efforts are usually best coordinated by an experienced developer, presumably from the frameworks team.

For Difficult Tasks Plan Three Iterations

For those aspects of the system that require iteration, the question still remains, How do I know when I am done? Experience has shown that three iterations are usually required, for example:

design and develop initial working model refined working model and pilot roll-out and support The need for three iterations has been observed in so many cases that some consider it a magic number. For example, the three iterations defined above parallel very closely a maxim quoted by Kent Beck, a well-known Smalltalk expert, Make it run, make it right, make it fast.

Difficult Components Should Be Designed and Then Prototyped

An initial working model phase designs and prototypes the component or framework. Prototyping may be necessary to evaluate two or three alternative approaches. In these cases the initial design represents a strawman, until receiving validation from implementation. Only then can things be finalized and reviewed for sign-off.

Piloting Reusable Components with Developers is Necessary

During the refinement and piloting phase, the component or framework is completed with any remaining functionality and then used in a pilot case. Coordination is often necessary with a pilot developer who is a client of the reusable piece, to ensure that it works in an appropriate use case. Typically, the pilot process generates several refinements or changes. Pilot developers need a flexible, positive attitude to handle potential instability.

The component must then be documented and rolled out for reuse to all developers. In many cases, the roll-out requires a formal group meeting to answer questions.

During the support and refinement phase, the component is refined as other use cases generate new requirements, and bugs or performance problems are identified. Although the implementation details of the component should not be widely known, it is critical that developers thoroughly understand the purpose and public behaviors of the component. If they do not, then they may not be able to effectively reuse and debug interactions with it.

Summary

A traditional client/server implementation often incorporates some limited iteration with a waterfall approach. This iteration is usually confined to technology architecture tasks. Component-based systems tend to require somewhat greater iteration for three key reasons:

Reusability often requires actually reusing the component to ensure the reused piece meets requirements Component technology is new, thus iteration helps address greater technical risk Component skills and methodologies are emerging, therefore the team often gains valuable experience from iteration Managing iteration is difficult but possible. Usually the plan must incorporate a hybrid of waterfall, incremental, and iterative models as appropriate. The right process depends on the organization or teams' skills, the degree of technical risk, and the specific application and business requirements.

Testing

Testing typically consumes anywhere from 50–80% of development effort. Despite this relative importance, testing receives little emphasis by component-based methodologies, which focus primarily on analysis and design techniques. This section presents testing lessons consistent with the primary themes in The Testing Process Practice Aid, produced by the Re-inventing Testing Project. These points merit increased emphasis, however, because experience has shown component-based systems increase testing complexity.

Testing Is More Complex

While a component-based approach may be simpler to test than a strictly object-oriented approach, testing is still more complex than a procedural system, because component architectures:

decompose into a much greater number of components than equivalent procedural modules, introducing more complex technical integration achieve a greater level of reuse, which is a blessing once highly reusable pieces stabilize, but remains a substantial challenge while they undergo development utilize flexible, messaging between components that creates a larger number of potential test execution paths usually develop with some degree of iteration, which jeopardizes the benefits of phase containment Testing Requires More Phases The Testing Process defines a three-step process, very similar to traditional Method/I, as follows:

component test—a test of an individual module or program that is specified and coded as a single unit assembly test—a test of a set of programs that communicate with each other via messages or files, usually equivalent to a user interface dialog or a batch string product test—a test that verifies the technical and functional implementation supports the business process Object Systems Require an Initial Atomic Test Phase When building components using objects, testing can logically follow these same three primary phases, at a high level, preceded by an initial atomic test phase. An atomic test phase is required because a well-factored object system may typically have at least 10 times more objects than procedural modules in a traditional system. This finer granularity requires testing and integrating more units at multiple levels.

Completing a Window Requires Several Stages of Component Test and Integration

A traditional approach often defines the initial component (unit) test as a working window, front-to-back. In a component-based architecture, on the other hand, a window may often utilize behaviors of several components. This results in too much integration for an initial component test. In fact, several stages of integration must occur to complete a single window.

Consider a customer that encapsulates other related components such as credit profile and address. This customer aggregation even represents too much functionality for an initial component test. Simpler components such as the address must be tested first. Testing individual components or tightly coupled aggregations should occur in the initial component test phase.

The assembly phase then tests the integration of these components. This test phase differs from a traditional assembly test, because more components must typically be integrated, particularly for the vertical, front-to-back functionality from window to database. This adds to the horizontal integration of interdependent windows in a dialog. In contrast, a traditional assembly test concentrates much more heavily on the horizontal dialog test, since the front-to-back window functionality is often just a single module.

The timing of the assembly test may vary depending on the development teams organization. If there are a number of developers working on a functional slice of the application, then early integration helps to ensure that developers are working in concert and simplifies integration later. Conversely, the issues of integration may not be as significant if a single developer is working on an entire business function, end to end.

In summary, the collective atomic, component, and assembly test phases require much more detail in terms of milestone definitions, status tracking, and methodology development.

Testing Component Collaborations Must Occur in Several Phases

The process of testing and integrating behavior of collaborating components must occur at multiple levels. In particular, distinguishing between the component and assembly test phases can seem somewhat arbitrary. A well-factored architecture may have identifiable boundaries, however, as noted above. Thus, coming up with good definitions of aggregation—that is, cohesive groups loosely coupled from other groups, is equally critical to testing as to design. The component aggregation must then support an effective partitioning of the application architecture and team organization.

Testing Requires a Flexible Organization

On large projects, the set of components involved in a business event are often developed by many different people. Thus, the complexity of team integration further complicates the testing effort. Well-defined component boundaries in the software and organization are certainly key. However, the organization must expect the need to support flexible integration testing teams that form to ensure a particular business function works correctly across partitions.

Testing Effort Shifts Earlier In Development

The System Test Phase Should Go Faster

The implications of greater modularity and flexibility discussed above increases complexity in the atomic, component and assembly tests. Once the architecture and highly reusable components in the component model stabilize, however, system test is simplified. Thus, component-based systems require shifting testing effort earlier in the development lifecycle.

Phase Containment Requires Greater Attention

Figure 49:
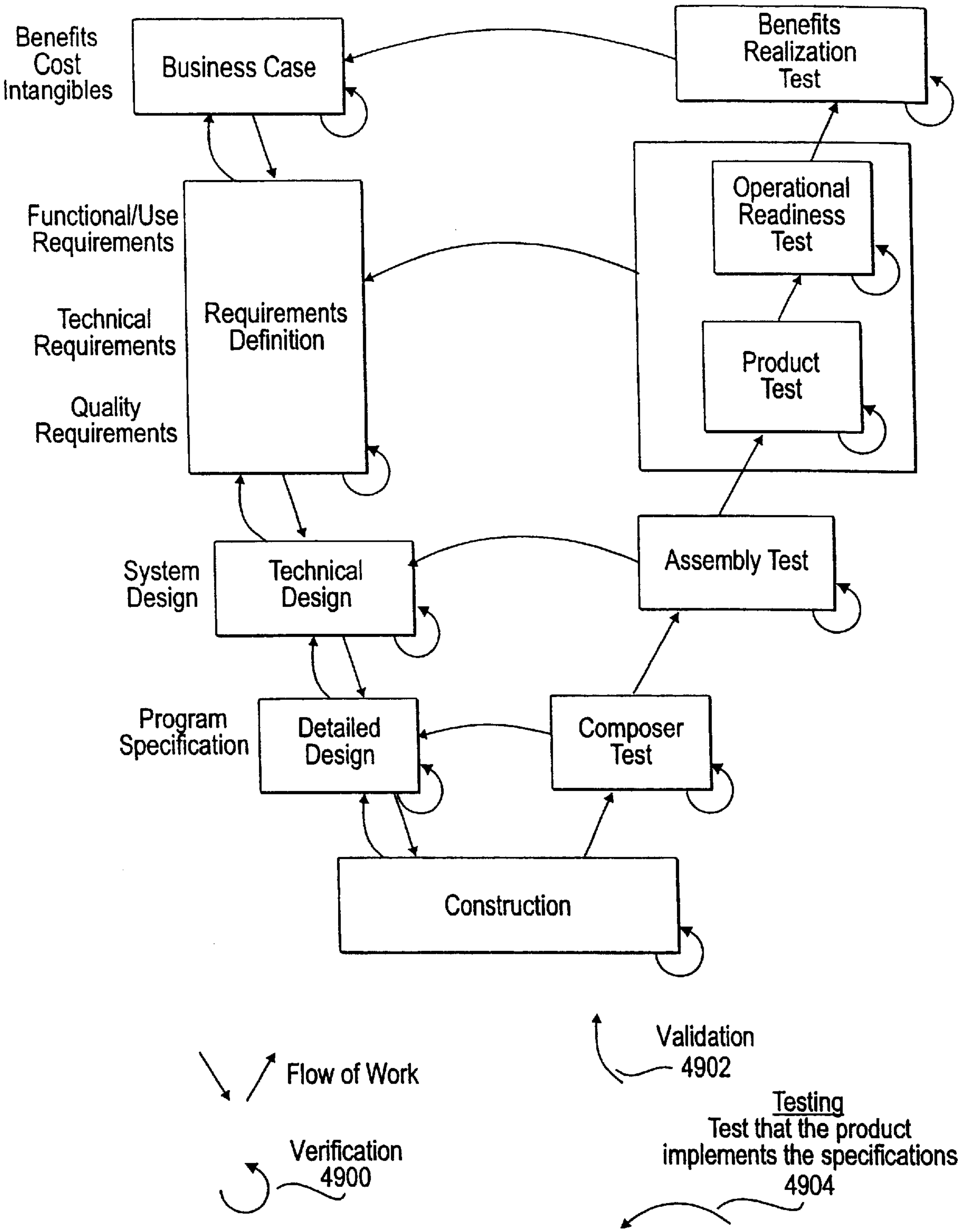
FIG. 49 illustrates a V-model of Verification, Validation, and Testing.

Experience has shown that defects become increasingly more expensive to fix later in the development cycle. Phase containment strives to decrease both the number and cost of fixing errors, by testing steps early in the development lifecycle through verification and validation of work. FIG. 49 illustrates a V-model of Verification 4900, Validation 4902, and Testing 4904. Exit criteria might involve, for example, compulsory detailed checklists or code reviews before work is promoted to the next phase.

While phase containment is not unique to component development, its importance is heightened. Since many portions of the component model may be reused by literally every window developer, quality is critical. That is, a high quality design and implementation for core components increase the productivity of every developer; however, the converse is also true—mistakes tend to penalize all developers. Thus, thorough testing and attention to quality in early development steps is important.

Iteration Complicates Phase Containment

Yet, incremental or iterative development complicates phase containment. Phase containment presumes a waterfall model. For example, a module or component should not be passed to a later phase such as coding until the design has been validated and verified. In contrast, overlapping design and code implies coding starts with an incomplete design. This puts at risk any efforts to define precise milestones so critical to effectively track progress.

Iteration Requires More Detailed Exit Criteria

Thus, iteration requires more detailed completion criteria. For example, different iterations of design must have very explicit scope boundaries to ensure that the completion of an iteration is adequately defined. These must be accompanied by strong adherence to proper procedures as components are promoted through various development stages. Even with such efforts, however, experience has shown that later designs tend to impact previously working code. Significant regression testing must be expected, as discussed below.

Automated Regression Testing Is Usually Necessary

Regression Testing is Necessary because of Iteration, Inheritance, and Extensive Reuse Experience has shown that the higher degree of reuse in an component model and application framework makes it very difficult to protect implemented components from subsequent development. Developers must then verify previously tested components as they incrementally add functionality to the system. Automated regression testing can save time by ensuring that areas that are impacted by changes are properly tested.

Moreover, regression testing capabilities are absolutely essential if an extensive architecture framework is developed. Component-based development allows an application framework to abstract both technical and functional behaviors. This greater level of reuse necessitates that the framework evolve with the development of the application. Unfortunately, this implies changing the technical environment of the application even as it approaches delivery. To effectively support these enhancements requires re-testing at many different levels.

Using Objects Increases the Need for Regression Testing

When developing components using objects, regression testing becomes even more important. For example, inheritance often results in sub-classes coupled to their parent. A parent class may have side effects with subtle implications to children, which are difficult to identify for test cases. Experience has shown that even seemingly innocuous changes to a parent can damage previously tested sub-classes.

In general, an inherited feature must be retested in the context of the subclass. Retesting can only be avoided if subclasses are "pure" extensions of their superclasses; that is, if they don't override any methods and do not modify inherited instance variables. Furthermore, test cases usually cannot be inherited when overriding a method. Slight differences in logic and data declarations are indeed enough to invalidate the superclass' test cases, requiring new test definition and input data.

All of the above considerations result in substantial re-testing. Enough so, that a manual approach to regression testing can be extremely cumbersome. In particular, changes to shared components or changes at or near the root class of a deep inheritance hierarchy can have widespread impacts. Thus, automated facilities for testing should be considered a mandatory element of component development.

Combine Automated Testing with an Automated Build Process

Automated testing can also make the configuration management process more efficient. By using an automated test process to verify that the latest version of the application is working correctly, it is possible to give the development and testing teams more stable releases. For example, simple defects such as incorrect interfaces can be detected before the application is even distributed.

GUI Scripting Tools Alone Are Usually Not Sufficient

Capture-playback GUI testing tools have proven effective. However, for many applications these are not completely sufficient. These tools may only re-validate that the application appears to function properly. Experience has also shown that applications may sometimes use widgets or technical elements of the user interface not supported by a particular tool.

Self-testing Features Should Be Built

A more comprehensive testing framework should be considered that incorporates the notion of self-testing components. That is, the component may have behaviors, or indeed contain a tester component, that feeds the class a test suite, and validates the resulting behavior. Note, however, that test components rarely test behaviors of just a single component in isolation, because any meaningful behavior usually cuts across multiple components. The test can still obey encapsulation, though, by testing the group as a single black-box, rather than taking short cuts which may undermine the validity of the test.

Testing Frameworks Requires More Attention

The use of frameworks in component-based systems also increases the complexity of testing. Frameworks add complexity for the following reasons:

- Foreseeing all the uses of a framework is hard a priori. Thus, verifying correct behavior is difficult because the test cases may not be complete.
- The test approach can require extensive scaffolding to support emulating the application intended to use the framework.
- Framework development is usually undertaken early in the project so that it is ready to support application developers. This implies incomplete knowledge of requirements for the frameworks team.
- The stakes are high, because the framework usually provides a reusable structure for many developers.

There are essentially two methods for testing a framework:

- Emulation approach—by building a comprehensive test environment that emulates the application.
- Pilot approach—by using application developers as pilot users in the testing process.

The emulation approach protects application developers from the testing effort, and is generally more consistent with a formalized approach. Not doing so opens the door to rolling out untested frameworks. On the other hand, creating a redundant simulation environment of the application use cases can be expensive.

The pilot approach may be more productive by leveraging real application code. In addition, it encourages training and knowledge transfer to developers. Finally, it helps ensure accurately covering requirements. It is important to use application developers for the pilot, not the architects. This may provide an objective review of the framework's usability. The primary drawback is that it takes a developer away from the application; and, as noted above, may result in frameworks developers feeling relieved from thorough testing. Experience has shown that a hybrid of the two is usually necessary.

Summary

Experience has shown that initial component development projects require more effort in testing. On the other hand, the later stages of testing can be more productive by effectively leveraging encapsulation of components and large-grained components. There is reason to believe that these benefits can be leveraged sooner if the team pays increased attention to testing early in development. Testing should be a part of the entire development process comprising:

- phase containment principles with explicit objectives and exit criteria such as checklists and peer or lead reviews
- automated regression testing capabilities
- self-testing components
- more detailed testing phases and milestones
- comprehensive procedures with disciplined enforcement Development Architecture Considerations This section highlights key messages for development architecture teams in regard to supporting teams and tools within a component based development project.

Building systems that are dramatically more responsive to change require a dramatically improved development architecture.

What does it mean to be more responsive to change? The solutions one builds must be more:

- Flexible. Making it possible to replace or modify application components with minimal impact to the other components in the system.
- Scalable. Giving you freedom to distribute and reconfigure application components to meet the scalability requirements of the client.
- Integratable. Allowing you to reuse the functionality within existing systems by wrapping them as components within the new application.
- Adaptable. Giving you freedom to deliver an application to a variety of user types through a variety of delivery channels with minimal impact to the application itself.
- Reusable. Making it easy to quickly assemble unique and dynamic solutions from reusable components.

Component-based development pushes us forward on all of these dimensions, and although it's relatively immature, we're better off than we were before. Metaphorically speaking, we've climbed very close to the top of the mountain that represents traditional development. The view is satisfactory, but we know there is something better, so now we're climbing the mountain that represents component-based development. We have yet to reach the top, but we're already higher than we were before.

On every component-based development project, teams spend time evaluating and establishing the environment in which analysts and developers create the deliverables. A workbench must be established that expedites the flow of deliverables through the different phases of the project. In component- and object-based solutions, these phases are very connected. This is largely because each subsequent phase tends to be an elaboration and refinement of the deliverables completed in previous phases. In addition, there is a strong desire to link deliverables and requirements from the earlier phases to the deliverables from the subsequent phases.

On a typical project one finds the following tools used in the software development process:

- General diagramming tools: Visio, ABC Graphics, etc. for workflow and operation diagrams
- MS Office: Word class and component specification templates, Excel scenarios, Object Oriented CASE tool: class and component models, component/class specifications, message trace diagrams Database design tools: Erwin, Oracle Designer, etc.

Integrated Development Environment(IDE): Visual Studio, Visual Age for Java, JDeveloper, Visual Cafe Source code configuration manager: SourceSafe, ClearCase An inordinate amount of time is invested in the macro process of how to capture and link information in a way that it can be used effectively through the course of the project (e.g., moving the models from the CASE tool into the source code of the targeted IDE environment). Teams should tackle early the selection of deliverables in each phase and which tool the deliverable may be created and maintained within. In addition, they should determine whether the deliverable is to continue to be enhanced in subsequent phases of the project through the iteration process.

Today's dilemma . . . no easy answers, yet

To realize an environment that enhances the productivity of your analysts and programmers is a challenge for any project, but for projects building component-based solutions, it's even more difficult because of the technology's relative immaturity. You won't find any easy answers, yet.

Generally speaking, the resulting environment gets the job done, but consists of tools that are crudely integrated with no central repository. This results in redundant data and manual cross-referencing. It can also cause problems during the transition from Design to Construction ¾ a gap that's always been difficult to traverse. Other typical concerns include a tool's ability to meet usability, scalability, and multi-user requirements.

Figure 50:
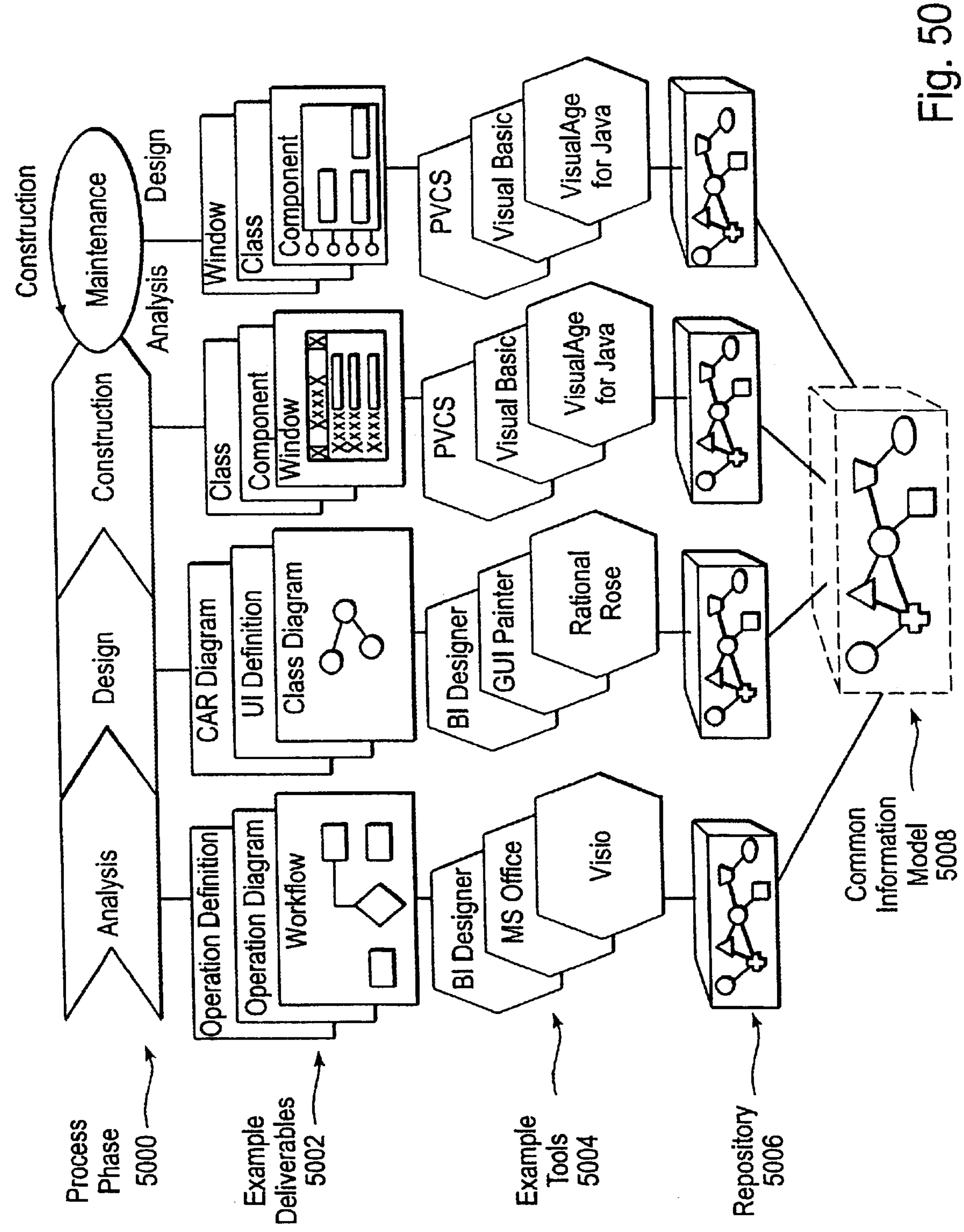
FIG. 50 portrays of a development architecture with a seamless integration of tools which can be plugged in for the capture and communication of particular deliverables.

Ideally what would greatly increase the productivity of the development architecture is a seamless integration of tools in the workbench and the ability to "plug in" whatever tool is most appropriate for the capture and communication of a particular deliverable. FIG. 50 portrays a development architecture with a seamless integration of tools which can be plugged in for the capture and communication of particular deliverables. Shown in FIG. 50 is the relationship between a process phase 5000, deliverables 5002, tools 5004, repositories 5006, and an information model 5008.

One solution center working on this architecture found that the current state of integration with tools was so constraining that the picture in FIG. 50 had to be resolved with many compromises for new component work. There were many custom scripts created and manual processes defined for leveraging the flow of information between phases and tools.

Figure 51:
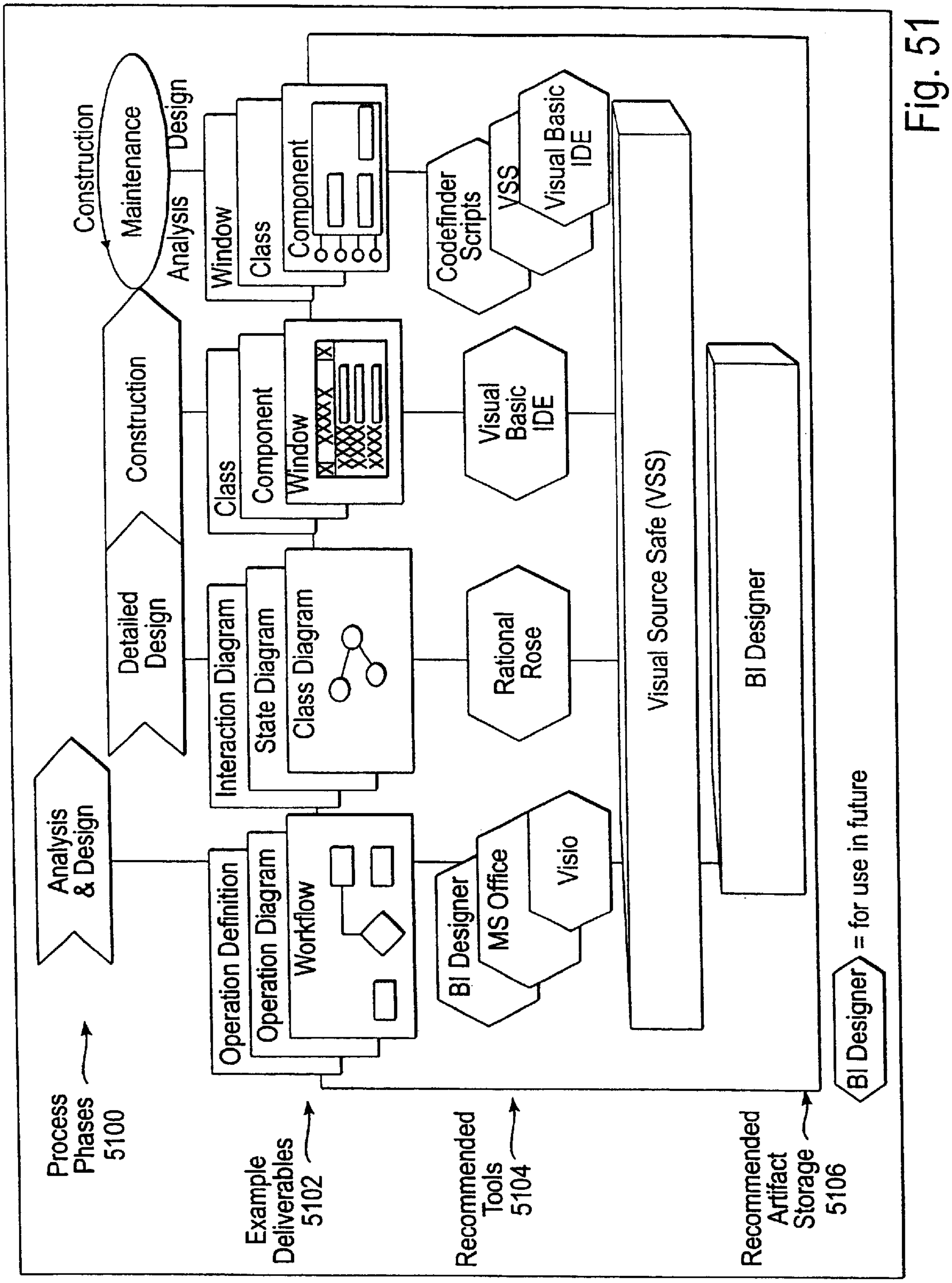
FIG. 51 shows a design architecture with the compromises made for today's component construction environment.

FIG. 51 shows a design architecture with the compromises made for today's component construction environment. Shown in FIG. 51 is the relationship between processes phases 5100, deliverables 5102, tools 5104 and storage 5106.

Key Considerations

A development architecture should provide an environment for component-based solutions that supports a team through the Analysis, Design, and Construction phases of the development process. It should also serve as a productive environment for the on-going maintenance of an application. Conceptually it should integrate all of the necessary tools through an information model and most ideally through a central repository. The following are considerations that all component development architecture must consider.

1. Support Custom Process. The present invention uses a robust process for developing component-based solutions. It includes deliverables that are above and beyond the Unified Modeling Language (UML). Furthermore, projects often customize it. The environment must provide the ability to extend the information model (i.e., the meta-model).

2. Versioning & configuration management. The environment should provide the ability to version objects within the common information model at any level of granularity, keeping track of these changes over time. It should provide the same ability for composite objects (i.e., configurations of smaller objects).

3. Scalability. The repository-enabled environment must be able to support hundreds of users simultaneously, and hundreds of thousands of repository relationships. It should also scale downward, so that small project can use it. This is a major criterion for usability.

4. Query and impact analysis. As organizations begin to maintain their own component-based assets, they must be able to analyze the impact of change requests (e.g., where-used searches). The ability to trace requirements is also critical.

5. Asset catalog (reuse). As organizations begin to reuse existing assets, it may become increasingly important to provide a catalog of components, frameworks, patterns, etc. The catalog should make it possible to search for relevant assets in a wide variety of ways. It should also provide a means for applying frameworks and patterns.

6. Code generation. The ability to generate the application structure from the model is essential to high productivity. Furthermore, this step should be transparent to the user. As far as the user is concerned, a change to the model is a change to the code.

7. Desktop Tool Integration. The repository-enabled environment must provide integration between all desktop tools (e.g., MS Office, Visio, OO CASE tools, designers, etc.) through component object models such as ActiveX. In addition, these tools must have access to the common open information models.

8. Non-redundant storage. The environment should avoid redundant storage of information, whenever possible. Everything from training to documentation to active components should be automatically updated or notified of changes.

9. Multiple users and locations. Many users may need access to the environment during the course of a development effort. Furthermore, because one supports global communities of practice, there is a strong need to share this information securely and across disparate locations.

A Development Architecture Needs to Support Customization of the Process

UML & Case Tools in the Development Architecture

Each project using component-based technology determines how to use OO CASE tools to support an object-oriented methodology and its deliverables. These deliverables range from high-level business process documentation in the business-modeling phase to descriptions of classes in the construction phase. UML compliant CASE tools provide a number of the deliverables that most object methodologies uses, however, there are almost always some deliverables that do not fit in the selected tool. There is also a discrepancy with the CASE tools' ability to comply with UML due to the continuing evolution of UML versions.

UML has become so universal now that deliverables from most methodologies form a superset or, in some cases, a subset of the deliverables described by UML. In the case where a deliverable is a close match to a UML deliverable, proprietary scripting is required to allow for complete semantics. This scripting is also used to migrate from the CASE tool to other drawing or word processing tool. Procedures must also defined to effectively use the tool to support the process.

Decide on Supported Deliverables Early in Process

Case tools in recent years have extended their ability to support more of the life cycle and improved their ease of use. In addition, some case tools have improved their integration with the Integrated Development Environments (IDEs) and produce some level of acceptable component code generation. It is important for the development architecture team to determine early exactly which deliverables may be created in each phase of development, which tool they may be captured in and whether links between phases require upgrading deliverables as a result of the transformations and/or enhancements from other phases.

The team must decide how much they may leverage the automated tools to support the build process. An investment in the macro infrastructure can lead to tremendous time savings as the construction process is supported. The team needs to determine early whether they may "build" their custom process into the tool or adjust the process to better integrate with the tool.

Development Architectures Are Often More Heterogeneous than Traditional Environments While traditional client/server systems typically required one development tool for programming efforts, component-based systems are often built using several tools and programming languages. The increase in tools is directly related to the improved capability to integrate software components through interfaces that hide the implementation details.

Typically, the more heterogeneous environments may be built upon the open CORBA technology, while applications developed with JavaBeans or COM may tend to be more homogeneous in nature. Thus, it is important to understand the technologies used as the effort to design a cohesive development architecture may be impacted. Plan to spend more time designing and building the development architecture for a heterogeneous environment.

Configuration Management

The advent of client/server has focused significant attention on the importance of configuration management as key to success. Configuration management is more than just source code control. It must encompass the management of the application software components from conception, through implementation, delivery, and enhancements. While the problem is not unique to component and object development, an object-oriented environment presents special challenges discussed below.

Configuration Management Is More Complex in a Component Development Architecture Currently, artifacts versioned with various tools do not know about each other. For example, an object versioned in a document management tool has no relationship to the source code configuration. In addition, various tools are advertising the advantages of their repository strategies. However, these products are in their infancy and most do not integrate seamlessly with the source code configuration managers let alone the various tools in a development workbench. Models, source code and documentation are not synchronized. The reality is that current versioning in the majority of tools only occurs at the file level and not at the required level of granularity to support development elements. Methods, classes, components, and their respective deliverables should be versioned but only a few products on the market today support this level of granularity and they are not yet integrated with popular case tools.

Object Systems Are Decomposed into More Pieces

Configuration management is more complex with object development because the system is more finely decomposed. Object development realizes the benefits of flexibility and reusability through a greater level of decomposition than was present in traditional systems. While smaller objects have the advantage of making it easier to have pre-defined building blocks, a disadvantage is that large-scale systems have so many elements that managing their relationships becomes difficult.

For example, a key principle of object-oriented design is separation of concern, which decomposes behavior into smaller, more cohesive objects. This strategy strives to prevent changes from rippling through many objects. The implication of this design approach, however, is that the resulting system may comprise many more modular pieces than a traditional architecture. This greater decomposition complicates configuration management.

Figure 52:
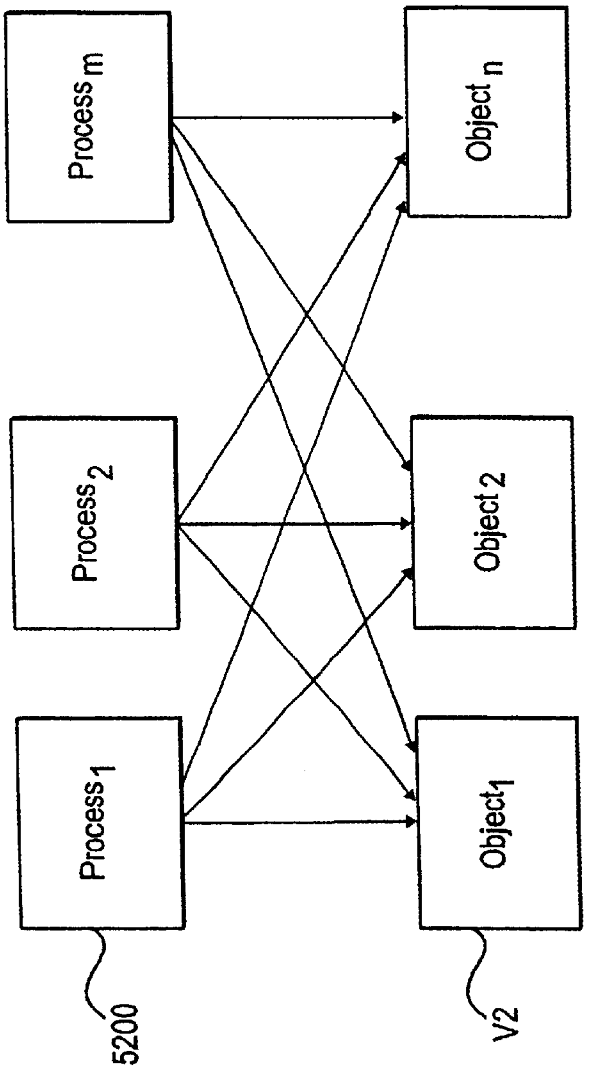
FIG. 52 illustrates a business process to object mapping.

Not only are there more objects than procedural modules, the relationships and dependencies intrinsic to object development are usually more complex. For example, the relationship between business processes and objects is a complex, many-to-many mapping: a business process is implemented by more than one object; conversely, an object contributes to more than one business process. FIG. 52 illustrates a business process 5200 to object 5202 mapping to illustrate such relationships between business processes and objects. One manager referred to this phenomenon as the web of interdependencies.

To manage this problem determine early what the "unit" of configuration may be and have the development organization aligned with the approach. For example, in the previous maze possible units of configuration could be:

Process I depends on:
- Object 1
- Object 2
- Object n

This keeps the process component rigorously configured with its dependent pieces.

Configuration Management Requires a Comprehensive Approach

Most Object CASE Tools Do Not Support a Complete, Integrated Repository

Integrated tools have, thus far, not been found to support cross-referencing window elements, object model attributes and behaviors, and relational database definitions. Thus, large projects must consider crafting a strategy to integrate multiple point tools to provide such cross-referencing.

The tools gap raises the importance of rigorous procedural and organizational models to address configuration management. For example, proper procedures must ensure that rigorous quality and build steps are followed before introducing a new component into the environment; the workplan requires much more detail to track dependencies; and, the organization structure must effectively support more extensive communications to react to changes.

Adopt a Philosophy for Configuration Management that Guides the Development of the Process There are two fundamentally different approaches to configuration management in the component world. Simply stated, they represent the difference between an optimistic approach versus a pessimistic approach to managing sources. In the optimistic approach multiple users can access and modify the same sources and the tool is leveraged to resolve conflicts when code is merged. In the pessimistic approach a source is locked when it is checked out. Both advantages have pros and cons and some source control managers allow the configuration to choose which approach they may choose.

Define Multiple Levels of Ownership

A traditional, procedural system usually assigns ownership by business function. Functional developers take on responsibility for a business function that corresponds to a front-to-back window. Technical team developers then take on cross-function architecture responsibility. This approach has obvious benefits in providing straightforward communication points and division of responsibility. A drawback, however, is that business function reuse is much more difficult.

This approach breaks down due to the higher level of reuse in an object-oriented system. Note that a procedurally designed system may also experience this problem to the extent that the team strives for a large degree of business logic reuse.

Owners Must Exist for Every Versionable Component

An object-oriented system must assign component ownership at multiple levels. Business process owners are still necessary; however, clear lines of responsibility must be assigned for the domain object model. Often these two may have a tight relationship. For example, consider a gas utility customer system that provides customer service orders. The service order business process and service order domain object owner should probably be the same person. However, the service order process may also need to collaborate with other key domain components such as the customer and premise. This requires collaborating and communicating with other developers.

Rigid Ownership Boundaries May Not Work

Experience has shown, however, that the level of communications with core business objects such as customer and bill account is so high that the rigid ownership might be ineffective. The resulting communications of requirements may produce inefficient hand-offs and bottlenecks. For large, mission-critical applications, multiple levels of ownership must then be defined. However, this creates a risk of conflicts. Before components mature, the rules of divisions should probably be more rigid. Later, multiple developers can modify common classes, while keeping responsibility to release, or publish, the code in the hands of a single owner.

Thus, ownership roles may overlap, requiring the rules of engagement to be defined. Yet, every scenario cannot be spelled out precisely. The team and leadership must then be very participatory and flexible to adapt to the dynamic requirements.

One large engagement defined separate, overlapping ownership responsibility for:

- Windows
- Domain object model sub-systems, or components; the model comprised about 350 model objects which were partitioned into about 12 major areas
- Business processes that were particularly complex, highly reusable, and cut across many windows; for example, writing off a bill
- Common architecture framework components
- Separate concept of ownership from developer for increasing productivity One solution to the above problem is the clear distinction between component ownership and developer rights. This philosophy is supported by tools like Envy/Developer for Smalltalk and Visual Age for Java. Assign owners of classes, packages, and projects and then assign developers to the packages. Any developer may write methods on an open edition or checked out copy of a class. The owner of the class can release the methods to the class, version the class and release to the general development team. In this model editions are open configuration units, versions are any units that have been checked back in and releases are units that have been made visible to the next construct of configuration management.

In this model clients of lower level components can be added as developers in the integration phase. Rather than have to wait for a new version of the component, they can concurrently have an edition opened with which they can modify or enhance and then submit their changes back to the component owner. This practice can keep control with component owners but increase the bandwidth of the development cycle.

Application Packaging Must Have a Clear Release Management Strategy

To support a flexible ownership model requires a detailed technical packaging strategy. Multiple levels of granularity for controlling source code are typically needed. The method and class are obvious targets for versionable components. However, levels of granularity above the class are critical to properly control the cross-class development that occurs.

Typically development may occur on groups of classes which can be versioned together as categories or applications. In Java, for example, these categories are packages. For example, the frameworks development team may generally have a work-in-process version of the framework architecture package to support new development. Application developers would instead have an older version, typically the first version, that had been thoroughly tested and rolled out.

It may also be necessary to version groups of methods together in a class. This has proved beneficial for managing object model development.

Components of the system should also have a well-defined [EWF1] relationship between them. This should occur at each level of granularity and give a definite feel for the dependencies between components. Each instance of a component also needs to know the specific, tested component versions with which they are compatible. It is essential that the relationships between components are non-cyclical or layered and that a complete dependency inventory be obtainable for every versionable component.

Favor Shorter Shelf Lives to Support Frequent Roll-outs of Reusable Objects

One of the most difficult decisions for object development is how frequently to roll-out reusable components to multiple developers. And a related issue is how long component should sit on the shelf between changes.

For a traditional, waterfall approach the shelf lives may be quite long with few iterations. For example, a module is typically coded and then put on the shelf until string test. The elapsed time ranges from a few weeks to many months. Likewise, once string tested the module may again sit for a long time until system test. These long shelf lives typically work reasonably well unless the underlying data model or architecture changes. In this case, unproductive re-work results.

The Object Model Must Be Continuously Rolled Out to the Team

For object development, roll-outs of objects must occur at varying intervals depending on the range of impact. Because the object model is continually evolving as completed windows incrementally add behavior, the model must be continually refined and rolled out to the team. Some of these changes may have a very narrow impact to just one window, where others may have more global implications.

For example, changes may be rolled out in the following intervals:

Application Interface or Control—nightly

Narrow Impact Object Model—nightly

Wide Impact Object Model—coordinated on-demand, no more than 1–3 times per week

Frameworks—weekly or less frequent depending on impact, maturity of the component, and the complexity of the effort Structural Object Model—for Data Waves, Once Per Month Object development also requires shrinking the shelf lives dramatically. Reusable domain model and framework objects generally require a zero tolerance policy for incorrect code. Problems need to be fixed immediately, or at least their impact critically assessed and the fix scheduled. As mentioned earlier, some of this immediacy can be managed with careful process surrounding ownership, editions and developers. In one tool there is a concept of a scratch edition that allows a non-registered developer to access units of control and make changes within his private environment and still be able to post the changes back to the component developers and owner. This eliminates hours or day turn around to correct a critical problem in a versioned component.

Clean-up or Fix-it Days Must Be Scheduled

Window or view specific behavior can have a longer shelf life, but still not as long as traditional development. Letting items sit for more than even just a few weeks can cause them to become dangerously out of date. Thus, two different large engagements found it necessary to schedule clean-up fix days on a regular basis.

Regression Testing Is Key to Effective Configuration Management

Regression testing is essential to support these more frequent clean-up efforts. This approach frustrated management, because these days appeared to be a step backward or treading water. However, keeping the application clean paid dividends in addressing and fixing problems more efficiently. Generally speaking, the longer the problem went unfixed, the more expensive they were to correct.

In summary, a flexible approach is necessary to coordinate and control changes. Some considerations include:

Ability to absorb change—If the developers are overwhelmed with change or learning curve, the shelf life must be expanded to reduce change.

Magnitude of the change—Minor changes may be easy to incorporate and may facilitate immediate turn around. Major changes may be expensive to incorporate except at controlled, regular intervals.

Restart Cost—Each effort to integrate changes into an existing component may incur a start up cost for the developer. This may again be influenced by the magnitude of the change, and the duration of the integration cycle. A rapid integration cycle may keep the behaviors fresher in the developer's memory; a longer shelf life may involve a refamiliarization cost. On the other hand, this must be balanced against the cost of starting and stopping new development to implement fixes.

Stability—As a component stabilizes and matures, the shelf life can be reduced without impacting the rest of the project. Unstable object components cannot be rolled out as frequently, because the turn-around time is longer.

Delivery Capability—The ability of the migration team to provide a "most current" build may also impact the fix versus shelf decision. In C++, the build process may be a major undertaking, where the shortest shelf life may be measured in days. In Smalltalk, the size of the image may likely have a similar affect. In Java the adherence to clearly defined packages improves the delivery capability.

Configuration Management May Require 5–10% of Development Team

Configuration management clearly requires more effort with object development. These roles are often hard to justify to management, because they appear to be pure overhead. The tasks may also appear unclear. For example, tasks such as "Manage environment" and "Communicate changes" do not to have a start and a finish.

These tasks should be controlled and managed by a centralized effort. Several people sharing the effort in their spare time may not exercise enough caution and due diligence. Furthermore, a centralized effort may often result in automation of tasks producing significant productivity improvements.

At least 5% of the development team should be completely dedicated to the on-going configuration management effort. When setting up and defining the environment even more resources may be necessary. Of course, there are limits. Stacking the team with too many resources may result in wasteful development of an overly elaborate tools architecture.

Another approach is to make the configuration process implicit in the entire development process. In other words, by ensuring that an owner of a class must version and release his work before it can be seen by a containing package the owner is required by the process to be thinking about the configuration process in all of his work. Subsequently, the package owner, generally a more experienced developer, must ensure that all classes are versioned within his package, version his package and then release it for general consumption. This would work the same for a project which tends to be centered around increasing units of capabilities (i.e. business activities and finally whole applications).

Scaling to Large Teams

Despite the advice to use small teams, enterprise applications are large and often require in the aggregate a large number of developers. Development architectures must be constructed in such a way as to support sometimes hundreds of users with many, sometimes hundreds of thousands of development artifacts and their relationships with each other.

All of the major software development tool providers (i.e. IBM, Microsoft, Oracle, Unisys, etc) have announced repository strategies. These repository strategies are much more comprehensive then the proprietary repositories that are represented by a source tool repository such as in Clear Case for source code or the proprietary repositories shipped with Case Tools or development environments like Envy Developer and Forte. These repositories allow for information to span tools and strive for integration between not only tools provided by a single vendor or from a host of third parties as well. Many case tool and IDE providers have announced support for this new generation of component repositories.

The new strategies all espouse either de facto standards (Microsoft's Open Information Model) or eventual conformance to a repository strategy (OMG's Meta Object Facility—MOF). These repositories, although encouraging, are very immature and may require a few years to deliver on their promises. In the mean time development architectures must decide on their own how they may provide the necessary facilities to promote large team development progress.

Query & Impact Analysis

Tools are necessary to identify categories of similar behavior such as the class hierarchy, where used, senders of, implementors of, etc. Today, many environments for C++, Smalltalk, Visual Basic & Java provide robust browsers with this comprehensive functionality. Additionally case tools also provide search capabilities. Unfortunately every tool uses a different method for finding artifacts, such as text searches for documents, menu provided searches in case tools, and where used and senders of within browsers.

As mentioned in an earlier section many of the language based IDEs provide sophisticated browsers and explorers that allow for searches for "where used" and "senders of" for messages and objects. These facilities are extremely important in component leveraged architectures. They allow developers to more effectively look for things to reuse rather than always re-inventing what they need. One important practice to help the searching process is naming standards. They should be put in place early in the process to enable a principle ParcPlace was fond of calling, "the principle of least astonishment". Because of polymorphism developers become very agile in locating classes and methods because their interfaces are so common like all objects responding to the "toString( )" method.

One of the problems in current development architectures is the redundancy of the facilities. For example, rather than be able to rely on the repository where the information should be stored in a common location developers may search in Rational Rose and in the source code manager for references of a given type.

One way to mitigate this issue is to publish information to a common location to make it accessible to everyone through a common interface, preferably a web browser. Tools like JavaDoc and Microsoft Word (which can transform documents into HTML) make it possible to leverage the web server's index server to locate artifacts from various locations. This practice is being more widely adopted, as shown by the release of IBM's JCentral tool.

Asset Catalog (Reuse)

One key improvement in component-based development from traditional development is the use of components to assemble solutions. This is very different from libraries. Because of the reflective nature of components, runtime binaries can be dropped into the development environment, their interfaces exposed and then integrated into the current solution space. This is done through the Java Reflection mechanisms within class files and type libraries in the Active/X world.

Currently reuse tends to be at entire source code branches rather than component-oriented. This has been provoked by poor version support in most development environments and tools inadequate for managing the assembly and configuration of components into solutions. Some component manager tools that are being released onto the market today support either the ActiveX or JavaBean component models but its not clear how they may be received, used and integrated into development and design environments.

To maximize reuse requires the assembly and configuration of run-time components in addition to being able to construct new components as part of the software construction process. A new breed of tools supporting black box reuse referred to as "Component managers" should be considered one of the primary tools provided with the environment to 1) support transformations between tools where this may continued to be a requirement, 2) enable component views of reuse allowing configuration from both run-time and development components and 3) give component developers security features preventing users from modifying and/or reusing certain components if they desire. It requires the ability to categorize components and search components according to property descriptions in a way that can be ascertained without the viewing of source code.

Code Generation

In the past code generation was crude, had to be customized, and was hard to keep synchronized once source code was emitted. This awkwardness was caused by other related factors like the lack of a common information model, little coupling with the IDE and no common repository sources. In addition, the ability of the CASE tool environment to comprehend the run time environment was poorly supported in most tool environments. The most damaging problem is the failure of CASE tool providers to "own" the code integration and generation produced from the model. Some of the efforts to integrate with IDE's via Add-Ins are a step in the right direction but, some key issues, such as identity integrity across multiple environments, have not yet been addressed to ensure its success.

That being said, code generation via case tools at the structural level can greatly increase the productivity of a team when a rigorous model is adhered to in mapping the domain model constructs to code or schema in the target environment. Two areas have been used to some degree of success from component engagements 1) generation of DDL from object schema—the domain model and 2) generation of the object structure or domain model to the target language.

One analogy has been made with Layout Managers or Screen Builders. A decade ago people were comfortable with coding windows by hand. Some even felt that form designers were too constraining and got in the way of developing a really usable interface. However, no one today would think of generating forms by coding them by hand. So with the standardization of UML and the maturing of object model semantics developers should be reticent to code class structures by hand. Oracle refers to this as "one source of truth". A change to the class structure in the source code is a change to the model and vice versa.

Desktop Tool Integration

Desktop tools today generally include an office suite, drawing tools, case tools and more recently, a web browser. For example, one might find a tool selection like Microsoft Office for documentation, Visio for custom deliverables, Rational Rose for models, and Internet Explorer for viewing HTML versions of the documentation. VBA has become the glue for extending and connecting the information between these tools. Other strategies have included using Notes as a repository for all of the deliverables that users could access information.

ODM has many predefined deliverable templates that are targeted towards this suite of tools including Word, Excel and Visio templates. Often times management underestimates the start up cost of integrating the tools in such a way as to improve the flow of information between phases and for ensuring that information is published to the team in a way that is accessible and plentiful. However project experience teaches that this investment can yield many returns down the road if the development architecture includes processes and infrastructure to support this flow of information.

This desktop tool integration strategy needs to take into account the comprehensive approach used by the configuration management strategies. In other words, relevant documents need to be associated with the components and business processes they update so that key stakeholders can subscribe to alarms that may make them aware of when sections of documentation need updating. This process may help ensure that the publishing model is dynamic and current.

Many Users and Multiple Locations

Solution Centers and engagements often have many users and multiple locations involved in solution delivery. It is very important for development architecture teams to solve the problems of concurrency within tools and ownership across locations. Strategies need to be developed for how components may be exported and imported, and supported across locations. In addition, an approach for receiving feedback for improvements needs to be established. Most projects have found that ownership is even more important in a distributed development environment. This allows for the using of master/slave assignments on components and dictating either who is allowed to make changes to the component or who is responsible for merging changes. As one technologist from Sun stated, if distributed development is not managed carefully it can be like herding cats.

SUMMARY

Although there are new challenges with development architecture in a component environment there are also additional opportunities for increased productivity. A team that understands the additional considerations may weigh the opportunities that tool integration can bring to the project against the practical gap in the market place and customize their development architecture accordingly. Wise planning and a clear understanding of the strengths and limitations of the tools available to a team may contribute greatly to the success or failure of a project.

Managing Performance

Component-based technology is often sold on benefits such as reduced maintenance, increased reuse, or flexibility to absorb change. Performance, on the other hand, is usually viewed as a significant drawback. However, resilience to change and performance do not have to be mutually exclusive.

Component Technology Can Enable Better Performance

Component-based systems have advantages that can actually enable better performance—but only if proper design techniques are used. This chapter discusses the correlation between performance-tunability and a well-designed component-based system, and the implications this has for project management.

The timing of when to address performance may initially appear trivial. “Design performance in from the start” is one often-repeated rule. The opposing viewpoint is expressed by computer scientist David Knuth who said, “Premature performance tuning is the root of all evil”. Timing when to address performance is actually a complicated management issue. The competing forces and their possible resolution are discussed further below.

Define Performance Goals in Terms of the Business

An old saying goes, “Cheap, fast and good—I'll give you two out of three”. Many of clients may react negatively to this philosophy, because they would certainly like excellence in all three areas. Yet, the fact remains that difficult tradeoffs exist between performance, quality, and the cost of the system. For example, no one intentionally designs a slow system. Thus, it is critical to define performance goals in business terms based on cost/benefit analysis.

Consider service level agreements for online performance, which are often based on the average wait time between screens. This makes sense in a technical environment using 3270 display devices. However, this may lead to poor business decisions for a non-modal, windowing GUI.

A GUI may support a more rich set of processing than a 3270-based design. This can result in response times much slower per window; however, the time for completing the business transaction such as a customer order may be equivalent or even less. Yet, to tune the performance for an equivalent level of window-to-window response time may simply not make economic sense. Thus, the requirements should be based on how efficiently the system completes the pure business event, encompassing potentially multiple windows, rather than a more technical measure of window-to-window navigation.

Measure Performance

Any effort to effectively address performance requires thorough measurement capabilities. There are two reasons for this. First, the team must understand where the specific risks reside, before they can effectively attack them. Is the application I/O or compute bound? Is database or network I/O a bigger issue? Are there obvious bottlenecks? These are all key questions.

Performance Metrics Focuses Attention and Provides Confidence

Second, just the simple act of measuring and tracking performance focuses attention in a positive way. Tools such as language profilers and memory-leak checkers are critical. A rich set of tools can give the team more confidence in the quality of their development and technology.

Confidence is particularly important to object-oriented and component-based systems development, because a delicate balance is necessary between addressing performance risks without detracting from good object-oriented design. For example, fear of messaging overhead may lead developers to avoid altogether factoring behavior into smaller methods and objects. Yet, such factoring is critical to application reusability and quality.

Fear of Object Messaging Overhead Can Be Overstated

A potential source of misunderstanding is equating object messages with network or operating system messages. Actually, object message sends are often more comparable to function calls, albeit slower. And the overhead of message sends compared to function calls can be unimportant compared to the application I/O. That is, most applications are I/O bound, not compute bound. On the other hand, it is important to understand the frequency of component messaging since it may cross network or process boundaries. Thus, when looking at messaging characteristics it is important to distinguish between component messaging and object-messaging.

Address Architecture Performance Risks Early

As with a traditional client/server system, performance risks should be addressed early. Performance requirements often have a severe impact on the technology architecture including the infrastructure design and the platform systems software and hardware. For example, the architecture team may need to decide whether to use messaging, remote procedure calls, or shipped SQL statements for distribution services between client and server. Performance may also impact fundamental platform decisions such as the choice of language, DBMS vendor, operating system, network, or hardware configuration.

Usually these parameters cannot truly be understood without constructing a benchmark prototype. In cases where the underlying platform is affected, the benchmark should be planned and conducted at the outset of the project. These measures are important, because intuition may often be wrong as to where the problems lie.

In addition, the technologies that make up the foundation of a component architecture may be new and unproven. To minimize risks, look for a reference application that is similar in complexity and size. If a similar application can't be found, then it may be necessary to develop a proof-of-concept prototype for the architecture. Such a prototype may address areas such as the middleware, application architecture, or hardware platforms.

Performance Is Balanced Against Encapsulation and Software Distribution

Performance is Frequently Balanced Against Encapsulation and Software Distribution As with any system, there are design trade offs that can be made to achieve better performance. With component-based systems, some of the most significant performance trade offs are made against encapsulation and software distribution.

The encapsulation of data forces applications to access data through a component's interface. Unfortunately, encapsulation may many times result in excessive messaging, sometimes across a network, between components. Thus, performance can often be improved by breaking encapsulation to directly access data.

Software distribution is often simplified by utilizing centralized application servers. However, a centralized approach may result in diminished performance due to the network messaging. Performance can often be improved by distributing software closer to the point of usage.

Selecting the right balance between performance, software distribution, and encapsulation is not easy. Achieving the right balance may be driven by system's requirements.

Performance Tuning Can Be Deferred with Object-Oriented Frameworks

Object-Oriented Frameworks Enable Performance Tuning to Be Deferred

Smalltalk columnist and consultant Kent Beck espouses the philosophy "Make it run. Make it right. Make it fast." At a glance, this advice may seem counter to the previous recommendation to address performance risks early. However, they do not have to be mutually exclusive. An application should be prototyped—i.e., made to run, early to address broad architecture performance risks. Later, proper design should be the focus before performance, because a well-designed application enables more productive performance tuning. Optimized code is simply very difficult to maintain. And prematurely optimizing code may incorrectly assume what problems are most important, thus wasting effort.

Figure 53:
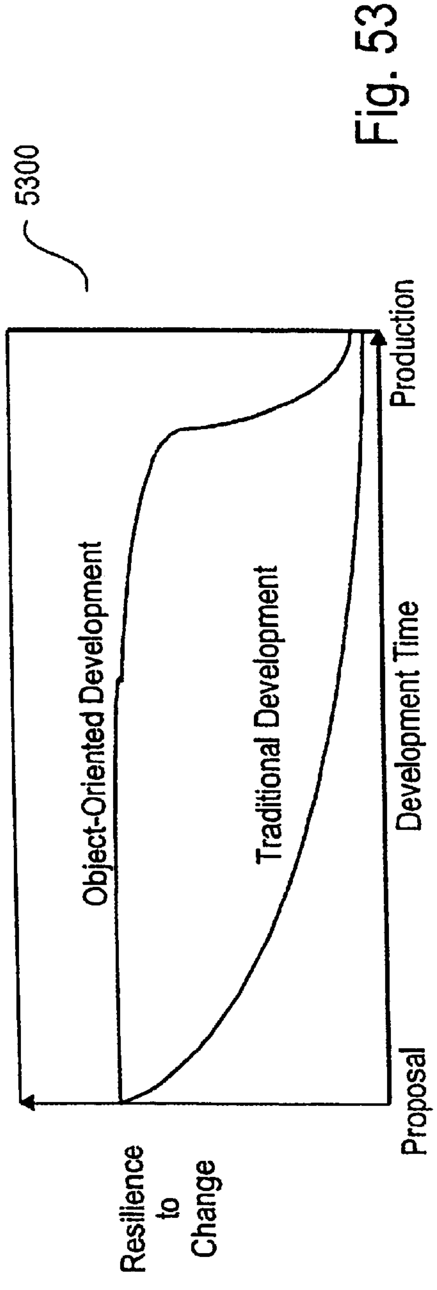
FIG. 53 is a diagram which illustrates a graph of resilience to change.

Object-oriented system development, in particular, allows for a deferred attention to performance. The component design goal of encapsulating implementation details tends to lessen the impact of major change to the application. This allows sweeping changes to be made late in application development. FIG. 53 is a diagram which illustrates a graph 5300 of resilience to change.

This graph illustrates the belief that through a good object-oriented design, changes related to performance tuning may be made much later in the development lifecycle than would generally be possible with traditional structured design. With an emphasis on good object-oriented design, the degree of radical change possible late in development is surprisingly high.

Non-Object-Oriented Systems Should Be Performance Tuned Throughout Development

When components are not built using object-oriented frameworks, it may not be as feasible to defer performance tuning. Without frameworks that provide a well-layered and factored architecture, it may not be possible to make small, localized changes that result in dramatic performance improvements. Instead, it is better to performance tune as the system is being built so that there is time to make changes. Furthermore, it becomes even more important to establish design guidelines early in the project so that detailed designs can be reviewed against them. This can help ensure that performance problems are avoided before components are implemented.

Leverage Points

The value of reuse is frequently perceived as "less to code". While often true, a sometimes overlooked, more valuable aspect is "less to maintain". This is notably significant when performance-tuning a system. It is generally worthwhile to spend more time upfront determining how to reuse existing components than it is to spend less time developing a new solution. Similarly, it is usually more worthwhile spending more time generalizing a component so it may be reused than it is spending time to develop a specialized solution.

A leverage Point Is Factored Out Behavior that Enables Leveraging Global Performance Gains A leverage point is processing common to multiple components which may be factored out and reused when needed. In performance tuning, these points are identified, profiled and tuned, thereby leveraging any performance gains against all components which use them. In general, the less actual processing an application-specific component (i.e. non-architecture) performs indicates the more performance leverage may be gained from it by tuning architecture processing.

For example, a business event controller class in a system must somehow specify the relationships between its relevant business components and the widgets which may interact with them on the application window. There are two fundamental approaches in specifying these relationships. The first is for an initialization method to be invoked in the controller which may perform the processing required to define these relationships. The other is for that business class to specify the bare minimum information required to infer these relationships such that a common architectural component can perform the actual processing required to define the relationships during runtime.

The latter approach provides a leverage point for performance tuning the initialization of the window. The processing may be tuned to use a more efficient algorithm; the results of the initialization may be cached during application packaging and read during initialization; or, efficient initialization methods may be generated and maintained automatically from the information by a code generator once it becomes clear what the most efficient implementation is. In any case, the flexibility provided by this leverage point allows many more possibilities to be considered during performance tuning. Note that all three optimizations could be achieved without manually visiting a single of perhaps hundreds of windows which share the initialization processing.

The pursuit of leverage points must be considered in every architectural design decision, and followed with discipline in application design.

Communication via Interface Definitions—Specify What Not How

On a component-based project where the development should reuse extensively, the name of a component and its methods are perhaps the strongest medium of communication between the original developer and a developer interfacing with, or maintaining that component. A fundamental grammatical naming standard is the means to ensure clear communication between developers. This standard must be well-defined, strongly enforced, and supported by leadership.

A weak standard of interface definition often results in code requiring extra processing which could be avoided by making assumptions based on a strict interface definition. Performance tuning is easily complicated by generic interfaces supported by vague assumptions. Redefining such interfaces late in development is often prohibitively expensive relative to the low cost of clear initial interface definition.

An example of a poorly-defined interface is a method definition which may accept several unrelated types as its parameters. The result leads to type-checking of parameters and decreased flexibility in tuning the implementation of the method. The strong definition of interface parameters allows fundamental assumptions to be made in tuning the implementation of the interface.

A grammatically-based naming standard differentiates between methods that do versus methods that get. In a traditional approach, procedures or functions do routines and algorithms. The unique blend of data and behavior in component-based development, on the other hand, allows components to collaborate, asking each other for data, as well as directing each other to perform processing. This requires the addition of nouns and the inclusion of verbs to the vocabulary of interface definition. That is, the interface should specify what, not how.

For example, if a customer component provides a public interface that allows another component to ask it to query the database for its credit profile, a common mistake is to define a method getCreditProfile or retrieveCreditProfile in customer. If, however, performance tuning required caching the customer may already have the credit profile. This would leave development with the choice of either changing the method name in all referencing components, or create documentation to explain why the method getCreditProfile didn't really get anything, but just provided access to another component.

This example illustrates the importance of naming to ensure encapsulation. The implementation changes required to achieve radical performance improvements are feasible only through diligence in the pursuit of encapsulating implementation.

Along with good design organization, clear interface definition is key in achieving valuable tunability.

Limit Knowledge of Data and Object Relationships

Developers with structured programming experience often tend to perceive objects as data, manipulating them within the context of objects, effectively distributing behavior associated within components amongst all the objects which interact with it. This becomes very difficult to performance tune due to the combination of duplication of code, and the wide impact any such tuning could have on application classes. A much greater degree of performance tuning can be achieved when object responsibilities are respected and objects or collaborations of objects can be tuned in isolation with minimal impact to their embedded system.

A simple example of "data-ifying" objects is when object A manages a group of other objects, yet other objects ask object A for its managed objects and manipulate them freely. Generally loop iterations are prime candidates for significant performance improvements. If the iterations are distributed over every object that interacts with object A, little performance improvement of component A may be gained without high impact. By restricting interfaces such that only object A may iterate over its own managed objects, the iteration code can be tuned with little impact outside object A.

Performance improvements can always be identified. The difficulty is in the cost of actually implementing them. The strong pursuit of encapsulation allows bottlenecks to be identified more easily (i.e. in one place), and tuned with minimal impact.

Leverage Functional and Technical Tuning

Though tuning of a component-based application can be deferred until late in development, eventually it must be done. At this point it is important to realize the difference between functional tuning and technical tuning.

Functional tuning involves a combination of cognitive and measured tuning. It consists of looking at the functional design of a component and determining which portions of processing can be deferred, cached, etc. It demands a developer who is functionally knowledgeable about the desired behavior, whether it be architecture or application. It often results in reorganizing or redesigning portions of code. The performance gains realized during functional tuning are generally the most significant gains.

Technical tuning is a lower-level approach to tuning, developing more efficient techniques to achieve the same functionality. Technical tuning demands a developer who, though not necessarily intimate with the functional requirements, has a strong familiarity with tricks and techniques of the development platform. It can involve better use of memory, language idioms, base class modifications, etc. Technical tuning should require little or no changes to application code, and narrow changes to architecture.

Opportunities for performance tuning are found both in bottlenecks and in distributed inefficiencies. There are generally many tools available in detecting bottlenecks. Distributed inefficiencies are usually more difficult to identify with tools. Whether performance optimizations are realized through cognitive analysis, or tool-assisted profiling, it is important to measure the gains against a baseline performance level.

Few performance improvements are gained by eliminating completely useless code. Gains are usually achieved by trading speed for size, or chronologically reorganizing processing. Improvements in one area may weigh in a different area. For example, runtime processing is often sped up by increasing initialization time. When making such changes, measuring the affected runtime processing is insufficient. It is necessary to measure also the areas impacted to determine that the optimization does not push another area into unacceptable response.

Summary

Performance is an acknowledged risk in developing complex systems with today's maturing component technologies. To reduce risk and uncertainty, it may be necessary to develop prototypes that validate the architecture approach. When components are built using rich object-oriented frameworks, it is possible to tune a component-based system more effectively and later in development, than its structured counterpart. Other more traditional approaches to components, may require tuning throughout the development cycle.

Base Services (1020)

Batch processing is used to perform large scale repetitive processing where no user involvement is required. Batch support is an often overlooked area in architecture and component design. When first client/server and then component technology hit the scene, the emphasis on GUI and communications was so strong that many thought of batch as dead. Today, one is wiser about including batch in the scope of both architecture and application efforts. One also finds that many of the principles and concepts that applied to batch twenty years ago also apply today.

In general, batch still has the following fundamental characteristics:

Scheduling—Services are required to manage the flow of processing within and between batch jobs, the interdependencies of applications and resources as well as to provide integration with checkpointing facilities.

Restart/Recovery—Batch jobs must be designed with restartability in mind. This implies the need for a batch restart/recovery architecture used to automatically recover and re-start batch programs if they should fail during execution.

Controls—Run-to-run and integrity controls are still required to ensure that all data is processed completely.

Reporting—Services are required to handle configurable report creation, distribution, printing and archiving.

These services are typically not provided through component technologies. They can be provided by third-party products or custom implementations.

How is batch different in a component-based system?

A system's batch architecture can be easily overlooked since it is not a part of the system that is visible to end-users. Regardless, it is critical to design components with both on-line and batch requirements in mind. Combining both sets of requirements is necessary to ensure that your components can be used in both environments. This will allow the batch programs to act as just another client to your components.

In addition, since many on-line systems are expected to be available on a 24×7 basis, there may be a limited window available for exclusive batch processing. This requirement can have a tremendous impact on your batch architecture. In these environments, it is necessary to design batch programs that make efficient use of resources and have a low impact on on-line users.

A component-based batch architecture must support batch programs that read transactions that are really messages. These message transactions are read either from a flat file or from a database. The program must then locate the component for which the message is intended and pass the message to that component for processing. In many cases, these will be the same components that process messages from on-line (GUI) applications. The function of the batch "program" in this environment is fairly limited. It reads the input messages, controls the packaging of database units of work, and sends requests to the business component that performs the actual business logic associated with the messages. Batch architectures usually "commit" on intervals that are designed to optimize database resources. Thus, it is important to design components that can participate in a logical unit of work that is controlled outside of the components.

How do the patterns in this section help?

The patterns described in this section represent some initial attempts to capture basic concepts that are useful in the design of a component-based batch architecture. They are by no means exhaustive but represent building blocks in a complete solution.

The Batch Job pattern describes a method of structuring batch components so that common architectural services are implemented uniformly across all of these components. In a way, this is the component-based analog to the concept of shell designs and skeleton programs which have been a recurring feature of robust batch architectures for many years.

The Batch Unit of Work (BUW) pattern, on the other hand, represents a method of structuring the work to be processed by the batch components so that it too can be treated uniformly by all components. An abstraction such as this forms the basis for distributing batch workloads in a number of useful ways. It also enhances the capability of the architecture to support evolutionary change.

The Processing Pipeline pattern describes a way of structuring batch activities so that they can be easily reconfigured as processing requirements change. This pattern directly addresses the issues of scalability and reuse in a component-based batch system.

The Abstraction Factory pattern has a much broader applicability than just batch systems. It represents a way to encapsulate diversity such that only those parts of the system that need to understand the difference between two objects have to deal with those differences. To use a typical batch example, a file is a file is a file. Only those components that require knowledge of the contents of a file should need to deal with those contents in other than a very generic way.

What are some other considerations in developing a component-based batch architecture?

Because batch processing executes on a server and requires limited user interaction, many of the services used for on-line architectures are not needed. For example, the services used for distributing components—naming, distributed events, bridging, trader, etc—are not needed for a batch architecture. In fact, the interfaces that encapsulate components and provide location transparency can add significant overhead to a batch architecture. To avoid the expense of unneeded services, the component stubs can be wrapped with a layer of indirection that short-circuits the normal distribution mechanisms. This will provide performance that will approximate local function calls.

Typically, business objects have to be instantiated from a relational database (RDBMS) before the batch application can make use of them. This extra overhead is a very real concern. It is an unfortunate fact that in many ways the more "object-oriented" your design is, the worse it fits into the relational paradigm of rows and tables. For one thing, these designs tend to have lots of objects with embedded instances or references to other objects. And the primary reason that such designs have RDBMS performance problems is that in the database, resolving such an object relationship requires joins or recursive queries. When mapping from your object model to the RDBMS, there is a tendency to "normalize" your object over many tables, and the performance can easily plummet.

Is efficient component-based batch hopeless? No. But if you have stringent batch performance requirements, you may need some specialized design. There are several techniques you can use to improve your batch speed.

Reduce (eliminate, if you can) batch. This may sound simple and stupid, but is often overlooked and is by far the cheapest way to improve your batch yield. Lots of reports can be obtained on-line, lots of them are not useful or used, "trigger transactions" can simply become spawned sub-processes that run in the background, same for printing bills, the only thing that must be done in batch is a database reconciliation, which requires a time window with no other activity. If you can engage in discussions for eliminating batch, by all means do.

Pool (recycle) objects. Each time you dispose of an object, instead of destroying it put it in a pool of recyclable objects; and every time you create a new object, look in the pool to see if there is one that can be recycled. Keep separate pools for each class of objects. Allocating objects is a lot more expensive than one tends to think, and recycling can improve your batch performance dramatically without affecting your design.

Cache and sort. This technique is well known to "traditional" batch designers, but it is so obvious that they don't even think of it. However, it has a correspondent object implementation. Keep a small cache of objects you have just read from the database. Most of the times, one instance of each is plenty. Whenever you need to access an object on the database, look to see if it is already in the cache. If not, read it and put it in the cache too. Encapsulate all this logic in a technical "Table" object—not in the business objects. At the same time, organize the processing of your data in a sequence that maximizes cache hits. Again, this technique does not affect your "business objects" design. The processing cost of this technique is so low that you can keep it enabled also for on-line, thus simplifying your technology architecture.

For some applications, an LRU caching policy might not be the right choice; a more complicated scheme with multiple cache levels might be necessary. For this reason it would be best to make the caching policy itself be an object (consider the Strategy pattern for making an object from an algorithm) so you can change the policy on demand.

Cache operations and accesses. One of the reasons component-based batch performs so poorly is due to the fact that, in order to maximize modularity and preserve encapsulation, a lot of operations are performed redundantly. For instance if a balance is implemented as a calculation, and if it is needed by six different objects it is recomputed six times. These situations are very easy to identify with a performance monitor that tells you where the program spends most of its time; it is not uncommon to find that most of the time is actually spent in very few methods. For these methods (and only for them!) cache the result in an instance variable. Every time the method is invoked, check if the instance variable contains an answer: if not, compute it and store it there; if yes, just return it. Of course, each operation on the object that invalidates the result of the computation must invalidate the cache too! This technique has a very small impact on your object design and typically leaves the interface unchanged.

Cache objects. Typically, this would involve leaving recently referenced objects instantiated in memory for some length of time after their last use. Then, if the object is accessed again, you check the memory-resident cache before re-loading the object from the DBMS. Usually you would construct this cache as a hash table keyed by object ID, and use a LRU policy to keep the cache size manageable. Expect degraded performance if you do anything to destroy the utility of the cache. For some applications, LRU might not be the right choice; a more complicated scheme with multiple cache levels might be necessary. For this reason it would be best to make the caching policy itself be an object (consider the Strategy pattern for making an object from an algorithm) so you can change the policy on demand.

Make use of "lazy" or "deferred" loading. That is, don't do a "deep" instantiation until you know you're going to use the associated parts of the object. Instead, load selected sub-objects only when first referenced This can save on memory overhead as well as DBMS access. In some cases you can use a hybrid strategy: do a "shallow" instantiation by default, but provide the client program with a way to build the complete object on demand to provide more deterministic performance. One thing to be careful of with this approach is that if you really do tend to use most parts of the object during high-volume processing, loading it in piecemeal can actually worsen the performance, because of the overhead of maintaining the load state and because of the smaller DBMS transactions sizes. These techniques have a very small impact on your object model.

De-normalize your database where possible. Typically when one does object-to-relational mappings, one tends to make every unique object type a separate table. This is best from a design perspective. But in cases where you know you have a fixed set of "private" associations (meaning physical aggregation with no possibility of shared references), then fold that sub-object data into the enclosing object's RDBMS table. It's not pretty, but it can save lots of extra loading time. Also, look at ways to do aggregate loads based on some unique object ID. For example, if you have collection-valued sub-components, insert the object ID of the enclosing object in the sub-object tables and do aggregate loads in code, rather than doing a "point-of-use" instantiation for each one separately. Of course, these optimizations can have a more substantial impact on your object model.

Consider making "light" versions of some of your objects. That is, for performance critical situations, create alternate implementations of your business objects that don't have all the baggage of the first-class objects. Yes, this can be ugly and more difficult to maintain. But for many batch processing applications you might find that you can drop a lot of the (persistence-related) complexity of an object without affecting the batch processing at all. Then create fast hand-tuned routines to instantiate the "light" objects from the database.

As can be seen, there are a lot of opportunities for improvement in component-based batch performance. However, in order to manage risk early, remember that the areas in which you will have trouble are those in which batch excels (predictability, repetitiveness) and component-based design trades off performance for flexibility and encapsulation. Message overhead and similar language related issues are unlikely to be critical. Obviously, before doing any of these things you should do some serious benchmarking to see where you're coming up short on performance. Often the overhead comes from surprising places. Don't twist your object model all out of shape without first having some solid performance measurements.

Abstraction Factory

Figure 54:
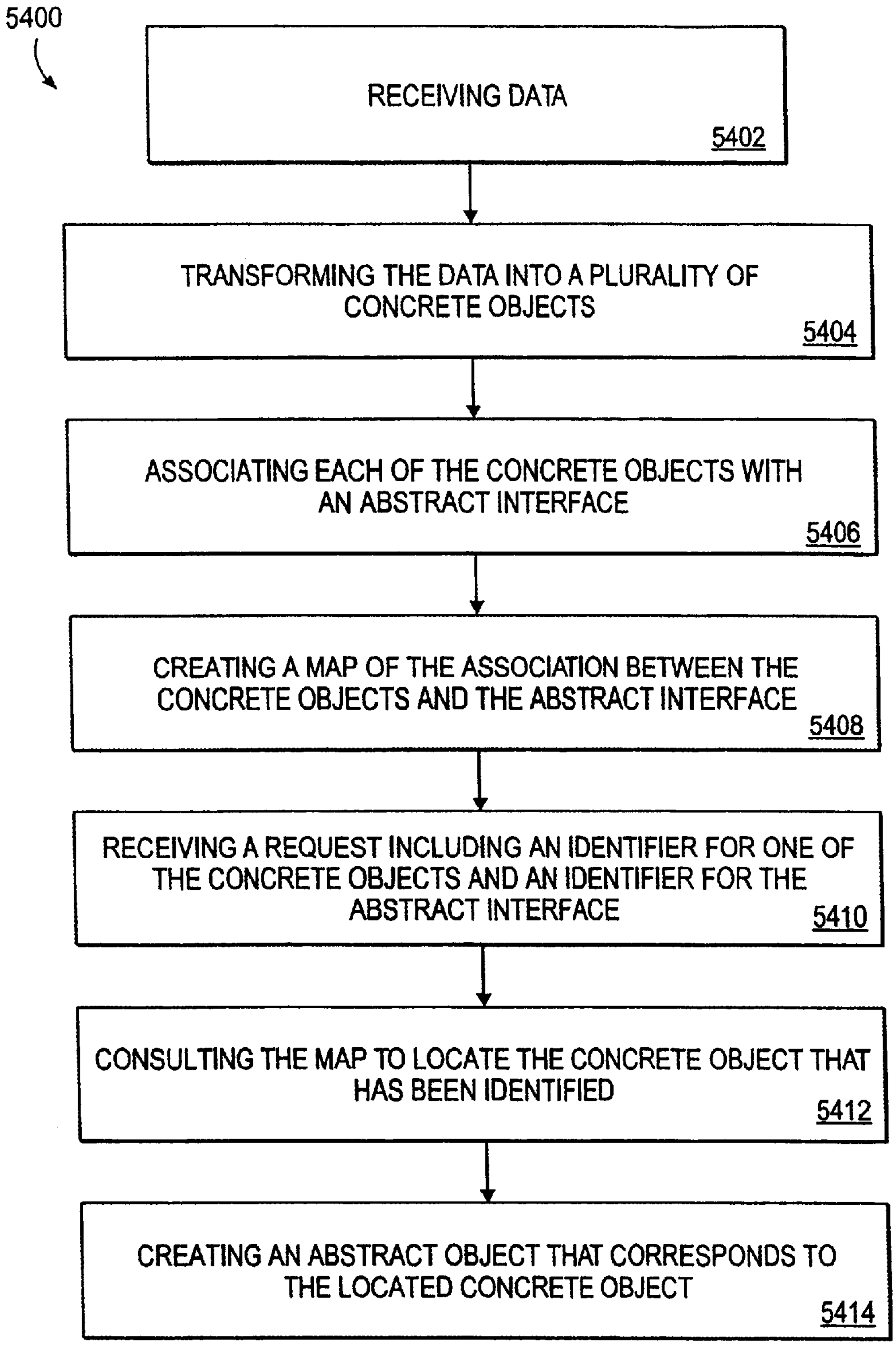
FIG. 54 illustrates a flowchart for a method for providing an abstraction factory pattern in accordance with an embodiment of the present invention.

FIG. 54 illustrates a flowchart for a method 5400 for providing an abstraction factory pattern. Data is received and transformed into a plurality of concrete objects in operations 5402 and 5404. Each of the concrete objects is associated with an abstract interface in operation 5406. A map of the association between the concrete objects and the abstract interface is created in operation 5408. In operation 5410, when request is received which includes an identifier for one of the concrete objects and an identifier for the abstract interface. The map is consulted to locate the concrete object that has been identified in operation 5412. An abstract object is then created that corresponds to the located concrete object in operation 5414.

The identifiers may be included with a single request. In another aspect of the present invention, the abstraction factory pattern may be written in a C++ programming language. As an option, the located concrete object may also be inserted into the abstract object. With this option, the abstract object may operate as a handle.

It is desirable to separate concerns between architecture/framework and implementation details. One way to do this is to exploit the power of polymorphism, using an abstract interface to a concrete object which implements that interface. How, then, is one to create these concrete instances and manipulate them within a framework while preserving the framework's independence?

In any complex information processing system, there will be a variety of different types of information, with a corresponding variety of actions which must be taken to process that information. One of the difficulties in this task involves taking an information source and creating an appropriate internal representation for it.

The typical approach to this problem takes the form of a large switch/case statement, where each case deals with one of the information types. The switch/case approach leads to components that are very difficult to maintain, extend, debug, etc. and also leads to a procedural programming style. This approach also makes it extremely difficult to properly manage dependencies so that the details depend on the framework and not vice-versa.

With this in mind, some alternative approach must be used which will allow a framework to handle multiple information types in a way which encourages good style, modularity, extensibility, and framework independence.

Therefore, one transforms the various types of raw data into a corresponding variety of concrete object types, all of which share a common abstract interface. This transformation will be encapsulated within an Abstraction Factory.

The primary interface to the Abstraction Factory is:

"abstractType produceForKey(key)"

where "abstractType" is the type of the common abstract interface, and key is a piece of information which identifies the appropriate concrete type. (This could be the same piece of information used in the switch/case statement; there could be a variety of ways to get it). When this method is invoked, the Abstraction Factory consults its internal mapping and creates an "empty" object of the proper concrete class. The factory then casts the concrete object into the abstraction and returns it to the method's client. This client (a framework most likely) will then instruct the abstraction to initialize itself from the incoming data stream.

At the end of this process we have an abstract handle to a concrete object which a framework may then manipulate generically.

Benefits

Software Quality. Exploiting this pattern can allow us to avoid one of the major pitfalls of procedural programming, the switch/case statement. Done properly you get better modularity, testability, maintenance and extensibility.

Frameworks. The layer of abstraction introduced allows us to build frameworks which follow the open/closed principle, that is to say, they are open to extension by the addition of new concrete types, but are closed to the necessity of risky and costly modification Implementations of this pattern will vary widely depending on the selection of language. For example, in C++ a generic factory, based on templates can be constructed, and key—concrete type pairs can be registered to the appropriate instantiation of the class. This might require manual coding in other languages. The key interfaces, however are:

Abstraction Factory

AbstractType produceForKey(key)

Abstract Type init(some data stream)

The Abstraction Factory can be fully coded in C++. It is very re-usable as it stands. In addition, it has been extended to perform "Java Loader-like" dynamic linking if the proper code cannot be found already within the factory.

Factory, the well know pattern from Gamma, et. al

BUW, in which the objects created by the factory can be dealt with generically in terms of independence, scalability, parallel processing, etc. Component Solutions Handbook.

Batch Job

FIG. 55 illustrates a flowchart for a method 5500 for representing a plurality of batch jobs of a system each with a unique class. In operations 5502 and 5504, an abstract class of abstract data required by a plurality of batch jobs is provided and a plurality of batch job sub-classes are defined. Each batch job sub-class includes batch specific data, and logic for processing the abstract data and the batch specific data upon the execution thereof. Each of the batch job sub-classes is represented with an object in operation 5506. In operataions 5508 and 5510, one of the objects is identified and the logic of the batch job sub-classes associated with the identified object is thereby executed.

In one aspect, the data may include a name, a current status, messages encountered during a run, various times, and a priority. In another aspect, the abstract class may include default logic for running a batch job.

In an additional aspect, the abstract data and the batch specific data may be stored separately. In a fourth aspect, the logic of the batch job sub-classes may be executed by a scheduler.

A set of logical operations may need to be initiated through some "batch" scheduling means. This requires a set of common services such as activation, logging, and error handling that will have to be applied across all jobs. How can these common services be distributed to all types of batch jobs?

Most business systems today include some sort of batch processing. Batch processing is the execution of a series of instructions that do not require any interaction with a user to complete. Batch jobs are usually stored up during the day and executed during evening hours when the system load is typically lower.

Once a batch job begins, it continues until it is complete or it encounters an error.

An architecture that supports batch jobs usually has certain characteristics. It must be able to support checkpoints and rollback, restart and recovery, error handling, logging, scheduling, and resource locking Most systems, including those that are component-based, require this sort of architecture. A difficulty arises when considering component-based systems though. In a component-based system, the application architecture is usually very separated from the business application classes. In many cases, the business classes and components are built without regard to the surrounding architecture.

It is expected that the business components will execute in some environmental container that will provide many of the architectural services (like batch services).

Some natural representation of the batch architecture must be developed and transparently integrate with the existing business components and still support all of the architectural requirements.

Therefore, represent each type of batch job in the system as its own class. An abstract class (BatchJob) will exist from which all specific types of batch jobs will derive from. The abstract BatchJob contains data that all batch jobs require:

name, current status (pending, started, finished, deleted), messages encountered during its run, various times (submission, start, completion), and a priority, for example. It also should provide some default behaviors including running the job and logic to execute before and after the run.

Figure 56:
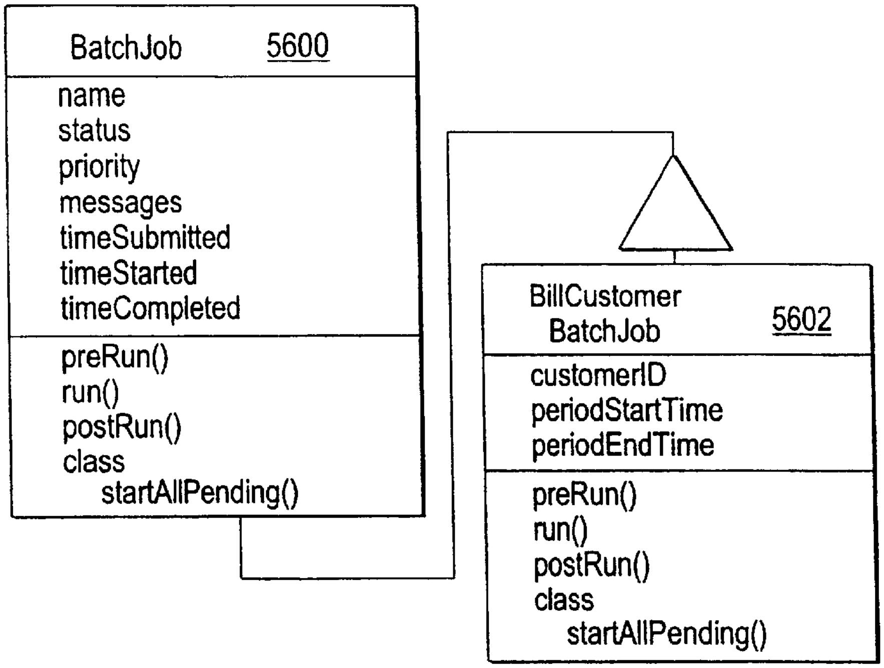
FIG. 56 illustrates a class diagram of the batch job hierarchy.

FIG. 56 illustrates a class diagram of the batch job hierarchy.

Various system batch job classes can subclass from the abstract BatchJob 5600 and add their own required attributes and behavior. A "Bill Customer" batch job may need the identifier of the customer to bill and the time period for which to bill. These should be attributes added to the concrete subclass: BillCustomerBatchJob 5602. In addition, the concrete class needs to supply the actual logic that the batch job performs (along with any pre- and post-run logic).

Finally, the concrete batch job class should provide some way to start-up all of the pending jobs in its class. A class method is implemented on the abstract class to start all pending jobs. This method can be overridden by any concrete extension of the BatchJob superclass.

By implementing batch job instance as any other type of object, the batch architecture may then take advantage of the same system services available to all other business objects in the system (persistence, transaction management, error handling, logging, security, etc.).

Benefits

- Natural Representation. Each type of batch job is represented by an object. This allows it to interact with the rest of the system in a natural way.
- Extensibility. By providing an abstract superclass, adding new types of batch jobs only require adding a new concrete class to the system.
- Architectural Separation. Batch Jobs that are not implemented "inside" the object-oriented environment can still be tracked by the batch job objects. The rest of the system is unaware of the batch job objects.

Figure 57:
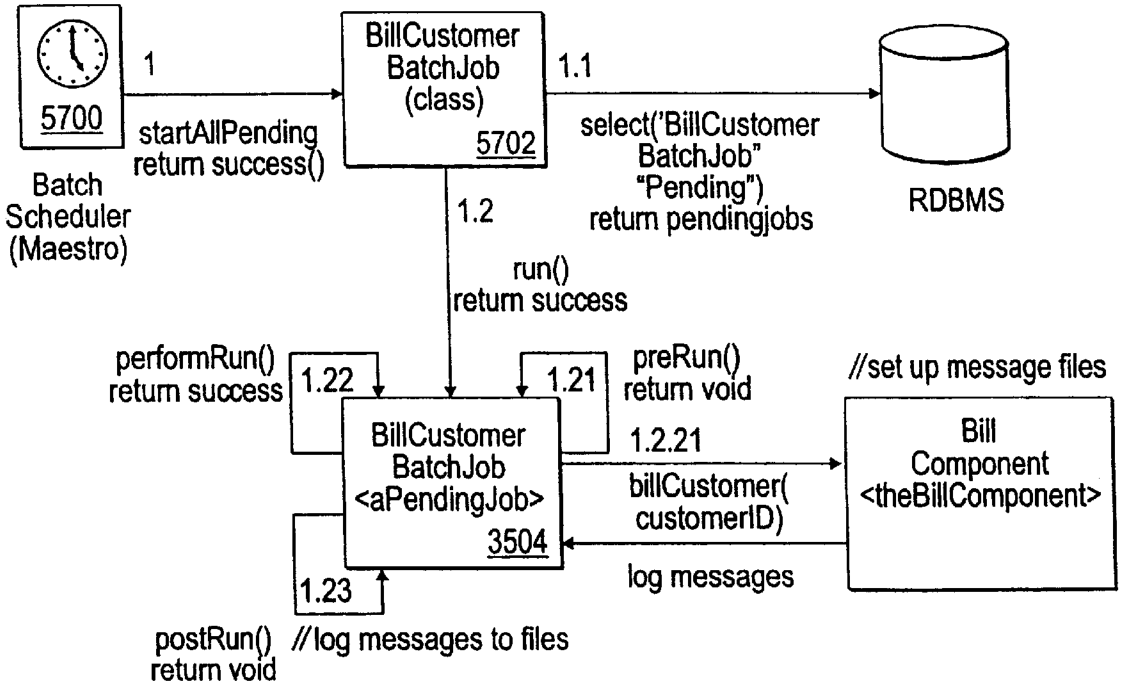
FIG. 57 illustrates an object interaction graph of a possible implementation of the class diagram of FIG. 56.

FIG. 57 illustrates an object interaction graph of a possible implementation of the example of FIG. 56. FIG. 57 illustrates a batch scheduler 5700 which interfaces a BillCustomer Class component 5702 which in turn interfaces a BillCustomer BatchJob component 5704

- ISO New England energy eXchange. A net-centric internet system build for managing functions associated with a competitive energy market. The energy eXchange is implemented in Java across client and server components and using CORBA as a communications architecture.

Batch processes are often highly resource intensive. In many cases the required throughput demands the use of multiple processors, possibly distributed, to provide scalability. How, then, should one structure one's batch workload to facilitate a robust and scaleable system?

BUW

One of the primary-techniques used to achieve scaleable batch applications is parallel processing. There are many different types of parallel processing, but the simplest and easiest to exploit occurs when the problem domain contains many independent work items. In this case, the work can simply be divided among the available processors, providing nearly linear scaling.

Happily, this is exactly the situation encountered in many batch systems. However, also given the nature of batch processing, the variety among the various work items will likely be large. This of course leads to the need to treat some items differently than others, and there goes the nice clean scaling model.

With this in mind, some alternative approach must be used which will allow a cleanly scaleable framework to handle multiple heterogeneous work types.

Therefore, one creates an abstraction which represents a batch unit of work. Now the design tension comes in. Clearly one common abstraction is easy to parallelize, but not very interesting to manipulate due to its very generic nature (at least if you're interested in type safety). This quickly leads us to design a shallow tree of more interesting abstractions, and again one's clean scaling model seems threatened.

The key is to treat the work units as top level abstractions while they are being routed among processing nodes and to treat them as more interesting derived abstractions when internal to a node. Treating them as topmost abstractions between nodes provides a good lever for robust processing, as typical actions like IO/persistence, recovery, auditing, etc. can often be treated uniformly for all types.

Treating work units as derived abstractions while internal to a node is achieved by actually creating the abstractions within the node. See the Abstraction Factory pattern for details on one way to achieve this.

So are we safely scaleable now? Not necessarily. There is still the danger that a given processing node will be presented with a unit of work it cannot deal with.

Kind of like asking a parking meter for a hot pastrami. This situation can be avoided with proper workflow, or with sufficient structure, a dynamic library loading version of the Abstraction Factory could, in effect, tell the parking meter how to fix sandwiches. This of course, has the effect of a one time performance hit as the processing node is instrumented with new capabilities.

Implementations of this pattern will vary widely depending on the selection of languages and technical architectures. The key is that the all work units in the system are derived from a single abstraction. This abstraction contains key interfaces that are appropriate at the workflow level. Derived abstractions add interfaces as needed functionally.

Abstraction Factory, in which concrete objects are created by the factory and returned to the Factory's client as an abstraction. CSH.

Processing Pipeline

Figure 59:
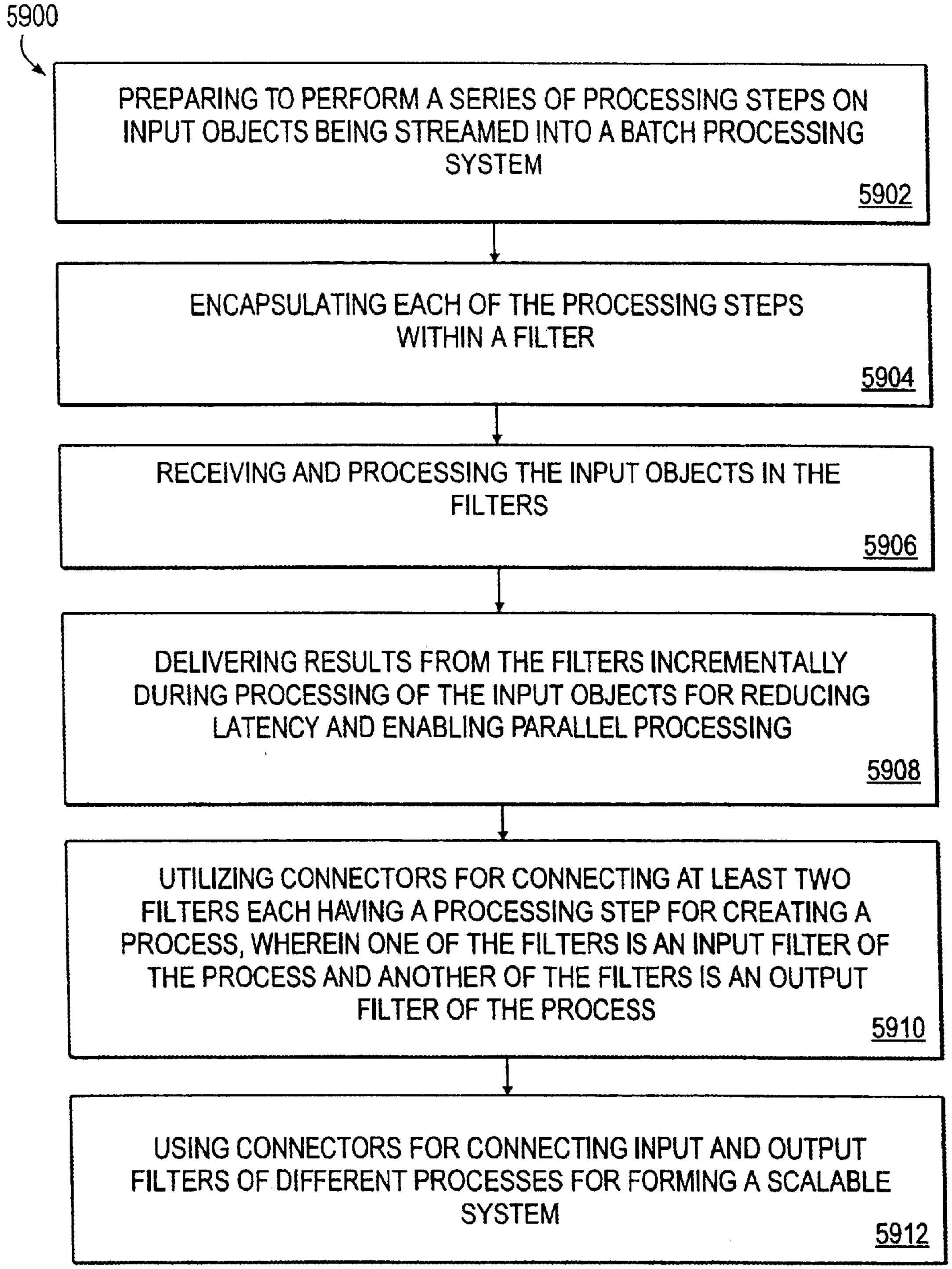
FIG. 59 illustrates a flowchart for a method for structuring batch activities for simplified reconfiguration in accordance with an embodiment of the present invention.

FIG. 59 illustrates a flowchart for a method 5900 for structuring batch activities for simplified reconfiguration. In operation 5902, a series of processing steps are prepared for performing on input objects being streamed into a batch processing system. Each of the processing steps is encapsulated within a filter in operation 5904. The input objects are received and processed in the filters in operation 5906. In operation 5908, results are delivered from the filters incrementally during the processing of the input objects for reducing latency and enabling parallel processing. In operation 5910, connectors are utilized for connecting at least two filters each having a processing step for creating a process. One of the filters is an input filter of the process and another of the filters is an output filter of the process. Connectors are also used in operation 5912 for connecting input and output filters of different processes for forming a scalable system.

There may be several instances of a particular type of filter running in parallel. A portion of the filters may be active and a portion of the filters may be passive. In such a situation, the active filters may pull input data and data may be pushed into the passive filters. Additionally, the input filter of the process may be an active filter and the remaining filters of the process may be passive filters.

The connectors may perform the steps of acting as a choke point for data to be pulled from a filter, connecting serial filters defined as independent processes, and/or multiplexing to demultiplexing from several filters of the same type running in parallel. As another option, one of the filters may be positioned between the input and output filters of the process for translating an output of the input filter into an input type of the output filter.

How do I define a disciplined strategy to structure the components performing processing steps within a batch system so that the system is cleanly partitioned while maintaining performance and scalability goals?

Often batch processing systems perform a series of processing or transformation steps on input objects that are streamed into the system. Implementing such a system as a single component is not feasible for several reasons: portions of the component must be developed by several developers, requirements are likely to change and it is difficult to cleanly partition the modules resulting in a highly coupled system.

Compounding the difficulty in implementing the system is the fact that most batch systems must satisfy the following challenging requirements:

Must be able to satisfy extremely stringent performance criteria.

The system must scale to meet client's volume.

The system must be flexible enough to be adapted to various contexts.

These requirements are difficult to meet for any system, and batch systems' stringent demands often lead developers to think they cannot use component technology. Building a procedural batch system to satisfy the requirements listed above may result in a complicated set of modules that are difficult to maintain as the system is scaled. By utilizing component technology's ability to manage complexity through encapsulation, a component-based batch system can more easily be defined with clean partitioning than when using a procedural paradigm. Defined with foresight, this partitioning enables the system to scale to meet difficult performance requirements.

Therefore, encapsulate each processing step within a filter component. A filter consumes and delivers its results incrementally, rather than consuming all of its input before producing output. The incremental nature of filters allows them to significantly reduce latency and enables true parallel processing.

A supplier provides the input to each filter, and the filter's output flows to a consumer. Suppliers and consumers may be objects that read files, databases or queues, other filters or any type of object supplying or accepting data. In order to produce a flexibly arranged system, connect the initial supplier, the filters and the final consumer with pipe components that are responsible for implementing the data flow between adjacent filters.

As a result of filter processing's incremental nature, one or more filters, tied together with pipes, define a process's Logical Unit of Work (LUW); i.e., the filters defining the steps of the process are sandwiched by the beginning and ending of the transaction. Expanding this model, each subsystem representing the LUW can be modeled as a filter with input and output that encompasses the internal filters. These filters are then tied together through the use of pipes to represent the system. In this manner, the Processing Pipeline pattern offers a consistent way to view the system that scales to whatever size and degree of complexity the system grows.

Benefits

Scalability. Each filter performs its data processing and transformation independently of other filters. By leveraging off some pipe forms' multiplexing/demultiplexing techniques, there may be several instances of a particular type of filter running in parallel.

Partitioning. As a result of encapsulating each processing step within a filter component it becomes easier to manage the balance between coupling and cohesion since there are disciplined and well-defined interfaces surrounding the components.

Flexibility. Since filters make little assumptions about the world around them, they can be arranged in any manner; several filters can be combined together and wrapped by a larger-grained filter; filters can be dynamically assembled at run-time depending on some context, etc.

Filters

At a high level, there are two types of filter components: active filters and passive filters. An active filter pulls input data from its suppliers, processes the data and outputs the result to its associated consumer. In contrast, input data is pushed into a passive filter, which then performs its processing step and outputs to its consumer.

Typically a system is defined by an active filter at the beginning of the Processing Pipeline, that pulls input data from the data source and initiates further processing by pushing the data to a chain of passive filters situated down the pipeline. Often the active filters are only responsible for pulling data into the system, while the core business functionality is performed by passive filters.

Because active and passive filters demonstrate different levels of pro-activity, it is useful to further break down the type of consumers and suppliers into four general types: push suppliers, pull suppliers, push consumers and pull suppliers. These four simple abstract interfaces help segregate the fundamental, yet disparate, behaviors. Active filters inherit both from PullConsumer and PushSupplier. Active filters' sources inherit from PullSupplier, and their destinations inherit from PushConsumer. Passive filters inherit from PushConsumer and PushSupplier. Passive filters' sources inherit from PushSupplier, and their destinations inherit from PushConsumer.

Pipes

While filters define the basic processing steps, pipes define how to flexibly configure the system. Pipes can be used to connect filters in a wide range of configurations:

Acting as a choke point for data to be pulled from an active filter

Connecting serial filters defined as independent processes

Multiplexing to/demultiplexing from several filters of the same type running in parallel Pipes may use buffering, multiplexing and de-multiplexing techniques in order to transfer data between filters. Some examples of useful pipe implementations include:

Channeled Pipes. Perhaps the most generally useful form of a pipe is based on the CORBA Event Channel object, which can connect any number of Push/Pull Suppliers to any number of Push/Pull Consumers.

Multithreaded Pipes. These pipes route data to one of several filter threads. The data can then be joined back to the primary thread on the other end of the filter with a demultiplexing pipe.

Database Queue Pipes. These pipes wrap around a database queue to enable seamless data transfer between processes.

The various command shells enable filter programs to be tied together into a Processing Pipeline.

Collaborations

Abstraction Factory. Often filters will need to produce new data objects from input but are only aware of the data's abstract interfaces. As a result of this generality, the filters will need to utilize an abstraction factory to produce concrete objects without knowing their concrete class types.

Business Logic Service Patterns (1024)

As is stated in the Component Technology Architecture Framework, "Business components are the core of any application, they represent concepts within the business domain. They encapsulate the information and behavior associated with those concepts. Examples of business components include: Customer, Product, Order, Inventory, Pricing, Credit Check, Billing, and Fraud Analysis." These are the components that in many cases have been the most elusive for reuse but hold the highest promise for attacking the cost of development. In this area there are at least three targeted categories of business components, Common Business Components, Common Business Services and Common Business Facilities.

Common Business Components are those components from the preceding list that encapsulate key business concepts. At one level these components represent cross application components that are common to a plethora of applications. These include concepts like Customer, Company, Account, Shipment, etc. These common components normalize how basic behavior surrounding common business concepts can be normalized. Common Business Components are very concerned about the validity of the relationships they have with other components and ensuring that the information relationships are maintained correctly.

Common Business Services deal with the higher level services that abstract out the "Business Unit of Work" or more transactional aspects of business processing. Having components that capture key processing concepts normalizes the processes for handling business events. These are services like credit checks, ordering, servicing problems, shipping, product selection, etc. They tend to capture business practices and when reused enable a company to increasingly leverage the value of those practices.

Common Business Facilities are those services that deal with areas of more engineering component type reuse. These include base common facilities like reason codes, currency management, telephone and address manipulation and validation of these common business types.

How do the patterns in this section help?

The patterns described in this section represent some initial attempts to capture basic concepts that are useful in the area of Common Business Facilities. They are by no means exhaustive but represent building blocks in a complete solution. Both provide tremendous value in solving two key challenges which appear on every engagement.

The Constant Class pattern describes a facility for ensuring correct data at the attribute level.

The Attribute Dictionary describes a facility for encapsulating architectural mechanisms within business objects.

Attribute Dictionary

Figure 58:
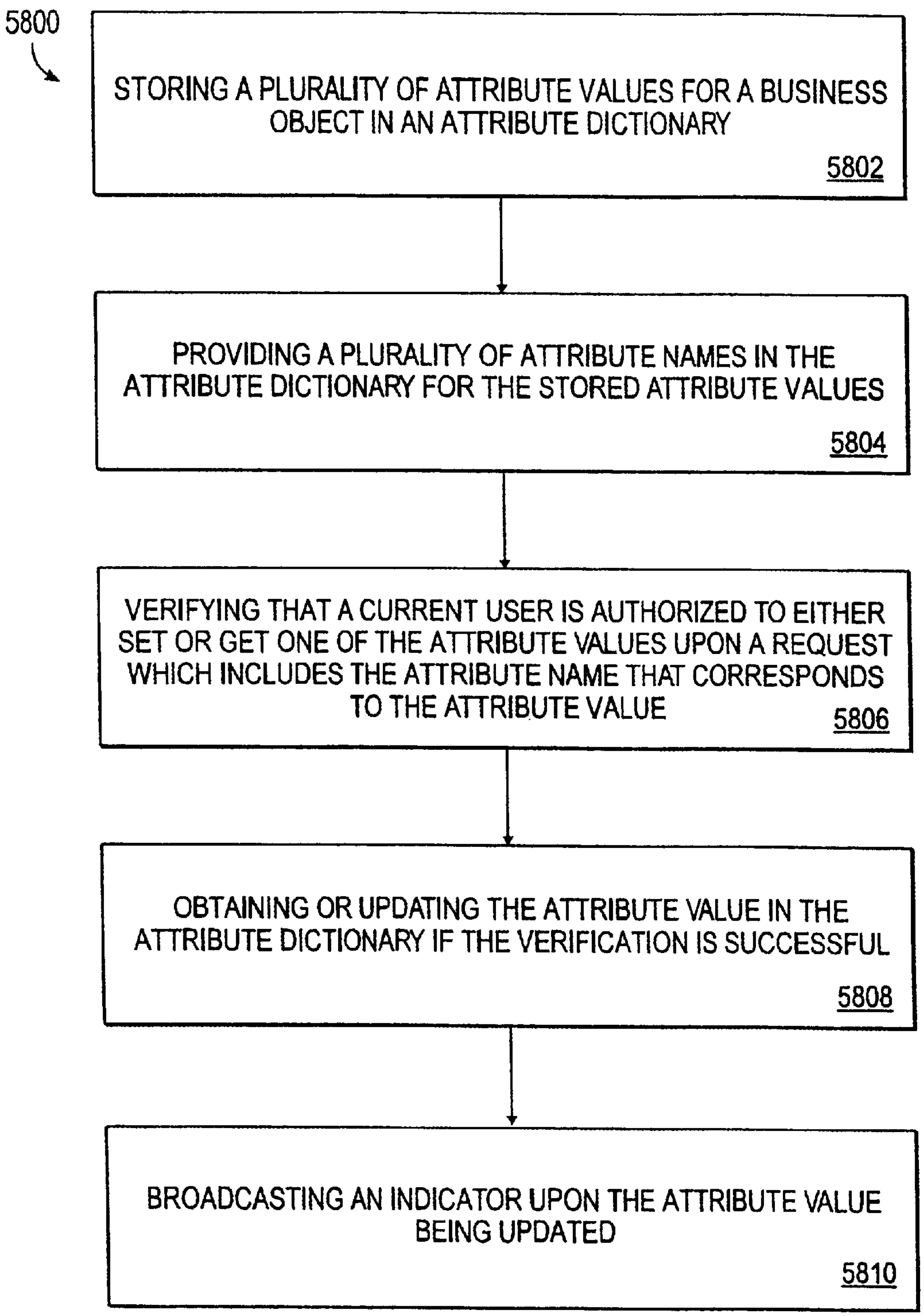
FIG. 58 illustrates a flowchart for a method for controlling access to data of a business object via an attribute dictionary in accordance with an embodiment of the present invention.

FIG. 58 illustrates a flowchart for a method 5800 for controlling access to data of a business object via an attribute dictionary. A plurality of attribute values for a business object are stored in an attribute dictionary in operation 5802. A plurality of attribute names are provided in the attribute dictionary for the stored attribute values in operation 5804. Next, in operation 5806, it is verified that a current user is authorized to either set or get one of the attribute values upon a request which includes the attribute name that corresponds to the attribute value. The attribute value in the attribute dictionary is obtained or updated if the verification is successful and an indicator is broadcast upon the attribute value being updated in operations 5808 and 5810.

In one embodiment, a list of the attribute names may be outputted in response to a request. Additionally, the list may also include only the attribute names of a portion of the attribute values of the business object that are present.

In one aspect, the attribute values may be obtained for auditing or rollback purposes. In another aspect of the present invention, a dirty flag may be set upon the attribute value being updated.

Typically, business objects include "getter" and "setter" methods to access their data. How can I support value-added processing, such as logging events for changes, without impacting application code?

Typically, business objects store attributes in instance variables. The application code for a typical setter for an attribute is depicted as:

```
public void setBalance(Float newBalance) {
        myBalance = newBalance;
        return;
}
```

Initially, this is straightforward. However, after all of the attribute setters and getters have been coded, the need may arise for an event to be broadcast each time an attribute is updated. The code for a simple setter would need to change to become:

```
public void setBalance(Float newBalance) {
        myBalance = newBalance;
        this.notifyChanged("Balance");
        return;
}
```

Now each attribute setter must contain the call to the 'notifyChanged' architecture method. This implementation forces architecture mechanisms to be intrusive to application code. Moreover, addition or extension of architecture processing should not impact business logic. One new line of code alone may not seem like a large burden on application developers. However, many other architecture requirements might later affect each setter or getter.

As another example, before updating an attribute, a check may be required to determine if the current user has security rights to update attributes. Also, after successful update, a dirty flag may be set, or an audit log may be performed. The code for each setter now looks as follows:

```
public void setBalance( Float newBalance ) {
      // keep track of my original balance,
      // for post-change processing, then do
      // some pre-processing to check
      // that the user has access rights
      Float oldBalance = myBalance;
      this.assertCanSetAttribute( "Balance" );
      // finally update the balance, then
      // broadcast, set the Dirty Flag,
      // and log
      myBalance = newBalance;
      this.notifyChanged( "Balance" );
```

-continued

```
        this.makeDirty();
        this.logChanged( "Balance", oldBalance );
    }
```

Thus, each added architecture framework for gets and sets must be manually added to all getters and setters. Such changes impact application developers during coding and maintenance. Moreover, they also complicate business logic with technical details.

Therefore, the application architecture should control access to a business object's data. This will separate out reusable, technical, architecture details. Business objects should use an Attribute Dictionary to provide an architectural hook for attribute getters and setters. Moreover, this framework should handle all architectural processing related to the update and access of data, transparently to application logic.

Rather than using instance variables, the Attribute Dictionary holds all attribute values for the object. This dictionary is a collection, keyed by attribute names. Then the architecture can provide generic architecture methods to get and set attributes in the dictionary.

Business objects could each delegate directly to the Attribute Dictionary within the attribute getter and setter. However, rather than having each business object talk directly to the Attribute Dictionary, simple helper methods can be created in a superclass for business objects. This simplifies the interface for application developers, who do not need to know about the Attribute Dictionary. This also allows for business object specific logic to also be added prior to and after the dispatch to the Attribute Dictionary.

The code for a simple setter now would look like:

```
class Account extends BusinessObject {
public void setBalance( Float newBalance ) {
    // set my balance with the new value
    // passed in. The architecture will handle
    // any technical details related to
    // setting the data.
    this.setAttribute( "Balance", newBalance);
}
}
```

The architecture superclass will then perform the following:

get the original value, perhaps for auditing or rollback purposes check if the user has security access to set the attribute update the attribute on the Attribute Dictionary if successful, broadcast and log the change The Attribute Dictionary would then contain the code to:

update the value for the given attribute name set the dirty flag

This illustrates that both the superclass facade and the Attribute Dictionary can have different processing. In general, one generic location for getting and setting attributes supports (but is not limited to):

logging broadcasting dirty flag security checking

NULL field value handling

This logic will be either in the facade methods (for any code that is business object specific), or the generic methods on the dictionary, thereby shielding developers from this added complexity.

Benefits

Maintainability. Architecture code can be added and changed in one place for all objects, without change to the application code.

Flexibility. The implementation of the storage mechanism can be changed as needed to improve performance.

Readability. The methods used in application code to retrieve and update fields on the object are generic. These methods do not have excess architecture code to detract from the purpose of the method.

Object Model

Figure 60:
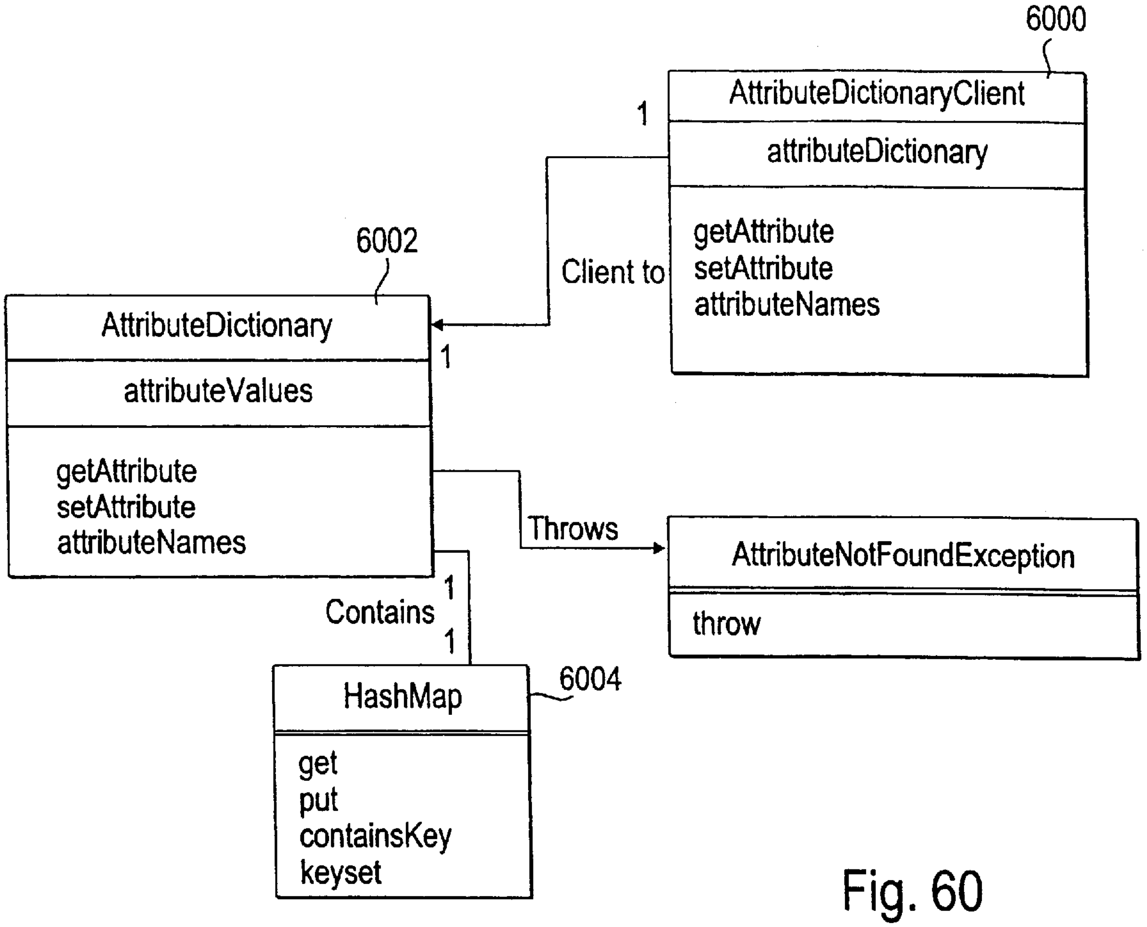
FIG. 60 illustrates the manner in which the AttributeDictionaryClient is the facade which delegates to the AttributeDictionary.

FIG. 60 illustrates the manner in which the AttributeDictionaryClient 6000 is the facade which delegates to the AttributeDictionary 6002. For example, business objects would inherit this behavior. AttributeDictionaryClient 6000 probably wouldn't be the immediate superclass, but it would be somewhere in the hierarchy. In this manner, stateful business objects, like Account or Customer, can easily take advantage of the Attribute Dictionary.

The attributeValues attribute on the Attribute Dictionary is shown as an instance of the HashMap class 6004, which stores key value pairs. The HashMap Collection is used to provide access to attribute values based on the attribute name. This is required for a direct lookup of values associated with attribute names. Such lookup can use string representation of the attribute names.

Object Interaction Diagrams

Figure 61:
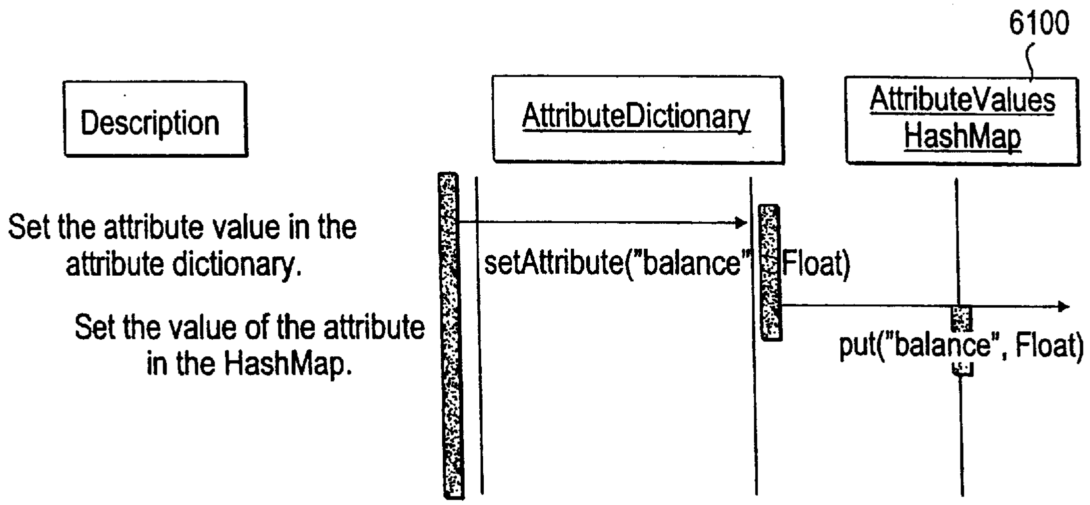
FIG. 61 depicts the use of the containsKey() method on the HashMap to ensure that the value will exist before the get() method is used.

There are four interactions for this framework: Simple Attribute Getter, Simple Attribute Setter, Failed Attribute Getter, and Retrieval of Attribute Names. FIG. 61 illustrates the internal implementation of the dictionary.

Figure 62:
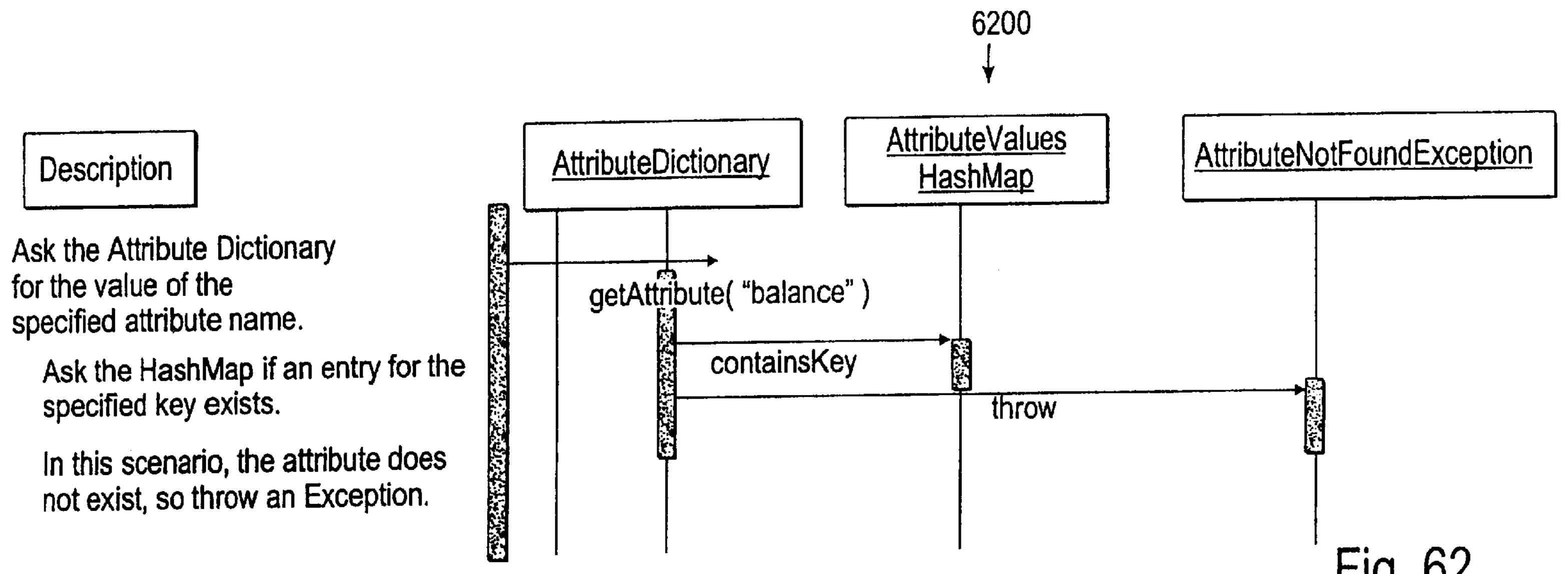
FIG. 62 illustrates a method that dictates that any nullPointerException that is thrown would be caught and rethrown as the more user-friendly exception in the attribute dictionary pattern environment.
Figure 63:
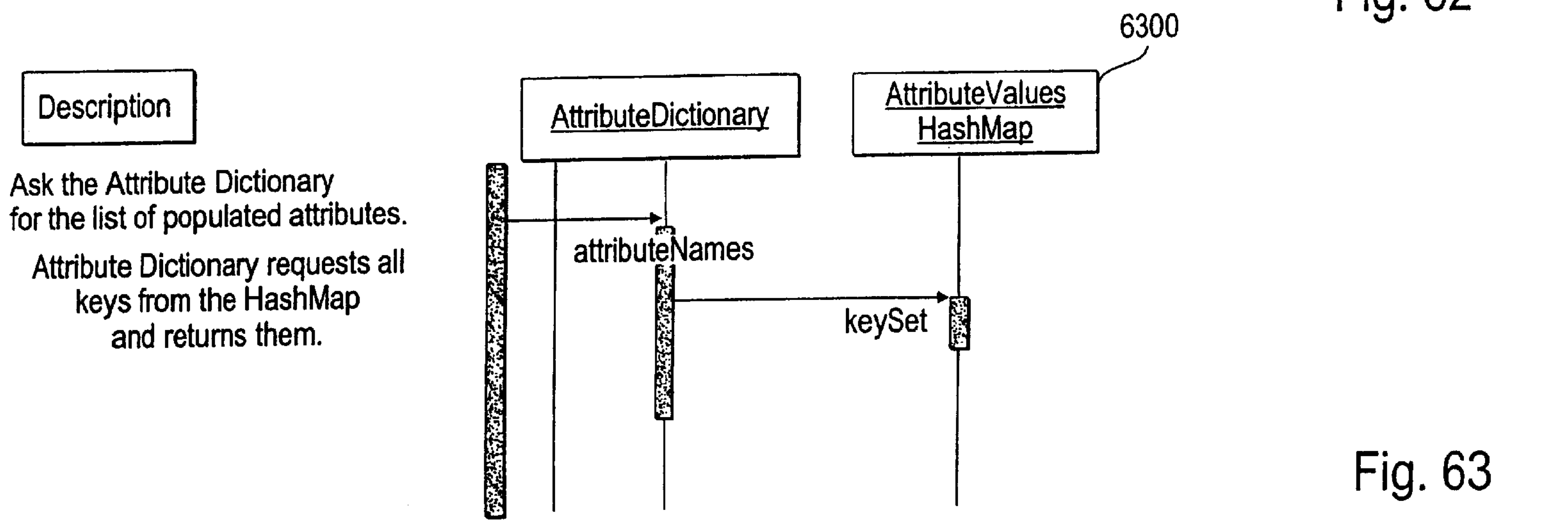
FIG. 63 illustrates the Get the Attribute Names method in the attribute dictionary pattern environment.

FIG. 61 depicts the use of the containsKey( ) method 6100 on the HashMap to ensure that the value will exist before the get( ) method is used. This proactive search for the value ensures that the nullPointerException is not thrown from the AttributeDictionary. The performance of such methods will be checked during testing. If such processing is not performant, the code can be altered and the call to containsKey( ) removed. In that case, the HashMap will need to wrap a try-catch block around the get( ) method. FIG. 62 illustrates a method 6200 that dictates that any nullPointerException that is thrown would be caught and rethrown as the more user-friendly exception in the attribute dictionary pattern envronment. FIG. 63 illustrates the Get the Attribute Names method 6300 in the attribute dictionary pattern envronment.

Public Interface

The following are methods on the AttributeDictionary. The AttributeDictionaryClient exposes similar public methods.

public Object getAttribute(String attributeName) raises AttributeNotFoundException;

The return value of getAttribute( ) is typically a wrapped primitive, or Java type, for most attributes. This includes, for example, an account balance (Float) or account number (String). The return value of these wrapped primitives must be cast, as illustrated in the following example:

```
class Account extends BusinessObject {
      public Float getBalance() {
      // get my balance using the superclass facade
      // cast the return value before returning it
      return (Float)( this.getAttribute( "Balance" ));
      }
}
```

Other methods on the AttributeDictionary include:

public void setAttribute(String attributeName, Float attributeValue);

public void setAttribute(String attributeName, String attributeValue);

public void setAttribute(String attributeName, BusinessObject attributeValue);

. . .

These overloaded methods create a generic interface to the AttributeDictionary for attribute setters. They ensure type checking, such that no attributes will be set to a value other than those for which an overloaded method exists.

public String[ ] attributeNames( );

The method attributeNames( ) returns a collection of the names of only those attributes that have been populated (or set) on the dictionary. This might be useful for other frameworks, which may want to iterate over all attributes. At any particular time, a business object may not contain all of its attributes (e.g., because of partial retrieval from the database). So this may be a subset of the full attribute list for the object.

Constant Class

Figure 64:
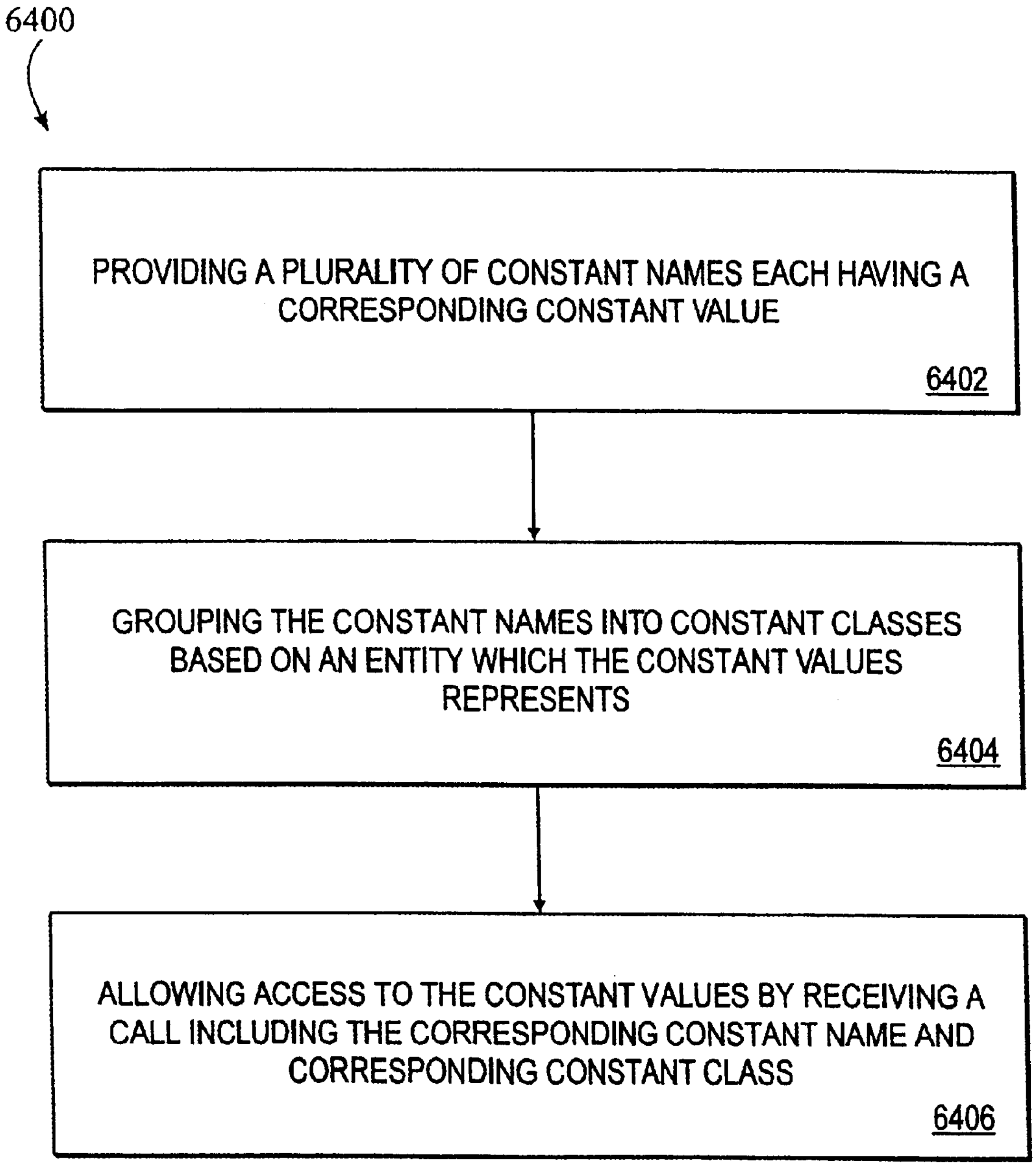
FIG. 64 illustrates a flowchart for a method for managing constants in a computer program in accordance with an embodiment of the present invention.

FIG. 64 illustrates a flowchart for a method 6400 for managing constants in a computer program. In operation 6402, a plurality of constant names are provided with each constant name having a corresponding constant value. The constant names are grouped into constant classes based on an entity which the constant values represent in operation 6404. Access is allowed to the constant values in operation 6406 by receiving a call including the corresponding constant name and corresponding constant class.

In one aspect, the constant values may be changed upon being accessed. In another aspect, the constant value may also include an enumeration. Also, in one embodiment, accessor logic modules may be assigned to a plurality of the named constants with the accessor logic modules being executed upon the accessing of the corresponding constant value via the accessor logic module. Also, the accessor logic modules may be edited per the desires of a user. Additionally, the constant values may be accessed without the accessor logic modules.

Literals are hard-coded constants referenced in multiple places. How can source code refer to literals in a maintainable fashion?

The concept and value of named constants have been realized for quite some time. The idea can date back to Assembler language naming memory locations where data was stored. The purpose is to give the ability to refer to fixed values by the name of what they represent rather than by the quantity they are set to.

Named constants allow a programmer to "parameterize" a system. This allows a programmer to change a constant's value in a single place rather than every place the constant is used. In addition to the maintenance gain, readability is also increased.

Many languages offer mechanisms to implement named constants. These include PoolDictionaries (Smalltalk), enums (C and C++) and public static final declarations (Java). Difficulties arise during implementation of these mechanisms with respect to type constraints, visibility, and type checking.

Using these traditional approaches, results in global namespace for these literals. This can result in name collisions. For example, the name HIGH to define a large magnitude could translate into different values for different uses. A HIGH temperature could be 95 while a HIGH altitude could be 39000.

In addition, constants often belong to logical groupings. For instance, STOCK, BOND, and OPTION are all types of financial instruments. These belong in a some sort of collection.

A consistent, quality method to represent constants in an object-based system is required.

Therefore, represent named constants in a separate class, grouping categories of constant values together within one name space. Constants tend to naturally fall into logical groupings. Each grouping should be represented by its own class. For instance, all of the constants used by a PhoneNumber object to capture the various types of PhoneNumber (i.e. home, business, fax, cell, pager, etc) can be accessed through a PhoneTypeConstants class.

If constants are obtained by other means than explicit language constructs like "public final int HOME_ADDRESS" than public accessors are used to insulate a client from changes in how the constant is obtained. In this case the values of each of the constants should be defined privately inside the Constant Class. Public accessors are then provided for clients to obtain the constant values. This allows for "changing constants". Business-related values that may seem constant at design and construction time very often are not. Some of these "constants" may eventually require some logic to determine their value. If clients obtain constants through accessor methods, no changes.(except within the accessor) will have to be made if the logic is added. This is a particularly safe practice when programming rules dictate all constants to be stored and retrieved from database tables.

In the case where constants are defined within the class itself most OO languages, excepting Smalltalk, allow for some type of const definition. In this case by using a const construct (i.e. static final int PhoneNumberType FAX=new PhoneNumberType( )) it is not necessary to have public accessors and private definitions. Declare the class type, create static final instances of the type and do not provide a public constructor. This ensures the type safety and provides easy to access members in the Eiffel style.

Moreover, public accessors in either strategy provide for type-safe enumerations. Enumeration is a special type of constant that deserves attention. A TypeConstant class can provide enumeration by implementing some key methods that provide for supporting iteration over the elements of the enums. In Java, for example, this entails implementing the Enumeration interface.

Benefits

Maintainability. Groups all valid values together and ensures they can not be created or passed as parameters by any other method.

Type Safety. Enumeration values can be type-checked by a compiler in method parameters and return values.

A common application pattern where this use of constants was applied was in the modeling of instances vs instance types where the types added no additional behavior. In two different customer care applications this came through as the objects like PhoneNumber, PhoneNumberType, RatePlan &

RatePlanType, etc. This example has not yet been updated to JavaBeans.

```
package Party;
import java.util.*;
public class PhoneNumberType {
      static final Vector types = new Vector( );
      static final PhoneNumberType FAX = new PhoneNumberType(0,
"Fax");
      static final PhoneNumberType CELL = new PhoneNumberType(1,
"Cell Phone");
      static final PhoneNumberType HOME = new PhoneNumberType(2,
"Home");
      static final PhoneNumberType WORK = new PhoneNumberType(3,
"Work");
      static final PhoneNumberType PAGER = new PhoneNumberType(4,
"Pager");
      private final int phoneNumberTypeOrd;
      private final String typeId;
      private PhoneNumberType(int i, String id) {
            phoneNumberTypeOrd = i;
            typeId = id;
            types.addElement(this);
      }
      public final static Enumeration elements( )
      { // allows for enumeration
            return types.elements( );
      }
      public static void main(String args[ ]) {
            Enumeration elements = PhoneNumberType.elements( );
            PhoneNumberType pt;
            while (elements.hasMoreElements( )) {
                  pt = (PhoneNumberType)elements.nextElement( );
                  System.out.println(pt.toString( ));
            }
      }
      public String toString( ) {
            return typeId;
      }
}
```

This type partition is used by PhoneNumber. See main( ) for uncommenting a line that demonstrates the type safety protection through the use of static final and private constructors.

```
package Party;
import java.io.PrintStream;
import java.io.StringWriter;
public class PhoneNumber
{
      private PhoneNumberType phoneNumberType;
      private String areaCode;
      private String prefix;
      private String suffix;
      public PhoneNumber( ) {
      areaCode = null;
      prefix = null;
      suffix = null;
}
public PhoneNumber(String aPhoneNumber)
{
      parsePhoneNumber(aPhoneNumber);
      setPhoneNumberType(PhoneNumberType.HOME);
}
public PhoneNumber(String anAreaCode, String aPrefix, String aSuffix)
{
      areaCode = anAreaCode;
      prefix = aPrefix;
      suffix = aSuffix;
}
public String areaCode( )
{
      return areaCode;
}
```

-continued

```
public void areaCode(String anAreaCode)
{
      areaCode = anAreaCode;
}
public boolean equals(String aPhoneNumber)
{
      PhoneNumber tempPhoneNumber = new
PhoneNumber(aPhoneNumber);
      return equals(tempPhoneNumber);
}
public boolean equals(PhoneNumber aPhoneNumber)
{
      if (areaCode( ) == null && aPhoneNumber.areaCode( ) != null ||
aPhoneNumber.areaCode( ) == null && areaCode( ) != null)
            return false;
      if (areaCode( ) != null)
      {
            if (areaCode( ).equals(aPhoneNumber.areaCode( )) &&
prefix( ).equals(aPhoneNumber.prefix( )) &&
                  suffix( ).equals(aPhoneNumber.suffix( )))
            return true;
            else
                  return false;
      }
      if (prefix( ).equals(aPhoneNumber.prefix( )) &&
suffix( ).equals(aPhoneNumber.suffix( )))
            return true;
      else
            return false;
}
public static void main(String argv[ ])
{
      PhoneNumber aPhoneNumber;
System.out.println("Testing construction & comparison!");
if(argv.length == 0)
{
      System.out.println("Test with no area code-no masks");
      aPhoneNumber = new PhoneNumber("5579203");
aPhoneNumber.setPhoneNumberType(PhoneNumberType.FAX);
      System.out.println(aPhoneNumber.toString( ));
      System.out.println("Test with area code-no masks");
      aPhoneNumber = new PhoneNumber("2065572039");
aPhoneNumber.setPhoneNumberType(PhoneNumberType.WORK);
      System.out.println(aPhoneNumber.toString( ));
      System.out.println("Test with normal masks");
      aPhoneNumber = new PhoneNumber("(206)557-3920");
      aPhoneNumber.setPhoneNumberType(PhoneNumberType.PAGER);
            System.out.println(aPhoneNumber.toString( ));
            System.out.println("Test equality 5578215 557-8215");
            PhoneNumber temp1 = new PhoneNumber("5578215");
            temp1.setPhoneNumberType(PhoneNumberType.CELL);
            PhoneNumber temp2 = new PhoneNumber("557-8215");
            temp2.setPhoneNumberType(PhoneNumberType.CELL);
            //temp2.setPhoneNumberType(new PhoneNumberType(6,
"TOY")); // enum type safety w/private ctor
            System.out.println(temp1);
            System.out.println(temp2);
            System.out.println("temp1 == temp2: " +
temp1.equals(temp2));
            return;
      } else {
            aPhoneNumber = new PhoneNumber(argv[0]),
            System.out.println(aPhoneNumber.toString( ));
      }
}
private void parsePhoneNumber(String aPhoneNumber)
{
      StringBuffer aStr = new StringBuffer(aPhoneNumber.length( ));
      int i = 0;
      do
            if (Character.isDigit(aPhoneNumber.charAt(i)))
                  aStr.append(aPhoneNumber.charAt(i));
      while (i++ < aPhoneNumber.length( ) - 1);
      String tempString = new String(aStr);
      if (aStr.length( ) == 7)
```

-continued

```
    {
        prefix(tempString.substring(0, 3));
        suffix(tempString.substring(3, 7));
        return;
    }
    areaCode(tempString.substring(0, 3));
    prefix(tempString.substring(3, 6));
    suffix(tempString.substring(6, 10));
}
public String prefix( )
{
    return prefix;
}
public void prefix(String aPrefix)
{
    prefix = aPrefix;
}
/**
*This method was created by a SmartGuide.
*@param sw StringWriter
*/
public void printOn (StringWriter sw) {
    sw.write(((areaCode != null || areaCode == "") ? ("(" + areaCode( ) +
")"): ""));
    sw.write(this.prefix( ));
    sw.write("-");
    sw.write(this.suffix( ));
    return;
}
public void setPhoneNumberType(PhoneNumberType pnt) {
    phoneNumberType = pnt;
}
public String suffix( )
{
    return suffix;
}
public void suffix(String aSuffix)
{
    suffix = aSuffix;
}
public String toString( )
{
    return new String(phoneNumberType.toString( ) +": " + ((areaCode
!=null || areaCode == ) ? ("("+ areaCode( ) + ")"): "") + prefix( ) + "-" +
suffix( ));
}
}
```

Alternatives

Smalltalk allows for grouping logical constants in PoolDictionaries as in TextConstants. This is simply a global dictionary with key value pairs that simplifies and improves readability by using well understood names like "Space" and "Tab". However, they are global variables and they are not automatically recreated when you file in code that depends on them.

When constants are implemented in a class within Smalltalk accessors must be used. There is no real language notion of final or const in Smalltalk that would allow for accessing member variables.

Communications Services Patterns (1008)

An original tenet of component-based design has been simplified distribution of functionality. According to the original argument, up-front definition of component boundaries and their interfaces would simplify the configuration of functionality on the network. Even though component-based design has simplified distribution, it has not guaranteed success. Networks introduce performance issues and failure conditions that didn't exist in non-distributed solutions. If a solution is to be successful, these issues can't be ignored.

Each pattern in this section addresses a difficulty associated with distributed computing. Every pattern reflects a problem and a solution to issues encountered by other development teams.

Legacy systems running on mainframes, Unix boxes, etc. are an important part of today's client projects. The majority of today's clients have existing computer systems that cannot be easily rewritten or ignored. Integration of these older systems with the newly developed applications is often imperative to the success of the project. Any newly developed components must leverage the existing functionality on these Legacy systems. The Legacy Wrapper pattern addresses this problem. It describes a common pattern for tackling the integration issues associated with reusing functionality from existing systems.

Server-side components implement services for use by the Clients in an application. These components should clearly specify the interfaces and services they provide, but how should they make them available? A well-known central service, e.g., a Name Service or Trader Service can be used to make the interfaces available to all Clients, but is that always warranted or prudent? Should every Client have access to every service? The Locally Addressable Interface (LAI) and Globally Addressable Interface (GAI) patterns describe two approaches to this problem.

The performance characteristics of remote components are very different from "in process" components. The cost of requesting and transmitting data between remote components is much higher and should be considered in a distributed solution. As a result, distributed solutions often call for communication patterns that improve upon the performance aspects most important to the system. The Structure Based Communication pattern addresses the "chattiness" associated with distributed applications. It helps reduce network load and increases system response time. The Paging Communication pattern addresses the common need to retrieve and display large lists of data. It shows how incremental fetching can be used to provide much better perceived responsiveness in GUI based applications.

The cost of locating a remote service and establishing a connection to that service can also be a costly endeavor. The Refreshable Proxy Pool pattern describes a robust and efficient way to minimize this "lookup" activity.

Most recent component-based systems use middleware such as CORBA, DCOM or Java RMI to specify the interfaces provided by components and the associated data types. However, such middleware is not always available, or directly applicable. In such situations the Stream Based Communication pattern, or one of its descendants, the Fixed Format Stream and Self Describing Stream patterns might be applicable. These patterns describe different techniques for efficiently streaming data between processes. While they all share a common solution to a common problem, the solutions present different tradeoffs between implementation simplicity, performance and flexibility.

A Null value represents the "empty set" and is an important value in distributed component solutions.

Some languages, such as Java, support Null as a specific value, whereas other languages do not (e.g., C++ which uses zero and context to determine Null). This language mismatch can cause problems in distributed systems that use more than one language. The Null Structure pattern describes this problem and proposes a solution.

Fixed Format Stream

Figure 65:
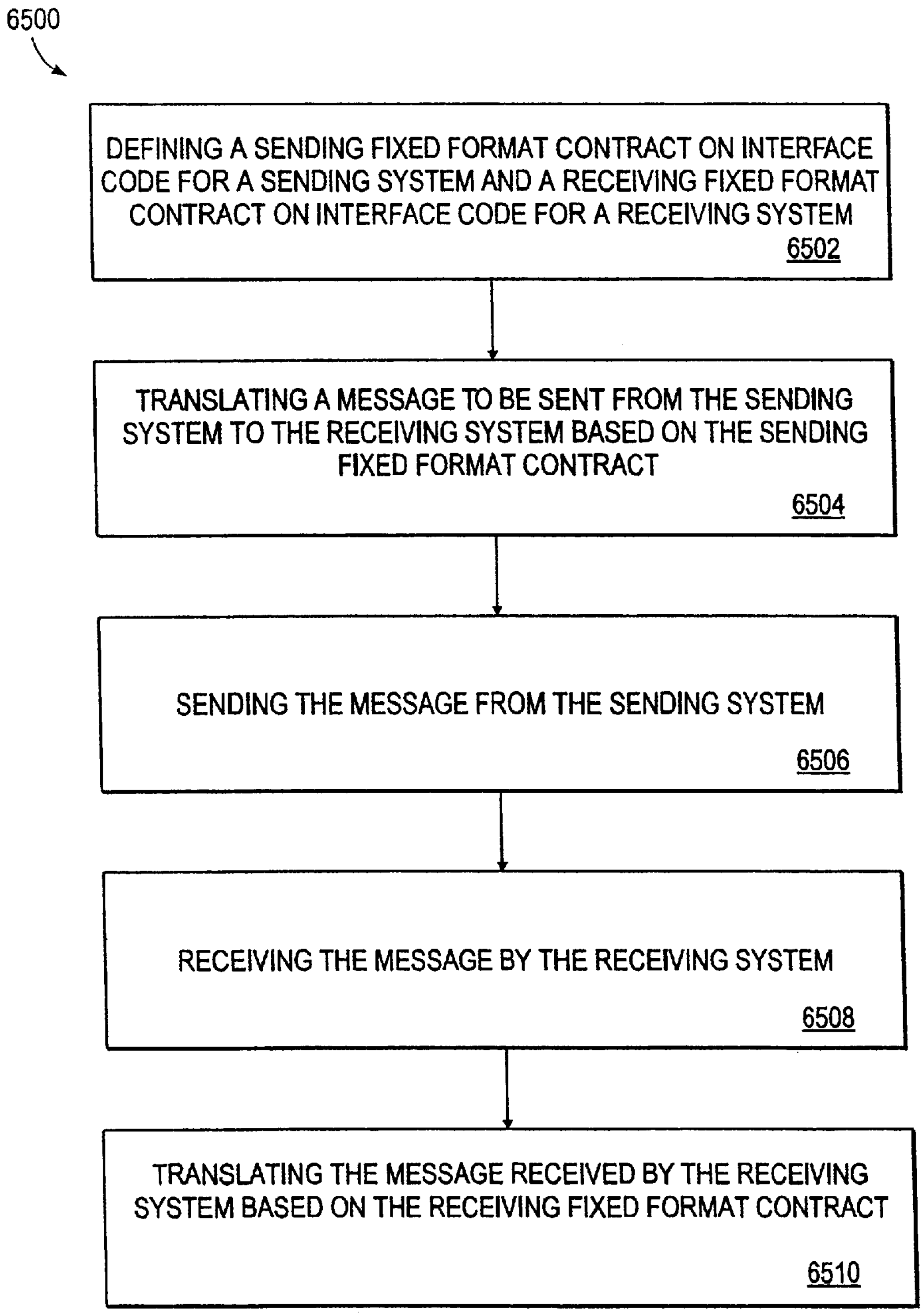
FIG. 65 illustrates a flowchart for a method for providing a fixed format stream-based communication system in accordance with an embodiment of the present invention.

FIG. 65 illustrates a flowchart for a method 6500 for providing a fixed format stream-based communication system. In operation 6502, a sending fixed format contract on interface code is defined for a sending system. A receiving fixed format contract on interface code is also defined for a receiving system. A message to be sent from the sending system to the receiving system is translated in operation 6504 based on the sending fixed format contract. The message is then sent from the sending system and subsequently received by the receiving system in operations 6506 and 6508. The message received by the receiving system is then translated based on the receiving fixed format contract in operation 6510.

In one embodiment of the present invention, information in the translated message received by the receiving system may also be stored in a relational database. In one aspect, the fixed format contracts may be included in meta-data of the message. Also, in another aspect, the message may include an indication of a version thereof.

In one situation, one of the systems is an object-based system and one of the systems may be a non-object-based system. In another situation, both of the systems are may be object-based systems. In a third situation, both of the systems may be non-object-based systems.

Stream-based communication is a very effective pattern for relaying data, data structures, and meta-data. Meta-data is information about the data like data structure, data types, etc. using a shared, generic format. How can the message format be shared between systems so as to create the most straightforward and best performing stream-based mechanism?

Often, it is determined that a stream-based communication mechanism should be used to transport information between systems. Stream-based communication is a pattern where information is transported from one system to another using a simple stream and a shared format to relay the data structure and meta-data information.

Figure 66:
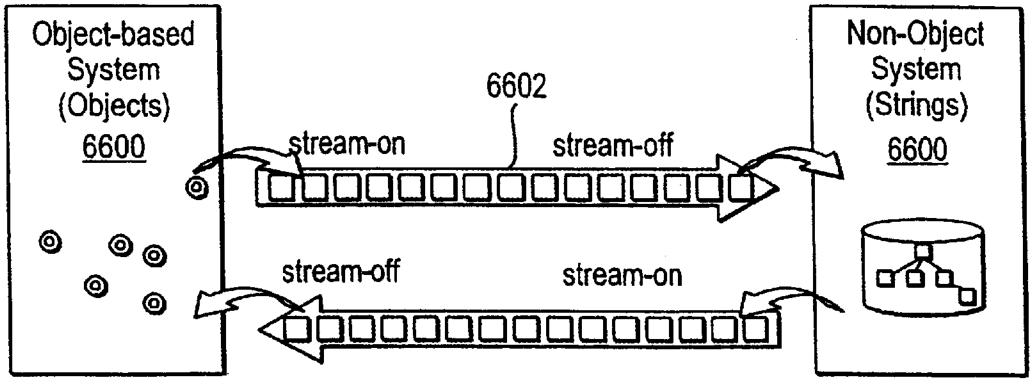
FIG. 66 illustrates two systems communicating via a stream-based communication and using a common generic format to relay the meta-data information.

FIG. 66 illustrates two systems 6600 communicating via a stream-based communication 6602 and using a common generic format to relay the meta-data information.

However, when implementing Stream-based Communication, a number of factors influence the method for enabling each system with a "shared format." The "shared format" provides the meta-data information needed to interpret the raw data in a stream. This shared format is like a secret decoder ring for systems sending and receiving messages. It allows the systems to convert structured data (objects, strings, etc.) into raw data and raw data back into structured data. This is needed to transmit the structured data across the network.

On many projects, the following factors influence the details of communicating using a stream.

- High performance—System performance is always a factor, but sometimes it is one of the most important factors in a system.
- Short development time—The system must be operational in the shortest possible timeframe.
- Stable information characteristics—In some solutions, the data and the structure of the data are stable and unlikely to change.

In cases like this, how can one optimize the benefits of stream-based communication and implement only the most basic capabilities that one requires?

Therefore, use the Fixed Format Stream pattern to create a stream-based message that uses fixed format contracts to share the formatting information and meta-data between systems.

Fixed format contracts are maps that contain the meta-data information such as the data structure, data separators, data types, attribute names, etc. They describe how to translate Fixed Format messages onto a stream and off of a stream.

Figure 67:
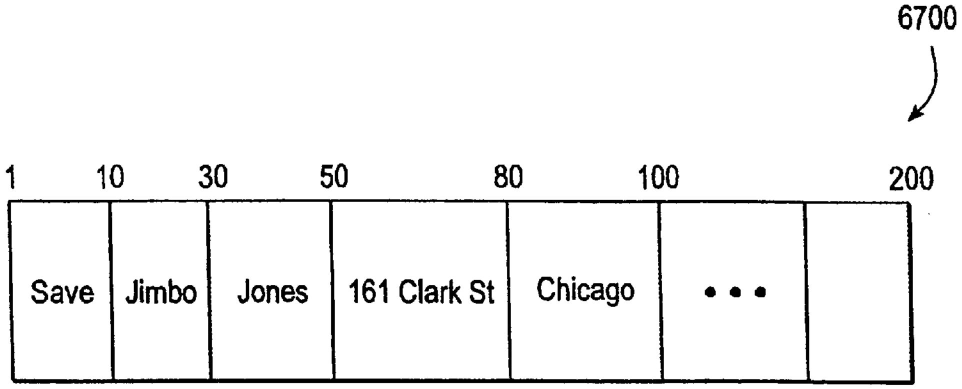
FIG. 67 illustrates an example of a Fixed Format message associated with the fixed format stream patterns.

FIG. 67 illustrates an example of a Fixed Format message 6700 associated with the fixed format stream patterns. The location and size of each attribute in the message is fixed and known at design time. In the example below, it is known that the command will be in bytes 1–9, the first name will be in bytes 10–29, the last name in bytes 29–49, etc. This information (meta-data) is used by the Fixed Format contracts to convert Fixed Format messages from data structures to raw data and back again.

Figure 68:
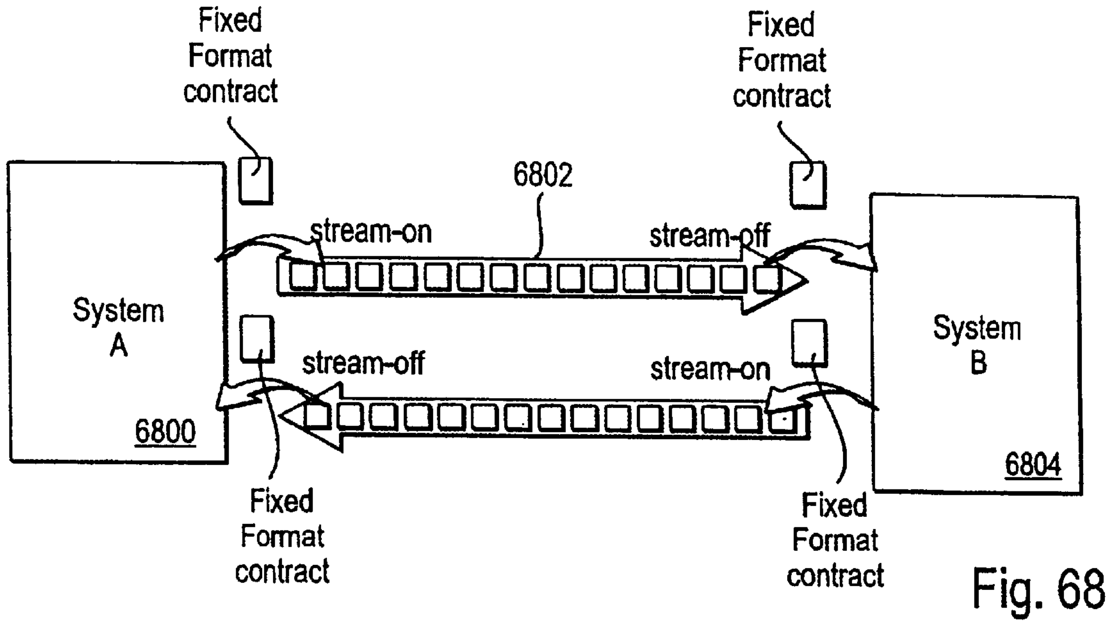
FIG. 68 depicts the complete Fixed Format Stream pattern associated with the fixed format stream patterns.

FIG. 68 depicts the complete Fixed Format Stream pattern associated with the fixed format stream patterns. A data structure on System A 6800 is translated to a Fixed Format message (raw data) using a Fixed Format contract. The message is put in the stream 6802 and sent to System B 6804. System B 6804 receives the Fixed Format Message (raw data) and uses its Fixed Format contract to recreate the data structure. The same process works in reverse when System B 6804 responds to the message request.

Benefits

- Performance. Because there is no time spent on look-ups or dynamic translation of the message, performance is better than with other variations of Stream-Based Communication.
- Small Message Size. Each Fixed Format message contains only data to be sent to the other system. These messages contain no meta-data and are smaller than those in Self-Describing Streams.
- Simplicity. Translating and parsing information onto and off of the stream is straightforward and easier than with the other variations of Stream-Based Communication. The behaviors for the Fixed Format Streaming are contained in the fixed format contracts on the interfaces of the sending and receiving systems and thus easy to find.
- Object Friendly. This pattern is very straightforward to implement in object based systems. The objects contain the fixed format contracts and manage the translation and parsing onto the stream. These objects can access their own private behaviors which makes the interface much simpler.

Figure 69:
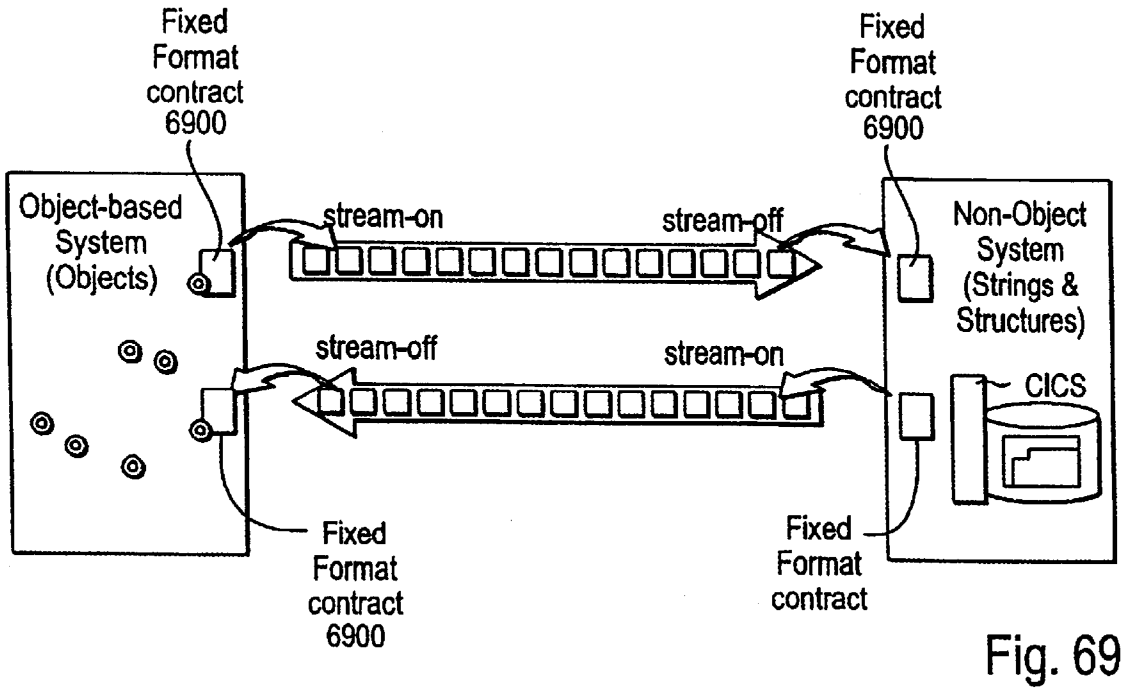
FIG. 69 illustrates fixed format contracts containing meta-data information for translating structured data onto and off of a stream.

Implementing this pattern is very straightforward. Define corresponding fixed format contracts on the interface code of both the sending and receiving systems. FIG. 69 illustrates fixed format contracts 6900 containing meta-data information for translating structured data onto and off of a stream.

In non-object systems, define a fixed format contract on the parsing interface module of the sending system. The interfacing module on the sending system can use the contract as a map for how to translate and write the data onto the stream. Define a corresponding fixed format contract on the interface modules of the receiving system. The interface module on the receiving system can use the contract to read and translate the data off of the stream.

In object-based systems, make each object responsible for its own fixed format contract. Using this contract, each object is able to retrieve and parse its attribute values onto a stream as strings (streamOn) and each object class should be able to parse attributes off of a stream and put them into a new instance of an object (streamOff). Also, it is good practice to include the version of the format within the stream so that concurrent format versions can be accommodated in the design.

Below is a pseudo-code example of an object-based system communicating with a non-object system using stream-based communication and a fixed format contract.

Figure 70:
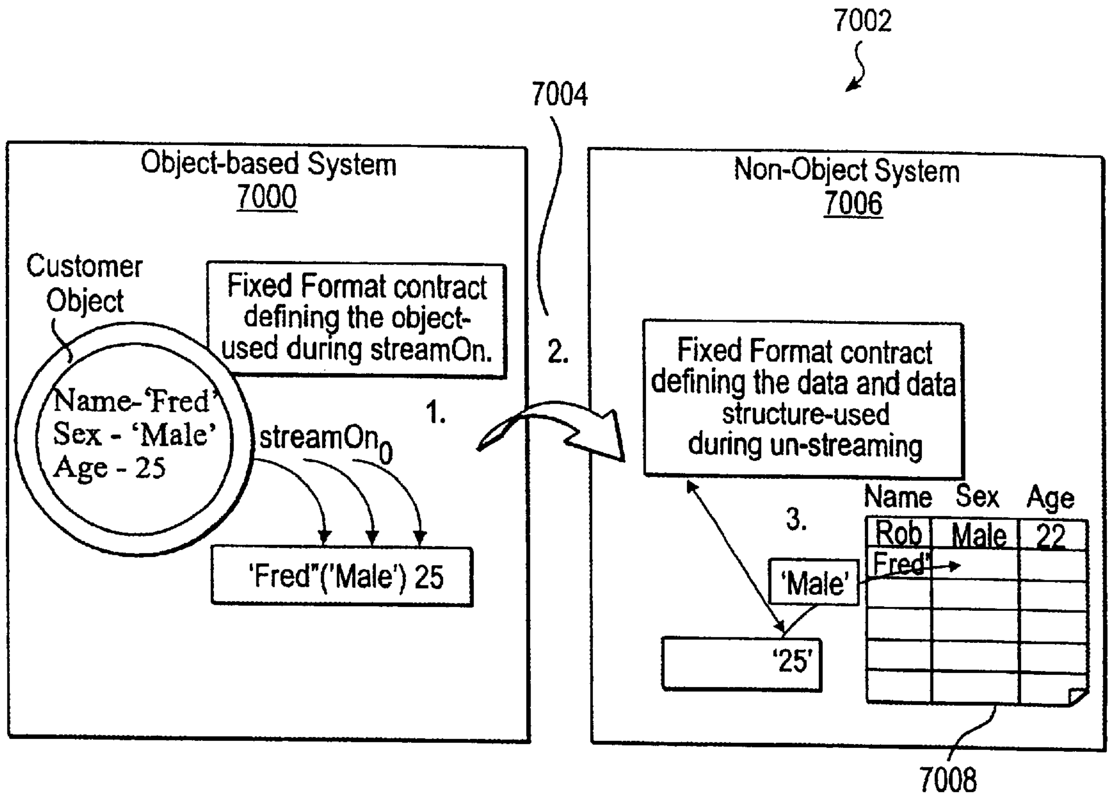
FIG. 70 illustrates a Customer object in an object-based system streaming itself into a stream, the stream being sent to a non-object system, this stream being read and the data inserted into a relational database.

FIG. 70 illustrates a Customer object 7000 in an object-based system 7002 streaming itself into a stream 7004, the stream being sent to a non-object system 7006, this stream being read and the data inserted into a relational database 7008.

1. The CustomerObject with attributes name, sex, and age has a method "streamOn: aStream." It is invoked with an empty stream as the argument 'aStream'. The CustomerObject "streamOn:" method goes through each of the object's attributes and parses each values as a string onto the stream.

The fixed format contract here is embodied in the order that this method parses the attributes onto the stream. A pseudo-code example in Java is the following: Note-Assume that "asString( )" converts the receiver to a string and that "padWithSpaces( )" pads the string with spaces and makes the string the length specified.

```
/** Stream my attribute values on aStream **/
public void streamOn (OutputStream aStream)
{
    aStream.write(this.getName().asString().padWithSpaces(10));
    aStream.write(this.getSex().asString().padWithSpaces(7));
    aStream.write(this.getAge().asString().padWithSpaces(3));
}
```

2. The stream is then put into a message communication mechanism like MQSeries or MessageQ and sent to the non-object system.
3. Once at the non-object system, interface code reads through the stream, parses the values off of the stream, converts them to the appropriate types if required, and puts them in a copybook with the appropriate structure. In this example, the fixed format contract is embodied in the structure and type of the WS-SHARED-FORMAT-CUSTOMER working-storage copybook. Refer to the pseudo-COBOL example below.

```
. . .
DATA DIVISION.
FD FILE-STREAM-IN
   RECORD CONTAINS 20 CHARACTERS
. . .
WORKING-STORAGE SECTION.
*** THIS COPYBOOK CONTAINS THE COMMON FORMAT OF
THE
*** CUSTOMER IN THE DATA STRUCTURE AND DATA TYPES
01 WS-COMMON-FORMAT-CUSTOMER
03 WS-COMMON-FORMAT-NAME         PIC X(10).
03 WS-COMMON-FORMAT-SEX          PIC X(7).
03 WS-COMMON-FORMAT-AGE          PIC 999.
*** THIS COPYBOOK IS THIS SYSTEMS VIEW OF A CUSTOMER
O1 WS-CUSTOMER
03 WS-NAME               PIC X(10).
03 WS-AGE                PIC 999.
03 WS-SEX                PIC X(10).
. . .
PROCEDURE DIVISION.
. . .
*** OPEN THE FILE STREAM AND PUT THE CONTENTS IN THE
*** WS-COMMON-FORMAT-CUSTOMER COPYBOOK.
OPEN FILE-STREAM-IN
READ FILE-STREAM-IN INTO WS-COMMON-FORMAT-
CUSTOMER
   AT-END CLOSE FILE-STREAM-IN
END-READ.
*** MOVE THE VALUES INTO FROM THE COMMON FORMAT
INTO
```

-continued

```
*** THE WS-CUSTOMER VARIABLES.
MOVE WS-COMMON-FORMAT-SEX        TO WS-SEX.
MOVE WS-COMMON-FORMAT-AGE        TO WS-AGE.
MOVE WS-COMMON-FORMAT-NAME       TO WS-NAME.
. . .
*** CALL A SQL MODULE TO SAVE THIS INFORMATION IN
THE
*** RELATIONAL DATABASE
CALL "SAVE-CUSTOMER-IN-DATABASE" USING WS-
CUSTOMER.
. . .
STOP-RUN.
```

Conversely, a stream could be created by a non-object system (or another object-based system for that matter) and sent to one's object-based system. In this case, CustomerObject could use a "streamOff: aStream" method and instantiate a new instance of an aCustomerObject and populate it with the appropriate attribute values.

Eagle Architecture Framework: Uses Stream Based Communication in a number of ways. First of all, it uses it to embed tracing information in CORBA distributed requests. Second of all, it is used to replicate state between fault-tolerant services.

MCI: Invoice Development Workbench. This workbench helps MCI create error-free invoice definitions for the various Local Bells. Stream-based communication was used as part of an efficient, lightweight persistence mechanism.

Java Serialization: This is a Java defined fixed format for streaming objects.

Object Request Brokers (ORBs) that use CORBA, DCOM, or Java Remote Method Invocation (RMI)—ORBs that use one of these standards implement this pattern. They define an Interface Definition Language (IDL) that is the format or contract of the stream and use stream-based communication as the communication medium.

Collaborations

Stream-based Communication. This is the parent pattern to Fixed Format Stream. In this pattern, information is transmitted using a simple stream and a shared, generic format. The Fixed Format Stream is a more specific implementation of Stream-Based Communication.

Structure Based Communication—This pattern uses a Fixed Format Stream to transmit data structure between systems. It is often used to obtain data from a Server for display in a Client UI.

Bridge (from the Gamma book Design Patterns) describes a way to de-couple an abstraction from its implementation so that the two can vary independently. The Bridge pattern is often used to define collaborations between a business object and a format object while decoupling the business object from its specific stream format.

Abstract Factory (from the Gamma book Design Patterns) is a pattern for creating families of related classes. This could be used with the Bridge pattern to retrieve the format dynamically based on non-static information.

Alternatives

Self-Describing Stream. This pattern is a specific implementation of Stream-Based communication where the messaging format is parameterised and stored on the stream. A message language is used to read and write the format of the message from the stream.

Downloadable Format Stream—This pattern is a specific implementation of Stream-Based communication where the messaging format is stored at a central location and is downloaded by the communicating parties when needed.

Globally Addressable Interface

Figure 71:
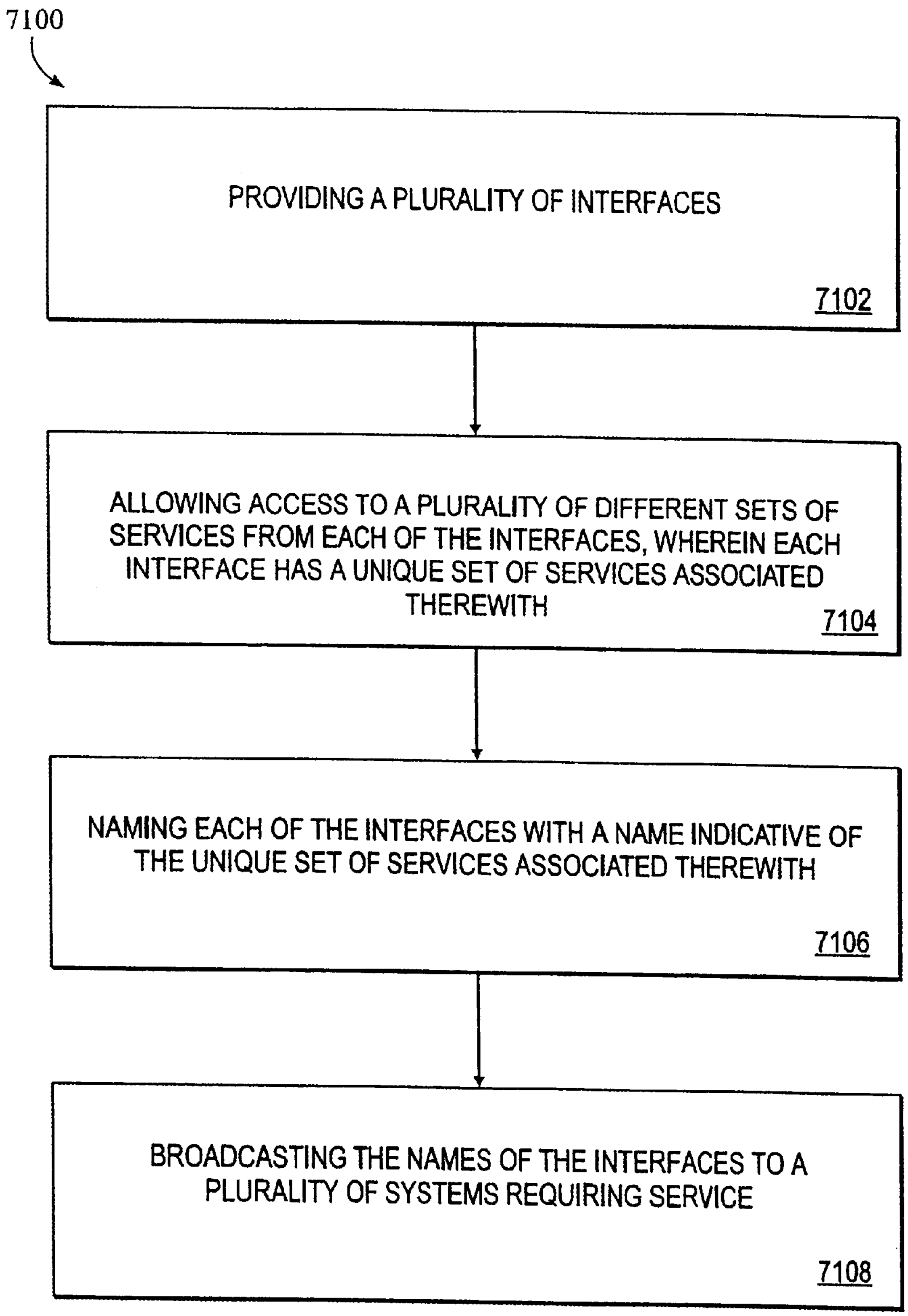
FIG. 71 illustrates a flowchart for a method for delivering service via a globally addressable interface in accordance with an embodiment of the present invention.

FIG. 71 illustrates a flowchart for a method 7100 for delivering service via a globally addressable interface. A plurality of interfaces are provided in operation 7102 and access is allowed to a plurality of different sets of services from each of the interfaces in operation 7104. Each interface has a unique set of services associated therewith. Each of the interfaces is named in operation 7106 with a name indicative of the unique set of services associated therewith. The names of the interfaces are then broadcast to a plurality of systems requiring service in operation 7108.

The access may be allowed via structured-based communication. As another option, the names may be broadcasted using a naming service. Also, the naming service may provide the systems requiring service with a location of the interface on a network. In addition, the systems requiring service may be capable of looking-up the interfaces using the naming service.

In a client-server environment, a client makes requests of services on a Server. In such an environment, how might a Server expose its services for use by one or more clients?

In a typical two or three-tiered client-server application, the services are maintained away from the users (Client) on separate Server machines. Whenever a user needs to use a service, the user must send a request across the network to the Server machine.

Figure 72:
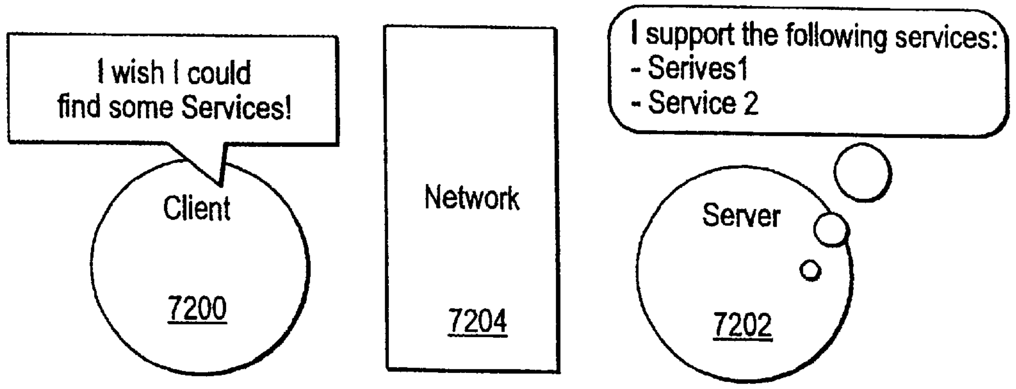
FIG. 72 depicts a client that is unable to find the services provided by a server via a network.

Before a client can utilize a service, it must find the service. If the client is unable to find the service, it can't ever use it. FIG. 72 depicts a client 7200 that is unable to find the services provided by a server 7202 via a network 7204.

The client could look for services in a naming service. However, if the services don't exist in the lookup or naming service, the client still can't find and use the service.

Therefore, use a Globally Addressable Interface to expose services to all available clients.

A Globally Addressable Interface builds upon the Interface pattern and the Naming pattern. When implementing a Globally Addressable Interface, a Server's operations are bundled into logical groups using the Interface pattern.

Figure 73:
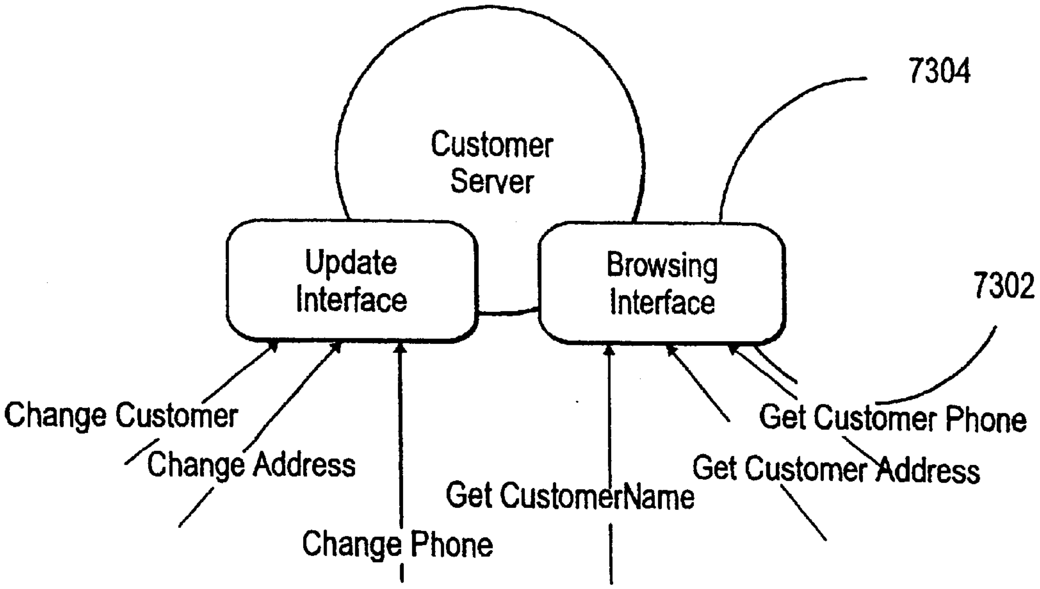
FIG. 73 illustrates the grouping of services using interfaces.

FIG. 73 illustrates the grouping of services 7302 using interfaces 7304.

For example, all the operations for accessing and viewing customer information (Get Customer, Get Customer Address, etc.) could be bundled into one interface. All the operations for changing customer information (Change Customer, Address, Change phone number, etc.) might be bundled into another interface. Keep in mind, this is an example "bundling" of operations and not the definitive method for bundling operations.

Figure 74:
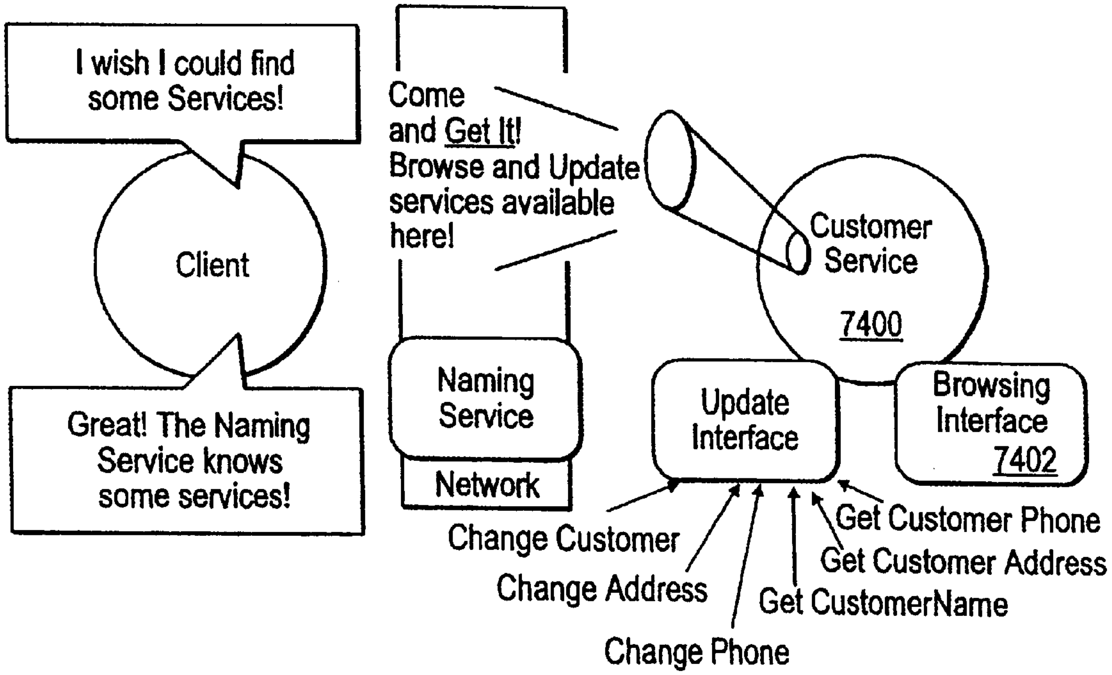
FIG. 74 illustrates a customer server publicly announcing its interfaces.

Once all the operations have been grouped into an interface, the interface is given a name appropriate to the operations it bundles. Then the interfaces are announced using the Naming pattern. The Naming pattern enables registration of interfaces in a globally available naming service. FIG. 74 illustrates a customer server 7400 publicly announcing its interfaces 7402.

Until that time, a client can't find the operations and can't use them. Thus, the Server must use the Lookup or Naming pattern to register its interfaces (not methods). Once the interfaces have been registered with such a service, any client can go to the Naming Service, locate an interface, and access an operation in that interface.

Benefits

Public Addressability—Every Globally Addressable Interface is publicly available for use by any client. As a result, any Client can find these interfaces and access these operations.

Stateless Load Balancing. Globally Addressable Interfaces are generally implemented for stateless Servers. When Stateless Servers are used, it is a lot easier to balance the incoming load. Since state or context is always passed into the Server, any call can be directed to any Server that supports a particular operation. If one is busy, the Client can be forwarded on to the next one.

The following is a message trace diagram depicting the interactions associated with a Globally Addressable Interface.

The Message Trace diagrams depict a common Client-Server scenario. A client requests customer data from a Server. The Server finds the data in a database and forwards it back to the client. The Client can then display the data in a User Interface for a user.

The scenario was broken into two message trace diagrams. The first message trace sets the stage for the second. In the first message trace, the Server registers two Globally Addressable Interfaces with a Naming Service. The Client then "looks-up" an interface and establishes a connection to that interface.

Assumptions

CORBA ORB connects Client and Server

CORBA Naming Service used to lookup GAIs

Figure 75:
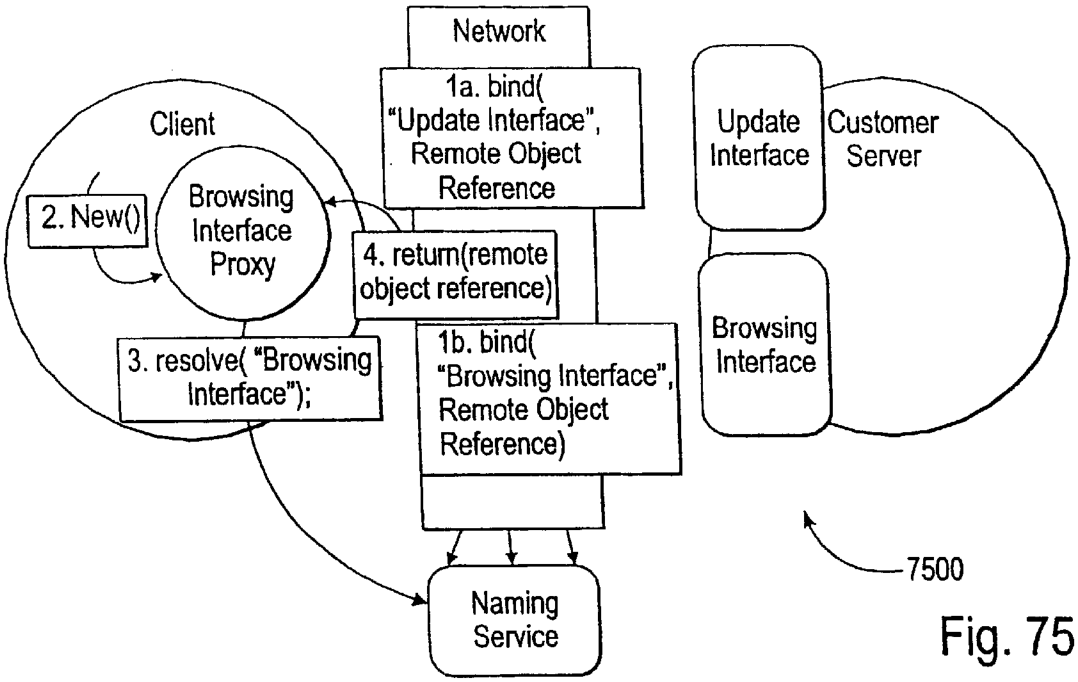
FIG. 75 illustrates a method including the registering and then locating of a globally addressable interface.

FIG. 75 illustrates a method 7500 including the registering and then locating of a globally addressable interface.

Collaborations

1a. "Bind" the interface name (Update Interface) with it's Remote Object Reference (network location) in a Naming Service. This will allow clients to "lookup" the interface. Once the Interface is registered in the Naming Service, it has become globally addressable. Any client can find the interface and access a operation.

1b. "Bind" the second interface in the same manner as the first.

2. The client instantiates a Proxy (Browsing Interface Proxy) to the Browsing Interface on the Customer Server.
3. The Proxy "looks up" the network location of the Browsing Interface. It makes a request of the Naming Service. It requests the network location of the Browsing Interface.
4. The Naming Service returns the Remote Object Reference (network location) for the Browsing Interface. The Proxy now has all the information it needs to access an operation on the Browsing Interface.

The second message trace builds upon the first. In this message trace diagram, the Client calls the Server through a Globally Addressable Interface. The server finds the appropriate customer data and returns it to the Client. The Client can then display it in the UI.

Figure 76:
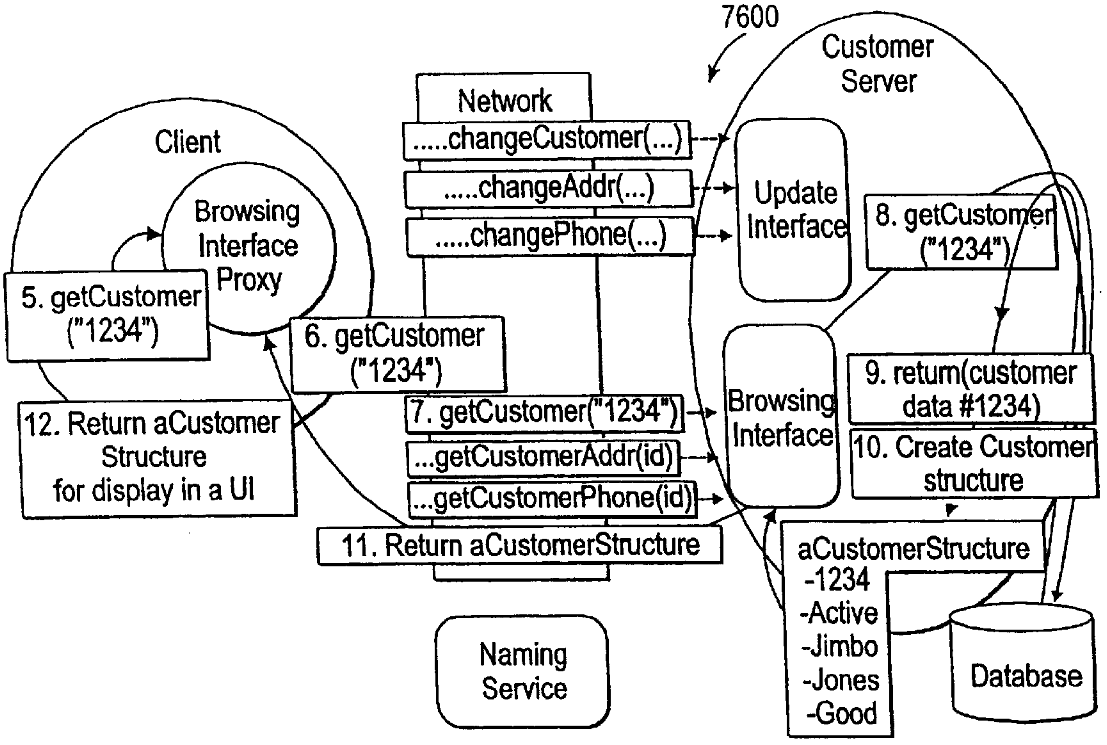
FIG. 76 illustrates the present invention using a method wherein a globally addressable interface is used to obtain data from a server.

FIG. 76 illustrates the present invention using a method 7600 wherein a globally addressable interface is used to obtain data from a server. The steps associated with the method 7600 of FIG. 76 will now be set forth.

Collaborations

5. The Client asks the Browsing Interface Proxy for the data associated with customer 1234.
6. The Browsing Interface Proxy forwards the request across the network to the Browsing Interface.
7. Same as 6.
8. The request is forwarded to the Customer Server. The Customer Server requests the customer data from the Database.
9. The Database returns the customer data for Customer 1234.
10. The Customer Server creates a structure and populates it with the customer data.

11. The Customer Structure is forwarded through the Browsing Interface, across the network and back to the Browsing Interface Proxy.
12. The Browsing Interface Proxy forwards the Customer Structure to the Client. The Client can now display the data in a UI for a user.

IDL Interfaces and Structures

The following IDL defines the two Interfaces and Structures used in the message trace diagram s above.

```
module CustomerServer
{
// CORBA IDL for the Update Interface
    interface CustomerUpdateInterface
    {
        void changeCustomer( long anId,
commonDefs::CustomerStructure aCustomer);
        void changeAddress(long anId,
commonDefs::AddressStructure aNewAddress);
        string changePhoneNumber(long anId, string
aNewPhoneNumber);
    };
    // CORBA IDL for the Browsing Interface
    interface CustomerBrowsingInterface
    {
        commonDefs::CustomerStructure    getCustomer(long anId);
        commonDefs::AddressStructure     getAddress(long anId);
        string getPhoneNumber(long anId);
    };
};
// This module defines the structures passed through the two // customer
interfaces.
module commonDefs
{
    struct AddressStructure
    {
            string street;
            string city;
            string state;
            string zip;
            string phoneNumber;
    };
    struct CustomerStructure
        {
            string id;
            string status;
            string firstName;
            string lastName;
        };
    };
```

Sample Code

The following is some Sample Java code for the Skeleton portion.

```
    //Pass all requests on to the Component for processing
    public CustomerStructure getCustomer(
    String aCustomerId)
    {
        CustomerComponent aCustomerComp = this.getComponent( );
        return(aCustomerComp.getCustomer(aCustomerId));
    }
    //Pass all requests on to the Component for processing
    public String getPhone(String aCustomerId)
    {
        .
        .
        .
    }
```

The next snippet of code is for the Customer Component (Server). The interface delegates the processing to the component.

```
    // Get the Customer's data and return it.
    public CustomerStructure getCustomer(String aCustomerId)
    {
        // Go to the database and get the
        // customer with the appropriate ID
        Customer aCustomer = . . .
```

-continued

```
        // Create a structure and populate it with the
        // customer data retrieved from the DB.
        CustomerStructure aCustomerStructure    = new
CustomerStructure( );
        aCustomerStructure.id                   = aCustomer.getId( );
        aCustomerStructure.status           = aCustomer.getStatus( );
        aCustomerStructure.firstName            =
aCustomer.getFirstName( );
        aCustomerStructure.lastName             =
aCustomer.getLastName( );
        return (aCustomerStructure);
}
public String getPhone(String aCustomerId)
{
        .
        .
}
public AddressStructure getAddress(String aCustomerId)
{
        .
        .
}
```

Additional Considerations

The GAI class is actually represented by two different classes (and the Component itself). Each GAI is made up of a Proxy and a Skeleton. The Proxy represents the interface on a Client while the Skeleton represents the interface on a Server.

Collaborations

Proxy—The proxy pattern is generally used to communicate from a Client to a Globally Addressable Interface on a Server.

Structure Based Communication—Often times, a client needs to display data in a UI for a user (e.g. Customer Information, Order Information, etc.). When communicating through a Globally Addressable Interface, this data is transmitted from the Server to the Client using Structure Based Communication.

Load Balancing—When a number of servers implement the same Globally Addressable Interface, the Load Balancing pattern is used to balance Client requests between these Servers.

Proxy Pool—The Proxy Pool pattern helps balance the cost of instantiating Remote Proxies and retaining Proxy "freshness." The Proxy Pool pattern can be used to create a pool of Proxies to Globally Addressable Interfaces.

Locally Addressable Interface—Locally Addressable Interfaces are private interfaces that aren't easily located. Generally, a well-known interface (like a Globally Addressable Interface) is used to find a LAI. A Client easily find and access a service on a Globally Addressable Interfaces and request a reference to a Locally Addressable Interface in return Interface—The Interface pattern defines methods or functions or services rather than implementation. The Interface pattern is expanded upon by the Globally Addressable Interface pattern.

Naming—The Naming pattern describes a pattern for registering and finding services or objects etc. where they can be easily found in an application. The Naming pattern is often used to register Globally Addressable Interfaces so they are publicly available Alternatives Locally Addressable Interface—The Locally Addressable Interface pattern is both a collaborating and alternative pattern. It can be used to retrieve information from Servers instead of Globally Addressable Interface.

Legacy Wrapper

Figure 77:
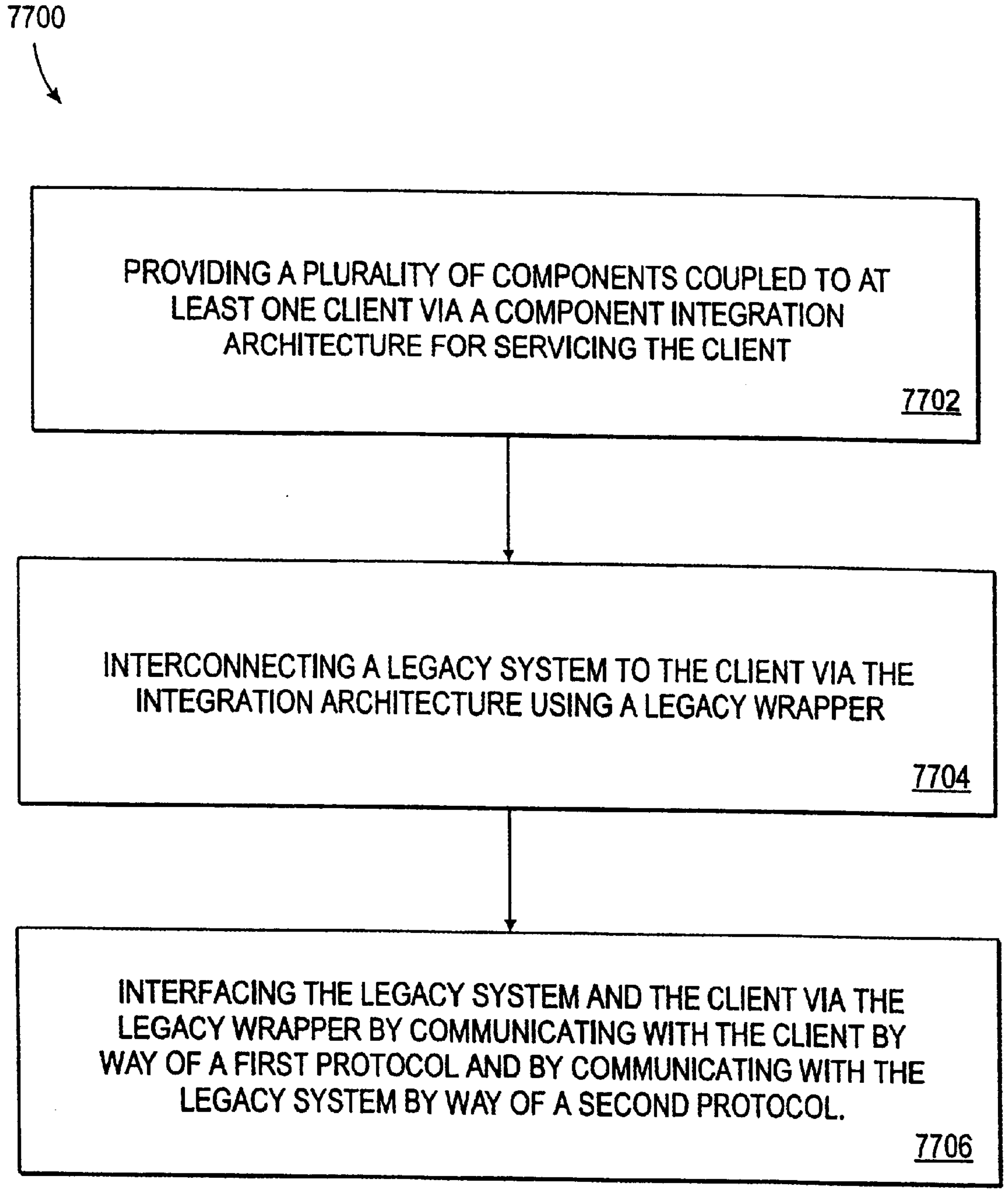
FIG. 77 illustrates a flowchart for a method for affording access to a legacy system in accordance to an embodiment of the present invention.

FIG. 77 illustrates a flowchart for a method 7700 for affording access to a legacy system. A plurality of components coupled to a client via a component integration architecture are provided for servicing the client in operation 7702. A legacy system is interconnected to the client via the integration architecture using a legacy wrapper in operation 7704. In operation 7706, the legacy system and the client are interfaced via the legacy wrapper by communicating with the client by way of a first protocol and by communicating with the legacy system by way of a second protocol.

As an option, the legacy wrapper may include a legacy wrapper component coupled to a component adapter which, in turn, may be coupled to a legacy adapter via a legacy integration architecture. In this aspect, the legacy adapter may also coupled to the legacy system. As another option, the component adapter may also reformat call parameters of the message into an acceptable format for the legacy system.

As an additional option for this aspect, the legacy wrapper component may also include a pure legacy wrapper component. As even a further option to this aspect, the legacy wrapper component may include a hybrid legacy wrapper component. Also, the interfacing may further include: sending a message from the client to the legacy wrapper component via the component integration architecture; sending the message via the component adapter to the legacy integration architecture; forwarding the message to the legacy adapter; formatting the message to match an application program interface (API) of the legacy system; executing calls on the legacy system based on the formatted message; executing function of the calls and returning results to the legacy adapter, legacy integration architecture, component adapter, and legacy wrapper component which reformats the results; and forwarding the reformatted results to the client via the component integration architecture.

Legacy systems pose a unique situation for developers of component-based solutions. Commonly hosted on mainframes, Legacy Systems often communicate through proprietary protocols, have no standard data or process APIs and don't integrate easily with component based systems. How does a developer access a Legacy System in a component-based solution?

A legacy system is an existing system that does not conform to the technology, architecture and standards of the current project. A large IBM 3090 Mainframe running programs to calculate automobile insurance rates is an example of a Legacy System. It is large, very important to an insurance company, and runs on older, proprietary hardware.

Legacy Systems generally utilize different communication protocols than those used by newly developed component systems. As a result, communicating between a newly developed component and a Legacy System is very difficult.

Figure 78:
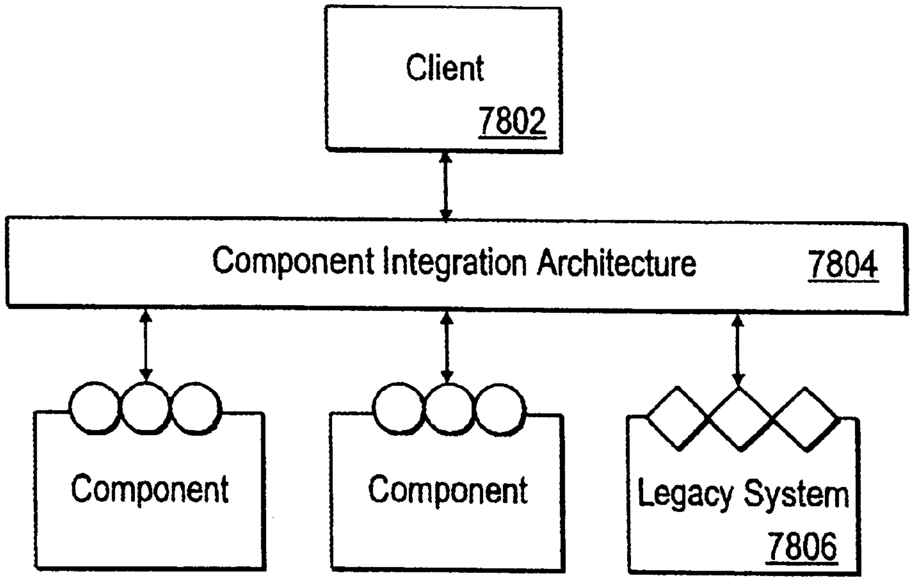
FIG. 78 depicts the communication difficulties associated with Legacy Systems attempting to communicate with a client via a component integration architecture.

FIG. 78 depicts the communication difficulties associated with Legacy Systems 7800 attempting to communicate with a client 7802 via a component integration architecture 7804. The newly developed application (client and components) communicates through a different protocol than the existing Legacy System. FIG. 78 illustrates heterogeneous Interfaces from Components.

Legacy Systems are critical to an organization and usually represent a significant investment. They are tightly controlled to reduce the incidence of system failures and clients may be unwilling or unable to replace these older systems.

New applications could be developed on the mainframe system, however, this generally is not considered strategic and takes a lot of time and effort. Organizations want to add new functionality (new processes) without investing in the old legacy system.

As a result, the current Legacy Systems represent significant investments, are often crucial to a business and aren't easily replaced. Investing in new Legacy applications isn't practical or strategic and Legacy Systems can't communicate with newer componentized systems.

Therefore, the component-based solution should use a Legacy Wrapper to communicate with the existing Legacy Systems. The Legacy Wrapper is a component built to adapt the front end of a legacy system to the rest of the component-based solution.

Figure 79:
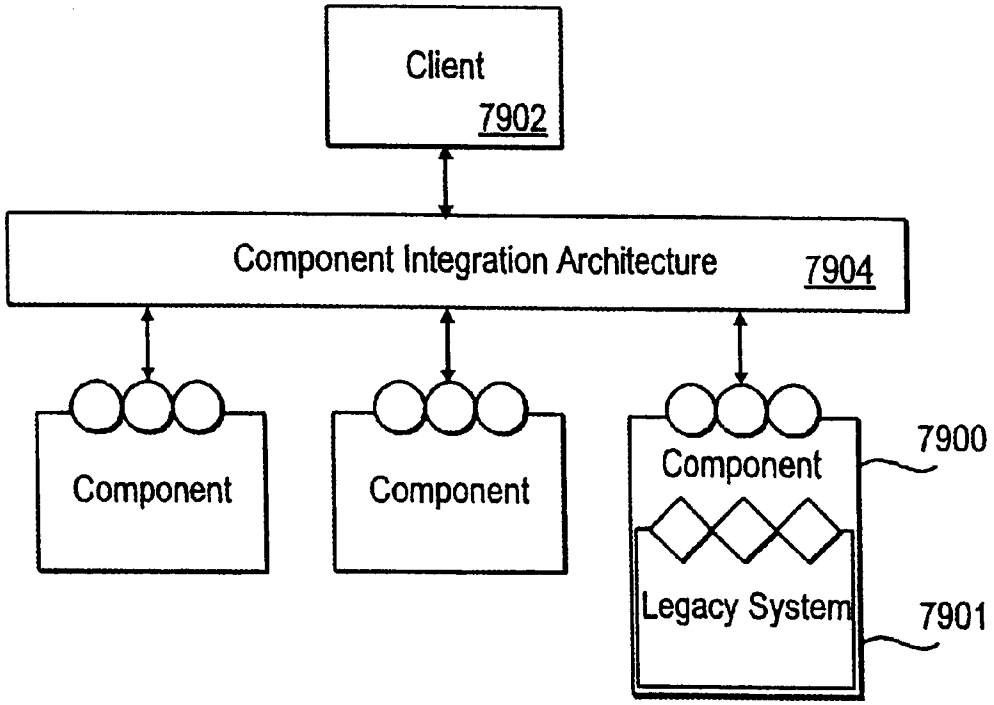
FIG. 79 illustrates homogenous interfaces from components which rectify the problems with Legacy Systems attempting to communicate with a client via a component integration architecture.

This solution encapsulates the concerns of a Legacy System away from the new application. It allows other components in the solution to communicate with the legacy component in the exact same manner as the rest of the component-based solution. Further, this solution can also be used to partition the existing Legacy System functionality. FIG. 79 illustrates homogenous interfaces from components 7900 which rectify the problems with Legacy Systems 7901 attempting to communicate with a client 7902 via a component integration architecture 7904.

Benefits

- Reuse. The Legacy Wrapper pattern allows reuse of an existing Legacy System. New component applications can be developed that leverage the rich store of business processes and data that already exist on the Legacy System.
- Migration. Allows for slower migration of functionality from the Mainframe to components. By continuing to use the functionality of the existing legacy system, the immediate need to build the same functionality in a pure component-based solution is lessened.
- Encapsulation. Provides a separation of concerns between the new system and the Legacy System. By encapsulating the Legacy System, the impact of host changes is largely limited to the Legacy Wrapper.

The implementation of legacy Wrapper is usually very specific to the type of Legacy System it is integrating. The implementation in this section attempts to give a high level overview of the components of typical legacy systems.

Figure 80:
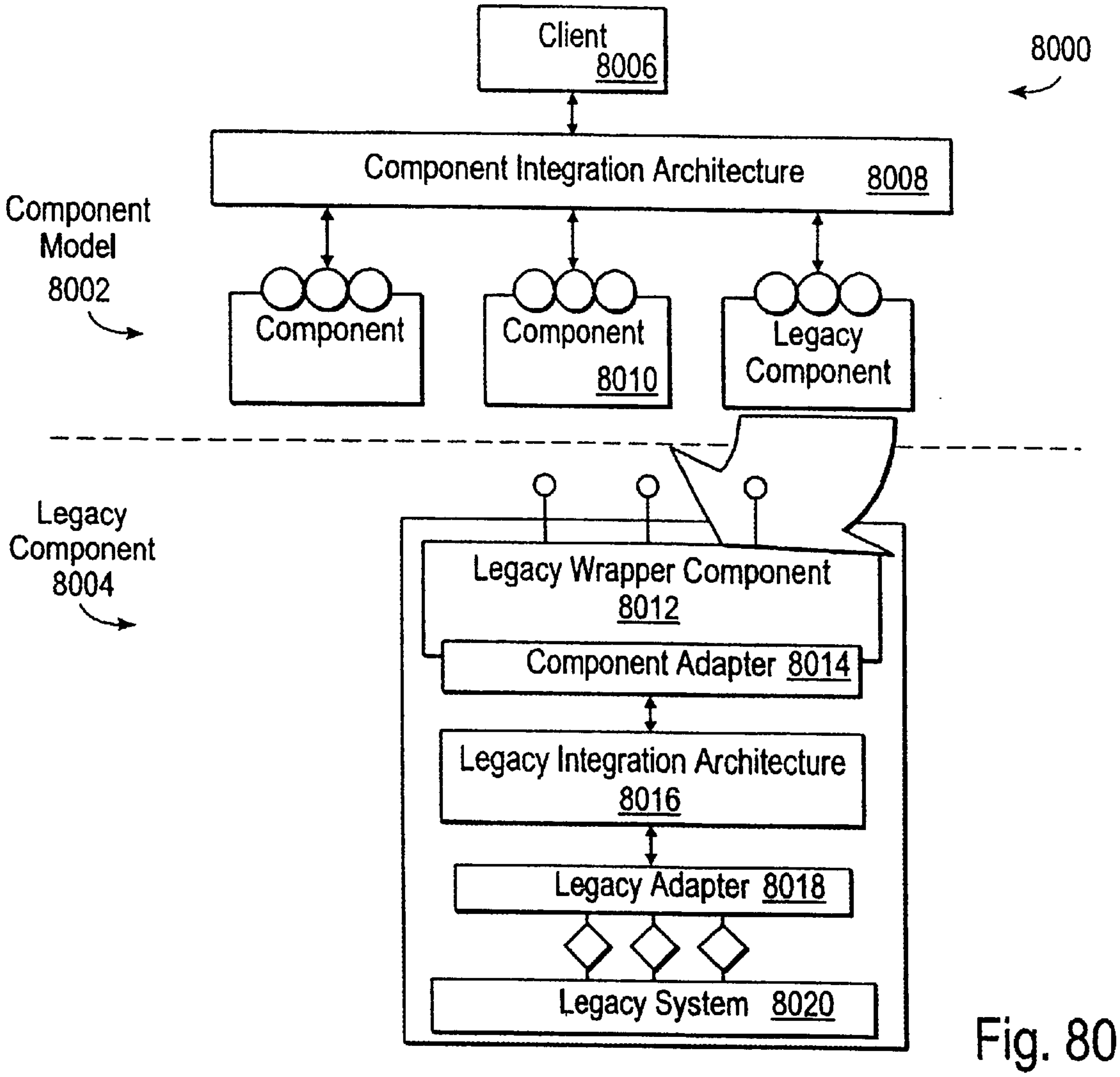
FIG. 80 shows how a Legacy Component is integrated into a component-based model.

FIG. 80 shows how a Legacy Component is integrated into a component-based model 8000.

The upper part of FIG. 80 depicts the main units 8002 of a component-based solution. The lower part of the picture depicts the Legacy Component 8004 in greater details.

The following is a description of the participants in the upper portion of FIG. 80.

- The Client (8006) is the application running on the user's machine. It is responsible for UI presentation, local business objects, and communication using client resident proxies.
- The Component Integration Architecture (8008) is the component that allows clients to communicate and remotely invoke functions on the server components. Typically this is based on some middleware standard (e.g., CORBA or MTS).
- The Components (8010) in this FIG. 80 represents the server components. These are the business entity components and the business process components. They are invoked from the Client via client proxies.

From the outside, the Legacy Component 8004 looks identical to any other component. However, internally is performs a very specialized function.

The lower part of FIG. 80 expands the Legacy Component 8004. The expansion shows the individual elements, which comprise the Legacy Component 8004. These elements are:

The Legacy Wrapper Component (8012) is responsible for presenting the same functionality provided by the legacy system to the rest of the component-based solution. Other components of the new component-based solution will interact and communicate with this component. Although this component wraps the existing legacy system, it should behave as any other component in the newer solution.

The Component Adapter (8014) is a custom component responsible for the translation from the Legacy Wrapper Component to the particular implementation of the Legacy Integration Architecture.

The Legacy Integration Architecture (8016) is responsible for sending and receiving messages between the server and host machines. This architecture is usually based on some specific communication implementation. Examples of this include message queues and common databases accessible by both legacy systems and component-based solutions.

The Legacy Adapter (8018) is a custom component responsible for translation from the particular implementation of the Legacy Integration Architecture to the Legacy System.

The Legacy System (8020) is the existing system that will be accessed by the newer component-based solution. Changes to the Legacy System should be minimized when accommodating the new component-based solution.

The application on the host is responsible for translating messages between the Legacy Integration Architecture and the Legacy System. For example, the application must know how to format calls to CICS appropriately, as well as interpret results and reformat them in a way appropriate for the Legacy Wrapper server component.

The degree to which the wrapper components are specialized to partition the functionality of the existing legacy system can vary.

Pure Legacy Wrapper Component

Figure 81:
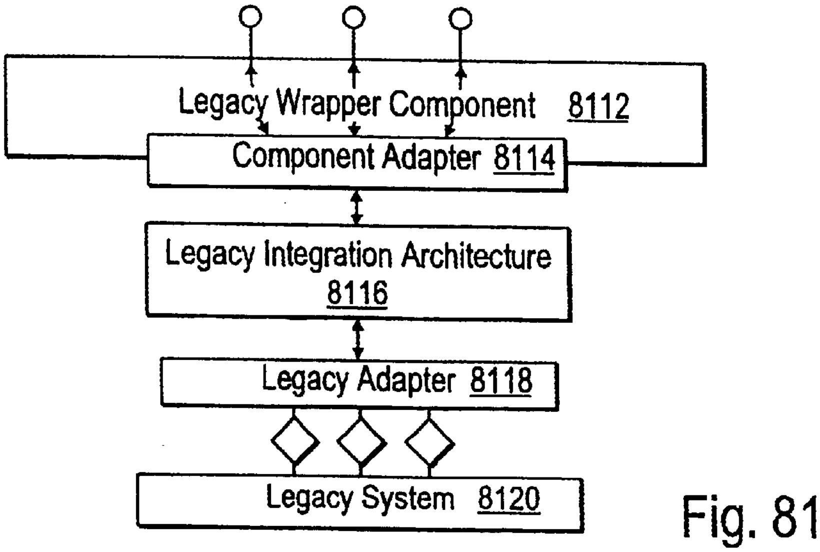
FIG. 81 illustrates Legacy Wrapper Components of a Pure Legacy Wrapper Component including a Legacy Wrapper Component, a Component Adapter, a Legacy Integration Architecture, a Legacy Adapter, and a Legacy System.

One type is the Pure Legacy Wrapper Component. This component simply adapts the legacy system to the new component-based solution. No new business processes are added. The interface methods on the Legacy Wrapper Component "pass through" to the legacy system, as shown in FIG. 81. FIG. 81 illustrates Legacy Wrapper Components of a Pure Legacy Wrapper Component including a Legacy Wrapper Component 8112, a Component Adapter 8114, a Legacy Integration Architecture 8116, a Legacy Adapter 8118, and a Legacy System 8120.

Hybrid Legacy Wrapper Component

Figure 82:
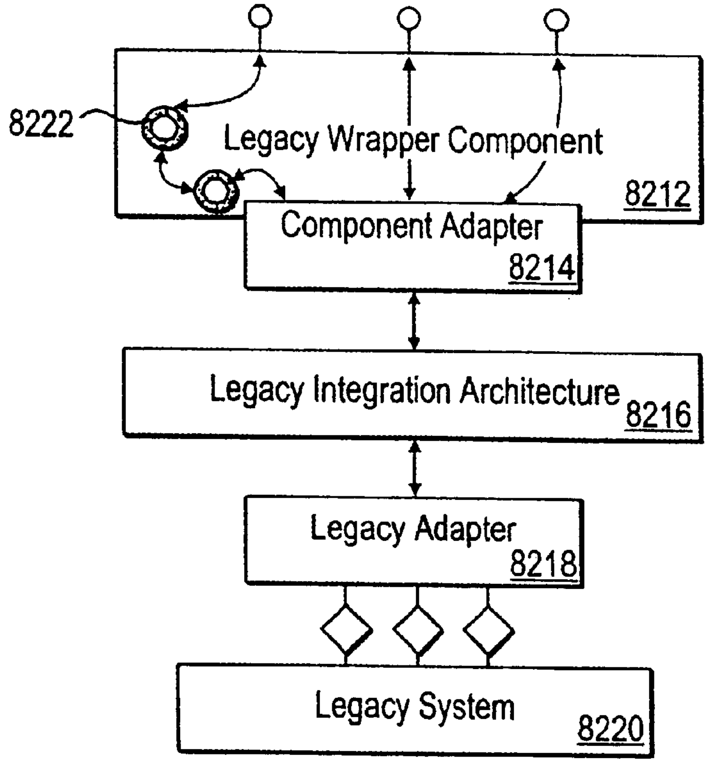
FIG. 82 illustrates a Hybrid Component type of Legacy Wrapper Component.

Another type of Legacy Wrapper Component is the Hybrid component. FIG. 82 illustrates a Hybrid Component type of Legacy Wrapper Component. As shown, the hybrid includes a Legacy Wrapper Component 8212, a Component Adapter 8214, a Legacy Integration Architecture 8216, a Legacy Adapter 8218, and a Legacy System 8220.

It is a mix of legacy system adapter and some new business processes built in a single component. Some of the interfaces 8222 of the wrapper component 8212 "pass through" to the legacy system, while other interfaces communicate with objects, which may in turn call the legacy system.

There are potentially more variations, including use of an Event Service to allow the mainframe to initiate work from the wrapper components.

EXAMPLE

Figure 83:
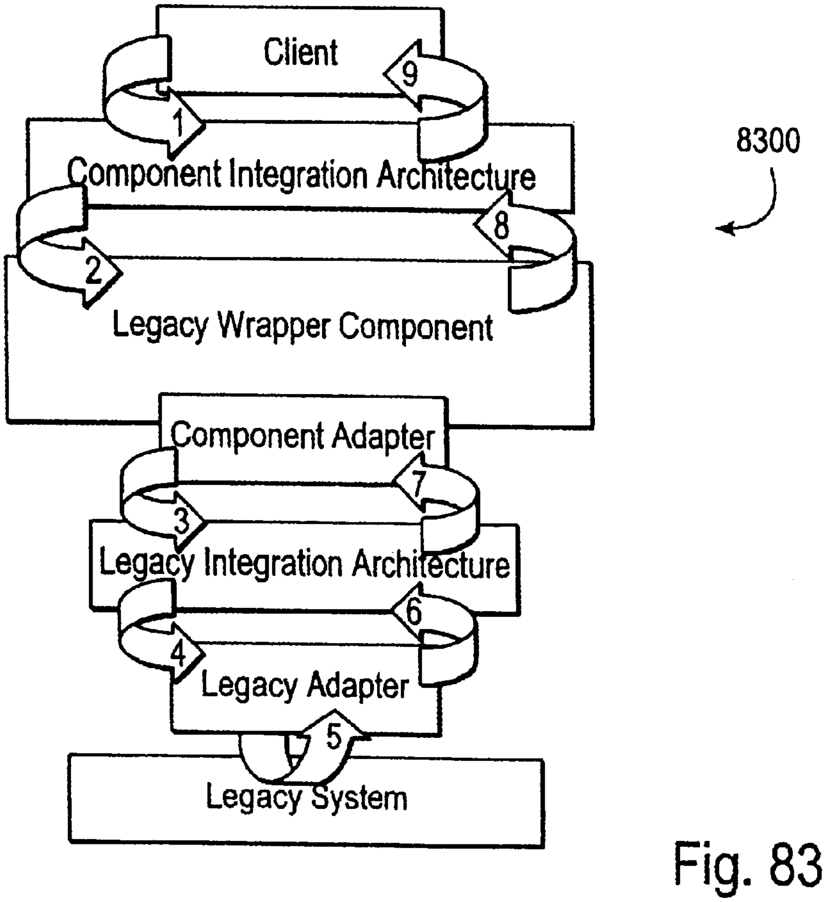
FIG. 83 shows an abstract example of the control flow in a Legacy Component.

FIG. 83 shows an abstract example of the control flow in a Legacy Component. Although, the example is at a very high level, it should provide some insight as to how the Legacy Component functions and how it invokes work on the legacy system.

From the example of FIG. 83, the following steps are shown:

1. The Client component wants to invoke some functionality, which is located on the legacy system. The Client sends a message via the Component Integration Architecture (e.g. ORB) on the way to the Legacy Wrapper Component.
2. The Component Integration Architecture (e.g. ORB) forwards the call to the appropriate Legacy Wrapper Component.
3. The Legacy Wrapper Component sends the call via the Component Adapter to the Legacy Integration Architecture. When necessary, the Component Adapter reformats the call parameters into an acceptable format for the Legacy System.
4. The Legacy Integration Architecture receives a call for the host-based Legacy application and forwards it to the Legacy Adapter.
5. The Legacy Adapter receives the message from the Legacy Integration Architecture and formats it to match the API of the Legacy System. It makes the appropriate calls on the Legacy System. The Legacy System executes the function and returns the results to the Legacy Adapter
6. The Legacy Adapter receives the results and returns them to the Legacy Integration Architecture.
7. The Legacy Integration Architecture receives the result and forwards it to the Legacy Wrapper Server Component through the Component Adapter.
8. The Legacy Wrapper Component receives the result, reformats the parameters for the component system and forwards it to the Component Integration Architecture.
9. Finally, Component Interaction Architecture receives the result and forwards it to the Client Collaborations Message Queued Legacy Integration is a specific implementation of this pattern. It uses message queues as the legacy integration architecture.

Adapter (from the Gamma book Design Patterns) describes at a more abstract level how to convert the interface of a class into another interface that clients expect.

Proxy—This pattern is documented in Design Patterns by Gamma, Helm, Johnson and Vlissides. The proxy pattern is often used to communicate with server components in a distributed environment. The Proxy would be used to communicate across the Component Integration Architecture to a Legacy Wrapper.

Alternatives

Screen Scraping is a more specialized version of legacy wrapping. It describes how to convert a user interface to that of the server (i.e., the legacy system in this case). In this solution, the host-based application generates 3270 type screens and then passes them to CICS. The advantage of this solution is that it is non-invasive to CICS and reacts as if it were just another terminal interacting with CICS. This may be necessary with legacy systems which must be leveraged, but can not be modified and provide no common API set.

Locally Addressable Interface

Figure 84:
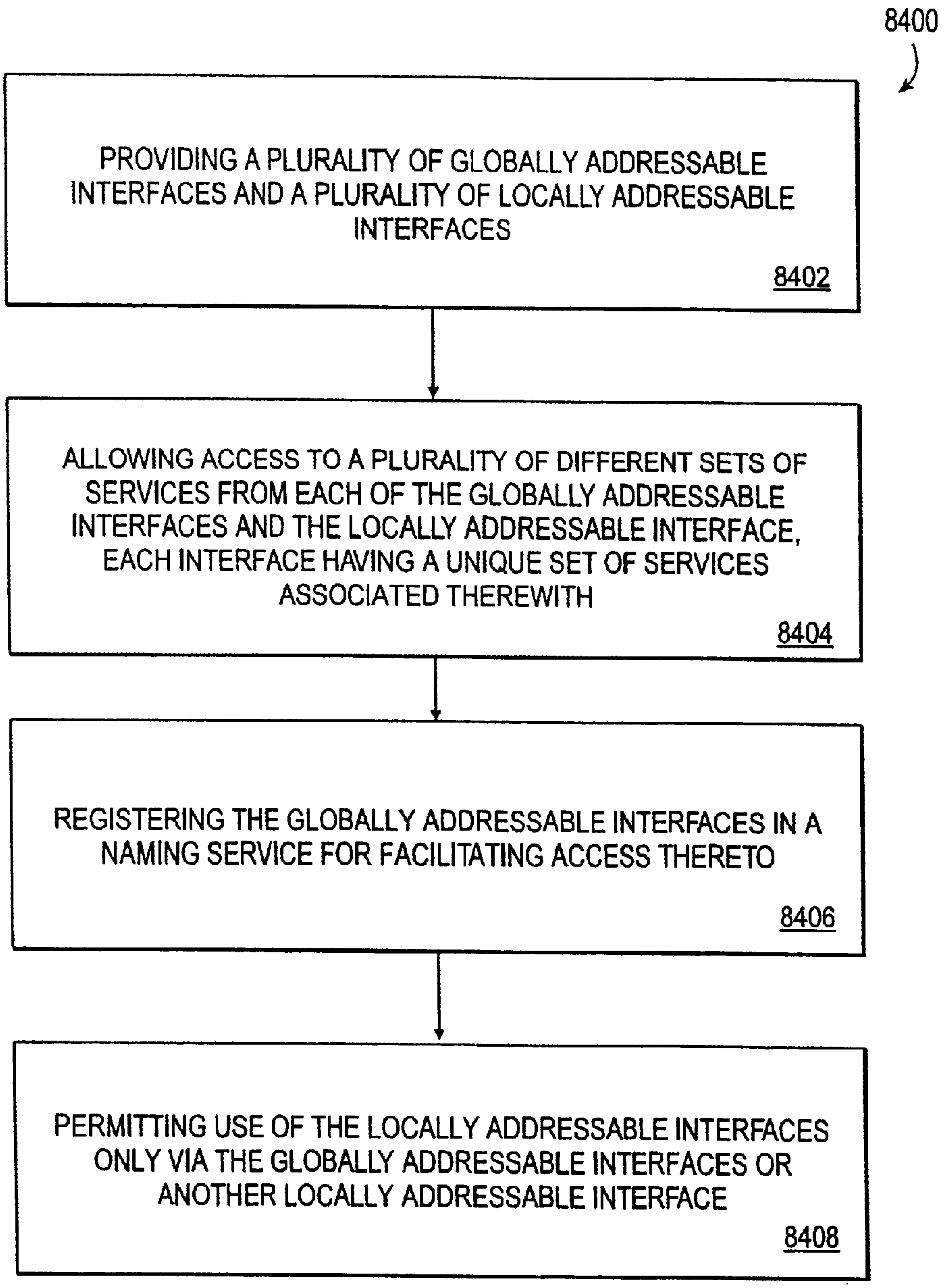
FIG. 84 illustrates a flowchart for a method for for delivering service via a locally addressable interface in accordance with an embodiment of the present invention.

FIG. 84 illustrates a flowchart for a method 8400 for for delivering service via a locally addressable interface. In operation 8402, a plurality of globally addressable interfaces and a plurality of locally addressable interfaces are provided. Access is allowed to a plurality of different sets of services from each of the globally addressable interfaces and the locally addressable interface in operation 8404. Each interface has a unique set of services associated therewith. In operation 8406, the globally addressable interfaces are registered in a naming service for facilitating access thereto. Use of the locally addressable interfaces is permitted only via the globally addressable interfaces or another locally addressable interface in operation 8408.

In an option, the use of the locally addressable interfaces may be facilitated by structured-based communication. As another option, the access may be allowed via a customer interface proxy, a customer server and a database of the globally addressable interface.

In one embodiment, a request may be received by the customer interface proxy for a reference to one of the locally addressable interfaces. The request may then be forwarded across a network to the database of a server of the globally addressable interface. Also, data from the database may be returned in response to the request. Additionally, an object may be instantiated and populated it with the data by the server of the globally addressable interface. The object may also be associated with one of the locally addressable interfaces. Also, the locally addressable interface may be forwarded to the globally addressable interface. As even a further option, a reference may be forwarded to the locally addressable interface across the network and to the customer interface proxy. In addition, the use of the customer interface proxy may be also used to access the locally addressable interface across the network.

In a client-server environment, a client makes requests of Services on a Server. In such an environment, how might a Server expose its services for use to a client in a tightly controlled manner?

Quite often a component wants tight control over the visibility of its interfaces or does not have a need to make its interfaces widely available. Examples of such situations include:

Security—A component may provide multiple interfaces, some of which have sensitive operations that should not be exposed to all clients. For example, an insurance company's customer service desktop application gets full access to all interfaces and services on a Customer component, but an Independent Agent application has restricted access to services.

Interface Design—From a design standpoint it may make sense to limit access to some interfaces. For example, a system operations interface might allow clients to query Server components for the number of requests being serviced, or disable future requests on a particular Server. In this type of situation, it's best to limit access to the appropriate user group. In this case, the operations tools specifically designed for administering a system.

Large number of interfaces—If the component design calls for a large number of interface instances (objects), then it would be detrimental to use the GAI pattern. The sheer number of interfaces could overcrowd and overburden the Naming or Trader service. The Naming or Trader service would slow down as it searched its large list of entries. Additionally, the system would slow down as every client attempted to access the Naming or Trader service for every interface.

Thus, it's sometimes best to keep interfaces with limited appeal out of a Naming or Trader Service.

No need—If a particular interface or service only bas one client, why bother registering it globally? It doesn't make sense and causes additional administration.

Figure 85:
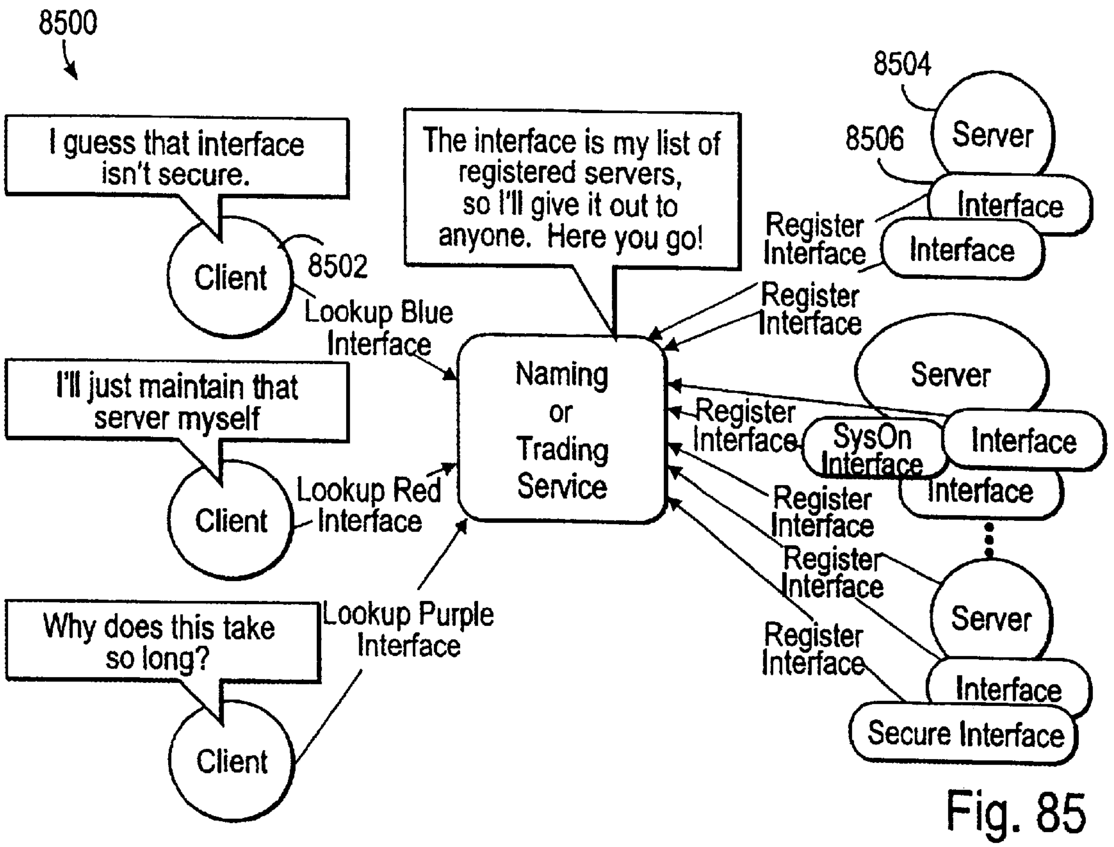
FIG. 85 illustrates Problems with Globally Addressable Interfaces in a system including clients and servers with a plurality of interfaces.

FIG. 85 illustrates Problems with Globally Addressable Interfaces in a system 8500 including clients 8502 and servers 8504 with a plurality of interfaces 8506.

The last couple of points are quite common for stateful components. The above samples clearly do not call for the GAI pattern—an alternative manner of making interfaces available to clients is required.

Therefore, the Locally Addressable Interface pattern should be used to control access to interfaces in an efficient manner.

Figure 86:
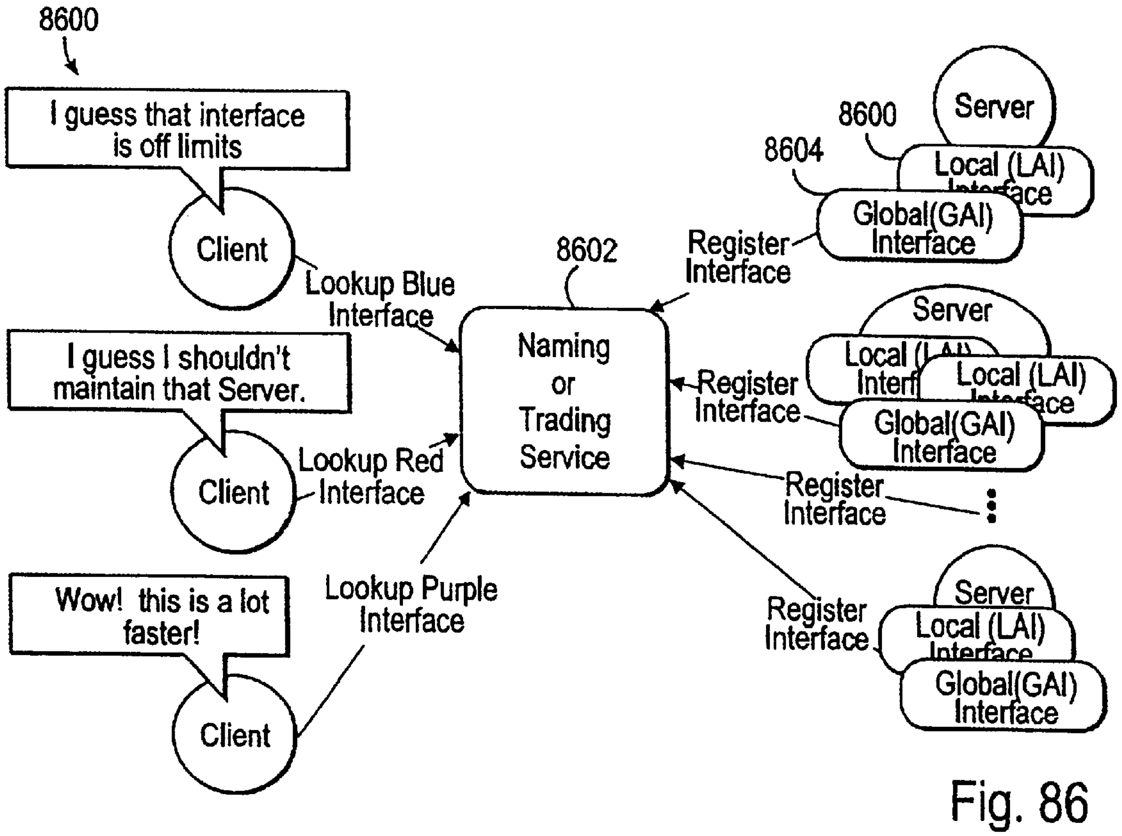
FIG. 86 illustrates the manner in which the present invention uses a Locally Addressable Interface to hide functionality and lessen the load on the Naming or Trading Service.

FIG. 86 illustrates the manner in which the present invention uses a Locally Addressable Interface 8600 to hide functionality and lessen the load on the Naming or Trading Service 8602.

All components maintain a Globally Addressable Interface 8604 This interface is registered with a Naming or Trader service 8602 and can have any of its services accessed by any client on the network. The services on a GAI 8604 are generally stateless and potentially shared by many clients.

Locally Addressable Interfaces 8600 are not registered with a Naming or Trading service 8602 and can only be obtained through a Globally Addressable Interface 8604 or another Locally Addressable Interface 8600.

Figure 87:
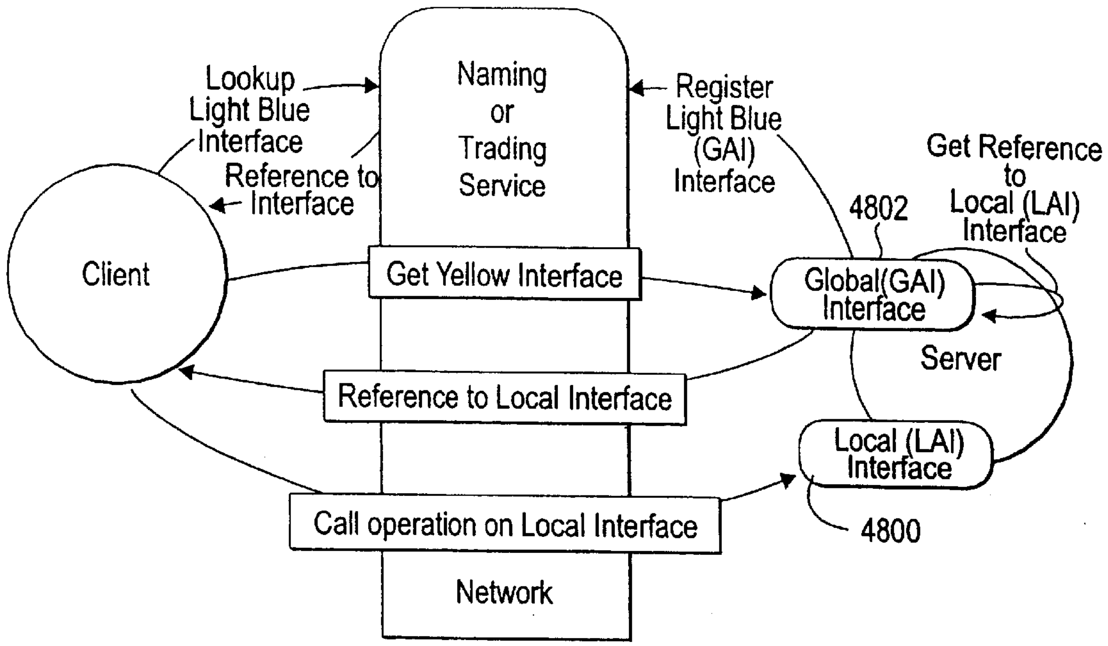
FIG. 87 illustrates the manner in which the present invention obtains a Locally Addressable Interface.

FIG. 87 illustrates the manner in which the present invention obtains a Locally Addressable Interface 8700.

Globally Addressable Interface 8702 services typically are used to obtain Locally Addressable Interfaces 8700 by providing some key information to the service, trigger global changes to all of the component's member objects, or to obtain component-maintained data that is not represented by a Locally Addressable Interface 8700.

It is important to note that member business objects are never directly exposed to the client but, rather, communicated with through a component interface (global or local). This allows for changes to be made to the internal structure of the component without disturbing the way a client interfaces with the component. Encapsulation is preserved.

Benefits

Tight control. Servers providing LAIs have full control to determine which clients will receive them. This control could, for example, be based on client type, access rights or server load.

No central bottleneck. The pattern does not rely on a centralized service to hand out interfaces. This leads to a scalable architecture that can handle many interface instances.

Useful for stateful components. Stateful components often contain many objects, each accessed through a separate interface instance. The LAI pattern is very useful in such circumstances.

Complex server side relationships. The LAI pattern is better for managing complex object relationships than most alternatives. If an object is associated with a lot of other objects (an order holds a customer and an address and a line item etc.), it isn't practical to copy all of the objects to the client.

The following is a message trace diagram depicting the interactions associated with a Locally Addressable Interface.

The Message Trace diagrams depict a common Client-Server scenario. The Client would like to interact with a specific Customer on the Server. The client requests a Locally Addressable Interface to a Customer Object on the Server and communicates with that object.

The scenario was broken into two message trace diagrams. The first message trace sets the stage for the second. In the first message trace, the Server registers a Globally Addressable Interface with the Naming Service. The Globally Addressable Interface will be used to get the Locally Addressable Interface.

Assumptions

CORBA ORB connects Client and Server

CORBA Naming Service used to lookup GAIs

Figure 88:
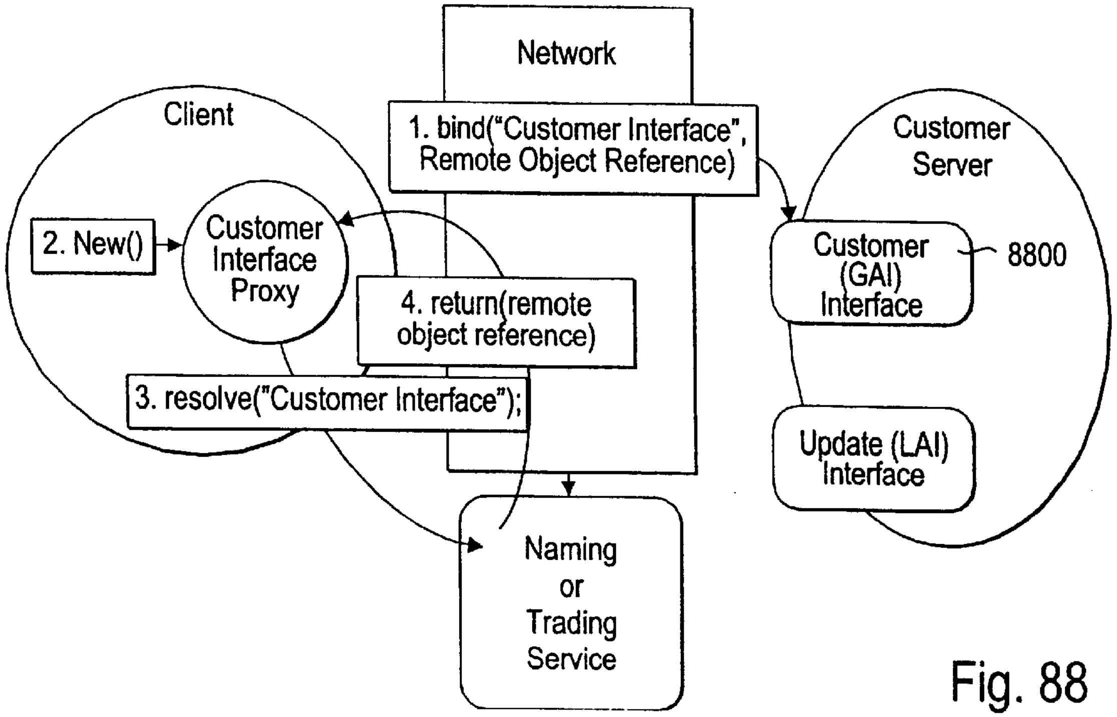
FIG. 88 illustrates the method in which the present invention registers and then locates a Globally Addressable Interface.

FIG. 88 illustrates the method in which the present invention registers and then locates a Globally Addressable Interface 8800. The various steps shown in FIG. 88 are set forth hereinbelow.

Collaborations

1a. "Bind" the interface name (Customer Interface) with it's Remote Object Reference (network location) in a Naming Service. This will allow clients to "lookup" the interface. Once the Interface is registered in the Naming Service, it has become globally addressable. Any client can find the interface and access a operation.
2. The client instantiates a Proxy (Customer Interface Proxy) to the Customer Interface on the Customer Server.
3. The Proxy "looks up" the network location of the Customer Interface. It makes a request of the Naming Service. It requests the network location of the Customer Interface.
4. The Naming Service returns the Remote Object Reference (network location) for the Customer Interface. The Proxy now has all the information it needs to access an operation on the Customer Interface.

The second message trace builds upon the first. In this message trace diagram, the Client calls the Server through a Globally Addressable Interface. The server finds the appropriate customer data and instantiates an object with the data. A Locally Addressable Interface to the specific Customer object is then returned to the Client.

The Client can then directly access the specific Client through the Locally Addressable Interface.

Figure 89:
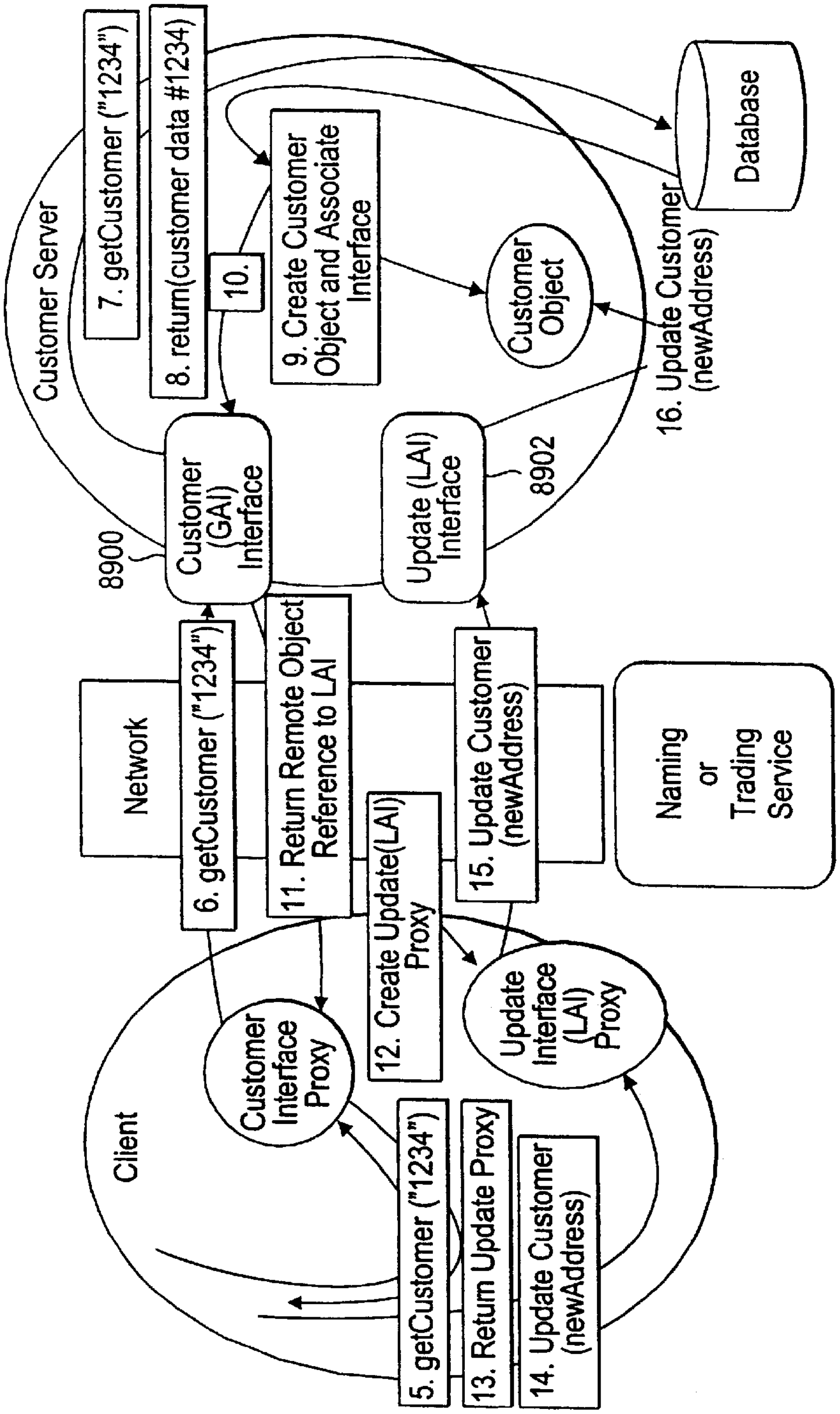
FIG. 89 illustrates the manner in which the present invention uses a Globally Addressable Interface to obtain a Locally Addressable Interface to a specific Customer Object.

FIG. 89 illustrates the manner in which the present invention uses a Globally Addressable Interface 8900 to obtain a Locally Addressable Interface 8902 to a specific Customer Object 8904. Note the steps set forth below.

Collaborations

5. The Client asks the Customer Interface Proxy for a reference to a Locally Addressable Interface for Cusomer 1234.
6. The Customer Interface Proxy forwards the request across the network to the Customer Interface.
7. The request is forwarded to the Customer Server. The Customer Server requests the customer data from the Database.
8. The Database returns the customer data for Customer 1234.
9. The Customer Server creates instantiates an object and populates it with the customer data. The Customer object is associated with a Locally Addressable Interface (Update Interface).
10. The Locally Addressable Interface is forwarded to the Customer Interface.
11. The Customer Interface forwards a reference to the Locally Addressable Interface, across the network and back to the Customer Interface Proxy.
12. The Customer Interface Proxy instantiates an Update Interface Proxy with the reference to the Update Interface.
13. The Customer Interface Proxy forwards the Update Interface Proxy to the Client.
14. The Client sends a new address for the customer to the Update Interface Proxy.
15. The Update Interface Proxy forwards the information across the network to the Update Interface.
16. The Update Interface forwards the new address to the Customer Object. The Customer Object updates its address based upon the new information.

Collaborations

Proxy—The proxy pattern is generally used to communicate from a Client to a Locally Addressable Interface on a Server.

Interface—The Interface pattern defines methods or functions or services rather than implementation. The Interface pattern is expanded upon by the Locally Addressable Interface pattern.

Globally Addressable Interface—Locally Addressable Interfaces are private interfaces that aren't easily located. Generally, a well-known interface (like a Globally Addressable Interface) is used to find a LAI. A Client can easily find and access a service on a Globally Addressable Interface and request a reference to a Locally Addressable Interface in return.

Structured Based Communications—Often times, a client needs to display data in a UI for a user (e.g. Customer Information, Order Information, etc.). When communicating through a Locally Addressable Interface, this data is transmitted from the Server to the Client using Structure Based Communication.

Alternatives

Globally Addressable Interface. The Globally Addressable Interface pattern is both a collaborating and alternative pattern. It can be used to retrieve information from Servers instead of Locally Addressable Interface—the right choice will depend on the context.

Null Structure

Figure 90:
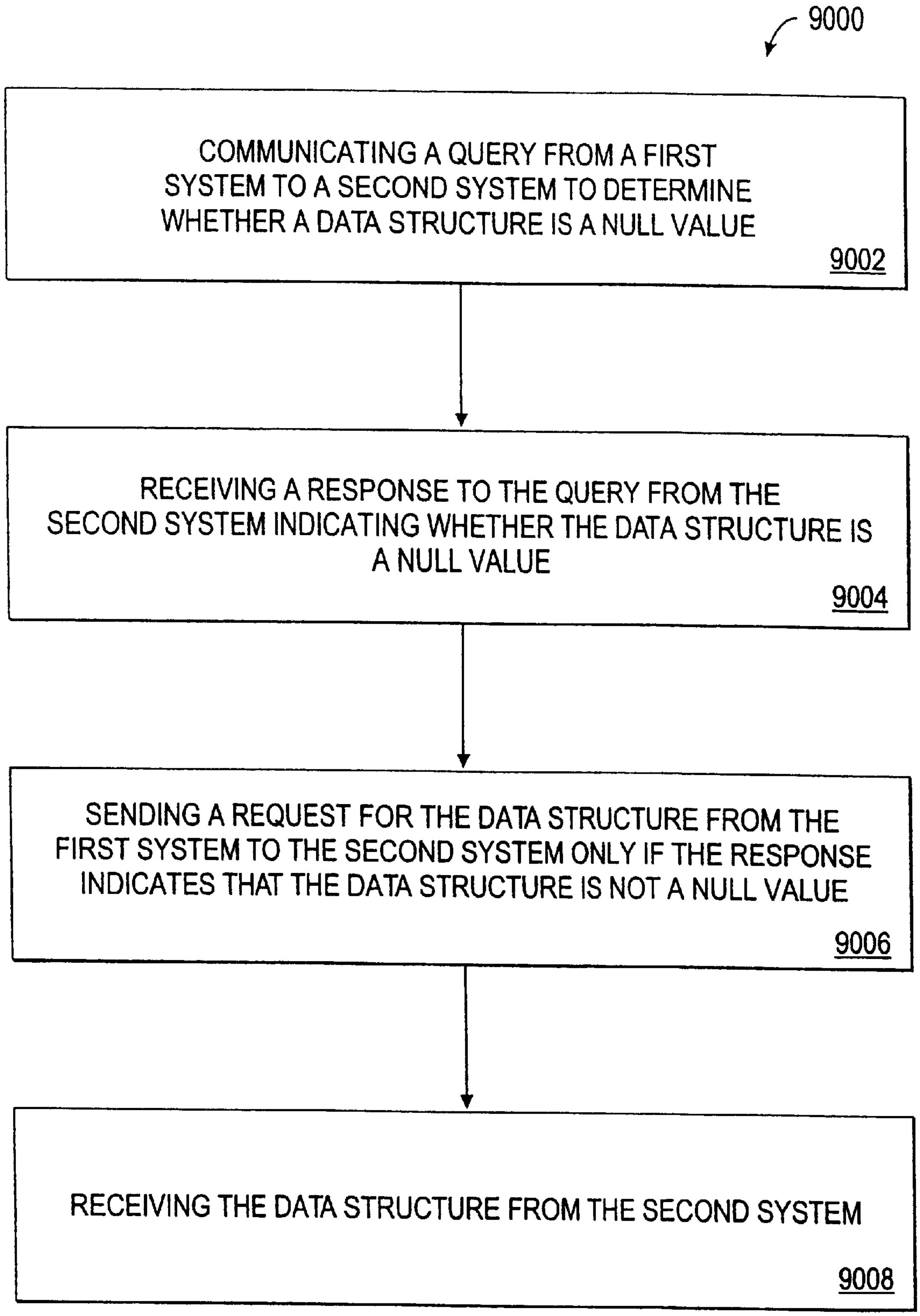
FIG. 90 illustrates a flowchart for a method for communicating a null value in accordance with an embodiment of the present invention.

FIG. 90 illustrates a flowchart for a method 9000 for communicating a null value. A query is first communicated in operation 9002 from a first system to a second system to determine whether a data structure is a null value. Next, in operation 9004, a response to the query is received from the second system indicating whether the data structure is a null value. A request for the data structure is sent from the first system to the second system in operation 9006 only if the response indicates that the data structure is not a null value. Subsequently, the data structure is received from the second system in operation 9008.

As one option, the response may be a Boolean indication. As another option, the response may be determined based on an attribute of the data structure. As a further option, the data structure may represent a set of a plurality of values. Also, the first system may, optionally, be a client and the second system is a server.

When transmitting data across a network between a client and server application, the middleware's "type system" does not always support null values. How can a remote service send or receive null values over a communications medium that does not support them?

It is expected that distributed Business Components will collaborate with other Business Components via some sort of communications medium. Communications between components is not usually handled by the components themselves but rather by some communications middleware (like an object request broker, or ORB).

A "null" value is a frequently used value in object-based systems. A "null" represents the empty set. It is often returned from a service that is unable to find the requested elements or is used as an optional parameter in a distributed service. For example, a Client might request all the customers with a last name of "Smith." If no Customers exist with a last name of "Smith," a "null" value would be returned.

Some legacy systems return −999 or 0 when no data exists. This is not an ideal solution as the system is using data to represent non-data. What if −999 or 0 are valid responses to a request? Instead, a "null" could be used to better represent this case. A "null" value provides extra flexibility since a specific data value need not be reserved to represent the empty set.

Figure 91:
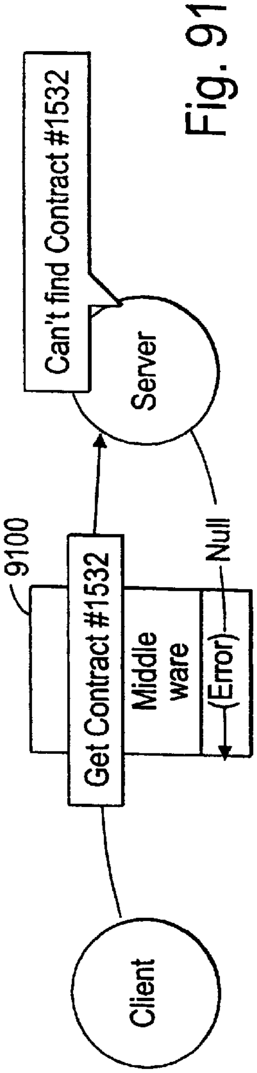
FIG. 91 illustrates the problem associated with sending a NULL across many types of middleware.

However, middleware cannot represent every data type that exists in every language. Since middleware is "language neutral", it can only represent the least common denominator of every language accessible via the middleware. Due to this constraint, "null's" often can not be represented in middleware. FIG. 91 illustrates the problem associated with sending a NULL across many types of middleware 9100.

A system should be able to take advantage of this important value and use middleware that may not support it.

Therefore, use the Null Structure pattern to pass a structure with an isNull attribute across the middleware. Unlike a "null", a structure can be passed across the middleware.

Figure 92:
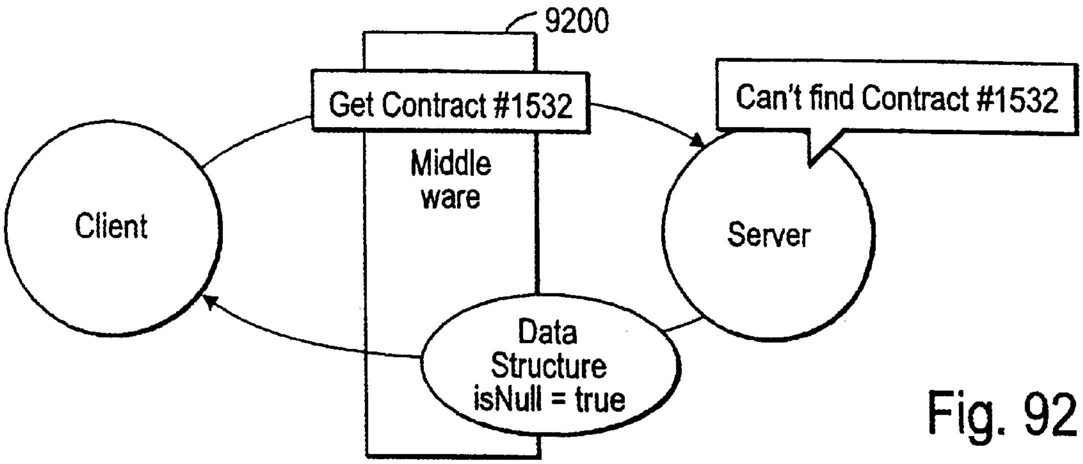
FIG. 92 illustrates the manner in which the present invention passes a "null" structure across the middleware.

FIG. 92 illustrates the manner in which the present invention passes a "null" structure across the middleware 9200.

Figure 93:
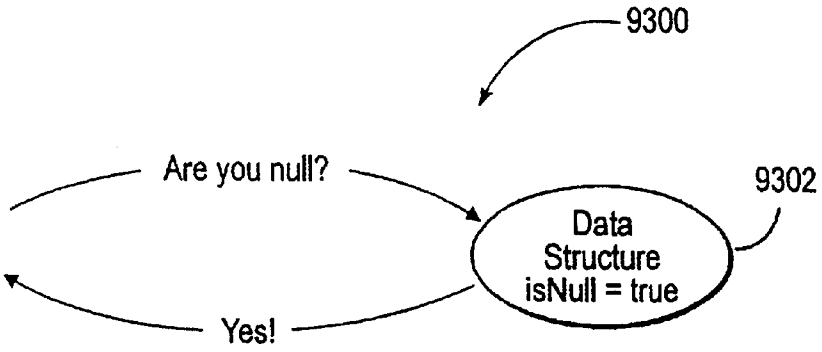
FIG. 93 depicts conversations with a "null" data structure.
Figure 94:
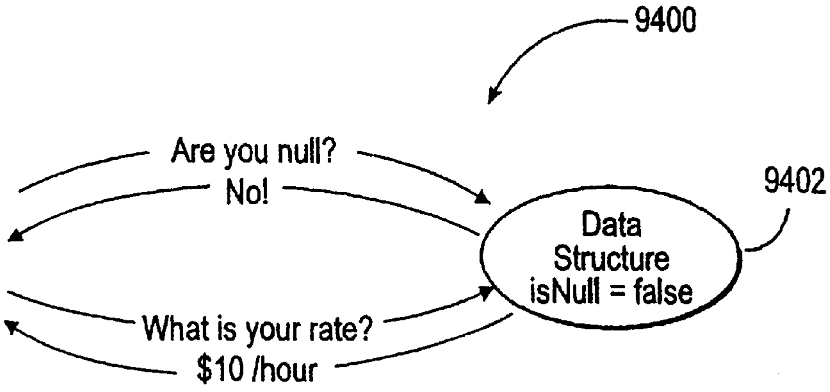
FIG. 94 depicts conversations with a non-"null" data structure.

The extra attribute on the structure then determines whether or not the structure represents a "null" value. The structure can be queried to determine whether or not it represents a "null" value. FIG. 93 depicts conversations 9300 with a "null" data structure 9302. FIG. 94 depicts conversations 9400 with a non-"null" data structure 9402.

The isNull attribute could be added as shown in the IDL example below.

```
structure contract
{
    boolean isNull;
    long buyerIdentifier;
    long sellerIdentifier;
    double rate;
};
```

Benefits

Flexibility. This pattern allows for "null" values to be utilized by distributed components.

The following example assumes a CORBA implementation. In order to pass Null Structures across an ORB, a structure must be defined in the ORB's interface definition language (IDL). The following IDL defines a structure that will represent an Integer or a "null."

```
struct CommonInteger
{
    long value;
    boolean isNull;
}
```

In the code that prepares the data to be sent over the ORB, a check of the data is made and the structure is populated appropriately. If it is null, the isNull flag is set, otherwise it is cleared. Refer to the following code example:

```
public CommonInteger convertIntegerForORB(Integer anInteger)
{
    CommonInteger integerStructure = new CommonInteger();
    if(anInteger == null)
    {
        integerStructure.isNull = true;
    }
```

-continued

```
    else
    {
        integerStructure.isNull false;
        integerStructure.value = anInteger.intValue();
    }
    return integerStructure;
}
```

The receiving code that obtains the data from the ORB does the same conversion in reverse as shown in the method below:

```
public Integer convertIntegerFromORB(CommonInteger
anIntegerStructure)
{
    Integer anInteger = null;
    if (anIntegerStructure.isNull == false)    // structure not null
    {
        anInteger = new Integer(anIntegerStructure.value);
    }
    return anInteger;
}
```

Collaborations

Proxy. A Proxy is a placeholder that can accept requests meant for another object. This is typically used in distributed systems when one component wants to send a request to another. Thus, a proxy is often used to make requests of servers that may return null structures.

Client-Server. Client-Server is a type of architecture that separates the Client portion of an application from the business logic or database portion of an application. When implementing a Client-Server application, the Client and Server often communicate across a middleware (like CORBA) that doesn't support "nulls."

Alternatives

Invalid Value. Determine an "invalid value" for each data type in the particular application. Return the "invalid value" when ever a null should be returned.

Paging Communication

Figure 95:
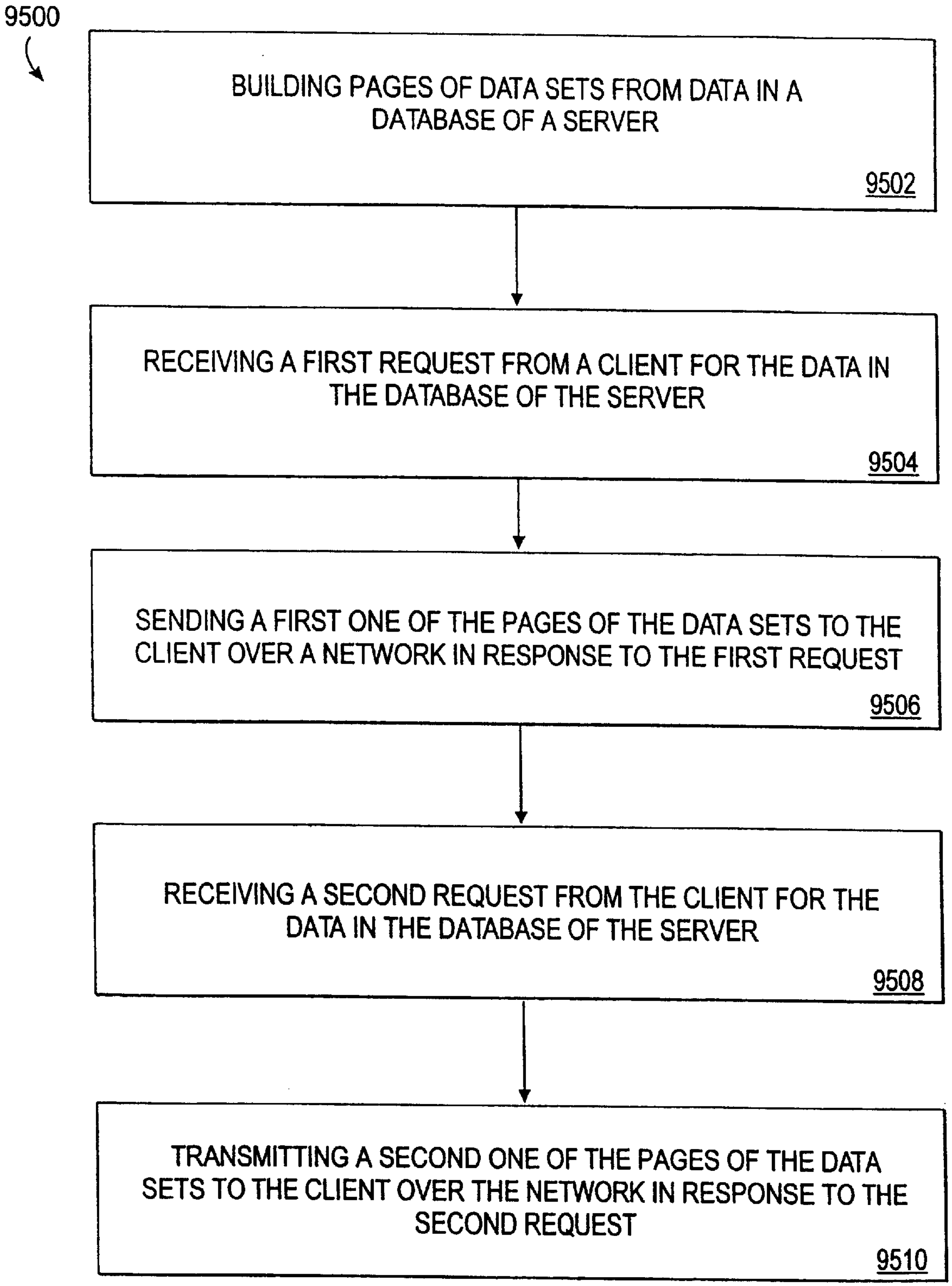
FIG. 95 illustrates a flowchart for a method for transmitting data from a server to a client via pages in accordance with an embodiment of the present invention.

FIG. 95 illustrates a flowchart for a method 9500 for transmitting data from a server to a client via pages. In operation 9502, pages of data sets are built from data in a database of a server. Upon receipt of a first request from a client for the data in the database of the server in operation 9504, a first one of the pages of the data sets is sent to the client over a network in response to the first request in operation 9506. When a second request from the client for the data in the database of the server is received in operation 9508, a second one of the pages of the data sets is then transmitted to the client over the network in response to the second request in operation 9510.

The second request may be sent to the server with an identifier of a last entry of the first page. Also, a size of the data sets of the pages may be defined dynamically. As an option, the pages may be displayed by the client upon receipt from the server. Also, a size of the data sets of each of the pages may be determined based on a user interface of the client. As another option, a size of the data sets of each of the pages may be determined based on an amount of data capable of being displayed at once by the client.

In a client-server environment, a client often needs to display or process a long list of data. Finding and transmitting this list of data can take a long time and negatively impact the user's response time. How can a client and server interact to improve the user's response time when retrieving a large list of data?

Figure 96:
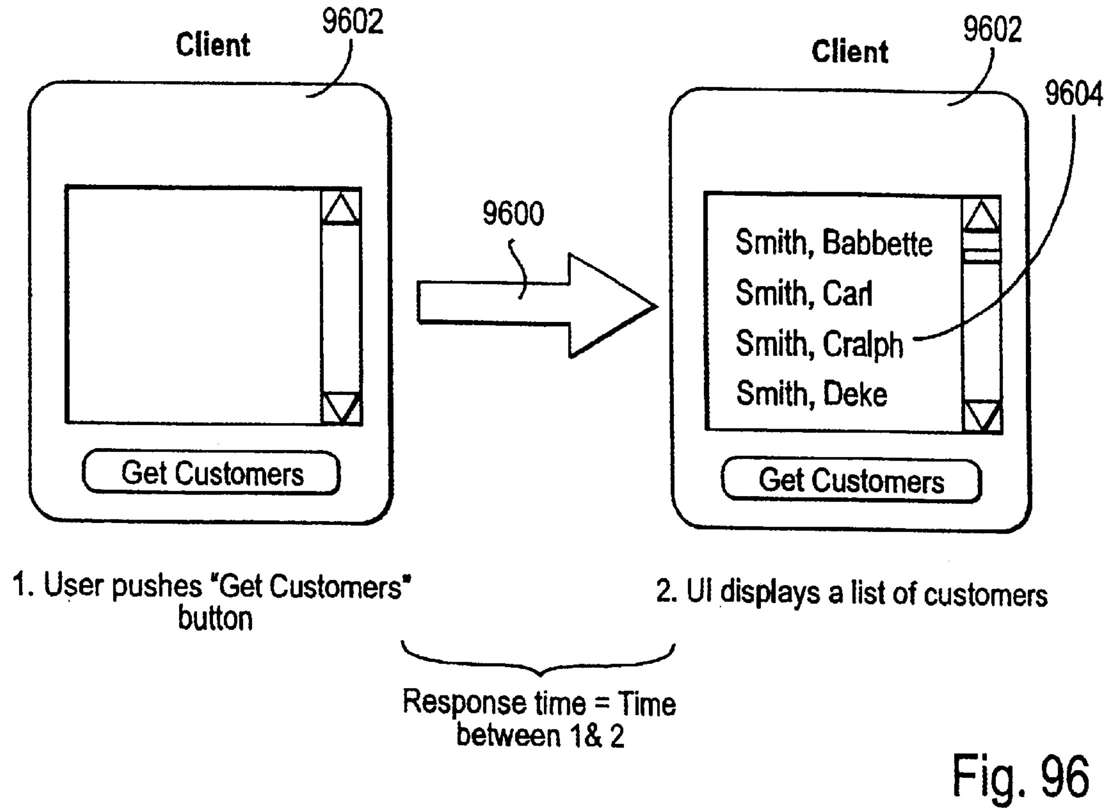
FIG. 96 depicts the response time for a User Interface to display a list of customers in a list box.

The speed with which a UI can respond to a "user initiated" request is important. This is generally called the UI response time and is an important attribute of every application. FIG. 96 depicts the response time 9600 for a User Interface 9602 to display a list of customers in a list box 9604.

Users expect an "acceptable" level of UI response in their applications. Applications that don't meet this criteria, will not be successful.

Many UIs allow users to query databases for lists of data. In FIG. 96, for example, the user clicks the "Get Customers" button to initiate a database query. The query will retrieve every customer from the database and the UI will display the customers in a list box. The user can then scroll through the data and select a particular entry for further investigation.

Figure 97:
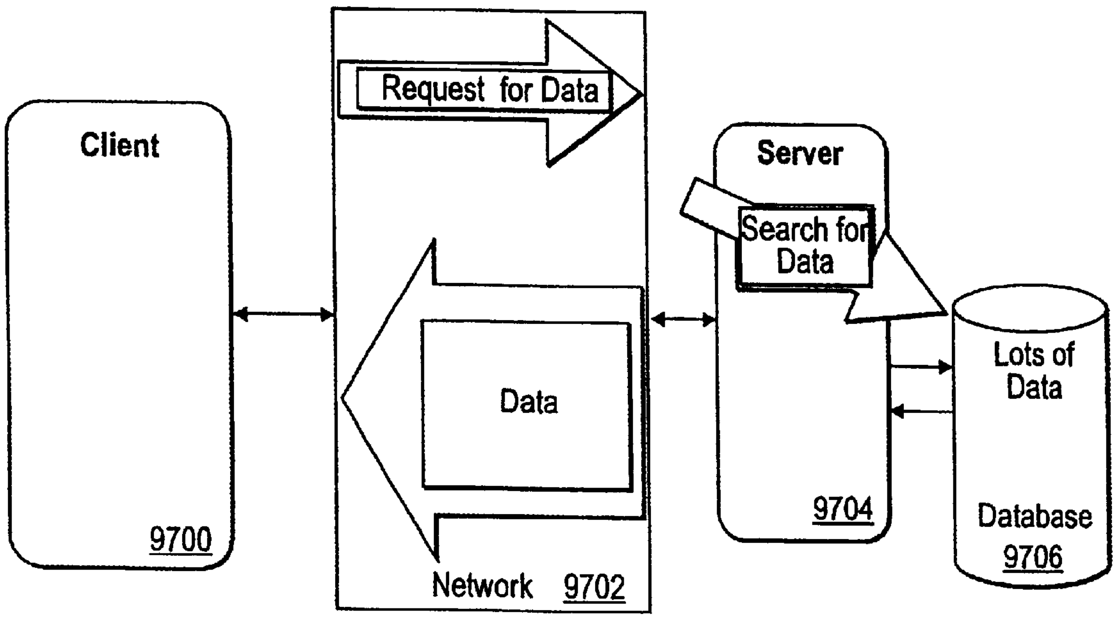
FIG. 97 shows a request that returns a large amount of data.

FIG. 97 shows a request that returns a large amount of data. As shown, in a three-tiered client-server environment, each query must travel from the client UI 9700, across a network 9702, to a Server 9704, and eventually to a Database 9706. Then, the result of the query must travel all the way back to the client.

When the query results in a large amount of data, the time to search the database and return the data across a network can become prohibitive. As a result, the UI response time will quickly degrade to an unacceptable level.

To make things worse, the average user only looks at half of the data returned from the database. The user is just as likely to find their data in the first half of the list as the second half of the list. As a result, the user may wait a long time for data that is not used.

Figure 98:
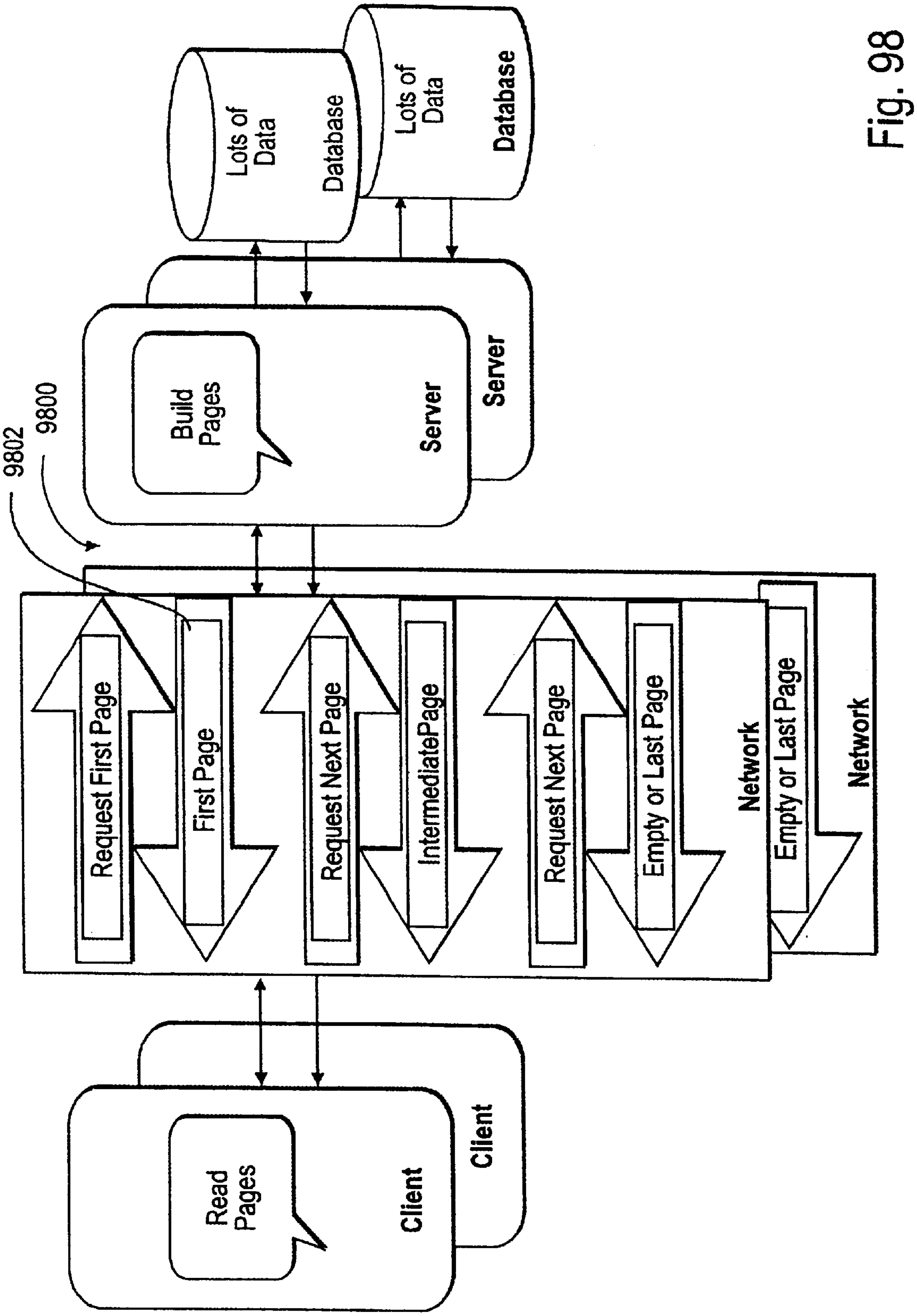
FIG. 98 shows a graphical depiction of a paging communication pattern.

FIG. 98 shows a graphical depiction of a paging communication pattern 9800.

Therefore, provide Paging Communication between the client and server tiers of an application. Paging Communication describes a pattern for transmitting a large amount of data while maintaining an acceptable UI response level.

Rather than send all of the data at one time, a subset or "page" 9802 of data is transmitted. When the client needs more data, another "page" 9802 of data is transmitted. This continues until the client has seen enough data or all the data has been transmitted.

Benefits

More Responsive UI. This pattern improves upon the user's response time. The server only retrieves and transmits a "page" of data at a time. This is a lot faster than retrieving and transmitting all of the data at one time. The pattern breaks-up the total search and transmission time into smaller page-sized chunks. This greatly improves upon the user's perceived performance.

Additionally, the Server searches the database for a "page" of data at a time until the user finds what they are looking for. As a result, unless the needed data is in the last page of data, the search is limited to a portion of the total search.

Configurable Page Size. The page size can be "tuned" to best fit the application. As a result, the page size can be altered to best fit a particular network, application design, etc.

Stateless Servers. The paging mechanism can be managed from the client-side requestor. Thus, this pattern can be used with stateless servers just as easily as with stateful servers.

UI Tunable. The page size can be changed to match a particular User Interface.

List Box Friendly. A list box can only display a limited amount of data at one time. As a result, it isn't as important to have all of the data immediately available for the list box. The List box can display a page of data, and then request additional pages of data as the user scrolls through the list.

Scenario: A user is searching for a particular customer. The user doesn't remember the exact name of the customer, but the user believes they will recognize the name when they see it. Thus, the user requests a list of all customers.

Technical Parameters

Static Page Size=4

List Box can only display 2 lines of data at a time.

Figure 99:
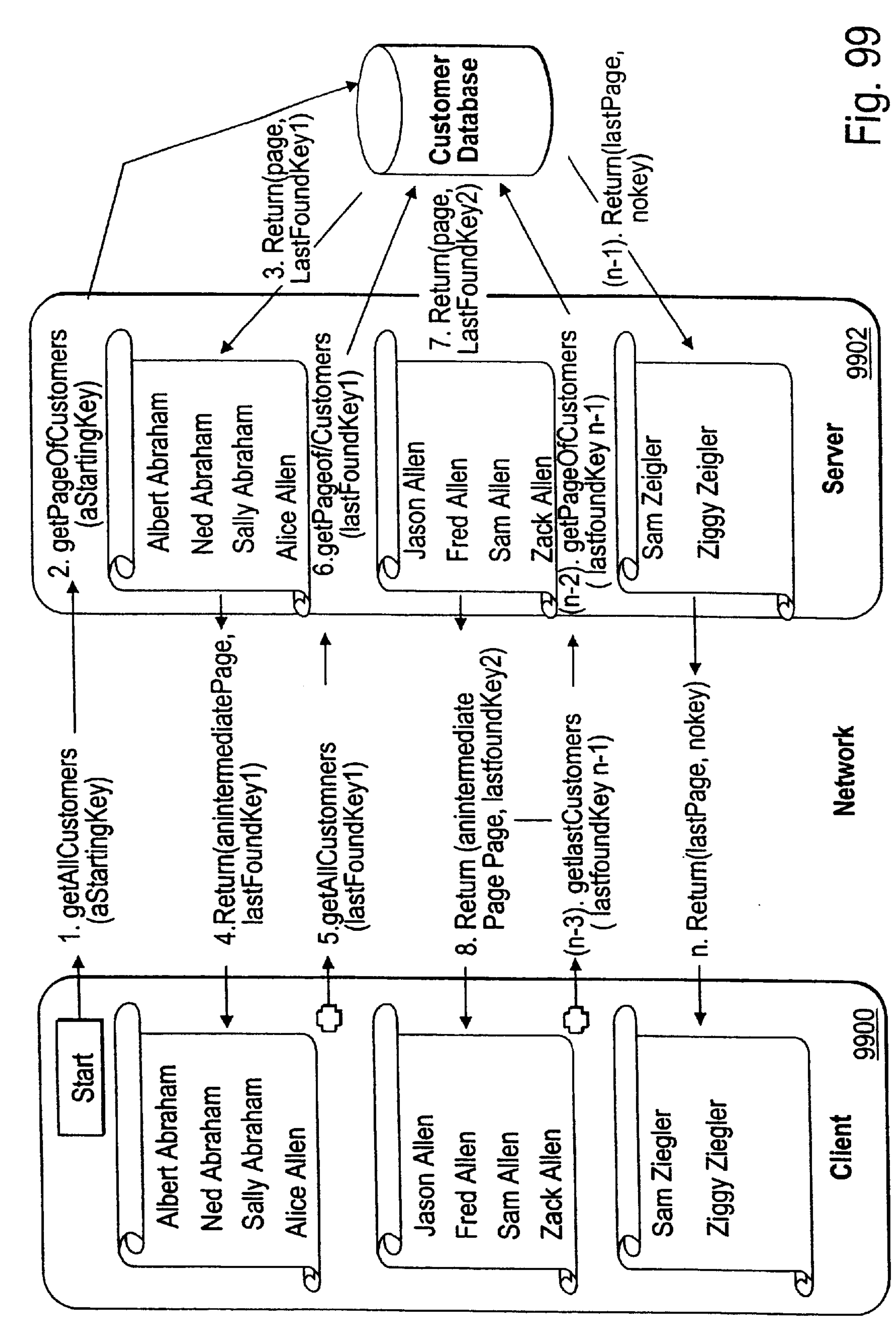
FIG. 99 illustrates a message trace diagram showing the interactions between a Client and a Server using Paging Communication to satisfy the previously mentioned scenario.

FIG. 99 illustrates a message trace diagram showing the interactions between a Client 9900 and a Server 9902 using Paging Communication to satisfy the previously mentioned scenario.

Definitions

Starting Key

The Starting Key is the initial starting point for the search. The database will begin searching for data (customers in the message trace above) at the Starting Key. An example starting key could be "A*".

Last Found Key

The Last Found Key is used to request subsequent pages of data from the Server and the database. The "last found key" defines the starting point for the next data request. The Server will begin searching for data at the "last found key" and continue until it has retrieved a full "page" of information.

When all of the data has been retrieved from the Server and Database, the Last Found Key is left blank. This notifies the Client that all the data has been sent.

Intermediate Page

An intermediate "page" is returned for every request but the last. When a client receives an intermediate page and a "last found key", the client knows more "pages" of data exist on the server.

In order to obtain an intermediate "page," a "last found key" must be passed from the client to the server. When the Server has retrieved a full "page" of data, the new "last found key" is saved. It is then passed back with the intermediate "page." The new "last found key" defines the starting point for the next data request.

Last Page

When the Server has retrieved all of the data meeting the search criteria, the Server builds the last "page." When the last page is returned to the client, the "last found key" is left blank. This notifies the client the search is complete and no more data matching the search exists on the Server. Note that the last page is usually smaller than the other pages.

Empty Page

When no data are selected from the search criteria, the server builds an empty page signaling to the client no more data exist on the server.

Static or Dynamic Page size

The page size can be defined statically or dynamically. The message trace diagram in FIG. 99 depicts a static page size.

If you'd like a dynamic page size, the client must pass an additional parameter with each request to the Server. The additional parameter would be the page size.

The steps associated with FIG. 99 will now be set forth.

Collaborations

1. The user "clicks" the "Get Customers" button on the User Interface. The Client UI makes a getAllCustomers request of the Server and passes a Starting Key as a parameter. Since the user wants to view all of the customers, a Starting Key of spaces is used. Message sent= getAllCustomers(" ")
2. The Server receives the request from the Client. The Server realizes the Starting Key is blank and knows this is a new request. Thus, the Server requests first four customers (the page size) from the database.
3. The database returns the first four customers (Albert Abraham, Ned Abraham, Sally Abraham and Alice Allen) and a "Last Found Key" ("Alice Allen") to the Server. The "Last Found Key" denotes the last entry found during the search. It will be used for subsequent searches.
4. The Server builds a page with the four customers retrieved from the database. The Server returns the page and the Last Found Key to the Client.

Page Type=Intermediate

Page="Albert Abraham", "Ned Abraham", "Sally Abraham" & "Alice Allen"

lastFoundKey="Alice Allen"

The Client receives the "page" of data. The Client sends the data to a UI List Box for viewing by the user. The User can see the first two customers (Albert Abraham, Ned Abraham).

The User clicks the "scroll down" arrow twice and can now see two additional customer (Sally Abraham, Alice Allen).

5. The User clicks the "scroll down" arrow again. No more data exists on the Client so the Client must request another page from the server. The Client UI makes a getAllCustomers request of the Server and passes the Last Found Key of Alice Allen. Message sent=getAllCustomers ("Alice Allen");
6. The Server receives the request from the Client. The Server requests the next four customers (page size) after Alice Allen. Message sent=getPageOfcustomer("Alice Allen")
7. The database returns the next four customers (Jason Allen, Fred Allen, Sam Allen & Zack Allen) and a "Last Found Key" ("Zack Allen") to the Server.
8. The Server builds a page with the four customers retrieved form the database. The Server returns the page and the Last Found Key to the Client.

Page Type=Intermediate

Page="Jason Allen", "Fred Allen", "Same Allen" & "Zack Allen"

lastFoundKey="Zack Allen"

The Client receives the "page" of data. The Client sends the data to a UI List Box for viewing by the user. The User can see the first two customers and one new customer (Alice Allen, Jason Allen).

The User can now scroll through the next three customers. When scrolling past customer Zack Allen, the Client will request another page of data from the Server. It will follow the same basic pattern as described in steps 5–9.

Eventually, the end of the list of Customer will be reached.

n-3. Once again, the client clicks the "scroll down" arrow and no more customers exist on the client. The Client must request another page from the server. The Client UI makes a getAllCustomers request of the Server and passes the Last Found Key of Jim Ziegler. Message sent=getAllCustomers("Jim Ziegler");

n-2. The Server receives the request from the Client. The Server requests the next four customers (page size) after Jim Ziegler. Message sent=getPageOfcustomer ("Jim Ziegler")

n-1. The database can only find two more customers. The database returns the final two customers (Sam Ziegler and Ziggy Ziegler) and no Last Found Key.

n. The Server builds a page with the two remaining customers retrieved from the database. The Server returns the page and the blank Last Found Key to the Client.

Page Type=Last Page

Page "Sam Ziegler", "Ziggy Ziegler"

lastFoundKey=""

The Client receives the final "page" of data. The Client sends the data to a UI List Box for viewing by the user. The User can see the following two customers (Jim Ziegler, Sam Ziegler).

The User clicks the "scroll down" arrow once and can now see the final two customers (Sam Ziegler, Ziggy Ziegler) in the List Box.

Subsequent "clicks" on the scroll down arrow no longer request data from the Server. The Client knows (due to the blank last found key) that it has already received all of the available data.

Additional details

Context isn't generally stored on the Server when implementing Paging Communication. As a result, it is important to request a minimum collection of data from the server. Most of the relational database are using a count mechanism that defines the maximum number of data to search. That will minimize CPU and memory usage.

As explained in the example, page size may be adapted to the client requirements, however that does not mean the page size must exactly fit the widget size. Ideally the client application will anticipate future user actions and request more than one page.

Collaborations

Proxy—The Proxy pattern is often used to communicate between Clients and Servers in a distributed environment. A Proxy is often used to make requests for a "page" of data from a Server.

Interface Control Model—The ICM pattern addresses the separation of the Interface (Viewing portion) from the Control from the Model (the data portion) in an application. Paging Communication is often used when implementing this separation of functionality. A user through the Interface uses the pattern to retrieve large lists of data from the Model for viewing.

Globally Addressable Interface—Globally Addressable Interfaces are often used to obtain a Page of data from a Server for display in a Client UI.

Alternatives

Paging with Server Caching—This pattern builds upon the Paging Communication pattern. Rather than querying the database for a "page" of information, the Server would retrieve all of the data at one time. Then the Server would pass the data to the Client one page at a time.

Refreshable Proxy Pool

Figure 100:
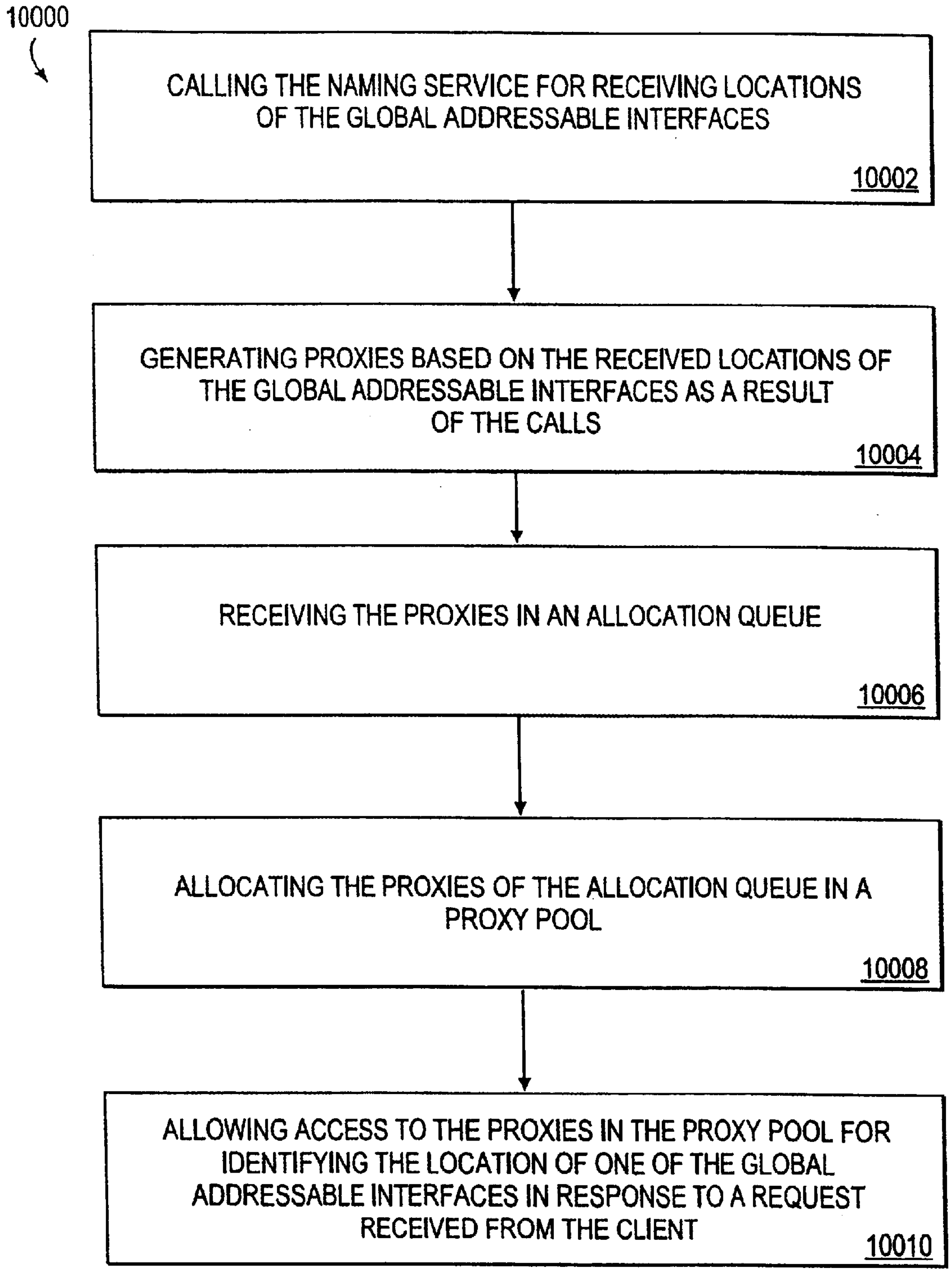
FIG. 100 illustrates a flowchart for a method for interfacing a naming service and a client with the naming service allowing access to a plurality of different sets of services from a plurality of globally addressable interfaces in accordance with an embodiment of the present invention.

FIG. 100 illustrates a flowchart for a method 10000 for interfacing a naming service and a client with the naming service allowing access to a plurality of different sets of services from a plurality of globally addressable interfaces. In operation 10002, the naming service calls for receiving locations of the global addressable interfaces. As a result of the calls, proxies are generated based on the received locations of the global addressable interfaces in operation

10004. The proxies are received in an allocation queue where the proxies are then allocated in a proxy pool (see operations 10006 and 10008). Access to the proxies in the proxy pool is allowed for identifying the location of one of the global addressable interfaces in response to a request received from the client in operation 100010.

The proxy pool may employ load balancing. As another option, the proxies in the proxy pool may be renewed based on an age thereof. As a third option, a handle may interface the proxy pool and the client. This handle may additionally interface a plurality of the proxy pools and the client.

In distributed systems with many clients, it is important to establish connections with remote servers in an efficient manner. In a manner where clients evenly utilize the available servers. How can this be performed in a consistent manner for all clients?

In production systems it is quite common for long-lived clients to "stay up" for days and interact with a collection of different servers. Oftentimes, a client process will establish connections to the same type of server a bunch of times during its lifetime. The lifetimes of the client and its servers are often different as a result of server maintenance and failures. However, such failures should have minimal impact on the client. Clients in such systems usually retrieve a Globally Addressable Interface (GAI) from a naming or Trader Service (see GAI Pattern).

A GAI retrieved by a client will usually go through three phases: 1) Initial retrieval of a GAI from the Trader Service that is subsequently wrapped up in a proxy, 2) Invocations of businesses functions supported by the GAI and 3) Release of the GAI proxy. This often means a long-lived client will repeatedly ask the Trader Service for the same type of interface during its lifetime.

Figure 101:
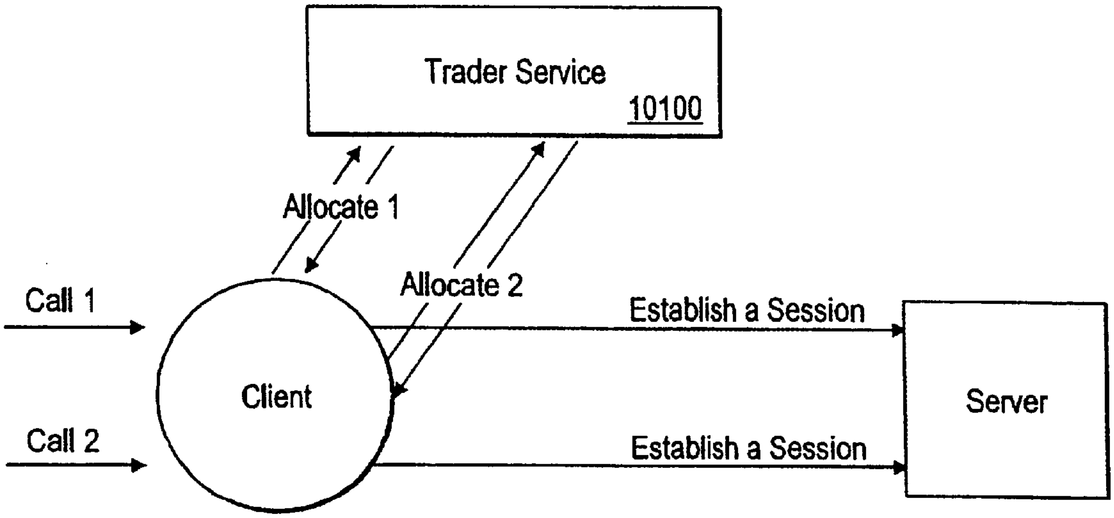
FIG. 101 illustrates repeated requests to the Trader Service for the same interfaces.

FIG. 101 illustrates repeated requests to the Trader Service 10100 for the same interfaces are neither efficient nor necessary Repeatedly requesting the same interface from a Trader Service is neither efficient or necessary. However, the Trader Service does maintain load balancing information and allocates the least busy interface at any given time. Thus, some value exists in repeated reallocation.

Therefore, use a Refreshable Proxy Pool mechanism that standardizes the usage, allocation and replenishment of proxies in a client's pool. Initially, the Proxy Pool will allocate a bunch of Proxies to remote services using some sort of a Lookup Service (e.g. Trader Service, Naming Service). The Proxy Pool will hold onto these Proxies and allocate them to Clients as they need them. When the client asks the Proxy Pool for a proxy, the pool will hand out a new Proxy.

Figure 102:
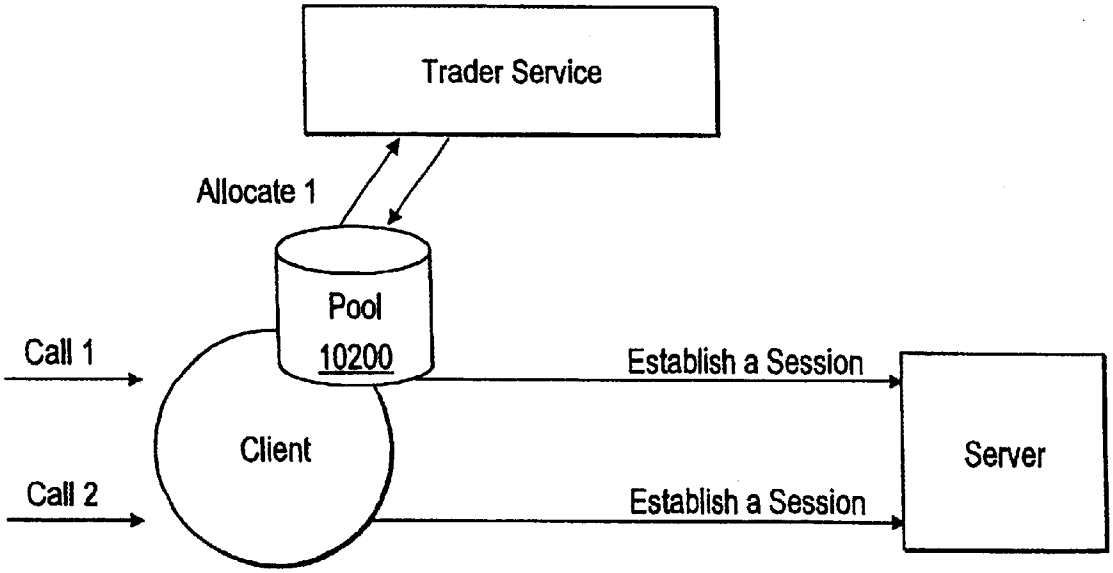
FIG. 102 illustrates how a pool can be created that reuses GAI proxies.

FIG. 102 illustrates how a pool 10200 can be created that reuses GAI proxies.

In order to balance the system load evenly, the Proxy Pool should implement a Load Balancing approach (e.g. Round Robin) for handing out proxies within the pool.

Each proxy in the pool has a "retirement age." The "retirement age" determines the time to refresh a given Proxy. When a Proxy reaches its retirement age, it is taken out of the pool and replaced with a freshly allocated Proxy. This ensures the Proxy Pool is refreshed regularly with new GAIs retrieved from the Trader Service. The retirement mechanism helps dynamically balance the systems load.

Benefits

- Performance. Establishing connections to servers will take less time because clients will go to the trading service less often.
- Balanced Load. This ensures all clients are implementing the same strategy for utilizing available servers.
- Standard. One single approach to pooling increases maintainability and predictability across the enterprise and decreases confusion.
- Ease of use. Client developers do not have to design and implement their own version of pooling.
- Maintenance. This mechanism allows for centralized development. When a bug is found it can be fixed and distributed to all build centers.
- Dynamic. Client threads will not have to worry about allocating retired or bad proxies.
- Robustness. By pooling GAI location information, clients are less susceptible to Trader Service failure. This is because the Proxy Pool can operate using the GAIs it has information on for as long as those references main valid.

The Proxy Pool should be packaged and distributed to client developers so that it is non-intrusive and easy for them to use.

Parameters such as pool size and retirement age should be configurable.

The client thread using the proxy should not pay a penalty for pooling or allocation.

The pool should recover gracefully from server failure.

The pool should recover gracefully from Trader Service failure.

Figure 103:
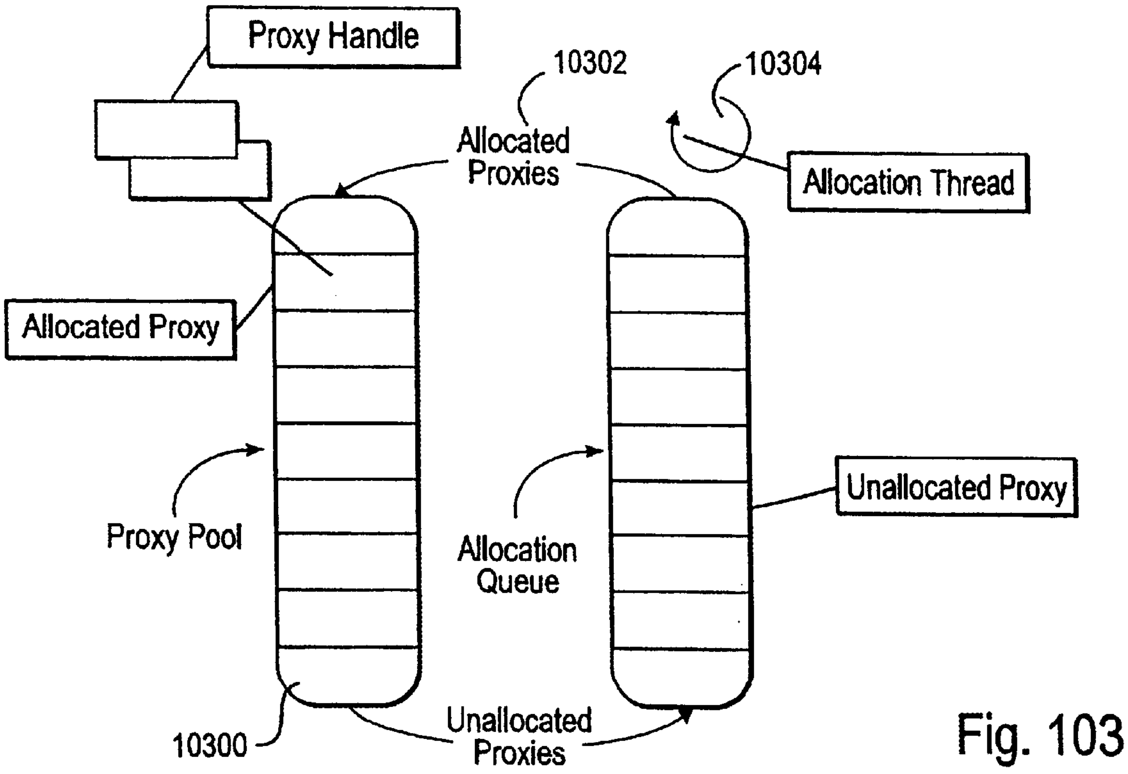
FIG. 103 illustrates the implementation of a Refreshable Proxy Pool.

FIG. 103 illustrates the implementation of a Refreshable Proxy Pool 10300. The Refreshable Proxy Pool is based on a pool-queue approach. In this design, the pool holds allocated proxies 10302 while the queue allocates and replenishes the pool with proxies. To handle the allocation and replenishment, a worker or allocation thread 10304 runs on the queue and makes calls to the Trader Services as needed.

There can be numerous proxy pools, but this implementation supports typed pools Using C++ templates, i.e., each pool will only contain proxies of one type. This allows the client to create a class that is passed to the proxy pool and supports client specific properties in the pool such as pool size, retirement age, etc. Also, due to synchronization issues with the rest of the architecture, there can be only one allocation queue.

Clients who wish to use a pooled proxy will create a handle as a wrapper. This handle wrapper takes care of the problems associated with sharing resources across threads such as lazy initialization, reference counting, allocation, and de-allocation.

Handles are classes that abstract the users away from the implementation. Handles are generally stack based and exist for the lifetime of a method invocation or an object. The handle destructor insures that the underlying proxy is dereferenced.

Suggested Classes

Figure 104:
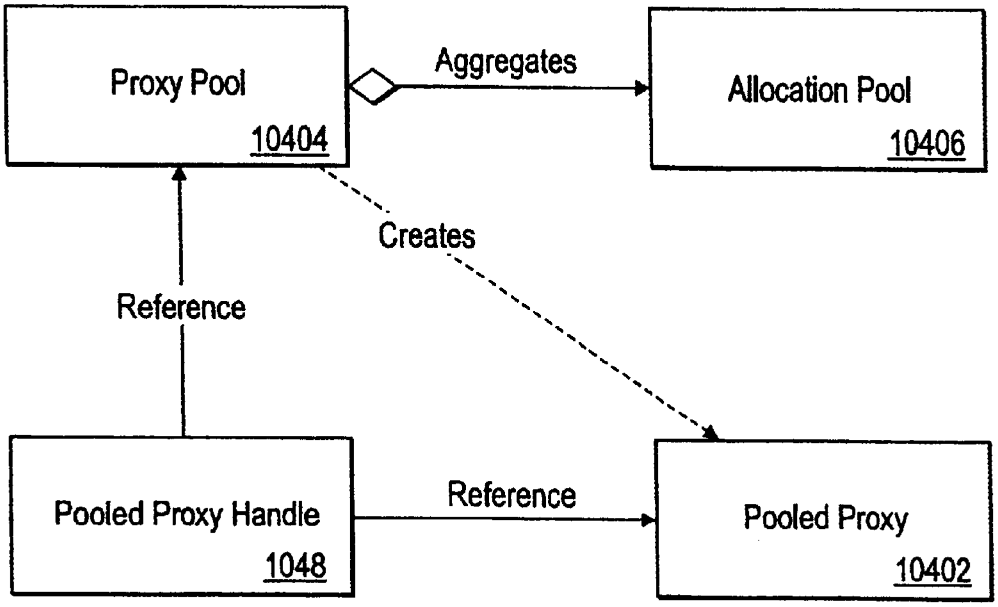
FIG. 104 illustrates the class relationships between the patterns primary classes.

FIG. 104 illustrates the class relationships between the patterns primary classes.

| Class | Description |
|---|---|
| PooledProxy (10402) | This is the base class for the pooled proxy. It actually acts as a wrapper for a Proxy and maintains all usage and reference counting information. |
| ProxyPool (10404) | This is the proxy pool, where clients go to retrieve a proxy. It should be thread-safe in that multiple threads are automatically synchronized. This pool should only contain valid proxies that have been allocated by the AllocationPool. When a proxy is requested, the usage count is incremented. After the |

-continued

| Class | Description |
|---|---|
| | "usage" passes retirement age, the proxy is remove from the pool and placed back into the allocation pool. |
| AllocationPool (10406) | This is the pool that actually does the proxy allocation. This pool is populated with unallocated proxies and a "reader" thread will allocate them. Since there will only be one, this class should be implemented as a Singleton. This pool however can allocate proxies of any type. |
| ProxyHandle<T> (10408) | This is the Handle that clients should use to manage pooled proxies. The handles must use a static_cast<T> (C++ template) to retrieve the correct proxy. T is defined by a client template instantiation, and assumes the client knows exactly what type of proxy the pool is actually holding. Clients must take care to assure that pools only contain proxies of one type. |

Collaborations

Globally Addressable Interface—This is a pattern for making interfaces publicly available. Distributed connections to Globally Addressable Interfaces can be pooled using the Refreshable Proxy Pooling pattern.

Proxy—This pattern is documented in the book "Design Patterns" by Gamma, Helm, Johnson and Vlissides. The proxy pattern is often used to communicate with server components in a distributed environment. Proxies are pooled using the Refreshable Proxy Pool pattern.

Trader—The Trader service defines how distributed architectures locate components based on the types of services they provide. The allocation queue interacts with a Trader Service to allocate the correct type of proxy.

Naming—The Naming Service provides a mapping between names and object references. A Naming Service could be used to store the GAI references that the Refreshable Proxy Pool pattern requires.

Alternatives

Single Use—As opposed to pooling connections to a remote server a client can request a new connection each time a GAI is needed. This would work best when a client infrequently needs GAIs.

Proxy Pool—This pattern addresses the pooling of proxies without periodic refreshing. It is a simpler version of the Refreshable Proxy Pool that may be of use when server load is fairly constant.

Self-Describing Stream

FIG. 105 illustrates a flowchart for a method 10500 for providing a self-describing stream-based communication system. Messages are sent including data between a sending system and a receiving system in operation 10502. Meta-data is attached to the messages being sent between the sending system and the receiving system in operation 10504. The data of the messages sent from the sending system to the receiving system is translated based on the meta-data in operation 10506. The meta-data includes a first section that identifies a type of object associated with the data and a number of attribute descriptors in the data. Also included is a second section that includes a series of the attribute descriptors defining elements of the data.

As an option, the sending system and receiving system may each be equipped with logic for interpreting the meta-data of the messages. As another option, the elements may be defined in terms of size, type, and name. Versions of the present invention include a version where one of the systems may be an object-based system and one of the systems may be a non-object-based system, a version where both of the systems may be object-based systems, and even a version where both of the systems may be non-object-based systems.

Stream-based communication is a very effective pattern for relaying data, data structures, and meta-data. Meta-data is information about the data, such as data structure, data types, etc. using a shared, generic format. How can the message format be shared between systems so as to create the most flexible stream-based communication mechanism?

Often, it is determined that a stream-based communication mechanism should be used to transport information between systems. Stream-based communication is a pattern where information is transported from one system to another system using a simple stream and a shared format that relays both the data and meta-data information.

Figure 106:
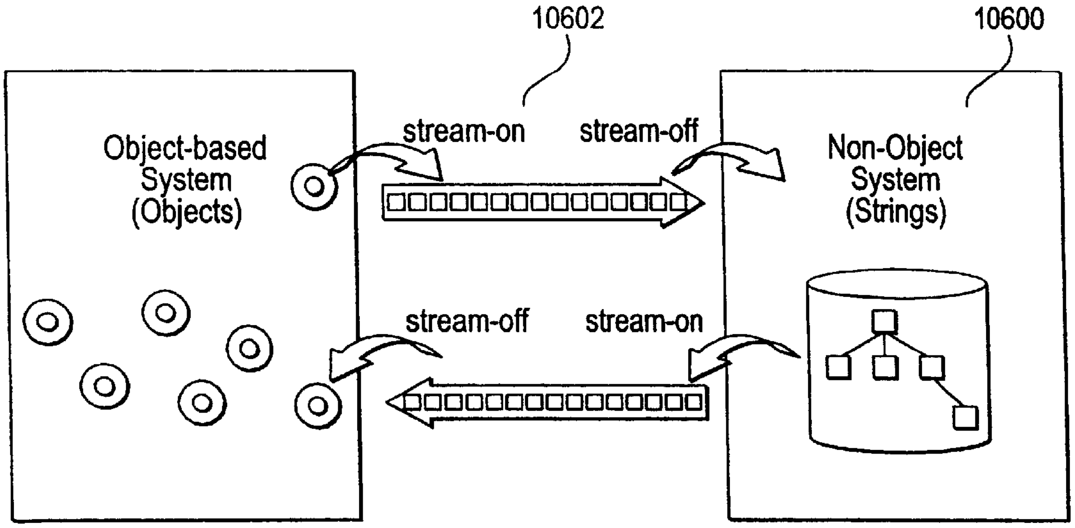
FIG. 106 illustrates two systems communicating via Stream-Based Communication and using a shared generic format to relay the meta-data information.

FIG. 106 illustrates two systems 10600 communicating via Stream-Based Communication 10602 and using a shared generic format to relay the meta-data information.

However, when implementing Stream-based Communication 10602, a number of factors influence the method for enabling each system with a "shared format." The "shared format" provides the meta-data information needed to interpret the raw data in a stream. This shared format is like a secret decoder ring for systems sending and receiving messages. It allows the systems to convert structured data (objects, strings, etc.) into raw data and raw data back into structured data. This is needed to transmit the structured data across the network.

Many additional factors influence the detailed design of this communication mechanism. Some systems support volatile and constantly changing object models, data models and data structures. In these systems, flexible, de-coupled communication is extremely important.

In a constantly changing system, a statically defined "shared format" doesn't work very well. Every change to the object model, data model of data structure causes a reimplementation of the "shared format." Each reimplementation results in a redesign, recompile, and retest of the changed code.

Figure 107:
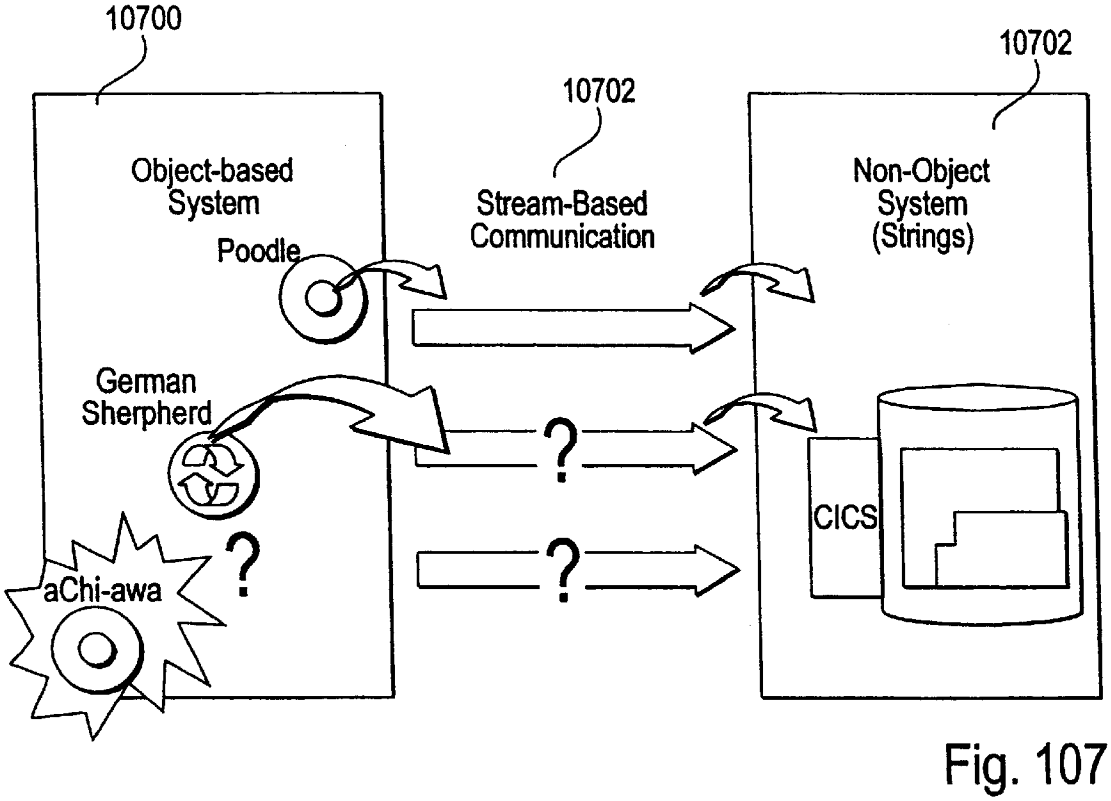
FIG. 107 illustrates an object-based system with a frequently changing object model communicating via Stream-Based Communication.

FIG. 107 illustrates an object-based system 10700 with a frequently changing object model 10702 communicating via Stream-Based Communication 10704.

FIG. 107 depicts a constantly changing system. Initially, the object-based system 10700 is designed to send Poodle objects through a stream to a non-object system 10702. As time passes, the system requirements change. Now, the object-based 10700 system must send German Shepherd objects through a stream to the non-object system 10702. If the "shared format" for converting dog objects to raw data is inflexible, this will break the system.

In cases like this, it would be better to implement a communication mechanism or "shared format" that can better handle changes to the systems.

Therefore, use a Self-Describing Stream and create a stream that contains message data AND descriptive meta-data. Then use a message language to read the formatting information and meta-data off of the stream.

Figure 108:
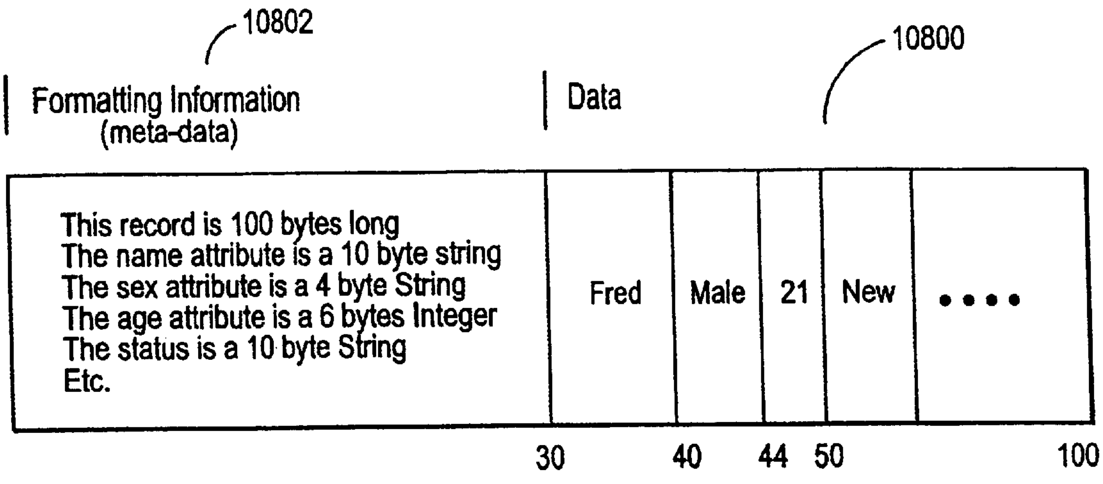
FIG. 108 illustrates a stream-based message that contains both message data and descriptive meta-data.

FIG. 108 illustrates a stream-based message that contains both message data 10800 and descriptive meta-data 10802.

FIG. 108 depicts a message sent using a Self-Describing Stream. The first 30 bytes contain descriptive meta-data 10802. This meta-data 10802 describes the formatting of the "real" data 10800 in the remainder of the message. It describes the data type, attribute names, location in the message, etc. of the "real" data 10800 in the message. The remaining 70 bytes are the "real" data 10800 transmitted between the two systems.

Additionally, each system must implement a message language. The message language defines the rules for writing and interpreting the descriptive meta-data. It describes how the meta-data is parametarised and embedded in the message.

These Self-Describing messages usually contain three distinct sections: a generic header, an attribute descriptors section, and a data section. The header portion contains generic information about the message. It contains such information as the type of object, the number of attributes descriptors, the target environments, etc. The attribute descriptors section contains a series of attribute descriptors that define the various data elements of the information. The number of these attribute descriptors is usually defined in the header section. The last section contains only data.

Figure 109:
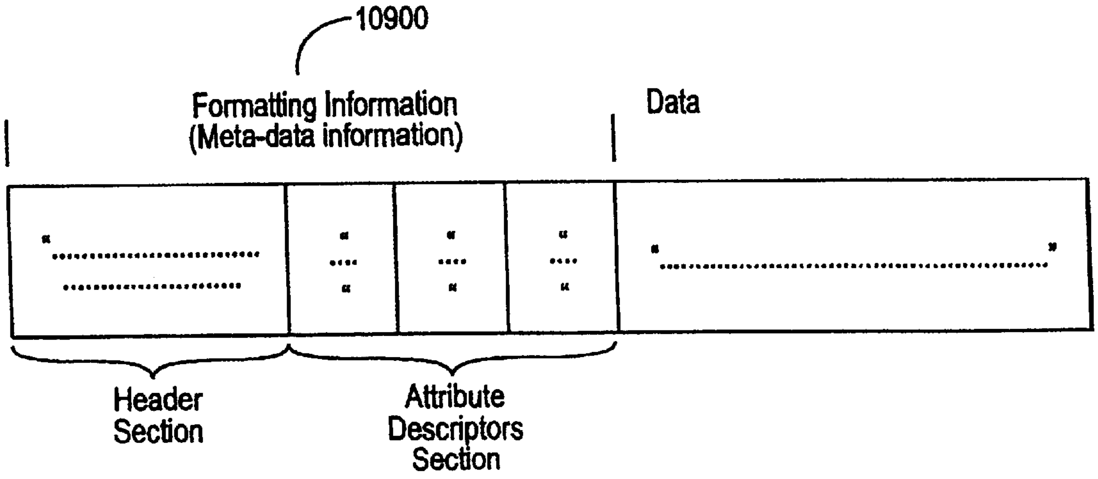
FIG. 109 illustrates the manner in which a message language defines how to parameterize the meta-data and put it on the stream.

FIG. 109 illustrates the manner in which a message language defines how to parameterise the meta-data 10900 and put it on the stream.

Benefits

Greater Flexibility. Because the information about the structure of the data has been parameterised and stored as additional data within the message, changes to the data structure would have no effect on this interface mechanism. This means the interface mechanisms will not need to be re-designed/re-built/re-tested/re-deployed, etc for each change in meta-data.

Interfacing systems are better de-coupled. Because the message format is embedded in the actual stream, this format does not need to be stored or kept in synch across different systems. It can be "discovered" at run-time when the interface is invoked.

For object-based systems, the implementation is quite straightforward. Simply make each object responsible for implementing streaming behaviors based on the format and message language. Each object should know how to get and parse its attribute values onto a stream as string values (streamOn) and each object class should know how to parse attributes off of a stream and put these values into a new instance of the object (streamOff).

Below is an example of a Self-Describing stream. It is used to stream an object's information from an object-based system to a non-object system.

Figure 110:
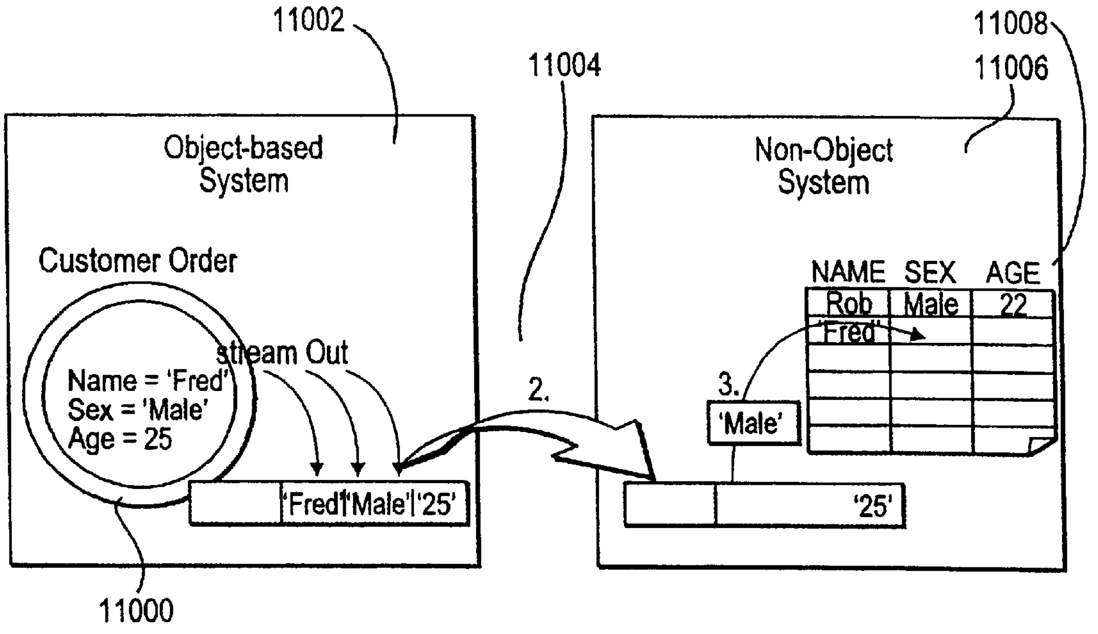
FIG. 110 illustrates a Customer object in an object-based system streaming itself into a stream, the stream being sent to a non-object system, this stream being read and the data inserted into a relational database.

FIG. 110 illustrates a Customer object 11000 in an object-based system 11002 streaming itself into a stream 11004, the stream 11004 being sent to a non-object system 11006, this stream 11004 being read and the data inserted into a relational database 11008. The steps illustrated in FIG. 110 will now be set forth.

1. The CustomerObject with attributes name, sex, and age has a method "streamOn: aStream." It is invoked with an empty stream as the argument 'aStream'. The CustomerObject "streamOn:" method goes through each of the object's attributes and parses each value as a string onto the stream.

In the Java pseudo-code below, the message language defines the format of the header, the format of the attribute descriptors, and the delimiter used in the parsing.

Note: Assume that "asString( )" converts the receiver to a string and that "padWithSpaces( )"pads the string with spaces and makes the string the length specified.

```
/** Stream my attribute values on aStream **/
public void streamOn (OutputStream aStream)
{
  // CREATE THE HEADER
  aStream.write('CUSTOMER ');//This is a customer object
  aStream.write('003'); // with three attributes
  aStream.write('001'); // this is the format version
  // DESCRIBE EACH ATTRIBUTE
  aStream.write(Stream.Delimiter);
  aStream.write('NAME ');
  aStream.write('STG ');
  aStream.write('010');
  aStream.write(Stream.Delimiter);
  aStream.write('SEX ');
  aStream.write('STG ');
  aStream.write('007');
  aStream.write(Stream.Delimiter);
  aStream.write('AGE ');
  aStream.write('NUM ');
  aStream.write('003');
  // WRITE OUT THE ATTRIBUTE VALUES AS DATA
  aStream.write(Stream.Delimiter);
  aStream.write(this.getName().asString().padWithSpaces(10));
  aStream.write(this.getSex().asString().padWithSpaces(7));
  aStream.write(this.getAge().asString().padWithSpaces(3));
}
```

2. The stream is then put into a message communication mechanism like MQSeries or MessageQ and sent to the non-object system.

3. Once at the non-object system, interface code reads the stream, parses the values off, converts and moves the values into a copybook with the appropriate structure, and saves the information in relational database. A pseudo-COBOL example is listed below. In reality, this interface code would be more dynamic than depicted in this example.

```
...
DATA DIVISION.
FD FILE-STREAM-IN
   RECORD CONTAINS 100 CHARACTERS
...
WORKING-STORAGE SECTION.
01 WS-FILE-STREAM-IN   PIC X(100).
O1 WS-SHARED-FORMAT-HEARDER
O3 WS-HEADER-OBJECT-TYPE           PIC X(10).
03 WS-HEADER-NUM-OF-ATTRIBUTES     PIC X(7).
03 WS-HEADER-VERSION-OF-FORMAT     PIC 999.
```

-continued

```
O1 WS-SHARED-FORMAT-ATTRIBUTE
O3 WS-ATTRIBUTE-NAME              PIC X(5).
03 WS-ATTRIBUTE-TYPE              PIC X(5).
03 WS-ATTRIBUTE-SIZE              PIC 999.
O1 TEMP-VARIABLES
   O3  WS-INDEX                   PIC 9999.
...
01 WS-CUSTOMER
03 WS-NAME                        PIC X(10).
03 WS-SEX                         PIC X(7).
03 WS-AGE                         PIC 999.
...
88 LT-HEADER-SIZE                 PIX 99 VALUE 20.
88 LT-ATTRIBUTE-DESCRIPTOR-SIZE
                                     PIX X(1) VALUE 14.
88 LT-DELIMINATOR                 PIX X(1) VALUE "|".
88 LT-STRING                      PIX X(1) VALUE "STG ".
88 LT-NUMBER                      PIX X(1) VALUE "NUM ".
...
PROCEDURE DIVISION.
...
*** OPEN THE FILE STREAM AND READ IT INTO THE
TEMPORARY ***
*** VARIABLE WS-FILE-STREAM-IN ***
OPEN FILE-STREAM-IN.
READ FILE-STREAM-IN INTO WS-FILE-STREAM-IN
   AT-END CLOSE FILE-STREAM-IN
END-READ.
*** MOVE THE HEADER INFORMATION INTO THE HEADER
COPYBOOK****
MOVE (WS-FILE-STREAM-IN FROM ZERO TO LT-HEADER-SIZE)
   TO WS-SHARED-FORMAT-HEADER.
*** FIND WHAT BYTE THE DATA STARTS AT AND SET THE
INDEX ****
MOVE (LT-ATTRIBUTE-DESCRIPTOR-SIZE * WS-HEADER-NUM-
OF-ATTRIBTES)
TO WS-INDEX.
*** PARSE THE APPROPRIATE OBJECT STRUCTURE OFF OF ***
*** THE STREAM                              ***
IF WS-HEADER-OBJECT-TYPE EQUALS "CUSTOMER " THEN
   PERFORM 1000-PARSE-CUSTOMER-STREAM THRU
      1000-PARSE-CUSTOMER-STREAM-END.
ELSE IF WS-HEADER-OBJECT-TYPE EQUALS "EMPLOYEE "
THEN
...
ELSE IF
...
ELSE
*** END THE PROGRAM
RUN-STOP.
END-IF.
1000-PARSE-CUSTOMER-STREAM.
*** READ WHICH VARIABLE IT IS AND POPULATE THE
CORRECT ***
*** VARIABLES ***
IF (WS-FILE-STREAM FROM WS-INDEX TO (WS-INDEX +5)) =
"NAME "
THEN
MOVE WS-INDEX TO START-INDEX.
*** FIND THE DELIMINATOR AFTER THE NAME STRING AND
***
*** MOVE THE NAME VALUE INTO THE SEX VARIABLE ****
PERFORM
   VARYING WS-INDEX
   FROM START-INDEX
   BY 1
   UNTIL (WS-FILE-STREAM-IN AT INDEX) = LT-
DELIMINATOR
END-PERFORM.
MOVE (WS-FILE-STREAM FROM START-INDEX
TO WS-INDEX) TO WS-SEX.
   PERFORM    1000-PARSE-CUSTOMER-STREAM
THRU 1OOO-PARSE-CUSTOMER-STREAM-END.
ELSE IF (WS-FILE-STREAM FROM WS-INDEX TO (WS-INDEX +
5)) = "SEX "
THEN
*** FIND THE DELIMINATOR AFTER THE SEX STRING AND
MOVE ***
```

-continued

```
*** THE SEX VALUE INTO THE SEX VARIABLE       ***
MOVE WS-INDEX TO START-INDEX.
PERFORM
     VARYING WS-INDEX
     FROM START-INDEX
     BY 1
     UNTIL (WS-FILE-STREAM-IN AT WS-INDEX) = LT-
DELIMINATOR
END-PERFORM
MOVE (WS-FILE-STREAM FROM START-INDEX
TO WS-INDEX)TO WS-SEX
     PERFORM    1000-PARSE-CUSTOMER-STREAM
THRU 1OOO-PARSE-CUSTOMER-STREAM-END.
ELSE IF (WS-FILE-STREAM FROM WS-INDEX TO (WS-INDEX
+5)) = "AGE "
THEN
*** FIND THE DELIMINATOR AFTER THE AGE STRING AND ***
*** MOVE THE AGE VALUE INTO THE AGE VARIABLE ****
MOVE INDEX TO START-INDEX.
PERFORM
     VARYING WS-INDEX
     FROM START-INDEX
     BY 1
     UNTIL (WS-FILE-STREAM-IN AT WS-INDEX) = LT-
DELIMINATOR
END-PERFORM
MOVE (WS-FILE-STREAM FROM START-INDEX
TO WS-INDEX)TO WS-AGE
     PERFORM    1000-PARSE-CUSTOMER-STREAM
THRU 1OOO-PARSE-CUTOMER-STREAM-END.
ELSE
     PERFORM 2000-SAVE-CUSTOMER THRU
2000-SAVE-CUSTOMER-END.
END-IF.
1000-PARSE-CUSTOMER-STREAM-EXIT.
2000-SAVE-CUSTOMER.
*** CALL A SQL MODULE TO SAVE THIS INFORMATION IN
THE
*** RELATIONAL DATABASE
CALL "SAVE-CUSTOMER-IN-DATABASE" USING WS-
CUSTOMER
...
2000-SAVE-CUSTOMER-END.
```

Conversely, a stream could be created by a non-object system or another object system, populated with customer information, and sent to one's object-based system. Once in the object-based system, the CustomerObject could use a "streamOff: aSteam" method, instanciate a CustomerObject, and populate it with the appropriate attribute values.

Collaborations

Stream-based Communication. This is the parent pattern to the Self-Describing Stream pattern. In this pattern, information is transmitted using a simple stream and a shared, generic format. The Self-Describing Stream is a more specific implementation of Stream-Based Communication.

Bridge (from the Gamma book Design Patterns) describes a way to de-couple an abstraction from its implementation so that the two can vary independently. The Bridge pattern is often used to define collaborations between a business object and a format object while decoupling the business object from its specific stream format.

Abstract Factory (from the Gamma book Design Patterns) is a pattern for creating families of related classes. This could be used with the Bridge pattern to retrieve the format dynamically based on non-static information.

Alternatives

Fixed Format Stream—This pattern is a specific variation of Stream-Based communication where the messaging format is defined and stored on both the sending and receiving systems.

Downloadable Format Stream—This pattern is a specific implementation of Stream-Based communication where the messaging format is stored at a central location and is downloaded by the communicating parties when needed.

Stream-based Communication

Figure 111:
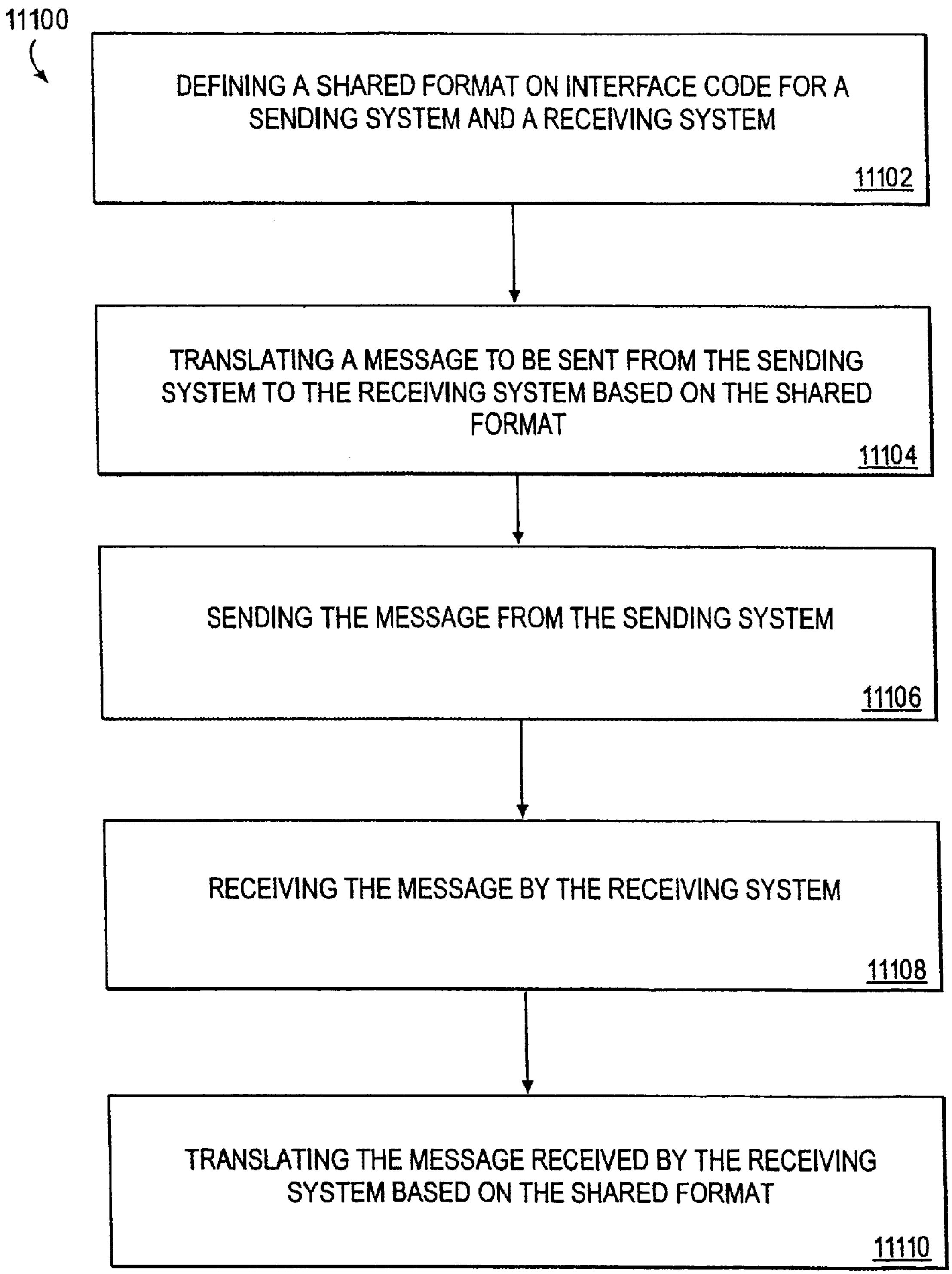
FIG. 111 illustrates a flowchart for a method for providing a stream-based communication system in accordance with an embodiment of the present invention.

FIG. 111 illustrates a flowchart for a method 11100 for providing a stream-based communication system. A shared format is defined on interface code in operation 11102 for a sending system and a receiving system. A message to be sent from the sending system to the receiving system is translated based on the shared format in opration 11104. The message is sent from the sending system and received by the receiving system in operations 11106 and 11108. The message received by the receiving system is translated based on the shared format in operation 11110.

As an option, information in the translated message received by the receiving system may be stored in a relational database. As another option, , the shared format may be based on an order of attributes in the message.

In one version, one of the systems may be an object-based system and one of the systems may be a non-object-based system. In another version, both of the systems may be object-based systems. In a third version, both of the systems may be non-object-based systems.

In order to successfully transmit a formatted message, both the sending and receiving systems must understand the format and structure of the transmitted information. Some communications mediums, however, do not inherently transmit the formatting information with the data. How can information be easily communicated between systems when the communication mechanism does not inherently convey data structure or other meta-data information?

For two systems to successfully communicate, they must understand the structure of the data they are passing. The sending system needs to convert standard programming constructs (objects, structure, strings etc.) into bytes of data that can be transmitted along a network. The receiving system needs to receive the bytes of data on a wire and reconstitute it back into objects, structure, strings etc.

Many communication mechanisms inherently provide this functionality to a software developer. CORBA and DCOM are two examples of this type of middleware. Using CORBA, one system can send a structure of information to another system. CORBA will convert the structure into a network appropriate format, transmit it across the network and reformat it on the receiving end.

Other types of middleware, however, do not provide this full range of functionality. Lower level communication protocols like TCP and UDP as well as higher-level protocols like HTTP and telnet do not provide support for sending data structures.

Additionally, popular message queuing software (IBM'S MQSeries and BEA MessageQ) and many custom communications mechanisms are lacking support for transmitting structured data across the network.

These communication protocols do not inherently convey meta-data information. 'Meta'-data is information about the data. Meta-data could describe the data structure (senders address in bytes 1–10, receivers address in bytes 11–20, data in 21–100, etc.), data types, etc.

When the highest-level common communication protocol between two systems cannot convey this meta-data information, an alternative communication mechanism is needed.

Figure 112:
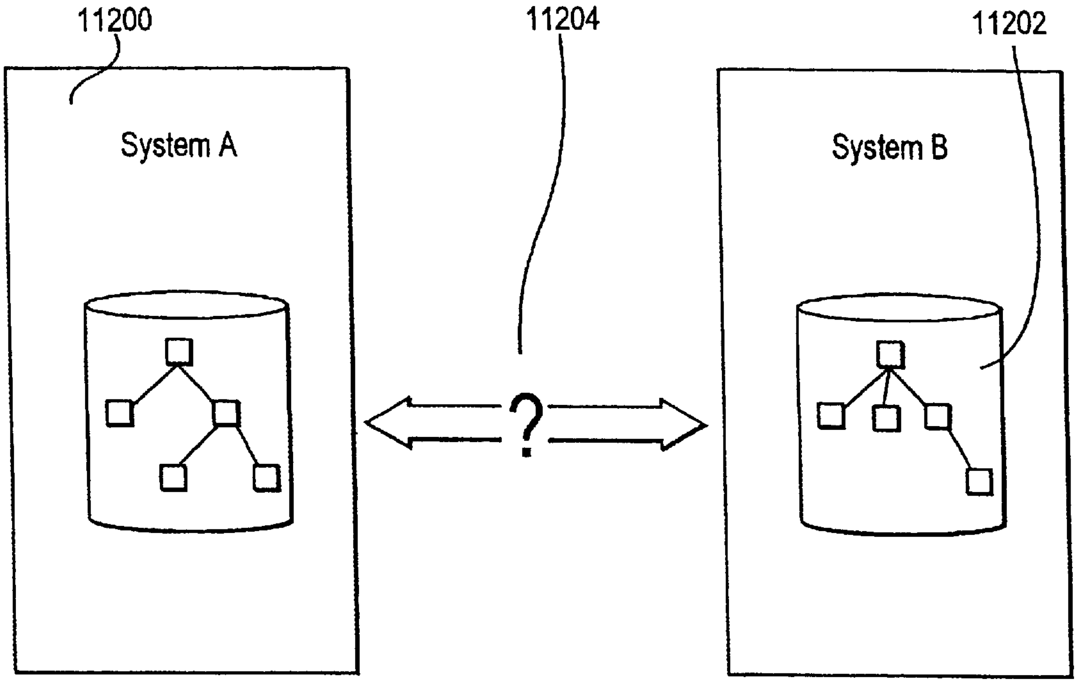
FIG. 112 illustrates how systems of the present invention communicate over a communication mechanism that cannot inherently convey meta-data information.

FIG. 112 illustrates how systems 11200, 11202 of the present invention communicate over a communication mechanism 11204 that cannot inherently convey meta-data information.

How can they exchange structured data?

In object-based systems, issues with conveying meta-data are even more prevalent. Object-based systems often need to transfer object information across non-object communication mechanisms (e.g. DCE, . . . ) or to non-object systems. Because neither non-object communication mechanisms nor the non-object systems understand the notion of objects, how can the structure of the objects be meaningfully conveyed?

Figure 113:
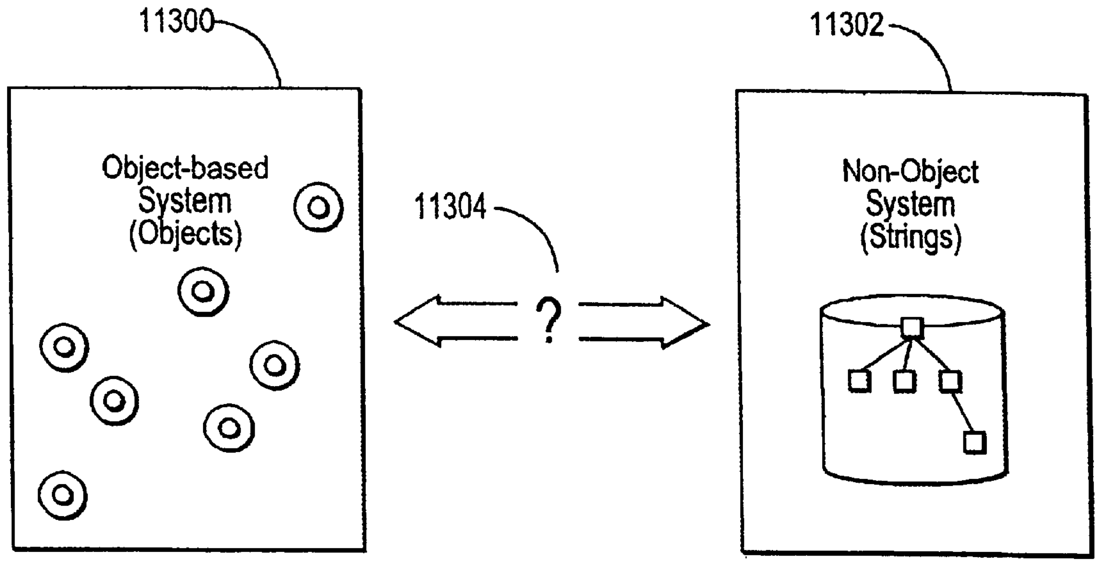
FIG. 113 is an illustration of an object-based system communicating with a non-object system using a communication mechanism that cannot convey meta-data information.

FIG. 113 is an illustration of an object-based system 11300 communicating with a non-object system 11302 using a communication mechanism 11304 that cannot convey meta-data information.

How can they exchange structured data?

Therefore, use Stream-based Communication to transmit information between systems. Stream the data between the two systems and use a generic format to relay the information and its associated meta-data between the systems.

A stream is simply a buffer that data is "written to" and "read from" in discrete quantities. The size of the buffer is predetermined and can be very small (i.e. one byte in length) or very large (i.e. a page). The buffer can't hold objects or structures, but just raw data. Buffers are quite dumb and don't understand anything about their raw data. Thus, it does not have meta data for the information in the buffer.

The "shared format" provides the meta-data information needed to interpret the raw data in the buffer. This shared format is like a secret decoder ring for systems sending and receiving messages. The sending system uses the decoder ring to convert objects, structures, etc. into raw data on a stream. The receiving system uses another decoder ring to reconstitute the raw data back into objects or structures. If objects aren't supported, the raw data is converted into a comparable format for use by the receiving system.

Figure 114:
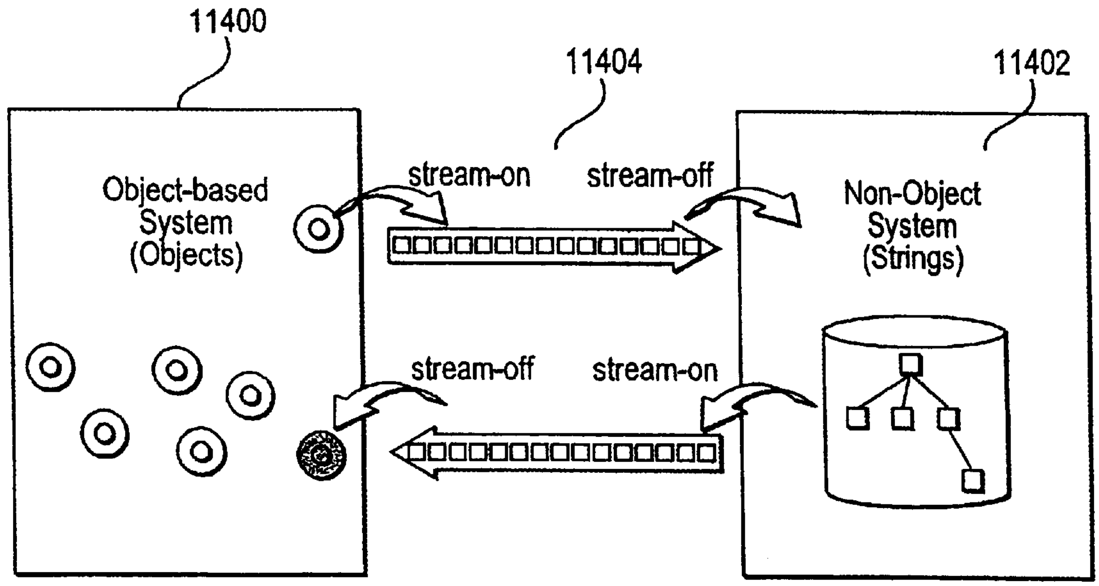
FIG. 114 depicts an example of Stream Based Communication with two disparate systems communicating via stream-based communication.

FIG. 114 depicts an example of Stream Based Communication with two disparate systems 11400, 11402 communicating via stream-based communication 11404.

In FIG. 114, the object-based system 11400uses a shared format (decoder ring) to convert an object into raw data. The raw data is then copied onto the stream. The stream then delivers the data to the Non-Object system 11402. The Non-Object system 11402 reads the raw data and reconstitutes the data using its shared format.

In this example, the sending system is sending objects while the receiving system doesn't understand objects. Thus, the receiving system can only convert the raw data into a data equivalent of the object sent.

Benefits

Maintainability. When using this pattern, a shared, generic format is used to interpret the data. As a result, the two systems are de-coupled and less dependent upon each other. As long as the format remains unchanged, changes to the internal implementation of either system will not affect the other system. Maintenance of decoupled systems is easier.

Batch Compatible. Strings of data can be concatenated and transmitted as a group. This enables batch messaging (e.g. Request Batcher) and processing.

Enables Lightweight Persistence. Stream-based communication can be used to interface with a lightweight persistence mechanism. Objects, structures, etc. can be can be converted to raw data and streamed to a flat file for saving. At a future time, the file can be opened, the raw data can be streamed out of the file and reconstituted into full blown objects or structures.

The implementation of Stream Based Communication is very straightforward. Simply define interface code on the sending system that creates a stream and parses the data onto this stream using a format shared by the both the sending and receiving systems. On the receiving system, define interface code that reads the stream and, using the same shared format, parses the data off of the stream and into a data structure compatible with the receiving system.

The specific implementation of the formats can be, and most likely will be, different from system to system but the actual format must be shared and should be generic between systems. Shared so that the information is accurately relayed and generic to keep the systems as de-coupled as possible by not exposing any implementation details of either system in the format. Further, this shared format can be implemented in a variety of places depending upon the specific requirements of the interface.

For object-based systems, make each object responsible for implementing streaming behaviors that use this shared format. Each object should use the format as a map to parse the attribute values onto a stream (streamOn). Conversely, each object class should use the format as a map to parse its attribute values off of a stream and put them into a newly instantiated instance of the object (streamOff).

In the example below, an object within an object-based system uses stream-based communication to stream its attribute values onto a stream. Then a communication mechanism transports the stream to a non-object system, and a non-object system reads the information off of the stream and inserts it into its relational database.

Figure 115:
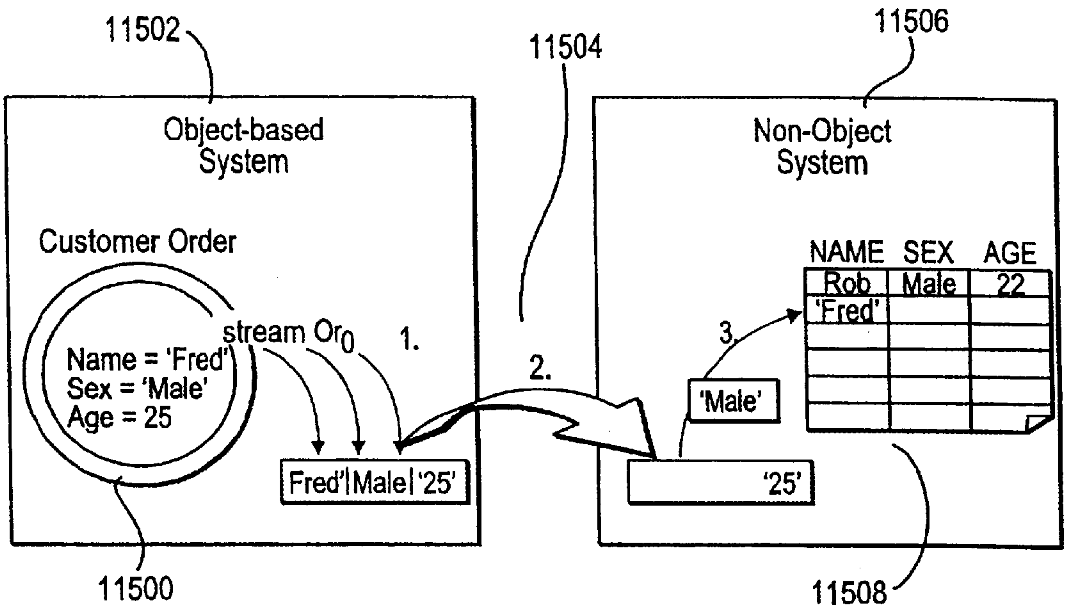
FIG. 115 is an illustration of a Customer object in an object-based system streaming itself into a stream, the stream being sent to a non-object system, this stream being read and the information is inserted into a relational database.

FIG. 115 is an illustration of a Customer object 11500 in an object-based system 11502 streaming itself into a stream 11504, the stream 11504 being sent to a non-object system 11506, this stream 11504 being read and the information is inserted into a relational database 11508.

1. The CustomerObject with attributes name, sex, and age has a method "streamOn: aStream." It is invoked with an empty stream as the argument 'aStream'. The CustomerObject "streamOn:" method goes through each of the object's attributes and parses each values as a string onto the stream.

The fixed format contract here is embodied in the order that this method parses the attributes onto the stream. A pseudo-code example in Java is the following: Note—Assume that "asString( )" converts the receiver to a string and that "padWithSpaces( )"pads the string with spaces and makes the string the length specified.

```
/** Stream my attribute values on aStream **/
public void streamOn (OutputStream aStream)
{
aStream.write(this.getName().asString().padWithSpaces(10));
aStream.write(this.getSex().asString().padWithSpaces(7));
aStream.write(this.getAge().asString().padWithSpaces(3));
}
```

2. The stream is then put into a message communication mechanism like MQSeries or MessageQ and sent to the non-object system.
3. Once at the non-object system, interface code reads through the stream, parses the values off of the stream, converts them to the appropriate types if required, and puts them in a copybook with the appropriate structure. In this example, the fixed format contract is embodied in the structure and type of the WS-SHARED-FORMAT-CUSTOMER working-storage copybook. Refer to the pseudo-COBOL example below.

```
. . .
DATA DIVISION.
FD FILE-STREAM-IN
   RECORD CONTAINS 20 CHARACTERS
. . .
WORKING-STORAGE SECTION.
*** THIS COPYBOOK CONTAINS THE SHARED FORMAT OF
THE
*** CUSTOMER IN THE DATA STRUCTURE AND DATA TYPES
01 WS-SHARED-FORMAT-CUSTOMER
03 WS-SHARED-FORMAT-NAME      PIC X(10).
03 WS-SHARED-FORMAT-SEX       PIC X(7).
03 WS-SHARED-FORMAT-AGE       PIC 999.
*** THIS COPYBOOK IS THIS SYSTEMS VIEW OF A CUSTOMER
O1 WS-CUSTOMER
03 WS-NAME                  PIC X(10).
03 WS-AGE                   PIC 999.
03 WS-SEX                   PIC X(10).
. . .
PROCEDURE DIVISION.
. . .
*** OPEN THE FILE STREAM AND PUT THE CONTENTS IN THE
*** WS-SHARED-FORMAT-CUSTOMER COPYBOOK.
OPEN FILE-STREAM-IN
READ FILE-STREAM-IN INTO WS-SHARED-FORMAT-
CUSTOMER
   AT-END CLOSE FILE-STREAM-IN
END-READ.
*** MOVE THE VALUES INTO FROM THE SHARED FORMAT
INTO
```

-continued

```
*** THE WS-CUSTOMER VARIABLES.
MOVE WS-SHARED-FORMAT-SEX TO WS-SEX.
MOVE WS-SHARED-FORMAT-AGE TO WS-AGE.
MOVE WS-SHARED-FORMAT-NAME TO WS-NAME.
. . .
*** CALL A SQL MODULE TO SAVE THIS INFORMATION IN
THE
*** RELATIONAL DATABASE
CALL "SAVE-CUSTOMER-IN-DATABASE" USING WS-
CUSTOMER.
. . .
STOP-RUN.
```

Conversely, a stream could be created by a non-object system (or another object-based system for that matter) and sent to one's object-based system. In this case, CustomerObject could use a "streamOff:aStream" method and instanciate A new instance of a aCustomerObject and populate it with the appropriate attribute values.

Again, there are several variations of this pattern depending upon what the specific requirements are. Some of these variations are further explained in the children patterns. Refer to Fixed Format Stream, Downloadable Format Stream, and Self-describing Format Stream.

Collaborations

Fixed Format Stream—This child pattern is a specific variation of Stream-Based communication where the messaging format is defined and stored on both the sending and receiving systems.

Downloadable Format Stream—This child pattern is a specific variation of Stream-Based communication where the messaging format is stored at a central location and is downloaded by the communicating parties when needed.

Self-Describing Stream. This child pattern is a specific variation of Stream-Based communication where the messaging format is parameterised and stored on the stream. A message language is used to read and write the format of the message from the stream.

Structure Based Communication—This pattern uses a Fixed Format Stream to transmit data structure between systems. It is often used to obtain data from a Server for display in a Client UI.

Bridge (from the Gamma book Design Patterns) describes a way to de-couple an abstraction from its implementation so that the two can vary independently. The Bridge pattern is often used to define collaborations between a business object and a format object while decoupling the business object from its specific stream format.

Abstract Factory (from the Gamma book Design Patterns) is a pattern for creating families of related classes. This could be used with the Bridge pattern to retrieve the format dynamically based on non-static information.

Structure-Based Communication

Figure 116:
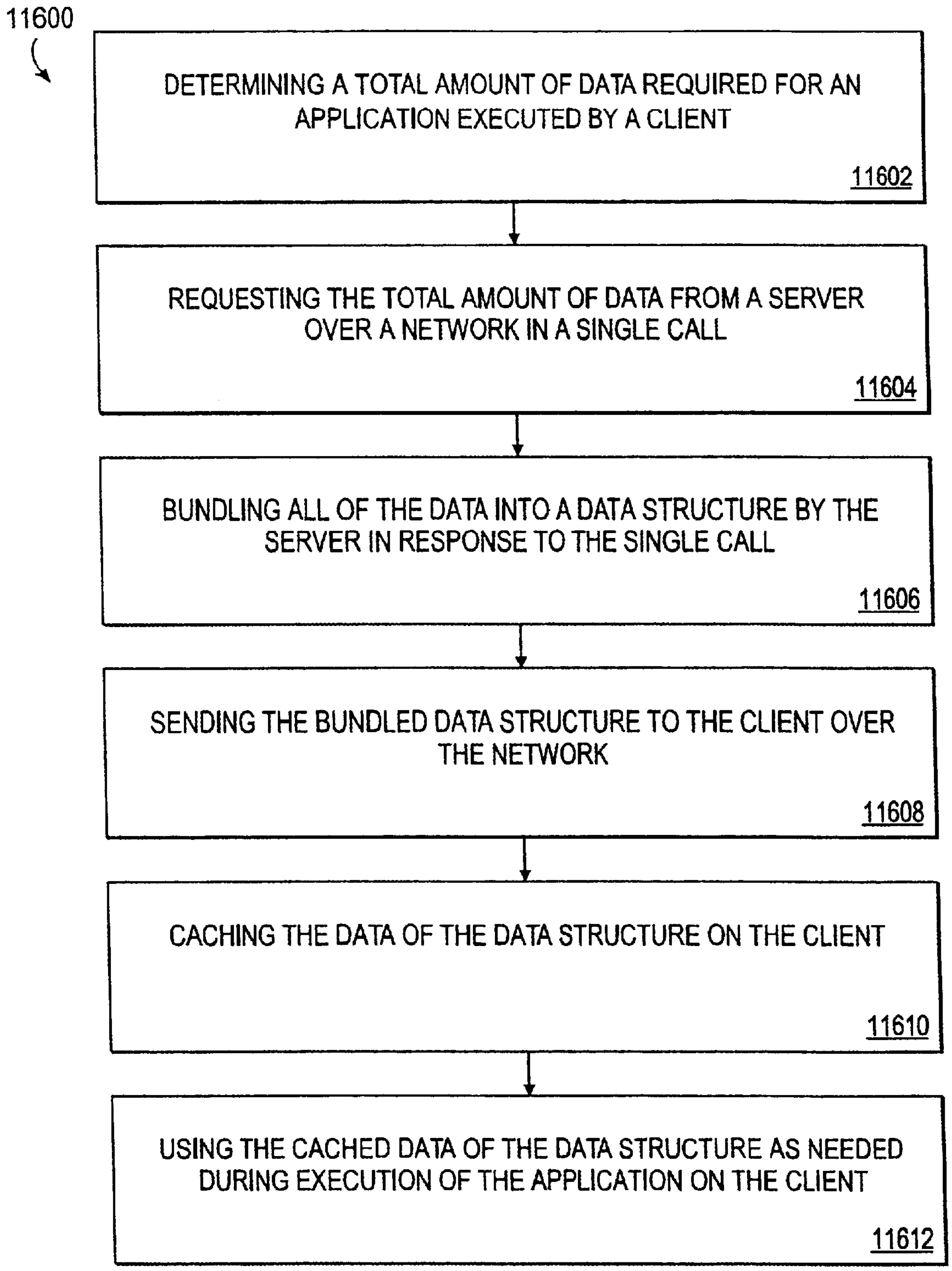
FIG. 116 illustrates a flowchart for a method for efficiently retrieving data in accordance with an embodiment of the present invention.

FIG. 116 illustrates a flowchart for a method 11600 for efficiently retrieving data. A total amount of data required for an application executed by a client is determined in operation 11602. In a single call, the total amount of data from a server is requested over a network in operation 11604. All of the data is bundled in operation 11606 into a data structure by the server in response to the single call. In operations 11608 and 11610, the bundled data structure is sent to the client over the network and the data of the data structure is cached on the client. The cached data of the data structure is used as needed during execution of the application on the client in operation 11612.

The data structure may be bundled on the server by a business object. In addition, the business object may be instantiated by an action of the client. Also, the network may be at least one of a local area network and a wide area network. As a further option, the request may be administered by a proxy component. Further, the data structure may contain no logic.

In a client server application, the client communicates with a server over a network. Depending upon the speed of the network and the number calls across the network, an application can experience performance problems. How can a client update a server while minimizing the network traffic and maintaining an acceptable level of system performance?

Acceptable system performance is an important attribute of every application. When creating a client-server application, the performance of the network must be considered during the design and development of an application. The speed at which data can be transmitted across the Local Area Network or Wide Area Network, can make or break a client-server application.

In a typical three-tiered client-server application, the business objects are maintained away from the users (Client) on separate Server machines. Whenever a user needs the expertise of a business object, the user must send a request across the network to the Server machine.

Figure 117:
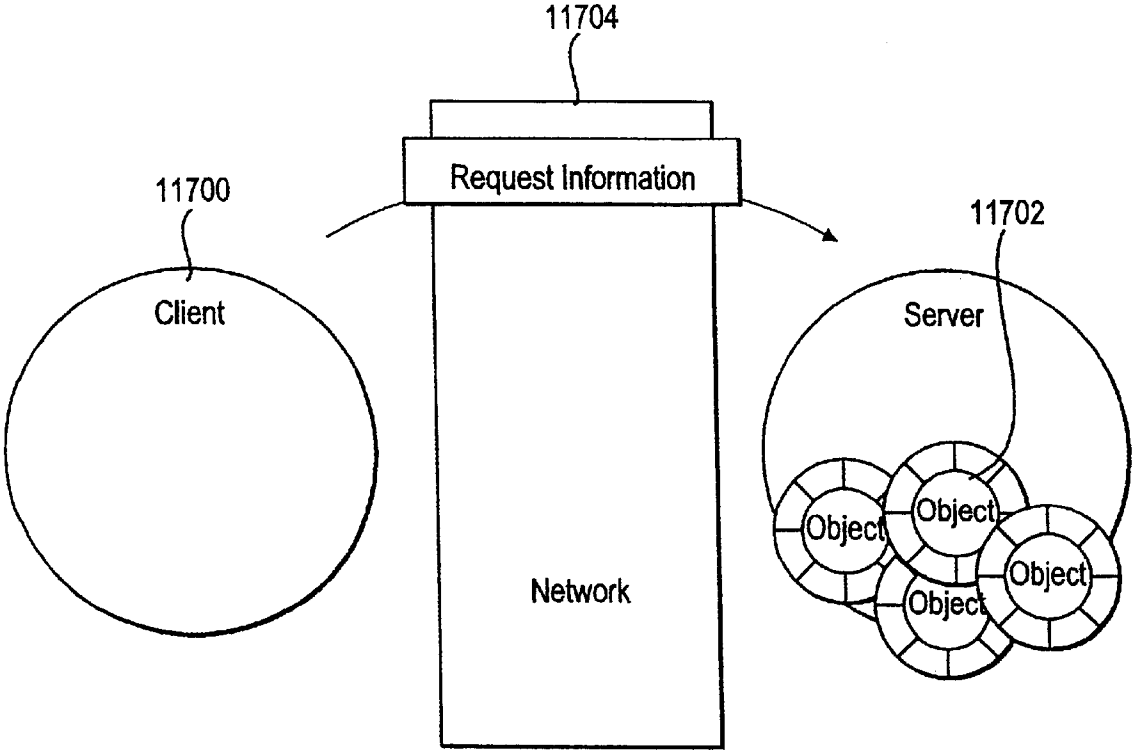
FIG. 117 illustrates the manner in which a client requests information from server objects via a network.

FIG. 117 illustrates the manner in which a client 11700 requests information from server objects 11702 via a network 11704.

Depending upon the size of the message and the speed of the network, this could take a long time. This is a reality of three-tiered client-server applications.

When a client-server application is introduced to the world of distributed objects, the network can become an even larger bottleneck. In a pure distributed object approach, the client is passed an object reference to a business object on a server machine. The client then accesses the specific business object over the network as if it resided on its local machine. Using this "pure" distributed object approach, the application's calling pattern begins to look like the schematic of FIG. 118.

Figure 118:
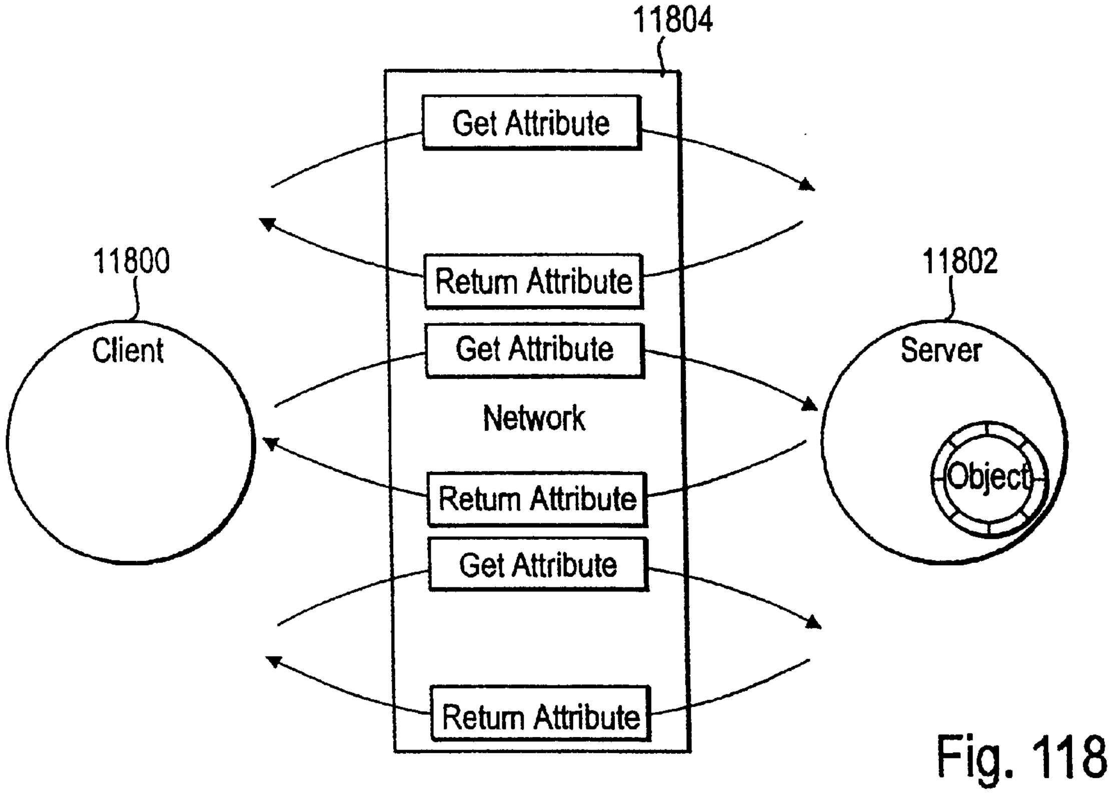
FIG. 118 illustrates the method of the present invention in which a client requests attributes from a server object via a network.

FIG. 118 illustrates the method of the present invention in which a client 11800 requests attributes from a server object 11802 via a network 11804.

This is an excellent programming model that frees the developer to access local and remote objects in the same fashion. Unfortunately, it makes it easier for the application developer to forget about the physical realities of the network. A network call is always slower than a call within a single machine. Ignoring this reality may result in an unacceptably slow application.

On a very fast LAN where the number of network calls is small, this calling pattern may be acceptable. On a slower LAN, any WAN or when the number of network calls is large, this pattern will yield unacceptable network performance. Something must be done to maintain an acceptable level of system response for the users.

Figure 119:
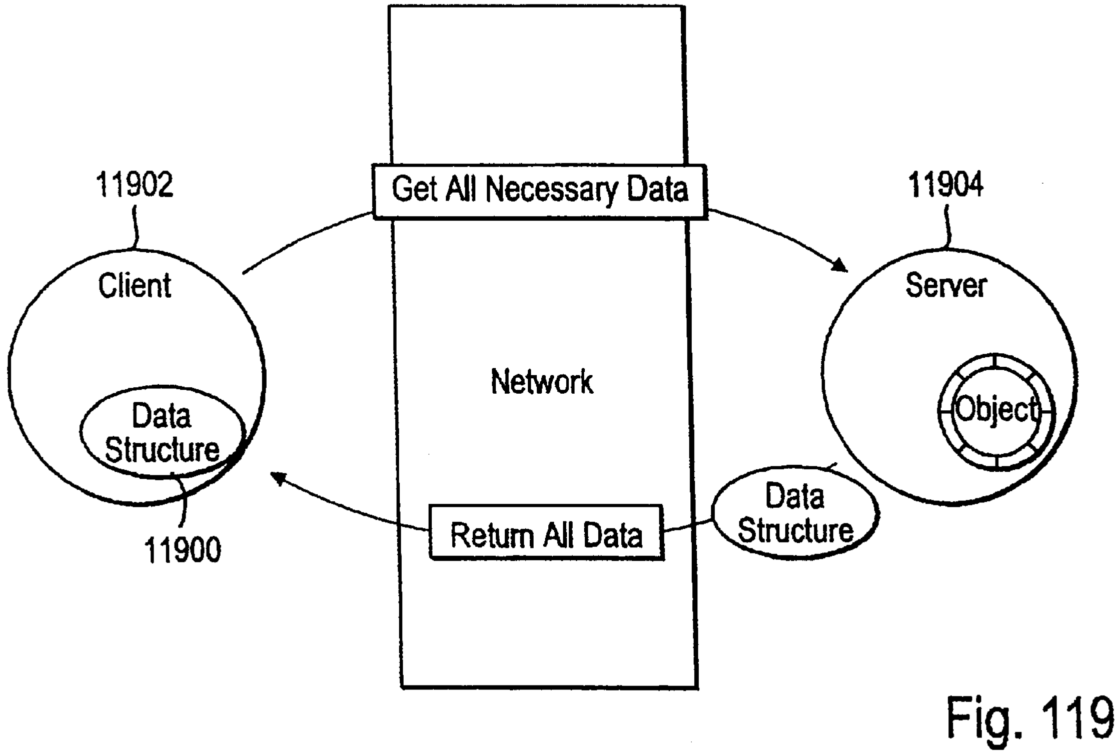

FIG. 119 illustrates the transmitting of all data in a Data Structure 11900 from a client 11902 to a server 11904 and visa-versa. As shown, to maximize the performance on the client, it is best to bundle all the necessary data into a single data structure that can be transmitted as a structure across the network.

The Client would first determine the sum total of everything it will need from the business object on the Server machine. The Client makes a request for all of this data from the business object. The business object bundles all the data into a data structure and returns it to the client. The Client will cache this data (using the Caching Proxy pattern) on its local client machine and use it as needed.

Benefits

Better System Performance—This pattern will improve the performance of an application by reducing the network traffic between the client and the server. The client makes one network request to retrieve all of the data from the server. Regardless of the number of displayable attributes the application will only make one network send.

Without this pattern, the client could make a network send for every attribute retrieval. If the user wants to retrieve a customer's name, address and phone number, that could result in three network requests (one for each attribute). Without this pattern, the network traffic can become prohibitive and the performance would suffer.

Structure Based Communication assumes a client needs information from an object that exists on a server. Thus, this pattern assumes the existence of an "interesting" object on the server machine.

Even though the "finding" and "instantiating" of a server object isn't part of this pattern, it does establish context and sets the stage for the pattern. As a result, a message trace diagram for finding and instantiating a particular object instance is shown below. This will set the stage for the implementation of the Structure Based Communication pattern.

Figure 120:
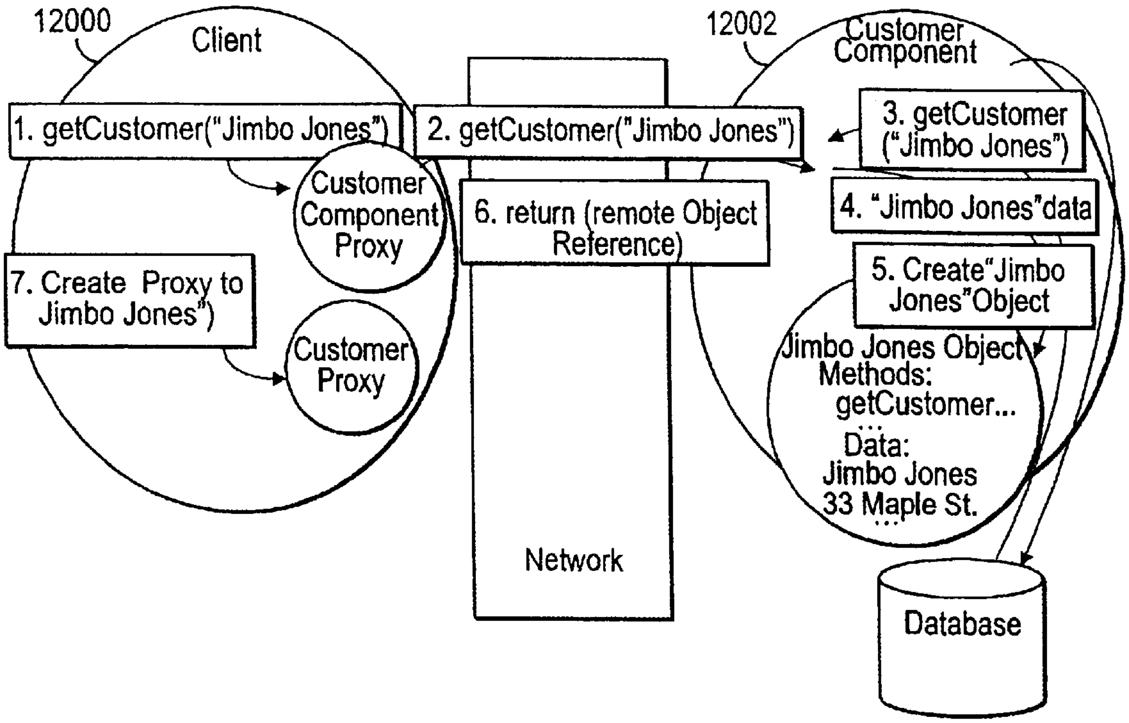

FIG. 120 illustrates the method in which a client 12000 finds and instantiates a Customer Object from a customer component 12002. The various steps shown in FIG. 120 will now be set forth.

Collaborations

1. The client instantiates a Proxy (Customer Component Proxy) to the Customer Component. The Client then asks the Proxy for Customer Jimbo Jones.
2. The Customer Component Proxy forwards the request across the network to the Customer Component.
3. The Customer Component requests the information for Jimbo Jones from the database.
4. The Database returns the data associated with customer Jimbo Jones.
5. The Customer Server Component instantiates a customer object using the Jimbo Jones data from the database.
6. The Customer Server Component returns a remote object reference to the "Jimbo Jones" object running on the Server.
7. The Client creates a proxy to the "Jimbo Jones" object using the remote object reference.

Now that a customer object (Jimbo Jones) exists on the server component, Structure Based Communication can be used to pass the needed data from the server to the client.

Figure 121:
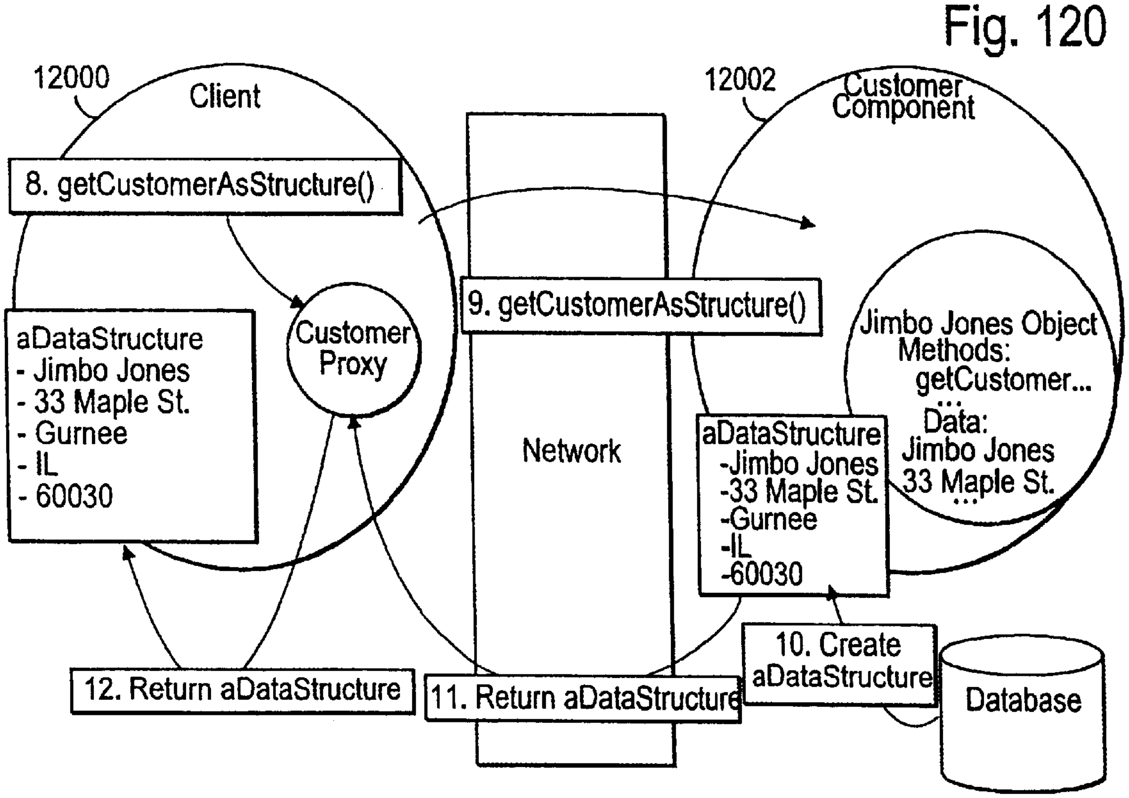

FIG. 121 illustrates a Structure Based Communication that builds upon the method of FIG. 120 and depicts the flow of control during Structure Based Communication. The various steps shown in FIG. 121 will now be set forth.

Collaborations

8. The Client asks the Customer Proxy for the data associated with the Jimbo Jones object.
9. The Customer Proxy forwards the request across the network to the Customer Component
10. The Jimbo Jones object creates a data structure and populates it with its data.
11. The Data Structure is passed across the network to the Customer Proxy on the Client.
12. The Customer Proxy forwards the data structure containing Jimbo Jones' data to the Client component.

Participants

Client—The "client" for the transaction. This could be a User Interface that displays customer data for viewing by a Customer Service Representative.

Network—A LAN or WAN network that connects the Client with the Customer Component.

Customer Component—A server component that encapsulates the data for all of the customers in a system.

Customer Component Proxy—A proxy to the Customer Component. Any request it receives, it forwards across the network to the Customer Component.

Customer Proxy—A proxy to the Jimbo Jones Customer Object Any request it receives, it forwards across the network to the Jimbo Jones Customer Object.

ACustomerStructure—A data structure. It contains the data (but no methods) from the Jimbo Jones object.

Database—Any relational database.

Jimbo Jones Object—An object that represents the Jimbo Jones customer. This object contains Jimbo Jones' data and methods associated customer methods.

Sample Java Code

The following java example accompanies the previous message trace diagrams. The java code follows the same scenario as the message trace diagrams, but it has been simplified in some areas.

The following snippet of code defines the data structure used to pass customer information.

```
public CustomerStructure(
    String  firstName,
    String  lastName,
    short   streetNumber,
    String street,
    String city,
    String state,
    String zipCode)
```

```
// Client side code here.
Main()
{
// Create a Proxy to the Customer Component.
CustomerComponentProxy aCustomerComponentProxy =
    new CustomerComponentProxy();
// Get a Proxy to the Jimbo Jones Customer
// object.
CustomerProxy aCustomerProxy =
    aCustomerComponentProxy.getCustomer("Jimbo Jones");
// Get Customer data from the Customer Server
// Component(Call across the network)
CustomerStructure aCustomerStructure =
    aCustomerProxy.getCustomerAsStructure();
// Use the Customer data received in the
// structure. For Example, display the data
// structure data (aCustomerStructure) in a UI.
        .
        .
        .
}
```

The following code is a sample Customer Server Component. The Customer Server Component is used to retrieve the data associated with customer Jimbo Jones from the database. It also instantiates a customer object using the data retrieved from the database.

```
// Customer Component Code here
public class CustomerComponent
```

-continued

```
{
    // Put the data associated with a Customer Object
    // into a data Structure. This data structure
    // will be sent across the network to a client.
    public Customer getCustomer(String aCustomerName)
    {
        // Find the Customer in the database
        .
        .
        .
        // Instantiate the Customer Object
        Customer aCustomer = new Customer(..
        .
        .
        // Return a "remote object reference" to the
        // Jimbo Jones Customer object.
        return (aCustomer);
    }
}
```

Finally, this is the code for the Jimbo Jones Customer object.

```
// Customer object code here
public class Customer
{
    // Put the data associated with a Customer Object
    // into a data Structure. This data structure
    // will be sent across the network to a client.
    public CustomerStructure getCustomerAsStructure()
    {
        CustomerStructure aCustomerStructure = new
    CustomerStructure();
        aCustomerStructure.firstName = this.getFirstName();
        aCustomerStructure.lastName = this.getLastName();
        aCustomerStructure.streetNumber = this.getStreetNumber();
        aCustomerStructure.street = this.getStreet();
        aCustomerStructure.city = this.getCity();
        aCustomerStructure.state = this.getState();
        aCustomerStructure.zipCode = this.getZipCode();
        return aCustomerStructure;
    }
    // Getters and Setters for all attributes
    // (code not shown here)
            .
            .
            .
}
```

Note: The "Main" code example above obtains a Proxy to customer "Jimbo Jones" and then a Structure of data through the proxy. The code was written for ease of understanding, but causes two calls across the network. In reality, it is preferred to perform both functions using one network call. Limiting the number of network calls will improve system performance. The recommended code might look something like this:

```
// Create a Proxy to the Customer Component
    // (same as above)
    CustomerComponentProxy aCustomerComponentProxy = new
    CustomerComponentProxy();
    // Get a Proxy to the Jimbo Jones Customer
    // object
    //          AND
    // customer data at the same time.
```

-continued

```
CustomerProxy aCustomerProxy;
CustomerStructure aCustomerStructure =
    aCustomerComponentProxy.getCustomerData("Jimbo Jones",
aCustomerProxy);
```

Collaborations

Proxy—This pattern is documented in the book "Design Patterns" by Gamma, Helm, Johnson and Vlissides. The proxy pattern is often used to communicate with server components in a distributed environment. The Proxy pattern is often used to retrieve data structures from a server component.

Cached Proxy—This pattern is documented in "The Proxy Design Pattern Revisited" section of the Pattern Languages of Programming Design 2 book. A Cached Proxy caches data locally on the client. Structure Based Communication uses and builds upon this pattern.

Globally Addressable Interface—This pattern often works in conjunction with Structure Based Communication. Oftentimes, a Globally Addressable Interface is used to obtain Structures of data for display on a Client.

Locally Addressable Interface—This pattern can also be used in conjunction with Structure Based Communication. After establishing a relationship with an LAI, a client may obtain data from the Server object using Structure Based Communication.

Alternatives

Distributed Objects—The "pure" distributed object approach is an alternative to Structure Based Communication. Using this pattern, individual objects are queried for each piece of information needed by a client.

Presentation Services (1000)

Presentation Services enable an application to manage the human-computer interface. This includes capturing user actions and generating resulting events, presenting data to the user, and assisting in the management of the dialog flow of processing. The Presentation Services forward on the user requests to business logic on some server. Typically, Presentation Services are only required by client workstations.

In addition to Presentation Services on the client, some business logic will usually reside on the client as well to aid the Presentation Services. Even on thin clients some sort of validation logic is usually included with the Presentation Services. A quick review of the Gartner Group's five styles of client/server computing help to illustrate this.

Figure 122:
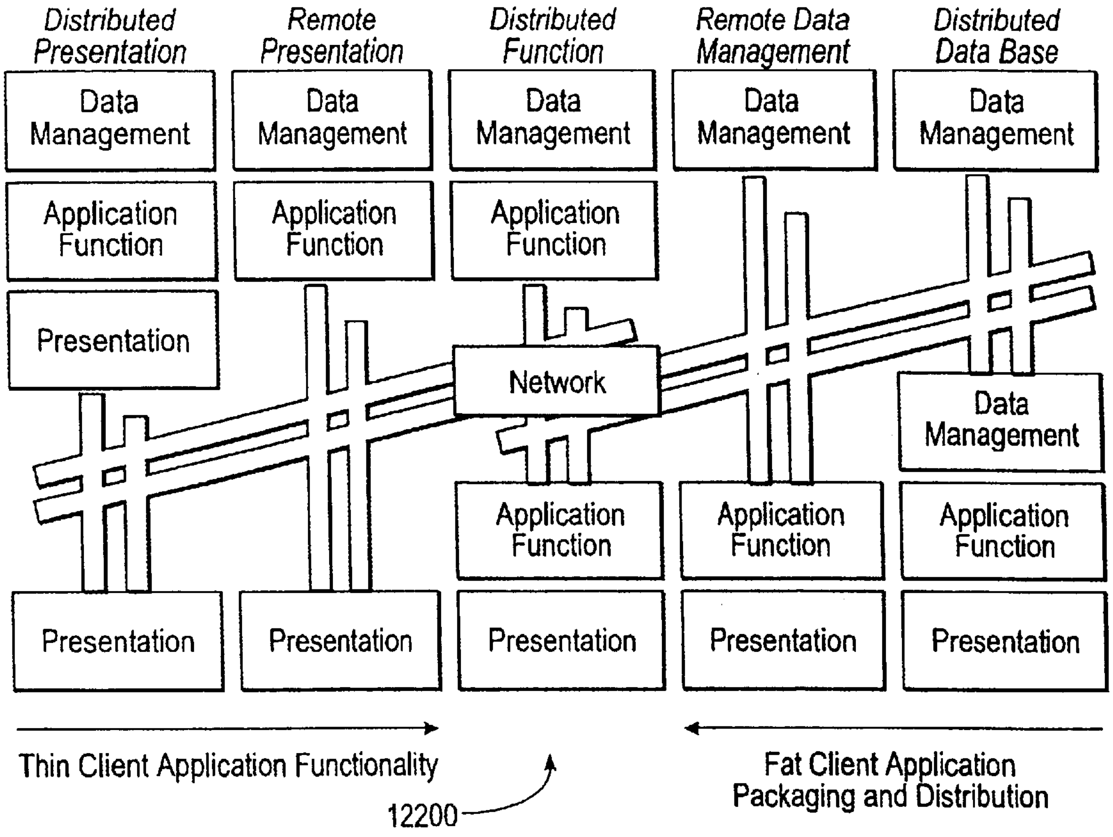

FIG. 122 shows the Gartner Group's Five Styles of Client/Server Computing 12200.

The way that Presentation Services interact with client-side business logic is very important to the overall scalability and maintainability of the application. An application's business logic is expected to be highly reusable, even on the client. If business logic is coupled with the Presentation Services too tightly, it will be very difficult to separate and reuse the business logic if the Presentation Services ever need to be altered (not an uncommon occurrence).

The patterns in this section help to guide application architects on strong, proven techniques to safely integrate client-side business logic with an application's Presentation Services. The Activity pattern lays the groundwork for separating the Presentation Services and business logic on the client by assigning non-presentation logic to a type of object called an Activity. The View Configurer pattern helps to assign new views with their appropriate Activity. Finally, the User Interface Validator pattern describes how to implement customizable, extendable validation logic on a user interface.

Activity

Figure 123:
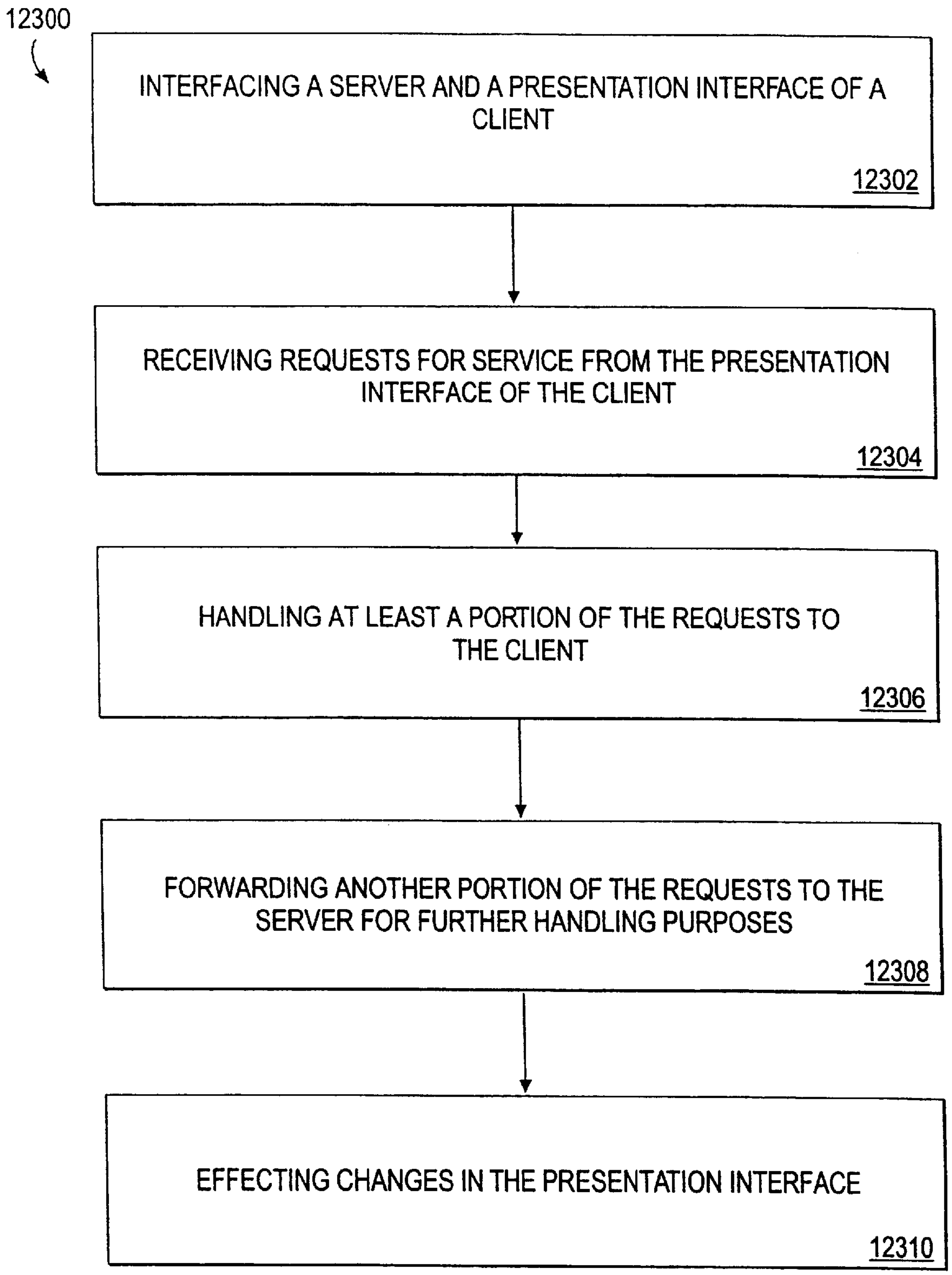

FIG. 123 illustrates a flowchart for a method 12300 for providing an activity module. A server and a presentation interface of a client are interfaced to permit the receipt of requests for service from the presentation interface of the client in operations 12302 and 12304. A portion of the requests are handled on the client in operation 12306. In operations 12308 and 12310, another portion of the requests are forwarded to the server for further handling purposes and changes are effected in the presentation interface.

A plurality of presentation interfaces may be interfaced. Optionally, a model may be interfaced for management purposes. With such an option, the model may further include a proxy. As another option, errors and exceptions may also be handled. As a third option, events intended to be received may be triggered by the presentation interface.

Many client/server applications maintain some amount of business logic on the client. How can an application represent and reuse "client-side" business logic across multiple, volatile user interfaces?

Imagine a typical client/server system design. In almost all cases, a typical system executes data access logic on the server and presentation logic on the client, business logic is split across both the client and server. The majority of this business logic is maintained on the server. This logic is-represented by various components and business objects that can communicate with each other to complete a variety of system use cases.

The client, on the other hand, is mostly responsible for supporting user interactions with the system. To be successful, the client must also execute some degree of business logic. While this can vary from implementation to implementation, some categories of logic are invariably located on the client. This includes simple data validations, representing data structures and relationships, error and exception handling, and communications with the server.

To complete a single use case, the client may need to interact with a number of server components. From the user's perspective, one unit of work is being performed but it may involve multiple, discrete interfaces and multiple server invocations. Some business logic is required to manage the complex flow to complete this unit of work. For example, suppose a use case for a network inventory management system is "Add Network Card". This may require the user to input information in three or four screens and client communication with more than one server component. Managing this flow is not the responsibility of the presentation logic but still needs to be executed on the client.

The system may also require a number of interfaces to complete the same use case. Depending on the user category executing the use case, the interface may be a PC, a handheld device, or a telephone. Even on the same type of device, the interface may differ depending on the user category. Some users may want to access the application via a standard Windows interface while others may want to access it via a "web-centric" interface (internet browser). In all of these cases, the unit of work to be completed by the user is not changed and should be reused.

Figure 124:
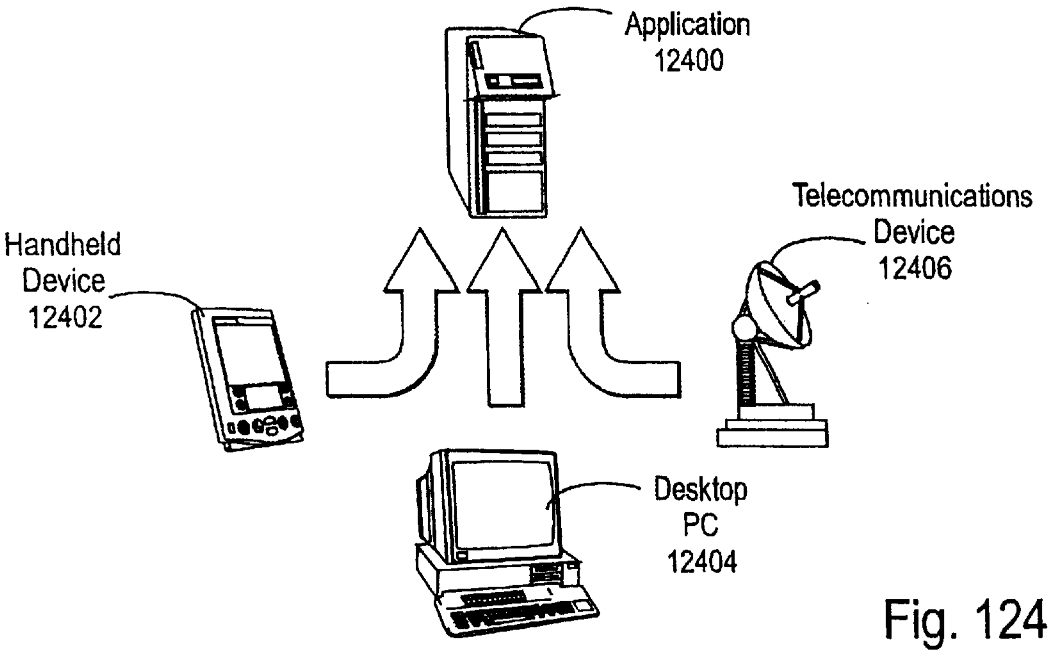

FIG. 124 illustrates multiple interfaces to an application 12400 including a handheld device 12402, a desktop PC 12404, and a telecommunications device 12406.

Often these user interfaces will be changed over time to fit user's changing needs. While the tasks completed by the user may not change, the interface to complete those tasks will need to. Windows users will want to move to the Web. Web users will want to move to handheld devices. The presentation code should be able to be changed without causing a rewrite of the business logic on the client.

Therefore, bundle business logic executed on the client separate from the presentation logic. This new type of class is an Activity.

Figure 125:
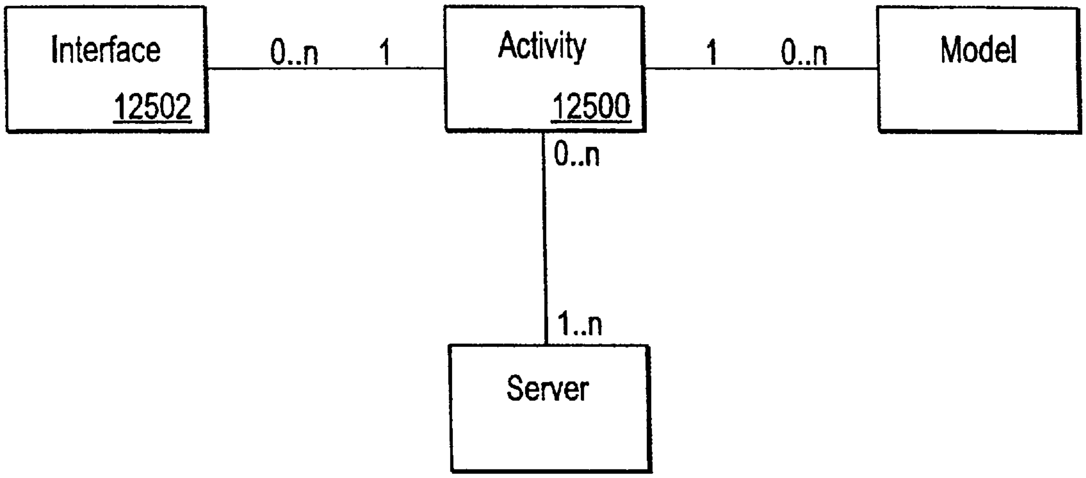

An Activity is responsible for:

- managing client logical units of work
- maintaining client representation of a business model
- validation across multiple interfaces (complex business logic)
- error and exception handling
- communication with server and other services
- creating other Activities
- triggering events intended to be "caught" and acted on by the presentation logic An Activity resides between the actual user interface and the business model and server components as shown in the Entity Relationship diagram below:

FIG. 125 illustrates an activity entity relationship diagram.

While any user interface maintains a reference to the Activity 12500 it provides an interface 12502 for, the Activity is unaware of what (if any) interfaces exist on it. This decoupling allows for a large amount of flexibility with the interfaces to an application. Multiple types of interfaces can exist on a single type of Activity. Code is reused and none is lost if presentation logic is replaced with something different.

While a user interface can communicate directly with its associated activity, an activity should never directly communicate with any of its interfaces. This would set up a dependent relationship that would reduce the flexibility of the activity.

Instead, an activity can communicate to its interfaces through an event mechanism. Interfaces are set up as dependents of the activity and the activity sends events to all of the interfaces on it. Each interface can decide how to handle the event.

Figure 126:
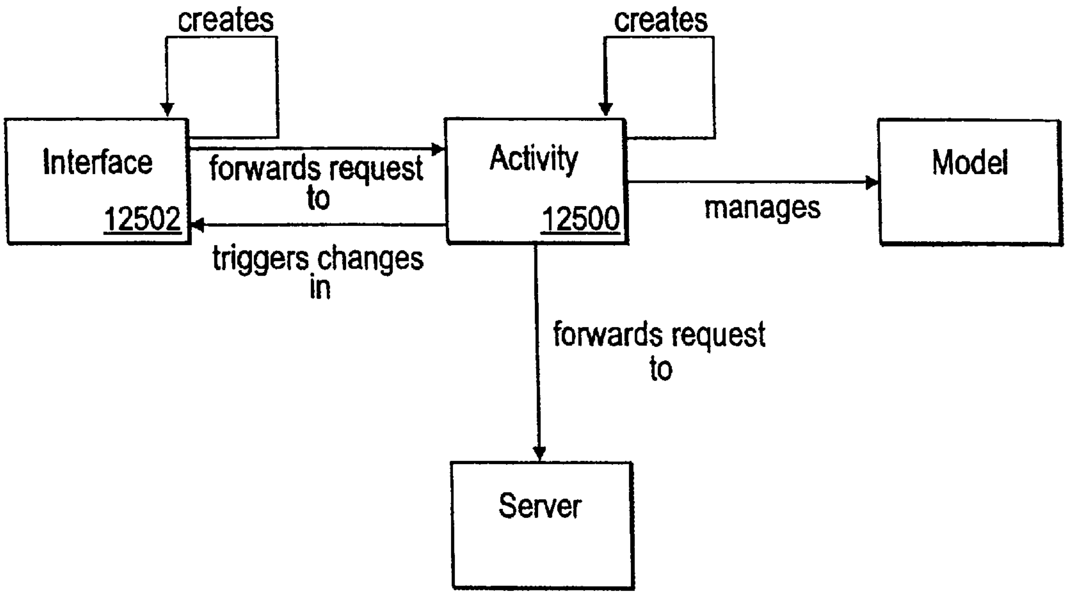

FIG. 126 illustrates a roles and responsibilities diagram.

Benefits

- Maintainability. By separating the presentation and non-presentation logic, the client is easier to understand and maintain.
- Reuse. The presentation layer may be replaced or reused without affecting the non-presentation logic.

Figure 127:
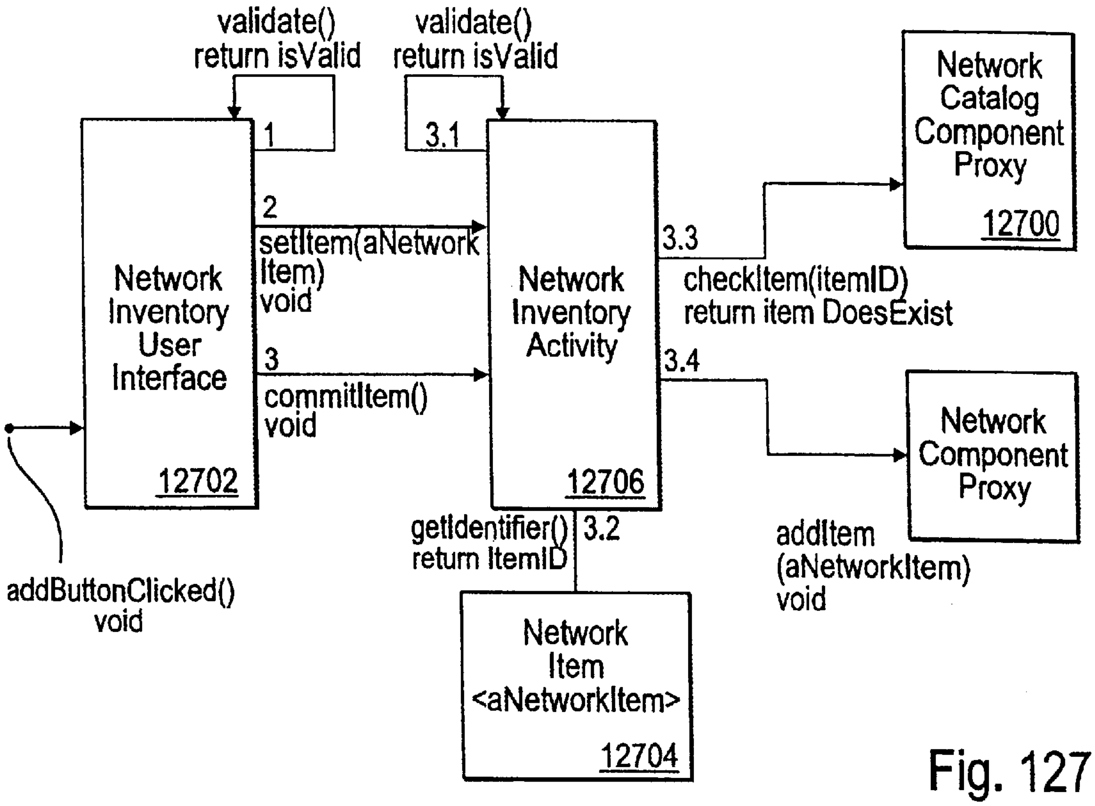

FIG. 127 illustrates a typical implementation between a user interface and its activity.

The diagram shows the various "layers" of interaction where the lightest shaded boxes are the presentation, the next darkest is the activity, and the darkest is the component (proxies 12700).

A user request is captured and processed by the presentation object (NetworkInventoryUserInterface 12702). In this case, the processing involves simple validation (format and "is null" checking).

The presentation object then copies its data into a structure representing some business entity (aNetworkItem 12704) and passes it to the activity 12706. The presentation object then triggers the activity to start its processing of the new network item.

The activity then performs possibly more complex validation and communicates with the server components to complete the use case.

Collaborations

Facade—The Activity acts as a Facade to all of the server components by coordinating a user interfaces interaction with them.

Separation of Concern—Dividing defined responsibilities into separate classes (presentation logic into UI classes and client-side business logic into activity classes).

Observer—An activity's interfaces are observers of that activity.

User Interface Validator

FIG. 128 illustrates a flowchart for a method 12800 for structuring validation rules to be applied to a user interface for maximum maintainability and extensibility. In operations 12802 and 12804, a plurality of user interface widgets are provided along with a plurality of validation rules which govern use of the user interface widgets. A user is allowed in operation 12806 to select the validation rules to associate with the user interface widgets of a first user interface. The validation rules of the user interface widgets of the first user interface are automatically associated across a plurality of separate different user interfaces in operation 12808.

The validation rules may be created at the time the first user interface is created. As another option, the validation rules may be implemented by a different class for each type of validation. As a further option, an indicator may be displayed upon one of the validation rules being violated. Additionally, each validation rule class may extend an abstract validation rule class that defines what types of widgets are supported. Also, a request for the validation rules may optionally be received from one of the user interfaces.

How can you structure validation rules to be applied to a user interface for maximum maintainability and extensibility.

Imagine a typical Windows or web-based client/server application. In most cases where a "windows" type of user interface is provided, an application supports some business rules by validating data entered by the user. A common example of this is checking the format of data in an entry field or ensuring that a required field is not left empty.

The business rules supported by user interface validation is usually somewhat limited. The scope of these rules is generally constrained to checking if a field is empty, checking the format of a field (date, time, numeric, currency, etc.), and checking if a field has alpha-characters, numeric-characters, or both. In addition, due to fact that many widgets provide constraints through their own form (list boxes, radio buttons), the types of widgets that require this type of validation checking is also somewhat limited (text fields, editable combo boxes, etc.).

Figure 129:
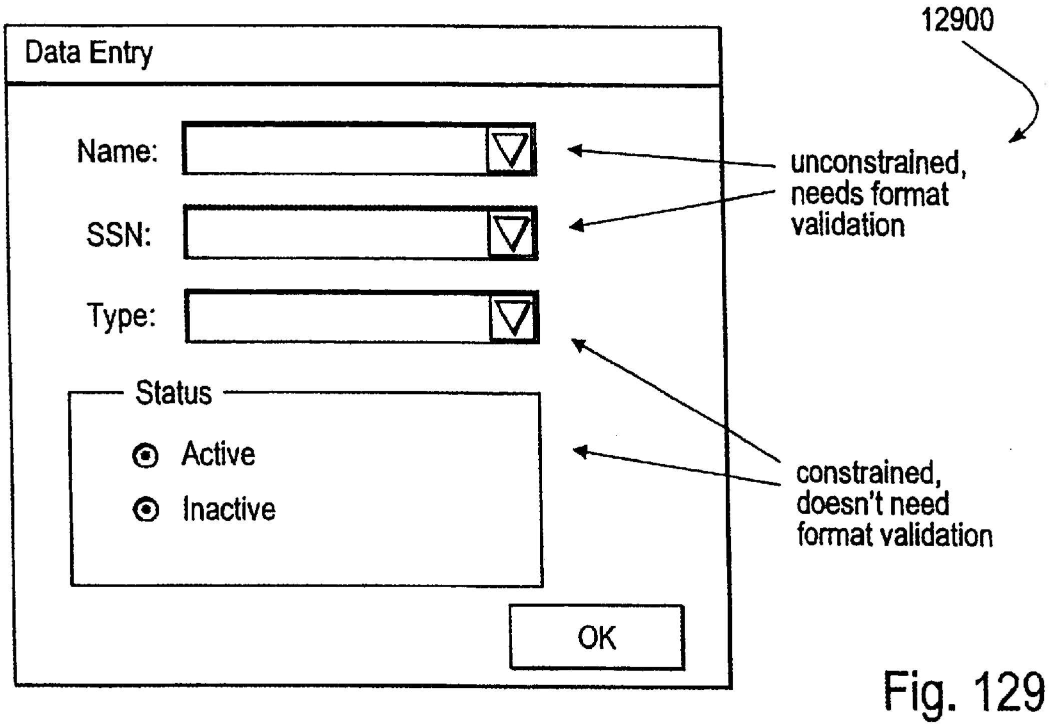

FIG. 129 illustrates widgets with their validation requirements 12900.

Because this type of validation will most likely be required across all of an application's user interfaces and the fact that the types of validation rules and widgets needed to validate are limited, this behavior is a strong candidate for a framework.

The framework would provide a common approach to validating user data across all of an application's user interfaces. Rules would be applied consistently throughout the application. While some common validation rules would be provided, the framework needs to allow their behavior to be modified (overridden) and make it easy for new rules to be added.

Finally, both immediate and batch validation should be provided by the framework.

Figure 130:
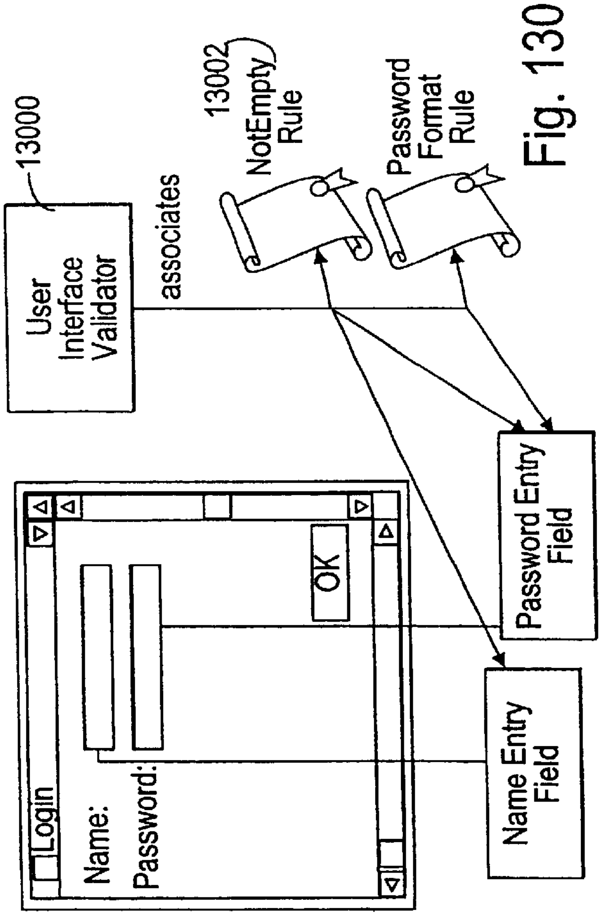

Therefore, for each user interface in an application, encapsulate their validation logic in a User Interface Validator. FIG. 130 illustrates a user interface validator association diagram. A User Interface Validator 13000 associates various validation rules with the user interface widget they are to be applied to.

The associations are created at the time the user interface is created. The validations are triggered when deemed necessary by the user interface. Any validations that fail are displayed to the user including the type of validation that failed and the widget that it failed on.

The rules are implemented by a different class for each type of validation. Each of these validation rule classes must know how to check its rule for every type of widget that can be checked. As mentioned in the Context section of this pattern, this will most likely be limited to text entry type widgets. In addition, each validation rule class extends an abstract validation rule class that defines what types of widgets are supported. This is an implementation of the Visitor pattern.

FIG. 131 illustrates a validation rule class diagram.

Note that the check operations accept a Validate 13200 type of class. Each widget that can be validated with this framework must implement a validateRule method. This simple method accepts some ValidationRule 13202 as a parameter and simply turns around and calls the check method on the rule passing itself in as a parameter. This interaction is shown in FIG. 132, which illustrates a rule validation interaction diagram.

The concrete implementation of the check method will be invoked. This method knows how to extract the data from the particular widget provided and verify the rule.

The User Interface Validator's job is to associate these rule instances with all of the widgets they pertain to. When the validate method is invoked on the Validator, all of the rules are sent to each of the appropriate widgets via the validateRule method.

New rules can be added by creating new classes that extend off of the abstract Validation Rule class. No changes need to be made to the widgets.

Benefits

Consistency. All user interface validation rule checking is done in the same way using the same rule logic.

Extensibility. New rules can be added without affecting any other part of the application.

Automation. Application of validation rules can be automated with a GUI based tool rather easily.

The associations between a widget and the rule to apply to it should be set up when the user interface is created. A user interface can implement a method that accepts a rule and widget and passes it on to the User Interface Validator as shown in the code example below:

```
ValidateTextField userNameField=new TextField("user name");
ValidateTextField passwordField=new TextField ("password");
ValidateTextArea commentsArea=new TextArea ("comments);
this.addValidation(userNameField, new NotEmptyValidationRule( ));
this.addValidation(passwordField, new NotEmptyValidationRule( ));
this.addValidation(passwordField, new NotNumericValidationRule( ));
this.addValidation(commentsArea, new MaxLengthValidationRule(255));
```

The add Validation method on the user interface is shown below.

```
public void addValidation(ValidateWidget aWidget, ValidationRule aRule)
{
    UIValidator myValidator = this.getValidator( );
    MyValidator.addAvlidation(aWidget, aRule);
}
```

The add Validation method on the User Interface Validator is shown below.

```
public void addValidation(ValidateWidget aWidget, ValidationRule aRule)
{
    Hashtable rulesAndWidgets = this.getRulesAndWidgets( );
    if (rulesAndWidgets.containsKey(aRule))
    {
        aRule = aRule.clone( );
    }
    rulesAndWidgets.put(aRule, aWidget);
}
```

In the above code, three widgets are created and then associated with various validation rules. The user name and password fields are required and cannot be left blank, the password may not contain any numbers, and the comments text area may not be longer than 255 characters.

Note that each of the widgets is created with a string that describes a name for the widget that the user would recognize. This name is used in the error list to help a user identify which widget failed validation.

At some appropriate time, the user interface sends the validate message to the User Interface Validator. This method steps through each of the rules provided to it when the user interface initialized and passes them to their associated widget by the validateRule method. The code is shown below:

```
public Vector validate( )
{
    Vector errors = new Vector( );
    Hashtable rulesAndWidgets = this.getRulesAndWidgets( );
    Enumeration rules = rulesAndWidgets.keys( );
    while (rules.hasMoreElements( ))
    {
        ValidationRule aRule = (ValidationRule)rules.nextElement( );
        ValidateWidget aWidget = (ValidateWidget)
            RulesAndWidgets.get(aRule);
        String anError = aWidget.validateRule(aRule);
        if (anError != null)
```

-continued

```
        {
            errors.addElement(anError);
        }
    }
    return errors;
}
```

Note that in the code example above, the validateRule message returns a String rather than a boolean. This string can be passed back to the user interface that invoked the validate and used to describe the errors that occurred to the user.

Collaborations

Visitor Each of the rules are implemented as a Visitor according to the GoF pattern of the same name.

View Configurer

FIG. 133 illustrates a flowchart for a method 13300 for assigning a view to an activity. Notification is received that a startup event of an activity has occurred in operation 13302. A reference to a first instance of an object created by the startup event of the activity is also received in operation 13304. In operation 13306, a view to launch is determined in response to the receipt of the notification and the reference. The view is based on predetermined criteria. The view is associated with the activity and displayed in operations 13308 and 13310.

The predetermined criteria may include user preferences, an experience level of a user, security profiles, and/or workflow settings. Also, the activity may be allowed to run without a corresponding view. The activity may also operate on a machine separate from a machine of an end user.

As an option, a request may be sent to be notified when a new instance of an object is created. As another option, a configuration file may be read for obtaining configuration information.

How do I associate a new view with the appropriate business activity underneath, in a configurable manner?

Consider a user interface that displays and collects data for an activity object underneath.

The ICM/MVC patterns provide for a layered architecture. Each layer talks to a layer below it, and no lower layer talks to an upper layer. For example, the view messages downward to the activity and the business objects, and the activity messages to the business objects. Layers talk down. No layer messages back upward.

Traditionally, activities launch their views directly. In the example illustrated below, the Search View tells the Search Activity to launch the Customer Maintenance Activity, which then opens up its own view. But this violates the ICM approach, because then the model is talking directly up to the view.

FIG. 134 illustrates a manner in which the maintain customer activity operation 13400 of the present invention launches its view 13402.

It might be more appropriate to let the view layer, rather than the activity layer, make decisions about launching other views. The view layer already knows about usability preferences, positioning on the screen, etc. However, one wants the activities to control conversational flow for preconditions, postconditions, workflow, and any other additional business logic.

A view should not be able to launch a new, separate activity, because that involves business logic. Instead, one wants activities to launch other activities. When the activity layer controls conversational flow, one needs a mechanism to launch views on top of these activities, without violating ICM.

Therefore, a View Configurer 13500 will be created to manage the relationship between activities 13502,13504 and views. This would likely be a singleton.

FIG. 135 illustrates the view configurer 13500 launching the maintain customer view operation.

The View Configurer is a generic mechanism which allows launching of different views, based on certain criteria. It uses an observable relationship with activity factories to solve this problem. With the View Configurer, developers do not hard code the particular policies for the selection of a view. Moreover, this mechanism allows activities to run without a corresponding view.

Communication from the activity to the View Configurer will be conducted through broadcasting (as described in the Observer pattern). In this manner, the activity doesn't know about the existence of the View Configurer, it listens to activity broadcasts such as when the controller starts up. This configurer can use the Observable Factory to get a handle to the activity instance.

There are four main steps involved with the View Configurer observer/observable interface:

Prior to the flow depicted above, the View Configurer has registered with the Activity Factory saying "Tell me when a new instance is created". This is an example of an "Observable Factory," which can be thought of as a Factory which implements the subject/observable role of the Observer pattern. The Factory needs to be a singleton, so the View Configurer has visibility to it.

The Search View tells the Search Activity to launch the Maintain Customer Activity.

The factory for the Maintain Customer Activity creates a new instance of the Maintain Customer Activity.

Because the View Configurer has pre-registered an interest in the startup of activities, it will receive a broadcast message. In this step, the View Configurer should receive a minimum of two parameters:

Notification of the startup event that has just occurred.

A reference to the new instance of the object that was just created.

The View Configurer then determines which view to launch. This can be based on a variety of criteria, such as user preferences, experience level, security profiles, or workflow settings. The configurer determines the correct view and attaches it to the activity underneath.

Benefits

Development. Depending on the distribution model in place, business processing can be executed and tested before the appropriate views have been implemented.

Automated testing. The View Configurer is particularly useful when you want to use scripts and avoid bringing up windows with automated testing. This is especially true for performance testing, where you might want to run 100 transactions, which might involve instantiating 100 instances of the same activity.

Running processes in batch mode. The View Configurer allows processes to run without a View, and makes it very simple to connect, disconnect, or reconnect related views.

Distribution Transparency. In a distributed environment, the process might live on a different machine from the end user's machine. In that case, it cannot launch the view directly, within its own executable. (Unless using a remote windowing system like X-windows, etc.) So the View Configurer allows application architects to transparently move process logic around, depending on the distribution model.

Collaborations

The Observer Pattern (Gang of Four Pattern) describes how to provide visibility to other entities via a one to many relationship. A singleton activity factory will create new activity instances, and broadcast the startup of the new activities to the View Configurer.

An interface for the creation of activities is used in conjunction with the Observer Pattern. In this way, the startup of new activity instances can be broadcast to the View Configurer. This is described in the Factory Pattern (Gang of Four Pattern).

Generally, there will only need to be one View Configurer per executable. The View Configurer would likely be a singleton, as described in the Singleton Pattern (Gang of Four Pattern).

Environment Services (1016)

Environment Services provide miscellaneous application and system level services that do not deal directly with managing the user-interface, communicating with other programs, or accessing data. These services are divided into:

Operating System Services

Runtime Services

Version Management

Licensing Services

Error Handling/Logging Services

Properties

Task and Memory Management

Security

"Miscellaneous services" should not be interpreted as "less important services." In fact, they are vitally important. Developers are more productive when they are not required to be concerned over logging and auditing, error handling and context issues. Obtaining the freedom to largely ignore these issues requires close attention to providing facilities which are well thought out and meld into the application structure.

Despite the pervasive demands of environmental considerations, many forms of documentation largely gloss over these issues. For example, many times when reading API documentation we find authors disclaim the fact that no error handling or "programming by contract" is shown within the code examples to improve readability. Yet, getting error handling right is key to stability in the execution environment. Programming by contract with the use of preconditions and post-conditions is perhaps the most aggressive style of programming known to date to assure correct programs. Assertion, Exception Hierarchies, Exception Response Table and Polymorphic Exception Handler tackle these problems vigorously by helping to define clearly how to solve some of these key kernel application architecture considerations. The Exception patterns provide a blueprint illustrating how architectural issues can be abstracted into a service level component so that the impact to the application code is minimal.

A demanding issue in distributed systems is gathering and using trusted information about the clients interacting with the systems. In earlier generations of systems the number of users was a fairly precise calculation—just count the number of workstations which could potentially connect to an application. Information about the users was also a fairly simple matter since they connected directly to the resources from which they were requesting services. Today, with clients offering web services within n-tiered architectures this is no longer easily predictable. In addition, requirements to support these less predictable numbers of users and to have a personal "one-to-one" relationship with them is key to many web strategies. The LoadBalancer and UserContext pattern offer some help in this area. The former addresses strategies for ensuring maximal leverage of the system resources and services and the latter helps in addressing the issue of maintaining state and context about the user. These facilities are mandatory when security, auditing and logging are considered essential properties of the environment.

Assertion

FIG. 136 illustrates a flowchart for a method 13600 for testing successfulness of an operation having pre-conditions and post-conditions that must be satisfied for the operation to be successful. A first assertion is raised in operation 13602 asserting a pre-condition that must evaluate to true if the operation is successful. The operation is then executed in operation 13604. A second assertion is raised in operation 13606 asserting a post-condition that must evaluate to true if the operation is successful. An error message is outputted upon failure of at least one of the assertions in operation 13608.

Optionally, an error handler may be provided for detecting a failure of the assertion of one of the conditions and shutting down a system running the operation upon the detection of the failure. As another option, an assertion may be raised at the beginning and end of every operation of a plurality of operations. Also, a check may be performed prior to raising the assertions for determining the propriety of raising the assertions.

Each assertion may be raised with descriptions for helping to identify where the assertion failed. Also, each assertion may be raised with parameters for helping to identify why the assertion failed. In one embodiment, two types of assertion classes may be provided. In such an embodiment, one of the assertion classes may implement assertion-checking logic and the other assertion class may implement only null operations, with one of the assertion classes being selected to be raised.

Every operation has a set of preconditions and postconditions that must be met for the operation to be considered successful. If these expectations are not met, the system state is in error. How can operations check for these errors so that the handling of these critical errors are consistent across the application?

Methods typically obtain and return a value, set an attribute based on a passed in parameter, or modify the state of the application based on some complex business rule or ruleset. While there is always some expected result of the invocation of an operation, there are also other, less expected possibilities. The provided parameters may not be within the expected range, thereby causing an error. A communications failure could cause the operation to fail to complete or, worse yet, return incorrect data or leave the system in an inconsistent state.

Any complete design determines that some formal specification is required to ensure operations complete correctly. This specification is most often in the form or pre- and post-conditions. These conditions define a set of logical expressions that must hold true for the operation to begin and end as expected. These conditions are usually defined during the Design Phase of development. An example is shown in the Operation Diagram below:

FIG. 137 illustrates an operation diagram depicting an example of pre-conditions 13700 and post-conditions 13702.

The conditions, in short, define the contract for the method. All of these pre-conditions must hold true before an operation's execution and all of the post-conditions must hold true after an operation's execution. Only then is the operation said to be successful. If any of these conditions fail, a critical error has occurred. The system must assume it is in an inconsistent state and cannot continue processing.

It is expected that the system programmers will check for pre- and post-conditions systematically in the operations they are coding. This seemingly simple requirement becomes non-trivial when some issues are considered:

How can multiple developers implement these checks in a consistent manner?

Some condition checks may be expensive to complete (database and remote component queries). How can these be turned on and off to meet performance expectations? Problem with deferred evaluation; see below.

How can the exceptions raised when a condition check fails be handled in a consistent manner throughout the system?

Therefore, a type of object should be developed to represent a check against an operation's conditions. This generic class of objects is known as an Assertion. Application developers should then raise Assertions throughout the system to check the correctness of the code and system state.

An Assertion accepts conditions that must always evaluate to true. If any of these conditions ever fail, a critical error has occurred and the system should shut down. Pre-conditions and post-conditions are good examples of the type of conditions that should be asserted during an operation's execution.

The Assertion class is passed a condition that, if evaluated to be false, raises the appropriate errors and shuts the system down. The purpose of this pattern is to formally recognize the pre- and post-conditions of a method in the actual code rather than through developer comments. By implementing an assert( ) method on a common superclass, the interaction with the Assertion class can be hidden from the functional developer. An example of the use of assertions is shown below:

```
public Customer creatCustomer(int newCustomerNumber)
{
    Customer newCustomer = null;        // declare the new customer
    this.assert(newIdentifier > 0);// pre-condition, a customer's
                                   // identifier must be greater than
                                   // zero
    // code to create the customer
    this.assert(newCustomer != null);       // post-condition, the customer
was
                                   // created
    return newCustomer;
}
```

Assertions can be raised with descriptions and parameters. A description can help to identify where the Assertion failed and a parameter list can help to identify why the Assertion failed.

Assertions should be raised at the beginning and end of every operation. Prior to raising the Assertion, a check should be made to see if it appropriate to raise one.(if assertions are enabled, if performance sensitive assertions are enabled). This can be accomplished by querying the Assertion class for its state before checking the assertion:

```
if (!Assertion.isPerformanceSensitive( ))
{
    // assert!
}
```

All operations will have both pre- and post-conditions. Even in cases where an operation defines an input parameter as something as broad as an integer, it is doubtful that all integers are acceptable to the operation. In this case, an Assertion should be raised to check if the parameter is in the appropriate range.

A "top-level" error handler should be defined to catch all AssertionExceptions and handle them in a clean and consistent manner. This should include reporting the assertion failure and shutting down the system following an orderly procedure.

It is important to note the difference between assertions and standard error-handling. Assertions are condition checks that can be turned on and off during runtime whereas standard error handling is always enabled. This is because assertions must always be true. The burden is on the testing process to catch all failed assertions. Thus, a failed assertion should simply never happen in deployed code. However, exceptions can happen, and therefore cannot simply be turned off.

Benefits

- Ease of Error Identification. Many error are caused by invoking an operation with improper data (parameters). By formalizing these conditions, it is very obvious is an error was caused by bad data or bad code.
- Correctness. Properly placed assertions assure that the system is in a correct state and responses can be trusted. Assertion checking complements, but does not replace, a comprehensive testing program. The responsibility remains with the designer to identify the correct conditions to assert.
- Consistency. All checks will be made and handled in a similar fashion.
- Control. The enabling and disabling features of the Assertion allows an operations controller to determine when and what checks should be made at runtime rather then development time.
- Flexibility. All handling and clean-up of incorrect assertions is located in one place making changes to this logic much easier to implement.
- Readability. Polices concerning how assertions are actually thrown and handled is not in the functional code.

Documentation. The code actually documents the design assumptions. This can also be used by documentation generators which read through the code.

The Assertion class can be defined as shown in the following specification:

Class Assertion void raise(boolean condition) throws AssertionException void raise(boolean condition, String description) throws AssertionException void raise(boolean condition, Vector parameters) throws AssertionException void raise(boolean condition, Vector parameters, String description) throws AssertionException boolean isEnabled( )

boolean isPerformanceSensitiveEnabled( )

Class AssertionException extends Exception

One possibility on how to handle the enabling and disabling of assertion checking would be to have two possible types of Assertion class. One which implements the actual assertion-checking logic and another which only implements no-ops. The Assertion instance is then obtains through an AssertionFactory which can be set as to which of the two types to distribute. These settings are determined at runtime.

It should also be noted that in Java, the exception that is thrown should be a generic run-time exception that doesn't need to be caught by the method or mentioned in the method's throw clause.

Collaborations

Factory

Distributed Garbage Collection

FIG. 138 illustrates a flowchart for a method 13800 for detecting an orphaned server context. A collection of outstanding server objects is maintained and a list of contexts is created for each of the outstanding server objects in operations 13802 and 13804. A compilation of clients who are interested in each of the outstanding server objects are added to the list in operation 13806. Recorded on the list in operation 13808 is a duration of time since the clients invoked a method accessing each of the contexts of the outstanding server objects. The list is examined at predetermined intervals for determining whether a predetermined amount of time has passed since each of the objects has been accessed in operation 13810. Contexts that have not been accessed in the predetermined amount of time are selected in operation 13812 and information is sent to the clients identifying the contexts that have not been accessed in the predetermined amount of time in operation 13814.

After waiting a preselected amount of time for receiving a response from one of the clients, the context may optionally be deleted if a response from one of the clients is not received within the predetermined amount of time. Also, a response may optionally be received from one of the clients requesting that one of the contexts be maintained. In such a situation, upon receipt of the response, a time the context was last updated may be updated to a current time.

As a further option, a queuing delay may be accommodated for a response from the clients. Also, each of the clients may maintain a collection of all objects the client is interested in. The clients then may send requests to keep alive any objects the clients are currently interested in.

A client requests a server process but due to abnormal circumstances fails to clean up. How is the orphaned process detected and removed?

In the design of a stateful server, the LUW Context pattern facilitates the server process constructing domain objects at the request of the clients and maintaining these objects within a given context. Domain objects are entered into a registry with their appropriate context which the server maintains and updates when a request is received to create or delete an object. Each time a context is accessed then a notification is broadcast to the registry, regardless of a state change. With a simple context management, each time a context is referenced by a client a reference counter is incremented and similarly decrements when the reference is destroyed. Once the reference count returns to 0 then the context can be removed from the registry.

If the context is not explicitly deleted by the client then it will remain in the registry as the server has no way of detecting that the context is orphaned.

Even if the client application is rigorously designed to ensure all redundant contexts are deleted, an abnormal client event may result in its termination leaving an orphaned server context.

FIG. 139 illustrates a Client 1 13900 that has instantiated A 13902 and C 13904, deletes C but fails to delete A.

The server still has a reference counter greater than 1 even though the client is no longer interested.

Therefore, Distributed Garbage Collection should be implemented to ensure that orphaned server contexts are deleted on the server. In the registry for the Garbage Collection the server maintains a collection of outstanding server objects and for each object a list of its contexts, the clients currently interested and the duration since a method was invoked upon a given context by a client. Periodically this list is examined to establish if any of the objects have not been accessed for some configurable time and are candidates for reaping. So, for example, a value of 5 minutes could serve as a default poll event or keep alive interval. If a candidate for a orphaned server process is identified then the clients are sent a message, requesting if they are still interested in the context. This might be performed by publishing an "is anyone interested" message to the registered clients to establish if anyone is. interested in the object in its assigned context or by asking the clients explicitly depending on the nature of the architecture.

The client side also maintains a collection of all of the objects that it is interested in. When it is queried, it instructs the server to keep alive any objects it has an interest in for which a query has been received.

FIG. 140 illustrates a GarbageCollector 14000 requesting for interest in context A 14002. No responses are received from any clients so the server assumes it is orphaned and deletes it.

If the period configured for a client to respond expires then the context is deleted. This accounts not only for an abnormal termination of the client but for failure of the client application to clean up. However, if a request is received from a client to maintain a context then the time the context was last accessed is updated to the current time and it remains in the Garbage Collection registry.

FIG. 141 illustrates a GarbageCollector 14100 requesting for interest in context B 14102. Client 2 registers interest so the reaper updates the access time stamp and maintains B.

Benefits

Cleanup on the Server. Reduces the amount of redundant resources on the server to a minimum. This is especially important if a stateful component is held in a transaction by a client and the architecture prevents additional clients from accessing it, e.g. with BEA's M3.

Performance. Ensures that only the required contexts are maintained on the server, minimizing the work that the server is required to do, especially during the cleanup process at the end of a LUW.

Centralization. The collector has a central view over all of the contexts that are currently accessed by all of the clients within a given context. This simplifies the persistence of a context at the end of processing.

In order to prevent potential race conditions the client must be given sufficient time to respond to the keep alive message from the server before the context is deleted. Typically the client has a separate listener for upward messages originating at the server, so queuing is not an issue at the client end. However, a server is more likely to queue on the receiving end, especially in a system with high message rates.

Unless there is a dedicated listener on the server it must be configured to accommodate for any queuing delay on receipt of the client response.

Collaborates With

Context Pattern Language describes the architecture that is required before the Distributed Garbage Collection is required.

Variation Of

Java Shared Namespaces with distributed garbage collection.

Objectstore PSE WeakArrays.

Exception Hierarchies

FIG. 142 illustrates a flowchart for a method 14200 for creating a common interface for exception handling. Naming conventions of exceptions are determined in operation 14202. A prefix and/or a suffix is added to each exception interface name in operation 14204 for indicating that the exception interface is an exception. In operations 14206 and 14208, where an exception error occurred is indicated and a determination is made as to what caused the exception error. Context is provided as to what was happening when the exception error occurred in operation 14210. Streaming of the exception is allowed to a common interface in operation 14212. An error message is outputted indicating that an exception error has occurred in operation 14214.

As an option, a layer and/or domain may be added from which each exception originates to each of the names of the exception interfaces. As another option, the exceptions may be partitioned into classes based on the way exceptions are handled, exceptions associated with different layers of a system, domains, and/or the source of the exceptions. As a further option, a class may be created which represents a source of the exception and holds an original copy of the exception for avoiding creation of duplicate exceptions. Also, arbitrary exceptions may each optionally support a clone method which creates a copy of the arbitrary exception.

Developing exception handling logic without classifying and organizing exceptions makes the handling logic cumbersome and fragile to change. How should exceptions be structured?

The traditional way of conveying errors is by passing error codes from callee to caller. This approach is adequate in some cases, but in general, it is less powerful and more error prone than an exception based approach. In the traditional approach, only minimal information can be passed, such as a failure to locate a configuration file (information on which file has to be provided by some other means). It is also very easy, and common, to ignore the return code. Projects which faithfully test every return code end up mixing a high percentage of error logic with the primary logic. This increases the complexity, and the development, review, and maintenance effort.

Some computer languages (Java, C++) support an error reporting mechanism based on exceptions. In these languages an exception can be a class type and hold arbitrary information, such as the name of the configuration file that was missing. Also, exceptions cannot be as easily ignored as return codes. If the callee raises an exception and the caller doesn't handle it, the caller's caller is checked to see if it handles the exception. This continues until the exception is handled or the program terminates. Designed properly, the error handling logic will be somewhat separated from the primary logic and will be less dense than the traditional approach.

The exception class designer is free to create any interface for the class, and each exception class can have its own unique interface. The exception handling logic 14300 will know which exception 14302 was raised (via runtime support) and can make use of the interface particular to the given exception. You can think of the exception handling logic being a set of "chunks" of logic where each chunk handles a specific type of exception. With this in mind, you can see how having many different exception types will cause the exception handling logic to grow. As a new exception type is added to the system, a new "chunk" might have to be added to the handling logic. This is not good. The code is not flexible to change and is in several places. Note FIG. 143.

Suppose you have all these chunks of handling logic and discover that the logic is pretty much the same. For example, assume your architecture is layered and you want to treat all exceptions from the persistence layer the same, such as logging the error and notifying the user. Also assume that the persistence layer can raise any one of fifty exceptions, and more are expected to be added in the future. This is fifty chunks of code that must be present in the exception handling logic, and again, this logic may be in several places. Wouldn't it be nice to write one chunk of handling logic and be done with it?

Let's take another scenario. Suppose you want to prevent any raised exception from bringing down your system, as least not without a fight. In some cases the error will be unrecoverable and there is not much you can do but release resources (locks, communication channels, . . . ) and terminate. What caused the problem is going to be on the tops of the minds of the production support people, and yours when you get their call (always in the middle of the night). You could write the exception handling logic chunks for each exception type—remembering that each exception has its own interface and will require separate logic to handle each interface—for each exception, but now you have to handle all the exceptions in the system. Wouldn't it be nice to write one chunk of handling logic and be done with it?

Therefore, to simplify the error handling logic and be able to treat groups of exceptions the same, a few techniques should be used to organize and define the exception interfaces.

The first step is to create an exception interface that all other interfaces will use or extend. It is not possible to provide one here as it greatly depends on the requirements at hand. But here are some guidelines:

Determine the exception naming conventions. Use either a prefix or suffix to indicate that the interface is an exception. Also consider naming exceptions with the layer or domain they originate from. For example you may have an exception, CaAddressExcp, which is owned by the Customer Acquisition domain.

Provide a means to determine where the error occurred (file, line, client or server, layer, . . . ) so that it can be investigated.

Provide a means to determine what happened (could not open file: XYZ).

- Provide context as to what was happening (Saving account information).
- Provide a way to stream the exception or stringify it.
- Consider separate production messages versus debug messages.
- Don't try to indicate severity. This is determined by the context of the caller, not the callee.

The intent is to be able to handle any arbitrary exception the same by having a common interface. Take time and get this right, to avoid updating several other exceptions later.

Now that this base exception interface is available, any handling logic can treat all exceptions alike; only one chunk of logic needs to be written. Specific exceptions can still be handled on a case by case basis as required. You can extend this concept to further partition the exceptions by creating a tree of exception types. By handling any exceptions at particular point in the tree, you effectively handle all exception types below that point. The trick is in creating a useful tree. Here are some guidelines:

Determine where handlers will be put and how they will respond to each exception. If you find that many are handled in the same way there may be a natural grouping that can be leveraged.

Consider the stability of your grouping. Is the group cohesive or is regrouping likely?

If parts of your system are layered, consider a branch that consolidates each layer. This enables a handler to deal with all exceptions emanating from a given layer.

- Consider grouping by domains (Legal, Finance).
- Consider grouping by subsystem
- Consider common problems such as parameter validation, pre- and post-conditions
- Consider the source (client or server).

FIG. 144 illustrates that groupings are not always exclusive. It is possible to group some exceptions 14400,14402, 14404 by layer and then domains within that layer.

Benefits

- Simplicity. Simplifies handling logic by being able to write a handler that deals with the base exception type.
- Consistency. Consistent approach to error handling.
- Maintainability. Minimizes coding changes by reducing the multiple number error handling chunks.
- Manageability. Provides Conceptual Framework The solution section covered many of the considerations in creating the exception tree so this section only provides some additional details to consider.

- Wrapping and delegation can be used to simplify in certain situations. Consider a distributed application and the need or desire to handle server and client exceptions differently, or to know the source of the error. One way to avoid creating duplicate exceptions (one per source) is to create a class which represents the source and holds the original exception. For example AaServerExcp can hold a pointer to the base class AaExcp. The handling logic can catch AaServerExcp exceptions and then access the held exception. An alternative is to put a code in the base class with indicates source but then all logic needs to know to set this value and all handling logic needs to test for it.
- To hold onto an arbitrary exception you need a way of creating a copy of it, but you may not know the actual type of the exception. In C++ the exception will be destroyed when you leave the handling logic, so you need the ability to create a copy to hold onto. A common technique is it have all exceptions support a "clone" method which creates a copy of themselves.
- Consider how to stream an exception so it can be sent from server to client.

Exception Response Table

FIG. 145 illustrates a flowchart for a method 14500 for recording exception handling requirements for maintaining a consistent error handling approach. An exception response table is provided in which an exception is recorded in operations 14502 and 14504. The context of the exception is entered in the exception response table in operation 14506 and a response for the exception is listed in the exception response table in operation 14508. The response is subsequently outputted upon the exception occurring in the context in operation 14510.

A typical response and a last resort response may be listed in the exception response table. The typical response may also be outputted upon the exception occurring in the context. The last resort response may be outputted upon the exception occurring out of the context. Additionally, abbreviations may be used to reduce an output size of the exception response table. Further, the exception response table may also include an exception category field for permitting organizing multiple exceptions by source. Optionally, an optimization may be determined that can be made based on similar entries in the exception response table. Further, the optimization made may also include classifying the exceptions for organizational purposes.

The response to an exception may vary per exception type and the context in which it is thrown, such as being thrown on the client or server, and the context in which it is handled. How do you record the exception handling requirements?

During exception handling design there are several aspects to capture to achieve a consistent approach:

- The set of exceptions to be handled
- The set of responses to these exceptions
- The context in which the exception is handled; e.g. client or server, batch or GUI The set of exceptions to handle and their organization structure varies by project. Typically exceptions are organized into hierarchies to facilitate handling. The response to an exception may vary by exception type, the context in which it was thrown, and the context in which is handled. Here are some examples of error handling decisions of a hypothetical project:

- "All exceptions thrown on the server, and not handled by the server logic, will be propagated to the client."
- "The current transaction is aborted if a server exception is not recoverable"
- "All Server exceptions derived from Excp will be logged if not handled by the server code. The last resort handler will ensure this."
- "GUI clients will display the error information in a splitter window"
- "Batch clients will send error information to Operations"

These few examples demonstrate how context (Batch, GUI, Client, Server, last resort) can affect the handling of exceptions, and that even in a given context, the exception type may play a role in the handling. In a real system there may be several other context and exception-type specific requirements.

There are two common exception handling contexts that should be present in most systems. One is referred to as the Typical Response and the other is referred to as the Last Resort Response. The Typical Response is the error handling code intentionally added to handle exceptions. For example, car.start( ) is likely to fail due to being out of gas. The Typical Response may be to fill the tank and retry. The Last Resort Response is what to do when an exception is not handled (the Typical Response could not handle the error, such as a hole in the gas tank). Last Resort Response is a way of capturing what should be done when application code fails to handle an error. Recovery is usually not possible at this point but the handler may be coded to log the error and notify Operations of the problem. Without this response, systems may crash unnecessarily, or without indicating what happened.

All these permutations of exception types, contexts, and responses need to be managed in order to maintain a consistent error handling approach.

Therefore, use an Exception Response Table to capture the exceptions in the system, and the appropriate responses by context. What is important to capture is the exception, context, response, information; documenting the error handling requirements.

The following table lists exceptions by category and type, with the typical and last resort response. Other contexts and responses are listed within these columns. The exception category field is optional but can help to organize exceptions by their source (application, architecture, . . . ) or hierarchy. This table can become quite packed with response information so a nomenclature may need to be developed to condense the information. The implementation section provides an example of this; Other ways of formatting this information are possible.

| Exception | Typical Response | Last Resort Response |
|---|---|---|
| Exception Category | | |
| Exception-Name<br>Description | | |
| . . . | | |
| Exception Category | | |
| Exception-Name<br>Description | | |

Benefits

- Requirements Traceability. Exceptions requirements are captured and managed through implementation.
- Hierarchy Design. Analysis may show optimizations that can be made such as handling a subtree of exceptions with the same code, as the response is the same to any exception in the subtree.
- Interface Design. Discovery of interface requirements on the exception classes to support a particular response is another benefit.
- Handler design. Assists in exception handling design by identifying common responses that can be leveraged by the handlers.

The table below shows an example of an Exception Response Table for a fictitious client/server system. This is followed by the nomenclature section which is customized per project.

| Name | Typical Response | Last Resort Response |
|---|---|---|
| Architecture Framework Exceptions | | |
| AaAssertionExcp<br>Assertion failure | C: N/A<br>S: N/A | C: L, Popup(severe), Shutdown<br>S: L, N, P(AaServerAaExcp), Shutdown |
| AaExcp<br>Base class for exceptions | C: N/A<br>S: N/A | C: N/A<br>S: N/A |
| Application Exceptions | | |
| CaBalanceExcp<br>Account out of balance | C: Popup(warn)<br>S: P(AaServerAaExcp) | C: L, Popup(warn)<br>S: L, N, P(AaServerAaExcp) |

Nomenclature

Note: Abbreviations were used so that the table could be printed. The nomenclature section is only meant to serve as an example.

Context

C=Client

S=Server

Response

N/A=not applicable; don't handle

L=log error

L(diagnostic)=log errors for diagnostic purposes only

N=notify operations

Optional=application, context dependent. Not required to be caught

P=pass exception to client

P(<exception>)=pass given exception type to client, will be different from type caught Popup(warn)=display warning message Popup(severe)=display severe warning message Popup(retry)=display retry message Shutdown=release resources and shutdown gracefully.

Exception Hierarchy discusses how to organize exceptions.

Last Resort Exception Handling describes where handlers should be placed to prevent a program from terminating without warning.

Polymorphic Exception Handler describes how to design and code exception handlers that reduce the impact of changes and the overall size of the error handling logic.

Polymorphic Exception Handler

FIG. 146 illustrates a flowchart for a method 14600 for minimizing the amount of changes that need to be made to exception handling logic when new exceptions are added. Exceptions are organized into hierarchies in a polymorphic exception handler in operation 14602. A root of one of the hierarchies in which an exception occurs is caught in operation 14604. The exception is instructed to rethrow itself in operation 14606. The rethrown exception is caught and identified in operations 14608 and 14610. A type of the rethrown exception is determined in operation 14612 and a message is outputted indicating the type of the rethrown exception in operation 14614.

Single exception interfaces may be used as the roots of the hierarchies. Also, the polymorphic exception handler may handle each unique root. Further, an added exception may be organized into a hierarchy and handled by the polymorphic exception handler. As an option, handling behavior may be encapsulated in the polymorphic exception handler. As additional option, catch blocks may also be created to catch the rethrown exception.

Large systems can be quite complex and require error management integrating disparate components and/or libraries (i.e. DBMS APIs, data structures library, middleware, etc) How can exception handling logic be written so that little or no changes are required when new exceptions are added to the system?

A software system using exceptions as the error handling approach may have to respond to a variety of exceptions. Handling each exception type on a case by case basis is cumbersome and expensive, both in terms of initial development and subsequent maintenance. In languages such as Java and C++, the mechanism to handle exceptions is to use try-catch blocks which look like this:

```
try
{
    // perform some work here
}
catch (ExceptionTypeA& excp)
{
    // Exception A thrown. Handling logic here
}
catch (ExceptionTypeB& excp)
{
    // Exception B thrown. Handling logic here
}
catch ( . . . )
{
    // Don't know what was thrown, but still need to handle it.
}
```

This example shows only two explicit exception types being handled but a system typically has several potential exceptions. If the development of the exception types is poorly designed the try-catch blocks can become quite large as they attempt to handle each exception. Imagine trying to handle, say, fifty more exception types, in several places, in the code. The error handling code expansion is exponential! FIG. 147 depicts a program 14700 (i.e., the exception handler of the present invention) with a few try-catch blocks 14702. As more exceptions are added these blocks expand to handle each new exception.

Another problem with exception handling logic is that it can be quite involved, such as logging the information to a persistent store, notifying Operations support, rolling back a transaction, etc. the example only showed one commented line to represent the code. Again, imagine each catch block requiring several lines of code. This logic may be repeated in each catch block.

Taken together, varying exception types and potentially repeating and complex logic in the catch blocks, the development and maintenance efforts regarding error handling are going to be much more expensive than they need to be.

Therefore, structure the exceptions into hierarchies, create an exception handler object that performs the catch block logic, and minimize the number of catch blocks required to support a given try-block.

Exception Hierarchies organizes exceptions into hierarchies and facilitates the design of exception handlers. Handlers can then be designed to handle the roots of hierarchies. This is much simpler than handling each exception type on a case by case basis. In custom development where the project has control of all code, a single exception interface can be used as the root. The more likely situation is some custom development and using third party libraries which may also use exceptions. In these cases, the exception handler will handle each unique root.

Using an exception handler, versus custom logic per catch block, reduces the maintenance and development effort as the code is easier to read, there is less of it, and any changes that need to be made can be made in one place.

The following code snippet shows the form of the try-catch blocks using the polymorphic exception handler. It may seem equivalent to the prior catch-block example but it is not. The first distinction is the type of exceptions handled. In this case, the roots of the exception hierarchies are caught, not the individual exception types. For this example there are only two exception hierarchies in the system, so only these roots are handled. What this means is that as new exceptions are added to the hierarchies, this code does not change, and remember, this code is in several places in the system.

The second difference with this code is the encapsulation of the handling behavior in the exception handler. The handle method can perform arbitrarily complex logic behind the scenes, and if this needs to change, is changed in one place. For example, if the current handling logic logs a message to disk and now needs to be extended to notify Operations personnel, this can be centralized in on place. The code as written does not need to change.

```
try
{
    // perform some work here
}
catch (ExceptionRoot& excp)
{
    ExcpHdlr hdlr;
        hdlr.handle(excp);
}
catch (ThirdPartyRoot& excp)
{
    ExcpHdlr hdlr;
        hdlr.handle(excp);
}
catch ( . . . )
{
    ExcpHdlr hdlr;
        hdlr.handle( );
}
```

FIG. 148 depicts the same program 14800 (the polymorphic exception handler) with smaller catch blocks 14802. A handler 14802 has been added which consolidates the common code and the number of catch blocks has been reduced overall by making the handler responsible for handling each exception. The downside is that now the handler is subject to frequent change as exceptions are added to the system. The maintenance effort outweighs this disadvantage.

The examples have shown a single exception handler being used. In practice it is more likely that multiple will be used. For example, the exception handler on a server may have different requirements or constraints than a client, or one client may be GUI based and display pop-up error messages, where another client is a batch program that needs to send notification messages to Operations. This can be handled by creating multiple handlers or using the Strategy pattern to customize the behavior.

Benefits

Simplicity. Reduces development and maintenance effort required for exception handling Maintainability. Reduces impact of changes Robustness. Centralizes/Encapsulates handling logic Flexibility. Multiple handlers can be used The exception base class declares a method, rethrow, which is used by the handler to determine the real type of the exception. Another approach is to use double dispatch which may be show in a future version. Below is an example of this interface only showing the essential detail.

```
//---------------------------
//-Base Class of Exceptions
//----------------------------
class Excp
{
public:
    //-Rethrow the exception. Throw *this;
    virtual void rethrow( ) const = 0;
};
//-----------------------------
//-Example Derived Class of Exceptions
//------------------------------
class Derived : public Excp
{
public:
    virtual void rethrow( ) const { throw *this; }
};
//-----------------------------
//-Example Derived Class of Exceptions
//-----------------------------
class SubDerived : public Derived
{
public:
    virtual void rethrow( ) const { throw *this; }
};
```

When the exception handler is passed the exception from the catch-block all it knows it that it has a root exception type. For some projects this may be sufficient if the exception interface is rich enough and all exceptions are treated the same. In other cases, exceptions may require specialized treatment. With the rethrow mechanism in place, the handler can create a try-catch block and have the exception rethrow itself. The catch blocks are then used to catch the specific exception type.

```
//---------------------------------
//-Exception
Handler
//---------------------------------
class ExceptionHandler
{
public:
    Exception Handler( );
    //-Handle the root exception
    void handle(const Excp& );
    //-Handle a third party root
    void handle(const ThirdPartyExcp& );
};
//---------------------------------
//-Handle the exception
//---------------------------------
void ExceptionHandler::handle(const Excp& e)
{
    //-Rethrow the exception to get the specific type
    //-Note that catches are in the order of most specific to
    //-most general.
try
{
    e.rethrow( );
}
catch(SubDerived& excp)
```

-continued

```
{
    // Handle SubDerived
}
catch(Derived& excp)
{
    // Handle Derived
}
catch( . . . )
{
    // Handle e parameter here since nothing matched it.
    }
}
ExceptionHandler::handle(const ThirdPartyExcp& e)
{
    // Handle based on ThirdPartyExcp interface
    // Can't rethrow because ThirdPartyExcp doesn't support this.
    // Could use RTTI if needed.
}
```

Load Balancer

FIG. 149 illustrates a flowchart for a method 14900 for distributing incoming requests amongst server components for optimizing usage of resources. Incoming requests are received and stored in operations 14902 and 14904. An availability of server components is determined and a listing of available server components is compiled in operations 14906 and 14908. A determination is made as to which server component on the listing of available server components is most appropriate to receive a particular request in operation 14910. Each particular request is sent to the selected server component determined to be most appropriate to receive the particular request in operation 14912.

Optionally, the determination of which server component is the most appropriate may be performed by allocating the requests on a round-robin basis whereby requests are assigned to consecutive server components by traversing along the listing of available server components. As another option, the determination of which server component is the most appropriate may also include calculating an amount of utilization that each available server component is currently experiencing.

The amount of utilization of each available server components may be calculated based on current CPU utilization, kernel scheduling run-queue length, current network traffic at a node to the server component, and/or a number of requests currently being serviced. Also, a request may be rerouted to a different available server component upon a crash of the selected server component. Additionally, the server components may be saved in a persistent store, wherein a check is made to determine whether a connection to a server component needs to be reestablished.

In order to support scalability in a high volume distributed component environment, resources tend to be replicated. How can incoming requests be distributed amongst the available server components in order to optimize the usage of system resources?

In a distributed system, server components provide functions and data that can be accessed by client components. Many identical copies of a server component can be running on different platforms in the system in order to support large volumes of client requests.

In order to make use of the system's scarce resources, some way of routing an incoming request to the best server component available is required. In general, all requests take a similar length of time to service.

FIG. 150 illustrates server components 15000 receiving service requests 15002.

Therefore, use Load Balancer to select the best server component out of an available pool for the client to use.

FIG. 151 illustrates a load balancer 15100 mediating the requests of FIG. 150.

Incoming client requests are routed by the Load Balancer to the best available server component.

A number of possible strategies exist for deciding which server component is the most appropriate at a given point in time.

Round Robin—Allocate the received requests on a round-robin basis, whereby a list of the available server components is created and, as requests are received, they are allocated by traversing down the list. When the end of the list is reached, the next request is allocated to the server component at the beginning of the list.

Utilization Based—Allocate the received requests based on the utilization that each server component is currently experiencing. The definition of utilization can be tailored to meet specific requirements or deployment strategies. It may be based on a combination of current CPU utilization, kernel scheduling run-queue length, current network traffic at that node, number of requests currently being serviced, or any other factors particular to the environment.

Benefits

Performance. Based on the selection strategy employed, the client is connected to the server component that is best able to serve it.

Scalability. As the number of users and requests increase, processing can be distributed across the available resources.

Robustness. In the event of the server crashing, the client can then ask the Load Balancer to provide another server component for it to use. This can be extended still further by federating Load Balancers and their associated server component pools.

The following is the IDL that was used to define the Load Balancer:

```
interface LoadBalancer
{
    Object getService ( )
        raises ( ArchitectureException );
    void register ( in Object aServerComponent )
        raises ( ArchitectureException );
};
```

Collaborations

Round Robin Load Balancing

Utilization Based Load Balancing

User Context

FIG. 152 illustrates a flowchart for a method 15200 for maintaining a security profile throughout nested service invocations on distributed components. In operation 15202, interconnections are provided between distributed components each having nested service invocations. A user is identified in operation 15204. The user is associated with roles in operation 15206. In operation 15208, a user context instance is created upon successful identification of the user. The user context instance also includes information about the user including the roles. A request is received from the user to invoke a service on a component in operation 15210. The component invokes an additional service of another component. The user context is queried for the information about the user in operation 15212. The user information is compared with an access control list for verifying that the user has access to the component in operation 15214. The user information is also compared with an access control list for verifying that the user has access to the additional service of the other component in operation 15216.

Optionally, all user interactions may be logged as well. As another option, a user interface may be modified to provide access to actions that can be performed by the user based on an identity of the user and the roles associated with the user. The user context instance may also be passed along as a parameter of service invocations. Additionally, the service invoked may associate any objects created, updated, or deleted with the user context instance. As a further option, the user context instance may also encapsulate security certificates of the user.

For security and auditing purposes, user information must be maintained throughout a service's implementation across multiple, distributed platforms. How can this original security profile be maintained throughout nested service invocations on distributed components?

All mission-critical systems require some form of security and auditing capabilities. These capabilities restrict who can use the system and what they can and cannot do and, in the case of a security breach or dispute, resolve who did what and when.

To meet these capabilities, users must be identified, associated with roles and granted authorization before any operation proceeds. In addition, all user interactions and results of those interactions may be logged. On a user interface, access to certain panels and controls are granted according to a user's role.

In a distributed, component-based system, these complex requirements become even more difficult to implement. Typically, a client (or user) invokes some service on a component. That component may invoke any number of additional services on any number of additional components to complete its designated task. These successive service invocations are a result of the initial client request so the security profile that allowed the initial request must also allow all successive requests.

FIG. 153 illustrates a component interaction diagram showing an interaction between a number of components in a financial system. A user initiates an addStock( ) service on the Portfolio component 15300. To perform the addStock( ) service, the Portfolio must use the getStockPrice( ) and the deductFromAccount( ) services on the Market and Finance components 15302,15304, respectively. This implies that a user who can access the addStock( ) service must also have permissions to access the getStockPrice( ) and the deductFromAccount( ) services. This may need to be checked by each of the distributed components within the context of one logical service. In addition, auditing what has been done, or perhaps requested to be done, adds another common requirement that must be accounted for. A component servicing multiple clients must associate client requests with corresponding services invoked on business objects. This information must be persisted as each change is committed.

Therefore, represent information about a user in a shared User Context object. This object maintains a user's unique identification that can be subsequently checked against a resource's access control list (ACL). A User Context instance is created upon a user's successful, validated identification to the system (usually through some "login" mechanism). After that, the system user interface can modify itself to provide only the actions that can be performed by that particular user acting in a particular role. Controls may query the User Context and modify their own visual state as needed (enable/disable, hide/show).

The User Context can also be passed along as a parameter of service invocations. All public, stateless services on a component should provide for a User Context to be passed along as a parameter. The service being invoked can then associate any Business Objects created, updated, or deleted as a result of the service invocation with the User Context.

One example of this would be a User Manager 15400 associating a User Context instance 15402 with the Business Objects 15404 they are affecting. FIG. 154 illustrates a user manger/user context relationship diagram.

These associations can be used for auditing purposes. When a change to a Business Object is committed, a log entry can be created tying the change with the user that triggered it.

Benefits

Common User Representation. One single representation of a user and their access rights can be shared across all areas of the system.

Extensible Security. Because there is one source for the User Context various policies or strategies could be used to identity and authenticate the User within a context. For example, it could encapsulate the User's certificates that allow more advanced security strategies to determine authorization.

```
Class UserContext
  UserContext(Identifier identifier)
  Identifier getIdentifier( )
  String getName( )
  void setName(String newName)
  void addRight(String accessArea, AccessLevel level)
  void removeRight(String accessArea, AccessLevel level)
  Vector getRights(String accessArea)
  boolean canCreateIn(String accessArea)
  boolean canReadIn(String accessArea)
  boolean canUpdateIn(String accessArea)
  boolean canDeleteIn(String accessArea)
Class AccessLevel
  static AccessLevel create( )
  static AccessLevel read( )
  static AccessLevel update( )
  static AccessLevel delete( )
  boolean=(AccessLevel anAccessLevel)
```

It is expected that the User Context will be passed from component to component. In this case the User Context will have to be defined using some sort of interface language definition (IDL).

Collaborations

Permission

Policy

SecurityManager

Logging

Alternatives

MTS & EJB offer an environment that does not require the passing of the context with every operation. A container as a set <context type> that provides a handle within the component for the methods to access the cached context.

Information Services Patterns

Reliable information access mechanisms in a multi-user environment are a crucial, technical issue for almost all systems that a user builds.

Most business information systems manage data which must be saved in non-volatile storage (e.g., disk). The data must live, or "persist," between invocations of any particular application or program. Persistence is the capability to permanently store this data in its original or a modified state, until the information system purposely deletes it. Relational databases, object databases, or even flat files are all examples of persistent data stores.

This section discusses issues and approaches for developing an object-oriented persistence architecture.

A key issue frequently encountered in the development of object-oriented systems is the mapping of objects in memory to data structures in persistent storage. When the persistent storage is an object-oriented database, this mapping is quite straightforward, being largely taken care of by the database management system.

In the more common situation where the persistent storage is a relational database, there is a fundamental translation problem or a so-called "impedance mismatch". The physical, logical, and even philosophical differences between a relational and object data storage approach are significant. Mapping between the two is hard. The architecture must, in this case, include mechanisms to deal with this impedance mismatch.

The impedance mismatch is due to the following contrasting features of objects/classes and tables:

Identity: Objects have unique identity, regardless of their attributes. Tables rely on the notion of primary key to distinguish rows. While a relational DBMS guarantees uniqueness of rows with respect to primary keys for data stored in the database, the same is not true for data in memory.

Inheritance: This is a meaningful and important notion for classes; it is not meaningful for tables in traditional RDBMSs.

Navigation: The natural way to access and perform functions on objects is navigational, i.e., it entails following references from objects to other related objects. By contrast, relational databases naturally support associative access, i.e., queries on row attributes and the use of table joins.

The patterns in this section focus on problems and solutions associated with using a relational DBMS with an object-oriented persistence architecture.

A key objective of a comprehensive object-to-relational persistence architecture is shielding the application business logic and developers from the relational structure. The benefits are a simplified environment for business developers, reduced distraction with technical issues, and increased focus on the business object model and functional logic. However, in order to reap these benefits, a significant investment in architecture development is typically required.

The scope of a persistence architecture can range across the following levels of transparency and automation:

Heavyweight, fully-automated, including the mapping of the object model to the database schema and generation of all the database access code. Variants of this architecture type may allow the customization of database access code (e.g., for optimization purposes).

Lightweight mechanism which provides generic persistence capabilities to business objects but delegates all database access to separately developed data access routines. In this case, the data access routines are not part of the persistence architecture per se.

Minimal persistence approach in which each business object is directly responsible for database access Of course, there is a tradeoff between transparency, automation, and flexibility on the one hand, and architecture complexity and development cost on the other.

The patterns in this section solve several of the fundamental problems encountered in the development of an object-to-relational persistence architecture, including the mapping of classes to tables (Data Handler, Individual Persistence), identity management (Object Identifiers as Object), caching(Object Identity Cache), allocation of responsibilities (Data Handler, Piecemeal Retrieval, Persistent State Separate from Persistent Object), and data access optimization (Multi-Object Fetch) and the mapping of basic SQL types to object attributes (Attribute Converter).

In addition to providing persistence capabilities, reliable information access mechanisms in a multi-user environment must support transaction semantics. As the real-life implementation of all of the patterns in this section requires integration with transaction management frameworks, the Persistence patterns should be considered and used in conjunction with the patterns in the Transactions section.

Attribute Converter

FIG. 155 illustrates a flowchart for a method 15500 for translating an object attribute to and from a database value. A database is provided and a conversion process is determined for converting an object attribute to and from a database value in operations 15502 and 15504. The conversion process is encapsulated in an attribute converter. A first object attribute is directed to the attribute converter for conversion to a first database value in operation 15506. A second database value is directed to the attribute converter for conversion to a second object attribute in operation 15508.

A different attribute converter may be created for each type of conversion of object attributes to and from database values. In addition, the attribute converters may also implement a common interface. Further, all attributes of the same type may be directed to a particular attribute converter. Optionally, a second attribute converter may be substituted for the attribute converter for altering the conversion of the attribute. As an another option, the attribute converter may be altered for relieving a performance bottleneck.

Object attributes must go through some translation before they are written to and after they are read from some persistent stores. How can you isolate the translation algorithm from the persistent object and the persistence mechanism?

When interacting with a relational data store, the attribute value doesn't always map directly to a database type. Other times, an attribute value maps to more than one database type.

For example, in an Object based system, an attribute with a Boolean value is often converted from a Boolean object to a "T" or "F" string before it is saved in the database. In another example, a phone number attribute might be composed of an area code (847), an exchange (714) and an extension (2731). These three field might be saved in three separate database columns or combined into one before they are saved in the database.

FIG. 156 illustrates that an attribute 15600 can't be saved directly into the persistent store 15602.

An impedance mismatch exists between the attribute and the data store and a conversion must take place.

The logic to perform this conversion can vary from one attribute to another. Based upon the attribute type, a different conversion must take place. In addition, special situations can arise where the same type of attribute will be stored differently in different situations. It is desirable to reuse this logic; however, the solution must be flexible enough that the developer is not locked into one single translation for an attribute type.

Therefore, use an Attribute Converter to translate database values to object attributes and vice versa.

FIG. 157 illustrates the use of an Attribute Converter 15700 to save an attribute 15702 into a database 15704.

The knowledge of how to translate an attribute value to and from a persistent store is encapsulated in a separate Attribute Converter object.

The attribute's value should not be obtained directly from the attribute prior to saving it in the database. Nor should an attribute be instantiated directly from the raw value obtained from the persistent store. Values should be obtained or attributes created exclusively via an Attribute Converter.

It is recommended that a different Converter be created for each type of conversion required. This keeps the Converter's knowledge very specialized. As a result, the combination of Converters required to persist an entire object to a persistent store is very flexible due to the modularity of the Attribute Converter objects.

Benefits

- Reuse. For some types of attributes, the conversion process can be rather involved. If this knowledge is encapsulated in an Attribute Converter, it can be reused for converting other attributes of the same type.
- Flexibility. If the conversion for a specific attribute needs to be altered, simply substituting a different Attribute Converter will alter the behavior and not disrupt the rest of the application.
- Maintainability. Altering a single Attribute Converter can affect several attributes in the system. For instance, if the conversion of one specific type of attribute is identified as a performance bottleneck, altering the corresponding Converter can benefit a large part of the system.

Ideally, all Attribute Converters should implement a common abstract class or interface. This allows the architecture to treat all Converters equally. The architecture need not know the specific translator class it is using.

The interface may look something like this.

```
public interface AttributeConverter
{
    public String translateValueForDataStore(Object anAttribute);
    public Object translateValueFromDataStore(String aColumn,
java.sq1.ResultSet aResultSet);
}
```

The first behavior, translateValueForDataStore, takes an attribute and translates it into a String that can be used in an SQL statement. The second behavior, translateValueFromDataStore, takes a column name and JDBC result set as arguments. It then answers the attribute translated from the given result set. Each implementation of AttributeConverter must then implement both behaviors in their own specific way.

```
public class BooleanTranslator implements AttributeConverter
{
    public String translateValueForDataStore(Object anAttribute)
    {
        String value = null;
        if(anAttribute != null)
        {
            if(((Boolean)anAttribute).booleanValue( ))
```

-continued

```
        {
            value = "'T'";
        }
        else
        {
            value = "'F'";
        }
    }
    else
    {
        value = "NULL";
    }
    return value;
}
public Object translateValueFromDataStore(String aColumn,
java.sq1.ResultSet aResultSet)
{
    Boolean result = null;
    String value = null;
    value = aResultSet.getString(aColumn);
    if(value.equalsIgnoreCase("T"))
    {
        result = new Boolean(true);
    }
    else if(value.equalsIgnoreCase("F"))
    {
        result = new Boolean(false);
    }
    return result;
}
}
```

The Boolean Converter above knows how to translate a Boolean object to and from a character representation in the relational database.

Collaborations

Normalized Mapping—The Mapper contains all information required to store an object in a relational data store. Attribute Converter can be utilized by Normalized Mapping to store the knowledge needed to properly translate attribute state values to and from the persistent store.

Denormalized Mapping—Denormalized Mapper is another pattern for mapping objects to a relational database. The Attribute Converter pattern could be used by Denormalized Mapper to provide conversion between attribute values and database values.

Alternatives

Case Statements—Case statements aren't really a pattern, but they are an alternative to Attribute Converter. A case statement could be implemented in the super class to handle the translation of the data.

Data Handler

FIG. 158 illustrates a flowchart for a method 15800 for controlling data. A data retrieval mechanism is provided in operation 15802 for retrieving data from a database. The data retrieval mechanism also writes data to the database. In operation 15804, the data retrieval mechanism is encapsulated in a data handler. A request from a domain object is received for a retrieval of a portion of the data in the database in operation 15806. The data retrieval mechanism is utilized in operation 15808 to retrieve the portion of the data from the database. The portion of the data is passed through the data handler to the domain object in operation 15810.

The data retrieval mechanism may be capable of being used by a plurality of domain objects. Also, the data retrieval mechanism may capable of being used by only one of a plurality of domain objects. Dependencies on the data retrieval mechanism within the data handler may also be managed via code generation.

The data handler may physically partitioned into a component separate from the domain object. Optionally, the domain object may write attributes to a data stream. In such a case, the data handler may define an order in which the attributes are written to the data stream. Also, a row class may define the attributes in the same order as the attributes appear on the database. Further, the data handler may iterate over the attributes and may save them to the database.

Business Objects in memory generally store and retreive their data members from some type of persistent store. When using Individual Persistence, how can we ensure that the retrieval mechanism used by the domain object is independent of the business logic?

Individual Persistence assigns responsibility for data access at the level of individual domain objects. Each domain object or class can retrieve, update, insert, and delete its data from a persistent store independently of other objects or classes. This promotes encapsulation and reuse across business transactions.

FIG. 159 illustrates the data retrieval mechanism calls being placed directly within the domain object 15900 (in this example SQL is inserted into the Account business object).

When persistence is at the class level, it is typical to code the actual SQL, serialization, or CICS call directly in the class itself. In the example shown above, an "Account" object can contain the SQL needed to retrieve and save its state to the database.

This approach can reduce the flexibility of the domain object, in that, changes to the access logic or the backend database must result in changes to the business object or class. How can we ensure that the business logic is independent of the data retrieval mechanism for such a class?

FIG. 160 shows the interrelationship between a database 16000, a persist 16002, and an account 16004.

Business objects delegate their data retrieval mechanism to an appropriate handler. This Data Handler can be either be generic or specific to each type of domain object used. To minimize the impact of changes, dependencies on the database schema or data retrieval mechanism within the handler could be managed via code generation. In this manner, the physical data access is separated from pure business logic.

FIG. 161 illustrates that the database retrieval mechanism is separated from the business object 16100 by encapsulating the logic within a data handler 16102.

Benefits

Loose Coupling of Data Access. The business object is independent of the database access logic and the back-end database. As a result, the method by which the domain object accesses the persistent store can be changed without impacting existing source code.

Distribution. Data handlers can be physically partitioned into a separate component from the business logic. For example, the data handler could be on a data server component near the DB, while the business logic is in an application component.

Multiple Data Handlers. Different strategies can be implemented based upon specific requirements. For example, on the client we can use serialization to communicate with the server; whereas the server can use standard DB access to communicate with DB.

Support for Testing. Similarly, during testing, hard-coded data handlers can be created to return dummy data. These can then be replaced at run-time or later in testing without impacting the code.

The following information focuses on the implementation of the Data Handler pattern (TiMapper) and the separation of the business domain objects from the data retrieval mechanism used on the project.

FIG. 162 illustrates the TiPersistenceStream 16200 and TiMapper 16202.

TiPersistenceStream and TiMapper

Within the Rapid Batch Persist Service, objects save and load themselves by writing to or reading from a Persistence Stream. This is undertaken via the base class (TiPersist) with specialized streaming code created via the Creation Code Generator. As a result domain objects are only "aware" of how to stream themselves, and not how the data storage mechanism works.

The first attribute an object writes to the stream is its CLASS_ID. The stream then expects the other attributes to be put to the stream in the order defined by the mapper class (the data handler). This relationship between data handler and domain object is controlled via a row class, which defines the attributes in the same order as they appear on the DB (this class is also created via the Code Generator).

When the end of the stream is reached, the mapper class iterates over the list of attributes within the row and saves them via embedded Pro*C. When loading the reverse happens, in that, the mapper loads the information from Oracle and then populates a row based upon the CLASS_ID pulled from the database.

TiMapper

A Mapper for a class contains the columns(s) and table that the class will be written to, the type of the data and the order that they will be read from/written to the stream. It also reads and writes rows of data from the database. It generates a where clause from the primary key information (PID). A database runtime context is obtained from the Transaction Service (using the current implicit transaction context). It also contains the code to query for sequence ids, for classes that use optimistic locking.

The mapper contains the data retrieval mechanism that interacts with the Oracle database instance. As a result, if a different technology is used to interact with Oracle (e.g. stored procedures, embedded Pro*C, Method/3 Pro*C) only the mapper class needs to change.

TiRow

A row contains the data to be written to a database row from a stream or to be written to a stream from a database row. It knows the column names on the table and knows the order in which they are read from streams.

TiMapperManager

The mapper manager is responsible for creating mappers for a given CLASS_ID. Each type of mapper registers with the mapper factory when the shared object is loaded into memory (using the dynamic registration factory pattern). The mapper factory is a singleton read only object.

The Factory pattern can be used to create the appropriate Data Handler for a specific business object. This pattern enables the data access method to be changed at runtime (e.g. batch mode, online mode or Request Batcher).

The Stream-Based Communication pattern can be used to stream the business object's data to the handler. The stream can then be either forwarded to a Request Batcher or can parsed and sent to database.

Individual Persistence

FIG. 163 illustrates a flowchart for a method 16300 for organizing data access among a plurality of business entities. Data about a user is retrieved and packaged into a cross-functional data object in operation 16302 and 16304. A request for data is retrieved from one of a plurality of business objects in operation 16306. In operation 16308, the business object are directed to the data object such that the business object retrieves the entire data object. The business object also selects the data from the data object.

Both locking and integrity may use a uniform mechanism. The business object may retrieve account, customer, and bill-related data from the data object. Also, the business objects may be able to update themselves independently of each other.

Optionally, new business objects may take advantage of existing data access routines. Also, each business object may use a uniform access architecture.

Create a data access architecture that supports reusable, independent business objects in the context of atomic, functionally-specific transactions.

A business unit of work, or business transaction, typically acts on multiple business entities. But for each individual entity, the transaction might only display and update a few data attributes.

For example, accepting bill payment over the phone might use the account number, customer name, amount due, date due, and credit card number. The transaction could therefore avoid accessing many attributes of the account, customer, or monthly bill entities. This might naturally lead to a data architecture which only fetches required attributes, based on the transaction's needs.

Indeed, a traditional client/server program retrieves data in a piecemeal fashion. In this case, the example program would typically allocate a single record to fetch and store the required data items. Then, an "accept bill payment" data access module would fill this structure. This couples data access to processing function.

FIG. 164 illustrates retrieving data piecemeal.

This traditional style of data access may seem flexible. After all, developers can grab whatever data they need for a particular business transaction.

But such access is very unstructured. Different pieces of a cohesive account entity, for example, scatter across multiple windows. Some windows will use the account's effective date; others will not.

This also introduces redundancy. Retrieving the date requires determining the correct database, table, column, and type declaration. Yet another developer who needs this date, for a different data set, duplicates the effort. This does not encapsulate changes, thereby raising costs for testing, maintenance, and extension.

Moreover, each transaction must hand-craft its own retrieval procedure. Creating the thousandth new business transaction would require creating a thousandth new access module. Yet all data items would already have been retrieved by other modules. This style of data access is not reusable.

Finally, business entities are typically less likely to change than the transactions, or processes, which act on those entities. For example, an enterprise might re-engineer its billing function. Regardless of the resulting process, the account, customer, and monthly bill objects would likely remain. This suggests that transaction-based data access is brittle.

Therefore, data access should be organized around business entities, rather than transactions. Individual Persistence packages data into cross-functional objects, rather than transaction-specific data structures. Each individual business object, instead of the window or application, manages the retrieval of its data items.

A business object provides public methods for accessing, comparing, displaying, and setting that data. Developers can therefore no longer plunder the persistent store, selecting data items at will. Instead, they must access their data through encapsulated, self-requesting business objects.

With this architecture, the example billing function retrieves account, customer, monthly bill, and bill payment objects.

FIG. 165 illustrates the manner in which the present invention retrieves whole objects 16500.

For reuse, business objects should be able to request and update themselves independently of each other. Separating the data access for customer and account objects supports reusing them in isolation. Objects should therefore avoid explicitly requesting other linked objects, unless a formal containment relationship exists.

Finally, separation of concern allows business objects to remain blissfully unaware of the transactions which use them. A business object will not know which data items or services it may need to provide to its clients. Thus, the object must bring back all its data.

Benefits

Reuse. New transactions can take advantage of existing data access routines. For example, introducing a new business transaction, like perform credit check, would use existing customer and account objects. Yet, these domain model objects would already know how to update themselves. Therefore, the new application would build no new data access code.

Maintainability and extensibility. This approach supports "fix in one place." Any changes to particular data elements only need to be changed, tested, and recompiled in one access module, that of the owning business object.

Uniformity. Both optimistic locking and referential integrity (RI) are typically defined at the business object level. For example, separate account and customer objects typically have their own locking attributes. In addition, an RI rule usually relates one entity to another, such as "all accounts must have a customer." Organizing data access around business entities simplifies locking and integrity. Both can use a uniform mechanism, implying that the architecture can hide technical details. This avoids the hard-coding typical of the transaction-based approach.

Flexibility. Whole object retrieval is extensible. It allows a transaction to ask an object for any data. This supports maintenance and extension. A developer can easily change the particular data items a transaction uses. But whole retrieval still guarantees that those items will already have been retrieved. For example, a future release of the accept bill payment window could also display the social security number. Yet the data access routines would need no modification.

Each typical business class will support the standard CRUD flag capabilities, of:

Create

Retrieve

Update

Delete

This access architecture is uniform across business entities. The architecture can therefore standardize much of the processing. For instance, the architecture can handle, across business objects: dirty checks, CRUD flag management, optimistic locking, referential integrity, security checking, commit scope, request formatting, object streaming/unstreaming, message compression, and error handling. Moreover, business entities should support these capabilities through a consistent, polymorphic interface.

For example, all business objects could respond to the saveData message, to persist any changes. saveData could first check, privately, if the object was even modified. Then, using private CRUD flags, it could determine whether a save translates into an insert, update, or delete. Finally, saveData could stream out the business object's attributes, based on a defined layout. Then, a transaction persists its business objects by simply iterating over the collection, sending each member saveData.

The architecture should also encapsulate the data access protocols or products. For example, whether the business objects use a relational or object DBMS should be transparent to calling programs. This minimizes the impact of changes to the storage technology.

Individual Persistence naturally leads to multiple, small-grained request messages per transaction. Request Batcher solves performance problems with multiple network messages.

Data Handler encapsulates data access code from business objects. This protects business logic from changes in data access protocols and products.

Request Sorter handles referential integrity and deadlock avoidance in a uniform manner.

Multi-Object Fetch

FIG. 166 illustrates a flowchart for a method 16600 for retrieving multiple business objects across a network in one access operation. In operation 16602, a business object and a plurality of remaining objects are provided on a persistent store. Upon receiving a request for the business object in operation 16604, it is established which of the remaining objects are related to the business object in operation 16606. The related objects and the business object are retrieved from the persistent store in one operation and it is determined how the retrieved related objects relate to the business object and each other (see operations 16608 and 16610. A graph of relationships of the business and related objects is instantiated in memory in operation 16612.

An object navigation pattern of accessing the business object and then accessing relationships with the related objects may be used to retrieve the related objects. The relationships between the business and related objects for instantiating the graph of relationships may also be determined from a source object, a set of target objects, and the name of the relationship. Additionally, the establishment of which of the remaining objects are related to the business object and the determination of how the retrieved related objects relate to the business object and each other may be pre-processed before retrieving the selected related objects and the business object from the persistent store.

As an option, a portion of the objects may also be retrieved from a cache. Also, as another option, a batch request may be sent to the persistent store for retrieving the remainder of the objects.

It is not unusual to retrieve multiple business objects within a unit of work. How can the persistent objects involved in a unit of work be efficiently retrieved?

A given business object maintains associations to several other business objects. A given unit of work needs to access a subset of the defined associations. In order to perform the unit of work, the business object and the required subset of associated objects must be retrieved from persistent store.

In the course of performing a unit of work, a set of related objects needs to be accessed. Typically, one starts from a "root" object and "navigates" relationships to access related objects. This process can be repeated on the related objects.

An entire graph of related objects can be accessed in this manner. A natural way to retrieve these objects is through lazy instantiation, i.e., objects are retrieved from persistent store as each relationship is traversed. This retrieval pattern typically requires multiple database/network accesses and can have serious performance implications, especially over a WAN.

Therefore, a mechanism is needed to perform the retrieval from persistent store in one access operation. This mechanism includes:

Support for a declarative multi-object fetch statement which defines what is going to be fetched. This multi-object fetch statement does two things. It declares what is going to be fetched. It also declares how the objects that are being fetched relate to each other.

Retrieval of the persistent data corresponding to the multi-object fetch statement.

Instantiation of the graph of related objects in memory.

Benefits

Performance. Performance is increased by making a single trip across the network and a single database access to fetch several instances of objects that participate in a transaction. The savings can be especially noticeable over a. high-latency WAN.

Continuity. Within the application code, the object navigation pattern of accessing an object and then accessing relationships from that object can still be used to access objects.

Complexity. Requires more elaborate architecture than lazy instantiation.

FIG. 167 illustrates an example of an implementation of the Multi-Fetch Object 16700.

FIG. 168 illustrates the Fetching of a Household object 16800 along with the other related objects using the multi object fetch results.

FIG. 169 is an interaction diagram showing when the multi object fetch is not used.

Note that if there is a large household, and each hobbyist in the household has lots of hobbies and interests, several trips to the server will be made to fulfill this query. There needs to be a multi-object fetch specification that keeps enough detail to know what needs to be fetched and how the fetched object will relate to each other. Here is a structure that will capture that information.

```
struct MultiObjectFetchSpec
{
    AxysClassId classId;
    char **associationName;
};
```

This is a declaration of the multi object fetch using the example above with the Household, Hobbyist, Hobby and Interst.

There is a class MultiObjectFetch that performs the fetch and associates all of the related objects that have been fetched so that when these related objects are accessed there is no further access to the database. The MultiObjectFetch class uses the MultiObjectFetchSpec to determine how the objects fetched relate to each other. This implementation assumes that the persistent framework being used can fill in the relationship given a source object, a set of target objects and the name of the relationship.

```
class MultiObjectFetch
{
    public:
    MultiObjectFetch *MultiObjectFetch(
        MultiObjectFetchSpec *mofSpec);
    PersistentObject *fetch( );
    RWOrdered *fetchRows( );
};
```

There is an assumption that the Household, Hobbyist, Hobby and Interest business objects inherits from a common base class, PersistentObject. If the restriction on the household is to bring back one Household, fetch( ) would used. If the restriction on the Household will bring more than one Household, fetchRows( ) would be used. The fetch and the fetchRows brings back the Household objects(s) and the related Hobbyists, Hobbies and Interests.

Static Approach (using Stored Procedures)

A stored procedure would be written that would retrieve the Household object(s), Hobbyist objects related to the Household objects, Hobby objects related to the Hobbyist objects and the Interest objects also related to the Hobbyist objects. It is important that the stored procedure fetch the objects in this order since the multi object fetch spec declared that this is the expected order. These fetched objects would then be passed to the MultiObjectFetch object which would fill in all the relationships of the returned object using the fetch specification.

Dynamic Approach (Dependent Requests/Pending Actions)

The multi-object fetch can be pre-processed before sending the request to the database. Any objects that can be fetched from the cache will be fetched from the cache. The remaining requests that cannot be satisfied from the cache will then be sent as a batch request to the database. This

```
const HOUSEHOLD_CLASSID = 1;
const HOBBYIST_CLASSID = 2;
const HOBBY_CLASSID = 3;
const INTEREST_CLASSID = 4;
const NUMBER_OF_HOUSEHOLD_RELATIONSHIPS = 1;
const NUMBER_OF_INDIVIDAUAL_RELATIONSHIPS = 2;
static char *EmptyRelationship[1] = { 0 } ;
static char *
HouseholdRelationships[NUMBER_OF_HOUSEHOLD_RELATIONSHIPS
+ 1] = {"Hobbyists", 0};
static char *
HobbyistRelationships[NUMBER_OF_INDIVIDAUAL_RELATIONSHIPS
+ 1] = {"Hobbies", "Interests", 0};
static MultiObjectFetchSpec HobbyInterestMofSpec[5] =
{
    { HOUSEHOLD_CLASSID, HouseholdRelationships },
    { HOBBYIST_CLASSID, HobbyistRelationships },
    { HOBBY_CLASSID, EmptyRelationship },
    { INTEREST_CLASSID, EmptyRelationship },
    { 0,0 }
};
```

requires complex processing to determine if the cache can be used. This dynamic processing assumes that dynamic SQL will be used since it is not known at design time what objects will be found in the cache and what objects still need to be fetched from the database.

Dependent Request—used in dynamic approach

Request Batcher—used in dynamic approach

Batching Update—similar to bathing of fetches but used to batch updates

Relationship Stereotype—The setAssociation method is called to fill in the relationships Object Identifiers as Objects FIG. 170 illustrates a flowchart for a method 17000 for implementing an association of business objects without retrieving the business objects from a database on which the business objects are stored. In operations 17002 and 17004, a business object is provided and an instance of an associated object is stored on a database. An association of the business object with the instance of the associated object is determined in operation 17006. In operation 17008, an object identifier is generated containing information including the determination association which is necessary to retrieve the instance of the associated object from the database. The object identifier is loaded when the business object starts in operation 17010. A location of the instance of the associated object on the database is determined in operation 17012 from the object identifier and the instance of the associated object is retrieved from the database in operation 17014.

The object identifier may be used to provide a unique identity that is required for implementing caching and identity management. Also, the object identifier may include a unique row identifier generated by the database, an identifier generated by a utility, and/or a unique string generated from one or more attributes. As an option, different types of business objects may be provided. In such a case, a different class of object identifier may be generated for each type of business object. As another option, the determination of a location of the instance and the retrieval of the instance of the associated object may also include the taking the object identifier as an argument and returning the instance of the associated object.

Most useful business objects have a relationship, or association, with other business objects. How should this association be implemented without having to read the associated object's state from the database?

Most useful business objects have a relationship, or association, with another business object instance. Traditionally, this relationship is expressed as a pointer or reference to the object. However, pointers (and references) are memory constructs valid only so long as the object state exists in memory. When storing the object to a persistent storage medium (such as a relational database) these associations need to be expressed in some other way. Likewise, when the object is restored from persistent storage, the associations need to be reinitialized since it is unlikely that the associated object will reside in the same memory location. If the associated object is stored in the persistent medium, this usually involves restoring it as well. This can become a long and expensive process if the association graph corresponding to the restored object is large or complex. It is particularly undesirable if the associations are not even traversed by the application.

Therefore, implement the associations using object identifiers that contain the necessary information to retrieve the object if it is needed. These objects can then be loaded when the object is restored, eliminating the need to restore the entire associated object In addition, since these object identifiers uniquely identify an object instance, they can be used/passed in place of memory pointers. When the object is needed, simply restore the instance using the object identifier.

Benefits

Performance. Objects are retrieved only when they are needed.

Caching and identity management. Object Identifiers can be used to provide the unique id needed to implement caching and identity management.

The object identifier (or OID) must contain enough information to uniquely identify the instance. This identifier could be a unique row id generated by a database, a UUID generated by a utility or a unique string generated from one or more attributes. It is generally desirable to have a different class of OID for each type of object, thereby creating a more type-safe environment. It should also be noted that OID's should have value semantics.

In addition, a mechanism must be available to retrieve objects given their OID. This can be as simple as a static (or class) method such as getById that takes the OID as an argument and returns the instance of the object. A more sophisticated approach would be to implement this and other persistence related methods in a generalized utility class. Below is a simple example that illustrates the relationship between two classes using object identifiers. Please note that this example is an extreme simplification. A useful implementation of this pattern would exist as part of a persistence framework that would include many additional methods and abstractions.

```
class FooId
public:
    // accessors, constructors and destructors
private
    long_id,
};
class Foo
{
public:
    // accessors, constructors and destructors
    static Foo* getById(FooId& id);
};
class Bar
{
public:
    Foo* getFoo( )
{
        return Foo::getById(FooId);
            // The caller now owns the instance of Foo. Use of an
        // auto_ptr here is highly recommended.
    }
private:
    FooId_fooId;
};
```

Collaborations

Identity Manager—Uses Object Identifiers as unique key's for storing persistent state objects.

Persistent State Separate from Persistent Object—Uses Object Identifiers embedded in persistent state objects to eliminate coupling.

Object Identity Cache

FIG. 171 illustrates a flowchart for a method 17100 for mapping of retrieved data into objects. An object is retrieved from a data store and cached in operations 17102 and 17104. A unique object identifier is assigned to the object in operation 17106. The object identifier is mapped to a representation of the object in a dictionary in operation 17108.

When a request for a reference to the object is received in operation 17110, the object identifier of the object is retrieved from the dictionary in operation 17112. The requested reference is associated with the representation of the object stored in the dictionary in operation 17114.

In one embodiment, a data store may be accessed if the object identifier is not found in the dictionary to retrieve the object so that the process may be repeated with the retrieved object. In another embodiment, a query may be performed to retrieve multiple objects. A check may be performed to verify that each object is already cached so that objects not already cached may be cached.

Also, if an object in the cache has changed since read, an error may be raised if the object retrieved has changed since read and the object retrieved may be ignored if the object retrieved has not changed since read. If an object in the cache has not changed since read, the object in the cache may also be replaced with the object retrieved if the object retrieved has changed since read and the object retrieved may be ignored if the object retrieved has not changed since read. Further, if a query is guaranteed to return at most a single object, the cache may be used prior to going to the data store by sequentially applying the function to each object in the cache and implementing a predicate function which answers whether or not a given object satisfies the query.

Within a client context (e.g., a logical unit of work), the same object may be referenced more than once. How can object identity be preserved and redundant accesses to persistent store be avoided?

(Although this pattern is not specific to relational databases, we will, for the sake of concreteness and clarity, describe the pattern in terms of an object-to-relational mapping.)

Objects can be stored in and retrieved from a relational database. A retrieval strategy that simply translates relational data into objects in memory will almost certainly result in the instantiation of multiple copies of the same object. Furthermore, such a strategy is inefficient as the same data may be repeatedly and unnecessarily read from the database. This violates object identity and contributes to performance problems.

Suppose the class Account has an association with the class Customer. Suppose the instance of Account ABC is associated with the instance of Customer 123. The following demonstrates multiple requests to Customer 123.

Example customer123=getCustomer(123)

accountABC=getAccount(ABC)

secondRefererenceToCustomer123=accountABC.getCustomer( )

Note that customer123 and secondRefererenceToCustomer123 are the same customer. In this scenario, the desired behavior is to have the data store accessed once for customer123. Also there should only be one instance of customer123 in memory. customer 123 and secondReferenceToCustomer 123 should reference this instance of the customer123.

Therefore, the mapping of retrieved data into objects should be mediated by an Identity Cache. FIG. 172 illustrates an Object Identity Cache.

Logically, an Identity Cache is a dictionary which, for each cached object, maps a unique object identifier to a representation of the object. Each object must be assigned an object identifier (OID) which uniquely identifies the object over the life of the system.

The mediation mechanism works as follows: When a reference to an object is requested, the identity cache is consulted. If the object's OID is found in the cache, the requested reference is associated with the representation of the object stored in the cache. If the OID is not found in the cache, the data store is accessed. The object representation that is retrieved from the data store is inserted into the cache and the requested reference is associated with it.

Benefits

Performance. Performance is improved for frequently accessed objects since they are only fetched from the database once.

Identity Preserved. Object identity is preserved since objects are cached based on the objects OID.

A dictionary can be used to implement the Object Identity Cache. The following points should be considering when implementing an Object Identify Cache.

A query could be performed that returns multiple objects. Each object that is retrieved must be checked to see if it is already in the cache. If it is not in the cache it must be inserted. The following shows what should be done when an object is retrieved that is already in the cache to get is correctly inserted into the cache.

| | Object retrieved has changed since read | Object retrieved has not changed since read |
|---|---|---|
| Object in cache has changed since read | Raise an error. At commit transaction there will be an optimistic lock failure so it is better to raise it now. | Ignore the retrieved object, the object in cache is newer and the changes should not be lost. |
| Object in cache has not changed since read | Replace the object in cache with the object retrieved since the retrieved object is newer. | Ignore the retrieved object, it is already in the cache. |

If the object is not in the cache when the object is retrieved, a simple insertion into the cache can be done.

If a query is guaranteed to return at most a single object, the cache may be used prior to going to the database by:

implementing (for a given class) a predicate function which answers whether or not a given object satisfies the query sequentially applying the function to each object in the cache.

A multiple row query must go to the database unless there is a mechanism to indicate that the class is completely cached. This is applicable to static reference data.

Life Time of cached objects can affect Cache size. If life time of the cache is associated with a transaction there will be no problem. If the life time of the cache is associated with a longer lived entity such as a thread or a process, removal of objects from the cache must be actively managed. Two commonly used strategies are reference counting and LRU purging.

Collaborates with

Object Relational Query pattern describes a mechanism for storing objects in a relation database.

Object Identity

Persistent State Separate from Persistent Object

Used by

Context Management

Each Context (e.g., transaction, thread, etc.) owns an Identity cache which holds all of the objects in that context.

Persistent State Separate from Persistant Object

FIG. 173 illustrates a flowchart for a method 17300 for separating logic and data access concerns during development of a persistent object for insulating development of business logic from development of data access routine. A persistent object being developed is accessed and a state of the persistent object is detached into a separate state class in operations 17302 and 17304. The state class serves as a contract between a logic development team and a data access development team. Logic development is limited by the logic development team to developing business logic in operation 17306. In operation 17308, data access development is restricted by the data access development team to providing data creation, retrieval, updating, and deletion capabilities.

The business logic team may develop persistent objects that manipulate the state of the persistent object in accordance with business requirements. In one embodiment, the state may be implemented as a structure of values of basic data types. In another embodiment, the state class may contain member variables of lower data types including basic data types, extended basic data types with value semantics, other state classes, and/or vectors of the basic data types, the extended basic data types with value semantics and other state classes.

Optionally, the state class may support data structures of arbitrary shapes. Supporting classes may manipulate the state in a polymorphic fashion. As another option, the state may be further implemented as a class that contains key-value attribute pairs. The state class may also contain a keyed data structure containing attribute names and attribute values. Additionally, the state can also be asked to write data to a stream.

When designing and implementing persistent objects, how do we effectively insulate the development of business logic from the development of database access routine?

Given the use of a relational database as the persistent store, the scope of a persistence architecture can range across the following levels of transparency and automation:

- Heavyweight, fully-automated persistence architecture. Including the mapping of the object model to the database schema and generation of all the database access code
- Variants of the above scheme allowing the customization of database access code
- Lightweight mechanism which provides generic persistence capabilities to business objects but delegates all database access to separately developed data access routines. In this case, the data access routines are not part of the persistence architecture per se.
- Minimal persistence approach in which each business object is directly responsible for database access From a persistence perspective, no matter which of these approaches is used, development of the system and architecture presents two distinct challenges to the development team. The first challenge is to accurately represent the business logic as a collection of business objects that include interfaces for performing the correct set of functionality. The second challenge is to be able to create, retrieve, update and delete (CRUD) records that represent the state of these business objects from the database in an efficient fashion.

Data access and business logic are significantly different tasks both in their goals and development approaches. Consequently, except when a fully automated persistence architecture is used, it is often the case that two separate teams are responsible for the development of business logic and data access. If both teams work directly with the business objects, serious contention may result.Problems encountered in practice include:

- Changes to business logic that impacts the development (e.g., requires recompilation) of database access code even when there is no change to the attributes of business objects. (Note: recompilation can be a problem even if a fully automated persistence framework is used.)
- Changes to the database schema can impact the development of business objects
- The data access team may unduly influence the design of the business objects, leading to a data-centric model and design
- The two teams' development schedules need to be in sync; slippage on one team can adversely impact the other team's progress Therefore, detach the state of the business object into a separate state class that can be agreed upon and completed prior to the start of significant development by either the data access team or the business object team. This class should be nothing more than the raw data (preferably basic data types) used to represent the state of the object. The business object contains all business logic and a reference/pointer to an instance of the respective state class. This allows the development of business logic and data access to proceed in parallel with the state class serving as a contract between the two teams.

Using this approach, it is important to limit data access focus to providing CRUD operations (i.e., no business logic provided by stored procedures). The purpose of the data access portion of the application is to provide essential access to the data used by the business objets, and deliver this data in the most efficient way possible. Likewise, the purpose of the business object team is to develop business objects that manipulate the state of the object in accordance with the business requirements. Maintaining this separation insures there is no overlap between the development teams.

Benefits

- Development Time. Data access and business logic can be developed in parallel reducing overall development time.
- Separation of concern. Data access remains separate from business logic, improving the understandability of the design.
- Testability. Business objects can be more easily developed and tested based on data access stubs, thereby relieving the business object development teams from dependencies on the data access classes and the database libraries.
- Caching and identity management. Separating the persistent state from the persistent object can be leveraged to aid in managing multiple class instances that represent the same entity (see the Object Identity Cache pattern).
- Object distribution. Separating the persistent state from the persistent object can aid in passing state in a distributed system. In cases where in is necessary to pass an object as an argument to a distributed method, it is more desirable from a performance perspective to pass the object's state as opposed to a remote reference. A new instance can then be created from the state, manipulated locally and then returned to the caller.

The persistent state can be implemented in a variety of ways depending on the requirements of the system. They can roughly be described by the following Implement the State as a Structure of Values of Basic Data Types Each business object class has an associated struct. This is the most straightforward approach, although also the least flexible. With this approach, the business logic may need to manipulate lower level data types contained in the state object.

Supporting classes which need to manipulate the state object (in order to retrieve data from the database or pass the value between processes) need to be knowledgeable about the struct data type to manipulate it. In addition, copying the struct may be non-trivial if it contains dynamically allocated memory.

```
struct State_Data
    {
        long        id;
        char        code[8];
        string value;
    };
```

Implement the State as a Class Containing Member Variables of Basic Data Types

1. Implementation using a "developer-friendly" state class: A state class can contain basic data types (except char*), extended basic data types with value semantics (e.g., currency, String), other state classes, and vectors (not arrays) of all of the above. This does not, however, imply that the class is a flexible (dictionary-like) data structure. These state classes could/should all inherit from a common abstract base class which defines (but does not implement, at least in C++) a serialization protocol (Java is a different story than C++ because everything is serializable almost by default).

```
class StateClass
public:
    virtual void read(Stream inStream) = 0;
    virtual void write(Stream outStream) = 0;
};
class StateData : public StateClass
{
public:
    virtual void read(Stream inStream);
        //implementation reads state data from stream.
    virtual void write(Stream outStream);
        //implementation writes state data to stream.
Private:
    long        id;
    char        code[8];
    string value;
};
```

2. Implementation using an enhanced kind of the class described in (A) but which also happens to be a flexible data structure (in the sense that the same class can, similar to a dictionary, support data structures of arbitrary shapes).

This approach provides more flexibility since some common behavior can be abstracted into a base class. In addition, supporting classes which need to manipulate the state object (in order to retrieve data from the database or pass the value between processes) can do so in a polymorphic fashion. Also, copy constructors and destructors can be used to handle dynamically allocated memory.

Implement the state as a class that contains key-value attribute pairs.

This is an alternative approach to the one listed above. Using this technique the state class would contain a keyed data structure (e.g. a dictionary) containing keys (the attribute name) and values (the attribute value). In cases where you want to copy the state or pass it to another process, the supporting code does not need to know the type of the state object it is working with. State objects can simply be asked to read or write their data to and from a stream or string. While this offers a more dynamic solution, it should be noted that with this solution additional logic would need to be included in the persistent object to insure the validity of the associated state class.

In all of these approaches, another important concept is the implementation of associations between objects. In general, the best approach is to store these as Soft References to the other objects as opposed to actual pointers. This illuminates the need to load a large graph of objects when only one is needed, as well as easing the question of whether to implement a deep or shallow copy.

Identity Manager: Manages a collection of persistent state objects for a given class.

Context Manager: Used in conjunction with Identity Manager to maintain separate collections of persistent state objects for separate application contexts.

Lazy Instantiation: Restores persistent state object for a given object instance on-demand.

Object Identity Cache: Caches persistent state objects referenced by persistent objects.

Piecemeal Retrieval

FIG. 174 illustrates a flowchart for a method 17400 for providing a warning upon retrieval of objects that are incomplete. An object is provided with at least one missing attribute in operation 17402. Upon receipt of a request from an application for the object access to the attributes of the object is allowed by the application in operations 17404 and 17406. A warning is provided upon an attempt to access the attribute of the object that is missing in operation 17408.

The warning may include information on how to handle the missing attribute. An implicit transaction may also be called by the object upon the attempt to access the attribute of the object that is missing. In addition, an explicit transaction may be called by the object upon the attempt to access the attribute of the object that is missing. Also, the transaction may also include finding the attribute that is missing.

When legacy transactions don't allow object or entity based retrieval, how do we retrieve useful objects?

Object and component based projects designed and built from the ground up will likely have a well thought out component model and architecture where GUI widgets are linked or bound to domain objects. Data access (and retrieval) for these objects is organized around the business entity, rather than a transaction, and so data is packaged into cross-functional objects, rather than transaction-specific data structures. Each business object manages the retrieval of its data items.

These domain objects provide public methods for accessing, comparing, displaying, and mutating data. Therefore, developers will only access data through these encapsulated, self-requesting domain objects. (See Individual Persistence).

For example a billing application that accepts bill payment over the phone might use the account number, customer name, amount due, date due, and credit card number. With an Entity-Based Data Access architecture, the account 17500, customer 17502, monthly bill 17504, and bill payment objects 17506 will all be retrieved. FIG. 175 illustrates an Entity-Based Data Access System.

This architecture is preferred if conditions allow, however legacy programs usually retrieve data through transaction or message based systems. These transactions often have two notable characteristics. One, a business unit of work or business transaction often acts on multiple business entities, and two, for each individual entity, the transaction might only retrieve and update a few data attributes.

Using the same bill payment example, a legacy system might utilize a 'accept bill payment' transaction. This transaction would require only a small portion of the attributes for the account, customer, or monthly bill entities and so the data would be retrieved piecemeal only as required by the transaction.

FIG. 176 illustrates a Retrieving Data Piecemeal System.

In this case, the transaction would allocate a single record (an 'accountPaymentData' 17600 structure as shown in the Figure) to fetch and store the required data items. This structure would then be used to populate the business entities.

As a result, domain objects are left incomplete and therefore unsuitable for use by all services. This forces the developers of services to know and understand the use of transactions to retrieve objects.

Therefore, when legacy circumstances dictate, retrieve data piecemeal, on a transaction basis as necessary rather than as complete business entities and develop mechanisms to handle access and updates to missing attributes of piecemeal objects.

By default, objects should return a warning when a missing attribute is accessed with no other means to retrieve it. This warning would simply let calling applications know that an attribute is missing or unavailable. The calling application would then have to determine how to handle these missing attributes.

A preferred approach to handling missing attributes would be to use multiple overlapping transactions. While, each transaction might only populate a part of the object, the transactions taken together assemble complete objects.

This use of overlapping transactions could either be implicit or explicit to the objects. An implicit transaction would be called by the object when a missing attribute is accessed. This method of lazy retrieval may be preferable because it is transparent to the calling application.

An explicit transaction would be called by a task independent of the object. Note however, that explicit transactions would either require that the task holds the object or that an object identity mechanism is used to find the existing object rather than create a new one.

In some cases, new transactions can be created for the explicit purpose of retrieving full or partial business entities. This approach requires a thorough knowledge of the legacy system.

In other cases, the legacy code can be opened and the transactions modified to bring back additional data. Care should used when doing so as legacy code is often fragile and poorly documented.

Benefits

- Legacy Reuse. The overwhelming benefit of piecemeal retrieval is that it enables reuse of legacy systems. Clients generally have a substantial investment in their existing systems and they will be hard pressed to convert them to component based systems built on objects. This pattern allows new systems to reuse existing business logic through their transactions.
- Performance and Impedance. Objects based on transactions typically bring back only that data which is needed. The transaction is typically mapped directly to change that the user is trying to make. This improves performance by reducing the number of network calls and only bringing back data that is needed.

Individual Persistence organizes data access around business entities rather than transactions.

Object Streaming handles the conversion of data from the structures received from transactions into business objects.

Transaction Service Patterns (1012)

Transactions and LUWS

A transaction is a set of business events that, coupled together, accomplish a particular business function, such as turning on gas service. Because the events are logically related, their data changes are logically related as well. Taken together, these data changes create a new, consistent state for the business model.

While a transaction is in process, the state of the business model may not be consistent, so it is necessary to manage the entire transaction from its point of origin to its point of completion. Whether the transaction is successful or not, the point of completion will always result in a steady, consistent state for the business model. For successful transactions, data changes will be committed and the business model will reflect all new business data associated with the transaction. For failed transactions, data changes will be rolled back and the business model will appear as it did prior to the start of the transaction.

To help manage the transaction from point of origin to point of completion, each transaction is organized through a single Logical Unit of Work (LUW). This LUW manages the business model and any of its subsequent data changes. While both users and internal exceptions can determine the success of a transaction, the LUW handles the commit and rollback operations.

FIG. 177 illustrates a Commit and Rollback routine 17700.

As transactions become more complex and require a greater scale of changes to the business model, the LUW trying to manage these changes becomes large and unwieldy. To simplify these transactions, the LUW is broken down into nested, more granular, logically related units of work called Secondary LUWs. Secondary LUWs are identical to LUWs except that their commit and rollback operations affect only the business model of their parent LUW and are not persisted to a data store. Consequently, a secondary LUW must manage its data changes differently than its parent.

FIG. 178 illustrates Nested Logical Units of Work.

One method for managing changes to the business model involves copying the model into the secondary LUW. Another often simpler approach is to store both old and new (or potential) values for all objects in the business model.

Transaction Patterns

In the process of managing its business model, a LUW will often have to send messages to all business objects within the LUW. Examples of such messages include saveDataChanges, retrieve, or isDirty. Rather than hardcoding a call to each object in the model, the pattern LUW Context suggests using a bag (or collection) to hold all objects referenced by the LUW. Then, a single message can be sent to the bag which will forward it to all objects within it.

Support for user multi-tasking can also present problems for LUWs. Through multi-tasking, multiple LUWs will be running concurrently. Problems occur if the business models of these concurrent LUWs overlap and the transactions attempt to write to the same business object. A call center representative trying to solve two customer problems during the course of one call is one example of this scenario. The Separate Models pattern helps solve this issue by assigning each LUW independent copies of their portion of the business model. This keeps one transaction from interfering with another.

There are also several patterns that address problems related to sending transactions across the network. These patterns typically focus on minimizing network messaging.

When an LUW is called to commit, the transaction will assemble the necessary objects from the business model to send their data changes to the information services layer. This group of objects will include all new and dirty objects as well as any objects marked for deletion. For each business object, the transaction will likely have a corresponding request. If each of these requests were then sent to information services independently, a large number of network messages would result. To solve this problem, the Request Batcher pattern batches all requests associated with a transaction together into one network message. On the other end of the network, Information services would unbatch the transaction requests and persist the data changes.

Another problem that may arise when multiple requests are sent for a given transaction is deadlock. Deadlock occurs when two requests are trying to lock the same pair of objects. Each request locks one object and waits to commit until it can lock the other. Therefore, each request will wait for the other to complete while neither is able to do so. The Request Sorter pattern works with Request Batcher to handle this problem by sorting requests as they are being unbatched by Information Services. A request is not allowed to proceed until any dependent requests are completed.

During retrieval, one request may depend on the response data for another request. For example, a business transaction that tries to retrieve a customer when given a customer ID will probably also want to retrieve the customer's address. However, the transaction won't have the address ID until the customer is retrieve. Thus multiple network messages are required when one request is dependent on another. The Dependent Request pattern solves this problem by allowing a batched request to indicate that it depends on another request.

As these patterns demonstrate, there is a high degree of correlation between Transaction Services and Information Services. Many of these transaction patterns require an understanding of Information Services patterns. Two such examples are Individual Persistence and Piecemeal Retrieval. It is recommended that these patterns be read and understood prior to using Request Batcher, Request Sorter and Dependent Request.

Dependent Request

FIG. 179 illustrates a flowchart for a method 17900 for allowing a batched request to indicate that it depends on the response to another request. A group of business objects necessary for a transaction are provided in operation 17902. Logically-related requests received from the business objects are batched into a single network message in operation 17904. One of the requests is a parent request. Received from the parent request in operation 17906 is a register that at least one of the requests is dependent upon the response data. The network message is sent across a network and the requests are unbundled from the network message in operations 17908 and 17910. Upon receipt of a response to the parent request in operation 17912, data is directed from the response to the parent request to the dependent request in operation 17914. Received from the response to the parent request is a response to the dependent request based on the received data in operation 17916.

The dependent request may not have a primary key. In such situation, the response to the parent request may include the primary key for allowing the dependent request to be responded to. As another option, the dependent request may also include a pointer indicating that the dependent request is dependent on the parent request. In this situation, the pointer may be passed to the parent request during the step of batching the requests into the network message.

Additionally, the pointer may be a configurable field of the dependent request. The requests may also be reused independently of each other. In event another aspect of the present invention, the dependent request may wait for the parent response at the server for minimizing network traffic.

During retrieval, one request may depend on the response data for another request. Nevertheless, ensure that a single network message contains both requests, while using Request Batcher.

A business transaction typically acts on multiple business entities. Consider an account maintenance window, which edits information from account, customer, credit profile, and home and work addresses. Given a unique account identifier, the business transaction can retrieve all five objects.

Once the account retrieves all of its data, it will know its unique customer identifier.

The customer can then retrieve its own data, which includes the identifiers for the credit profile and both addresses. Finally, the profile and addresses can retrieve their data. In this case, profile and address retrieval depends on customer data; customer retrieval in turn depends on account data.

However, Individual Persistence requires that each object have its own, independent request module. That is, customers do not always need accounts to be retrieved. After a customer's unique identifier has been filled in—regardless of by whom—it retrieves its data independently.

In theory, this independence is not an issue. The account could first get its data. After the customer's identifier was filled, the customer could send its own request.

In practice, however, sending multiple messages, in series like this, degrades network performance. Request Batcher 18000 provides a solution which bundles up requests into one network message, thereby minimizing traffic. FIG. 180 illustrates a Batching Retrievals and Dependency.

This batching framework applies not only to update messages. For retrieval as well, one overall, batch request receives one batch response. Yet an individual batched request may depend on the response data from another batched request. The serial nature of the two requests must be preserved, even while the requests actually go in the same batch, in parallel.

Therefore, additional mechanisms should allow a batched request to indicate that it depends on another request. If a business object does not have its primary key—or other attributes guaranteeing a unique match—it becomes a Dependent Request. Because a dependent cannot fetch itself, some other business object will inevitably have the necessary foreign key. The dependent request will therefore register its dependency on this other object.

This object, the parent request, can have multiple dependents. The aforementioned customer had credit profile and address dependencies. This implies the need for an arbitrarily large collection of dependent requests; A dependency collection can even include requests for multiple instances of the same class. This was the case with two address requests depending on the same customer.

FIG. 181 illustrates the Dynamically Setting Dependency. Dependencies should not be hard-coded. Any business object can register as dependent on any other object which can provide the necessary data.

In this manner, dependencies can be set at run-time. This could happen while building the model, or as requests register with Request Batcher.

Benefits

Performance. This solution supports request batching for retrieving interdependent models.

Reuse. Because dependencies are not hard-coded, business objects can be reused independently of each other.

Loose Coupling. When a request dynamically registers its dependency, it need not know anything about its parent request. The dependent effectively says, "I don't know who you are, but I know that your response data contains my identifier."

Dependent Request would be irrelevant were it not for the "transaction impedance mismatch." This mismatch means that transactions no longer map one-to-one to access modules. Individual Persistence is the approach which dictates that each business entity have its own independent access module.

Request Batcher solves the performance problems of sending multiple, small-grained request messages over a network. But the resultant single message must support dependencies, with Dependent Request or a similar mechanism.

LUW Context

FIG. 182 illustrates a flowchart for a method 18200 for sending a single message to all objects in a logical unit of work. A group of business objects necessary for a transaction are provided and managed in a logical unit of work in operations 18202 and 18204. A receiver is created which communicates with the business objects in the logical unit of work in operation 18206. Upon receiving a message for the business objects in the logical unit of work in operation 18208, the message is directed to the receiver in operation 18210. The receiver also forwards the message to each of the business objects in the logical unit of work.

Several groups of business objects necessary for a transaction may also be provided with each group of business objects being managed in a separate logical unit of work. Also, a separate receiver may communicate with each group of objects. As another option, a request batcher in communication with the receiver may also be provided for batching requests from the business objects for delivery. In such an embodiment, the request batcher intercepts the requests from the business objects and holds the requests until told to deliver the requests by an activity associated with the logical unit of work.

Optionally, the receiver may hide technical details including details of persistence and garbage collection from business developers. As a further option, the business objects may be distributed across a network. Also, the receiver may distribute the message to each of the business objects across the network. Additionally, the logical unit of work may optionally be modeled as an object in software.

Applications often need to send technical messages, like saveDataChanges( ) or release( ), to all business objects in an LUW. Do this in a consistent manner and hide technical details from business developers.

Consider an Account Payment window, which displays information about an Account, Customer, Monthly Bill, and Payment. This window occasionally needs to send generic, technical messages to all business objects within its LUW. This messaging has nothing to do with the window's application-specific behavior. In fact, the other windows in the system need to send the same, generic messages to their LUW business objects. Although the business objects receiving these messages differ from window to window, the messages remain the same.

In addition, this messaging typically has an arbitrary order. All that matters is that all business objects eventually receive the same message.

For example, the window might use Individual Persistence. Then, when the user decides to save the window, all business objects receive a message like saveDataChanges( ). The resultant pseudo-code would look like:

```
AccountPaymentActivity::saveDataChanges( )
{
    //Propagate along the save message to all business
    //objects in my LUW.
    this.getAccount( ).saveDataChanges( );
    this.getCustomer( ).saveDataChanges( );
    this.getMonthlyBill( ).saveDataChanges( );
    this.getBillPayment( ).saveDataChanges( );
}
```

A retrieveData( ) message might also be required, if the object model pre-instantiates objects before retrieving them. Similarly, refresh( ) could be used: the business object, if dirty, replaces any changes with data originally from the data store.

Even without Individual Persistence, there are other common messages the window may want to send. For example, distributed objects typically need to be told when their memory can be reclaimed. COM+ uses the well-known method releaseRef( ), whereas some implementations of CORBA use release( ). Regardless, this is a common message that would also need to be sent to the business objects, similar to the saveDataChanges( ) propagation above.

Dirty Flag provides another example. Here, the window accumulates the results of dirty checking, as follows:

```
AccountPaymentActivity::isDirty ( ) {
    //Return true if any single business object in the LUW is dirty,
    return
        (this.getAccount( ).isDirty( ) or
        this.getCustomer( ).isDirty( ) or
        this.getMonthlyBill( ).isDirty( ) or
        this.getBillPayment( ).isDirty( ) );
}
```

This hard-coded approach, although straightforward, is both tedious and error-prone. It is tedious because business developers shouldn't have to deal with technical issues like dirty checking or distributed garbage collection. They should focus instead on business-specific processing.

Moreover, this is error-prone because it can be difficult to detect if the developer makes a mistake. For example, a new requirement could make the window display address information. In addition to re-painting the window, the developer would also need to modify their hand-coded methods. But the developer might forget to update the isDirty( ) or release( ) methods. Such errors can be difficult to locate. (Readers who have debugged memory leaks will certainly agree.)

Instead, an architecture mechanism should encapsulate the propagation of these technical messages. When a message needs to be forwarded generically, to all objects in an LUW, the architecture should handle it. Such a capability would free business developers from worrying about these technical details. FIG. 183 illustrates a Hand-crafted Message Forwarding scheme.

Therefore, an architecture "bag" will represent the business objects in a particular LUW. This bag, or collection, will hold onto each business object. Then, when the bag receives a message like saveDataChanges( ) or release( ), it simply forwards the message to each member business object.

FIG. 184 illustrates a Generic Message Forwarding feature.

Each LUW must have its own bag. This enforces the Isolation property (of ACID) for LUWs. That is, one LUW should not affect another LUW. For example, if the Account Payment and Account Services activities have separate LUWs, they will correspondingly have their own bags. Then, calling saveDataChanges( ) on the Account Payment activity will forward saveDataChanges( ) to only those business objects owned by Account Payment.

The bag also helps ensure the Atomicity property (also of ACID) for LUWs. It provides a single, atomic interface into the multiple business objects of the LUW. By design, it ensures that all business objects receive the same architecture messages.

Thus, the scope of a bag is an LUW In addition, a bag provides contextual information for the LUW—i.e., which business objects that LUW uses. The architecture bag therefore models the LUW Context, and will be named as such.

Benefits

Encapsulation. LUW Context hides technical details of persistence, garbage collection, etc., from business developers. Some of the Known Uses have managed to hide this framework, in entirety, from business logic.

Robustness. This approach guarantees that each business object in the LUW receives forwarded messages. There is no longer the chance of a developer forgetting to include a particular business object in a group message.

Application Maintainability. As the application requirements change, the set of business objects in an LUW can change without impacting the generic, LUW code. For example, a future version of the Account Payment window could also display Address information. This introduces a new business object into the LUW. Yet it would not require updating saveDataChanges( ), or release( ) methods, as it would have previously.

Performance. LUW Context can dramatically improve performance in a distributed environment. By nature, it batches up messages for a group. This can reduce network messaging.

For example, consider a search window which has instantiated 30 business objects. Releasing those objects, if the messages were sent independently, would require 30 network messages. However, with LUW Context, a single message can go from the client to the server. Then, within the server executable, the LUW Context forwards release( ) to the 30 member objects. This is far less costly than using the network for that messaging. Because of this message batching, some readers may confuse LUW Context with Request Batcher. It is true that both reduce the number of network messages. However, the former is concerned with supporting a family of generic, architecture messages, like isDirty( ) and refresh( ), on a single atomic object. The latter is concerned with grouping database requests into a physical package, for un-batching at the server. Although both have similar principles and characteristics, they solve different problems and are implemented differently.

Architecture Extensibility. LUW Context models the LUW as an actual object in the software. Any other architecture processing which executes on a per-LUW basis can also be coded there. (See the Related Patterns section for examples.)

This pattern seeks to hide the message propagation from business logic. In fact, messaging to an LUW Context can be hidden completely in an architecture superclass. Previously, saveDataChanges( ) would've been coded specifically in each concrete activity class. LUW Context allows it to be abstracted, as in:

```
AbstractLUWActivity::saveDataChanges( ) {
    //Propagate along the save message to all business
    //objects in my LUW. Subclasses don't even need to
    //know about this method.
        this.getLUWContext( ).saveDataChanges( );
    }
```

This assumes that business objects were put into the LUW Context in the first place. The context object can be passed in when instantiating an object, transparently by the persistence and streaming frameworks, etc.

An LUW Context can collaborate with a Request Batcher, if requests are batched for transmission to the data store. Rather than storing the batcher globally, each context and hence model can have its own manager. This allows multiple domain models, in multiple contexts, to send transactions simultaneously but independently. Then, whenever a business object requests an access or update, its request will be intercepted by the model's particular Request Batcher. The batcher then holds these requests until the activity—which owns the LUW—tells the batcher to send them.

The LUW Context holds onto all domain objects in a particular model. It can therefore collaborate with an Identity Registration Manager, to enforce object uniqueness within the particular context.

The Potential Variables pattern, which provides local undo, is discussed in the first version of the Object Solutions Handbook. If local LUWs use this approach, then LUW Context is a natural location to store the LUW phase variable.

In that pattern, every time a business object sets an attribute, the variable must be checked. The LUW Context, as intermediary, can provide a simple public interface which supports setting and querying the phase variable.

Request Batcher

FIG. 185 illustrates a flowchart for a method 18500 for batching logical requests for reducing network traffic. A group of business objects necessary for a transaction are provided and managed in a logical unit of work in operations 18502 and 18504. In operations 18506 and 18508, logically-related requests received from the logical unit of work are grouped into a single network message which is then stored. The message is sent in operation 18510 upon receiving an order to send the message.

Optionally, update and retrieval transactions may be grouped into a single network message which is stored. The message may be sent upon receiving an order to send the message. As another option, the requests from the message may be unpackaged at a point across a network and data changes may be persisted. In a further optional embodiment, responses to the requests may be received and the responses may be bundled into a reply. In one embodiment, the requests in the message may be sorted. In such an embodiment, the requests in the messages may also be separated into submessages.

When domain objects request themselves, minimize the impact of network traffic.

Individual Persistence assigns responsibility for data access to individual business objects. Then, each business object can retrieve, update, insert, and delete its data from a persistent store independently of other objects. This promotes encapsulation and reuse across business transactions.

FIG. 186 illustrates the manner in which the present invention sends requests 18600 independently.

Thus, an LUW which uses multiple business objects will correspondingly have multiple requests. This might suggest that each independent request communicate independently with data access services. Then, each logical request would translate into its own physical, network message.

Every network message imposes a certain amount of overhead, independently of its contentsor length. This implies that multiple, small-grained messages have more overhead than a single, large-grained message. Many networked-constrained environments cannot tolerate this additional overhead. Such environments should minimize the impact of this network traffic.

Therefore, a high-performance transaction should batch its logical requests into a single network message. Moreover, a framework should handle this packaging, transparently to application logic.

FIG. 187 illsutrates a manner in which the present invention registers requests.

A Request Batcher 18700 object will group logically-related requests. All requests will register with this coordinating object, rather than sending themselves immediately and independently to their server or database. The batcher will then store these requests together, until told to send them as a unit. This batching applies equally well to update and retrieval transactions.

A corresponding Request "Unbatcher" 18702 on the server will unpackage the bundled network message. Finally, this Unbatcher will bundle the network response and send it back to the Request Batcher.

Benefits

Performance. Sending a single message of multiple requests, as opposed to multiple messages of single requests, improves communication performance.

Dynamic. Batching and sorting requests is transparent to the requests themselves. Requests do not know that a particular transaction contains them. This dynamic relationship allows any type of request to be part of any transaction at run-time.

Scaleability. In an asynchronous or multi-threaded environment, an application could use multiple Request Batchers. For example, each LUW could have its own batcher. A batcher needs to store state while building the batch, as requests register. Using multiple instances facilitates registration for, and sending of, multiple batches simultaneously. Users can then multi-task while other, time-consuming requests process in the background.

This simultaneity can also be supported with one, multi-threaded batcher. In this case, each request registers along with its unique transaction id.

Centralization. The batcher has visibility over all requests in the LUW. This provides a centralized point to sort these requests, thereby supporting referential integrity and deadlock avoidance.

Request Sorter

FIG. 188 illustrates a flowchart for a method 18800 for sorting requests that are being unbatched from a batched message. A group of business objects necessary for a transaction are provided in operation 18802. Logically-related requests received from the business objects are grouped in operation 18804. Sorting rules and/or sort weights are obtained in operation 18806 and, in operation 18808, the requests in the message are sorted and placed in a specific order determined from the sorting rules and/or the sort weights. The sorted requests are batched into a single message which is sent to a data server where the requests are unbundled from the message in the specific order (see operations 18810, 18812, and 18814).

A request may also not be allowed to proceed until all dependent requests are completed. A plurality of transactions may each use the same sorting rules for preventing deadlocks. Optionally, the class represented by each request may be determined so that the sorting rules may be based on a class type. As another option, the sorting rules may include referential integrity rules which ensure that references between two relational tables are valid. In such a situation, a linear ordering of requests may also be created based on the referential integrity rules. The numbering of the position of the request in the linear ordering may also be the weight of that request so that requests with lower weights are processed before requests with higher weights.

In an update transaction, order requests for referential integrity and deadlock avoidance.

Referential Integrity

Referential Integrity (RI) ensures that references between two relational tables are valid. That is, foreign keys in one table must refer to existing primary keys in another table. For example, RI rules could require that all accounts have a customer. Then, values in account.cust_id would need matching values in customer.cust_id.

Mission-critical RDBMSs can enforce RI at run-time. Then, if a modified foreign key does not match an existing primary key, the database prevents the update.

Continuing the example, a transaction may insert a new customer and its new account. If the transaction inserts the account first, account.cust_id will refer to a non-existent customer. The RDBMS will raise an error, thereby failing the transaction. Instead, the account request should run after the customer request.

Deadlock Avoidance

Even without RI, request ordering remains an issue.

Imagine a transaction A orders customer before account. Conversely, a concurrent transaction B orders account before customer. A will request a lock on the customer table, while B will request a lock on the account table. A must wait for B to complete and release its account lock. Yet B cannot complete until A releases its customer lock.

Thus, both transactions will deadlock. Many transaction-processing systems would simply fail both transactions, after a time-out. Yet both transactions may otherwise have been valid.

Traditional Approach

Traditionally, transactions have hard-coded deadlock avoidance and RI. Each transaction has called its own update module. Each hand-crafted module has ordered multiple SQL statements, according to these rules.

However, with Individual Persistence, a transaction no longer maps to a centralized module. Instead, independent requests register for the transaction in an ad-hoc manner. FIG. 189 illustrates an Ad Hoc Registration feature.

Moreover, an account has no hard-coded "knowledge" that it should persist after a customer. This independence provides flexibility any business object can request an update without concern for other business objects. A framework which constrains the request order must support this flexibility.

Therefore, an update transaction should sort its requests before sending them to the data server. The sorted result will conform to RI rules. Then, across update transactions, all customer requests can appear before all account requests. In addition, every transaction will use the same sort algorithm. That will prevent deadlocks.

Multiple requests can no longer send themselves directly to the server, in an ad hoc fashion. Instead, they must register with a centralized object, which can sort them first. A centralized Request Sorter will order multiple requests before finally sending the transaction.

FIG. 190 illsutrates a manner in which the present invention sorts requests by weight.

The sorter 19000 will have visibility to sorting rules, or even weights, to determine this order. The rules can typically be based on the class type. Before sending the transaction, the sorter can ask each request which class it represents. In this manner, the sorter can re-order the requests appropriately.

Benefits

Separation of Concern. This sorting pattern hides the technical details and complexity of RI from business logic. Applications avoid hard-wiring customized RI rules for its transactions.

Maintainability. RI rules can easily be changed without impacting application code. Granted, this does not happen frequently in production.

Reusability. The generic Request Sorter uses universal sorting rules, or weights. These rules are global across business processes. Moreover, the rules are based on existing, reusable business objects. Therefore, new applications can reuse the sorter, as well.

Visibility. If RI enforcement is distributed across application logic, it can be difficult to get a complete picture of the referential rules. Request Sorter centralises those rules (i.e. weights) in one, visible place.

A complete, linear ordering of all domain classes can be created, based on the RI rules. Each class will have a unique position in the ordering. This position is the class' weight for the sorting algorithm. Requests for domain objects with lower weights will always appear before requests with higher weights.

For example, consider the ordering:

27. . . .

28. Customer

29. MeterRead

30. Account

31. Meter

32. MonthlyBill

33. . . .

This satisfies the RI rule mentioned earlier, because Customers have a lower weight (28) than Accounts (30). Thus, requests for customers will appear in any transaction before requests for accounts. As long as the order satisfies every RI rule, the request sorter can use such a linear ordering.

This sort ordering can be created programmatically. A sort generator can convert pairwise relationships into linearly-ordered weights. Then, the Request Sorter could use an algorithm like QuickSort to do the actual sorting. (Alternatively, object requests could be sorted as they are registered, a la Insertion Sort.)

A centralized store-and-forward site must hold requests, before they send themselves to the server. Otherwise they cannot be sorted as a group. Request Batcher provides a centralized place to attach a sorter.

Separate Models

FIG. 191 illustrates a flowchart for a method 19100 for assigning independent copies of business data to concurrent logical units of work for helping prevent the logical units of work from interfering with each other. In operation 19102, multiple logical units of work operating concurrently are provided. Each of the logical units of work manipulate at least one common business object. In operation 19104, a copy of the common business object is created for each of the logical units of work such that the copy of the business object for one logical unit of work becomes a separate instance from the copy of the business object for another logical unit of work. Each copy of the business object knows the context of that copy of the business object in relation to the associated logical unit of work. Upon receiving a request to make changes to a copy of the business object of one of the logical units of work in operation 19106, that particular copy of the business object is changed while the other copies of the business object are not changed. It is then verified in operation 19108 that only one copy of the business object has been changed and the common business object is updated in operation 19110 based on the change to the copy of the business object.

A business object may optionally be passed as a parameter from one context to another. In such case, a context copy of the business object may be created which includes a duplicate of the original data and excludes a context variable. As another option, an exception may be thrown when an attempt is made to create a copy of a business object being altered by one logical unit of work for another logical unit of work.

The business object may also be sent to another context as at least one of a single focus of a window that is being created and a parameter in an explicit parameter-passing mechanism. Additionally, the copies of the business objects may be created from a same retrieved data stream. As a further option, receiving a request to make changes to a copy of the business object of one of the logical units of work and changing that copy of the business object may further include the broadcasting of the change to the other logical units of work.

Support multiple business LUWs within an MVC-based architecture. Manage these LUWs concurrently yet separately, thereby preserving the Isolation property of ACID.

Multi-tasking allows the user to complete several different business functions independently of each other. Those functions which are business LUWs must process concurrently yet separately. For example, a user could establish a new customer account while separately verifying bill details for another customer.

Providing for these multiple LUWs demands mechanisms which ensure integrity. Specifically, as with any LUW, a primary LUW must isolate its own changes. It is an independent workspace which prevents its changes from affecting other LUW.

However, an MVC-based OO architecture does not naturally support this requirement. With MVC, the domain model stores all data changes. Windows are merely a view into this model, and they have little business data of their own. In addition, MVC model objects have no idea which views are using them. Instead, the model anonymously broadcasts its data changes, and all views on the model respond by updating themselves. This synchronizes windows with their business data. Thus, MVC allows multiple views to simultaneously display, and be refreshed by, a single copy of the model data.

FIG. 192 illustrates the MVC Implementation with Global Model.

Unfortunately, this benefit of MVC introduces a problem. A globally-shared domain model does not naturally separate concurrent LUWs. It puts a burden on business "activity" objects, which coordinate the high-level business processing across their domain models. Each activity has to either avoid overlap or know specifically how it affects the model.

Consider a telecommunications system, with two separate business LUWs for paying bills and adding new services, like call waiting. An end user might launch windows for these two LUWs simultaneously. This would allow the user to multi-task while conversing with the customer.

Both windows display Account and Customer information. In addition, the Account Services window actually modifies the Account object, whereas the Account Payment window does not. Making a payment only modifies the Bill Payment object. Both windows, using MVC, could share the same Account 101 instance.

It is not atypical for custom architectures to have generic mechanism for persistence and transactions. For example, the architecture could use a straightforward mechanism which automatically saves all business objects within an LUW. Then, when the user saves the Account Payment window, the changes to Account 101 would be accidentally saved as well. The user would then not be able to later cancel changes on the Account Services window. This violates the isolation of the two LUWs.

A similar problem might arise with a garbage collection framework, which explicitly destroys all instances once the LUW has completed. In this case, Account Payment would need to ensure it did not explicitly free the memory for Account, while Account Services was still using it.

Therefore, using a global, MVC model may preclude using other architecture mechanisms. To avoid the problems of overlapping saves or releasing memory prematurely, the windows could have additional code to ensure the LUWs remain separate. However, adding application-specific code in this manner, to handle a global technical requirement, is undesirable.

Instead, business LUWs should be able to modify domain data independently of each other, transparently in the architecture. In addition, each data change should unambiguously belong to a single, originating LUW.

Modern Object Transaction Monitors promise to provide this capability. These products will handle locking, tracking which LUW has made changes to which piece of data, etc. However, in the absence of an OTM, a custom architecture needs a different approach.

Therefore, separate business LUWs by giving each LUW separate copies of business data.

Rather than using a globally-shared model, each business LUW will own a private, scratchpad copy of its domain model. This satisfies the independence requirement. A business object in one model will automatically be a separate instance from a business object in another model, even if they share the same functional identity. For example, simultaneously opened payment and services windows would have separate copies of Account 101.

Then, changes made to a particular instance will only be reflected in the LUW which created and points to that instance. This contrasts with a single, globally-shared model. The latter would simultaneously reflect changes across multiple LUWs.

FIG. 193 illustrates the Separate Models for Separate Business LUWs 19300,19302.

The aforementioned telecommunications example had two separate business LUWs for the account payment and account services functions. Although both activities may be related by the same logical account, this pattern gives each a different context copy. Then, when the customer representative cancels the addition of call waiting, she can still save the payment details.

FIG. 194 illustrates the Canceling of one LUW 19400 Independently of Another LUW 19402.

Thus, using Separate Models preserves the integrity of business LUWs. It allows each LUW to easily save or cancel independently.

This pattern is not intended to allow different LUWs to simultaneously change their different physical copies of the same logical entity. In fact, if both windows modified their Account 101 copy, one of the LUWs would fail. (Mechanisms like optimistic locking would detect the data integrity conflict.)

Precisely for this reason, a good UI design doesn't typically allow simultaneous but separate LUWs to update the same data. And this was not an issue in the example above. Updates to the Account object occur on the Account Services window but not the Account Payment window.

Benefits

Isolation. Most fundamentally, this pattern solves the Isolation requirement of ACID. It ensures that each LUW has its own "working storage" copies of business data.

Transparency. Separating models can be done in an architected fashion, as outlined in the implementation section. The separation of LUWs—which is a technical issue—can be hidden completely from business logic.

Imagine instead that LUWs didn't have their own copies. Then, each operation might need an additional argument: the LUW owning the data change. This would pollute application code with an extra "transaction ID" argument, as in setBalance(newBalance, transactionId). As previously mentioned, this is only required in the absence of an Object Transaction Monitor. An OTM can transparently manage the transaction Id with the thread, without including it as an explicit argument.

Uniformity. Application developers don't need to know about which objects may or may not be used by other, concurrent LUWs.

The following implementation assumes that the LUW Context pattern is used to help separate the LUWs.

Each instance of a business object knows which LUW owns it. That is, each instance knows its context. By definition, context gives something a scope, a frame of reference, a relationship to other things. To provide this relationship, an actual LUW Context object will hold onto business objects which share a business LUW.

In addition, each business object can point to its context. In that manner, business objects know their LUW. This could be useful, for example, while building a domain model. Then, the parent object could propagate its context to a linked, child object.

Business objects owned by the same business LUW share the same LUW Context, whereas different LUWs have different contexts. Each context therefore contains its own "working-storage" copy of the model. This delineates an individual workspace, or scratchpad, for each LUW.

At a higher level, each activity object which represents a business LUW has its own context object. That context remains with the activity throughout its entire lifecycle. For initialization, creating a new LUW activity also creates a new context instance for that activity. This context will then be passed downwards, to all business objects, as part of navigation.

Eventually, when the activity closes, it releases its LUW Context. This correspondingly releases all business objects. They can then be garbage collected, because the only LUW using those objects just closed. A context's lifecycle therefore corresponds directly to its activity's lifecycle.

Preserving Context Boundaries

Every context has a scope which limits the business LUW. This context boundary cannot be violated with objects from other LUW Contexts. For, the same instance of a business object cannot live in two different contexts. Otherwise, changes made to that instance would affect two different LUWs.

It is often necessary, however, to pass a business object as a parameter from one context to another. For example, a user may open up a customer details window based on a selection from a search window. The selected customer becomes the focus of the new window, but it was instantiated in the search context. It is the responsibility of the details window to take the passed-in customer and make a context copy of it. A context copy duplicates the original's data, excluding the context variable, which is re-set to the new context. The copied customer can then be safely used and modified within the details context.

A business object can be passed as parameter to another context as:

the single focus of a window that is being created
a parameter in an explicit parameter-passing mechanism For example, when a business object is the focus of a new activity, the launching activity could instantiate the new activity as follows:

```
MeterMaintenanceActivity::prorateMeterRead( MeterRead aMeterRead )
{
    // Creates a new activity to prorate <aMeterRead>. This will manually adjust the
    // read charges, based on corrections from the location, the office, etc.
    // Pseudo-code below.
    // Create the new activity instance by reflection, based on the class name, and
    // give it a new context and <aMeterRead> as focus.
    newProrateActivity = this.newActivity(
                    this.prorateMeterReadClassName( ),
                    aMeterRead );
    // Other initialisation here ...
    newProrateActivity.startup( );
}
```

The newActivity( ) architecture method instantiates a new activity, instantiates a new context, and creates a context copy of aMeterRead that the new activity can use.

Sometimes an activity cannot get enough information simply by navigating from the focus. Non-focus information that must be passed as an additional parameter could be handled in the following manner:

```
MeterMaintenanceActivity::prorateMeterReadWithCorrection(
        MeterRead originalMeterRead, MeterRead correctedMeterRead )
{
    // Creates a new activity to prorate <originalMeterRead> based on measurements
    // in <correctedMeterRead>. Pseudo-code below. (Duplicates some code above
    // for clarification.)
    // Create the new activity instance by reflection, based on the class name, and
    // give it a new context and <originalMeterRead> as focus.
    newProrateActivity = this.newActivity(
                    this.prorateMeterReadClassName( ),
                    originalMeterRead );
    // Pass along the corrected read, as well. This will create a context copy and
    // then use reflection to call the right public setter on the activity.
    newProrateActivity.receive( aCorrectedMeterRead,
```

-continued

```
"setCorrectedRead" );
    // Other initialisation here ...
    newProrateActivity.startup( );
}
```

Here, the receive( ) framework method allows any business object to be passed across the context boundary. The receiving activity will automatically create a context copy and then call the specified setter method, with the copy as argument. The setter is application-specific, and it allows the activity to handle and store the context copy wherever it wants.

FIG. 195 illustrates the Context Copying Protects Context Boundaries.

A dirty object should not be safely copied into a new LUW context. Otherwise, the second LUW would begin using information that was half-completed in the first LUW. Again, this violates the isolation requirement. The second LUW could save its changes before the first LUW. This means the first LUW couldn't undo any changes it had made to the dirty object. Instead, to avoid this problem, an exception should be thrown when trying to copy dirty objects across contexts. This disallows users from beginning a new LUW based on half-entered data.

Thus, context copying allows LUW contexts to share parameter information while preserving context boundaries.

Persistence Caching

Although LUW contexts manipulate separate copies of business objects, they can often share the same retrieved data stream. For example, when a workstation retrieves data for Customer ABCD, the returned stream can be stored in a global cache. If another context wants to later instantiate its own copy of Customer ABCD, it can reuse the details stored in the stream cache. This improves performance, by avoiding a redundant request to the remote data store.

Context "Refresh"

Each LUW, while working on its data, is independent of the other LUWs. From that perspective, each LUW context manipulates data that, to its knowledge, is the most current information from the data store. One instance's changes remain invisible to another copy of the same business entity, during the course of normal processing.

However, when an LUW context successfully commits changes, it will have more current data than other contexts which it intersects. This up-to-date data can be broadcast and shared with the other contexts. These contexts can then decide to transparently incorporate the changes or not.

This refresh mechanism can be complex to build, and it requires an understanding of locking issues. For example, does the window have any changed data which might conflict with the new data? This would make the changes which hadn't yet been committed invalid, and the user would need to be notified.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for distributing incoming requests from a client amongst server components for optimizing usage of resources, comprising the steps of:

(a) receiving incoming requests from a user interface, wherein the user interface resides on a client and the requests are received by an activity module, and wherein the activity module instructs the client to handle a first subset of the requests on the client and the activity module forwards a second subset of the requests to a utilization-based load balancer, such that the activity module resides between the user interface and a plurality of server components;

(b) storing the second subset of the requests on the load balancer upon receipt thereof from the activity module;

(c) determining an availability of server components from among the plurality of server components;

(d) compiling a listing of available server components;

(e) determining which server component on the listing of available server components is most appropriate to receive each of the second subset of the requests, wherein the load balancer calculates an amount of utilization that each available server component is currently experiencing wherein the amount of utilization of each available server components is calculated based on at least two of: current CPU utilization, kernel scheduling run-queue length, current network traffic at a node to the server component, and a number of requests currently being serviced; and (f) sending each of the second subset of the requests to the selected server component determined to be most appropriate to receive each of the second subset of the requests.

2. A method as recited in claim 1, wherein the step of determining which server component is the most appropriate is performed by allocating the request on a round-robin whereby requests are assigned to consecutive server components by traversing along the listing of available server components.

3. A method as recited in claim 1, further comprising the step of rerouting a request to a different available server component upon a crash of the selected server component.

4. A method as recited in claim. 1, further comprising the step of saving the server components in a persistent store, wherein a check is made to determine whether a connection to a server component needs to be reestablished.

5. A computer program embodied on a computer readable medium for distributing incoming requests from a client amongst server components for optimizing usage of resources, comprising the steps of:

(a) a code segment that receives incoming requests from a user interface, wherein the user interface resides on a client and the requests are received by an activity module, and wherein the activity module instructs the client to handle a first subset of the requests on the client and the activity module forwards a second subset of the requests to a utilization-based load balancer, such that the activity module resides between the user interface and a plurality of server components;

(b) a code segment that stores the second subset of the requests on the load balancer upon receipt thereof from the activity module;

(c) a code segment that determines an availability of server components from among the plurality of server components;

(d) a code segment that compiles a listing of available server components;

(e) a code segment that determines which server component on the listing of available server components is most appropriate to receive each of the second subset of the requests, wherein the load balancer calculates an amount of utilization that each available server component is currently experiencing wherein the amount of utilization of each available server components is calculated based on at least two of: current CPU utilization, kernel scheduling run-queue length, current network traffic at a node to the server component, and a number of requests currently being serviced; and (f) a code segment that sends each of the second subset of the requests to the selected server component determined to be most appropriate to receive each of the second subset of the requests.

6. A computer program as recited in claim 5, wherein the code segment that determines which server component is the most appropriate is performed by allocating the requests on a round-robin basis whereby requests are assigned to consecutive server components by traversing along the listing of available server components.

7. A computer program as recited in claim 5, further comprising a code segment that reroutes a request to a different available server component upon a crash of the selected server component.

8. A computer program as recited in claim 5, further comprising a code segment that saves the server components in a persistent store, wherein a check is made to determine whether a connection to a server component needs to be reestablished.

9. A system for distributing incoming requests from a client amongst server components for optimizing usage of resources, comprising the steps of:

(a) logic that receives incoming requests from a user interface, wherein the user interface resides on a client and the requests are received by an activity module, and wherein the activity module instructs the client to handle a first subset of the requests on the client and the activity module forwards a second subset of the requests to a utilization-based load balancer, such that the activity module resides between the user interface and a plurality of server components;

(b) logic that stores the second subset of the requests on the load balancer upon receipt thereof from the activity module;

(c) logic that determines an availability of server components from among the plurality of server components;

(d) logic that compiles a listing of available server components;

(e) logic that determines which server component on the listing of available server components is most appropriate to receive each of the second subset of the requests, wherein the load balancer calculates an amount of utilization that each available server component is currently experiencing wherein the amount of utilization of each available server components is calculated based on at least two of: current CPU utilization, kernel scheduling run-queue length, current network traffic at a node to the server component, and a number of requests currently being serviced; and (f) logic that sends each of the second subset of the requests to the selected server component determined to be most appropriate to receive each of the second subset of the requests.

10. A system as recited in claim 9, wherein the logic that determines which server component is the most appropriate is performed by allocating the requests on a round-robin basis whereby requests are assigned to consecutive server components by traversing along the listing of available server components.

11. A system as recited in claim 9, further comprising logic that reroutes a request to a different available server component upon a crash of the selected server component.

12. A system as recited in claim 9, further comprising logic that saves the server components in a persistent store, wherein a check is made to determine whether a connection to a server component needs to be reestablished.

* * * * *